United States Patent
Ebrom et al.

(10) Patent No.: US 10,333,731 B2
(45) Date of Patent: Jun. 25, 2019

(54) METHODS AND APPARATUS FOR COMMUNICATIVELY COUPLING INTERNAL COMPONENTS WITHIN APPLIANCES, AND APPLIANCES WITH EXTERNAL COMPONENTS AND ACCESSORIES

(71) Applicant: WHIRLPOOL CORPORATION, Benton Harbor, MI (US)

(72) Inventors: Matthew P. Ebrom, Holland, MI (US); Mark E. Glotzbach, Granger, MI (US); Richard A. McCoy, Stevensville, MI (US); Andrew D. Whipple, Saint Joseph, MI (US); Donald E. Maynard, Ypsilanti, MI (US); Matthew J. Nibbelink, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 119 days.

(21) Appl. No.: 15/056,674

(22) Filed: Feb. 29, 2016

(65) Prior Publication Data
US 2016/0218884 A1    Jul. 28, 2016

Related U.S. Application Data

(60) Continuation-in-part of application No. 14/997,700, filed on Jan. 18, 2016, and a continuation-in-part of
(Continued)

(51) Int. Cl.
*H04L 12/28*    (2006.01)
*H04L 29/06*    (2006.01)
(Continued)

(52) U.S. Cl.
CPC ............ *H04L 12/281* (2013.01); *D06F 33/02* (2013.01); *G05B 15/02* (2013.01); *G06F 8/34* (2013.01);
(Continued)

(58) Field of Classification Search
CPC ............ H04L 12/2803; H04L 12/2807; H04L 12/2809; H04M 1/72533
See application file for complete search history.

(56) References Cited

U.S. PATENT DOCUMENTS 4,303,990 A    12/1981  Seipp
4,345,132 A    8/1982   Takase et al.
(Continued)

FOREIGN PATENT DOCUMENTS

DE    4038801 A1    6/1992
DE    19746423 A1   4/1999
(Continued)

OTHER PUBLICATIONS

International Search Report and Written Opinion from PCT Application No. PCT/US2008/081441, dated Apr. 29, 2009, 11 pages, 11 pages.
(Continued)

*Primary Examiner* — Jeong S Park

(57) ABSTRACT

Example methods and apparatus for communicatively coupling internal components and accessories appliances, and appliances with external components and accessories are disclosed herein. A disclosed example method of operating a domestic appliance having at least one of an internal communications network and/or an external communications network among at least two components includes identifying the components, communicating the capabilities of each identified component, communicating the status of each identified component, providing a command interface
(Continued)

for operating the components, facilitating communication between the components, and operating the appliance using the command interface and the facilitated communication.

20 Claims, 126 Drawing Sheets

Related U.S. Application Data application No. 14/874,682, filed on Oct. 5, 2015, now abandoned, and a continuation-in-part of application No. 14/741,609, filed on Jun. 17, 2015, now abandoned, and a continuation-in-part of application No. 13/889,625, filed on May 8, 2013, now Pat. No. 9,277,188, and a continuation-in-part of application No. 11/571,457, filed on Dec. 29, 2006, now Pat. No. 9,401,822, said application No. 14/997,700 is a continuation of application No. 12/340,995, filed on Dec. 22, 2008, now Pat. No. 9,264,252, which is a continuation of application No. 11/953,595, filed on Dec. 10, 2007, now Pat. No. 8,533,253, which is a continuation-in-part of application No. PCT/US2006/022503, filed on Jun. 9, 2006, and a continuation-in-part of application No. PCT/US2006/022420, filed on Jun. 8, 2006, said application No. 14/874,682 is a continuation of application No. 11/930,299, filed on Oct. 31, 2007, now Pat. No. 9,164,867, which is a continuation-in-part of application No. PCT/US2006/022503, filed on Jun. 9, 2006, said application No. 14/741,609 is a division of application No. 12/206,766, filed on Sep. 9, 2008, now Pat. No. 9,103,061, which is a continuation-in-part of application No. 11/931,170, filed on Oct. 31, 2007, now Pat. No. 8,688,530, which is a continuation-in-part of application No. 11/617,793, filed on Dec. 29, 2006, now abandoned, which is a continuation-in-part of application No. PCT/US2006/022503, filed on Jun. 9, 2006, and a continuation-in-part of application No. PCT/US2006/022420, filed on Jun. 8, 2006, said application No. 13/889,625 is a continuation of application No. 12/256,555, filed on Oct. 23, 2008, now Pat. No. 8,442,042, which is a continuation-in-part of application No. 11/932,876, filed on Oct. 31, 2007, now Pat. No. 8,816,828, which is a continuation-in-part of application No. PCT/US2006/022503, filed on Jun. 9, 2006, said application No. 11/571,457 is a continuation of application No. PCT/US2006/022420, filed on Jun. 8, 2006.

(60) Provisional application No. 60/595,148, filed on Jun. 9, 2005.

(51) Int. Cl.

| | |
|---|---|
| D06F 33/02 | (2006.01) |
| G06F 9/54 | (2006.01) |
| H05B 6/68 | (2006.01) |
| H04L 29/08 | (2006.01) |
| G05B 15/02 | (2006.01) |
| G06F 8/34 | (2018.01) |
| G06F 8/38 | (2018.01) |
| G06F 9/445 | (2018.01) |
| H05B 1/02 | (2006.01) |
| H05B 6/66 | (2006.01) |
| H04M 1/725 | (2006.01) |
| G04G 7/00 | (2006.01) |

(52) U.S. Cl.
CPC ............ *G06F 8/38* (2013.01); *G06F 9/44505* (2013.01); *G06F 9/54* (2013.01); *H04L 12/282* (2013.01); *H04L 12/2803* (2013.01); *H04L 12/2814* (2013.01); *H04L 12/2816* (2013.01); *H04L 12/2818* (2013.01); *H04L 12/2823* (2013.01); *H04L 12/2825* (2013.01); *H04L 12/2827* (2013.01); *H04L 67/12* (2013.01); *H04L 69/26* (2013.01); *H05B 1/0252* (2013.01); *H05B 6/668* (2013.01); *H05B 6/688* (2013.01); *G04G 7/00* (2013.01); *G05B 2219/2642* (2013.01); *H04L 12/2807* (2013.01); *H04L 12/2809* (2013.01); *H04L 12/2832* (2013.01); *H04L 2012/285* (2013.01); *H04M 1/72533* (2013.01); *Y02B 40/143* (2013.01)

(56) References Cited

U.S. PATENT DOCUMENTS

| | | | |
|---|---|---|---|
| 4,375,586 A | 3/1983 | Ueda et al. | |
| 4,480,307 A | 10/1984 | Budde et al. | |
| 4,503,535 A | 3/1985 | Budde et al. | |
| 4,520,576 A | 6/1985 | Vander | |
| 5,113,398 A | 5/1992 | Howes | |
| 5,321,229 A | 6/1994 | Holling et al. | |
| 5,517,622 A | 5/1996 | Ivanoff et al. | |
| 5,520,576 A | 5/1996 | Wastell et al. | |
| 5,609,786 A | 3/1997 | An | |
| 5,710,409 A | 1/1998 | Schwarzbaecker et al. | |
| 5,754,548 A | 5/1998 | Hoekstra et al. | |
| 5,774,528 A * | 6/1998 | Bogner ............... | H04L 12/2825 340/533 |
| 5,839,097 A | 11/1998 | Klausner | |
| 6,009,284 A * | 12/1999 | Weinberger ........ | G03G 15/5079 399/77 |
| 6,105,122 A | 8/2000 | Muller et al. | |
| 6,121,593 A | 9/2000 | Mansbery et al. | |
| 6,148,349 A | 11/2000 | Chow et al. | |
| 6,243,772 B1 | 6/2001 | Ghori et al. | |
| 6,295,272 B1 | 9/2001 | Feldman et al. | |
| 6,426,947 B1 | 7/2002 | Banker et al. | |
| 6,453,687 B2 | 9/2002 | Sharood et al. | |
| 6,480,753 B1 | 11/2002 | Monaghan et al. | |
| 6,539,501 B1 | 3/2003 | Edwards et al. | |
| 6,539,570 B2 | 4/2003 | Youn et al. | |
| 6,559,882 B1 | 5/2003 | Kerchner et al. | |
| 6,587,739 B1 | 7/2003 | Abrams et al. | |
| 6,622,925 B2 | 9/2003 | Carner et al. | |
| 6,668,339 B1 | 12/2003 | Maeda et al. | |
| 6,681,248 B1 | 1/2004 | Sears et al. | |
| 6,711,632 B1 | 3/2004 | Chow et al. | |
| 6,847,614 B2 | 1/2005 | Banker et al. | |
| 6,883,065 B1 | 4/2005 | Pittelkow et al. | |
| 6,919,815 B2 | 7/2005 | Peterson et al. | |
| 6,934,592 B2 | 8/2005 | Hood et al. | |
| 6,948,098 B2 | 9/2005 | Pillay et al. | |
| 6,983,628 B2 | 1/2006 | Cho et al. | |
| 6,993,615 B2 | 1/2006 | Falcon et al. | |
| 6,996,115 B1 | 2/2006 | Budde et al. | |
| 6,996,741 B1 | 2/2006 | Pittelkow et al. | |
| 7,003,688 B1 | 2/2006 | Pittelkow et al. | |
| 7,043,663 B1 | 5/2006 | Pittelkow et al. | |
| 7,069,468 B1 | 6/2006 | Olson et al. | |
| 7,117,051 B2 | 10/2006 | Landry et al. | |
| 7,127,633 B1 | 10/2006 | Olson et al. | |
| 7,134,011 B2 | 11/2006 | Fung et al. | |
| 7,136,927 B2 | 11/2006 | Traversat et al. | |
| 7,149,983 B1 * | 12/2006 | Robertson ......... | G06F 17/30398 715/810 |
| 7,165,107 B2 | 1/2007 | Traversat et al. | |
| 7,171,475 B2 | 1/2007 | Weisman et al. | |
| 7,295,099 B2 | 11/2007 | Lee et al. | |
| 7,808,368 B2 * | 10/2010 | Ebrom ................. | D06F 39/005 340/286.11 |

(56) References Cited

U.S. PATENT DOCUMENTS

| | | | |
|---|---|---|---|
| 2001/0025349 A1* | 9/2001 | Sharood | G06Q 30/0235 |
| | | | 713/340 |
| 2001/0025392 A1 | 10/2001 | Youn et al. | |
| 2002/0005787 A1* | 1/2002 | Gabai | H04B 1/202 |
| | | | 340/12.29 |
| 2002/0043557 A1 | 4/2002 | Mizoguchi et al. | |
| 2002/0120502 A1 | 8/2002 | Sakaguchi et al. | |
| 2002/0161552 A1 | 10/2002 | Ryu et al. | |
| 2003/0040813 A1 | 2/2003 | Gonzales et al. | |
| 2003/0076240 A1* | 4/2003 | Bae | G05B 19/0426 |
| | | | 340/12.5 |
| 2003/0182412 A1* | 9/2003 | Lee | H04L 12/2803 |
| | | | 709/223 |
| 2004/0031038 A1 | 2/2004 | Hugly et al. | |
| 2004/0057455 A1 | 3/2004 | Choi et al. | |
| 2004/0060932 A1 | 4/2004 | Chun et al. | |
| 2004/0098504 A1 | 5/2004 | Ueno et al. | |
| 2004/0156170 A1 | 8/2004 | Mager et al. | |
| 2004/0172587 A1 | 9/2004 | Lawlor et al. | |
| 2004/0201627 A1* | 10/2004 | Maddocks | G06F 9/451 |
| | | | 715/762 |
| 2004/0240451 A1 | 12/2004 | Lee et al. | |
| 2004/0260407 A1 | 12/2004 | Wimsatt | |
| 2005/0011886 A1 | 1/2005 | Kim et al. | |
| 2005/0013310 A1 | 1/2005 | Banker et al. | |
| 2005/0018612 A1 | 1/2005 | Fitzgerald et al. | |
| 2005/0021712 A1 | 1/2005 | Chassapis et al. | |
| 2005/0076312 A1* | 4/2005 | Gardner | G06F 3/0482 |
| | | | 715/853 |
| 2005/0103466 A1 | 5/2005 | Landry et al. | |
| 2005/0141438 A1 | 6/2005 | Quetglas et al. | |
| 2005/0203647 A1 | 9/2005 | Landry et al. | |
| 2005/0251604 A1 | 11/2005 | Gerig et al. | |
| 2005/0258961 A1 | 11/2005 | Kimball et al. | |
| 2006/0009861 A1 | 1/2006 | Bonasia et al. | |
| 2006/0015299 A1 | 1/2006 | McDermott et al. | |
| 2006/0092861 A1 | 5/2006 | Corday et al. | |
| 2006/0120302 A1 | 6/2006 | Poncini et al. | |
| 2006/0123124 A1 | 6/2006 | Weisman et al. | |
| 2006/0123125 A1 | 6/2006 | Weisman et al. | |
| 2006/0168159 A1 | 7/2006 | Weisman et al. | |
| 2006/0168269 A1 | 7/2006 | Sather et al. | |
| 2006/0184661 A1 | 8/2006 | Weisman et al. | |
| 2006/0190266 A1 | 8/2006 | Tanigawa et al. | |
| 2007/0129812 A1 | 6/2007 | Ferchau et al. | |
| 2007/0129813 A1 | 6/2007 | Ferchau et al. | |
| 2007/0156265 A1 | 7/2007 | McCoy et al. | |
| 2007/0160022 A1 | 7/2007 | McCoy et al. | |
| 2007/0255796 A1* | 11/2007 | Lee | H04L 12/2803 |
| | | | 709/208 |
| 2007/0288331 A1 | 12/2007 | Ebrom et al. | |
| 2007/0298405 A1 | 12/2007 | Ebrom et al. | |

FOREIGN PATENT DOCUMENTS

| | | |
|---|---|---|
| EP | 082465 A2 | 10/1997 |
| EP | 1016831 A1 | 7/2000 |
| EP | 1028604 A2 | 8/2000 |
| EP | 1133188 A2 | 9/2001 |
| EP | 1351447 A1 | 10/2003 |
| FR | 2680592 A1 | 2/1993 |
| JP | 58148316 A | 9/1983 |
| JP | H06313561 A | 11/1994 |
| JP | 200249381 A | 2/2002 |
| JP | 200274086 A | 3/2002 |
| JP | 2004096591 A | 3/2004 |
| JP | 2004333079 A | 11/2004 |
| KR | 20020006809 A | 1/2002 |
| KR | 20030035228 A | 5/2003 |
| KR | 1020050066456 A | 12/2003 |
| KR | 1020050068297 A | 12/2005 |
| WO | 2005046166 A1 | 11/2004 |
| WO | 2005109135 A1 | 11/2005 |
| WO | 2006014504 A2 | 2/2006 |
| WO | 2006135726 A2 | 12/2006 |
| WO | 2006135758 A1 | 12/2006 |

OTHER PUBLICATIONS

International Search Report and Written Opinion from PCT Application No. PCT/US2008/08198, dated Apr. 21, 2009, 12 pages, 12 pages.

European Search Report from EP Application No. 10161402.2, dated Aug. 11, 2010, 5 pages.

European Search Report for Counterpart EP08859140.9, dated May 26, 2017.

* cited by examiner

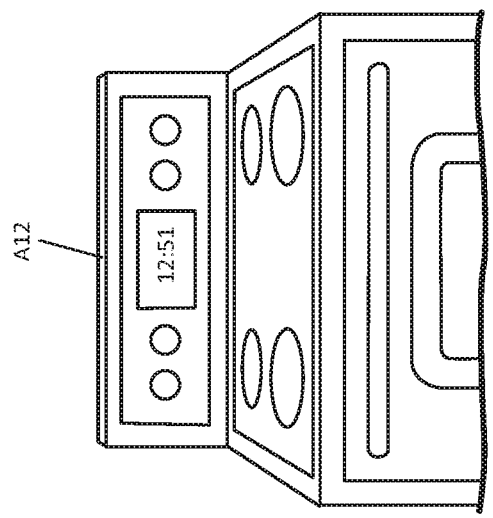
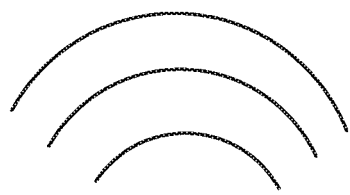
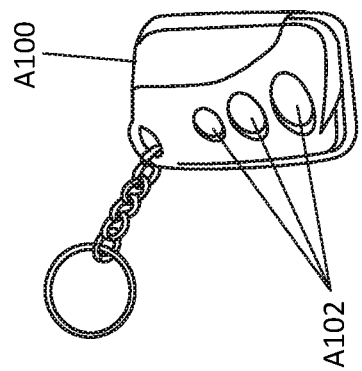
FIG. 16

| Frag | MFP | MID | FID | |
|---|---|---|---|---|
| | Cmd/Fb | OpCode | | - Fragmented Message Bit Definition |
| | | | | - Standard Message Bit Definition |
| 1 | Cmd | OpCode | | - First fragment contains OpCode and Cmd/Fb bit |
| 1 | 1 | 0 | 0 | - Second fragment begins MID and FID counters |
| 1 | 1 | 0 | 1 | - Only the FID counter increments inside the message |
| 1 | 1 | 0 | 2 | - FID increments again to ensure no fragments are lost |
| 1 | 0 | 0 | 3 | - MFP = 0 indicates fragmentation is complete |
| 1 | Fb | OpCode | | - Next fragmented message begins with OpCode |
| 1 | 1 | 1 | 0 | - Now the MID increments for this new message group |
| 1 | 1 | 1 | 1 | - FID counter incremented |
| 1 | 0 | 1 | 2 | - Fragmented message complete |
| 0 | Fb | OpCode | | - A standard feedback message is sent here so Frag = 0 |
| 1 | Cmd | OpCode | | - Next fragmented message begins with Frag = 1 |
| 1 | 0 | 2 | 0 | - The FID always starts at 0 and counts up to 7 |
| 1 | Cmd | OpCode | | - Next fragmented message begins |
| 1 | 1 | 3 | 0 | - The maximum value for the MID is 3 |
| 1 | 0 | 3 | 1 | - Message complete |
| 0 | Cmd | OpCode | | - A standard message is sent. This is a command message |
| 1 | Fb | OpCode | | - Next fragmented message begins |
| 1 | 1 | 0 | 0 | - The MID rolls over from 3 to 0 for this message group |
| 1 | 0 | 0 | 1 | - MFP = 0 - message complete |

FIG. 104

| oid | mid | arg1 | argn |
|---|---|---|---|
| 1 | 1 | 0 | 0 |

METHODS AND APPARATUS FOR COMMUNICATIVELY COUPLING INTERNAL COMPONENTS WITHIN APPLIANCES, AND APPLIANCES WITH EXTERNAL COMPONENTS AND ACCESSORIES

CROSS-REFERENCE TO RELATED APPLICATIONS

This application is a continuation-in-part of U.S. patent application Ser. No. 14/874,682, filed Oct. 5, 2015, which is a continuation of U.S. patent application Ser. No. 11/930,299, filed Oct. 31, 2007, now U.S. Pat. No. 9,164,867, which is a continuation-in-part of International Application No. PCT/US2006/022503, filed Jun. 9, 2006, which claims the priority benefit of U.S. Provisional Patent Application No. 60/595,148, filed Jun. 9, 2005, all of which are incorporated herein by reference in their entirety.

This application is a continuation-in-part of U.S. patent application Ser. No. 13/889,625, filed May 8, 2013, now U.S. Pat. No. 9,277,188, issued Mar. 1, 2016, which is a continuation of U.S. patent application Ser. No. 12/256,555, filed Oct. 23, 2008, now U.S. Pat. No. 8,442,042, which is a continuation-in-part of U.S. patent application Ser. No. 11/932,876, filed Oct. 31, 2007, now U.S. Pat. No. 8,816,828, which is a continuation-in-part of International Patent Application No. PCT/US2006/022503, filed Jun. 9, 2006, which claims the priority benefit of U.S. Provisional Patent Application No. 60/595,148, filed Jun. 9, 2005, all of which are incorporated herein by reference in their entirety.

This application is a continuation-in-part of U.S. patent application Ser. No. 14/741,609, filed Jun. 17, 2015, which is a divisional of U.S. patent application Ser. No. 12/206,766, filed Sep. 9, 2008, now U.S. Pat. No. 9,103,061, which is a continuation-in-part of U.S. patent application Ser. No. 11/931,170, filed Oct. 31, 2007, now U.S. Pat. No. 8,688,530, which is a continuation-in-part of U.S. patent application Ser. No. 11/617,793, filed Dec. 29, 2006, now abandoned, which is a continuation-in-part of International Patent Application No. PCT/US2006/022503, filed Jun. 9, 2006, and is a continuation-in-part of International Patent Application No. PCT/US2006/022420, filed Jun. 8, 2006, both of which claim the priority benefit of U.S. Provisional Patent Application No. 60/595,148, filed Jun. 9, 2005, all of which are incorporated herein by reference in their entirety.

This application is a continuation-in-part of U.S. patent application Ser. No. 14/997,700, filed Jan. 18, 2016, which is a continuation of U.S. patent application Ser. No. 12/340,995, filed Dec. 22, 2008, now U.S. Pat. No. 9,264,252, which is a continuation of U.S. patent application Ser. No. 11/953,595, filed Dec. 10, 2007, now U.S. Pat. No. 8,533,253, which is a continuation-in-part of International Application No. PCT/US2006/022503, filed Jun. 9, 2006, and is a continuation-in-part of International Application No. PCT/US2006/022420, filed Jun. 8, 2006, both of which claim the priority benefit of U.S. Provisional Patent Application No. 60/595,148, filed Jun. 9, 2005, all of which are incorporated herein by reference in their entirety.

This application is a continuation-in-part of U.S. patent application Ser. No. 11/571,457, filed Dec. 29, 2006, now U.S. Pat. No. 9,401,822, issued Jul. 26, 2016, which is a continuation of International Application No. PCT/US06/22420, filed Jun. 8, 2006, which claims the priority benefit of U.S. Patent Application No. 60/595,148, filed Jun. 9, 2005, all of which are incorporated herein by reference in their entirety.

FIELD OF THE DISCLOSURE

This disclosure relates generally to appliances and, more particularly to, methods and apparatus for communicatively coupling internal components and accessories appliances, and appliances with external components and accessories.

BACKGROUND

Household appliances typically comprise one or more components responsible for the electromechanical operations of the appliance. For example, an oven can include an appliance management component having a printed circuit board (PCB) with memory, as well as a user-interface component, such as a control panel or keypad, for a user to issue commands to the oven. As another example, a washing machine can include an appliance management component, a user-interface component, and a motor control component that controls a motor of the washing machine.

Typically, discrete circuits couple the internal components of an appliance, with each discrete circuit responsible for individual communication between related components. The circuits communicate with each other over an internal network that traditionally is implemented by hard-wired ribbon cables or other connectors or harnesses between the components. The hard-wired connectors form a closed system or network that is difficult or not possible to modify. For example, because the closed network relies on hard-coded or hard-wired network solutions, it is not practical to couple additional external components or additional internal components to the appliance to expand the capability or function of the appliance. The closed network cannot easily be adapted for communication with the additional external/internal components and therefore limits the potential of the appliance.

Household appliances typically operate on an article using one or more cycles of operation. Many appliances perform the cycles of operation using a consumable. A consumable comprises a finite supply of at least one product or a perishable good that must be periodically replenished or replaced. For example, a washing machine might use a detergent and a fabric softener while washing clothes, or a dishwasher might use a detergent and a water softener while washing dishes. In some cases, appliances perform cycles of operation on a consumable as the article. A consumable may be a food item where, for example, a range oven or a microwave oven might perform a cycle of operation related to the consumable.

It is known to provide cycles of operation to an appliance based on a consumable, and to provide communication between the appliance and a device has or obtains information about the consumable. However, there is a need to improve communication with the appliance about the consumable.

Household appliances are typically comprised of one or more components which cause the electromechanical, electrothermal, and electrochemical operations of the appliance. For example, an oven may include an appliance management component, having a printed circuit board (PCB) with memory thereon, as well as a user interface component, such as a control panel or keypad for a user to issue commands to the oven appliance. The basic appliance models typically are difficult to design, develop, test, diagnose, control, and debug due to the diversity of componentry and the associated diversity of implementation choices. This diversity is an impediment to creating interoperable, reusable, value added componentry.

It has become known in recent years to interlink the components of an appliance by an internal communications network capable of sending and receiving control messages for controlling the interaction between the internal components of an appliance, as opposed to the use of a plurality of discrete circuits, with each discrete circuit responsible for an individual communication between related components and implemented by hard-wiring ribbon cables or other connectors or harnesses between the components. This internal network affords some degree of universality in connecting the components internal to the appliance, however, each component typically needs to be enabled with software within its microprocessor and the adjacent hardware circuitry to achieve network participation. One example of this internal network used within a household appliance is the WIDE network protocol, created by Whirlpool, Inc., the assignee of this document.

SUMMARY

Methods and apparatus for communicatively coupling internal components and accessories within appliances, and appliances with external components and accessories are disclosed herein.

An example method of operating a domestic appliance having at least one of an internal communications network and/or an external communications network among at least two components includes identifying the components, communicating the capabilities of each identified component, communicating the status of each identified component, providing a command interface for operating the components, facilitating communication between the components, and operating the appliance using the command interface and the facilitated communication.

Methods and apparatus are disclosed for initiating a cycle of operation based on a consumable in one of a plurality of appliances, each of which communicates over a network. The method includes providing a consumable reader having a software architecture configured to image data, communicate over the network, and identify functionalities of appliances based on a unique identifier associated with each instance of a functionality. Steps of the method include imaging data about the consumable using the consumable reader; retrieving cycle data associated with the consumable based on the imaged data; ascertaining in the software architecture at least one functionality associated with the cycle data; selecting from the plurality of appliances an appliance having the at least one functionality using the unique identifier associated with an instance of the at least one functionality; and communicating the cycle data to the selected appliance over the network of appliances wherein the selected appliance can conduct a cycle of operation associated with the consumable using the cycle data.

In accord with this disclosure, a method of servicing an appliance includes identifying an appliance configured to perform a useful cycle of operation to complete a physical operation on an article comprising one or more components operated by a microprocessor controller to run a cycle of operation, and also having a multimedia user interface. Servicing can be facilitated by establishing a video conference over the multimedia user interface between a service representative and a user to enable interaction between the service representative and the user. Simultaneously, a diagnostic routine related to one or more of the components can be run. The method can include establishing a data link with the appliance and collecting data about one or more of the components.

The video conference can include a still picture of the service representative, a video of a service representative, a voice signal from the service representative, a voice signal from the user, a still picture of the user, a video of a user, an audible signal from the appliance, a still picture of the appliance, or a video of the appliance. The interaction can include answering questions, asking questions, explaining to the user how to use the appliance, assisting the user in the service process, assisting the user in the installation or configuration of the appliance, ordering a replacement part, authorizing a replacement part order, purchasing a good or service, and authorizing the purchase of a good or service.

Preferably, the service representative controls the appliance by interacting with microprocessor, and can control it by sending a network message to the appliance, or a test script to be run on the appliance. In the latter case, the test script can be contained in an Extensible Markup Language (XML) document, a database record, or Structured Query Language (SQL) statements for appending and updating records in a database. The appliance will typically have multiple components and the service representative can select which of the multiple components to activate as part of the service. The service representative can send information to the user over the multimedia user interface, including such things as a fault tree, a how-to video, a use and care guide, a frequently ask questions document, a still picture, an image, a survey, a question, an SQL statement, an XML document, and a Uniform Resource Locator (URL). As well, the service representative can add another user to the video conference.

In another aspect of this disclosure, the method includes identifying a first appliance configured to perform a useful cycle of operation to complete a physical operation on an article, the first appliance having a multimedia interface, identifying a second appliance of similar configuration, and establishing a video conference connection between the first and second appliances such that a person at the first appliance can video conference with a person at the second appliance. The first and second appliances can be connected over a communications network or connected in a peer-to-peer relationship.

In another aspect of this disclosure, the method includes identifying an appliance having one or more components coupled to and controlled by a controller to implement a cycle of operation, with an internal communication network coupling the components to the controller, coupling a smart device having video conferencing functionality to the internal communication network where the smart device has software capable of assuming control of the a component; and establishing a video conference over the smart device to enable interaction between a service representative and a user. Either the service representative or the user can control the appliance using the smart device.

The appliance will typically have multiple components and the service representative can select which of the multiple components to activate. The smart device can be used for the service representative sending information to the user, the user sending information to the service representative, the appliance sending information to the service representative, or the appliance receiving information from the service representative. Preferably, the appliance is configured to perform a useful cycle of operation to complete a physical domestic operation on an article.

In yet another aspect, this disclosure includes a method of alerting a user of a need for maintenance of an appliance. Here the method includes identifying an appliance configured to perform a useful cycle of operation to complete a physical operation on an article, with one or more components operated by a microprocessor controller to run a cycle of operation, and also having a multimedia user interface. The method further includes ascertaining a need for maintenance of the appliance, establishing a data link with the multimedia user interface; and transmitting a message about the maintenance for receipt by a user. The ascertaining step can be based on a predetermined schedule, sensor data, diagnosis, or user input. Preferably, the data link is a video link and the message is a video message. The message can also be an audio message.

The method can also include the step of rendering the message on the multimedia user interface for receipt by a user. In this case, the rendering is preferably a visual message on a video screen or an audio message from a speaker.

In a further aspect of this disclosure, a method of servicing an appliance includes identifying an appliance configured as above and interacting with the multimedia user interface in an audiovisual conference link. Here, the interacting step can include leaving a video message, leaving an audio message, speaking to a user, seeing an image of the user, listening to the voice of a user, transmittal of an identifier identifying the interacting, receiving of warranty information, and receiving one of customer information, payment information, and/or product registration information.

An appliance according to this disclosure will one configured for performing a useful cycle of operation on a physical article and include one or more components whose actuation is used to implement a useful cycle of operation on a physical article, a controller to control operation of the components in the cycle of operation, a multimedia user interface, a communication portal, and a software component configured to communicate audio. With an appliance thus configured, a user and a third party can interact remotely by audio using the multimedia user interface or the communication portal to attend to one of the components or the controller. Preferably, the audio comprises voice over internet protocol. If using the multimedia user interface, it can be further configured to graphically interact with a user or a service representative. Such interaction can include displaying screens with one of questions about service, and questions about the operation of the appliance, and questions about performing tests during the service process, and/or questions about the appliance. Preferably, the appliance is configured to accept, store, and use new service information for the servicing of the appliance by a user, a service representative, or both.

This disclosure also contemplates an accessory for an appliance having one or more components configured to perform a useful cycle of operation on a physical article. The accessory includes a smart device enabled to communicate with the at least one component, and with a multimedia user interface, and a software component configured to communicate audio. When the smart device is coupled to an appliance, a user and a third party can interact remotely by audio using the multimedia user interface to attend to the appliance.

In another aspect of this disclosure, a network comprises two or more connected appliances. One of the appliances is configured to perform a useful cycle of operation on a physical article and both of the appliances are configured to communicate with each other. The network includes an audio communication link so that users at each appliance can interact remotely by audio using the network.

According to this disclosure, a client having at least one memory location is provided for use with an appliance network. The client includes an arbitrary software component for performing a useful function, a software architecture or a software architecture driver configured to generate or enable transmission of messages, and means to communicate by message over a network. Thus, the client can have full capability to act as an accessory to an appliance to communicate with and to enhance or alter the operation of the appliance. The client can be a physical device.

In one aspect, the client can include one or more identifiers residing in one or more memory locations. Preferably, the identifier will be one of a class identifier, a sub-class identifier, at least one instance ID, a model number and a serial number of the appliance or components of the appliance, a functional identifier, identifier of a method, identifiers of objects, identifiers of class attributes, network identifiers, a unique numeric addressing identifier, a unique numeric functional identifier, and an API ID that can serve as a portion of a unique numeric addressing identifier.

In another aspect, the identifier includes one or more class identifiers and one or more instance identifiers where the instance identifiers are cached and indexed to a class identifier. In another aspect, the identifier is an identifier of function or an identifier of another client node on a network. Preferably, an arbitrary software component, the software architecture, or the software architecture driver develops references to the identifier of a different node on a network so that the client can communicate with the different node by message using the references.

The client can include a display for communication with a user. The client can also include a control command for communication by message that can affect a cycle of operation of a networked appliance. In one aspect, the control command is configured to create objects or instances of classes in a networked appliance. In another aspect, the control command is configured to change values in a first objects field to a third object from a second object in an appliance control system of a networked appliance. In another aspect, the control command is configured to place a networked appliance into one of two or more operating modes.

The client can be configured to query a network for information such as the identity of another node on a network, an appliance, a client, an arbitrary software component, a device comprising a node, a coupler, one or more of a plurality of identifiable software elements on any node, or the functional identifiers thereof. In one aspect, the query can be a propagated message. In another aspect, at least one identifier can be received in response to a query.

The arbitrary software component of the client can be one of a clock and time synchronization accessory, a stirring and ingredient addition accessory, a cooking sensor accessory, an operation cycles accessory, a consumable messaging and reader accessory, a recipe book, a recipe wand, a laundry credit accessory, a smart dimmer and adapter, a network binder accessory, a remote user interface, a smart coupler, a resource communication accessory, a cellular telephone accessory, a configuration mechanism, an audio communication accessory, and a remote audio communication accessory.

The software architecture or software architecture driver can be configured to communicate a password. The client can also include identification information in order for the client to establish useful communications with other communicating nodes without the arbitrary software component having knowledge of routing information otherwise required to enable the useful communication.

The software architecture or software architecture driver can be configured to collect data associated with a node synchronously for a complete snapshot of updates to the state of the node for one scan of a processor, so that meaningful dynamic and virtual data aggregation can occur regardless of changing states of the node. As well, the software architecture or software architecture driver can be configured to send a plurality of commands to a second node by a message protocol enabled by the one of a software architecture and a software architecture driver wherein multiple messages are used to convey elements of a command, bounded together synchronously whereby the receiving node will know when to begin executing the command.

In one aspect, the arbitrary software component is configured to send configuration messages over a network to create an event structure in a memory heap. In another aspect, the arbitrary software component is further configured to classify the event structure as acknowledged or unacknowledged. In another aspect, the arbitrary software component is configured to invoke a function of a second arbitrary software component utilizing encapsulated routing information where the invocation does not contain routing information. The arbitrary software component can be configured to listen to a heartbeat of a networked appliance.

The client can include a source of information about a resource used by an appliance of the type configured to perform an operation on a physical article where the appliance consumes at least some of a resource in performing the operation. The source will typically include a request to change the operation of an appliance in response to a resource parameter or a request for the status of a resource used by the appliance.

The client can include an embedded virtual router, in which case the arbitrary software component is configured to collaborate with another software component by a method of access or exposure to each other. Here, the embedded virtual router encapsulates the method, so that the collaboration can be uniform and identical whether the collaboration is over a network or sharing a runtime environment.

A network control system according to one embodiment of this disclosure comprises a software operating layer responsive to a plurality of function calls; a physical user interface capable of generating directly at least some of the function calls; and a virtual user interface configured to invoke at least some of the function calls.

A network control system according to another embodiment of this disclosure comprises a software operating layer responsive to a plurality of function calls; a physical user interface having a plurality of UI actions, each of the UI actions generating directly one of the function calls, and at least one UI action generating data; and a virtual user interface adapted for invocation of at least some of the function calls generated by UI actions as well as for invocation of at least one function call that cannot be generated by a UI action.

BRIEF DESCRIPTION OF THE DRAWINGS

In the drawings:

FIG. 16 is a schematic view of a network binder according to one embodiment of this disclosure for use with a communicating appliance.

FIG. 104 illustrates a sequence of packets representing a series of fragmented messages transmitted in the form shown in FIG. 80, which are by the receiving SA and reformed into the original cohesive data sets created by the sender of the packets.

FIG. 119 is a UML sequence diagram illustrating the execution of an ordered collection of messages of the classes in FIG. 113 of the software operating environment.

FIG. 120 is a UML sequence diagram showing an ordered collection of messages of the classes in FIG. 113 of the software operating environment.

FIG. 121 is a UML sequence diagram illustrating the messaging required to process incoming messages from the WIDE bus D14 from clients D22/16 which do not require a response containing meaningful data other than a response transmitting the success or the reason for failure of the incoming message (the ACK or NAK of API ID=1, Op Code=1).

FIG. 122 is a UML sequence diagram illustrating the messaging required to process incoming messages from the WIDE bus D14 from clients D22/16 which require a plurality of response messages containing meaningful data in addition to a response which transmits the success or the reason for failure of the incoming message (the ACK or NAK of API ID=1, Op Code=1).

FIG. 123 is a UML sequence diagram illustrating the messaging required to process incoming messages from the WIDE bus D14 from clients D22/16 which require a single response messages containing meaningful data in addition to a response which transmits the success or the reason for failure of the incoming message (the ACK or NAK of API ID=1, Op Code=1).

Figure 124:
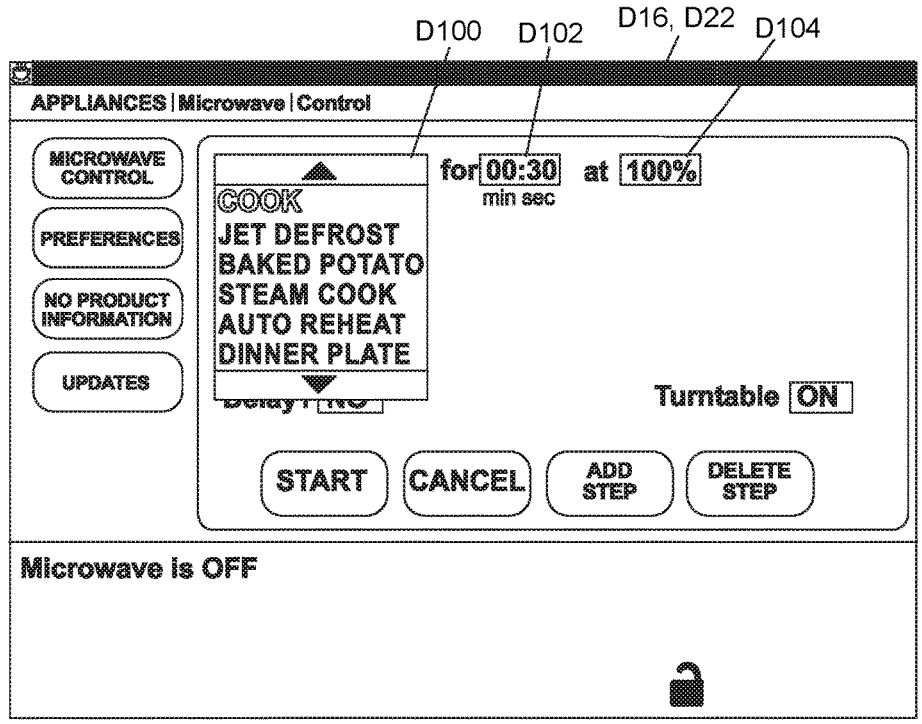

FIG. 124 schematically illustrates a user interface populated by a taxonomy dataset comprising a hierarchy of options and data inputs that will lead the user to selecting options and data inputs to generate a well-formed command.

Figure 125:
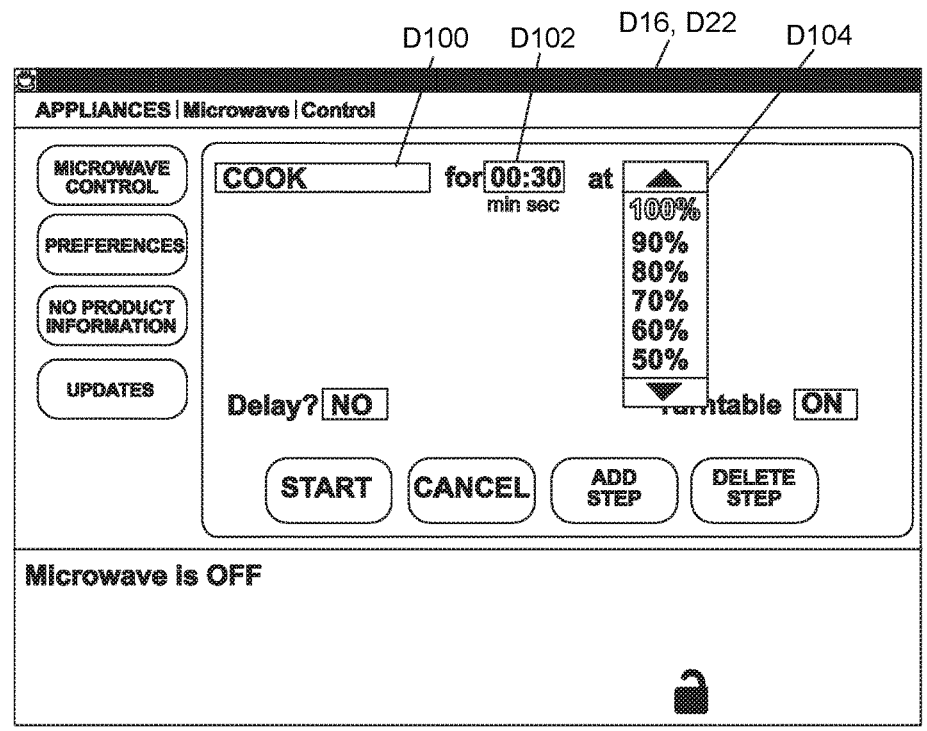

FIG. 125 schematically illustrates the options available for a top level option selection with associated data inputs.

Figure 126:
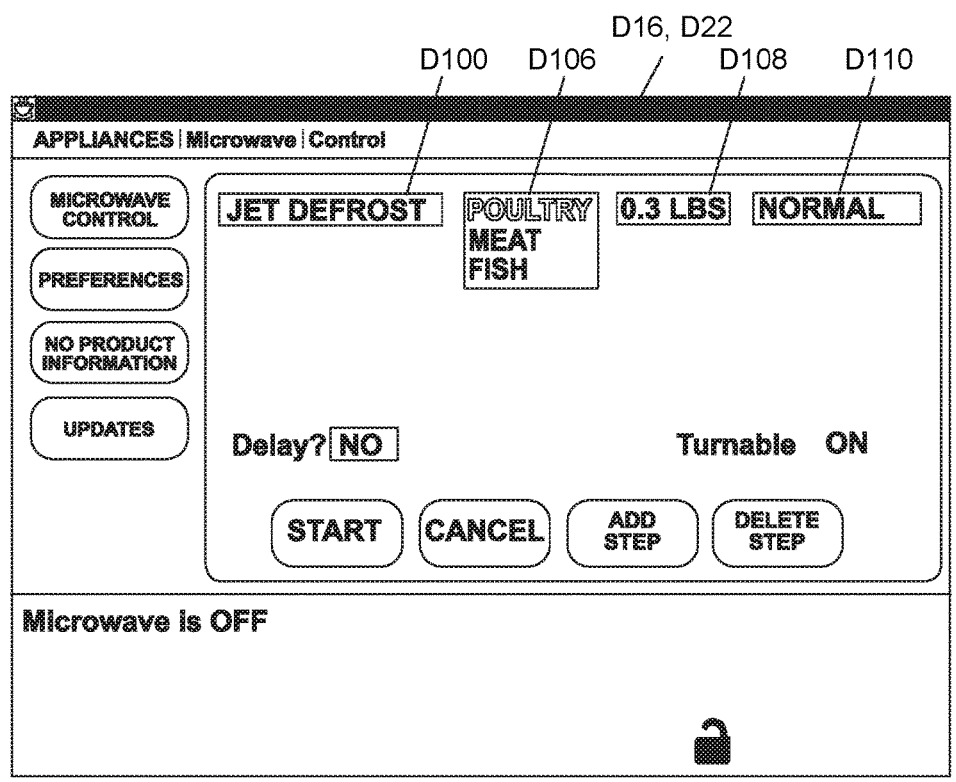

FIG. 126 schematically illustrates the options available for a sub-level option selection with associated data inputs.

Figure 127:
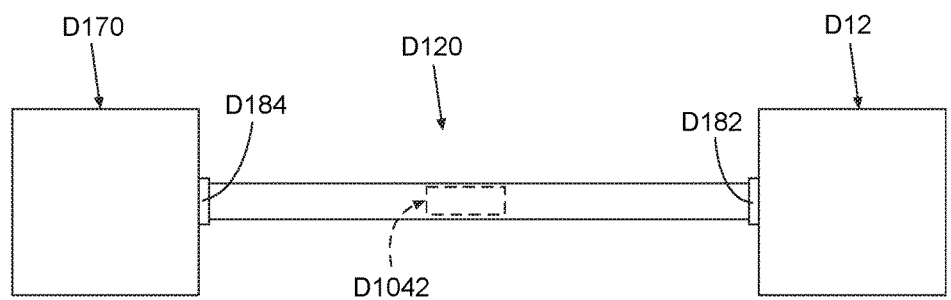

FIG. 127 is a schematic view of an over-molded smart cable comprising an embedded smart device according to one embodiment of this disclosure for use with an appliance.

Figure 128:
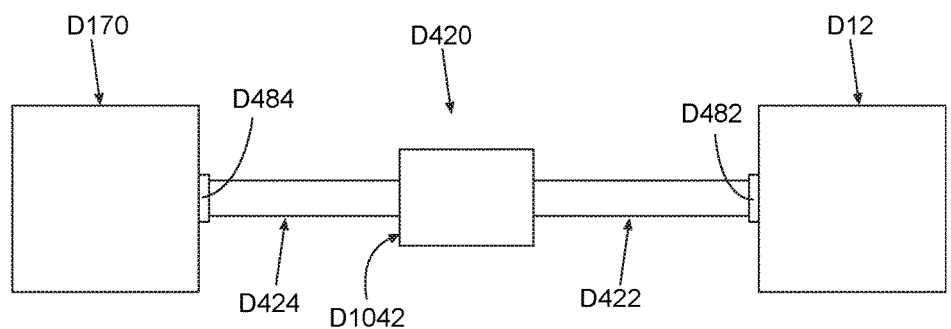

FIG. 128 is a schematic view of a smart cable comprising a discrete smart device according to one embodiment of this disclosure for use with an appliance and an external device.

Figure 129:
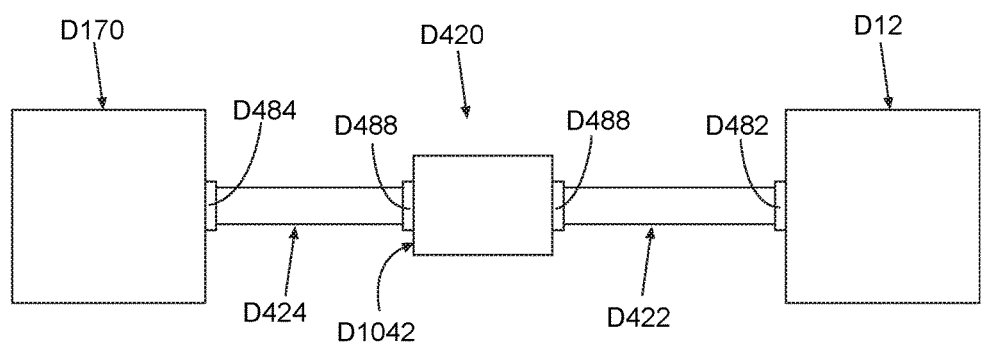

FIG. 129 is a schematic view of a smart cable comprising a discrete smart device and smart device connectors according to one embodiment of this disclosure for use with an appliance and an external device.

Figure 130:
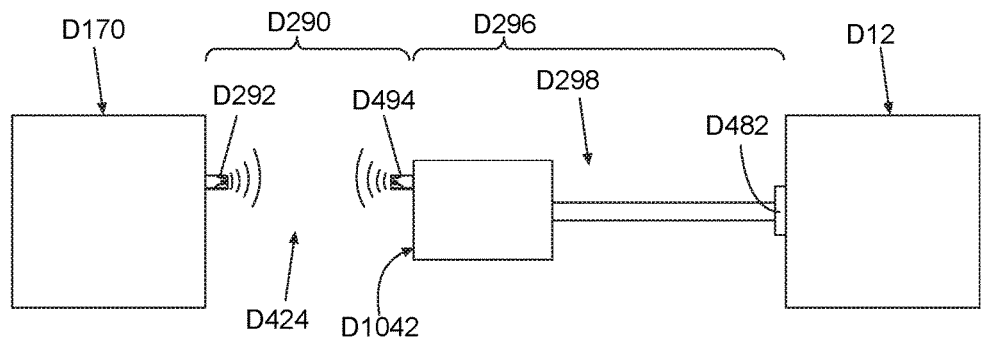

FIG. 130 is a schematic view of a combination smart wireless coupler and smart cable according to one embodiment of this disclosure for use with an appliance and an external device.

Figure 131:
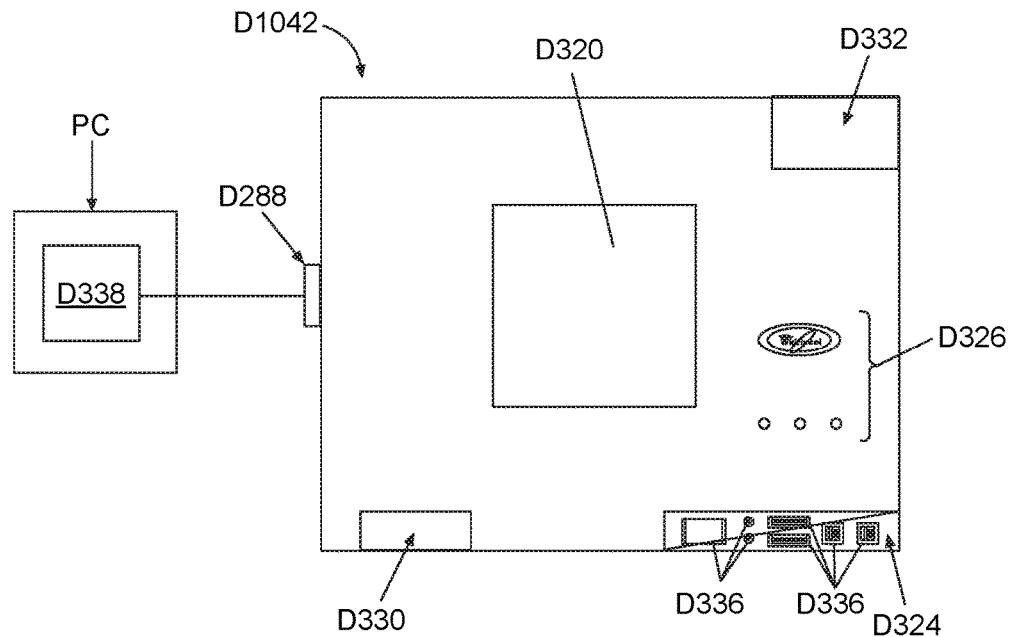

FIG. 131 is a schematic view of a smart device according to one embodiment of this disclosure.

Figure 132:
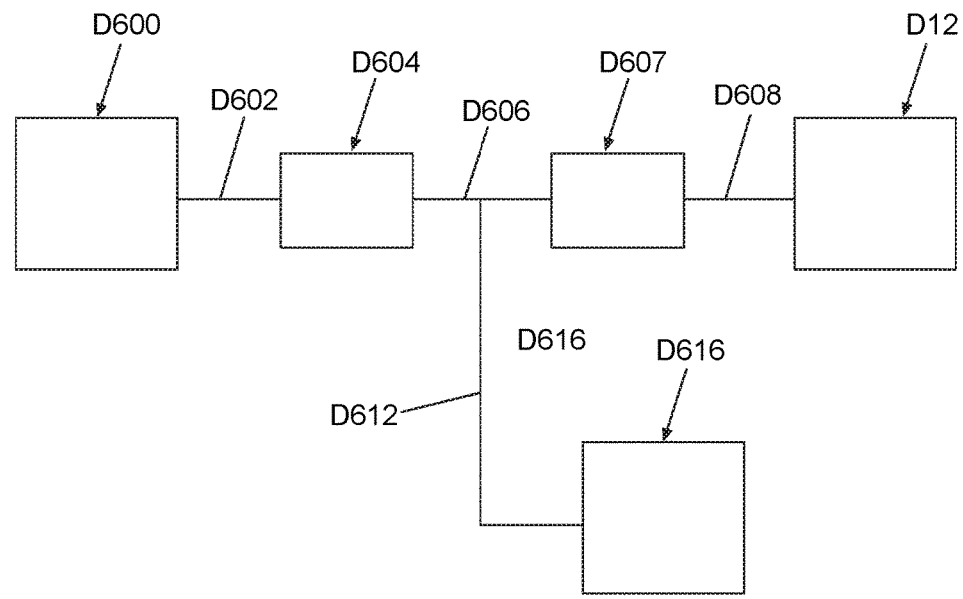

FIG. 132 is schematic view of a source of information about resources connected to an appliance by a combination.

Figure 133:
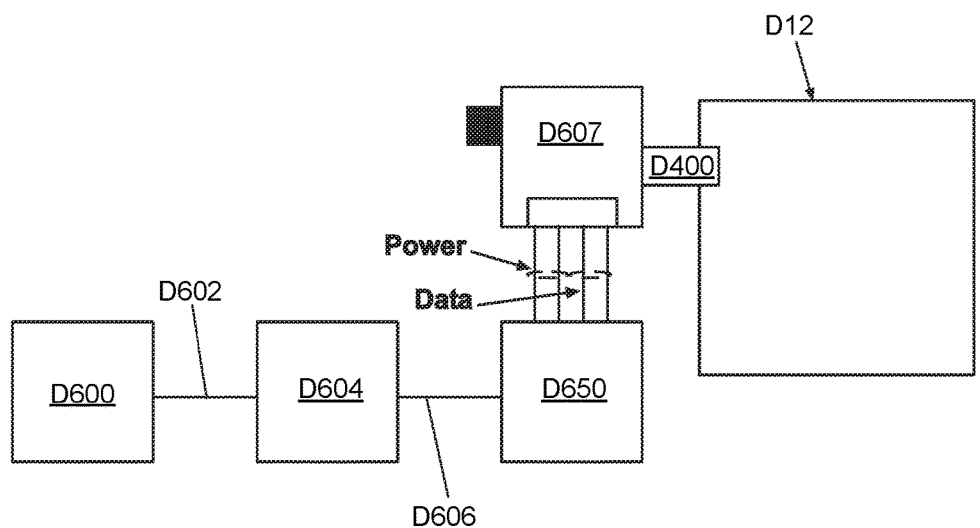

FIG. 133 is a schematic view of a source of information about resources connected to an appliance with a smart coupler directly coupled to an appliance connection element.

Figure 134:
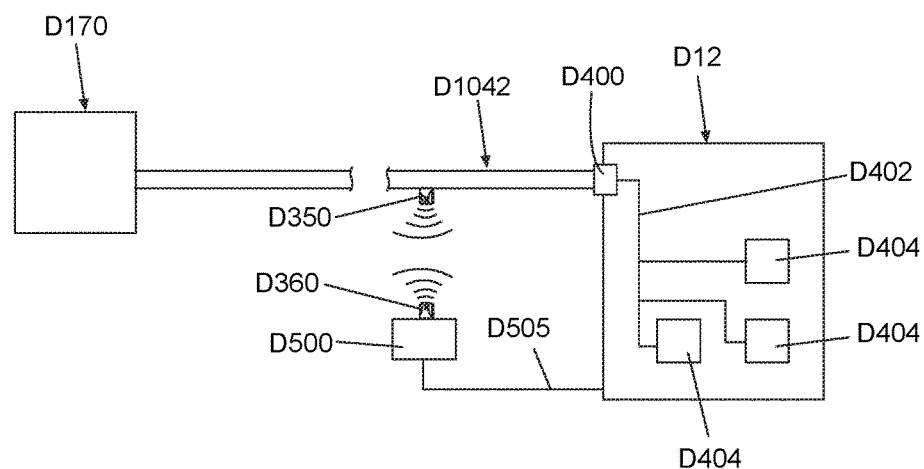

FIG. 134 is a schematic view of a source of information about appliance operation connected to an appliance through a smart coupler.

Figure 135:
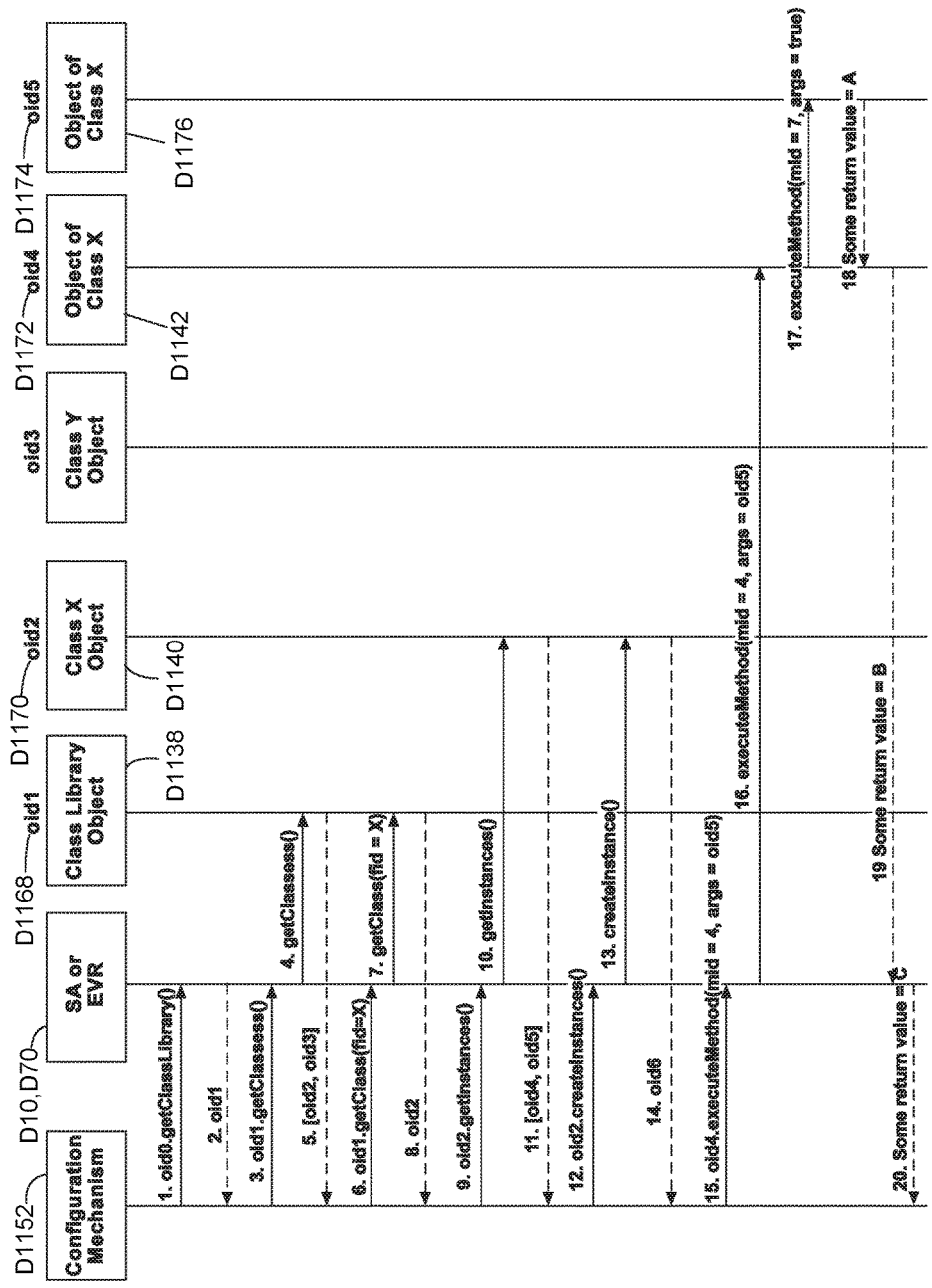

FIG. 135 is a schematic view of the basic mechanisms which can create and manage the software portion of an appliance control system.

Figure 136:
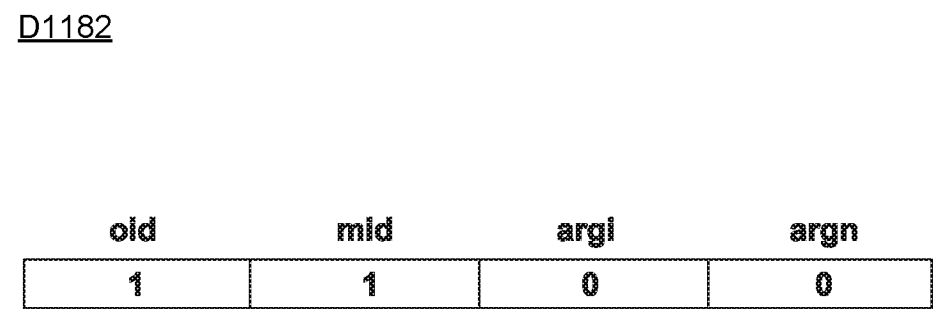

FIG. 136 is a schematic view illustrating an exemplary packet structure for an object-oriented message in an appliance.

DETAILED DESCRIPTION

By employing a software architecture that enables facile communication between internal components of an appliance and between an external component and one or more of the internal components of the appliance, various components and accessories can communicate with the appliance to expand the capability, functionality, and usability of the appliance. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include any component that participates in the operation of the appliance. Some of the internal components have a corresponding controller (main controller, motor controller, user interface, etc.), which can be a simple microprocessor mounted on a printed circuit board, and other components that have no controller. The components can comprise one or more devices that are controlled by the controller. Typically, the controller components in cooperation, either directly or indirectly, through other components, control the operation of all of the components and the associated devices to implement an operation or cycle for the appliance.

The software architecture can be implemented on and communicated over an internal communications network on the appliance. The internal communications network connects the various internal components of the appliance and can be considered a closed network. One example of the internal communications network used within the appliance is the WIDE network protocol, created by Whirlpool, Inc., the assignee of the present patent application.

The software architecture expands the communication ability of the appliance by effectively creating an open network, hereinafter referred to as "network." Within the appliance, the software architecture can, but does not have to, reside on each of the components that have a controller. Those components with the software architecture form a network node that can communicate with the other nodes.

The software architecture can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as primary or main software architecture, with the other nodes functioning in a client relationship to the main software architecture. In such a configuration, all of the nodes can communicate through the main software architecture. The software architecture can be sufficiently robust that it can permit configurations without main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can be any suitable software architecture that enables communication between the internal components of the appliance and the external component and/or the new internal component or between components external to the appliance. An example of the software architecture is disclosed in Patent Cooperation Treaty Patent Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety. A related example is shown in priority document U.S. Patent Application No. 60/595,148, filed Jun. 9, 2005. All of the communications between components and accessories and/or any combination of components and accessories described in this application can be implemented by the software and network structures disclosed in either of these applications.

The software architecture disclosed in the aforementioned references can be implemented by providing one or more of the software elements of the software architecture at least on each of the components to be controlled and on the accessory. The software architecture is configured to generate a plurality of messages, with at least one of the software elements residing in each of the components and in the accessory and configured to enable transmission of at least one of the plurality of messages between the components and between the accessory and the components. The messages can be transmitted for bi-directional communication between components and/or components and accessory. The messages can include command messages that are used to implement a physical domestic operation cycle of the appliance.

The messages can be generated by a message generator, which can take the form of the software architecture, the accessory, or a component. One possible message generator is a user interface.

Descriptions of several examples of components and accessories, herein after referred to as "accessory" with it being understood that the accessory can be considered a component on the network, for use in conjunction with the appliance having the software architecture follow. The accessories can be external to the appliance or internal to the appliance. Each of the accessories is enabled with the software architecture whereby the accessory establishes a node on the network or is part of an existing node on the network.

One example of the accessory is a clock. In one embodiment, the clock is external to the appliance and is an atomic clock. For example, the atomic clock can be a wireless atomic clock that can communicate with one or more of the appliances. An illustration of this embodiment is shown in FIG. 1, where a clock A10 can communicate with a first appliance A12 in the form of an oven and a second appliance A14 in the form of a microwave oven.

The clock can acquire an official time via any suitable method, such as from a cellular network, a radio network, or the Internet. The clock can then transmit the official time to the appliance(s). For example, the clock can automatically transmit the official time, transmit the official time based on registered time events (i.e., transmit the official time at predetermined intervals to appliances that have registered for the time events), or transmit the official time upon request from one or more of the appliances.

Figure 1:
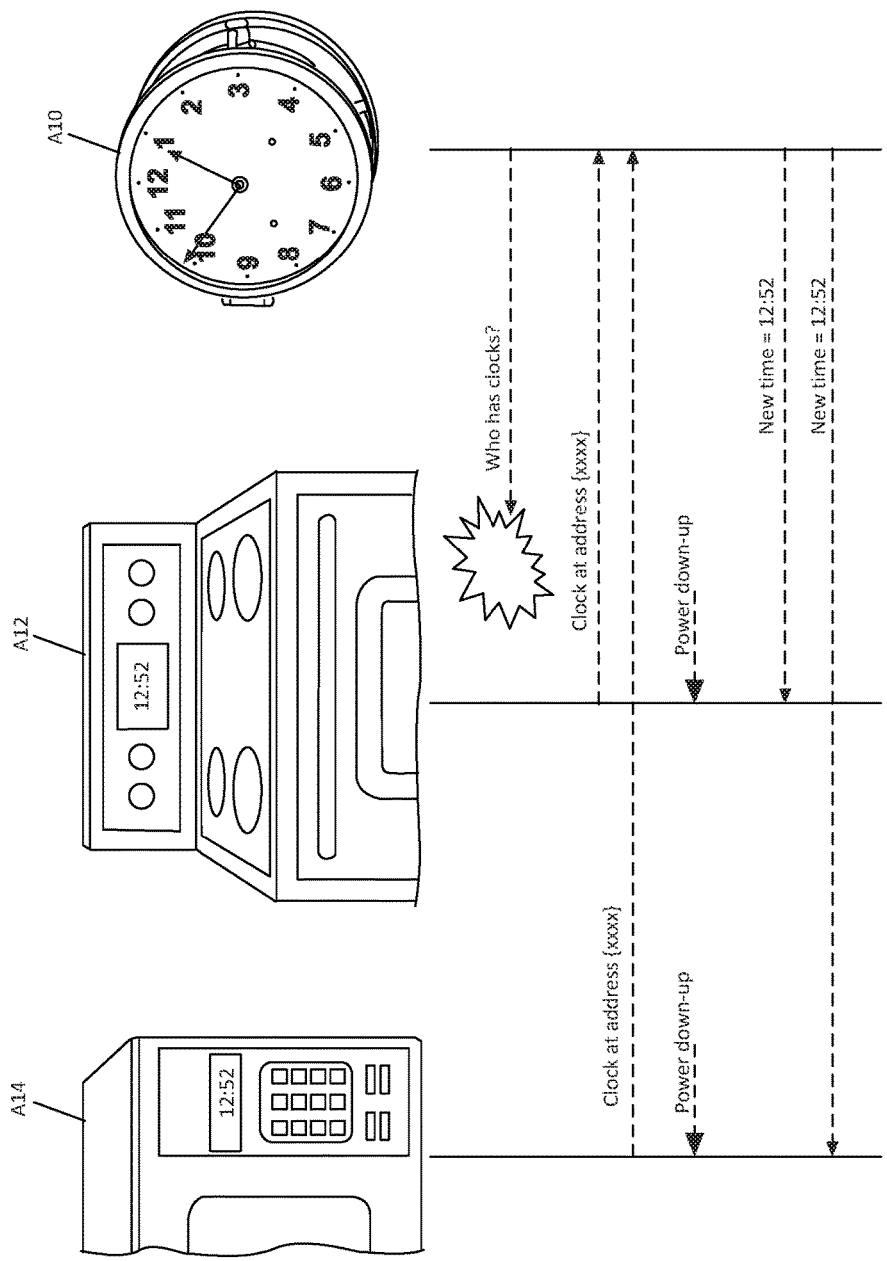
FIG. 1 is a schematic view of a clock accessory for a communicating appliance according to one embodiment of this disclosure, wherein the clock communicates a time to appliances following powering the appliances down and up.

An example of transmitting the time is shown in FIG. 1. The clock A10 communicates with the first and second appliances A12, A14 on the network and asks for identification of the appliances that have clocks. The first and second appliances A12, A14 both respond by informing the clock A10 that the first appliance A12 and the second appliance A14 each have a clock and provide corresponding addresses for the respective clocks. An event occurs where the first and second appliances A12, A14 are powered down (i.e., off) and up (i.e., on) such that the time on the first and second appliances A12, A14 is no longer set. The clock A10 then transmits the official time to the clocks of each of the first and second appliances A12, A14, and the clock A10, the first appliance A12, and the second appliance A14 all display the same official time.

Figure 2:
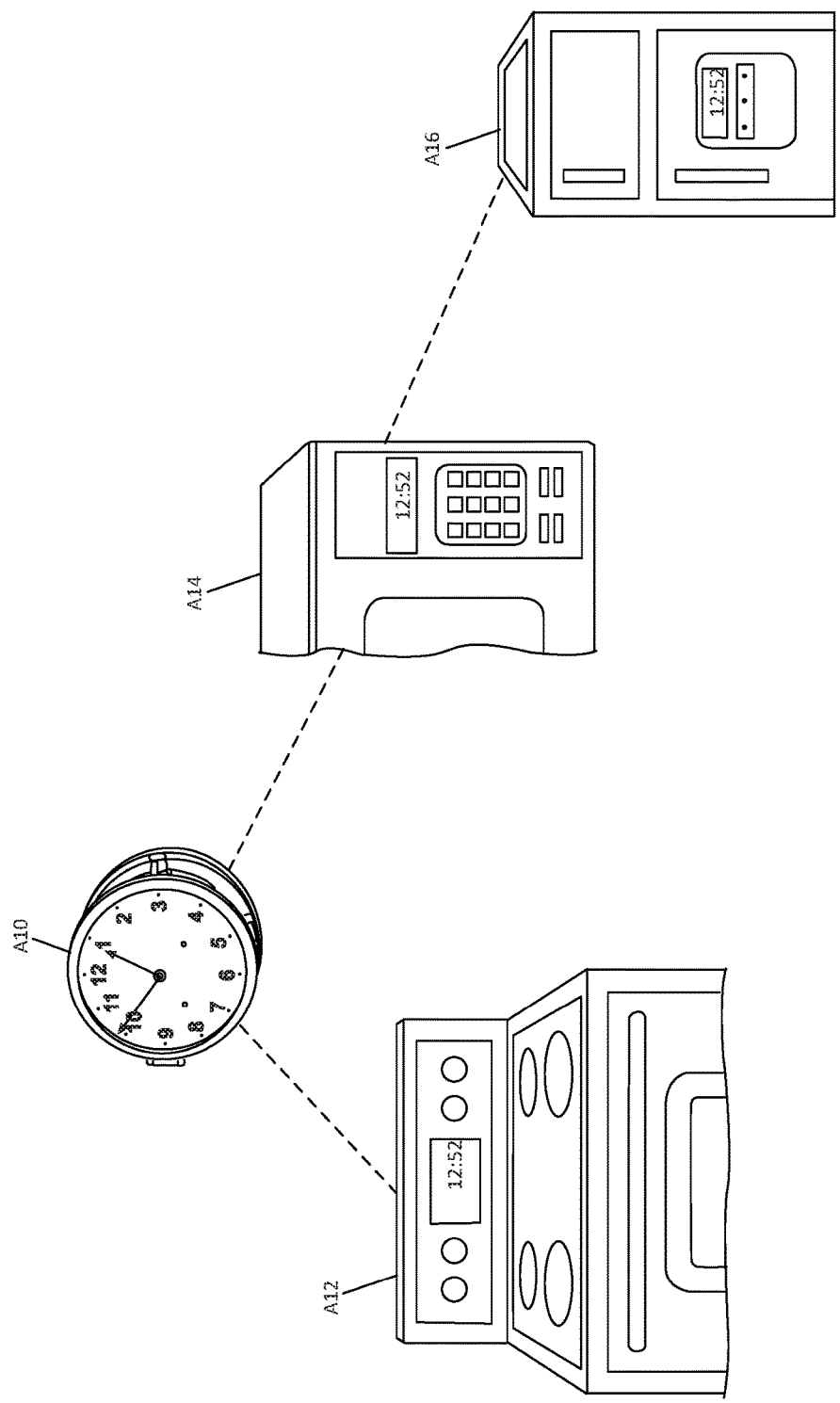
FIG. 2 is a schematic view of a clock accessory for a communicating appliance according to another embodiment of this disclosure, wherein the clock functions as an amplifier and/or a wireless access point.

The clock can also function as an amplifier to boost a signal provided by the appliance to a destination appliance or as a wireless access point that can transmit a signal provided by the appliance to a destination appliance. For example, the appliance can have a radio that is not sufficiently strong to provide visibility to the destination appliance but is strong enough to provide visibility to the clock. The clock can receive the signal from the appliance and re-broadcast the signal to a destination appliance or to another appliance that can transmit the signal to the destination appliance, and so on. The clock can amplify the signal prior to or while re-broadcasting the signal, or the clock can simply re-broadcast the signal. An example of utilizing the clock in this manner is illustrated in FIG. 2. The first appliance A12 in the form of the oven has visibility to the clock A10 and sends a signal to the clock A10. The clock A10 can optionally amplify the signal before or while re-broadcasting the signal to the second, destination appliance A14 in the form of the microwave oven. In another scenario, where the destination appliance is a third appliance A16 in the form of a refrigerator, the second appliance A14 can send the signal to the third appliance A16.

The clock can optionally serve as a protocol bridge. A protocol is a standard procedure for regulating data transmission between devices; however, not all devices necessarily communicate in the same protocol. A bridge effectively translates one protocol into another so that devices with different protocols can communicate with one another. The clock, therefore, can function not only as a time-keeping apparatus but also as a bridge between appliances or between the appliance and another device. Thus, the bridge functionality can be incorporated into the clock and the user does not need to purchase a separate bridge. The amplifier and bridging functions can also be included in any of the other accessories described below.

Figure 3:
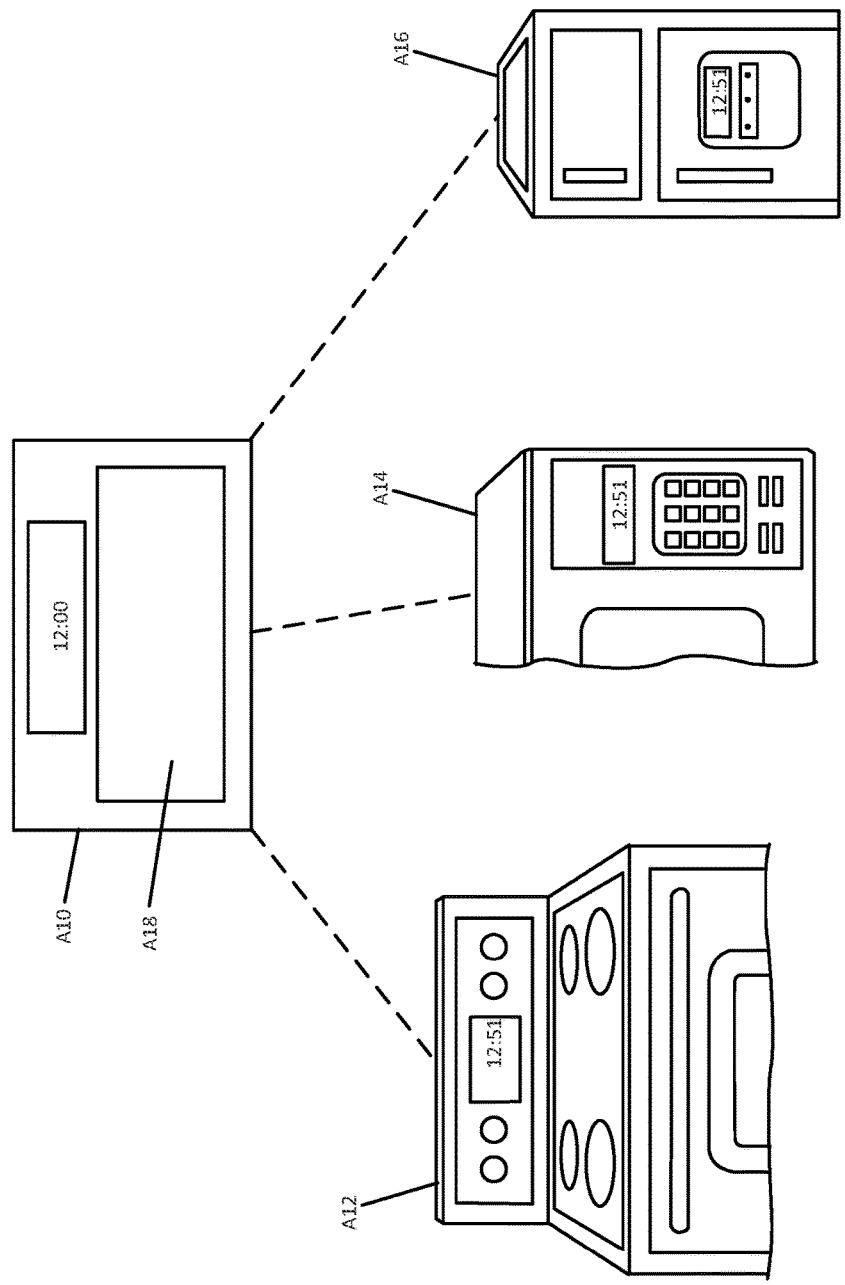
FIG. 3 is a schematic view of a clock accessory for a communicating appliance according to another embodiment of this disclosure, wherein the clock comprises a display for communication with a user of the communicating appliance.

Referring now to FIG. 3, the clock A10 that communicates with the appliance(s) A12, A14, A16, can include a display A18 for communication with the user. The display A18 can be integrated with a time display or can be separate from the time display. As examples, the display A18 can be a liquid crystal display (LCD), a plasma display, a digital display, and the like. The display A18 can communicate to the user a status of the appliance, such as via one or more notification icons. Examples of appliance status include, but are not limited to, laundry washing complete, laundry drying complete, laundry off balance, microwave food defrosted, turn defrosting food in microwave, microwave food ready, oven pre-heat complete, oven food ready, boil over on cooktop, fire, hot water ready, and coffee ready. The relevant notification icons can become illuminated, such as by flashing or being constantly illuminated, or otherwise visible when appropriate and become un-illuminated or otherwise not visible when appropriate.

The clock A10 can further have the capability of communicating to the user, such as via the display A18, an alert status of the appliance(s) A12, A14, A16 with which the clock A10 communicates, and, optionally, the user can acknowledge receipt of the alert status, such as via the display A18. According to one embodiment, the acknowledgement by the user can clear the alert status from the clock A10 and the appliance(s) A12, A14, A16. In this manner, the display A18 can function as a user interface that effects communication not only to the user from the appliance but also from the user to the appliance.

With continued reference to FIG. 3, the clock A10 can optionally incorporate appliance control capability whereby the user can provide control inputs or commands to the appliance(s) A12, A14, A16 through the clock A10, such as via the display A18. Exemplary commands include, but are not limited to, start/stop wash cycle, start/stop drying cycle, start/stop cooking program, decrease heating element power for simmer, execute low heat tumble following drying cycle, decrease microwave heating power, increase temperature of chill zone in refrigerator, and the like.

If the clock on the network does not have electronics for functioning as an atomic clock, the clock can be a satellite clock that can receive time from an atomic clock enabled to speak "TimeCast" protocol. Thus, the clock can display the time given by the atomic clock through TimeCast.

The clock can be internal to the appliance, as described above, or can be external to the appliance. When the clock is internal to the appliance, electronics for the clock can be packaged into the appliance during manufacture of the appliance or can be installed into the appliance as an after-market accessory. The clock as an internal accessory can have any of the functionalities described above for the external clock. The clock can also be "plugged" into an appropriate connector on the appliance. The connector can provide both power and data communication.

Figure 4:
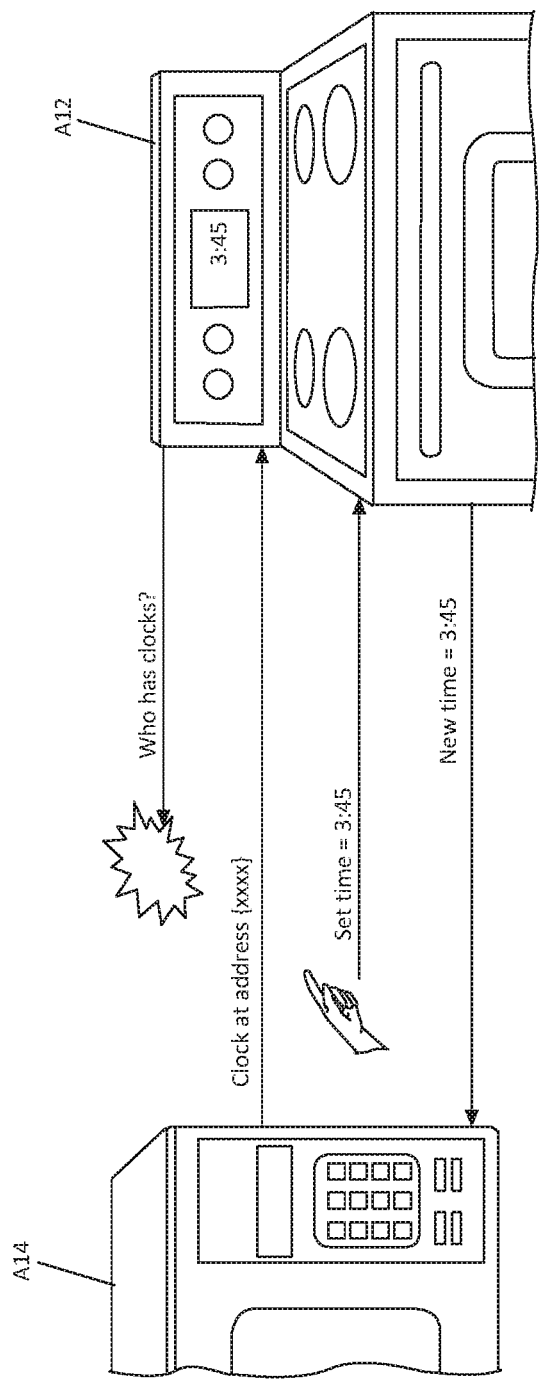
FIG. 4 is a schematic view of a clock accessory for a communicating appliance according to another embodiment of this disclosure, wherein the clock communicates a time to other appliances to synchronize the time among the appliances.

The clock conventionally associated with the appliance can also function as an accessory. For example, the clock of the appliance can communicate with clocks of other appliances, such as for synchronization of the clocks to establish and/or maintain consistent time among all of the appliances. An example of clock synchronization is illustrated in FIG. 4. The first appliance A12 broadcasts a message requesting identification of appliances having clocks. The second appliance A14 responds by informing the first appliance A12 that the second appliance A14 has a clock and provides an address for the clock. Thus, the first appliance A12 has established the appliances that have clocks. In the future, the user can set the time on the first appliance A12, and the first appliance A12 can then broadcast the set time to the appliances that have clocks, such as the second appliance A14. Alternatively, the user can set the time on the clock of another appliance, which can transmit the set time to the first appliance A12 and the second appliance A14. As a result of this process, the user need only set the time on one of the appliances as the clocks of the other appliances automatically synchronize with the clock having the set time. Such a configuration can be especially beneficial in situations, such as a power outage, where multiple clocks on the appliances lose power and, therefore, the time.

Figure 5:
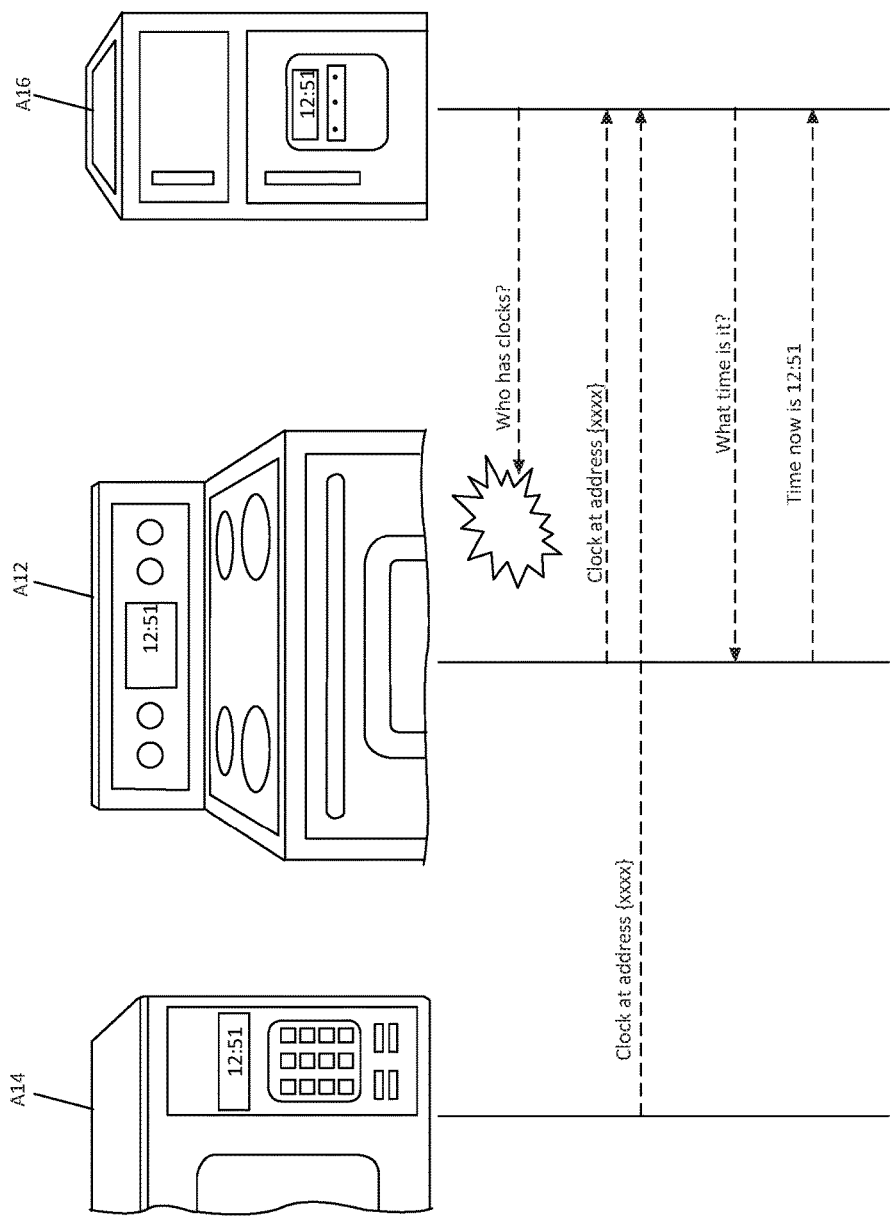
FIG. 5 is a schematic view of a clock accessory for a communicating appliance according to another embodiment of this disclosure, wherein the clock on one appliance requests a time from a clock on another appliance to synchronize the time among the appliances.

Another example of clock synchronization is shown schematically in FIG. 5. In this example, the appliance requests the time from another appliance. The third appliance A16 broadcasts a message requesting identification of appliances having clocks. The first appliance A12 responds by informing the third appliance A16 that the first appliance A12 has a clock and provides an address for the clock. Similarly, the second appliance A14 responds by informing the third appliance A16 that the second appliance A14 has a clock and provides an address for the clock. Thus, the third appliance A16 has established the appliances that have clocks. The third appliance A16 then communicates with at least one of the appliances having a clock, which is shown as the first appliance A12 in FIG. 5, and requests the time from the first appliance A12. The first appliance A12 responds by providing the time to the third appliance A16. Alternatively, the third appliance A16 can request the time from another of the appliances, such as the second appliance A14.

The clocks of the appliances can also synchronize by one of the appliances broadcasting the time at periodic intervals. When the clocks are synchronized in this manner, each minute rollover of the time can be synchronized so that there is no discrepancy between the times on the clocks, even while the displayed time is changing.

Another example of an accessory is a cooking aid. The cooking aid can be an active accessory, a sensing accessory, or a combination thereof. The active accessory can be programmed by the user or can receive commands from the appliance for performing an action. The sensing accessory can include one or more sensors that detect a state of the accessory and/or appliance and communicate the state to the appliance or other component on the network.

Figure 6:
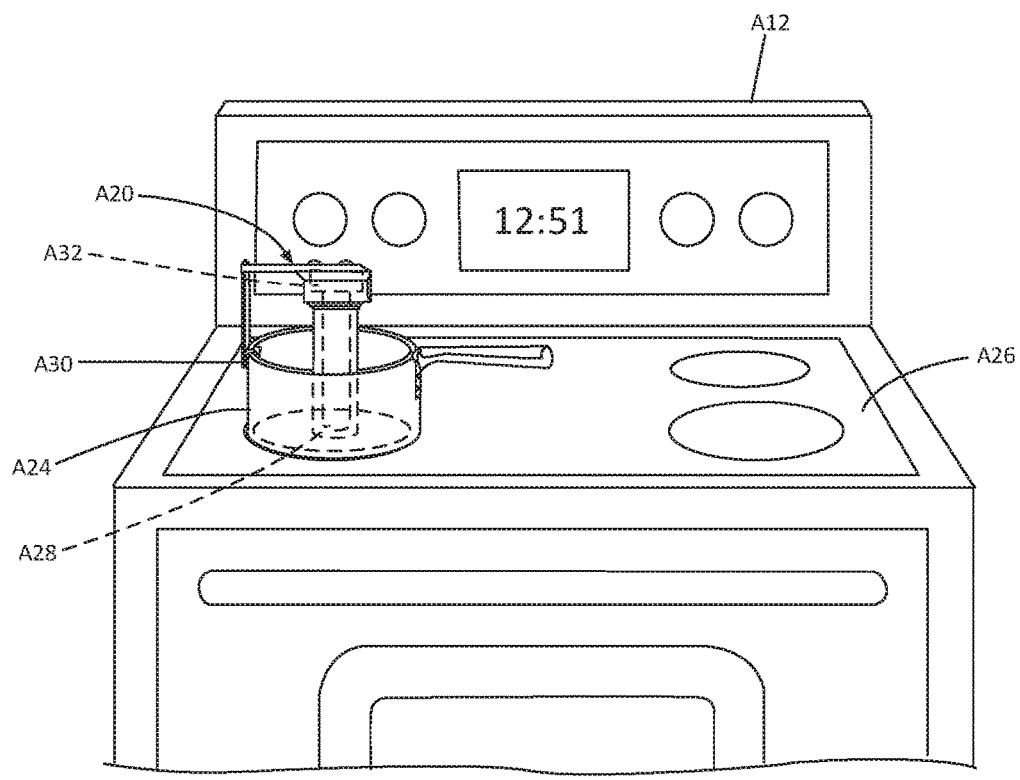
FIG. 6 is a schematic view of a cooking aid accessory in the form of a controlled stirrer according to one embodiment of this disclosure for use with a communicating appliance.

Exemplary active cooking aids include a controlled stirrer A20 and an ingredient dispenser A22, which can both be associated with the first appliance A12 in the form of the oven. As shown in FIG. 6, the controlled stirrer A20 can be coupled to a cooking vessel A24, such as a pot or pan, located on a cooktop A26 of the first appliance A12. Alternatively, the controlled stirrer A20 can be coupled to the first appliance A12, such as to the cooktop A26, rather than to the cooking vessel A24. The controlled stirrer A20 includes a stirring mechanism A28, such as an auger that can induce movement of material (i.e., food) within the cooking vessel A24, and a mount A30 for coupling the stirring mechanism A28 to the cooking vessel A24 or the first appliance A12. The controlled stirrer A20 has a controller A32 that can communicate with the cooktop A26 or other part of the first appliance A12 for receiving stirring commands. The commands can be associated with a recipe, such as a recipe stored within the first appliance A12 or a recipe otherwise visible to the first appliance A12, such as via another component on the network. Alternatively, the user can program the controlled stirrer A20 according to desired actions or a recipe. The stirring commands can include information such as start stirring, stop stirring, stirring speed, and stirring frequency. In an alternative embodiment, the controlled stirrer A20 can be integrated with the cooking vessel A24. Regardless of the configuration of the controlled stirrer A20, employing the controlled stirrer A20 eliminates or reduces the need for the user to be present at the second appliance A12 to stir the material in the cooking vessel A24. The controlled stirrer A20 is especially beneficial when a recipe requires continuous stirring of the material for a relatively long period of time.

Figure 7:
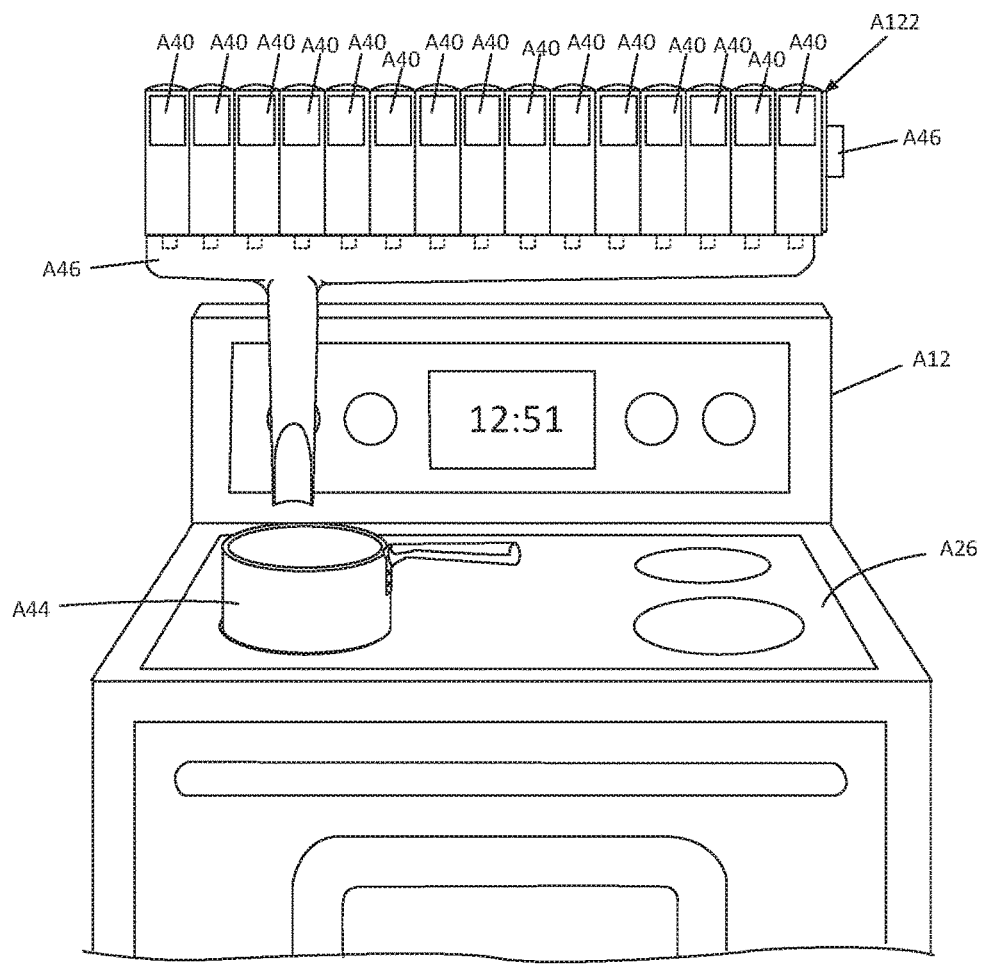
FIG. 7 is a schematic view of a cooking aid accessory in the form of an ingredient dispenser according to one embodiment of this disclosure for use with a communicating appliance.

Referring now to FIG. 7, the ingredient dispenser A24 can be mounted to or located in the vicinity of the first appliance A12 and can include one or more compartments A40 configured to store ingredients. The compartments A40 couple with corresponding dispensing mechanisms A42 configured to transport the ingredients from the compartments A40 to a cooking vessel A44, such as a pot or pan. The cooking vessel A44 can be intended for use on the cooktop A26 or inside the first appliance A12. The ingredient dispenser A24 further includes a controller A46 that can communicate with the first appliance A12 for receiving commands related to dispensing the ingredients. The commands can be associated with a recipe, such as a recipe stored within the first appliance A12 or a recipe otherwise visible to the first appliance A12, such as via another component on the network. Alternatively, the user can program the ingredient dispenser A24 according to desired actions or a recipe. The commands related to dispensing the ingredients can include information such as when to add an ingredient and the amount of the ingredient to be added.

The ingredient dispenser A24 can be provided to the user with the ingredients in the compartments A40 (i.e., pre-filled compartments) or with the compartments A40 in an empty condition whereby the user must supply the ingredients to the compartments A40. When the compartments A40 are pre-filled, the type and amount of ingredients can correspond to a predetermined recipe. In one embodiment, the ingredient dispenser A24 can include replaceable compartments so that the user can insert compartments A40 that correspond to a desired recipe.

Employing the ingredient dispenser A24 provides several advantages. For example, the ingredient dispenser can accurately measure and dispense the ingredients at the proper time during the preparation of the material in the cooking vessel A44, thereby improving the quality of the resulting food. Additionally, the ingredient dispenser A24 eliminates or reduces the need for the user to be present at the first appliance A12 for dispensing the ingredients.

Figure 8:
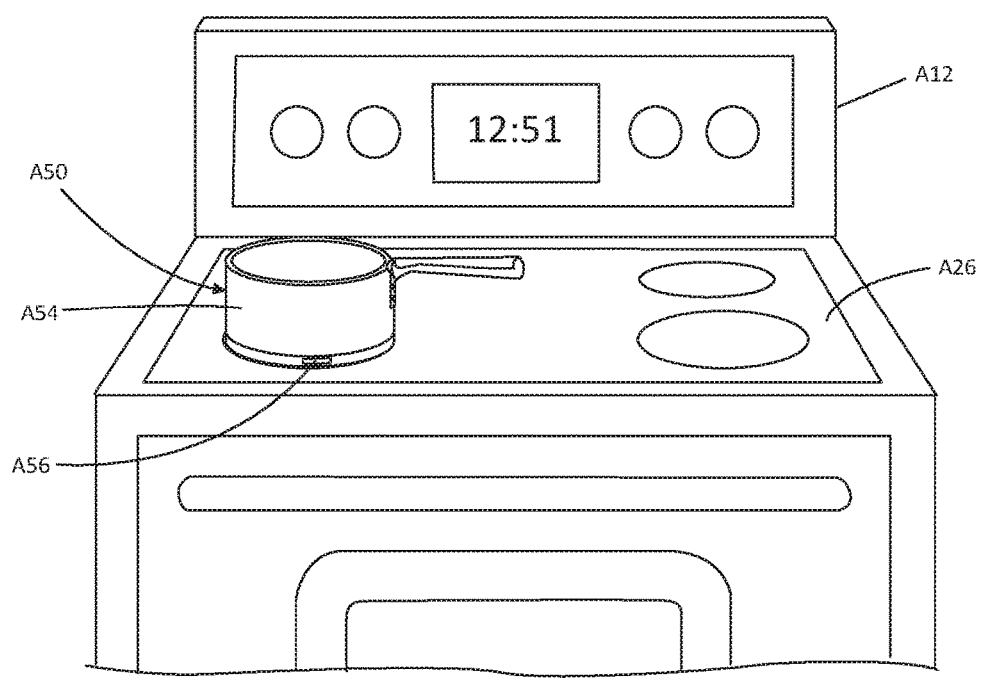
FIG. 8 is a schematic view of a cooking aid accessory in the form of a sensing cooking vessel according to one embodiment of this disclosure for use with a communicating appliance.

Exemplary sensing cooking aids include a sensing cooking vessel A50 and a removable cooking vessel sensor A52, which can both be associated with the first appliance A12 in the form of the oven. As shown in FIG. 8, the sensing cooking vessel A50 comprises a cooking vessel A54 and a sensor A56 that can detect a condition of the cooking vessel A54. The cooking vessel A54 can be any suitable type of cooking vessel, such as a pot or a pan. The sensor A56 can be, for example, a temperature sensor, a timer, a combination temperature sensor/timer, a sound sensor, a humidity sensor, a vision sensor, and a motion detector. The sensor can be integrated with the cooking vessel A54 or otherwise coupled with the cooking vessel A54. The sensor A56 can communicate with the first appliance A12, such as with the cooktop A26, or other component on the network to communicate the sensed condition of the cooking vessel A54. For example, the sensed condition can be boiling, boiling over, simmering, current temperature, boiling time, simmering time, time above a certain temperature, and temperature as a function of time (i.e., heating curve). The first appliance A12 can be configured to respond to the sensed condition of the cooking vessel A54, such as by increasing heat, decreasing heat, and increasing or decreasing time at a certain temperature. The response by the first appliance A12 can be in accordance with a recipe or with instructions programmed by the user. The sensing cooking vessel A50 thereby provides a means for closed loop temperature control between the cooking vessel A54 and the first appliance A12.

In the case of a vision sensor, the sensor could transmit video to anther device for the consumer. The consumer could then make control function decisions including control adjustments or stirring activation, as the case may be.

Figure 9:
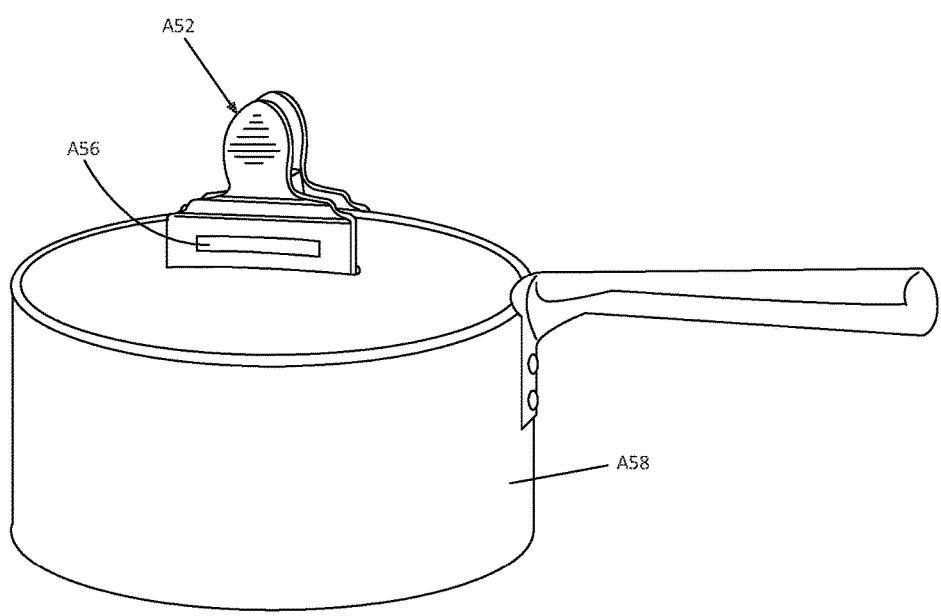
FIG. 9 is a schematic view of a cooking aid accessory in the form of a removable cooking vessel sensor according to one embodiment of this disclosure for use with a communicating appliance.

The functionality of the sensing cooking vessel A50 can alternatively be accomplished with the removable cooking vessel sensor A52. Referring now to FIG. 9, the removable cooking vessel sensor A52 is an accessory that can be removably coupled to a conventional cooking vessel A58 and comprises the sensor A56 described above with respect to the sensing cooking vessel A50. The removable cooking vessel sensor A52 can have any suitable form, such as a clip, as shown in FIG. 9, which removably clips onto the cooking vessel A58. Employing the removable cooking vessel sensor A52 eliminates the need for the user to purchase a special cooking vessel having the sensor A56; rather, the removable cooking vessel sensor A52 can be used with any cooking vessel as it can effectively add the sensor A56 to any cooking vessel.

The exemplary cooking aids described above, the controlled stirrer A20, the ingredient dispenser A22, the sensing cooking vessel A50, and the removable cooking vessel sensor A52, can be employed individually or in combination with one another. Each of the cooking aids A20, A22, A50, A52 provides a degree of automation to the cooking process, and using more than one of the cooking aids increases the degree of automation. When the user employs more than one of the cooking aids A20, A22, A50, A52, the cooking aids A20, A22, A50, A52 can optionally communicate with each other in addition to communicating with the first appliance A12 or other component on the network.

Figure 10:
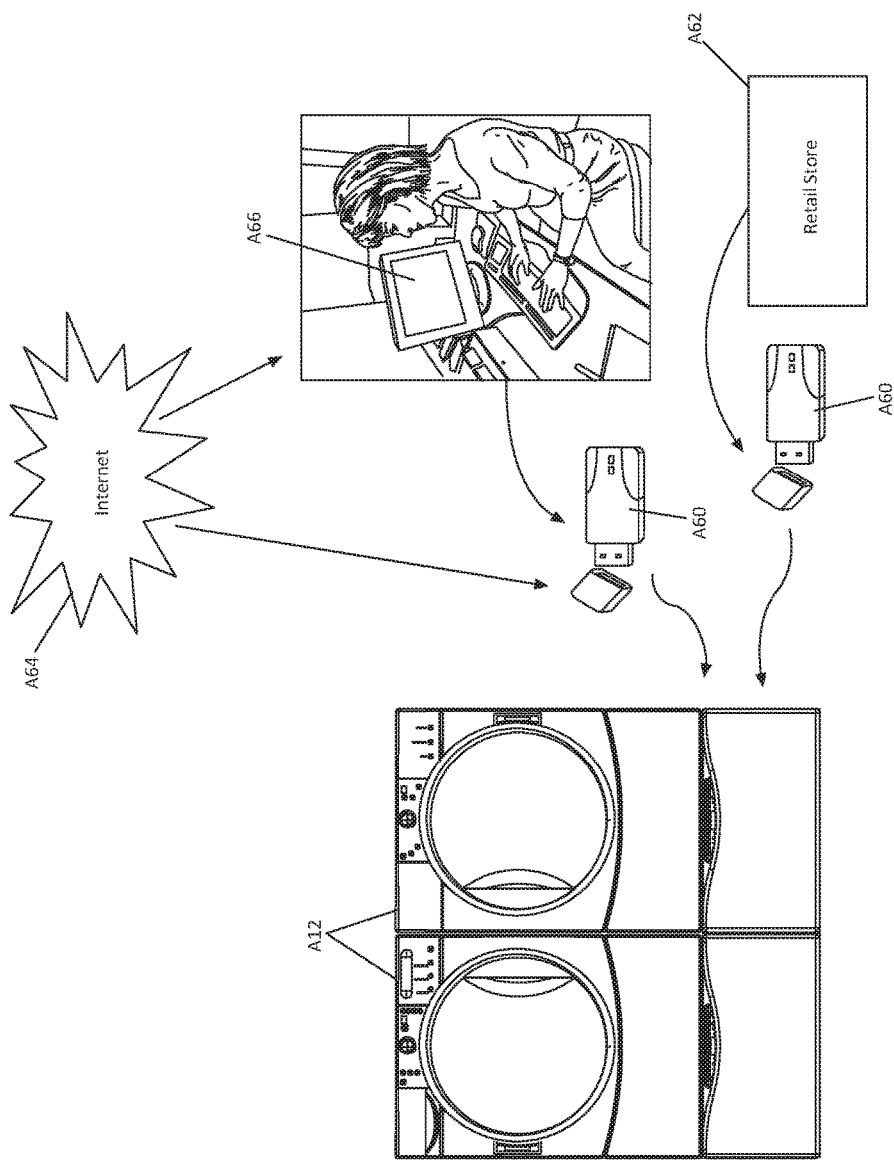
FIG. 10 is a schematic view of an operation cycle component according to one embodiment of this disclosure for use with a communicating appliance.

Another example of an accessory is an operation cycle component configured to store and transfer operation cycles for the appliance. An operation cycle is a set of commands that the appliance executes for operation of the appliance. For example, a washing machine can have several wash cycles that depend on the type of fabric being washed or a size of a fabric load. Similarly, an oven can have several cooking cycles that depend on the type of food being cooked and the cooking process (e.g., defrosting, baking, self-cleaning). Typically, the appliance when purchased by the user has a set of operation cycles that can permanently reside in the appliance as firmware. Referring now to FIG. 10, the operation cycle component A60 can store additional operation cycles not originally provided with the appliance A12 and communicate with the appliance A12 such that the appliance can implement the additional operational cycles. The operation cycle stored by the operation cycle component A60 can also or alternatively include an updated operation cycle. The operation cycle component A60 can be any type of component, such as a hardware device that can plug into the appliance A12. In FIG. 10, the operation cycle component A60 is shown as a USB dongle that can couple with both a personal computer and the appliance A12. The USB connection and communication is just for illustration and is not limiting on this disclosure. Any other suitable connector and/or communication method can be used.

With continued reference to FIG. 10, the additional operation cycles can be uploaded to the operation cycle component A60 in any suitable manner. For example, the operation cycle component A60 having the additional operation cycles can be purchased at a retail store A62, or the additional operation cycles can be uploaded to the operation cycle component A60 at the retail store. Alternatively, the user can download the additional operation cycles via the Internet A64. For example, the user can download the additional operation cycles through a personal computer A66 and then upload the additional operation cycles to the operation cycle component A60, or the user can wirelessly directly download the operation cycles to the operation cycle component A60. In another embodiment, the user can develop custom additional operation cycles on the personal computer A66 and upload the custom additional operation cycles to the operation cycle component A60. In an alternative embodiment, the additional operational cycles can be transmitted wirelessly from the personal computer A66 to the appliance A12 without using the operation cycle component A60. The wirelessly transmitted additional operational cycles can be transmitted to an intermediate storage in the appliance A12. The cycles can also be authenticated by the software architecture or other methods to ensure that they are compatible with and appropriate for the appliance.

The operation cycle component A60 can couple with the appliance A12 in any suitable manner, such as through a direct hardwire connection or a wireless connection. Furthermore, the appliance A12 can implement the additional operation cycles directly from the operation cycle component A60, or the additional operation cycles can be transferred from the operation cycle component A60 to the appliance A12.

Figure 11:
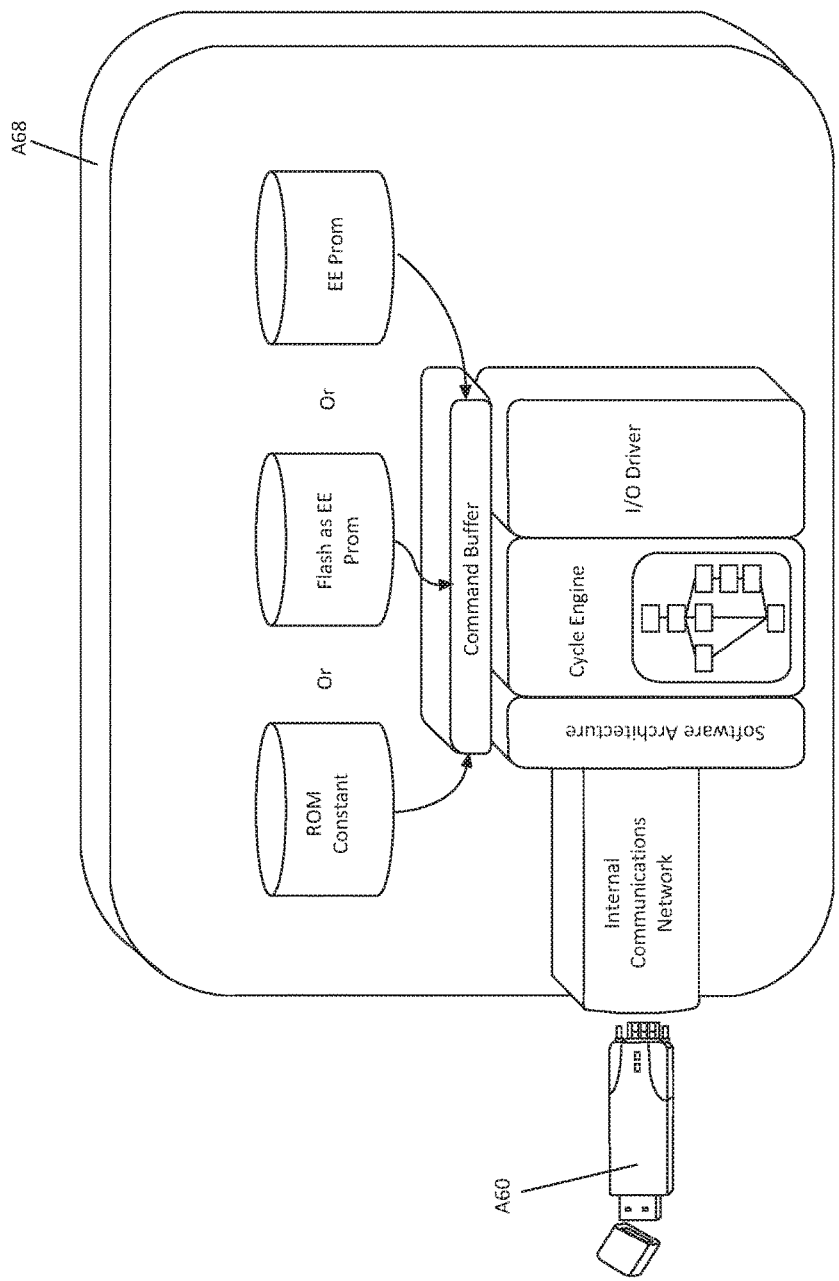
FIG. 11 is a schematic view of the operation cycle component of FIG. 10 coupled with a main controller of a communicating appliance.

Referring now to FIG. 11, which illustrates a main controller A68 of the appliance A12, additional operation cycles can be provided to a cycle engine A69. The additional operational cycles can be considered as data when combined with the cycle engine. The cycle engine A69 differs from conventional operational cycle execution software. Conventional operational cycle execution software is determined wholly from compiled source code which cannot be easily separated into constituent parts or portions. The cycle engine A69 is software that has two portions. The first portion is data describing a plurality of elements comprising an ordered collection of steps, the actions to be taken during each step, and the conditions under which the current step should transition to a next step in the ordered collection of steps.

In one embodiment, the second portion is compiled software which, in an initial step, reads the data portion and builds a cycle structure in memory which can execute instructions comprising an operational cycle corresponding to the description suggested by the data portion. In a subsequent step, the second portion commences execution of the cycle structure where each step performs some useful action and then transitions to a different step based on transitional logic separating the steps from one another.

In another embodiment, the second portion comprises a compile process step which reads the data portion and builds the cycle structure in memory, and further compiled software which can commence execution of the cycle structure in memory where each step performs some useful action and then transitions to a different step based on transitional logic separating the steps from one another.

Figure 14:
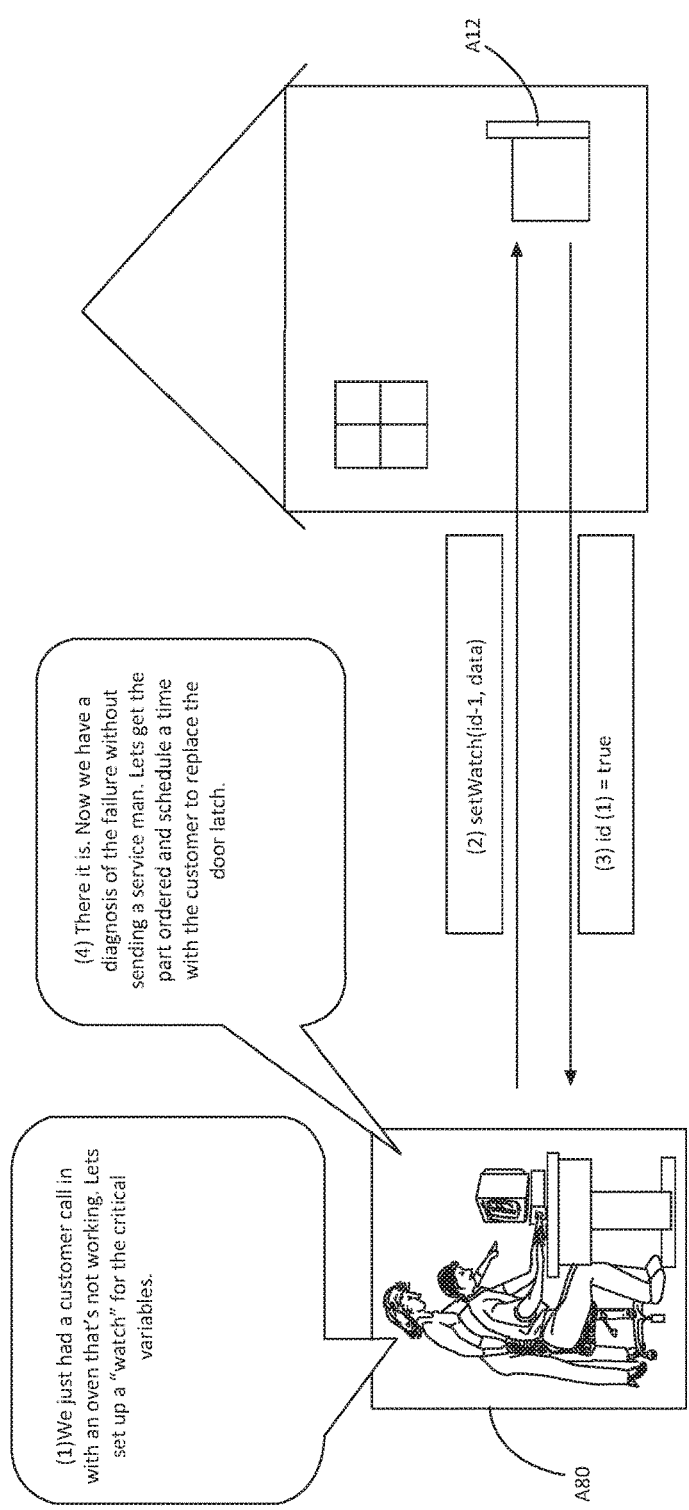
FIG. 14 is a schematic view illustrating remotely servicing a communicating appliance according to one embodiment of this disclosure.

The cycle engine itself can be communicated, as well as be configured to communicate with a client to receive and send messages, preferably in accordance with software architecture as shown in FIG. 14 of the incorporated PCT/US2006/022420, having an enabling identifier and a collection of commands and events which are supported via a collection of Op ("Operation") Codes. Preferably, the cycle engine A69 of either embodiment, will receive messages from a client allowing for changes to the cycle structure. Changes to a cycle structure may be, for example, the insertion or deletion of steps, additions or deletions to the actions of each step, or changes to the transitional logic between any two given steps. To accomplish such changes, identifiers must be associated with the components of the cycle structure such that the client messages can fully specify the exact desired modifications to the cycle structure.

Typical actions in the data portion include, for example, changing the state of electro-mechanical actuators like relays, valves, and fans, and changing the state of user interface indicators like LEDs, buzzers, light rings, segmented displays, or graphics on a graphical LCD. The devices to which the actions will apply may be represented as identifiable functions with a known controllable interface. In other words, physical devices may be modeled or virtually revealed in the SA by an Application Programming Interface (API) Id where their control interfaces are represented by a collection of Op Codes, each having associated parameters. This allows controllable devices or software components which control the controllable devices to expose themselves to the actions of a step as a message, preferably exposing themselves using the messaging mechanism of the incorporated PCT/US2006/022420 such that location of the control software which can operate on a device or the control software providing controllable access to the device does not need to be known by the cycle engine. With respect to FIG. 14 of the incorporated PCT/US2006/022420, the cycle engine A69 would typically reside in the App Logic A59. "Control software" here means any software, algorithm, or logic directly or indirectly associated with the operational cycle of an appliance. Generally, all logic provides indirect access to the control of a device, but the meaning can extend to include any non-device oriented software participating in the operational cycle of an appliance.

Using the aforementioned cycle engine architecture, an operational cycle accessory can be added to the network of an appliance, discover the cycle engine A69, and send it configuration messages to affect its structure and ultimately its execution. In this case, the operational cycle accessory would typically include a combination of software and data to accomplish the configuration of the cycle engine. Alternately, the aforementioned cycle engine architecture might send a discovery message seeking identification of all sources of the data portion (see the summary of discovery messages below). Sources of the data portion may be in ROM, Flash, EE Prom, an operational cycle component, and/or an external source connected via a network different from the control network (See FIG. 27). Once the data portion is located and retrieved, the cycle engine can commence modifying its own cycle structure according to the data.

In one embodiment, the data portion will be stored in flash memory using the process described in the aforementioned second embodiment, and upon receiving new data from an operational cycle accessory, either physically or virtually by message from a remote client, the cycle engine will compare the received data with the stored dated to create a difference table in a separate memory area. In this way, alterations to the cycle structure can be made to the initial cycle structure while preserving the initial cycle structure for corruption.

When the operation cycle accessory is disconnected from the cycle engine, the data in the difference table associated with that operation cycle accessory may be optionally removed by the cycle engine. This is a form of anti-piracy protection in that the operation cycle accessory must be present for the additional functionality represented by the accessory to be available to the appliance.

Optionally, the connection between the appliance and the operation cycle accessory can include a transfer of data into the difference table or an intermediate table from which the difference table is created or increased. In this case, additional operation cycles may optionally be retained without the permanent presence of the operational cycle accessory. It should also be noted that an operation cycle accessory can be virtual in that the software and data and ability to communicate with the cycle engine may reside on an external device connected to the cycle engine via at least one network and not physically attached to the containing appliance.

It is to be noted that an operational cycle component can have other elements that are not the aforementioned operation cycles or constituent data and complied portions. For example, the operational cycle component can include software code to configure a cycle engine for communication and other functions or code to put software architecture into an alternate mode for the purpose of diagnostics or changing memory.

Other examples of an accessory include a consumable and a consumable reader. A consumable is an object external to the appliance that can be consumed or otherwise used during operation of the appliance or following operation of the appliance. The consumable can be consumed by the appliance or by the user. Examples of consumables include, but are not limited to, detergents and other wash aids for a laundry appliance and/or dishwasher, fabric items (e.g., clothing), heat and serve meals, frozen side dishes, frozen meals, microwave popcorn, frozen pizza, and frozen breakfast sandwiches. Characteristics or information, such as an operating cycle, usage directions, cooking instructions, dosage information, and washing/drying instructions, associated with the consumable can persist, for example, within the consumable itself, in the packaging for the consumable, or in auxiliary materials, such as user manuals and tags, provided with the consumable.

The consumable reader is a component that can accept the information associated with the consumable and transmit it to the controller of the appliance. The consumable reader can be a device integrated with the appliance or a separate device that can be coupled, either by a hardwire connection or wireless connection, to the appliance for communication with the appliance. Examples of consumable readers include, but are not limited to, bar code scanners, radio frequency identification (RFID) tag readers, and magnetic strip readers.

The consumable reader communicates the information associated with the consumable to the appliance so that the appliance can optimize its performance for the consumable. An example of employing the consumable and consumable reader is provided in the schematic illustration of FIG. 12. In this example, a food provider A70 determines cooking instructions for a consumable A72 in the form of a frozen meal and encodes the packaging for the consumable A72 with the cooking instructions. The user can place the consumable A72 in the vicinity of the appliance A12 in the form of an oven, and a consumable reader A74 of the appliance A12 communicates the encoded cooking instructions from the consumable A72 to the appliance A12. The appliance A12 can then execute the cooking instructions for preparing the frozen meal.

It is contemplated that the consumable will contain information corresponding to a preferred operating cycle for the consumable. In the case of a food item, the information would correspond to a cooking cycle for the consumable. The consumable can also have the ability to identify the appliance and provide an appliance-specific operating cycle. One manner of implementing this is for the consumable to have operating cycles corresponding to a particular appliance or class of appliance. The appliance in which the consumable is used identifies and implements the relevant operating cycle. Another manner of implementation is for the consumable to have an identifier and the appliance has stored or access to a database or table of operating cycles for different consumables. The appliance takes the consumable identifier and looks up the corresponding operating cycle for the consumable.

The information associated with the consumable can be in any suitable form. In one embodiment, the information can be a communication packet that can be directly transmitted to the software architecture, thereby eliminating a need for a central storage of consumables data. In another embodiment, the information can be a key that can be used to direct the appliance to stored consumables data.

It is within the scope of this disclosure to utilize the consumables without the consumable reader. For example, the consumable can be configured to directly communicate with the appliance or other component on the network without employing an intermediate consumable reader.

The consumables can be supplied by a third-party provider, as in the case of store-bought frozen meals and wash aids for laundry appliances and/or dishwashers, or provided by the user. Leftovers and cooked and uncooked prepared foods are examples of consumables that can be provided by the user. The leftovers and the prepared foods can be placed in a storage container encoded with information related to the leftovers and prepared foods. For example, the information can include re-heat or cooking instructions and an expiration date (i.e., throw away date). When the information includes the expiration date, the appliance, such as the oven or microwave oven, can refuse to re-heat or cook the food if the current date is past the expiration date. Optionally, the appliance can be configured to receive an override command from the user when the user desires to re-heat or cook the food despite the expiration date.

Any suitable material can be used to encode the information, and examples include, but are not limited to, plastic wrap, aluminum foil, pots, pans, microwave-safe containers, container lids, and an adhesive or magnetic strip that can be placed on the storage container. The information can be configured by the person who originally prepared the leftovers and the prepared foods and encoded using any suitable means, such as a personal computer, a magnetic strip writer, and a handheld encoding device. With this configuration, the user can configure the information on the consumable as desired.

Along the lines of the consumables and the consumable readers, another example of an accessory is a recipe book and a recipe book scanning wand. The recipe book can contain various recipes having associated cooking instructions, and the cooking instructions can be extracted by the recipe book scanning wand. For example, the cooking instructions can be extracted from text of the recipe book or hidden or visible encoding. The recipe book scanning wand can then communicate, via hardwire or wireless connection, the cooking instructions to the appliance for execution. In an alternative embodiment, the recipe book can directly communicate with the appliance without employing the recipe book scanning wand.

Another example of an accessory is a commercial laundry credit accessory. The commercial laundry credit accessory can be any suitable device, such as a card with memory and/or a microprocessor (commonly known as a "smart card") and a dongle. The commercial laundry credit accessory can store laundry operation cycle credits and communicate with the appliance in the form of a commercial laundry appliance, such as at a public laundry facility, via a direct or wireless connection. When the commercial laundry credit accessory has sufficient credits, the appliance will operate and deduct credits from the commercial laundry credit accessory based on the operation of the appliance. Optionally, individual users can purchase the laundry operation cycle credits, or others can purchase the laundry operation cycle credits for gifting purposes. In one embodiment, the laundry operation cycle credits can be purchased at the public laundry facility or remotely, such as via the Internet.

The credit accessory can also be used in combination with the software architecture to track usage and transferring the usage information to a local or remote central system. Price changes and other operating parameters for the laundry can be changed by the credit accessory. The price change can be linked to other information accessible through the software architecture, such as energy costs, for example. The credit accessory can also collect diagnostic information and call for service or alert the owner if there are any pending issues via wired or wireless. The smart card can also be used to supply alternate content to the user interface of the appliance, such as advertisement, for example.

Another example of an accessory is a customized connector that can be used to couple the appliance with another accessory or with another component on the network. The customized connector can be associated with any item, such as a cable or a dongle, that can couple with the appliance, and can be configured to prevent unauthorized, third-party devices, including generic brand replacement parts, from undesirably coupling with the appliance and other components on the network. Thus, the connecting item must have the customized connector to couple with the appliance or other component on the network.

Another group of exemplary accessories relate to energy usage. For example, the accessory can be an energy controller and/or energy monitor, hereinafter referred to collectively as the energy controller. The energy controller can be a separate component on the network that communicates with several appliances and other networked components in the home and also with an energy source, such as an electricity source. The energy controller can monitor the amount of energy used by each of the appliances and can distribute energy among the appliances. The distribution of energy can result in an efficient usage of energy and can also manage energy usage, for example, when the energy source curtails the amount of supplied energy. The energy controller can also control the operation of the appliances so that the operation occurs during non-peak energy usage times, which typically correspond to lower energy costs.

Figure 13:
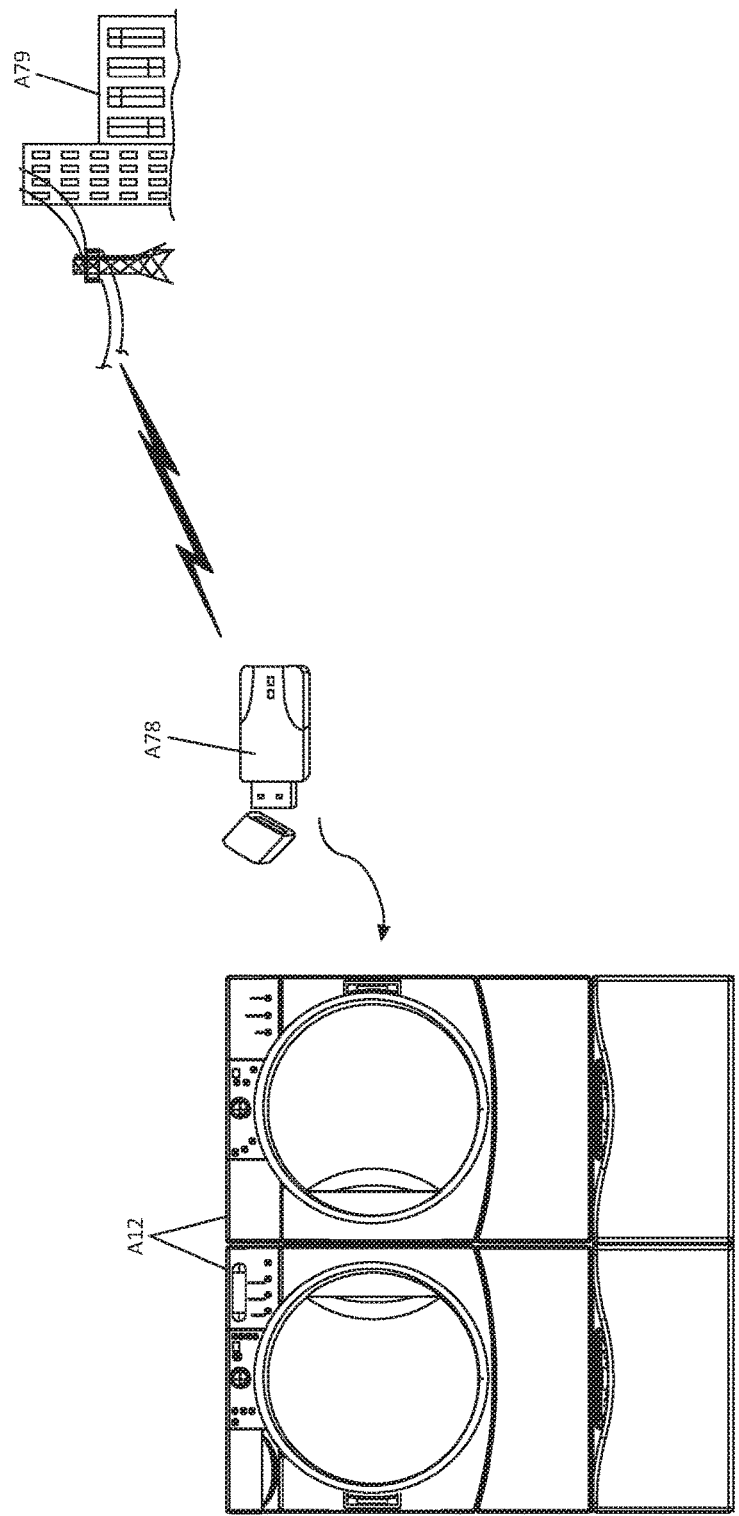
FIG. 13 is a schematic view of a connection assembly according to one embodiment of this disclosure for use with a communicating appliance and an energy controller.

The energy controller can be internally configured for communication with the appliances, or a separate connection accessory, such as a dongle, can be coupled to the energy controller to provide connectivity to the appliances. Similarly, the appliance can be internally configured for communication with the energy controller, or a separate connection accessory A78, such as a dongle, as illustrated in FIG. 13, can be coupled to the appliance A12 to provide connectivity to the energy controller. The connection accessory can have the ability to discover the type of appliance and provide appropriate modules of the software architecture for the appliance. In addition, the connection accessory can have the ability to respond to messages and commands from the energy controller. The connection accessories can be configured to provide wireless communication between the energy controller and the appliances.

The energy controller A78 can be connected to an energy supplier by any suitable means, such as, wireless, Internet, power lines, etc. With such a connection, the energy supplier can provide information relevant to the control of the appliance. The energy supplier can also remotely control the appliance in addition to or in lieu of providing information.

Other energy related accessories include a smart breaker, a smart dimmer, and a smart adapter. The smart breaker is described in detail in U.S. Pat. No. 6,988,375, issued Jun. 24, 2006 which is incorporated herein by reference in its entirety.

The smart dimmer is effectively a replacement for a load switch, such as a light switch, having discrete on/off control and can be used in any component on the network, including lights and ceiling fans. The smart dimmer provides the ability to not only switch power on and off but also to vary voltage, such as via triac control or converter/inverter control. The smart dimmer communicates with the energy controller, such as to respond to requests from the energy controller and to notify the energy controller of energy consumption status. By giving the energy controller additional control over the component associated with the smart dimmer, the energy controller has more capability to achieve target energy consumption without disruption to the user. Furthermore, in the event of an emergency energy curtailment, the energy controller can communicate with the smart dimmer to dim or shut off the lights or other component associated with the smart dimmer. The smart dimmer can also have associated sensing capabilities to feedback to the energy controller measurements of watts and power-factor.

The smart adapter is functionally similar to the smart dimmer but serves as a replacement for a common wall outlet. By replacing the common wall outlet with the smart adapter, which can communicate with the energy controller in a manner similar to the communication between the smart dimmer and the energy controller, "dumb" components, such as water heaters, that typically function in off/on modes can be plugged into the smart adapter and converted for use on the network and for operation at varying voltages. As a result, the components with the smart adapters can participate in energy curtailment programs and can communicate energy usage information to the energy controller.

Other examples of accessories relate to servicing the appliance. In one embodiment, a remote service center can communicate wirelessly with the appliance in the home. As a result, the remote service center can monitor the appliance, including low level components of the appliance, either passively or actively, and diagnose failures of the appliance. An example of passive monitoring of the appliance is illustrated in FIG. 14. In this scenario, the user communicates with the customer service center A80, such as via a telephone call or through the Internet, to inform the customer service center A80 that the appliance A12 in the form of an oven is not functioning properly. In response, the customer service center A80 communicates with the appliance A12 wirelessly to monitor the appliance A12 and diagnoses a failure associated with a component of the appliance A12, particularly the door latch. Thus, observation over the network enables the remote service center A80 to diagnose the failed component without a service visit to the home.

If information not available on the internal network of the appliance is needed for diagnosis, the remote service center A80 can use the DAQ, which is described in more detail in the aforementioned and incorporated PCT patent application to retrieve information available in memory of the associated appliance componentry for analysis of a problem or for searching for a problem.

If in addition to passive monitoring, the remote service center A80 determines the need to control and test the low level components of the appliance A12, the remote service center A80 can actively monitor the appliance A12. To actively monitor the appliance A12, the remote service center A80 can put the appliance A12 in a development state, which is described in more detail in the aforementioned and incorporated PCT patent application and priority application. In the development state, the remote service center A80 can communicate with the appliance A12 and actuate the individual components of the appliance, such as heaters, valves, and motors, to facilitate making a diagnosis. According to one embodiment, for the appliance A12 to enter the development state, the appliance A12 must be in an attended mode. In the attended mode, a responsible person must be present at the appliance to ensure that the actuation of the individual components of the appliance A12 does not harm anyone in the vicinity of the appliance A12. The responsible person can be the user of the appliance A12 or any other person deemed responsible. The presence of the responsible person can be confirmed in any suitable manner, such as by communication between an identification card of the responsible person and the appliance A12 or by the responsible person actuating a key press on the appliance A12.

As an alternative, the appliance can be monitored and diagnosed by an individual, such as the user, in the home with the aid of a service accessory rather than employing the remote service center. In this scenario, an automated service system replaces the remote service center. The service accessory can be any suitable device, such as a dongle, configured to communicate, either via a wired connection or wirelessly, with the appliance and with the automated service system.

Figure 15:
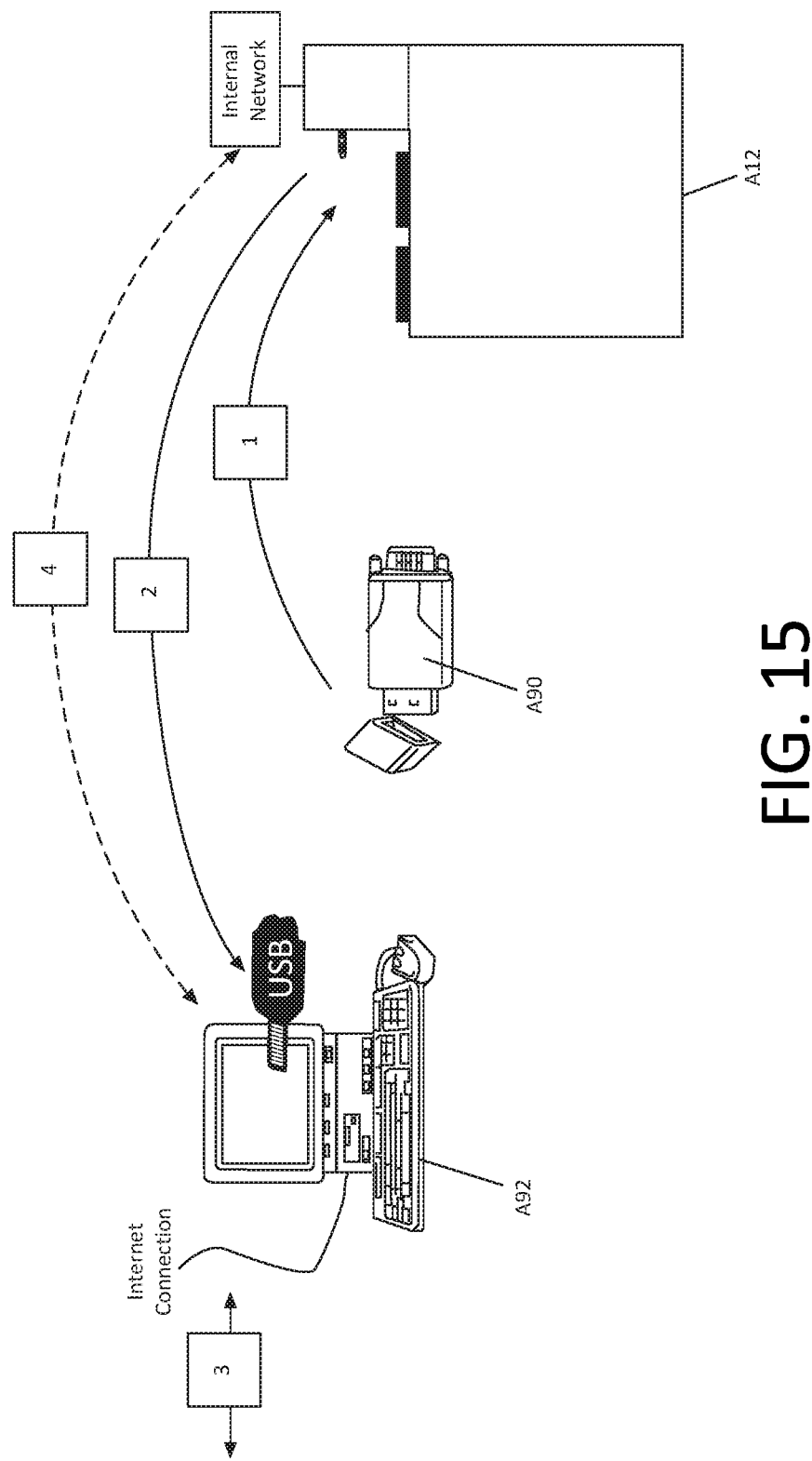
FIG. 15 is a schematic view illustrating self-servicing a communicating appliance according to one embodiment of this disclosure.

An example of self-servicing the application using the automated service system and the service accessory is illustrated in FIG. 15. Shown as step A1, the user couples the service accessory A90 to the appliance A12 in the form of an oven, and the service accessory A90 automatically configures to record diagnostic data from the appliance A12. If an appliance failure occurs, the user removes the service accessory A90 from the appliance A12 and couples the service accessory A90 to a personal computer A92, shown as step A2. Next, the service accessory A90 connects to the Internet via the personal computer A92, shown as step A3, and uploads the diagnostic data associated with the appliance failure to the automated service system. The automated service system analyzes the diagnostic data and determines an appropriate response. The response can include, for example, downloading customized testing scripts based on the diagnostic data, and the testing scripts can be used to further diagnose the appliance failure or eliminate the problem. The testing scripts can be downloaded via the Internet and the personal computer A92 to the service accessory A90, which can be re-coupled to the appliance A12, shown as step A4, for transferring the testing scripts to the appliance A12. Alternatively, the service accessory can be a coupling mechanism allowing a computing device, such as a cellular phone, a personal computer, and a personal digital assistant, to execute logic associated with data collection, analysis, and test scripts.

Other examples of accessories relate to home automation. Home automation systems are systems with a control center configured to control multiple objects, such as lights, drapes, blinds, thermostats, audio/video components, and security systems, within a home. Typical control centers are in the form of a monitor, such as a touchpanel monitor, or a remote control with a customized keypad. With the software architecture, the appliance can be integrated with the home automation system. In one embodiment, the appliance can be added to an existing home automation system whereby the appliance can be controlled, monitored, etc. from the control center. The appliance can optionally communicate with the control center via a wireless device coupled to the appliance. Alternatively, the appliance can be used as the control center. For example, a kitchen is generally a centralized location in the home, and one of the appliances, such as a refrigerator, in the kitchen can include the control center. In this example, the control center can be a monitor integrated into a door of the refrigerator.

By combining the appliance and the home automation system, several synergistic features become feasible. For example, when a fire alarm or smoke detector of the home automation system detects a fire or smoke, the combined appliance/home automation system can take appropriate actions, such as turning off an oven and cooktop, turning off HVAC systems, turning on lights, and shutting off gas supply. In another example, the user can set the combined appliance/home automation system in a vacation mode. Upon departure and during the vacation, the combined appliance/home automation system can take appropriate actions, such as shutting off water supply, turning off water heaters, increase refrigerator temperature, enable alarms, and setup an automatic telephone call to police if the refrigerator door opens. On return, the combined appliance/home automation system can take appropriate actions, such as turning on water supply, turning on water heaters, decrease refrigerator temperature, and disable alarms.

As another example, the combined appliance/home automation system can provide notifications to the user for time management benefits and peace of mind. Notifications for time management benefits can include, but are not limited, to fabric/dish washing complete, fabric/dish drying complete, microwave defrost complete, turn food for microwave defrost, oven pre-heat complete, and food cooking complete. Upon receiving the notification, the user can immediately attend to the corresponding appliance to remove the fabric load, dish load, food, etc. rather than spending the time to periodically having to check whether the operation cycle is complete and possibly delaying initiation of another operation cycle. Notifications for peace of mind can include, but are not limited to, refrigerator door ajar, freezer door ajar, water filter operational, oven left on, cooktop left on, basement humidity level satisfactory, air filtration system functioning, air quality index, boil over on cooktop, and grill flame exceeding limit.

The notifications can be provided to the user on the control system or a remote device that can be used outside the home. Examples of remote devices include, but are not limited, to a cellular phone, a key fob, and a pager/buzzer. The remote device can be configured with the software architecture for communication with the appliance or other component on the network.

Another example of an accessory is a network binder. The network binder is a device that binds nodes on a wireless network to the network by assigning an identical unique network ID to each node. Binding allows nodes that are within communication range of each other to be bound together to create private networks and separate the nodes from other nodes that are also within communication range but not part of the network. The network binder can be useful when there are multiple networks within range of one another, as in a neighborhood or an apartment building. The private network prevents communications from being inadvertently transmitted between networks, which would prevent unexpected interactions. The network binder of the present application can be a wireless device that is solely used for binding appliances or other components in a relatively short range of the network binder. For example, the network binder can have a limited transmission range of about three to four feet to ensure that the target appliance or other component becomes bound to the network when the network binder is operated. An exemplary network binder A100 is illustrated in FIG. 16 and comprises at least one button A102 that can be depressed when in the vicinity of the appliance A12 or other component to bind the appliance A12 or other component to the network. The network binder can optionally have the ability to communicate with a personal computer or other computing device so that the computing device can also be configured.

Figure 17:
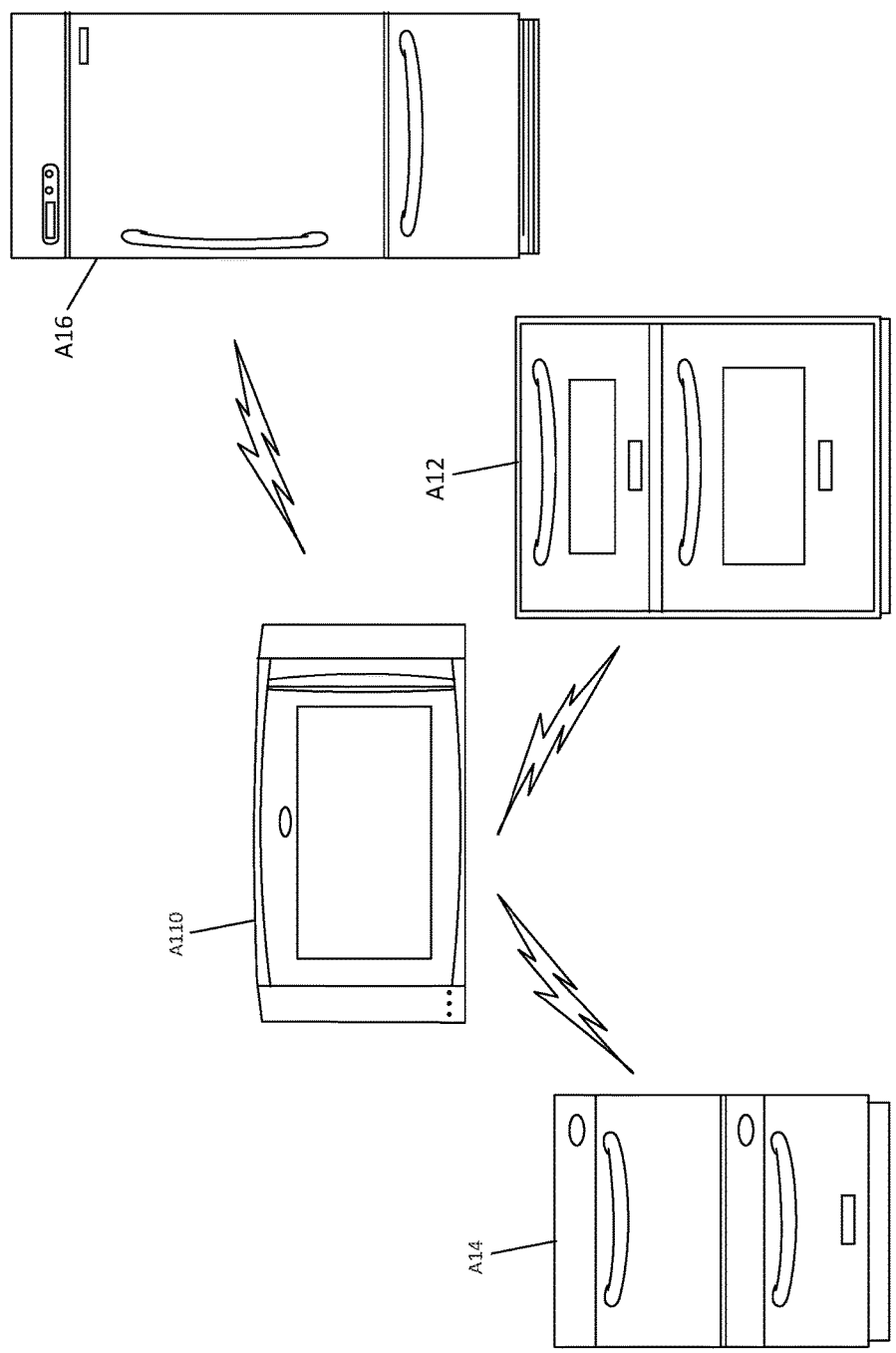
FIG. 17 is a schematic view of a remote user interface according to one embodiment of this disclosure for use with a communicating appliance.

Another example of an accessory is a remote user interface. The remote user interface is a user interface that can communicate with one or more appliances and can be positioned remotely from the appliances with which the remote user interface communicates. For example, the remote user interface can be positioned in a central location in the home or can be portable within the home. The remote user interface can provide many, if not all, of the functions associated with a traditional user interface of the appliance and can include additional functionalities. The remote user interface can have any suitable form, such as a monitor, including a touchpanel monitor A110, as illustrated in FIG. 17. Other examples of the remote user interface can include, but are not limited, to a remote keypad, a phone, a personal computer, a voice recognition device, a voice generation device, a sound generation and recognition device, a remote control, a user interface of a home automation system, a user interface of a component different from the components of the appliance, a television, a device that plays recorded music, a device that plays recorded video, and a personal digital assistant. According to one embodiment, the remote user interface can be employed in addition to the traditional user interfaces on the appliances associated with the remote user interface. Alternatively, the appliances associated with the remote user interface do not include a separate user interface that physically resides on the appliances. Furthermore, the remote user interface can be used in conjunction with the above-described combination appliance/home automation system.

Another example of an accessory is an appliance monitor. The appliance monitor, which can be a device integrated with or separate from the appliance, monitors and records operational data associated with the appliance. The appliance monitor can monitor one appliance or a plurality of appliances. Optionally, the appliance monitor can include a display for displaying an operational status of the appliance and can be integrated with the remote user interface described above to also provide the ability to issue commands to the appliance. Furthermore, the appliance monitor can optionally be configured to transmit the operational data associated with the appliance to another device, such as a personal computing device or an intermediate storage device, such as a dongle.

Figure 18:
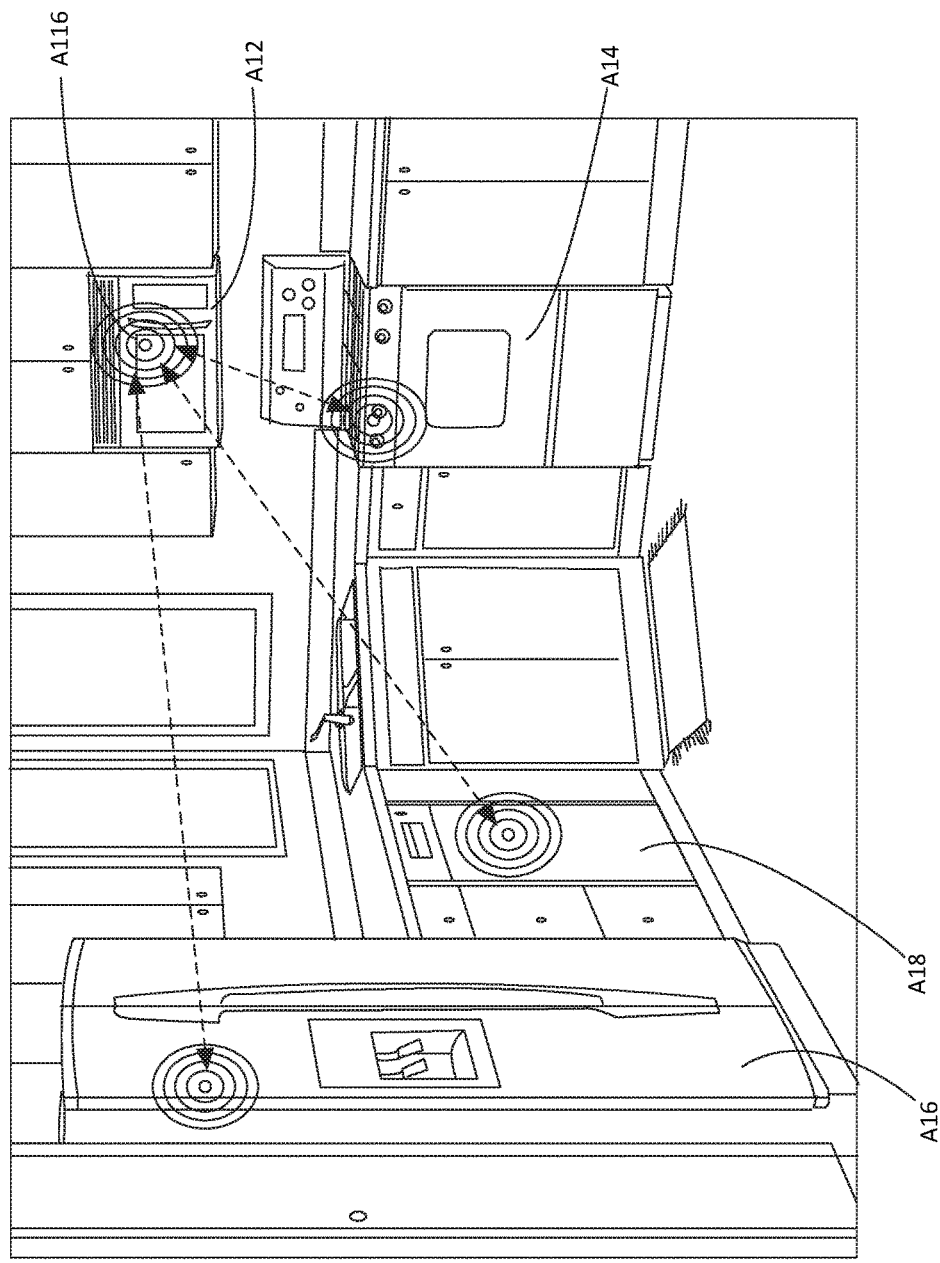
FIG. 18 is a schematic view of an appliance monitor integrated into a communicating appliance according to one embodiment of this disclosure.
Figure 19:
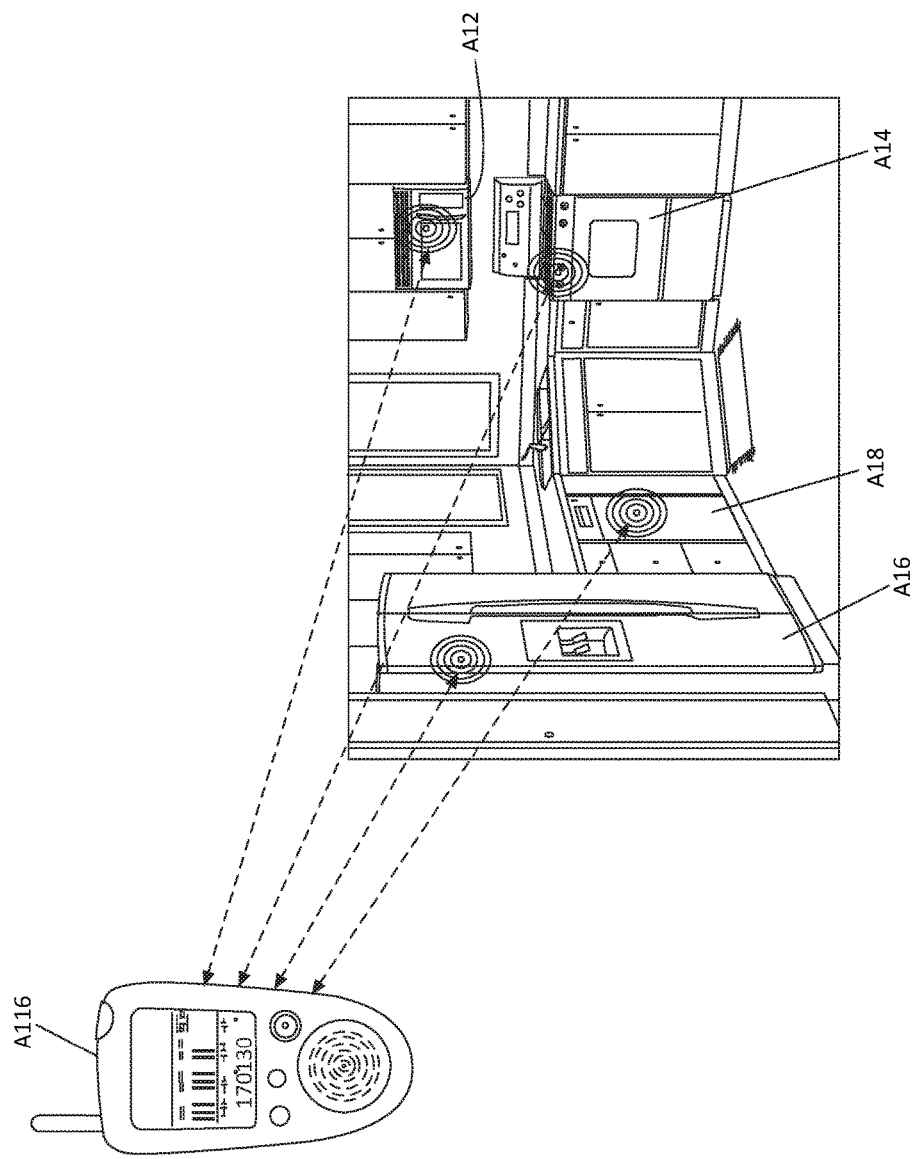
FIG. 19 is a schematic view of a remote appliance monitor according to one embodiment of this disclosure for use with a communicating appliance.

In an example illustrated in FIG. 18, the appliance monitor A116 is integrated into the first appliance A12 in the form of a microwave oven, and the second, third, and fourth appliances A14, A16, A18, along with the first appliance A12, communicate with the appliance monitor A116. In another example illustrated in FIG. 19, the appliance monitor A116 is a separate, portable device that communicates with the first, second, third, and fourth appliances A12, A14, A16, A18. The portable appliance monitor A116 can be carried by the user so that the user is able to observe the operational status of the appliance at any desired time.

Figure 20:
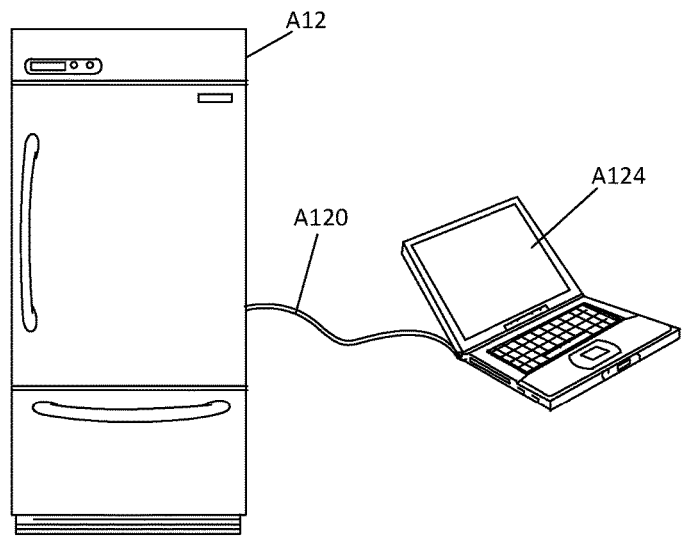
FIG. 20 is a schematic view of a smart cable according to one embodiment of this disclosure for use with a communicating appliance.
Figure 21:
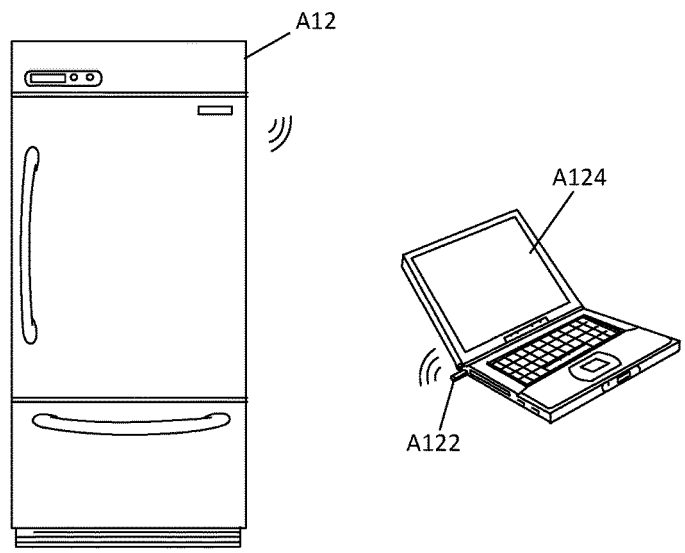
FIG. 21 is a schematic view of a smart wireless connector according to one embodiment of this disclosure for use with a communicating appliance.

Other examples of accessories relate to servicing the appliances. If the appliance experiences a failure that requires a service person to visit the appliance in the home, the service person can couple a personal computer or other portable computing device to the appliance using a smart cable A120 or a smart wireless connector A122. As shown schematically in FIG. 20, the smart cable A120 hardwires the appliance A12 with the portable computing device A124. The smart cable A120 can include special, proprietary electronics that enable communication between the appliance A12 and the personal computing device A124. As a result, unauthorized persons who do not have the smart cable A120 cannot couple an unauthorized computing device with the appliance. Referring now to FIG. 21, the smart wireless connector A122 accomplishes the same goal as the smart cable A120, except that the former provides a wireless rather than hardwired connection between the appliance A12 and the portable computing device A124. The smart wireless connector A122 can be any suitable device, such as a proprietary wireless dongle, that establishes a proprietary connection between the appliance A12 and the portable computing device A124.

Figure 22:
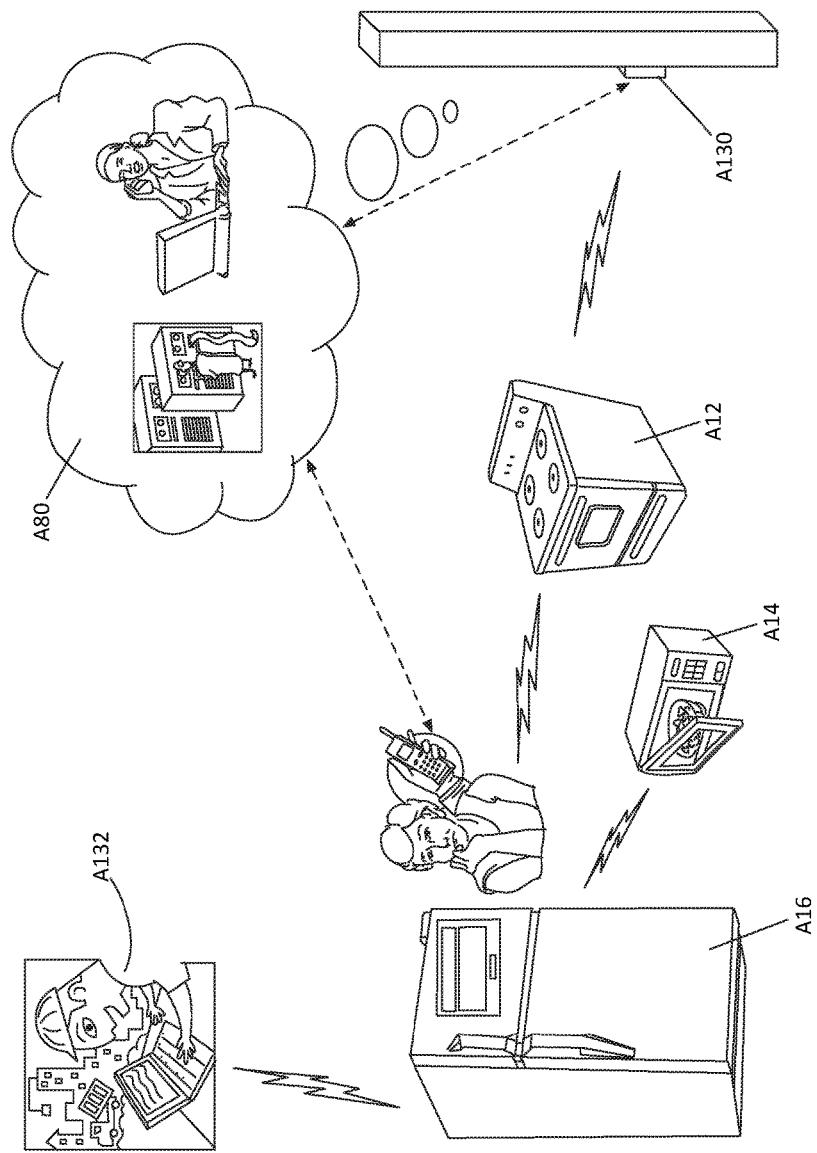
FIG. 22 is a schematic view of a central collector according to one embodiment of this disclosure for use with a communicating appliance.

Additional service-related accessories include a central collector A130 and a local collector A132, which can implement the same service-related functions previously described. Referring to FIG. 22, the central collector A130 functions similarly to the appliance monitor described above in that the central collector A130 communicates with the appliance(s) and monitors and records operational data associated with the appliance(s). The central collector A130 is illustrated in FIG. 22 as a box mounted to a wall in the home, but the central collector A130 can assume any suitable form and can be located in any suitable location, including on or in the appliance. The central collector A130 can communicate with the appliances A12, A14, A16, such as via a wireless connection, and the remote service center A80 can also communicate with the central collector A130. As a result, when an appliance failure occurs, the user can communicate with the remote service center A80, such as via telephone, to inform the remote service center A80 of the appliance failure, and the remote service center A80 can communicate with the central collector A130 to receive and analyze the operational data associated with the failed appliance. Furthermore, if the appliance failure requires a visit from a service person A132, the service person A132 can optionally communicate with the central collector A130, such as via a portable computing device, to receive and analyze the operational data associated with the failed appliance. The central collector A130 can also be employed by the service person A132 for field testing of the appliance. While illustrated external of the appliances, the central collector can be located within one of the appliances.

The central collector A130 can also be used for aggregation of customer usage data. The customer usage data can be sold to third parties and can be used in customer studies to gain insight to customer usage patterns and preferences. As another option, the central collector A130 can be used for benchmarking. The operational data associated with the appliance can be aggregated and compared to benchmarks or used to generate benchmarks related to appliance performance. When the operational data is compared to a benchmark, and the comparison indicates a degradation of appliance performance, the user can be alerted to the decrease in performance.

A derivative of the central collector A130 is a black box recorder. The black box recorder can function similarly to the central collector A130 but is constructed such that it cannot be destroyed or at least retains the operational data associated with the appliance in case of a fire or other event potentially destructive event to the appliance or the home. The operational data can possibly be used by insurance companies and investigators to assess the cause and effects of the destructive event.

Figure 23:
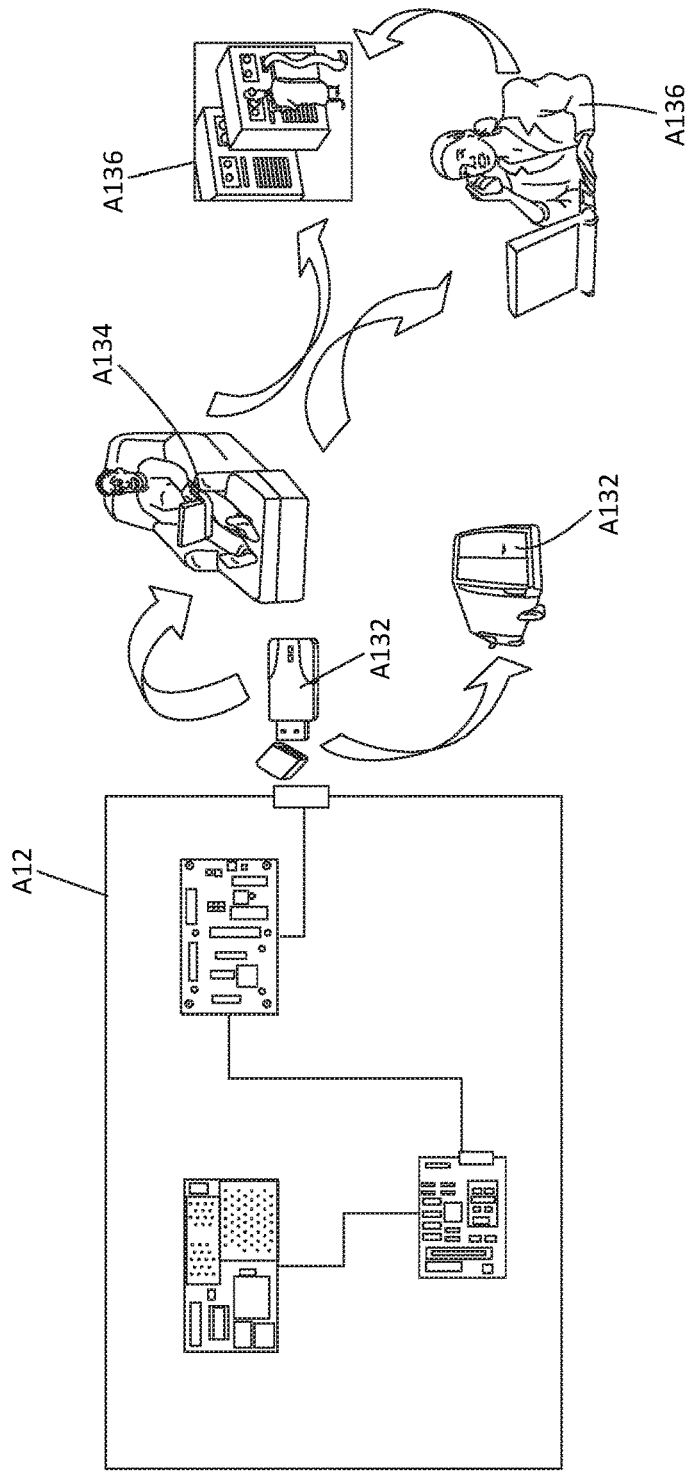
FIG. 23 is a schematic view of a local collector according to one embodiment of this disclosure for use with a communicating appliance.

Referring now to FIG. 23, the local collector A132 functions similarly to the central collector A130 in that the local collector A132 communicates with the appliance(s) and monitors and records operational data associated with the appliance(s); however, the local collector A132 is a portable device that can removably couple with the appliance(s). As shown in FIG. 23, where the local collector A132 is illustrated as a dongle, the local collector A132 can be coupled with the appliance A12 to receive the operational data associated with the appliance A12 and removed from the appliance A12. After removal from the appliance A12, the local collector A132 can be coupled with a computing device A134 of the user, and the operational data can be sent from the computing device A134, such as via the Internet, to a remote location, such as the remote service center A80 or a remote automation center A136. If the user does not have the computing device A134 or an Internet connection, then the local collector A132 can be provided to a shipping service A138 for delivery to the remote location.

The local collector A132 can be implemented using the service accessory A90. Either of the local collector A132 or the service accessory A90 can be interfaced with the electrical system of the appliance and with either the appliance or with a service tool (accessory) to perform enhanced diagnostics and performance analysis of the appliance. Exemplary uses would be to validate that each output device (when actuated) consumes the expected electrical consumption, and to realize certain performance or failure conditions by evaluating information contained in the electrical bus (example frequency analysis).

Another example of an accessory is an appliance coupler. The appliance coupler can be any device, such as a cable connector or a device capable of wireless communication, which enables direct communication between appliances. As a result, the coupled appliances can communicate with each other, which can be especially beneficial when the operation of one appliance affects the operation of another appliance. For example, a washing machine and a dryer can be coupled together by the appliance coupler, and the operational cycle of the dryer can be selected based on the operational cycle employed by the washer.

Figure 24:
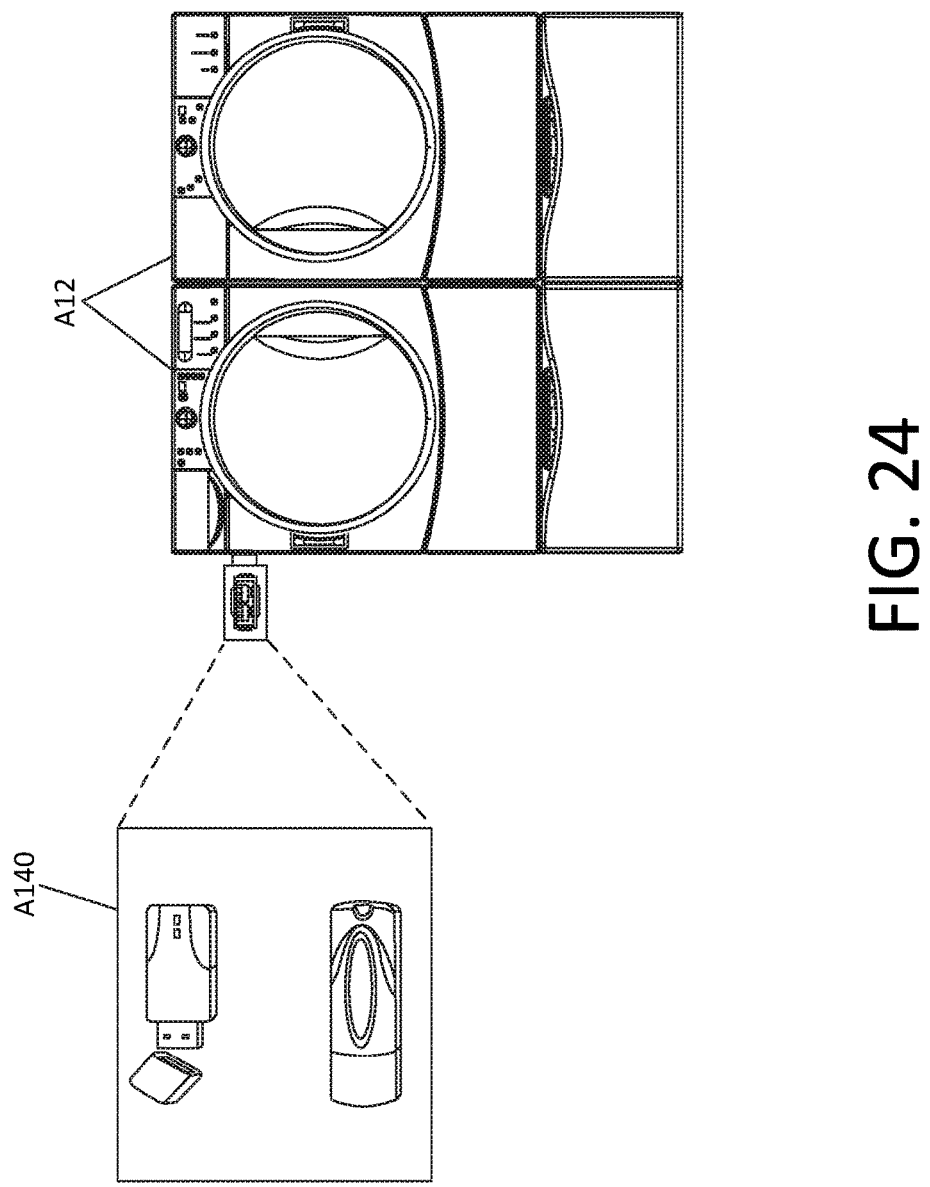
FIG. 24 is a schematic view of a sales demo accessory according to one embodiment of this disclosure for use with a communicating appliance.

Another example of an accessory is a sales demo accessory. As shown by example in FIG. 24, the sales demo accessory A140 can be a portable device, such as a dongle, that can removably couple with the appliance A12 on display at a retail store. The sales demo accessory A140 can store sales demos that can be executed by the appliance A12. The sales demos can control the appliance A12, highlight certain features of the appliance A12 for the customer, and can be interactive with the customer. Examples of the sales demos include, but are not limited to, displaying promotions on a user interface, user interface light and sound shows, voice feedback combined with user interface key presses, voice command and control, video playback combined with user interface key presses, motion sensing, and mechanical system custom demonstrations. When the software architecture enables control of individual components of the appliance A12, the sales demo can take advantage of this capability and combine the control of the components with external electronics and customization, thereby motivating the customer to interact with the appliance A12. The sales demo mode can be implemented by placing the appliance into a development state using the software architecture.

The sales demos can be downloaded to the sales demo accessory A140 from a web site associated with the manufacturer of the appliance A12 and updated periodically to reflect current marketing strategies of the manufacturer of the appliance A12. By differentiating the appliance A12 from other appliances on display in the retail store, the sales demos can help improve sales of the appliance A12. The sales demos can be customized according to the retail store and trade partners of the manufacturer of the appliance A12. Furthermore, by locating the sales demos on the sales demo accessory A140, code for sales demos that would traditionally reside on the appliance A12 can be removed from the appliance A12, thereby reducing development time and cost of the appliance A12.

Figure 25:
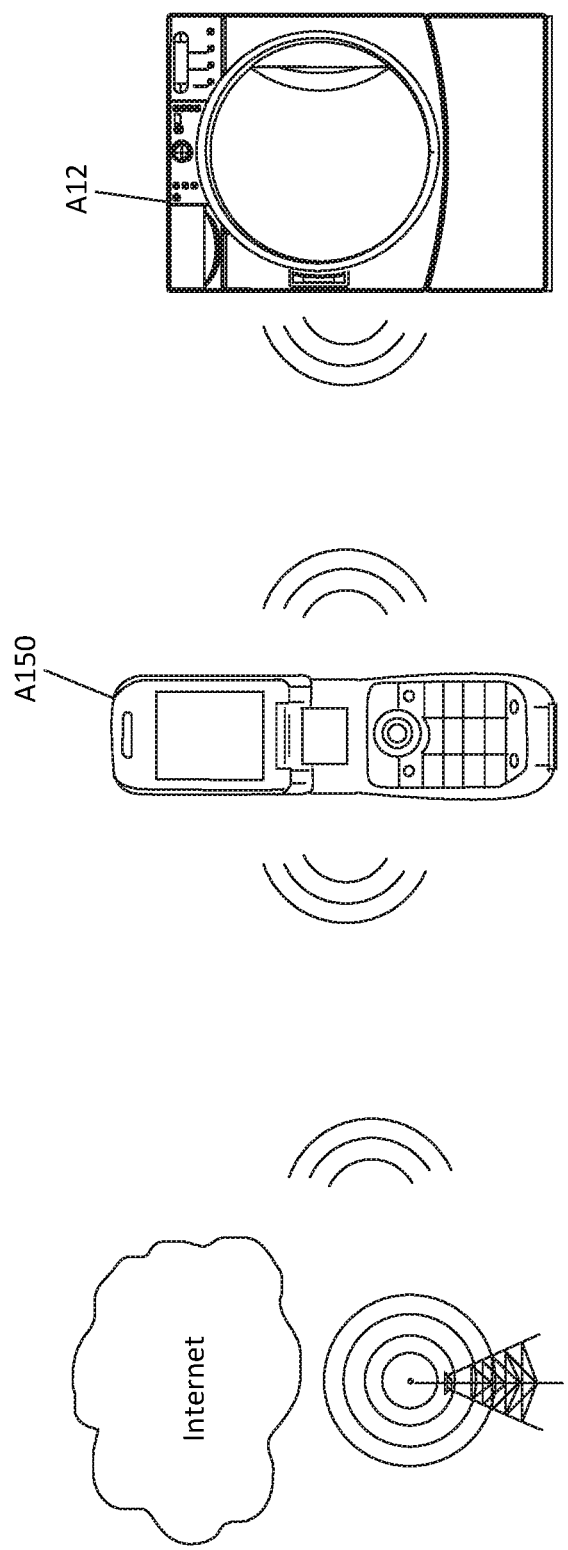
FIG. 25 is a schematic view of a cellular phone according to one embodiment of this disclosure for use with a communicating appliance.

Another example of an accessory is a cellular phone, which can be used for communication with the appliance A12. In general, today's cellular phones have several integrated technologies, including networking capabilities (Including Bluetooth), Internet connection capabilities, color user interfaces, premium sound, voice recognition capabilities for automatic dialing, and tactile feedback (e.g., vibration), and these integrated technologies can be utilized in conjunction with the appliance A12. Referring to FIG. 25, the cellular phone A150 can communicate with the appliance A12 via Bluetooth or an external connector, such as a USB connector. The cellular phone A150 can also communicate via the Internet. Thus, the cellular phone A150 can download information from the Internet and communicate the downloaded information to the appliance A12 and, conversely, receive information from the appliance A12 and upload the information to the Internet. The information can be any type of information related to the appliance A12, such as applications, custom tests, custom audio, diagnostic data, and customer data.

Examples of using the cellular phone include, but are not limited to, remote diagnostics and service, interactive audio, voice control, and enhanced user interface. For remote diagnostics and service, the cellular phone discovers the appliance and downloads diagnostic tests from the Internet. The cellular phone can locally execute the diagnostic tests through the software architecture and Bluetooth (or other communication means). After the diagnostic tests are complete, the cellular phone can upload testing results to the Internet for diagnosis. For interactive audio, the cellular phone discovers the appliance and downloads custom audio files from the Internet. The cellular phone can register with the appliance for key status events through the software architecture and Bluetooth (or other communication means). When the key events occur on the appliance, the cellular phone can automatically play the appropriate audio file to provide enhanced feedback. For voice control, the user can input voice commands into the cellular phone, and the cellular phone can convert the voice command to a command for the software architecture and transmit the command over Bluetooth (or other communication means). Finally, for the enhanced user interface, a user interface application, which can be downloaded from the Internet, can be executed on the cellular phone. The user interface application can take advantage of the color user interface, the premium sound, and the tactile feedback on the cellular phone. The control of the appliance A12 via the enhanced user interface and feedback from the appliance A12 to the enhanced user interface can occur locally through the software architecture and Bluetooth (or other communication means).

Another example of an accessory is an audio communication accessory. The audio communication accessory is a device that communicates with the appliance or other component on the network having a traditionally visual user interface and adds audio capabilities to the user interface. The audio communication accessory can also be used with any appliances or other component on the network that does not have a user interface. By incorporating the audio communication accessory, the appliance or other component on the network can audibly communicate information related to the appliance or other component to the user, and, optionally, the user can audibly communicate commands and the like to the appliance or other component through the audio communication accessory. Audible communication can be especially beneficial to users having a physical disability, such as blindness or mobility issues where it is difficult for the user to move within visual range of the appliance or other component. The audible communication can be voice (i.e., speaking) or a variety of sounds, such as beeping, alarms, Morse code, songs, etc.

Figure 26:
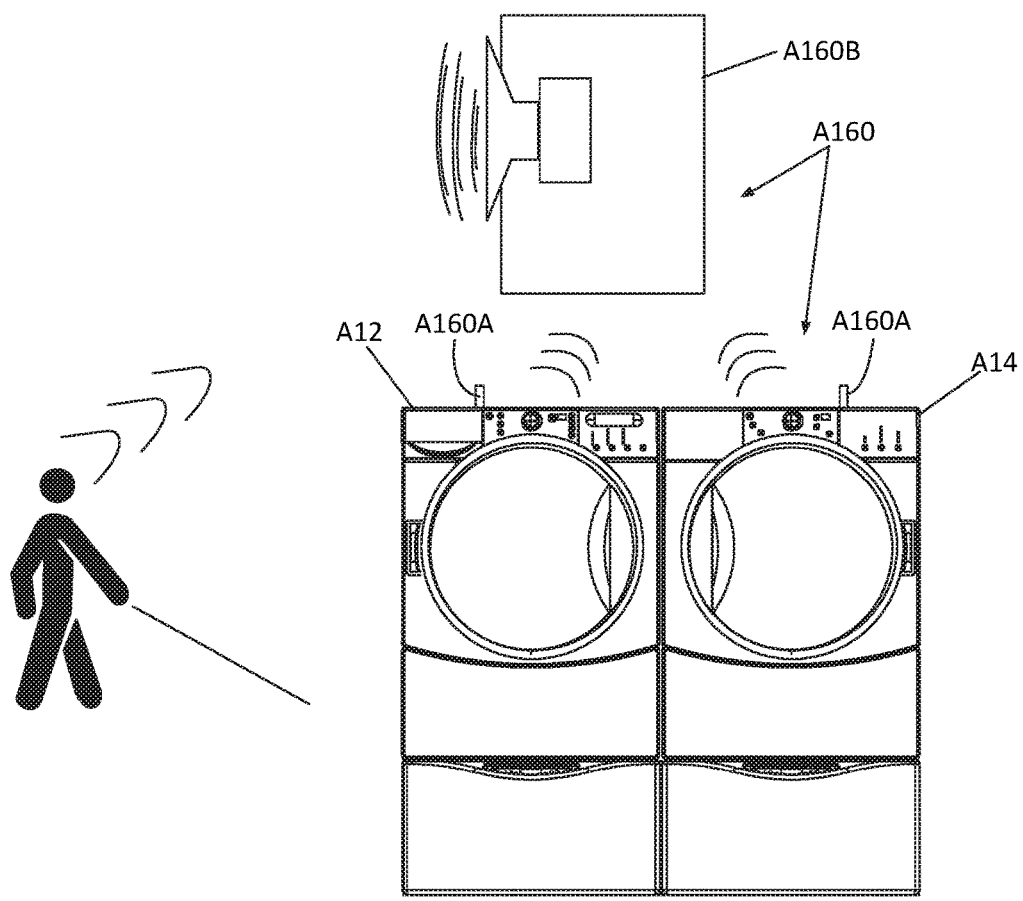
FIG. 26 is a schematic view of an audio communication accessory according to one embodiment of this disclosure for use with a communicating appliance.

Referring to FIG. 26, the audio communication accessory A160 can be directly mounted to the appliance A12, A14, as shown at A160A or can be separate or remote from the appliance A12, A14 as shown at A160B. In the latter case, the remote audio communication accessory A160B can be located in the home at a convenient location for the user. In one embodiment, the audio communication accessory A160A mounted to the appliance A12, A14 can communicate with the remote audio communication accessory A160B so that the audible information is communicated at more than one location. It is also contemplated that the audio communication accessory A160 can communicate with other audio devices, such as a telephone, a stereo system, a clock radio, and a cellular phone, so that the information can be communicated audibly through the audio device and increase the likelihood that the user will hear the information.

Examples of the information communicated by the audio communication accessory to the user can include, but are not limited to, notifications concerning an operational status of the appliance or other component, such as fireplace on, security system activated, carbon monoxide alarm activated, appliance door open, temperature limits exceeded, leakage, filter requires changing, end of operation cycle, cooktop burner on, oven pre-heat complete, fabric/dish washing complete, water temperature, circuit breaker blown, energy usage status, and energy usage exceeds preprogrammed limit. Examples of the information communicated from the user to the audio communication accessory can include, but are not limited to, commands concerning an operational status of the appliance or other component, such as call or otherwise contact emergency personnel, turn on outdoor spa, turn on outdoor sprinkler system, extend dryer operation cycle, and initiate operation cycle.

Other examples of utilizing the audio communication accessory follow. In one embodiment, the audio communication accessory can be used as an event calendar where the user can record an event, such as a reminder to take medicine, and the audio communication accessory can play the reminder at the appropriate time. As another example, the audio communication accessory can communicate with a source of weather information, such as via the Internet, and notify the user of weather conditions on demand or at preprogrammed times. It is also contemplated that the audio communication accessory can be used in conjunction with tracking devices to locate items in the home. For example, a set of keys can be equipped with the tracking device, and the audio communication accessory can communicate to the user the location of keys when the user cannot find the keys. The audio communication accessory can also be employed as an intercom system where multiple users can communicate with one another through the audio communication accessory. In this scenario, the users can each have the audio communication accessory, or the single audio communication accessory can interface with another device to enable two-way communication. In another embodiment, the audio communication accessory can be used to place the appliances or other components on the network in a "sleep mode," which can include, for example, shutting off lights, lower heating temperature, and activating the security system, when the user provides a sleep mode command as the user is going to bed. As another example, the audio communication accessory can be used in conjunction with the sales demo accessory described above to audibly enhance the sales demos for the appliance. The customer could effectively talk to the appliance and vice-versa, thereby improving the customer interaction with the appliance at the retail store. It is also contemplated that the audio communication accessory can be used in conjunction with an outdoor audio system and/or outdoor camera whereby the user can audibly communicate with a person who has activated a doorbell and/or view, such as via a display on a cellular phone, images of the person who has activated the doorbell. As another example, the audio communication accessory can communicate with a computing device or telephone system and notify the user when the user has received new electronic mail messages and voice mail messages.

The audio communication accessory can also be used to implement an audible use and care guide associated with the appliance. The audible use and care guide can be considered a replacement or addition to a conventional user manual that a user must read. Listening to the audible user and care guide can be more convenient, more efficient, and more easily understood than reading the conventional user manual. The audible use and care guide can include content traditionally included in the conventional user manual, such as explanations of the operational cycles and/or features of the appliance, troubleshooting information, and recommendations for care of different types of items used in the appliance (e.g., laundry, dishes, foods). As an improvement, the audible use and care guide can be configured to communicate information related to operation cycles selected in real-time by the user. Thus, as the operation cycle is being selected by the user, the audible use and care guide can inform the user, for example, how to use the operation cycle, what the operation cycle is meant for, what options are available for the operation cycle, and steps for programming the operation cycle.

The audible use and care guide can be activated prior to using the appliance for the first time or at any time the user requires assistance. In one embodiment, the audible use and care guide can be always accessible and activated by the user actuating a button on the appliance or voice activation via the audio communication accessory. The user can optionally interact with the audible use and care guide, such as by asking questions or instructing the audible use and care guide to skip information not needed by the user. According to one embodiment, the audible use and care guide can implement multiple, selectable modes for various use scenarios, such as whether the appliance is on the floor of a retail store as a sales demo, for a new appliance in the home, for a new user, or for an experienced user. The amount of information and level of detail in the information provided to the user can depend on the experience of the user. The audible use and care guide can be disabled if it becomes annoying or can be reconfigured.

The audio communication accessory can optionally include tactile feedback, such as vibration, which can be especially useful for users having a hearing disability. The tactile feedback can be used in conjunction with or as an alternative to the audio communication. The user can wear or carry a portable device that provides the tactile feedback.

Regardless of the type of accessory, the software architecture can be configured such that the accessory must present electronic credentials (i.e., authentication) before communicating with the appliance. Requiring the electronic credentials prevents unauthorized communication between the accessory and the appliance, thereby avoiding undesirable control of the appliance by the accessory. The security techniques of the incorporated International Patent Application No. PCT/US2006/022420 work well for the software architecture, including a firewall. Other possible authentication mechanisms can be used to gain access to the firewall. These can include a hardware signal, a sequence of messages, a handshaking algorithm, or a standard encryption algorithm for example. Any standard authentication method can be used to gain access to the firewall, as long as it is possible to verify that a client or accessory is authorized to gain access.

In addition, the disclosed three basic levels of access to the firewall (access, deny, and temporary access) can be expanded as necessary to allow different levels of access to different clients. These access levels each have a unique authentication (such as a unique password) and can be associated with different user roles such as a service technician, factory tester, developer, or consumer. Different levels of access allow different sets of commands to be executed by the client. These levels can be temporary and time bound or permanent once authentication is successfully completed.

The implementation of the firewall can vary as needed. The disclosed implementation uses a table of protected commands to validate against clients. Any number of data structures can be used to validate a user with the allowed commands for an access level of the firewall. In the end, a firewall must only allow access to commands to the appropriate clients that have successfully been authenticated.

Figure 27:
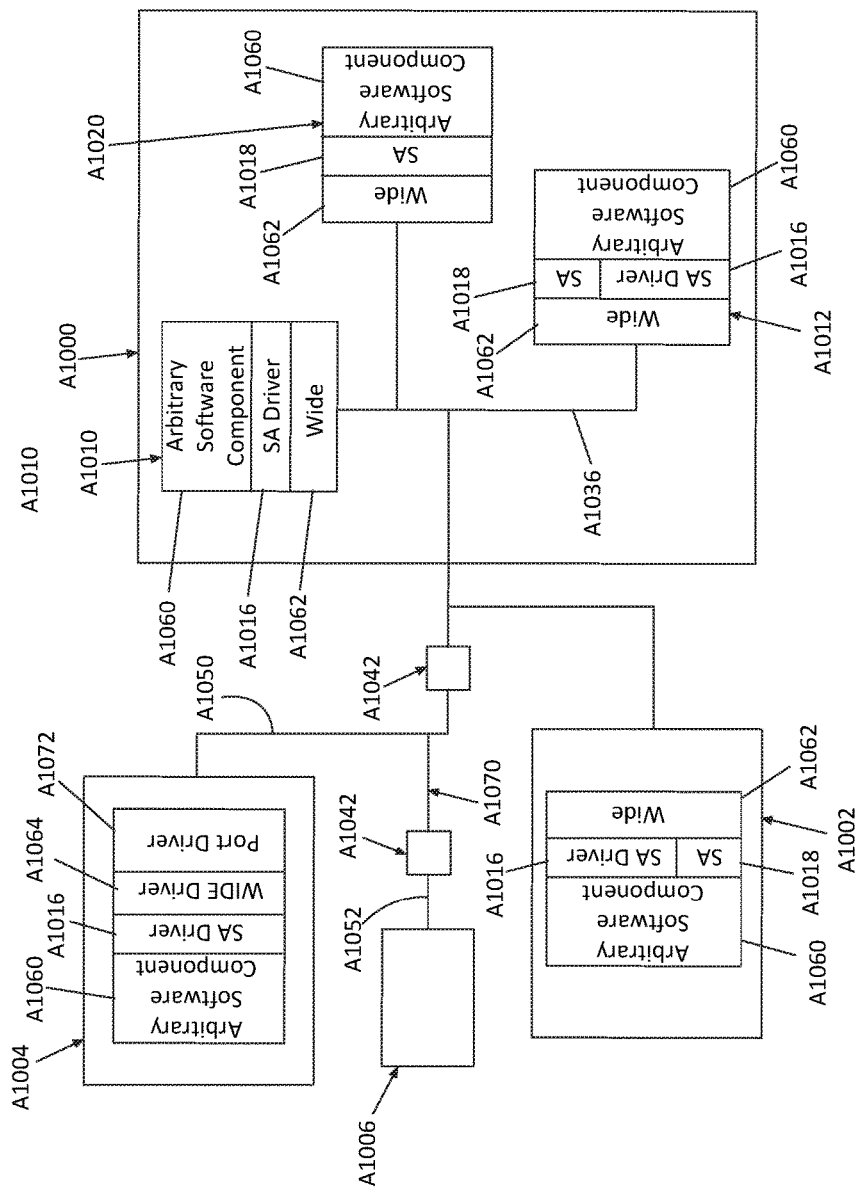
FIG. 27 is a schematic view of a network of appliances and clients connected on multiple networks by couplers.

FIG. 27 illustrates an appliance A1000 connected to external clients A1002, A1004 and a second appliance A1006 by a plurality of networks. A first network A1030 comprises a first internal client A1010, a second internal client A1012 and the external client A1002. A second network A1050 comprises the external client A1004. And a third network A1052 comprises the second appliance A1006. Each client is characterized as a node on the respective network. Local clients are clients that communicate with nodes on the same network. Remote clients are clients not directly coupled to the same network as the node to which they are communicating. In this embodiment, external client A1004 would be a remote client of the nodes on the first network A1030.

Each client node A1002, A1004, A1010, A1012 comprises a software architecture driver (SA driver) A1016 for exchanging messages with any node having a software architecture (SA) A1018 thereon. The nodes on any given network are in operable communication with the other nodes in that network and are optionally in communication with the nodes present on other networks.

The appliance A1000 further comprises at least one node A1020 having the SA thereon. The second appliance A1006 will also likely have a node with the SA on it, and may have one or more clients as well. The first network A1030 also comprises the node A1020.

Couplers A1040, A1042 are special devices that connect to the appliance and/or to a network and/or to two or more networks and communicate therebetween. Each coupler can comprise all the functionality of a node, and each node can comprise all of the functionality of a coupler. In this embodiment, the coupler A1040 couples the second network A1050 to the third network A1052, and can function as a node on each network. The coupler A1042 couples the second network A1050 to the first network A1030. It could also be considered as coupled to the appliance A1000.

Either of the couplers A1040, A1042 can propagate discovery messages issued by the SA or an SA driver across the networks in order to enable the SA and SA drivers or their coupled arbitrary software components to develop references to identifiers of functionality for the different nodes. Each coupler A1040, A1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers A1040, A1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol A1062, a proprietary appliance network protocol utilized by Whirlpool Corporation. For a client not having WIDE network protocol that needs to communicate WIDE messages (e.g., external client A1004), a WIDE driver A1064 can be used. A port driver A1072 couples the external client A1004 to the network A1050.

Each node can also comprise an arbitrary software component A1060. The couplers A1040, A1042, for example, may not. The SA driver A1016 is a software element configured to allow an arbitrary software component to communicate with the SA A1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver A1016 can receive and at least partially interpret messages from the SA and/or from another SA driver, which are specified as feedback events. In some instances, the SA driver A1016 can also send command messages to the SA A1018. In this respect, the external clients A1002, A1004 can have full capability act as an accessory to communicate with and to enhance or alter the operation of the appliance.

It will be understood that any or all of the external clients A1002, A1004, the couplers A1040, A1042, and the internal clients A1010, A1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered.

Where more than one network is connected by a coupler, such as couplers A1040, A1042, a message received by the coupler from one network can be propagated and sent to the second network. The coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e., a sent message that is also unknowingly received by the sender on a second network to which the sender is coupled. At least the coupler A1040 may have a routing table including proxy identifiers of the functionalities of the second node. As well, the coupler A1042 may have a routing table including proxy identifiers. A discovery message sent by the node A1020 is received by the coupler A1042, which evaluates the message in accord with the routing table and propagates the message to the next node, coupler A1040. Similarly, the coupler A1040, evaluates the propagated message in light of the routing table, and propagates the message to the next node in line, which may be the second node.

Figure 28:
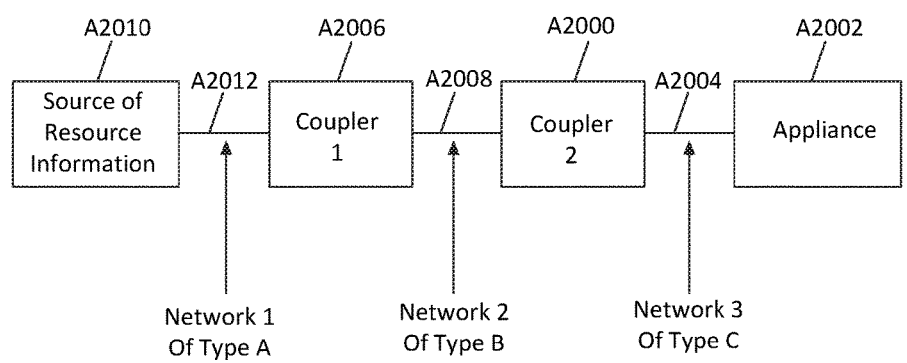
FIG. 28 is a schematic view of a source of information about resources connected to an appliance through two couplers.

See, for example, FIG. 28 illustrating a system where resources in an appliance can be monitored, managed, or changed as in the energy controller accessory of FIG. 13. A likely scenario has a coupler A2000 connected to an appliance A2002 by a network A2004. The coupler A2000 also connects to a coupler A2006 via network A2008 that may be a different type of network from network A2004. Coupler A2006 connects to a source A2010 of information about resources used or generated by the appliance A2002 by a third network A2012 that may be a different type of network from either network A2004 or network A2008. Assume that the source A2010 wants to send information about the resource to the appliance A2002. This disclosure enables a node in the source A2010 on network A2012 to communicate with a second node, having SA for example, which may be among several on the appliance A2002. We assume that the source A2010 has at least an appropriate communication driver, or one of the couplers has software to translate any message from the source to the communication protocols of the incorporated PCT/US2006/022420, for example.

In this scenario, the source A2010 sends a discovery message over the network A2012 seeking any consumer of resources to which the source wants to send information. The coupler A2006 receives the discovery message, translates the message, if necessary, and propagates the discovery message to the next nodes over the network A2008, including coupler A2000. Coupler A2000 receives the discovery message, translates the message, if necessary, and propagates the discovery message to the next nodes over the network, including the appliance A2002. The relevant nodes in the appliance A2002 evaluate the message and determine a discovery reply message, and send respective replies. Here, we assume at least one reply is positive.

The discovery reply message is received by the coupler A2000, which populates its routing table and sends it to the coupler A2006, which populates its routing table and sends it to the source A2010 in accord with the foregoing process. Each node retains the relevant identifiers so that subsequent message can be communicated without repeating the discovery sequence. As well, those nodes with memory, such as the couplers, can be configured to save messages.

With this structure, a source of information about a resource such as electricity, hot water, gray water, gas, water, replaceable parts, or other consumables, can request a change in the operation of the appliance based on the information. For example, if an electric utility is facing a brownout, a source of information about the electricity can request that an electric dryer not commence an operation for a period of time. Similarly, a source of consumables, such as filters or spare parts, can ascertain from an appliance the status of the consumable and send information about the timing and availability of replacement.

Figure 29:
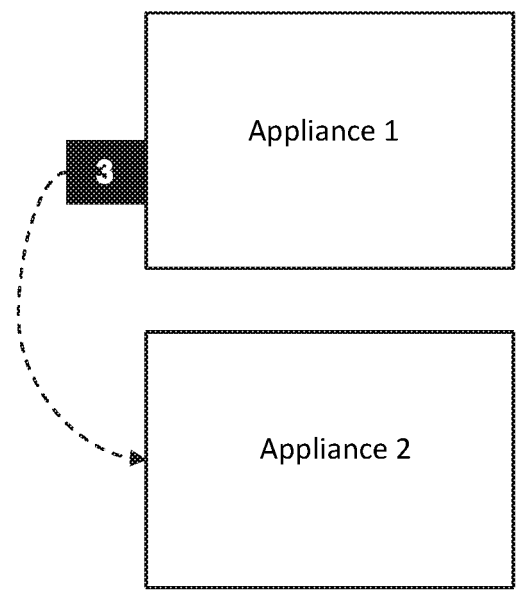
FIG. 29 is a schematic diagram showing the transfer of an operation cycle accessory between two appliances.

FIG. 29 illustrates the transfer of an operation cycle accessory between two appliances, Appliance A1 and Appliance A2. A removably coupled operational cycle accessory A3 has, as part of its data portion, data which is associated with an identifier of the appliance. In this way, when the cycle engine seeks data, it can include in its request an identifier which will determine the correspondence of the data retrieved from the data portion table for the identifier. With this capability, the operational cycle accessory A3 can be removably coupled with more than one appliance and is operable with as many appliances at the data portion table has identification support for.

Likewise, when an arbitrary software component configures the cycle engine through communications, the arbitrary software component can first interrogate, through useful communications, the appliance to ascertain its identification whereby that identification is used with the data portion table to retrieve the appropriate data about the cycle structure to be built. The arbitrary software component can then send messages to the API of the cycle engine to build the appropriate cycle data structure for the appliance.

Figure 30:
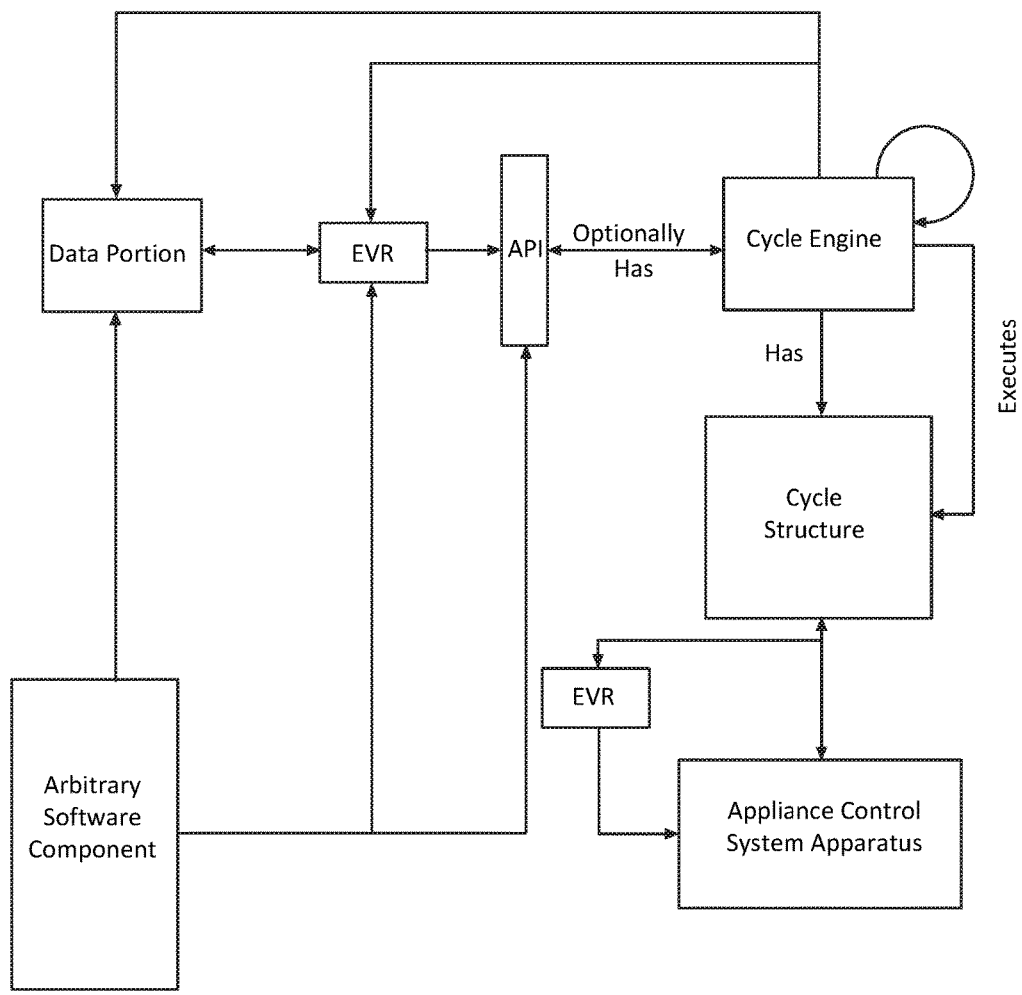
FIG. 30 is a schematic diagram showing the communications controlling the operation of an appliance.

FIG. 30 illustrates communications controlling the operation of an appliance. Here, message (1) between the data portion and the cycle engine enables the cycle engine to discover data related to the cycle structure to be created. The cycle engine proceeds to build the cycle structure at (2). Optionally all messages can be routed through an embedded virtual router at (3).

Alternatively, any client having an arbitrary software component can find or discover data about the cycle structure at (4). Then, the arbitrary software component can build a cycle structure in conjunction with the cycle engine, configured to receive configuration messages as at (5). As before, all messages can be optionally routed through an embedded virtual router at (6).

Figure 31:
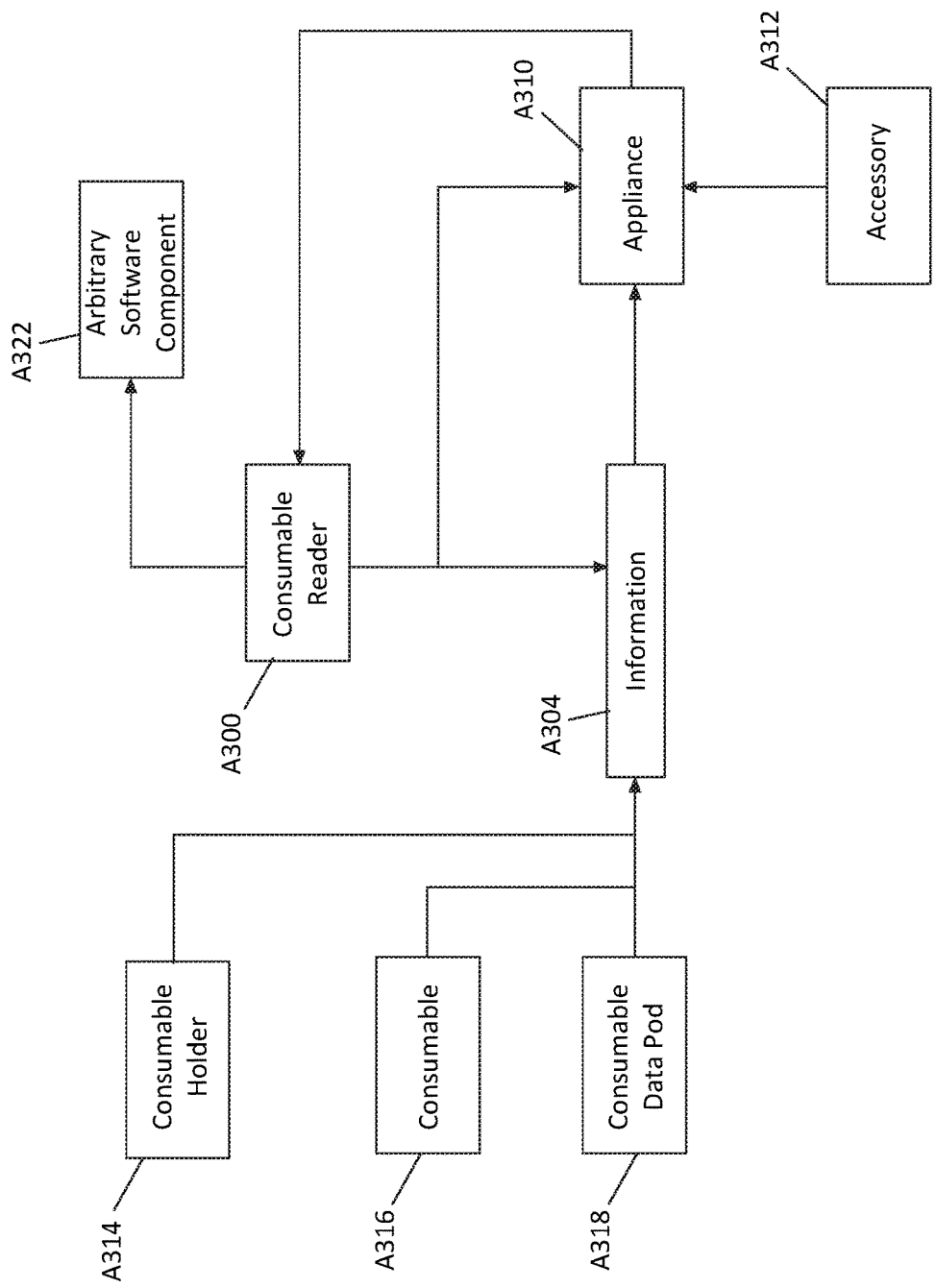
FIG. 31 is a schematic diagram showing the operation of a consumable reader.

Further explanation of the consumable reader accessory is found in FIG. 31. Here, a consumable reader A300 can be or be in communication with a smart coupler. The consumable reader enables communication of information A304 associated or related to a consumable A316 to any of the functional components of an appliance A310 or to another accessory A312 such as an operation cycles accessory as shown in FIG. 11. The consumable reader A300 is also preferably configured to receive feedback from the appliance or accessory.

Information A304 associated or related to a consumable can include data about the consumable itself, the data portion of a cycle structure, data about a response to a query message from the appliance or other accessory, commands associated with an operating cycle, parameters of an operating cycle such as personal preferences of a user (e.g., doneness or crispiness preferences) or environmental parameters (e.g., altitude), and data about the appliance, accessories or components thereof. The information A304 can also include the quantity of consumable pieces, quantity by volume or by weight, date of manufacture, manufacturer, data about its transit from manufacture, distributor, market, and consumer, data about the temperature during transit, nutritional information like calories, fat grams, % daily allowance of essential vitamins and minerals, a list of medical conditions under which a consumable should not be consumed, data about the relationship between the consumable and known diets, known medical conditions, and known reactions to known medications, and the like. The information A304 can further include appliance or component identifier data in accord with the messaging protocol of the software architecture.

The information A304 can be stored in a memory within a node internal to the appliance or within the consumable reader itself, or to removably coupled memory within the consumable reader or to a surface on consumable holder A314. A consumable holder can be an item such as a bag, a box, a carton, a bottle, a can, a bowl, a dish, a plate, or any other rigid or semi-rigid body suitable to contain a substance. The information A304 can also be stored in a removably coupled article comprising memory attached to a surface of the consumable holder or to the consumable A316 itself. The latter would be a consumable enabled to store retrievable information, e.g., food with information directly etched into the food using edible ink. The information A304 can also be stored in a consumable data pod A318 which is article comprising memory enabled to store retrievable information about a consumable. Preferably, the consumable data pod A318 is consumed by the process also operating on the consumable without degradation to the consumable or to the overall objective of the relevant cycle of operation.

In one embodiment, the appliance A310 or accessory A312 detects the coupling of the consumable reader A300, queries the consumable reader for the information A304, and creates an appropriate cycle data structure according to FIG. 11.

In a second embodiment, the consumables reader A300 is given or infers a start command by which it selectively retrieves data about an operating cycle, changes the mode of a software operating layer of the appliance, and commands the alternate software layer of the appliance according to the information to retrieve data about an operating cycle. Alternatively, the consumables reader A300 retrieves data about an operating cycle and establishes communication with the appliance A310 or accessory A312 and creates a cycle data structure. Regarding the alternative, the cycle data structure can be created in the memory of the consumables reader A300; or, the consumables reader A300 comprises an arbitrary software component A322 of an accessory which creates the cycle data structure by communication with the API of the cycle engine, using, for example a virtual router and also using discovery messages to establish a reference to the cycle engine's API through the virtual router.

In a third embodiment, the appliance A310 or accessory A312 selectively detects the coupling of the consumable reader A300, which is given or infers a start command. Upon the selected event, the cycle of operation of the appliance will be in communication with the information A304. This direct communication with the information is facilitated by the consumable reader acting as a smart coupler, or by memory within a node in communication with an executing operation cycle previously populated by the consumable reader acting as a smart coupler.

Further explanation of message binding may be helpful with respect to the incorporated disclosure of International Patent Application No. PCT/US2006/022420. The software architecture preferably can support and promote both asynchronous and synchronous data collection. Asynchronous memory polling, for example, is available in the Core API (API ID=A1). There are at least two available embodiments of synchronous data collection.

Understanding this disclosure related to synchronous data collection is helped by an understanding of the concept of bounded updates. Bounded updates are events that are grouped together as a snapshot of the appliance state taken during the same scan of the host microprocessor's Main( ) loop execution. The appliance control main loop will allow for an iterative update of feedback variables that are registered with the DAQ API (e.g., every A25 ms). Each registered variable is monitored and only those that change value according to their memory monitor change operator are broadcast as updates to the client. When updates are in the process of being broadcast, no new updates are allowed in order to preserve the snapshot in time.

In the first embodiment, a snapshot is communicated to the client using the MMP flag in Byte 2 of the software architecture 10 header as shown in the application protocol 28 in FIG. 4 of International Patent Application No. PCT/US2006/022420. While the MMP of 28 is true, more messages are pending for the snapshot. When MMP is false, the current message is the last message in the snapshot. Therefore, if the first message of a snapshot is the only message in that snapshot, MMP will be false.

The example in FIG. 9 of International Patent Application No. PCT/US2006/022420 illustrates a bounded command (Cycle+Temperature+MMP) with acknowledgements, followed by two consecutive bounded updates. Where bounded refers to elements of protocol which indicate to the receiver that more messages are coming from the source and that data processing by the application logic of the receiving component should be delayed until the bounding indicators of the protocol within the packet structure A28 (MMP bit A7) indicate a complete transaction at which time data processing by the application logic is permitted. The bounded command is shown by reference numeral A42 and the two consecutive bounded updates are shown by reference numbers A44 and A46, respectively. Notice that updates do not begin until bounded command execution is complete, providing the client the ability to filter away transient feedback data. Bounded commands are provided by the same mechanism, MMP found in A28, as bounded updates in order to provide applications a greater level of control.

The example of FIG. 9 in International Patent Application No. PCT/US2006/022420 is conceptual. The actual mechanism is MMP found in A28. However for illustrative purpose, the bounded command begins with an initial "begin" command initiator (MMP set) and includes commands to set a washer cycle to wash, a recipe status to ready, a water temperature to medium, again a recipe status to ready, and finally a cycle start indicator, followed by a command terminator (MMP unset). It can be noted that, in FIG. 9, updates (such as by eventing) are disabled to prevent updates from happening before the bounded command is complete. In addition, a "process command" indicator is shown periodically throughout the bounded command processing in the appliance A12 to illustrate the portions of the command issued from the client A16 through the internal communications network A14 are processed.

In the bounded updates A44, the updates are once again enabled (since they were disabled at the beginning of the bounded command A42) to allow the appliance A12 to report its status to the client A16. In the example shown in bounded updates A44, the acknowledgment state is shown to ready, the cycle is reported as wash, the state is reported as running, the basket is reported as fill, the pump is reported as on, and the temperature is reported as medium. Again, beginning and terminating indicators enclose the bounded update A44. These beginning and terminating indicators can be reported by use of the flag, MMP, in the application packet structure 28 as discussed in FIG. 4 of International Patent Application No. PCT/US2006/022420 or another method which would be apparent to one skilled in the art of network protocol.

In the bounded update A46, the basket is reported as agitate, the pump is reported as off and the motor is reported as on. Again, beginning and terminating indicators (MMP) enclose the bounded update A46. Without the beginning and terminating indicators (MMP), the client cannot deduce a relationship between the updates from the appliance. However, with beginning and terminating indicators (MMP), the client can deduce a relationship between the events.

Figure 32:
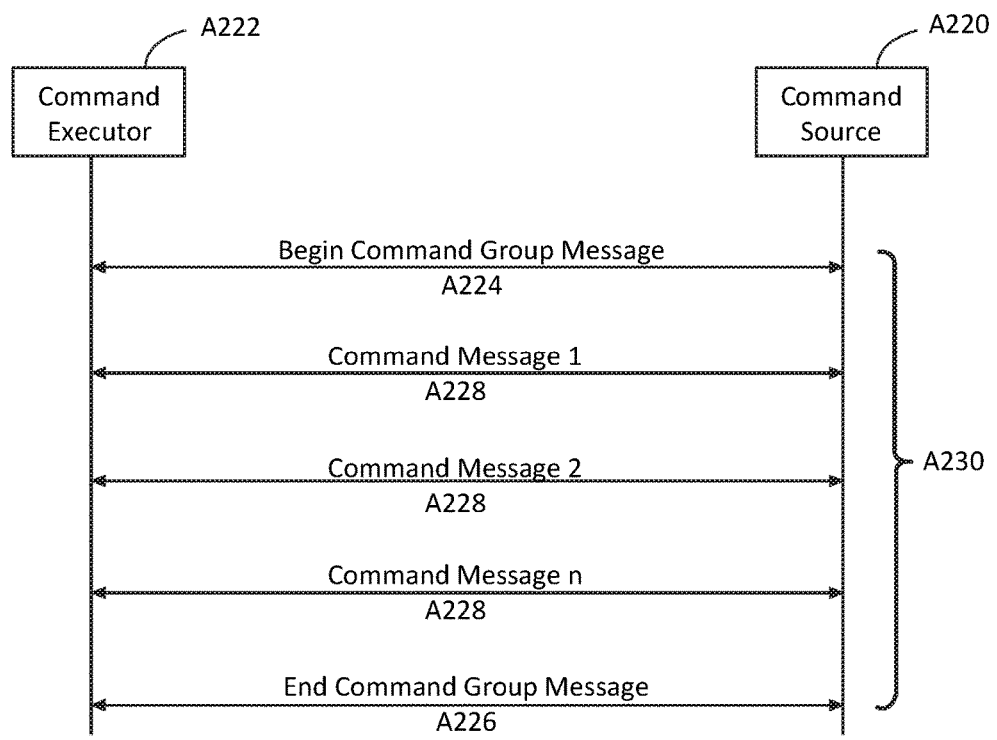
FIG. 32 illustrates synchronous data collection by binding messages in an event group.

The second embodiment of synchronous data collection is shown in FIG. 32. Generally, a node comprises at least a micro-processor, a memory, software, and circuitry coupled to a transmission media where the node is configured to take information from the memory of the micro-processor and, with the circuitry, produce a signal representing that information onto a transmission media. Two nodes in communication with each other could be two micro-processors on a single printed circuit board connected by a serial communications or two computers connected via the internet.

FIG. 32 shows an eventing software architecture for communications between one node, event source A200, and a second node, event observer A202. The software architecture contemplates the event source sending a message to the event observer about the event. Rather than sending a single message, however, the event source A200 can use a begin event group message A204 and an end event group message A206 to create an event group A208 from a series of individual event messages A210. An advantage of sending separate messages in this technique is that it more efficiently uses the messaging architecture in rapidly changing states of an appliance and minimizes the number of uniquely identified messages needed to express the state of an appliance. Without the begin and end event group messages, the event observer A202 cannot deduce a relationship between event messages A1, A2, through N. However, with the begin and end event group messages, the event observer A202 can deduce a relationship between the events.

Figure 33:
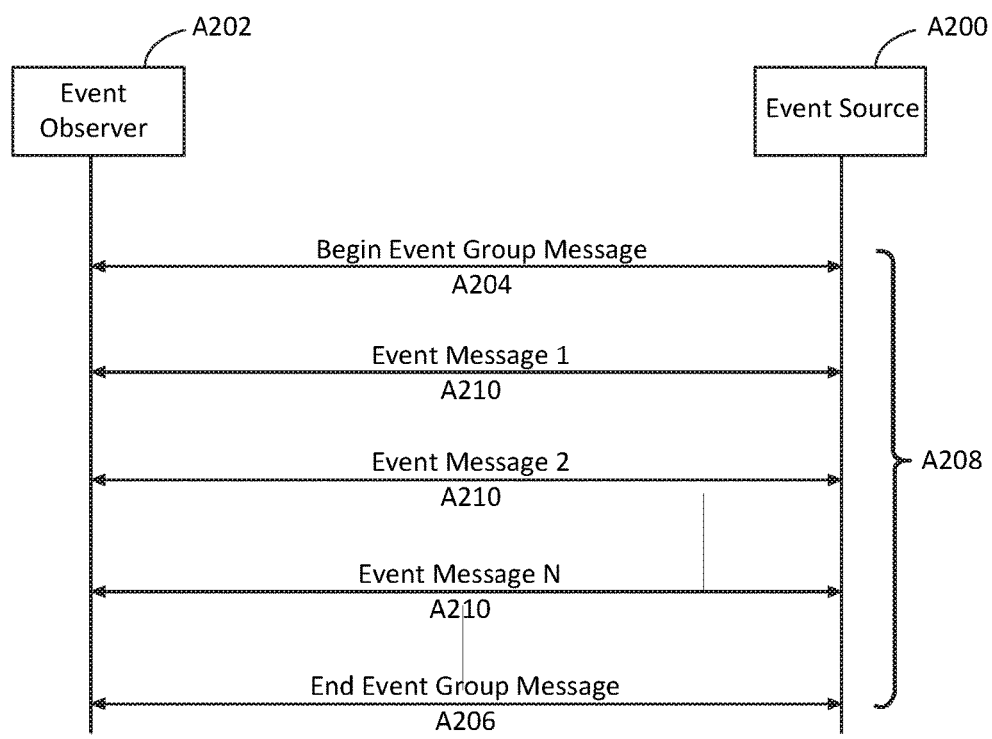
FIG. 33 illustrates the technique of FIG. 32 to bind command messages.

This technique can also be used to batch commands, as shown in FIG. 33. It is conventional for a command source A220 to send a complete command within one complete message to a command executor A222. This disclosure, however, contemplates using multiple messages to convey the elements of a command so that a command can be modular and can be composed by command elements. For this to work, the command executor A222 needs to know when to execute the command comprised of multiple command elements, each of which were sent as an independent single command message. This disclosure provides a solution by providing a begin command group message A224 and an end command group message A226, which inform the command executor A222 as to the which command elements belong together for the purpose of executing a plurality of command elements as a single aggregated command.

FIG. 33 shows how the command source A220, using a begin command group message A224 and an end command group message A226 bounding a series if independent command messages A228 can create a command group A230. Without a begin command group message A224 and an end command group message A226, the command executor A222 cannot deduce a relationship between command message A1, A2, through N. However, with the begin command group message A224 and the end command group message A226, the command executor A222 can deduce a relationship between the command messages A228. In message aggregation, whether data collection or batched commands, the MMP flag can be used to identify the beginning and ending of the message group.

Figure 34:
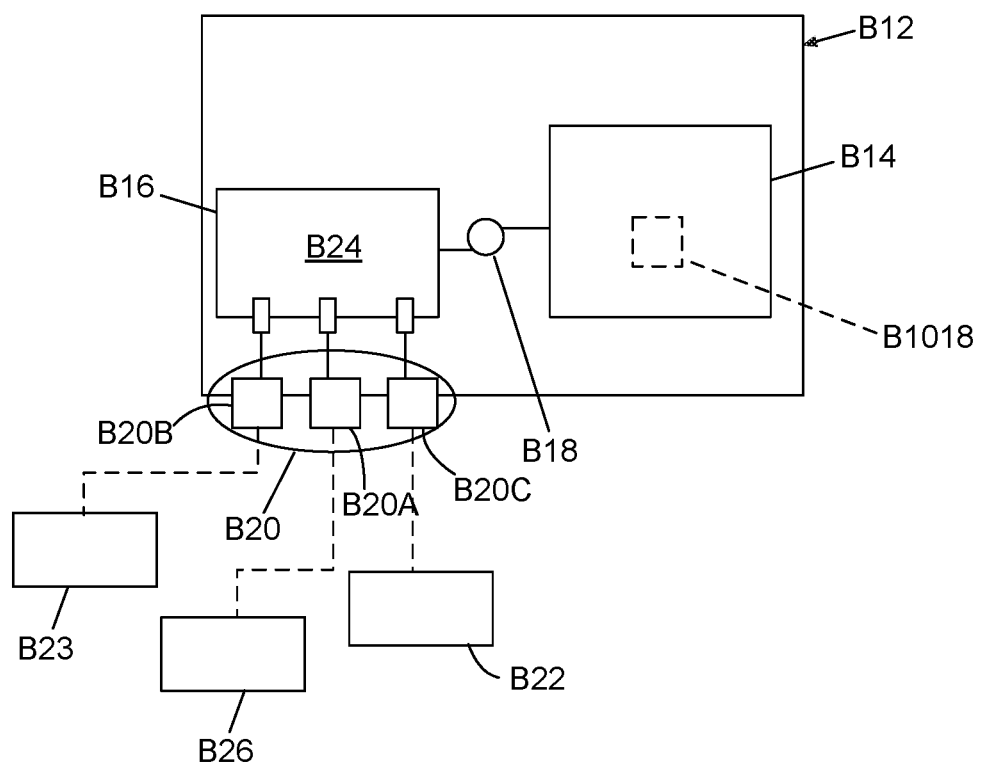
FIG. 34 is a schematic view of an appliance coupled to and comprising a consumable holder according to this disclosure.

Looking first at FIG. 34, an embodiment of this disclosure comprises an appliance 12 having a process control apparatus B14 and a consumable holder B16. The appliance 12 is configured to perform an operation on a physical article, such as clothing or food, using a resource such as water, temperature-controlled air (hot or cold), steam, gas, electricity, and the like. The process control apparatus B14 is configured to implement and control a cycle comprising at least one operation. The process control apparatus B14 can comprise one or more components, such as electronic control boards, wiring and wiring harnesses, power-supplies, sensors integrated with the electronics as digital or analog inputs, and actuators like valves, relays, heaters, and the like, any or all of which can integrate with the electronics as digital or analog outputs. Examples of appliances 12 that perform an operation on a physical article include a wide range of device types, including but not limited to, washers, dryers, ovens, ranges, steam cookers, ice makers, refrigerators, drink makers and the like. Articles are the objects upon which a user intends the appliance to perform its cycle of operation. Typical examples as mentioned above would include food and clothing.

The consumable holder 16 is configured to hold, carry, supply, communicate with, or otherwise interact directly with a consumable B24. When performing a cycle of operation on an article, the appliance 12 will often use at least one consumable B24. A consumable 24 in one sense comprises a substance, device, or other product that would be at least partially consumed or transformed by an appliance during a cycle of operation on an article, such that the consumable must be periodically replaced or replenished. The period after which the consumable must be replaced or replenished can be but is not limited to a single cycle of operation, multiple cycles of operation, an amount of time, or a number of uses. For example, many common washing machines require that a user place a single dose of detergent in a dispenser prior to initiating a cycle of operation. For each subsequent cycle of operation, the user must again place a single dose in the dispenser, as a single dose of detergent is consumed by the washing machine during each cycle of operation.

In some cases, the consumable can be the article on which the appliance 12 performs the cycle of operation, and the consumable can be subsequently consumed by a user. Thus, a consumable 24 also includes anything that would be consumed or otherwise used by a person, such as food, beverages, cosmetics, or medicine. For example, in a cooking or refrigeration appliance, the consumable can be a food item, and the cycle of operation comprises heating or cooling the food.

Consumables are to be distinguished from resources, although resources may in some circumstances be "consumed" during a cycle of operation. Resources are fluid or gas commodities that are continuously available to an appliance, and used by the appliance in its cycles of operation on articles. Typical examples as mentioned above would include water and air. In some cases, a resource may also be considered an article as in a refrigerator that chills and dispenses water. Water in that instance is a resource (continuously available to the refrigerator), but also an article (intended by the user for the refrigerator to act upon). The cycles of operation would include the chilling and dispensing. Things that hold or supply resources such as water supply lines or air conduits are not considered consumable holders B16. They would be "resource holders", which can be supplied by resource providers. In a refrigerator, for example, water supplied to the appliance 12 would be considered a resource and/or an article. If flavoring is mixed with the water supplied to the appliance B12, the flavoring can be considered a consumable B24, and whatever holds/supplies the flavoring to be the consumable holder B16.

Consumables are also to be distinguished from parts in an appliance, although parts wear out and need to be replaced or replenished as do consumables. Parts are devices, without which a cycle of operation by the appliance or a principal function of the appliance would be hampered. Examples include valves, actuators, switches, tubes, lamps, wiring, motors, pumps, seals, gears and the like. Consumables, one the other hand, are not critical to the operation of the appliance, although they provide huge benefits to a user of the appliance. An appliance can typically still operate on an article in some fashion without a consumable.

Other examples further illustrate the foregoing distinctions. Consider using an oven to cook a turkey in a roasting pan where there is a steam dispenser with a basting cartridge for automatic basting. The turkey is the article upon which the appliance (the oven) performs its cycle of operation (cooking). But the turkey is also a consumable in the sense that it is a food item to be consumed by the user. The basting cartridge would be a consumable holder and its contents a consumable. The water used to generate the steam is a resource, making the steam a changed resource. The roasting pan would be a second consumable holder, holding the turkey. In accord with this disclosure, the appliance or the roasting pan or some other device (such as a performance tag described below) might also hold information about the turkey or how to cook a turkey or how to cook a turkey in different kinds of ovens. Such information would be considered information about a consumable and information about a cycle structure.

Consider also a powdered detergent box with a performance tag configured to communicate with an appliance contemporaneously with the dispensing of the detergent to a washer. The washer is the appliance, the detergent is a consumable, and the box is a consumable holder. The performance tag can hold information about the chemistry of the powder, information about cycle structures, and data about cycle structures wherein the information and data are associated with other information comprising appliance types, fabric types, stain types, and the like so that the data and information can be used alone or combined with the other information to create a cycle of operation in response to the data and the information and the other information and in response to the user and the user preferences about the cycle of operation, the data, the information, and the other information.

Consider also a detergent pellet with an etched or embossed or imprinted cycle structure enabled to communicate with an appliance contemporaneously with being introduced into a washing machine before or during a wash cycle. Here, the washing machine is an appliance and the detergent pellet is a consumable. There is no separate consumable holder. The cycle structure is intended to effect the cycle of operation (washing). Consider also a detergent pellet having a data pod. The detergent pellet is a consumable, but the data pod is a form of performance tag that could communicate with an appliance contemporaneously with being introduced into the use environment for the purpose of effecting the cycle of operation.

In accord with this disclosure, a consumable or a consumable holder or a performance tag or data pod or anything that can hold and convey information (consumable information holder) might comprise one or more cycle structures. A first cycle structure can be associated with a first appliance or first appliance type and a second cycle structure can be associated with a second appliance or a second appliance type such that the appropriate cycle structures are introduced to the appropriate appliance or appliance type when the consumable or consumable holder is in useful communication with the appliances. For example, a frozen food (a consumable) or a package of frozen food (a consumable holder) might have cycle instructions for freezing, defrosting, or preserving cycles in a refrigerator or freezer appliance, and also might have cycle instructions for defrosting, cooking, or warming cycles for a cooking appliance like an oven or microwave.

A consumable information holder can comprise one or more user interface data sets, with or without cycle structures, which can be communicated to a user interface, such as might be on the appliance. User interface data is considered to include anything that can be rendered to be responsive to a user's senses, such a visual displays, audible sounds, and tactile displays. A first user interface data set can be associated with a first appliance or first appliance type and a second user interface data set can be associated with a second appliance or a second appliance type such that the appropriate user interface data are conveyed to a user interface associated with the appropriate appliance or appliance type when the consumable or consumable holder is in useful communication with the appliances. For example, a frozen food (a consumable) or a package of frozen food (a consumable holder) might convey to a refrigerator an expiration date to be rendered on a user interface on the refrigerator. The frozen food or its package might also convey to an oven serving suggestions to be rendered on a user interface on the oven.

Consumables, consumable holders, performance tags, data pods and the like (consumable information holders) can be enabled not only to provide data, but also can be configured to receive and store information associated with the consumable in accord with this disclosure. Exemplary information includes data about a consumable, a cycle structure, data about a cycle structure, tracking the number of times a shirt or a dish is washed, the number of cycles and the parameters thereof which have been executed by or in combination with an appliance and consumable holder, the types of consumables introduced into the use environment, information entered into an appliance user interface including cycle selections, usage patterns, user information, user identification, other data associated with the cycle of operation of an appliance, and any data held by a data source in communication with the holder, tag, or pod which either the data source writes to the holder, tag, or pod or any data or the holder, tag, and pod reads from the data source. Such information can be sequentially added to a database on the consumable information holder for later retrieval. For example, a shirt with a performance tag can keep data about how many times it has been washed, about different wash cycles it has been through, and the specific machines it has been washed in.

More specific examples of consumables 24 for use with/by appliances 12 include dispensing additives for laundry washers, dryers, or combination washer/dryer appliances. The additives can include, but are not limited to, normal detergents, gentle detergents, dark clothing detergents, cold water detergents, fabric softeners, chlorine bleaches, color-safe bleaches, and fabric enhancement chemistry. Non-limiting examples of fabric enhancers are additives to provide stain resistance, wrinkle resistance, water repellency, insect repellency, color fastness, fragrances, and anti-microbials.

An additive dispenser in this case would be a consumable holder 16 and can be a single load dispenser that dispenses all of additive contained therein during a single cycle or a bulk dispenser that dispenses only some of the additive contained therein during a single cycle. An appliance comprising a bulk dispenser can meter and dispense the correct amount of additive for each particular load and provide information to the user regarding the remaining amount of additive in the bulk dispenser after dispensing.

Because each additive can have different parameters associated with its use, information about each consumable can be provided with each consumable B24. This information can be provided on the packaging of the consumable 24 (the consumable holder), in the consumable B24, or by any other suitable means (performance tag, data pod, user interface, etc.). For example, different additives can have different concentrations, and the amount of a given additive needed for a particular load will vary depending on the concentration of that additive. The amount of a particular additive needed to complete a cycle of operation will also depend on the amount and type of laundry being treated, as well as the condition of the laundry (e.g. soil and stain level).

The amount, type, and condition of the laundry can be determined utilizing information supplied by the user, information gathered by sensors associated with the appliance, or information otherwise obtained during the operation of the appliance B12.

Additional information provided with the consumable can also be used to tailor the cycle of operation to that consumable B24. In a laundry application, the additive will have to be dispensed at the right time during the cycle, such as before, during, or after wash, rinse, spin, or drying. Particular additives can also require that they are dispensed under certain conditions, such as at a given water temperature or air temperature. Additionally, particular additives might require at least one additional step in a cycle for optimal performance. For example, the presence of a particular additive might require that the cycle structure be augmented by inserting an additional ordered collection of steps such as filling at a new temperatures to a new level after spinning, then soaking for an amount of time, then draining, then spinning for a new amount of time at a new spin speed between the original step in the cycle and the last step in the cycle.

The appliance process control apparatus B14 or the consumable holder 16 can determine parameters to be used for the cycle of operation or the structure of the appropriate cycle of operation or changes to an existing cycle of operation for different operations based on the information provided with the consumable B24, user input, and information obtained by sensors associated with the appliance B12. Exemplary types and sources of information are found in the following table:

Consumables can also include food, as mentioned above, and articles of clothing. Such consumables may or may not be contained by a consumable holder. However, non-contained consumables can still have consumable holder functionality in that they can comprise information about the consumable that is retrievable by the appliance. For example, a food item can carry information about itself that is contained in edible ink printed on the surface of the food item.

The appliance B12, the consumable holder B16, or both comprise at least one interface B18 to couple the appliance and the consumable holder to each other. The interface B18 can be an internal or external interface and can be configured to receive, connect to, or otherwise couple the consumable holder 16 and the appliance B12. One or more interfaces 20 can couple the appliance 12 and/or the consumable holder 16 to an external source or device, such as a power source, a consumable source and/or a consumable reader. Either interface B18, 20 can comprise any number of coupling points, such as coupling points B18A-B18F and 20A-20C for various purposes.

The coupling points in an interface B18, 20 can be configured for coupling to a consumable holder B16, an appliance B12, a component that can facilitate engagement or interaction with a consumable holder B16, or any other source or device to be used with the appliance 12 and/or consumable holder B16. For example, a coupling point 20C can be configured for connection to a consumable reader 22. Alternatively, the consumable reader 22 can be incorporated into the appliance B12, and a sensor can be connected to the appliance 12 and/or the consumable reader 22 via a coupling

| Information provided from the consumable or consumable holder | Information provided by the user | Information provided by appliance sensors |
|---|---|---|
| New Order Collection of Cycle Steps, Actions for Each Steps, a plurality of Transition Logic expressions for each step, and the relationships between steps, actions, and logic expressions. | Fabric type | Soil level |
| Additive type | Desired cycle | Load weight |
| When in cycle to dispense | Fabric type | Load absorption |
| Any special cycle parameters | Load size | Additive remaining in dispenser |
| Amount to dispense for a standard load | Fabric condition (soil level, stains, etc.) | Soil level |
| Special dispenser maintenance considerations | Dispensing compartment used | |

Another example of consumables contemplated by this disclosure includes filters used by an appliance B12. Refrigerators, dryers, washers, and dishwashers are all known to use filters that are consumed in the sense that they must be replaced after a certain amount of time or usage due to wear and dirtying of the filter. Filters, in particular, depending on the embodiment may be construed as a consumable, a consumable holder, or both. For example, if there is a filter assembly holding a filtering material, then the filter assembly may be considered a consumable holder and the filtering material can be considered a consumable because it is disposed of after it usability is consumed; its life and the life of the consumable holder are significantly different. On the other hand, the filter assembly and the filter material can be integrally formed and introduced and removed from the use environment as a unit. In this case, the assembly and the filter material would be considered both a consumable holder and consumable because the assembly and the filter material comprise functionality and attributes of both consumable holders and consumables.

point 20C. Further, a coupling point 20A can couple the consumable holder 16 to a bulk source B26 of a consumable B24, such as a large bottle of detergent. A coupling point 20B can also couple an external power source B23 to the appliance 12 or to the consumable holder B16.

Preferably, the appliance 12 and the process control apparatus B14 include software architecture 1018 enabling the appliance to discover a consumable holder 16 using network messages. For this purpose, the process control apparatus B14 can comprise at least one functional identifier and can send or receive messages to for the discovery of functionalities, as discussed later. Likewise, the consumable holder 16 can also comprise an instance of the software architecture 1018 and/or an SA Driver 1016, which will be discussed in more detail hereinafter with respect to FIG. 27.

Consumable Holder

The consumable holder 16 comprises a device that holds or contains a consumable B24. Typically the consumable 24 is contained by a receptacle of some sort, such as a container, a dispenser, a cartridge, a dish, a bag, a carton, a conduit, or the like. In some cases, consumable holders 16 can be nested within other consumable holders B16. For example, a cartridge holding a consumable can be disposed in a dispenser, which is another consumable holder B16.

In some cases articles on which the appliance operates—such as clothes, dishes, and food stuffs—may not be contained by receptacles and may not be consumables or consumable holders in the sense herein defined, but rather articles enabled to perform at least some of the inventive functionalities of a consumable 24 and/or consumable holder B16. An example of an article with consumable holder 16 capabilities is a shirt having a bar code thereon containing information that is directly readable by an appliance B12. The bar code can be, for example, on a performance tag. The appliance 12 can use data and/or information represented by the bar code for use in configuring and selecting the cycle of operation of the appliance. The bar code can be read by the appliance 12 while the shirt is being operated on contemporaneous with the cycle of operation.

A performance tag is an information holder either integrally formed or selectively attached to an article and adapted to maintain its integrity over the life of the article. For example, a performance tag for clothing would be adapted to maintain its integrity throughout the repeated processes of washing in a washing machine appliance, drying in a dryer, being cleaned at a dry cleaners, being ironed, being left in the sun, and being subjected to the impacts sustained during usage. Examples of impacts during usage for a shirt might occur during a soccer match where the shirt impacts the earth and other players at considerable speeds and forces repeatedly. Likewise, performance tags for dishes would be subjected to similar impacts, and similar wash and dry cycles from a dishwasher. Performance tags integrally formed with fabric items might be sewn in, glued in, woven in, stamped on, or printed on during the manufacturing of the article or by a home machine adapted to integrate the article and the tag. Performance tags integrally formed with dishware might be glued, stamped, printed, embossed, cast, molded, or otherwise formed during the manufacturing of the article or by a home machine adapted to integrate the article and the tag. Performance tags that are selectively attached to an article could be attached by sewing, gluing, pining, sticking, printing, embossing, or other like methods in the home environment for articles not specifically adapted for receiving a performance tag. Performance tags are constructed of any suitable material which can be used to hold encoded information about a cycle structure, a cycle structure, or information about a consumable, the description of which is contained herein. Examples of materials for holding the information include magnetic strips, bar codes, and images of encoded data including color patterns, shape patterns, plain texts, numeric identifiers, and the like. An appliance having a cycle architecture and being in communication with a performance tag (as for example by using a consumable reader) can optimize the cycle of operation in the appliance for the article in response to the cycle structure, data about a cycle structure, and/or data about a consumable held by the performance tag. Performance tags can either hold information or hold other information about how to find the information. An example of a performance tag that holds other information is a performance tag holding a URL wherein the data returned when invoking the URL is the information. Further, the appliance can alter or optimize the user experience further by providing information on a user interface in response to the cycle structure, data about a cycle structure, and/or data about a consumable.

A consumable holder 16 can be integral with the appliance B12, as for example, installed during manufacture and sold with the appliance, or it can be made and sold separately as an upgrade or addition. It can be disposed inside or outside or on the appliance. The interface B18 can comprise at least one coupling point to couple the consumable holder 16 to the appliance B12, and the interface 20 can comprise at least one coupling point to couple the appliance 12 to an external resource or device, or couple the consumable holder 16 to an external resource or device. A coupling can be a physical coupling or a coupling can be an electrical or wireless coupling. For example, a coupling 20 can comprise a scanner and an image to be scanned, such as a barcode. Any coupling point in the interface B18 can be configured such that the consumable holder 16 can be selectively or permanently coupled to the appliance B12. Coupling points can also be used to couple electronics in a consumable holder to a device such as a sensor or actuator, or to couple electronics in an appliance to a device such as a sensor or actuator. In certain embodiments, electronics in a consumable holder can directly couple the appliance to a device such as a sensor or actuator with the use of a coupling point.

Figure 35:
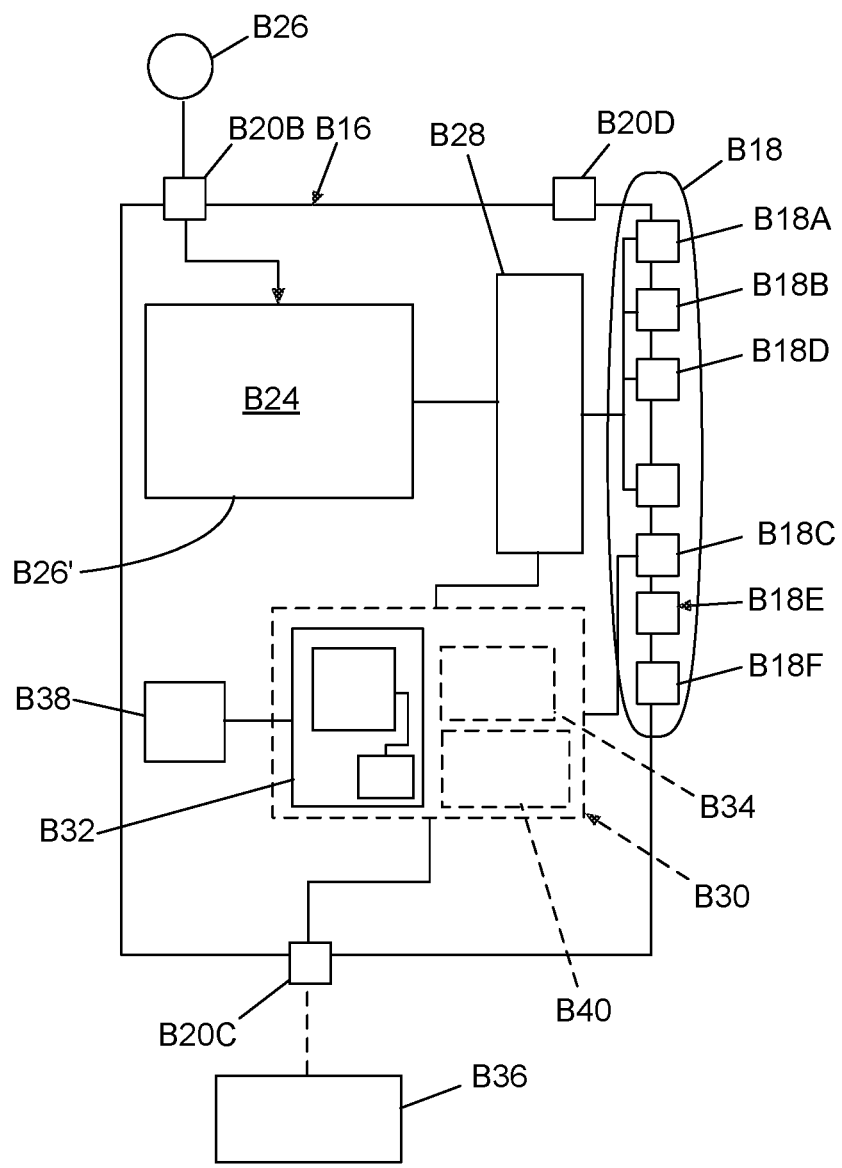
FIG. 35 is a schematic view of a consumable holder according to this disclosure.

Referring also to FIG. 35, the consumable holder 16 can be in the appliance as in FIG. B1, or separate from the appliance as contemplated in FIG. 35. Either way, the consumable holder 16 can be connected to the appliance 12 by at least one interface B18 comprising a plurality of coupling points B18A-F. The interface B18 is configured to communicatively couple the consumable holder 16 to the process control apparatus B14 of the appliance B12. Each coupling point can enable a different function. For example, a resource coupling point B18A can facilitate transmission of the resource to a consumable holder B16, a resource coupling point B18B can facilitate transmission of the resource back to the appliance B12, a data coupling point B18C can facilitate data exchange between the appliance 12 and a consumable holder B16, a consumable coupling point B18D can facilitate transmission of a consumable 24 to the appliance B12, and a circuit coupling point B18E can couple a circuit to a consumable holder 16 to trigger an actuator in the consumable holder 16 or in the appliance B12. Resource and consumable transmission between the consumable holder 16 and the appliance 12 will normally require a physical coupling. Data exchange and circuit coupling can require electrical connections, wireless connections, or optical coupling points. In another embodiment, a coupling point B18E can facilitate transmission of a changed resource from the consumable holder 16 to the appliance B12. A changed resource may be one whose properties have been changed by a chemical, thermal, electrical, or other type of process. For example a changed resource may be one that has been heated, cleaned, cooled, mixed with a consumable, or generally treated in such a way that it has at least one property with a different value.

The interface B18 can also include a power coupling point B18F. The coupling point B18F can deliver power to a consumable holder 16 or it can deliver power to the process control apparatus B14. Coupling point B18F can comprise a power connection adapted to transmit power to a consumable holder B16. The power can be conventional AC at 110 V, DC at 12 V, or even less, such as the power that is transmitted by a USB connection. In some cases, the data coupling point B18C or the circuit coupling point B18E can also function as a power source.

Continuing with FIG. 35, the consumable holder 16 has an internal source B26' and/or an external source B26" of a consumable B24, such as a reservoir, bottle, conduit, dispenser or bulk dispenser, cartridge, another appliance, another consumable holder, or a connection to a dispenser. The consumable holder 16 can also have its own holder process control apparatus B28 to control the dispensing or transmission of a consumable 24 from the source B26, B26', or B26".

Figure 45:
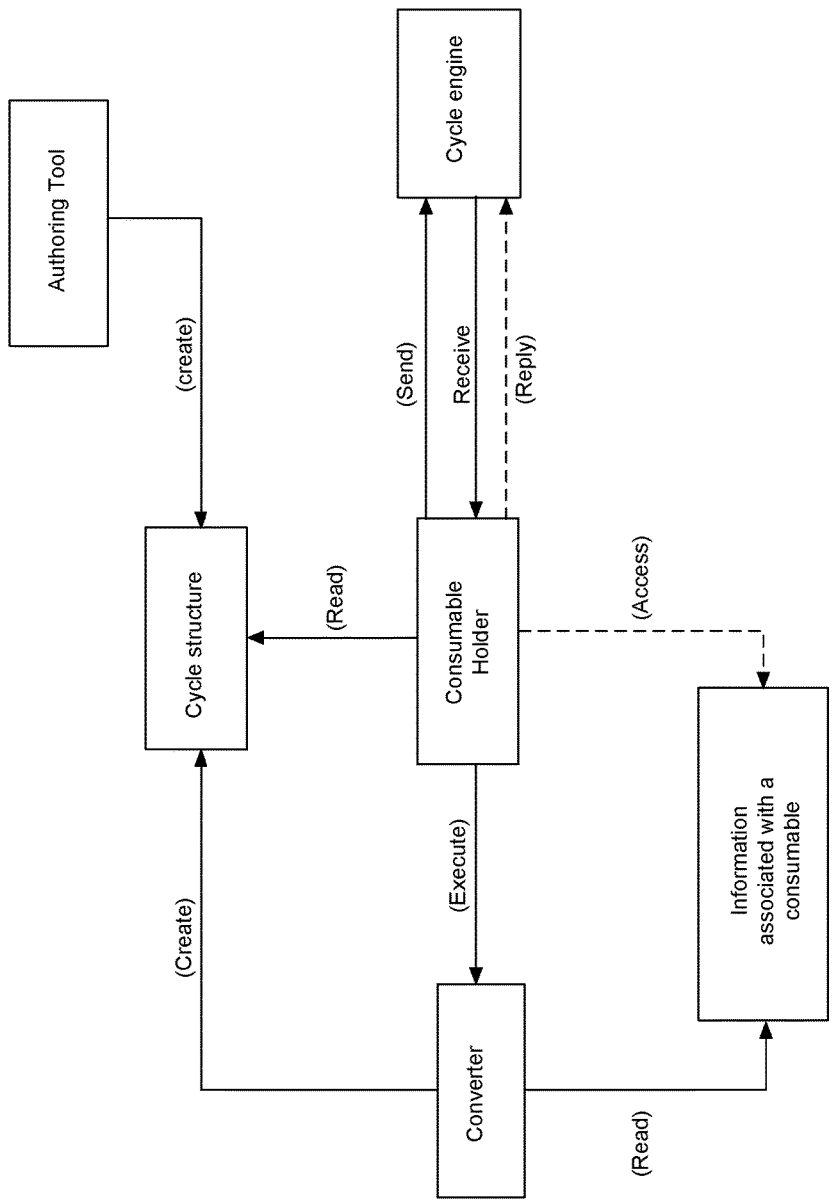
FIG. 45 is a schematic diagram of an example of the creation of a cycle structure for an appliance by way of a consumable holder according to this disclosure.

As discussed previously, the consumable holder 16 comprises resource coupling points B18A, B18B (which can be assimilated into a single coupling point) configured to exchange a resource with the appliance B12. The appliance 12 is configured to use the consumable 24 and the resource to perform a physical operation on an article. The consumable holder 16 may further comprise electronics B30 configured for communication with the appliance process control apparatus B14. The electronics B30 can affect a resource by communicating with the appliance process control apparatus B14 when the consumable holder 16 is coupled to an appliance B12. The electronics B30 can be configured to deliver a cycle of operation to the appliance B12. Alternatively, the electronics B30 can communicate with the software architecture 1018 for the purposes of observing the cycle of operation and modifying the cycle of operation. The electronics B30 may observe the cycle of operation using any of the data collection schemes (as disclosed in the incorporated WO2006135726) supported by the software architecture 1018. These data collection schemes include but are not limited to requesting data from the software architecture B34, receiving unsolicited events from the cycle of operation 1018, or by creating new events that can be received by communicating with a software architecture having a DAQ (as disclosed in the incorporated WO2006135726) and specifying the events to the DAQ for creation by the DAQ. In addition, the electronics B30 may alter the cycle of operation in response to the observations. In a first embodiment, the electronics B30 can alter the cycle of operation by requesting to the software architecture 1018 that the appliance process control apparatus B14 enter an alternate operating mode enabling the electronics B30 to directly control, partially or wholly, the cycle of operation. In a second embodiment, the electronics can alter the cycle of operation by making specific requests to the software architecture 1018. In a third embodiment, the electronics can selectively alter the cycle structure 71 using any of the techniques described herein (see descriptions of Figures B5 and FIG. 37) The electronics B30 can include a controller B32 and software architecture 1018 similar to that of the appliance 12 and/or a software architecture driver 1016. The electronics B30 can be powered by the consumable holder 16 or via connection to the appliance B12. The electronics B30 can further comprise a client B40. Client B40 can comprise a plurality of arbitrary software components, the software architecture driver 1016, an instance of the software architecture 1018, a converter as shown in FIG. 45, and any other software and data storage and data access functionality.

The consumable holder 16 can also have a consumable reader B36, similar to the aforementioned consumable reader 22, coupled to the consumable holder 16 by external coupling point 20C. In this case, the consumable reader B36 is communicatively coupled to the controller B32 and to the software architecture 1018. This enables information about the consumable 24 and/or about the consumable holder 16 to be read from a source of information and transferred into the memory of the controller B32 or into the memory at least one control board within the process control apparatus B14 wherein the transferring is preferably accomplished using software architecture 1018.

The consumable holder 16 can further comprise at least one coupling point 20D configured to couple with at least one other corresponding coupling point for resource/consumable transmission. Thus, coupling points can exchange or convey a resource, data, and/or a consumable 24 to an appliance 12 or to another external device. A coupling point can connect to a source of information about the consumable 24 and/or to a consumable reader 22, B36 and/or to a resource separate from the appliance B12.

The consumable holder 16 can have at least one sensor B38 to sense one or more attributes of a consumable 24 and/or its source B26. Attributes can include such things as amount, brand, type, composition, structural form, expiration date, dispensing properties, nutritional information, temperature, pressure, and concentration. To store and inventory such data, the consumable holder 16 can utilize the controller B32. Such information or data can also be conveyed to and/or presented at a user interface in the consumable holder 16 or the appliance B12.

The holder process control apparatus B28 of the consumable holder 16 can be configured to detect functionalities of the appliance B12, modify functionalities of the appliance B12, be controlled by the appliance B12, or otherwise exchange data with the appliance process control apparatus B14 of the appliance B12. The holder process control apparatus B28 can be used to actuate the transmission, dispensing, supplying, or usage of at least one consumable 24 by actuating a mechanical part, such as a valve, conduit, solenoid, sensor, actuator, spring, transmission, motor, or gear. Additionally, the holder process control apparatus B28 can be configured to modify properties of one or more consumables or resources such as temperature or a chemical property. For example, temperature could be raised by actuating a heater, and chemical properties might be changed by controlling a mixture of at least two consumables and/or resources by using a motor and an auger. Additional auxiliary functionalities not directly related to the actuation of consumables 24 can be enabled by the holder process control apparatus B28. The holder process control apparatus B28 can optionally include a mechanism to effect the use of a resource, such as an actuator for a valve.

The consumable holder 16 can receive resources from the appliance B12, act on the resources, and return the modified resources to the appliance. For example, in a washing machine or dishwasher, the consumable holder 16 can receive water from the appliance 12 and return that water to the appliance 12 as grey water or as water mixed with detergent. In this instance, detergent would be a consumable B24. The consumable holder 16 can thus export modified consumables 24 which have either been operated on by the consumable holder 16 or that have been operated on by the introduction of at least one resource. The consumable holder 16 can also dispense the consumable 24 directly to the appliance B12.

The client B40 in the electronics B30 can contain a data set linking the model of the appliance 12 or some other functional identifier such as a class id, or an API ID, type, and/or version to the plurality of consumables 24 that the consumable holder 16 can contain. The data set can further link any of these attributes to a plurality of cycles of operation for the appliance B12. The data set can also link cycle modification or cycle operation data or cycle structure data or data for response to a query message to various combinations of appliances B12, consumables B24, and selected cycles. The data set can alternatively be in the appliance B12. The data in the data set can be modified by a network message sent by a node on the network, such as the consumable holder B16, the consumable B24, or the consumable reader 22, B36.

Software Architecture

The software architecture 1018 enables the consumable holder 16 to discover one or more functionalities of the appliance 12 via messaging. The software architecture 1018 can also enable the consumable holder 16 to respond to discovery messages so that the appliance 12 can discover one or more functionalities of the consumable holder 16 or at least one characteristic of a consumable B24. The software architecture 1018 can be located in the controller B32, hard-wired into the electronics B30, located in a client B40, or accessed separately. The process control apparatus B28 can have at least one functional identifier known by the controller B32 and/or software architecture 1018, enabling the software architecture 1018 to respond to discovery messages with a response that contains data about the consumable holder process control apparatus B28. Generally, a consumable holder with a controller B32 and software architecture 1018 can initiate or respond to a plurality of discovery messages either to find or disclose information to a node on a network about a component associated therewith or the appliance.

By employing a software architecture 1018 that enables facile communication between internal components of an appliance and between an external component and one or more of the internal components of the appliance, various components and accessories, including a consumable holder according to this disclosure, can communicate with the appliance to expand the capability, functionality, and usability of the appliance, and particularly, an appliance that uses a consumable product during its operation, or otherwise operates on a consumable product. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, air purifiers and dehumidifiers, hot water heaters, water softeners, blenders, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include any component that participates in the operation of the appliance. Some of the internal components have a corresponding controller (main controller, motor controller, user interface, etc.), which can be a simple microprocessor mounted on a printed circuit board, and other components that have no controller. The components can comprise one or more devices that are controlled by the controller. Typically, the controller components in cooperation, either directly or indirectly, through other components, control the operation of all of the components and the associated devices to implement an operation or cycle for the appliance.

The software architecture can be implemented on and communicated over an internal communications network on the appliance. The internal communications network connects the various internal components of the appliance and can be considered a closed network. One example of the internal communications network used within the appliance is the WIDE network protocol, created by Whirlpool, Inc., the assignee of the present patent application. The internal communications network must at least address the physical layer of the OSI layered network model. Preferably, the internal communications network comprises all appropriate layers of the OSI model. The WIDE network protocol addresses the physical layer and at least some aspects of the Link and Transport layers.

The software architecture expands the communication ability of the appliance by adding upper layer functionalities to the network stack effectively creating a fully functional appliance network incorporating the necessary aspects of the OSI layered network model like fragmentation and message reliability and session management, certain object oriented functionalities like message routing using functional identifiers, discovery, and the like, and certain advanced routing features like message propagation across multiple networks where distributed routing tables are used to facilitate the message propagation across the multiple networks and certain other important functionalities like message binding, authentication of nodes, and message firewalls hereinafter referred to as "network." Within the appliance, the software architecture can, but does not have to, reside on each of the components that have a controller. Those components with the software architecture form a network node that can communicate with the other nodes. In other words a network as it relates to this disclosure is any system of collaboration between arbitrary software components, whether physical (shown for example in FIG. 27) or virtual (shown for example in FIG. 55).

The software architecture 1018 can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture 1018 can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture 1018, the internal components of the appliance are not only connected with one another, but the internal components can also be connected to one or more external components or a new internal component through the network. The external component and/or the new internal component have one, some, or all of the software architecture modules in resident. As a result, the external component and/or the new internal component can communicate with the internal components of the appliance and can also communicate with other external components having the software architecture.

The software architecture can be any suitable software architecture that enables communication between the internal components of the appliance and the external component and/or the new internal component or between components external to the appliance. An example of the software architecture is disclosed in Patent Cooperation Treaty Patent Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety, as published in WO2006135726. A related example is shown in priority document U.S. Patent Application No. 60/595,148, filed Jun. 9, 2005. All of the communications between components and accessories and/or any combination of components and accessories described in this application can be implemented by the software and network structures disclosed in either of these applications.

The software architecture disclosed in the aforementioned references can be implemented by providing one or more of the software elements of the software architecture at least on each of the components to be controlled and on the accessory. The software architecture is configured to generate a plurality of messages, with at least one of the software elements residing in each of the components and in the accessory and configured to enable transmission of at least one of the plurality of messages between the components and between the accessory and the components. The messages can be transmitted for bi-directional communication between components and/or components and accessory. The messages can include command messages that are used to implement a physical domestic operation cycle of the appliance. It will be understood that the consumable or at least the consumable holder can be considered a component on the network, for use in conjunction with the appliance having the software architecture.

Operation Cycles

An operation cycle comprises a set of physical actions that the appliance 12 executes in response to a cycle architecture for operation of the appliance. For example, a washing machine can have several wash cycles that depend on the type of fabric being washed or a size of a fabric load. Similarly, an oven can have several cooking cycles that depend on the type of food being cooked and the cooking process (e.g., defrosting, baking, self-cleaning). Typically, the appliance when purchased by the user has a set of operation cycles that can permanently reside in the appliance as firmware.

Referring again to FIG. 10, an operation cycle component 60 can store additional operation cycles, changes not originally provided with the appliance B12, or other information upon which a cycle of operation can be changed, and communicate with the appliance 12 such that the appliance can implement new, changed or additional operational cycles. An operation cycle stored by the operation cycle component 60 can also or alternatively include an updated operation cycle. The operation cycle component 60 can be any type of component, such as a hardware device that can plug into the appliance B12.

The operation cycle component 60 can be a smart coupler that can couple with both a personal computer and the appliance B12. See the discussion of smart coupler below. Any other suitable connector and/or communication method can be used. More particularly with respect to a consumable holder 16 according to this disclosure, the operation cycle component 60 can be the optional client B40 in or connected to the consumable holder B16.

With continued reference to FIG. 10, the additional operation cycles, changes to existing cycles, or other relevant information can be uploaded to the operation cycle component 60 in any suitable manner. For example, the operation cycle component 60 having the relevant data can be purchased at a retail store B62, or the information can be uploaded to the operation cycle component 60 at the retail store. Alternatively, the user can download additional operation cycles, changes, or relevant data via the internet B64. For example, the user can download additional operation cycles through a personal computer 66 and then upload the additional operation cycles to the operation cycle component 60 or the user can wirelessly directly download the operation cycles to the operation cycle component B60. In another embodiment, the user can develop custom additional operation cycles or changes on the personal computer 66 and upload the custom additional operation cycles or changes to the operation cycle component B60. In an alternative embodiment, additional operational cycles can be transmitted wirelessly from the personal computer 66 to the appliance 12 without using a separate operation cycle component B60, in which case the personal computer 66 may itself be considered the operation cycle component. The wirelessly transmitted additional operational cycles can be transmitted to an intermediate storage in the appliance B12. The cycles can also be authenticated by the software architecture or other methods to ensure that they are compatible with and appropriate for the appliance.

The operation cycle component 60 can couple with the appliance 12 in any suitable manner, such as through a direct hardwire connection or a wireless connection. Furthermore, the appliance 12 can implement the additional operation cycles, changes or relevant information directly from the operation cycle component 60 or the relevant data can be transferred from the operation cycle component 60 to the appliance 12 or to the consumable holder B16.

Returning to FIG. 11 illustrates a typical controller 68 or control board of the appliance B12, one or more of which can be connected on a network, and to which additional operation cycles can be provided by an operation cycle component B60. Appliances can have one or more control boards controlling the cycle of operation and the user interface as shown in FIG. 27 items 1010, 1012, and 1020. Among other things, the controller 68 will include a cycle architecture B69. The cycle architecture 69 differs from conventional operational cycle execution software. Conventional operational cycle execution software is determined wholly from compiled source code that cannot easily be separated into constituent parts or portions. The cycle architecture 69 is software that has two distinct portions, a cycle structure 71 and a cycle engine B73. The cycle structure 71 is a data or cycle structure portion representing a plurality of elements or components comprising an ordered collection of steps, separated from each other by transition conditions, with the actions to be taken during each step. Each element or component can have an identifier to enable replacement or merging of elements or components. The transition conditions are the conditions under which a selected step should transition to a next step in the ordered collection of steps. Transition conditions comprise arbitrarily complex logic expressions that must be resolvable to a Boolean value. In one embodiment, the logic of a Transition Condition is a composition of structures comprising operators connected to functions, other operators, variables, or constants and functions connected to other functions, operators, variables, or constants wherein the composition forms a composite which can be resolved to a Boolean during the cycle of operation. For example, a logic expression could start with a structure representing an "AND" wherein the "AND" is connected to one "OR" structure and a function "foo". The "OR" structure is then connected to a function "bar" and a function "domo". During the cycle of operation where a first step was separated from a second step by the Transition Condition, the first step would de-activate and transition to the second step when function "foo" returned a value of true and either functions "bar" and "domo" returned a value of true. Compositions of structures representing logic can be represented in data, which data can be converted into the composition of structures during or before the cycle of operation. Likewise, existing compositions can be modified with additional data. Using this data technique or another technique providing the same flexibility, a cycle architecture comprising a cycle structure further comprising a plurality of step transition logic expressions can be authored by an authoring tool, transmitted via network, encoded into a consumable or consumable holder, and used by a cycle engine to execute a cycle of operation. The cycle engine 73 is software that can be combined with at least one cycle structure 71 in the controller 68 for the execution of an operational cycle.

One advantage of a cycle architecture 69 partitioned into two components is that the cycle engine 73 can reside in a plurality of different appliance types, thereby reducing the cost and increasing the quality of the appliance types. A second advantage is that new appliance models or types can be developed using the cycle engine B73, thus avoiding the development time and cost of conventional operational cycle execution software, which is typically and historically developed specifically for each new appliance model and type.

Another advantage of a cycle architecture 69 is that it can be in communication with a cycle structure 71 over a network or within a runtime environment. This allows the logical architecture of the appliance to vary independently from the physical architecture of the appliance. In one embodiment, an embedded virtual router is used to provide a messaging layer between all components of the cycle architecture including a cycle structure 71 and the cycle engine B73. This allows the manufacture of the appliance process control apparatus B14 increased degrees of freedom with respect to the physical embodiment of the appliance process control apparatus B14 because the cycle architecture B69, when combined with an embedded virtual router, provides an adaptive function allowing the cycle architecture to route messages throughout the networks of the physical architecture without prior knowledge of the physical network or physical architecture.

Another advantage of a cycle architecture 69 using a cycle structure 71 and a separate cycle engine 73 is that the cycle structure 71 is portable, which allows it to be delivered to the cycle architecture 69 over a network, from a remote data source, from a local data source like flash memory, EE memory, or Read-Only Memory, or from an accessory, from a user interface configured to create a cycle structure, or from any source of information about a cycle structure or data about a cycle structure including data about a consumable. One example for delivering a cycle structure 71 is by the use of an operation cycle component 60 as shown in FIG. 10. This advantage provides upgradeability to the appliance operational execution software in a less obtrusive approach than that of conventional operational cycle execution software in that the operational execution software can be changed in whole or in part without a complete re-downloading of the whole execution software running on the controller B68.

Another advantage of a cycle architecture 69 using a cycle structure 71 and a separate cycle engine 73 is that the cycle structure 71 can be altered to any degree even after the appliance is installed and in use. This type of upgradeability can be delivered to the user in a variety of methods such as by authoring tools, cycle accessories, consumables with encoded cycle structures, network downloads, appliance user interface configured data, software patches and the like, or even by an operation cycle component B60. Conventional operational cycle execution software cannot be changed without a complete re-downloading of the whole execution software of controller B68. Further, conventional operational cycle execution software is configured to accept only parameters that vary the magnitudes of time, temperature, speed, and the like, or modify fixed actions within a fixed ordered collection of steps. By contrast, the cycle architecture 69 according to this disclosure is fully modifiable, allowing for new steps, re-ordered steps, new actions, new or modified transition conditions and the like.

The cycle structure 71 can be represented directly or indirectly. A direct representation of a cycle structure will provide an ordered collection of steps, transition conditions and actions, either logically or in an instructions set that can be interpreted by a cycle engine B73. An indirect representation of a cycle structure 71 will provide a set of instructions that will enable a creator, a converter, a compiler, or the cycle engine itself to build an ordered collection of steps, transition conditions and actions.

Whether direct or indirect, the cycle structure 71 can be represented in a plurality of data embodiments such as key-value pairs, XML, relational data tables, comma separated variable files, a hierarchical composite tree or graph, byte arrays, data packets, command objects, binary encoded data, data encoded as a programming language such as a C header file, text, scripts, serialized objects, and messages. Regardless of the embodiment of the cycle structure B71, the essential meaning and functionality will be interpreted to accomplish the same operational cycle execution on the controller B68. It is envisioned that a cycle structure 71 may be transcribed from one embodiment to another as appropriate during the authoring, distribution, and delivery of the cycle structure to the cycle architecture 69 on controller 68 without loss of meaning or functionality. It will be understood that data embodiments of a cycle structure 71 are transferable between and can be resident in a plurality of memory types including RAM, ROM, and Read-Write types like Flash, EE, RW, CDs, floppy disks, hard drives, portable memory thumb drives, external hard drives, and the like.

For an indirect representation of a cycle structure, a cycle structure creator can read a set of instructional messages, for example, and interpret them to build or create a cycle structure. Such instructional messages can be in the form of data packets for messages preferably in accordance with software architecture such as that of the incorporated WO2006135726. For example, the data packets can have routing information such as an enabling identifier, one example of which can be a functional identifier representing things like a cycle structure creator, a state, a transition condition, or an action. As well, the data packets could have a collection of command identifiers that are supported via a collection of Op ("Operation") Codes.

In an additional form of indirect representation, a cycle structure 71 can be the source data for automatically generated compilable source code, or the cycle structure itself may be formatted such that it is directly compilable by a compiler configured to create an executable program appropriate for the controller B68.

Yet another form of indirect representation can be a plurality of cycle parameters like time temperature, speed, fill amount and the like wherein the cycle engine or an arbitrary software component would receive the cycle parameters and convert them to a direct representation of a cycle structure 71 or portion thereof.

In another form of indirect representation, a cycle structure 71 can be represented as a script that is either compilable for the controller 68 or interpretable by a cycle structure creator or converter (see FIG. 45). A script can be created by a script authoring tool for introduction into the use environment in any of the disclosed embodiments. The script in communication with cycle architecture 69 is able to affect and change the state of the appliance control system as described herein.

For a direct representation of a cycle structure where a data packet is used to deliver information about a cycle structure, the data packet can comprise routing information and a direct representation of a cycle structure. The direct representation could be encoded into a byte array. The byte array could then be operated on directly from a cycle engine configured to interpret the byte array by decoding the byte array during the interpretation such that the data in the byte array could be interpreted as an ordered collection of steps separated by transition conditions having transition logic wherein each step comprises a plurality of actions.

Another example of a direct representation is the script is shown below. The script comprises information about the consumable and information about a cycle structure including references to functions, variables, memory locations, APIs and messages directly available or exposed through an embedded virtual router in the appliance controllers B68, information about credentials such as a password (not shown), and information about the script such as a CRC (not shown). The script can also comprise a set of basic instructions like operators like IFLESSTHAN. The cycle engine 73 can validate the script against the references making sure that the appliance controllers 68 can support the references called for by the script. For example GRILL could represent a software class having a set of functions that can be invoked if an instance of the class is available. The script statement $resource grill instructs the cycle engine 73 to associate the variable grill with the instance of GRILL wherein if the object already exist then the associating is one of referencing grill with GRILL and wherein if it does not, to instantiate GRILL and then create the reference from grill to GRILL. If there is no GRILL capability or functionality or there is not a GRILL class available, then the cycle engine 73 would reject the script and notify the user of the rejection using a user interface and prompt the user to manually specify the operating instructions for the appliance 12 using the user interface instead of the script. Other reasons that a script might be rejected include insufficient memory to hold or execute the script, non-existent references (shown as $resource or $var), unreadable script, and script that does not conform to its CRC, or non-credentialed script which is script that cannot be authenticated using the credentials of the script. The script comprises functionality enabling it to perform all essential functions as previously described in the embodiment of the cycle structure comprising steps, actions, transition conditions, and transition logic expressions. The statement RESOURCEACTION grill.turnOn is an example of an action. 'IFLESSTHAN time, 2000' is an example of transition logic evaluating to a Boolean value. LABEL1 and LABEL2 are examples of steps.

Figure 36:
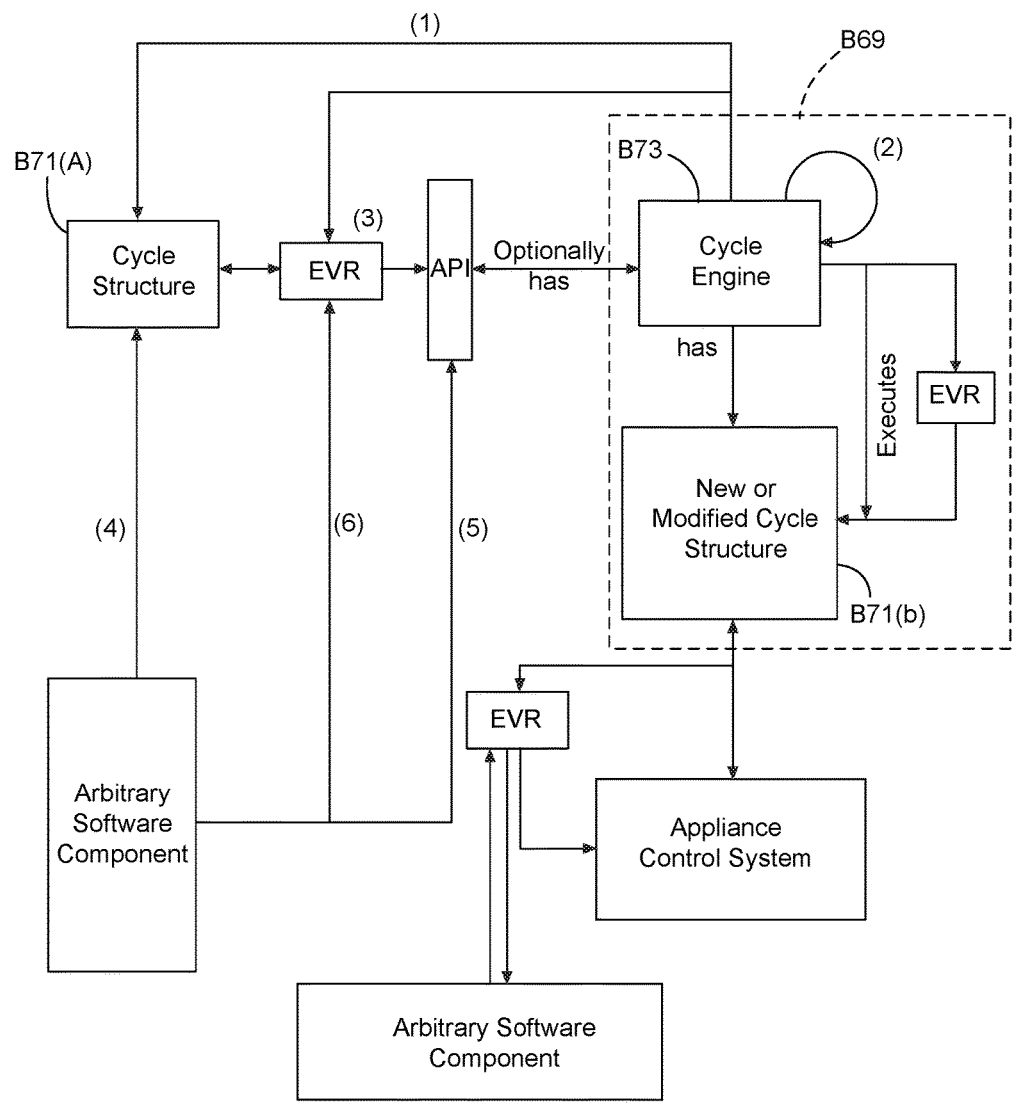
FIG. 36 is a schematic diagram showing the communications controlling the operation of an appliance.

Additionally, a script could comprise information identifying the plurality of appliances to which the script could be used so that the cycle accessory shown and described in FIGS. 29, 30, and 36 could hold a plurality of scripts each comprising the information so that the accessory could apply the appropriate script to the cycle architecture 69 when it establishes communication with an appliance.

```
+Header
exp-date: "09/09/09"
brand: "La Cucina Italiana"
advertising: "The taste of Italy in your mouth"
$var time,2
$var temp, 2
$resource timer, TIMER1
$resource cookbroil, COOKBROIL
$resource grill, GRILL
$resource temp-oven, TEMPERATUREOVEN
$resource ui, UI
$resource beep, BUZZER
+Behavior
RESOURCE ACTION timer.init,250
RESOURCE ACTION timer.start
RESOURCE ACTION ui.showAdvertsing, brand, advertising
LABEL1:
RESOURCE ACTION timer.getCounter
MOVE time, ANSWERACTION
IFLESSTHAN time,2000
GOTO LABEL1
RESOURCE ACTION timer.stop
RESOURCE ACTION ui.showCookingScreen, "Cooking Lasagna"
RESOURCE ACTION cookbroil.start, 400 F, 10
LABEL2:
RESOURCEACTION cookbroil.getStatus
MOVE temp, ANSWERACTION
IFNEQUAL temp, FINISHCOOKING
GOTO LABEL 2:
RESOURCEACTION ui.showCooking Screen, "Cooling down"
LABEL3:
RESOURCEACTION temp-oven.getTemp
MOVE temp, ANSWERACTION
IFGREATERTHAN temp, 200
```

```
GOTO LABEL3
RESOURCEACTION ui.showCookingScreen, "Making
it crispy"
RESOURCE ACTION timer.start
LABEL4:
RESOURCE ACTION timer.getCounter
MOVE time, ANSWERACTION
RESOURCEACTION grill.turnOn
IFLESSTHAN time,180000
GOTO LABEL4
RESOURCE ACTION timer.stop
RESOURCEACTION grill.turnOff
RESOURCEACTION ui.showCookingScreen, "Your
Lasagna is done. Wait for cooling it"
RESOURCEACTION timer.start
LABEL5:
RESOURCEACTION timer.getCounter
MOVE time, ANSWERACTION
IFLESSTHAN time, 120000
GOTO LABEL5
RESOURCEACTION ui.showCookingScreenDone,
"Your lasagna is done! Enjoy it"
RESOURCEACTION beep.longBeep
```

Figure 46:
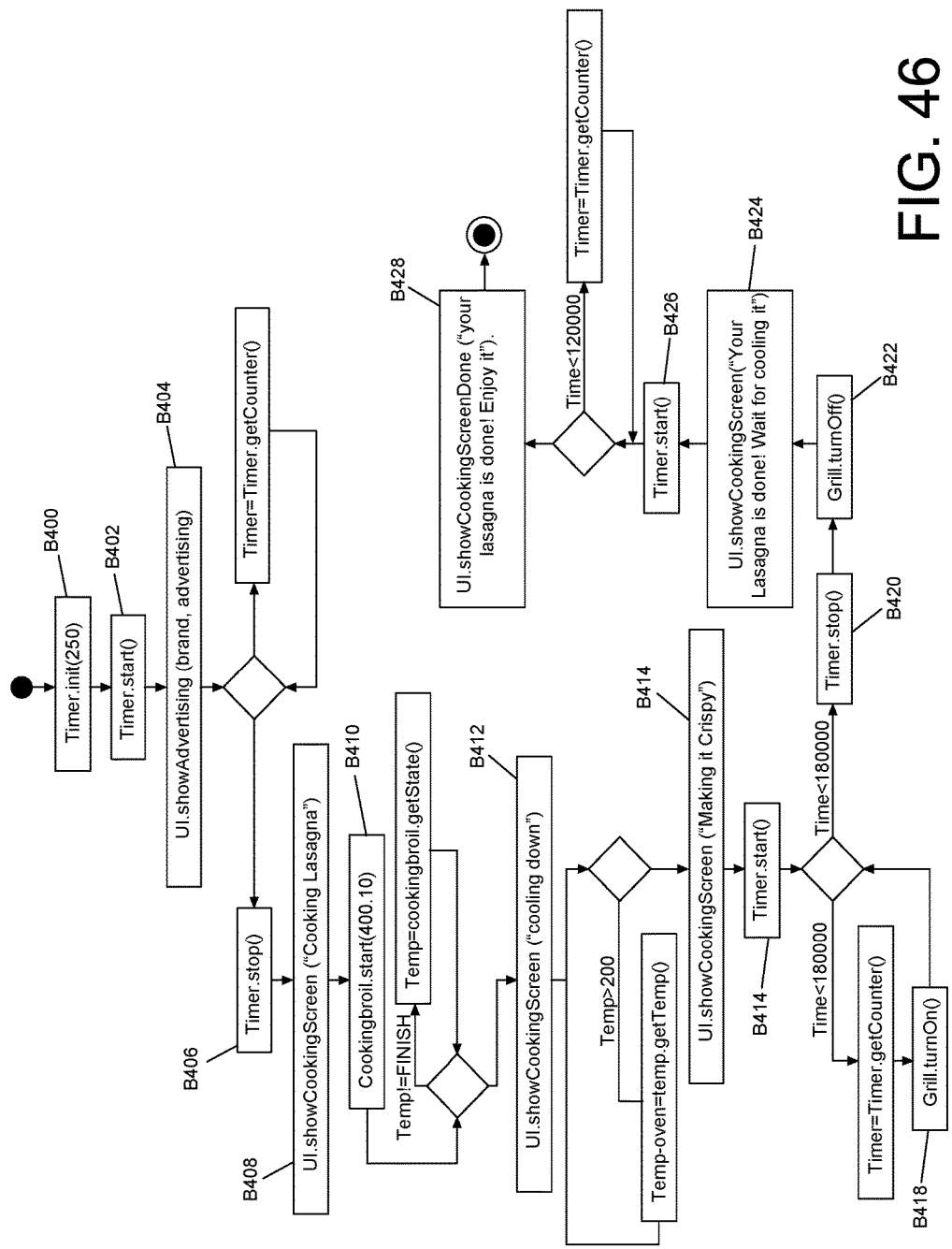
FIG. 46 is a flow chart illustrating the steps implementing a script according to this disclosure.

The functionality of the script is shown in FIG. 46 and is described herein. At steps B400, B402 and B404, respectively, a timer is set, initiated, and the brand and advertising defined in the script (here, "La Cucina Italiana" "The taste of Italy in your mouth" is displayed on the user interface (UI) for the defined time. At the end of the set time, the timer is stopped at B406, and the UI is instructed to display "Cooking Lasagna" at B408, while a cooking cycle (broiling) commences at B410. At the end of the cooking cycle (ascertained by temperature), the UI is instructed to display "Cooling down" at B412. At the end of the cooling down period (ascertained by temperature), the UI is instructed to display "Making it crispy" at B414 while the timer starts at B416 and the grill is turned on at B418. At the end of the set time, the timer is stopped at B420, and the grill is turned off at B422. The UI is instructed to display "Your Lasagna is done. Wait for cooling it" at B424. The cool down cycle is ascertained by a preset timer at B426, after which the UI is instructed to display "Your lasagna is done! Enjoy it." at B428 and the cycle terminates.

It is contemplated that a cycle architecture 69 can have multiple sources of information about and/or representing a whole, a part of, or a modification to a cycle structure and that each source may either be a direct or indirect representation and that each source may be embodied in a variety of memory types. According to this disclosure, the information about a cycle structure will be used to change a cycle structure in the appliance and thereby change an operation cycle of the appliance. The term "change the cycle structure" is contemplated to include creating a cycle structure, modifying a cycle structure, or accessing a whole or part of a cycle structure or a representation of a cycle structure.

It is further contemplated that the cycle architecture 69 may publish data about itself, its progress and information about the progress. For example, cycle architecture 69 can publish its current active step, conditions about the transition logic, elapsed time per step, total elapsed time, or sub-states of the steps, or sub-states of an ordered-collection of steps such as fault state, normal state, transitioning state, idle state, etc. The cycle architecture 69 may implement additional functionalities such as a software or network API allowing cycle architecture observers to register for notifications to receive the published data.

In a first embodiment, the cycle engine 73 is compiled software that communicates at runtime with at least one source of indirect or direct representation of a whole or part of a cycle structure B71(a) and builds or changes an in-memory cycle structure B71(b) where the memory is in communication with the controller B68. Once the in-memory cycle structure B71(b) is prepared, the cycle engine 73 finds the initial step, reads the step, executes the actions prescribed by the step, and begins evaluating the transition logic for transitioning to the next step, whereupon the process repeats in subsequent steps.

In a second embodiment, the cycle engine 73 is compiled software that communicates at compile time with at least one source of indirect or direct representation of a whole or part of a cycle structure B71(a) and builds or changes downloadable image comprising a cycle structure B71(b). Once the compilation is complete and the downloadable image is downloaded to the memory of the controller B68, the cycle engine 73 finds the initial step, reads the step, executes the actions prescribed by the step, and begins evaluating the transition logic for transitioning to the next step, whereupon the process repeats in subsequent steps.

In a third embodiment, the cycle engine 73 is compiled software that communicates at runtime with at least one source of indirect or direct representation of a whole or part of cycle structure B71(a) without building or changing a cycle structure B71(b). Once in communication, the cycle engine 73 immediately commences execution by continuous communication with the source whereupon it finds the initial step, reads the step, executes the actions prescribed by the step, and begins evaluating the transition logic for transitioning to the next step, whereupon the process repeats in subsequent steps.

In a forth embodiment, the cycle engine B73, uses a fetch and execute technique to conserve memory. In this embodiment, the cycle engine 73 is in communication with a source of information about a cycle structure B71(a) where a first memory comprises the source and a second memory comprises the cycle engine 73 so that the cycle engine can fetch portions of the information from the source and convert that portion to a form appropriate for execution by the cycle engine. In one example of this embodiment, the cycle engine 73 would fetch a portion of the information representative of future potential steps, transitions, actions, and transition logic expression or information that represents the information so that the cycle engine can expeditiously transition to the next step based on a step transition because the next step is already in the form appropriate without the latency involved in a memory read or network message. Contemporaneous to the step transition, a next portion will be fetched and the process of fetch and execute repeats.

It should be understood that all communications according to the embodiments may be accomplished using an embedded virtual router, gaining the advantages describe herein.

The cycle architecture 69 can be communicated, as well as be configured to communicate with a client to receive and send messages by routing information such as an enabling identifier, one example of which can be a functional identifier representing things like a cycle structure creator, a state, a transition condition, or an action. As well, the messages could have a collection of command identifiers that are supported via a collection of Op ("Operation") Codes. Preferably, the cycle architecture 69 of any embodiment will receive messages from a client allowing for changes to the cycle structure B71. Changes to a cycle structure may, for example, include the insertion or deletion of steps, additions or deletions to the actions of each step, or changes to the transitional logic between any two given steps. To accomplish such changes, identifiers must be associated with the components of the cycle structure such that the client messages can fully specify the exact desired modifications to the cycle structure.

The actions of the cycle architecture 69 cause the state of the appliance control system to change including, inter alia, changes to the appliance process control apparatus B14, a user interface, appliance software, and other components of the appliance like the screens on an appliance graphical user interface or some graphical component thereon. Other exemplary actions include changing the state of electromechanical actuators like relays, valves, and fans, and changing the state of user interface indicators like LEDs, buzzers, light rings, segmented displays, or graphics on a graphical LCD. Additionally actions of the cycle architecture 69 further comprise effects including hiding or making available user interface screens, making elements of screens visible, invisible, enabled, or disabled; changes to fonts, colors, size, or other attribute values of screen elements, changes to menu so that items could be enabled, disabled, added, and deleted, and the like. The devices to which the actions will apply may be represented as identifiable functions with a known controllable interface. As disclosed in the incorporated WO2006135726, physical devices may be modeled or virtually revealed in the software architecture ("SA") by an API ("Application Programming Interface") Id where their control interfaces are represented by a collection of Op Codes, each having associated parameters. This allows controllable devices or software components that control the controllable devices to expose themselves to the actions of a step as a message, such that location of the control software that can operate on a device or the control software providing controllable access to the device does not need to be known by the cycle engine B73. An embedded virtual router (EVR) can provide communications between the cycle architecture B69, controllable devices having a control interface, and software components that control the controllable devices (device drivers) wherein the router provides a messaging interface between the actions of the cycle architecture 69 and the devices and the software components that can implement that action regardless of where the devices or software components reside. This capability allows the cycle architecture 69 to interact with devices, appliances, and software including other cycle architectures that reside on a different controller 68 or in a different appliance 12 or in a different device in communication with the cycle architecture 69 such as any external client 1004 having either the software architecture 1018 or the software architecture driver 1016. "Software components" here means any software, algorithm, or logic directly or indirectly associated with the operational cycle of an appliance. Generally, all logic provides indirect access to the control of a device, but the meaning can extend to include any non-device oriented software like fragmentation algorithms, user instructions, network authentication services, and the like.

Routing information comprises identifiers allowing a sender to send a message to a receiver. Examples of identifiers which enable routing are network node ids which are identifiers identifying the address of either the sending or receiving node on any given network. An example of network node id is shown in the address byte of FIG. 11 (as disclosed in the incorporated WO2006135726). Another example of an identifier which enables routing is a network id uniquely identifying each network within a plurality of networks such that a sender could uniquely identify the destination (or receiver) of a message by with a network id and a network node id thereby allowing the network node ids on each network vary independently while maintaining unique addressability by the combination of network id and network node id. Another example of an identifier which enables routing is an Object ID and Method ID or an API ID and Op Code. These identifiers provide routing from the sending node to the receiving software module or object within the receiving node. These identifiers provide unique addressability within the software operating environment of a node. A routing table comprising a plurality of rows can be constructed having a combination of routing information identifiers in each row where each row represents a route. An additional unique identifier (a route id) can be added to each row identifying each route thereby providing the sender a convenient mechanism for sending information. An example of a routing table is shown here:

| Routing ID | API ID | Sub-Net ID | Sub-Net Node ID |
|---|---|---|---|
| 4 | 35 | 1 | 1 |
| 5 | 46 | 2 | 2 |

Software can be constructed allowing the sender to send information to a route id whereby the software with convert the route id to the appropriate routing identifiers such that the information is sent to the appropriate network and to the appropriate node on the network and to the appropriate receiving software module. In a further example wherein a sender on a first node communicates to a receiver on a third node via a second node, the second node can have a routing table linking, for example, the Object Id to another route id so that the message sent by the first node is appropriately propagated and routed to the third node by software on the $2^{nd}$ node using the routing table of the $2^{nd}$ node. Routing tables can be populated with routing information using the techniques described herein.

Figure 55:
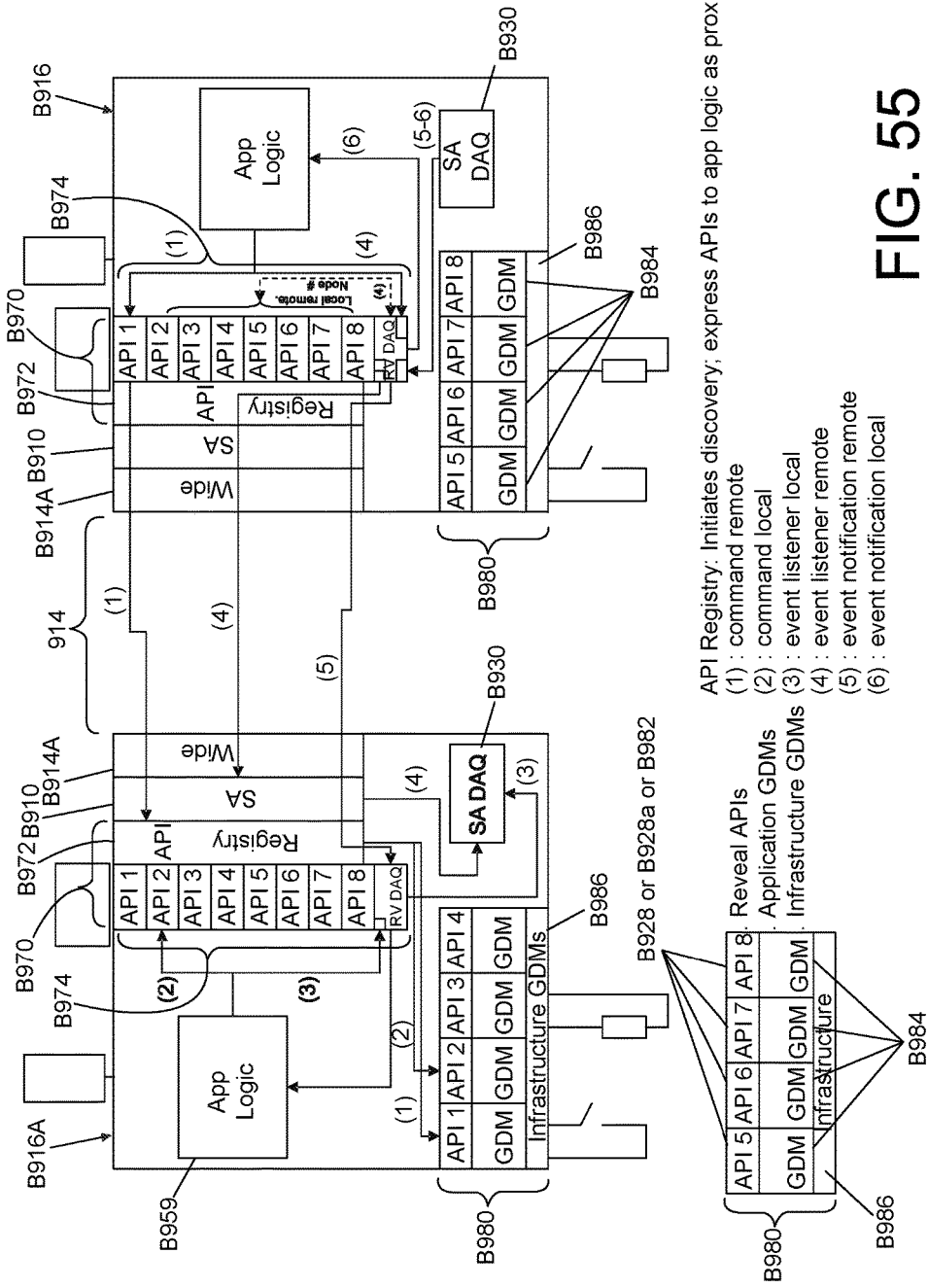
FIG. 55 is a schematic illustration of a pair of software operating environments, each corresponding to a different component with its own SA, and connected by the internal communications network.

The foregoing discussion of cycle structures will be helped by an understanding of an embedded virtual router (EVR) in this disclosure. FIG. 55 is a schematic illustration of a virtual router showing a mapping between a pair of software architecture implementations. The virtual router of FIG. 55 is a software design which encapsulates the API implementations (objects, see APIs B1-8 in each side of the router of FIG. 55) of the software architecture 10 such that the collaboration between an embedded client (application logic, algorithms, closed loops, sequencers, and state machines) and embedded components (the software architecture 10 API implementation: objects like defrosters, heaters, temp sensors, valves, etc.) is uniform and identical regardless if the entities collaborate over the network or share a runtime environment (the shared runtime collaboration being an example of a virtual network).

FIG. 55 shows six unique collaboration examples labeled as such illustrative of how a pair of software operating environments B916A existing on separate hardware components B916 and connected by a network B914 will use the various software components B916B of the software operating environment B916A to create transparent access between the operating logic of B959 and the software components B916B of both the right hand and the left hand software operating environments.

Prior to describing the collaboration examples, a description of the structure of FIG. 55 should aid in the understanding of the collaboration examples. Each software operating environment B916A contains representations of a sub-set of useful software operating components (916B) contained, including: the software architecture B10, internal communications network layer interface B952, a sub-component of the software architecture B10, the DAQ B930, and a hardware abstraction layer B980.

The hardware abstraction layer B80 comprises: a mechanism therein to encapsulate the particular fixed address of the connected electrical circuits on which the software operating layers of the hardware abstraction layer B980 will operate and software interfaces (928, B928A, or B982) encapsulating occurrences of B916B in the form of one of the following: the packetized representation (an ordered collection of bytes) of a message B928 exchanged by the software architecture B10, the packetized representation (an ordered collection of bytes) of a message exchanged by the software architecture B10 representing only the payload structure B928A (the valid data arguments) expected by the software operating component B984 or B986, or an alternate representation B982 of either B928 or B928A where the intent and data values and resultant actions are functionally identical but not of the form of an order collection of bytes. A unique software function B982 has arguments represented by individual named variables whose value is derived from B928A or represented by an ordered collection of bytes derived from B928A.

Application GDMs B984 are variants of B916B known as global design modules which are standard software operating components having been subjected to a standard development process including functional and non-functional requirements, testing, documentation, and implementation guidelines. Application GDMs B984 address appliance specific concerns such as defrosters, heaters, and door closure. Application GDMs B984 can be classified into at least two types of variants. The first variant contains specific application logic apart from the application logic B959 that is used to govern the behavior and gather information from a collection of other software operating components including a plurality of other GDMs B984, B986. The second variant contains specific application logic apart from the application logic B59 that is used to govern the behavior and gather information from a specific electro-mechanical device or sensor such as a heater, evaporator, motor, valve, solenoid, relay, pressure or temperature sensor. The second variant can be configured to address specific concerns made relevant by the specific manufacturer's variant of the device, by the particular configuration of the device based on the usage mode determined by the application requirements (i.e. scaling values), or by a confluence of factors which create specific concerns not mentioned heretofore.

Infrastructure GDMs B986 address specific recurring concerns which are independent of the application of the system architecture. They can be re-used across a plurality of appliances, examples of which include but are not limited to refrigerators, cooktops, dishwasher, dryers, and clothes washers. Infrastructure GDMs B986 can be classified into at least two variants. The first variant is associated with a particular concern resulting from a recurring combination of electrical components or electrical constraints. Some examples are: manufacturer interface constraints, device duty cycles, electrical load characteristics (such as inrush and steady state current limits), or other constraints such as the mode of analog-to-digital conversion such as 4-20 mA current loops vs. 0-5 Vdc analog voltage feedbacks. The second variant is associated with appliance- and application-independent software components known as utility functions. They provide logic used by other 9B916B components including B959 and B980. The second variant can contain or use references to the first variant of the infrastructure GDM B986. Examples include timers, zero cross detection, and other useful software components whose purpose is more utilitarian than driven by application or electro-mechanical requirements.

An embedded virtual router B970 provides an encapsulating layer by which architectural dependencies (the method by which one software component B916B is accessed by or exposed to another B916B (examples of B916B are B930, B984, B986) within or between at least two software operating environments connected by the network B914 alone or a combination of network B914 and other networks) between the application logic B959 (of the software operating layer B916A of the component B916) and the components comprised by the hardware abstraction layer B980, DAQ B930, another instance of application logic B959 or component therein, or any other useful component B916B are minimized or eliminated.

A software component B972 can be used by other software components B916B to obtain references to any other software components B916B where the obtained B916B may be part of a software operating environment B916A existing in or on: the same hardware component B916, a different hardware component B916 connected by B914, a different hardware component B922 connected by a combination of network segments including B914, or a different hardware component B916 of a different appliance 12 connected by B914, a combination of different network segments between the two occurrences of B12, and the B914 of the first appliance B12.

The software component B972 also provides the mechanisms for other software components residing within the same software operating environment B916A to publish the necessary identification and/or routing information into the memory of B972 to enable the aforementioned enumerated uses of the software component B972. The identification and routing information may be associated with components residing within the same software operating environment. Alternatively, the identification and routing information can be associated with components apart from the components residing within the same software operating environment but that are known by components residing within the same software operating environment.

Structures B974 in the memory of B970 are able to receive messages or provide functions for invocation of messages and are able to send messages or provide callback functions for the distribution of information. These structures have an access definition of a packet structure B928, a payload structure B928A, or B982 corresponding to an occurrence of a software component such as components within the hardware abstraction layer B980, application logic B959, or any other useful software component located in the aforementioned enumerations of B972 and the capability to route the information to that software component or to an appropriate intermediate software component having the same or similar purpose of B974.

Looking now at the possible collaboration examples, it is expected that the structures B974 of B970 will be created and populated based on discovery queries containing requests for access to specific software components B916B which are both identifiable and routable, invocations implying said access, or by software components B916B which are able to invoke on B970 on behalf of themselves or other components B916B resulting in creation and population of structures B974.

Collaboration 1: a command is issued by software component B959 of the right-hand software operating environment B916A and received by a software component contained in the collection of B974 with an identifier of API 1 within component B970 of the same software operating environment. Using the identification and routing information contained within B970, the component identified by API 1 transmits the received information through the other local software operating layers B10 and B952, and finally transmitted over B914 and received by B952 of left hand software operating environment. The message is then handled by software architecture B10 and routed to the appropriate component within B974 of the left hand software operating environment. The appropriate B974 of the left hand software operating component using identification and routing information contained within B970 of the same software operating component then invokes on or sends the message to the local implementation of API B1 contained in the left hand software operating environments hardware abstraction layer B980. Thus the application logic within software component B959 of the right hand software operating environment invoked a function implemented in the software operating environment of the left hand side without information contained therein for the realization of said invocation. Therefore, the value of the design implied by FIG. 55 is that application logic B959 is re-useable with respect to the location of the of the other software operating components B916B within a plurality of software operating environments B916A connected by a network B914 or a plurality of network segments which may include B914.

Collaboration 2: In this case, the initiation of the message is from B959 of the left hand software operating environment B916A. Illustrated is the case where the final invocation is on a software component (in this case API 2) within the same software operating environment using the same methodology described in greater detail in Collaboration 1. Therefore, in Collaboration 2, an alternative architectural disposition between an occurrence of Application logic B959 to some other useful software component (API 2 of hardware abstraction layer B980) is shown to have no effect on the implementation of either. And furthermore, it is the purpose of software component B970, also being able to comply with the Identification and interface requirements imposed by the software architecture B10, to provide this capability.

Collaborations 3-6 show additional uses for the embedded virtual router B970. The mechanisms used to accomplish these variants are the same as described in Collaborations 1 and 2. They are included to illustrate the usefulness of the design and the expected additional message patterns to be available with respect to the DAQ B930. Local event listeners (3) and remote event listeners (4) of application logic B959 are provided with an interconnection to a representation of the DAQ engine B930 providing not only a connection to the DAQ in the local software operating environment, but also to the DAQ(s) which reside in remote operating environments. DAQ generated messages based on the occurrence of DAQ events can be transmitted locally (6) and remotely (5) through mechanisms available in B970.

In addition to the six collaboration examples, a seventh collaboration example includes first and second arbitrary software components comprised within the application logic B959 where both the first and second arbitrary software components have identifiers and can be identified within the structures B974, which can comprise the routing table. In this collaboration, the first arbitrary software component sends a message to the second arbitrary software component by invoking a software function linked to a plurality of function pointers within the routing table (another example of using a virtual network, i.e., collaboration between arbitrary software components within a shared runtime environment). One of the function pointers of the plurality of function pointers links the message to at least the second arbitrary software component. Likewise, if there is a second instance of the second arbitrary software component residing in the application logic of B916, the first arbitrary software component function invocation may not change. In this case, the plurality of function pointers would include a pointer linking the invocation to routing information contained in the routing table. The routing information is necessary for enabling the message to be routed from the invocation to the receiving second instance of the second arbitrary software component.

It is preferred that the routing tables are populated by one of at least discovery confirmation messages, propagated discovery confirmation messages, manual configuration, semi-manual configuration, hard coded configuration software, and the software compilation process. It should be noted that using discovery messages to populate routing tables is the preferred embodiment. However, routing tables can also be populated using conventional configuration methods involving a manual or semi-manual configuration process, such as with the use of a visual configurator (see, for example, FIG. 53 and FIG. 54 used for another purpose). In addition, a manual or semi-manual configuration process can be used in addition to discovery generated routing tables. In this approach, the discovery process or the configuration process can incrementally add or delete routing information within a routing table.

The various techniques described above with respect to the use of the embedded virtual router B70 can also be applied in a variety of other network configurations in order to enable communication between objects in the system. Examples include but are not limited to enabling communication between two different arbitrary software components within an application logic B959, an arbitrary software component of an application logic B959 and an arbitrary software component of a hardware abstraction layer B980, any arbitrary software component of a first processor and any arbitrary software component of a second processor on the same component B916, any arbitrary software component of a first processor and any arbitrary software component of a second processor on different components B916 within an appliance B12, any arbitrary software component of a first processor and any arbitrary software component of a second processor on different components B916 in different appliances, any arbitrary software component of a first processor and any arbitrary software component of a second processor on different computers where the computers can be dislocated from one another but coupled via a network.

It should be understood that the arbitrary software components above are preferably associated with an identifier associated with the functionality of the software component (a class) and with an arbitrary identifier used as an object handle. A comprehensive namespace can contain unique identifiers for each arbitrary software component on the system. An exemplary namespace can create identifiers comprising a class ID including an API ID, an instance ID, and a type ID; and an object ID comprising a node ID and an instance ID. In another exemplary scheme, model number ID and serial number ID can also be identifiers in a namespace. Other namespace schemes can use any desired combination of identifiers to give each arbitrary software component a unique identifier.

Figure 56:
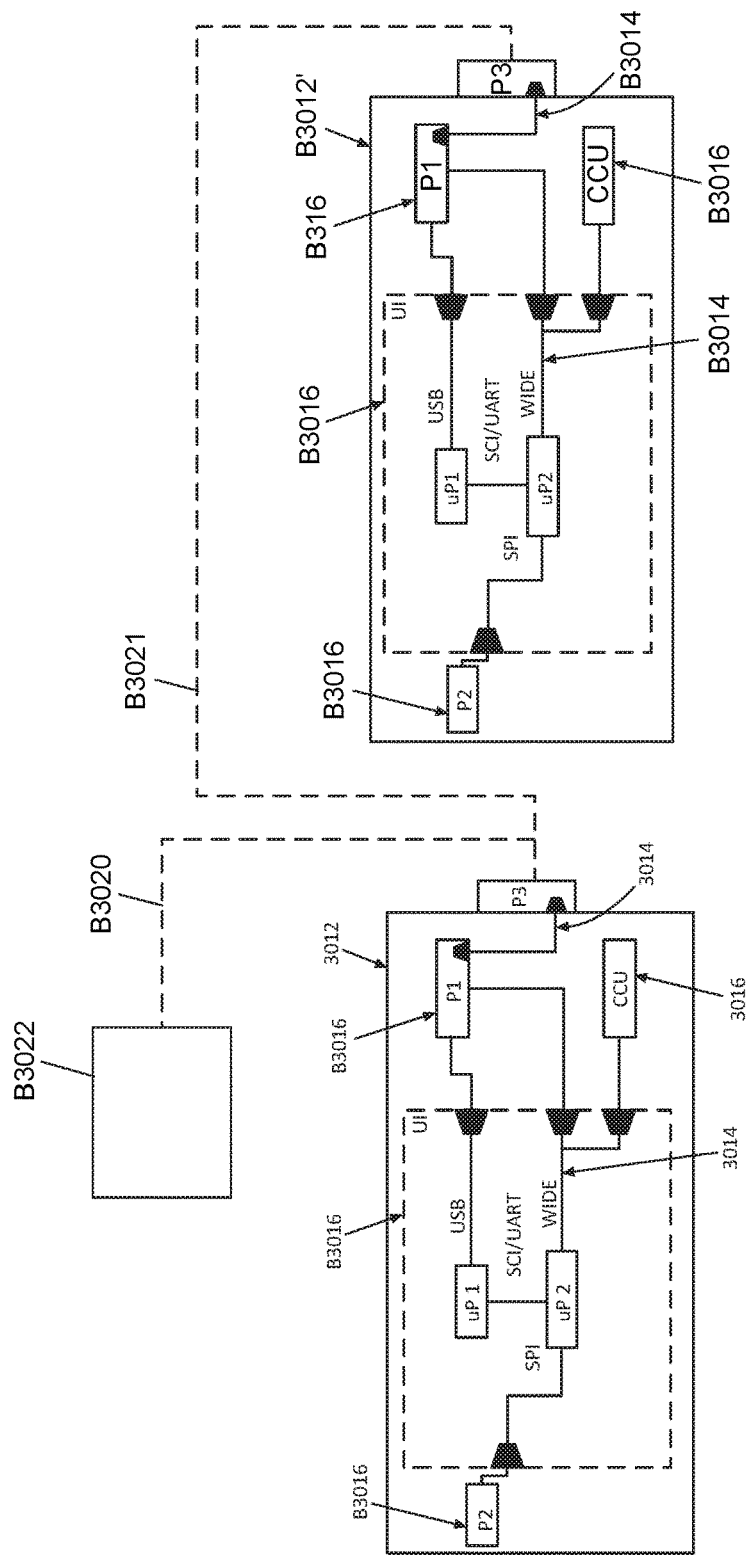
FIG. 56 is a schematic view of a network of appliances and clients connected on multiple networks by couplers.

FIG. 56 illustrates a network architecture comprising two appliances B3012, B3012' and a third party device B3022 of the type shown in FIG. 34. Each appliance has a plurality of nodes B3016 comprising, in this embodiment, a CCU, a user interface UI, and several peripherals P1, P2, and P3 in communication with each other by a local network B3014. Each peripheral can be a circuit board which may or may not have at least one microprocessor. On the UI board, there are shown two micro-processors uP1 and uP2, connected by a serial communication bus which is different from B3014. The UI board typically has multiple network connections on USB, WIDE, and SPI networks. The third party device B3022 may be able to send messages. Alternately, the third party device B3022 may send messages in the form of a taxonomy dataset. In the latter case, the peripheral P3 could contain a taxonomy architecture which could create well-formed commands. The appliances B3012, B3012' communicate with each other over network B3021 and the third party device B3022 communicates with the appliances over network B3020.

Figure 57:
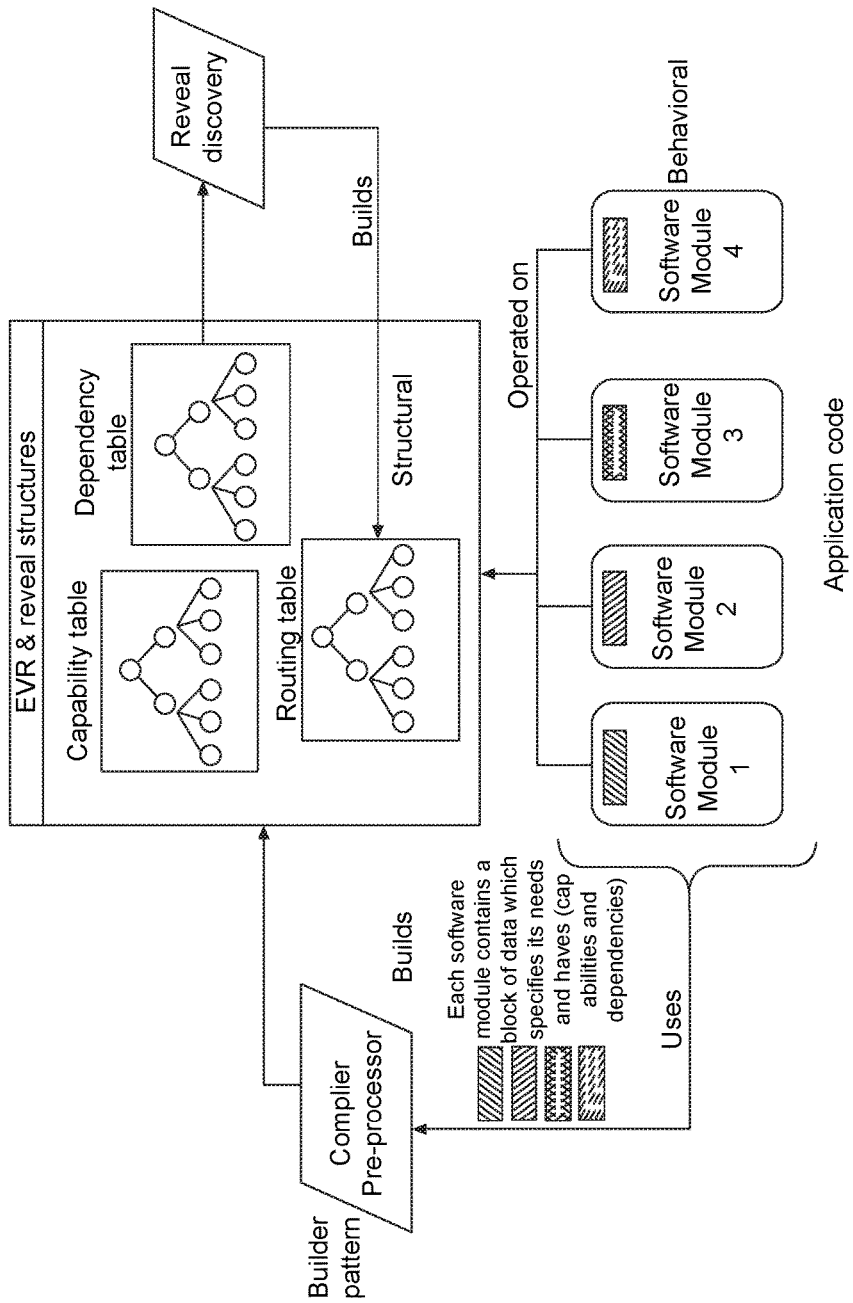
FIG. 57 is a schematic view of a process of creating main structures of an embedded virtual router.

It will be seen in FIG. 57 that messaging can occur among microprocessors on the same board connected on a network different from B3014. As well, messaging can occur between boards B3016 on at least two networks where the networks are not of the same type. Further, messaging can occur between appliances B3012, B3012' between boards B3016 carried on at least three networks where at least one of the three networks is a network external to the appliance. Yet further, the third party device B3022 can communicate with nodes implementing SA or nodes that can route messages to a node implementing SA in accord with this disclosure.

It will be understood that the architectural characteristics of a network configuration normally impact the implementation of the arbitrary software components which communicate within the architecture. By "architectural characteristics", we refer to the distinctive features of individual networks, the way the various boards B3016 are interconnected, and the combinations of network routes interposed between connected boards B3016. An embedded virtual router in a processor on a board B3016 in accord with this disclosure will enable the arbitrary software components in that board B3016 to communicate independently of the architectural characteristics of the associated networks.

An advantage of an embedded virtual router according to this disclosure can be seen in an appliance having a plurality of useful arbitrary software components, each providing at least one useful consumer benefit. Since different consumers typically prefer different combinations of features, it has been a long standing problem in the appliance industry to be able to supply only the sub-set of specific features that an individual consumer would prefer. Typical approaches include (1) providing multiple appliance models or SKUs, each with a unique feature set, and (2) providing an appliance with the superset of features insuring that the customer can have all the available features. Both are costly because arbitrary software components in appliances are hardware dependent; at a minimum, software for a board controlling a device in an appliance must be reworked for use in a different appliance, even if it is the same or similar device. This disclosure provides a third, more cost-effective alternative. With the use of an embedded virtual router according to this disclosure, all arbitrary software components are independent of one another with respect to their architectural location. An appliance manufacturer can thus provide a user-specific capability for an appliance at much lowest cost by providing an external client having any combination of arbitrary software components that can be purchased separately as part of an external accessory, but with full capacity to participate in all forms of useful communication with other arbitrary software components within the appliance because of the embedded virtual router.

Assume, for example, an appliance with three possible features: (a) a door switch, (b) an LED, and (c) an LCD, either or both of the LED and the LCD to indicate the state of the door switch. All versions of the appliance will have a door switch. But some will have only an LED, some will have LCD, and some may have both an LED and an LCD. With the prior art, the manufacturer has to provide three software architectures: one for communication between the door switch and the LED, one for communication between the door switch and the LCD, and one for communication among the door switch, the LED and the LCD. With an embedded virtual router according to this disclosure, designer need only have software architecture for the door switch and an embedded virtual router. An accessory can enable the door switch in any version of the appliance having an embedded virtual router to handle communication with any combination of LED and LCD, without further software architecture.

For another example, assume an appliance with three controller circuit boards, each having a feature. If a manufacturer sought to save costs by combining two features on a single board, any costs savings would have be adjusted by the added cost of reconfiguring the software architecture on the third board. A software architecture with an embedded virtual router according to this disclosure would enable such a change without the necessity of reconfiguring the software architecture.

Figure 58:
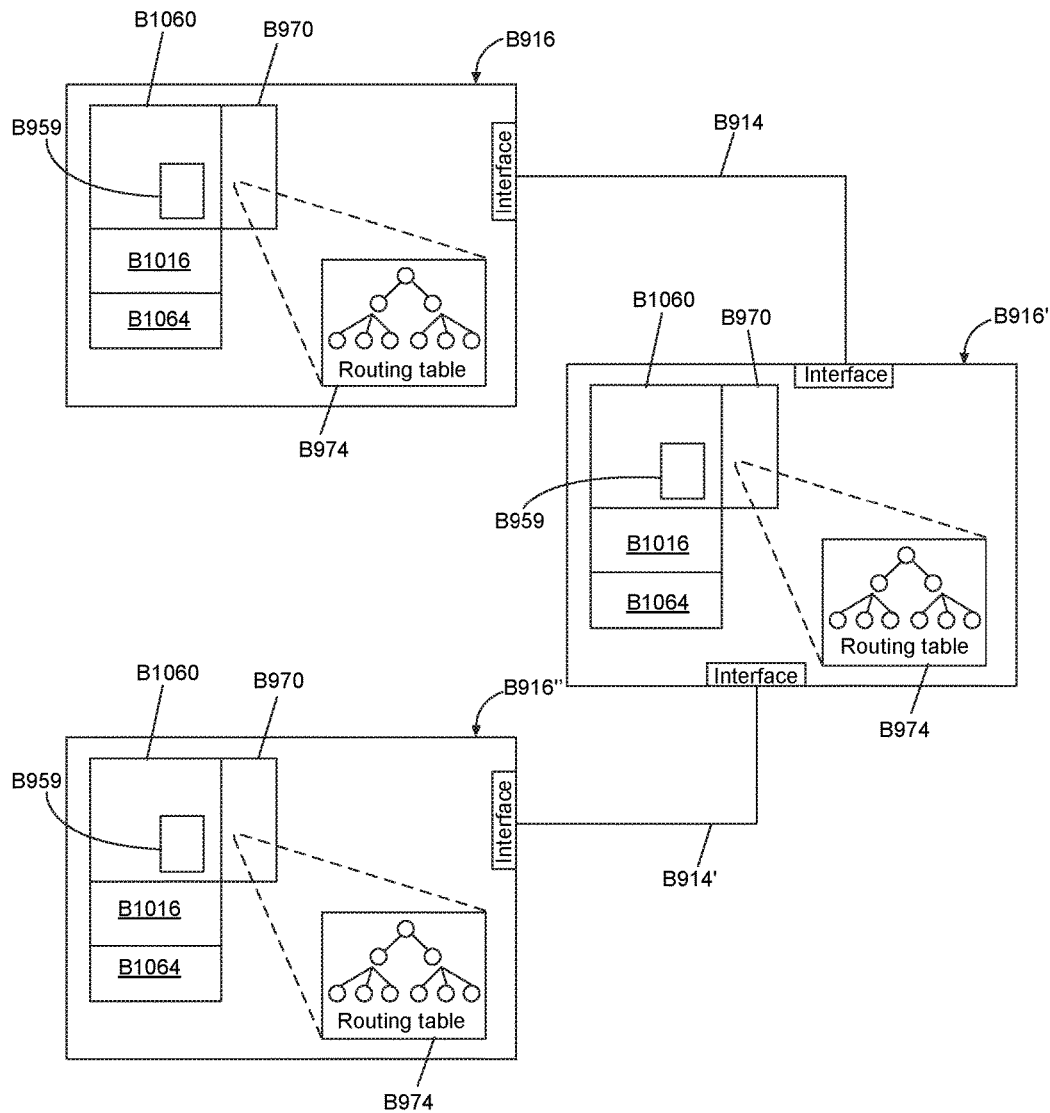
FIG. 58 is a schematic view of a plurality of hardware components that are communicatively connected using chaining.

FIG. 58 illustrates the process of creating the main structures B974 of the embedded virtual router B970 (see FIG. 55). The three main structures B974 comprise a capability table, a dependency table, and a routing table. Each software module operating over the appliance network or among appliances and accessories contains its own capability and dependency information. The compiler pre-processor executes a set of EVR builder macros at compile time to create a capability table and a dependency table (that may be in composite form) for the downloadable software image. Reveal Discovery completes the process by populating the routing table. Although FIG. 57 shows the creation of the dependency and capability table on compiling, all can be created at runtime. The routing tables simply inform the application layer how to 'get to' other software specified in its dependency list. Routing tables are populated based on a first set of software modules stating a set of "needs" in the dependency table and a second set of software modules stating a set of "haves" in the capability table. For "needs, the implementer specifies what software modules (classes) are needed by this software module. For "haves", the implementer specifies what software modules (classes) are available.

FIG. 58 illustrates how the embedded virtual router B970 can enable different hardware components B916, B916', B916" to be virtually chained together. This virtual chaining enables messages to be sent from the application logic B959 of a first hardware component B916 to the application logic B959 of a third hardware component B916" without the first hardware component B916 having to know anything about the route that a message will have to take by using structures B974 contained in each component's embedded virtual router B970. Each hardware component B916, B916', B916" includes at least one arbitrary software component, e.g., software components 1060 (see FIG. 27). Each hardware component B916, B916', B916" also includes an SA driver 1016 and a WIDE driver 1064 (see FIG. 27). Network B914 connects the first hardware component B916 to the second hardware component B916', and network B914', which is a different network from network B914, connects the second hardware component B916' to the third hardware component B916". Routing tables comprising the information on the structures contained in the memory of the first hardware component B916 and of the second hardware component B916' of FIG. 57 are used to encapsulate the complete route from the first hardware component B916 to the third hardware component B916". This enables a message to be sent from the first hardware component B916 to the third hardware component B916" without the first hardware component B916 having knowledge of the route between the second hardware component B916' and the third hardware component B916". The message can be propagated such that a first message is sent from the first hardware component B916 to the second hardware component B916' while a second message is sent from the second hardware component B916' to the third hardware component B916". In this manner, the routing information necessary to route the message from the first hardware component B916 to the third hardware component B916" is contained in part within each of the first and second messages.

Figure 59:
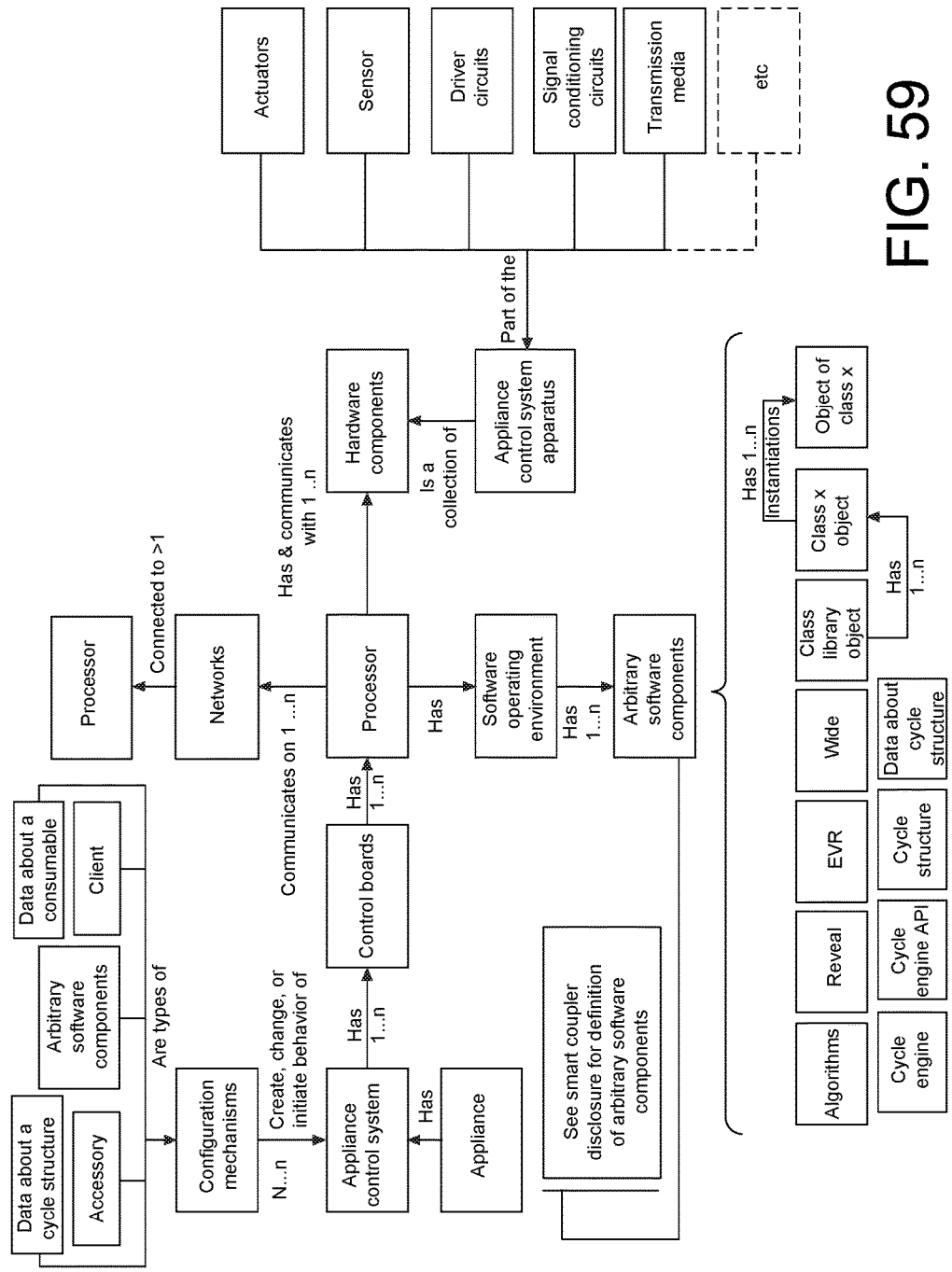
FIG. 59 is a schematic view of relationship between structural components within an appliance control system.
Figure 60:
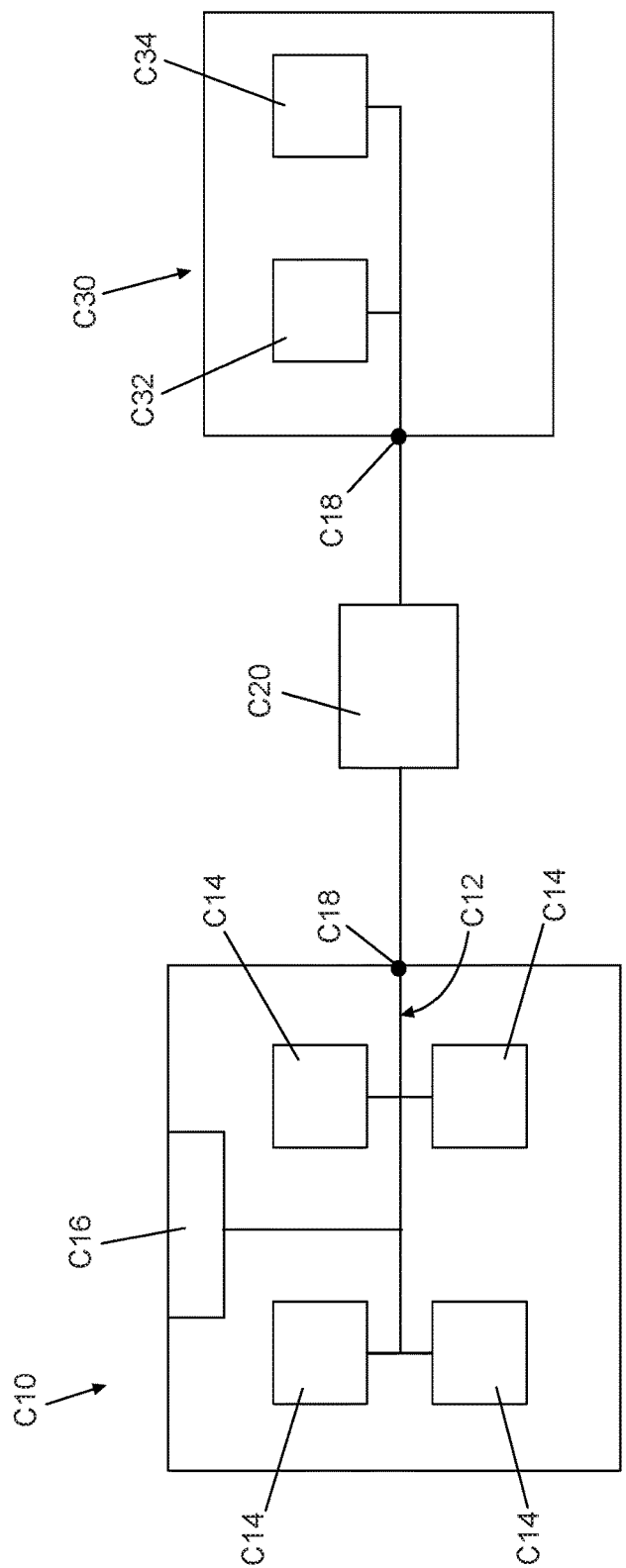
FIG. 60 is a schematic illustration showing a household appliance having an internal communication network connected to a smart device according to this disclosure.
Figure 61:
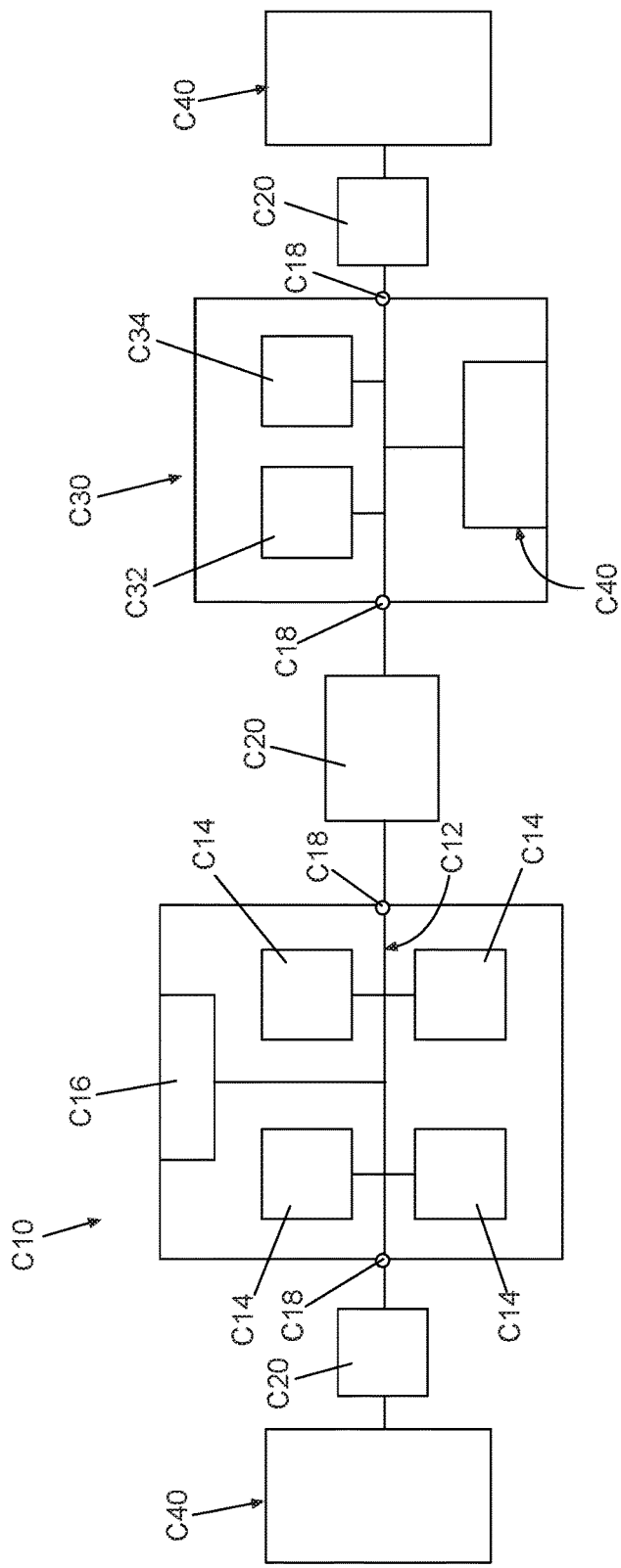
FIG. 61 is a schematic illustration of the household appliance and the connected smart device of FIG. 60 and further incorporating a plurality of connected demo devices.
Figure 62:
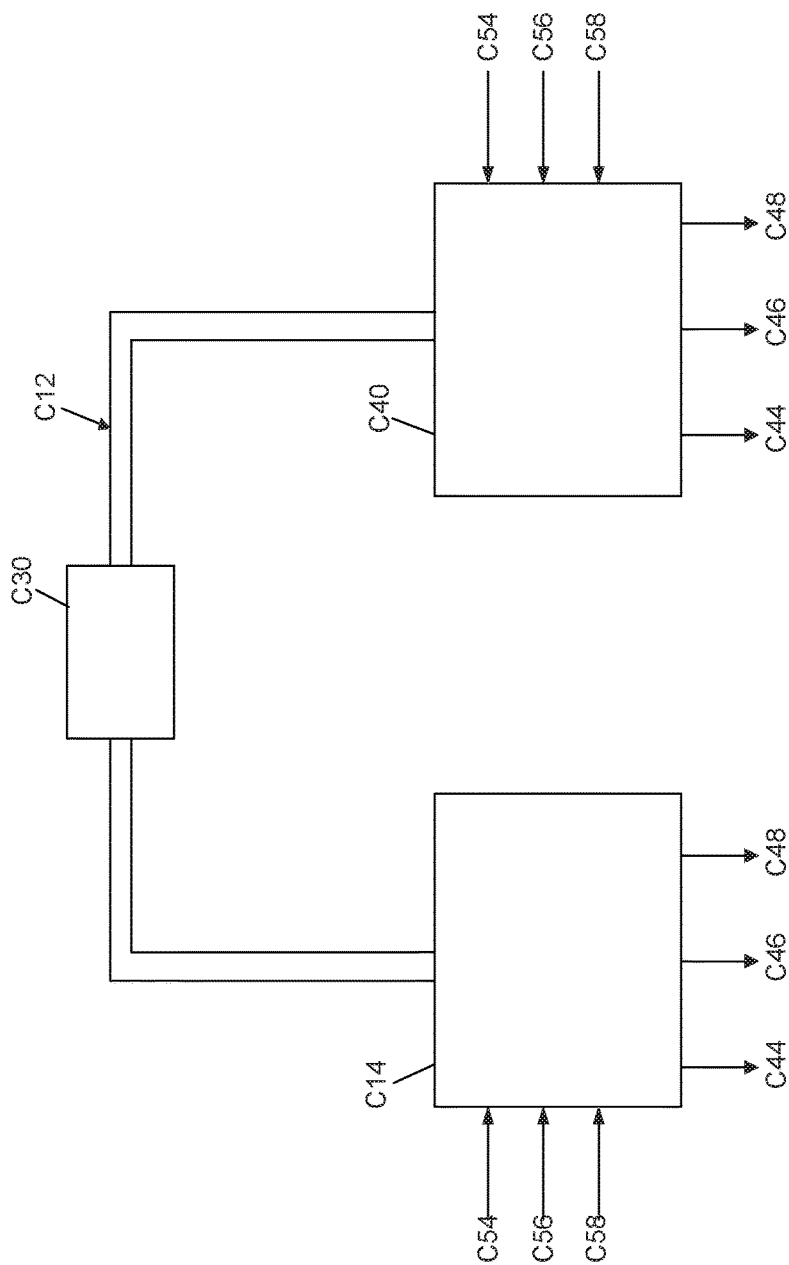
FIG. 62 is a schematic illustration of the smart device of FIG. 60 in use with a component of the appliance and a demo device and showing the capabilities of the component and the demo device.
Figure 63:
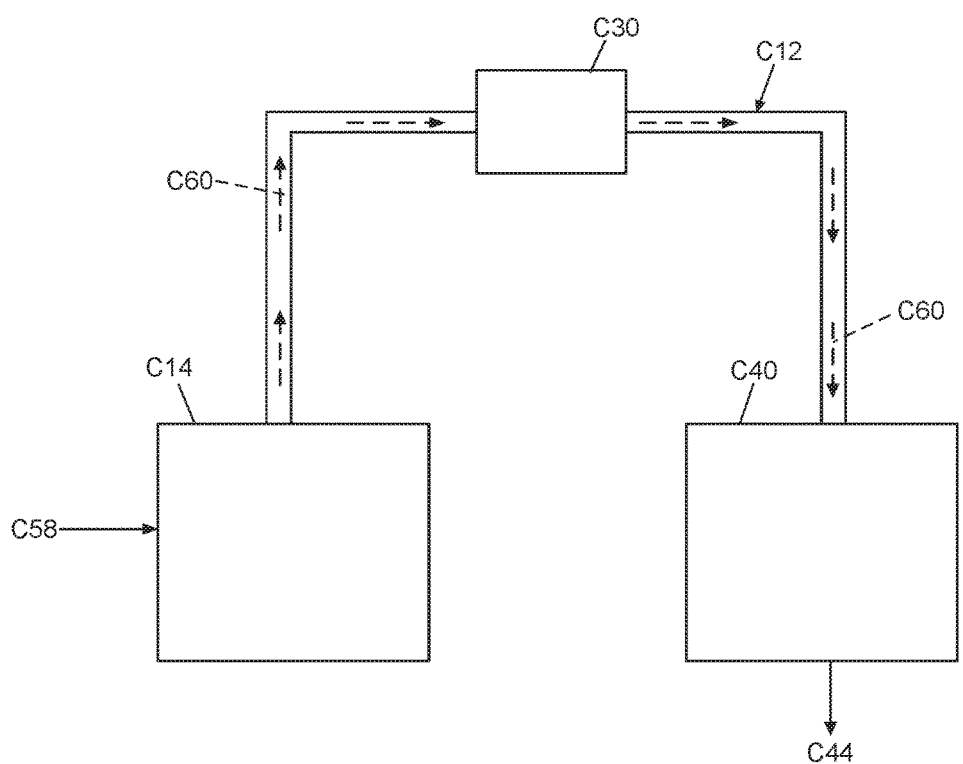
FIG. 63 is a schematic illustration of the smart device, component, and demo device of FIG. 63 and showing communication via messages therebetween.
Figure 64:
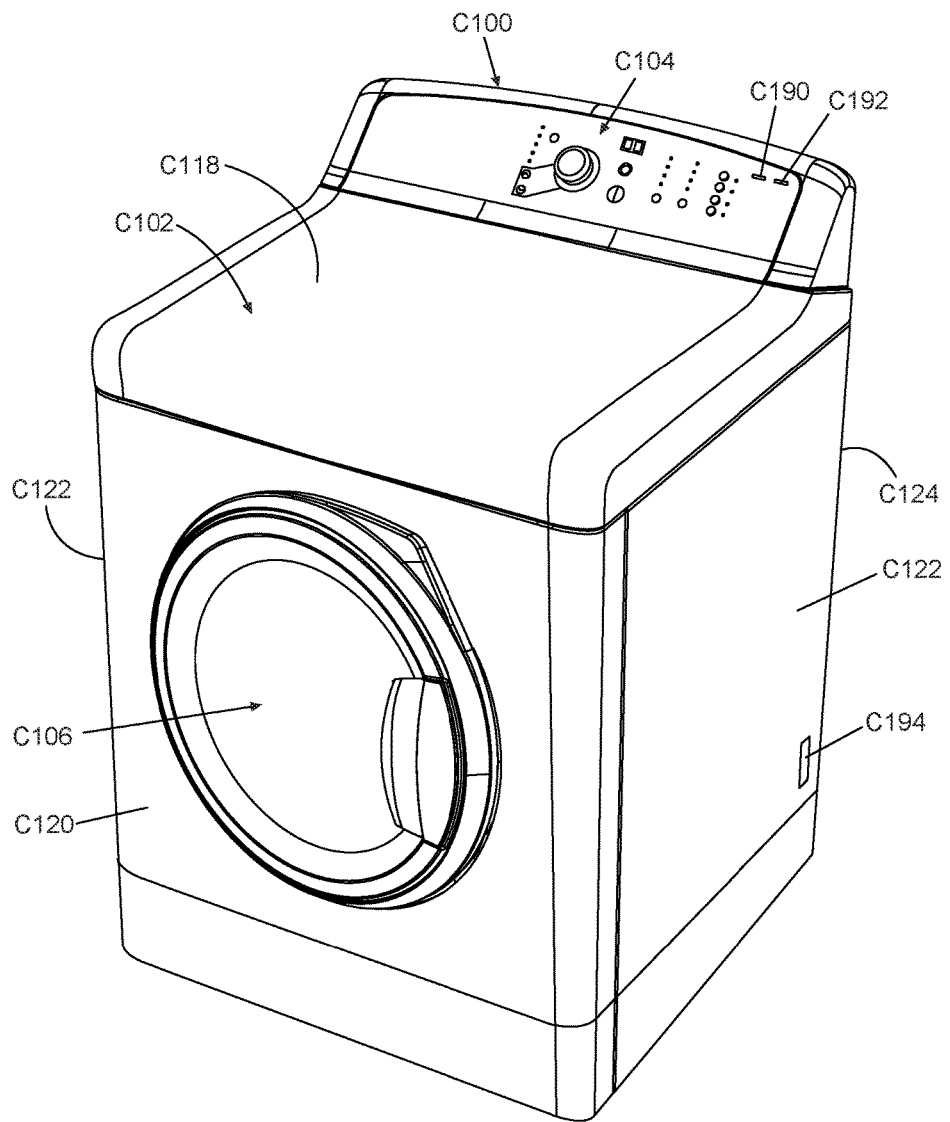
FIG. 64 is a perspective view of a dryer capable of connecting to a smart device according to one embodiment of this disclosure.
Figure 65:
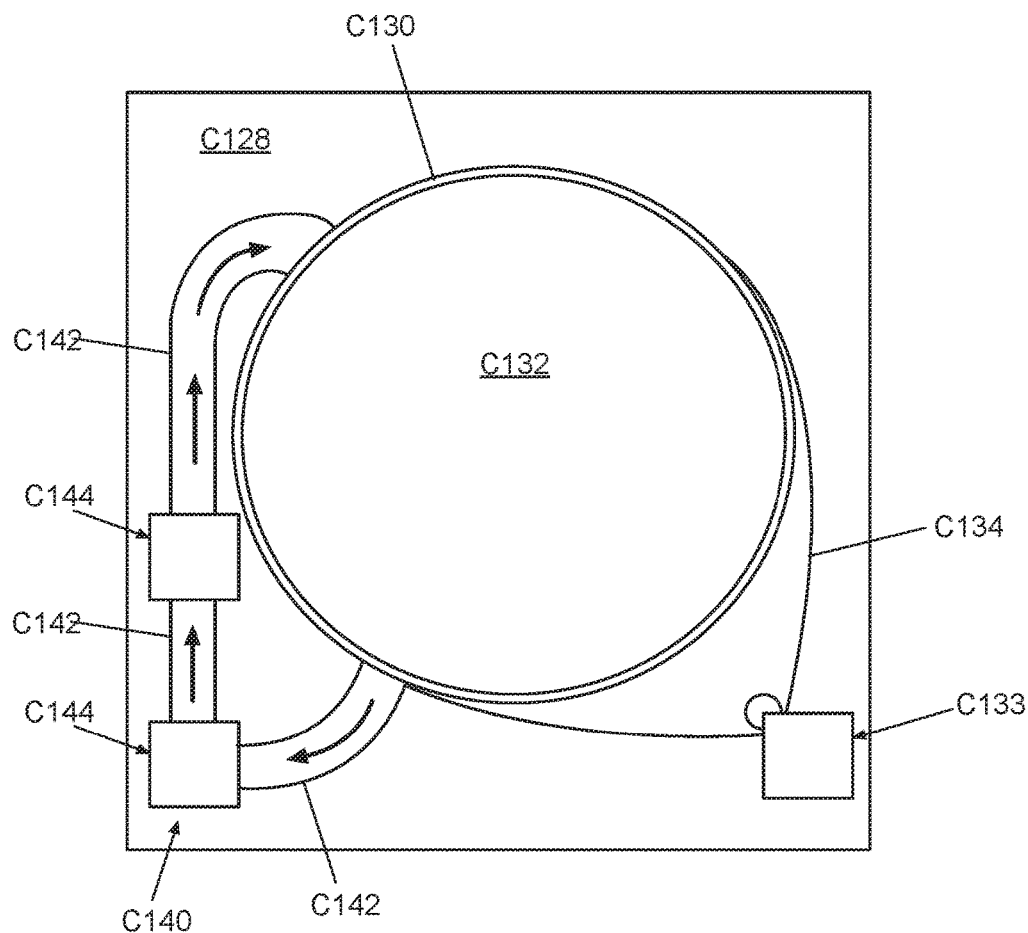
FIG. 65 is a schematic illustration of the interior of the dryer of FIG. 64.
Figure 66:
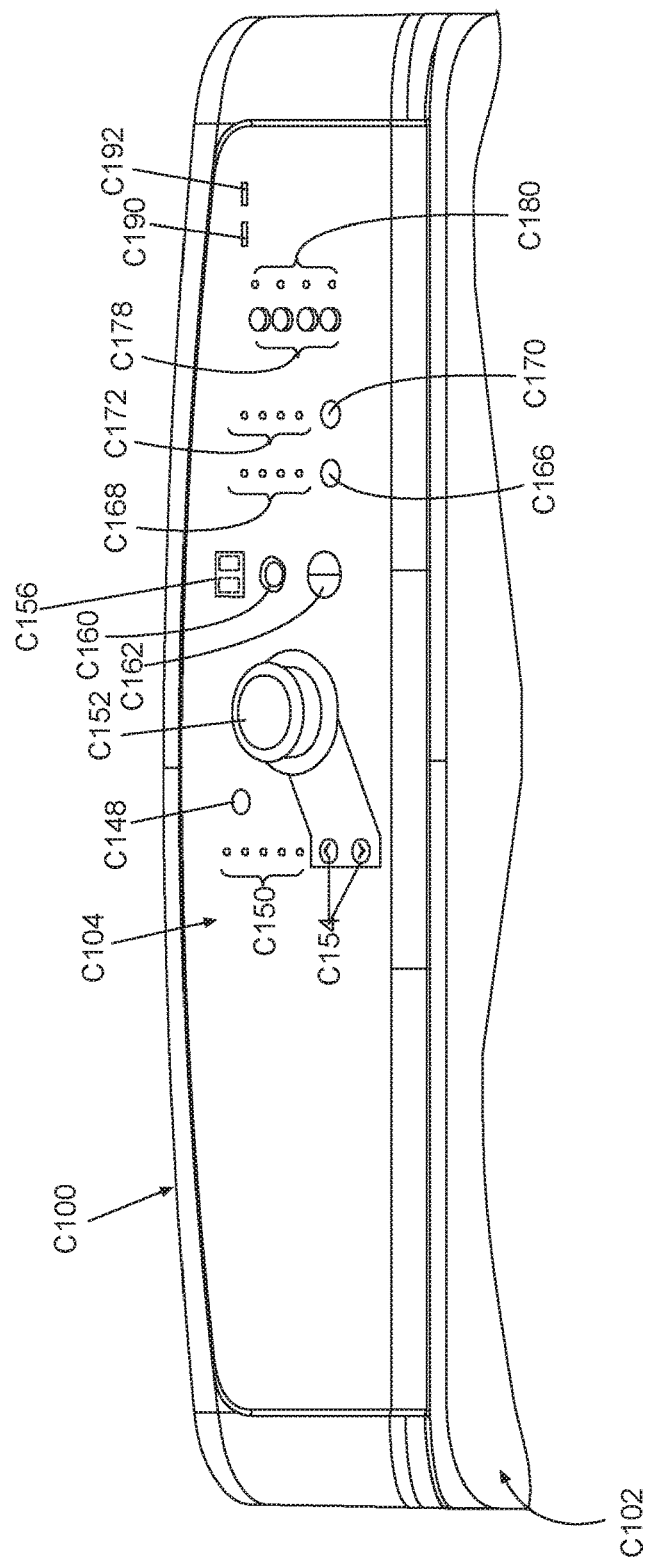
FIG. 66 is a perspective view of a user interface on the dryer of FIG. 64.
Figure 67:
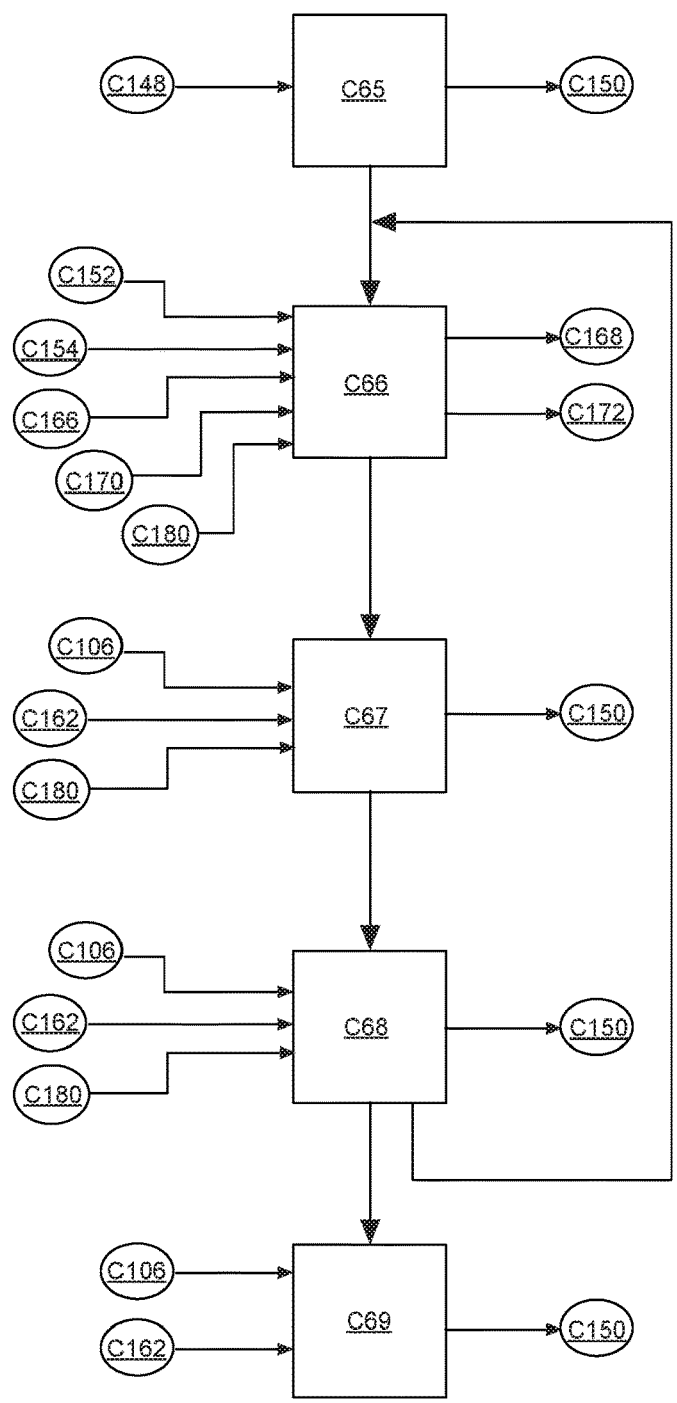
FIG. 67 is a flow chart illustrating normal operation of the dryer of FIG. 64.
Figure 68:
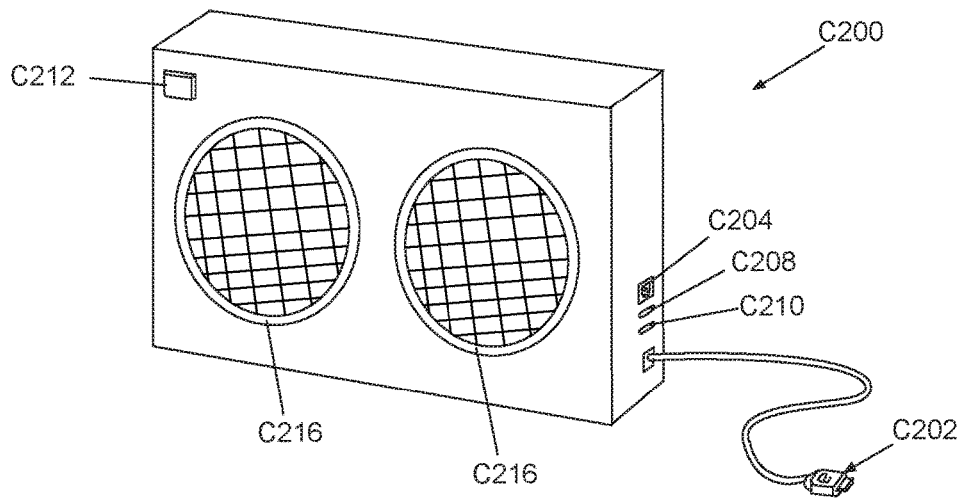
FIG. 68 is a perspective view of a smart device for connection to the dryer of FIG. 64.
Figure 69:
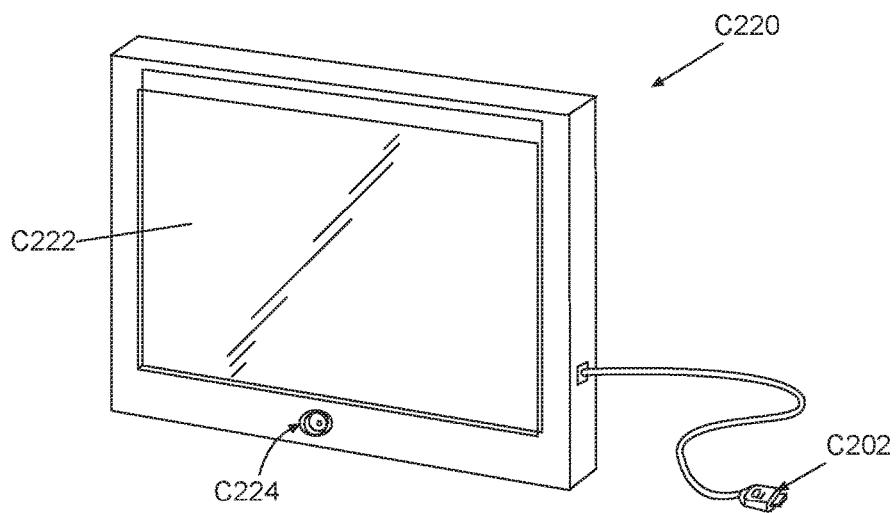
FIG. 69 is a perspective view of an LCD monitor for connection to the smart device of FIG. 68.
Figure 70:
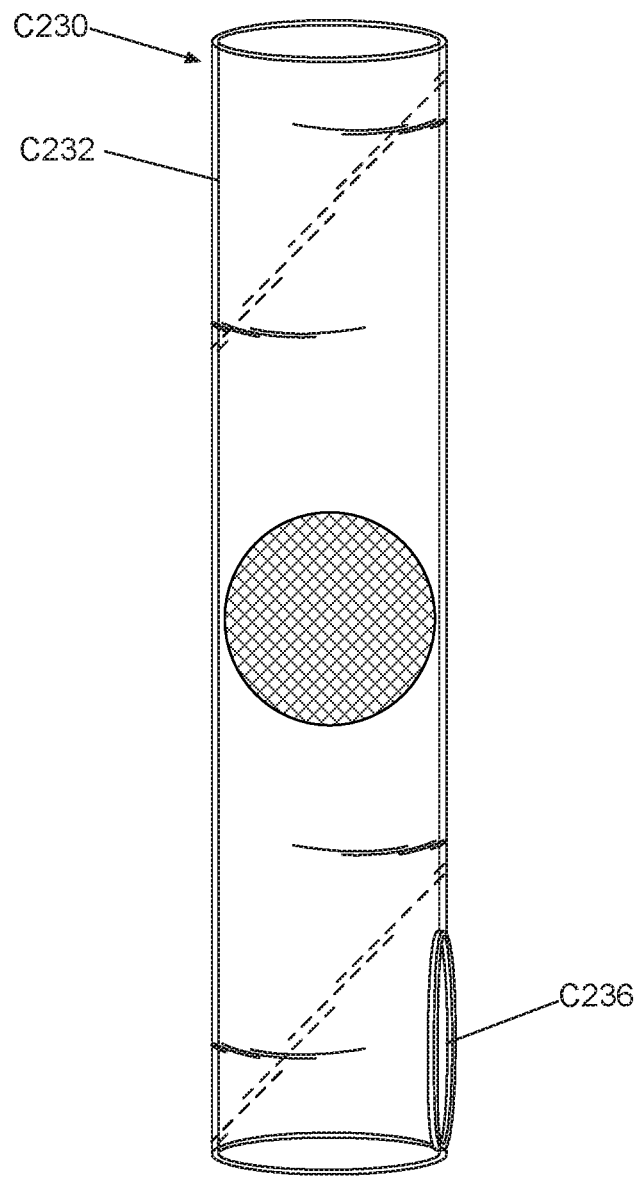
FIG. 70 is a perspective view of an air flow demo unit for connection the dryer of FIG. 64.
Figure 71:
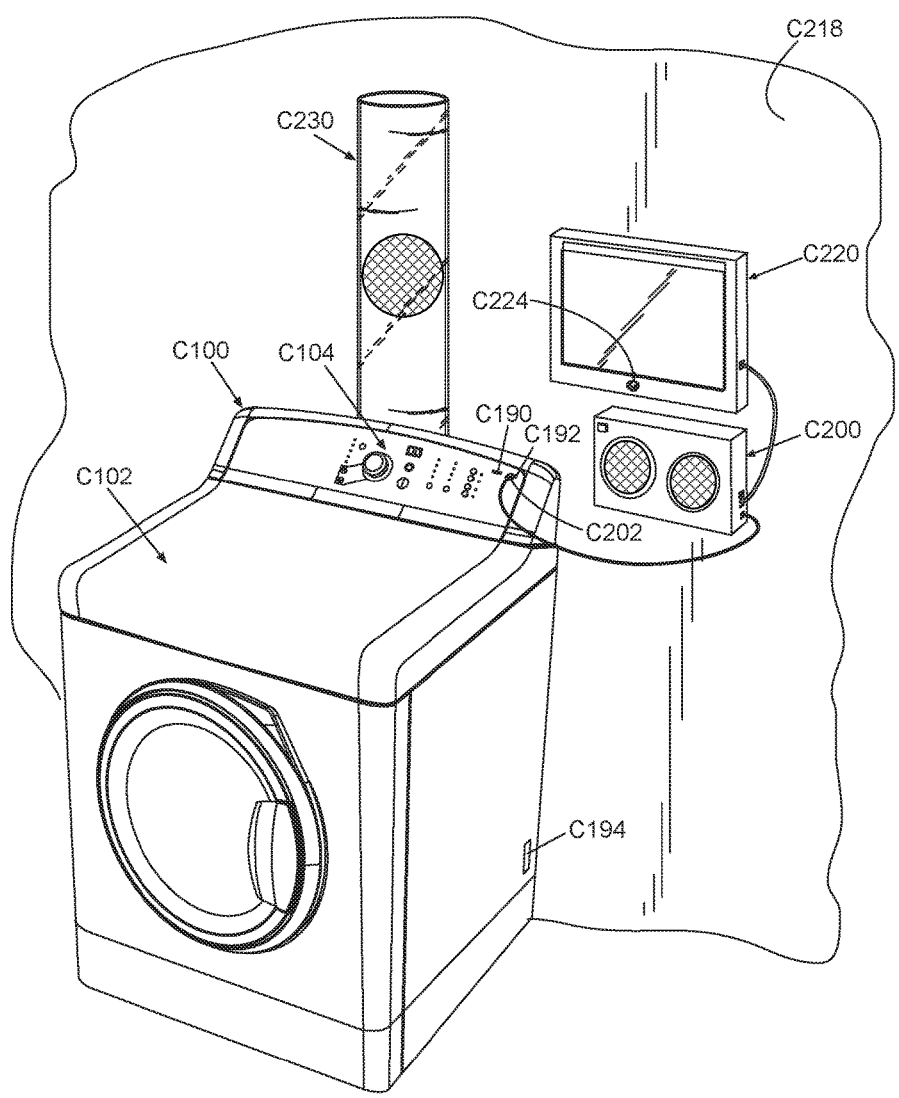
FIG. 71 is a perspective view of the smart device of FIG. 68, the LCD monitor of FIG. 69, and the air flow demo unit of FIG. 70 in use with the dryer of FIG. 64.
Figure 72:
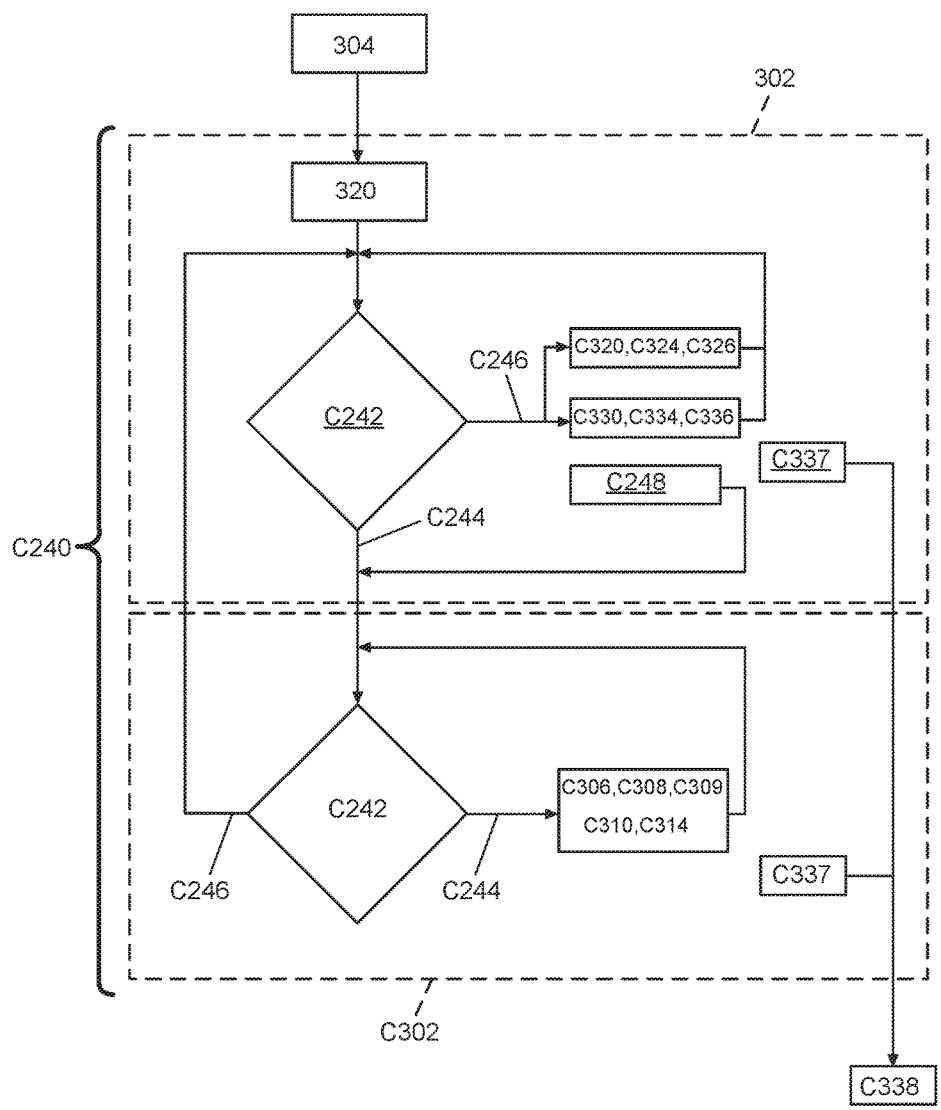
FIG. 72 is a flow chart illustrating a sales demo to be executed and performed by the smart device, LCD monitor, air flow demo unit, and dryer of FIG. 71.
Figure 73:
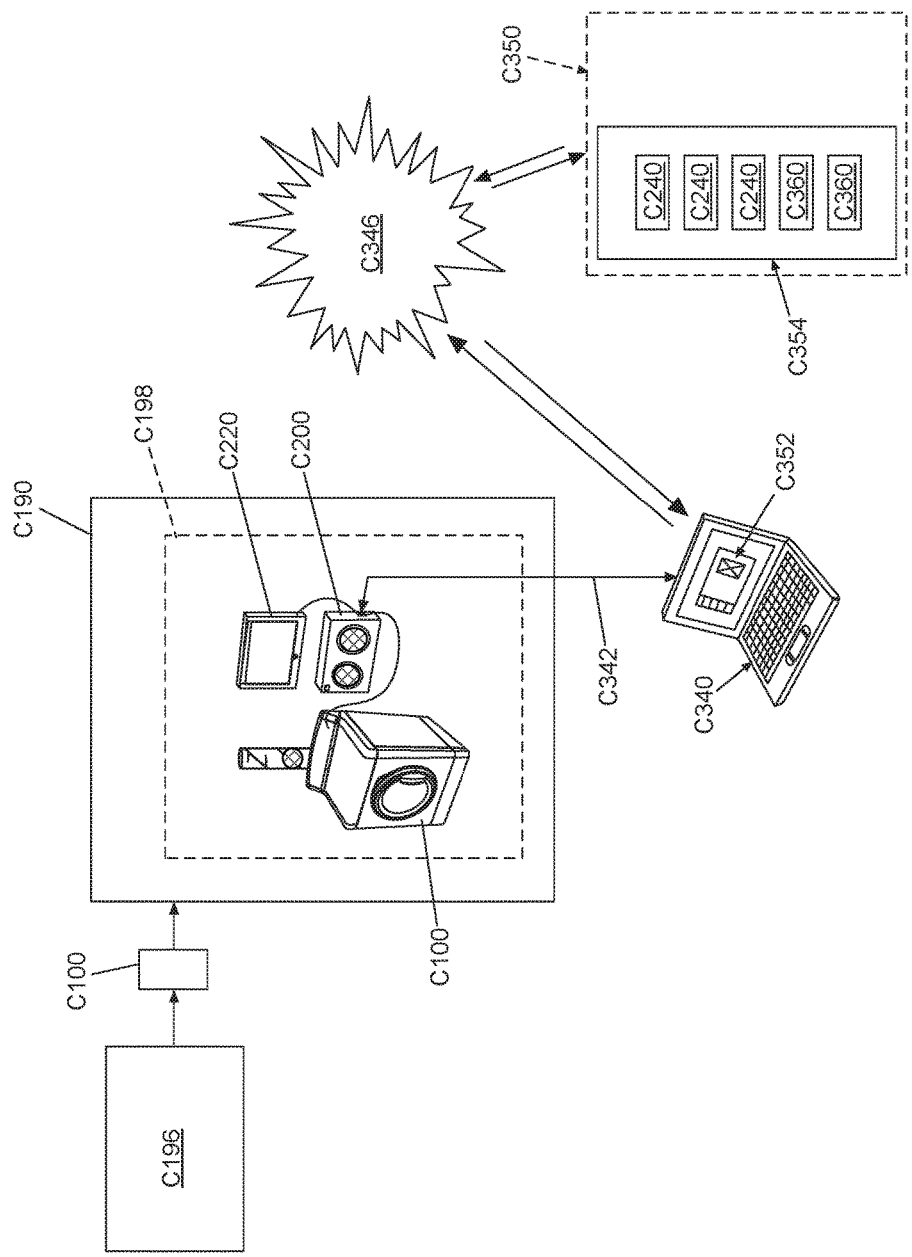
FIG. 73 is a schematic illustration of a business method for use with this disclosure of FIG. 71.
Figure 74:
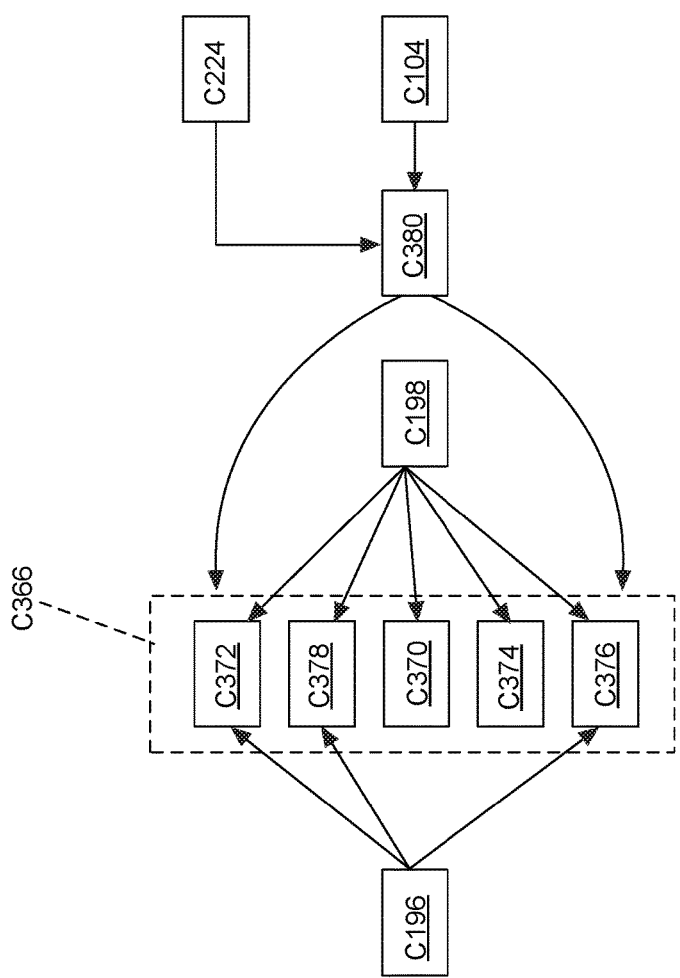
FIG. 74 is a flow chart illustrating the effect of various factors on business concepts for inclusion in the sales demo of FIG. 72.
Figure 75:
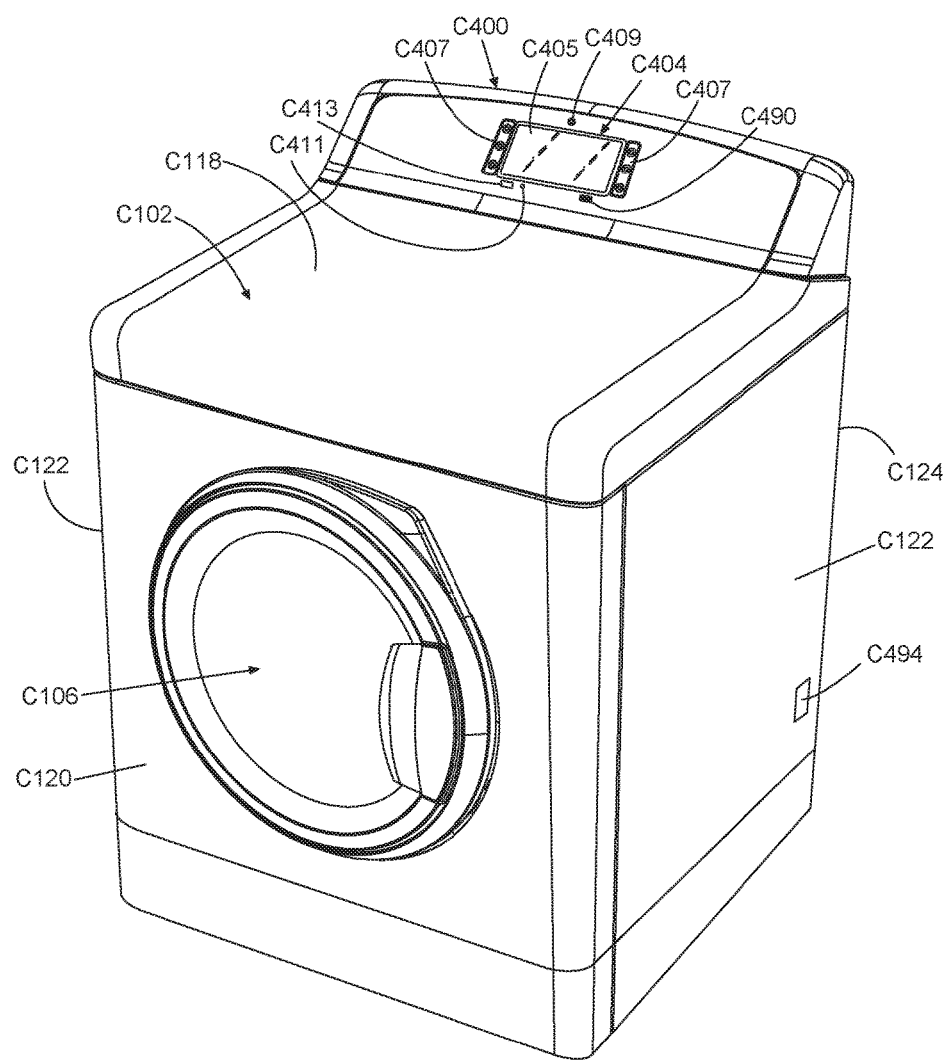
FIG. 75 is a perspective view of a dryer having a multimedia user interface according to another embodiment of this disclosure.
Figure 76:
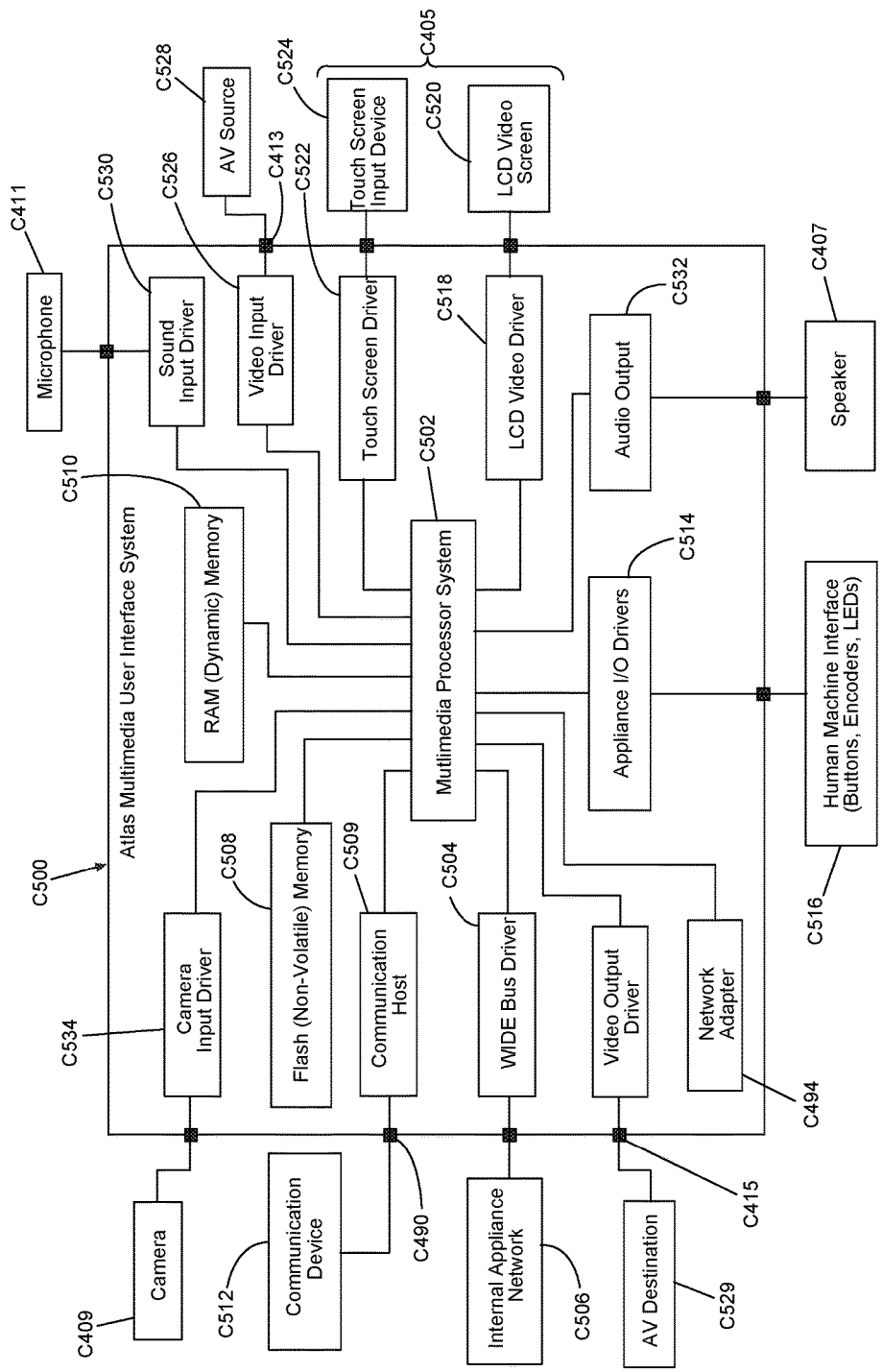
FIG. 76 is a schematic drawing of a controller having an integrated smart device for the dryer of FIG. 75.
Figure 77:
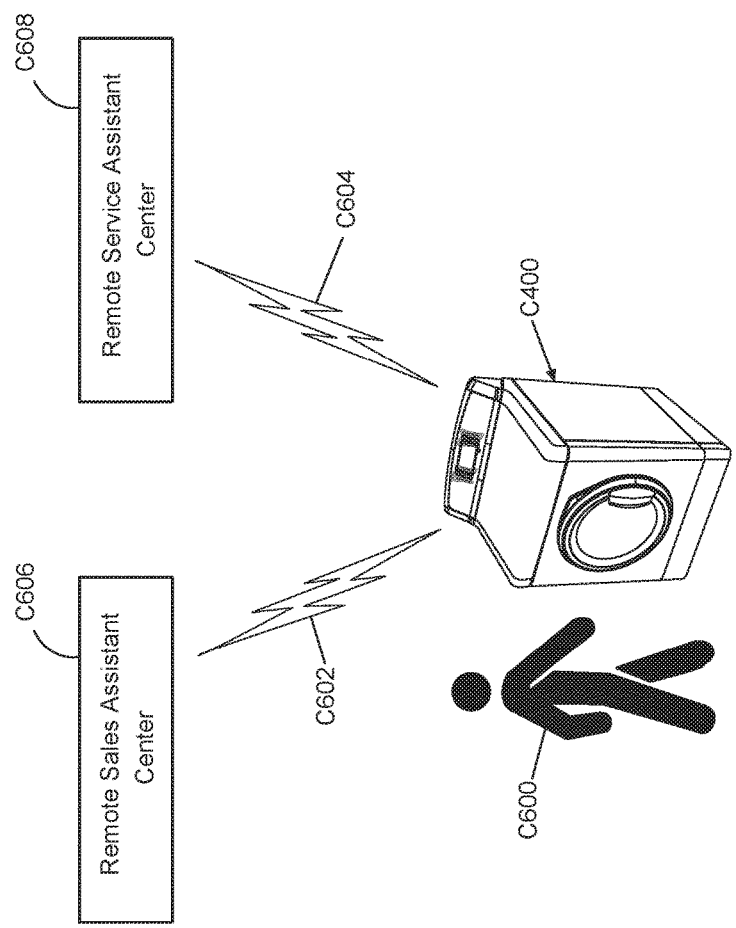
FIG. 77 is a schematic drawing of a network connection between the dryer of FIG. 75 and remote third parties.
Figure 78:
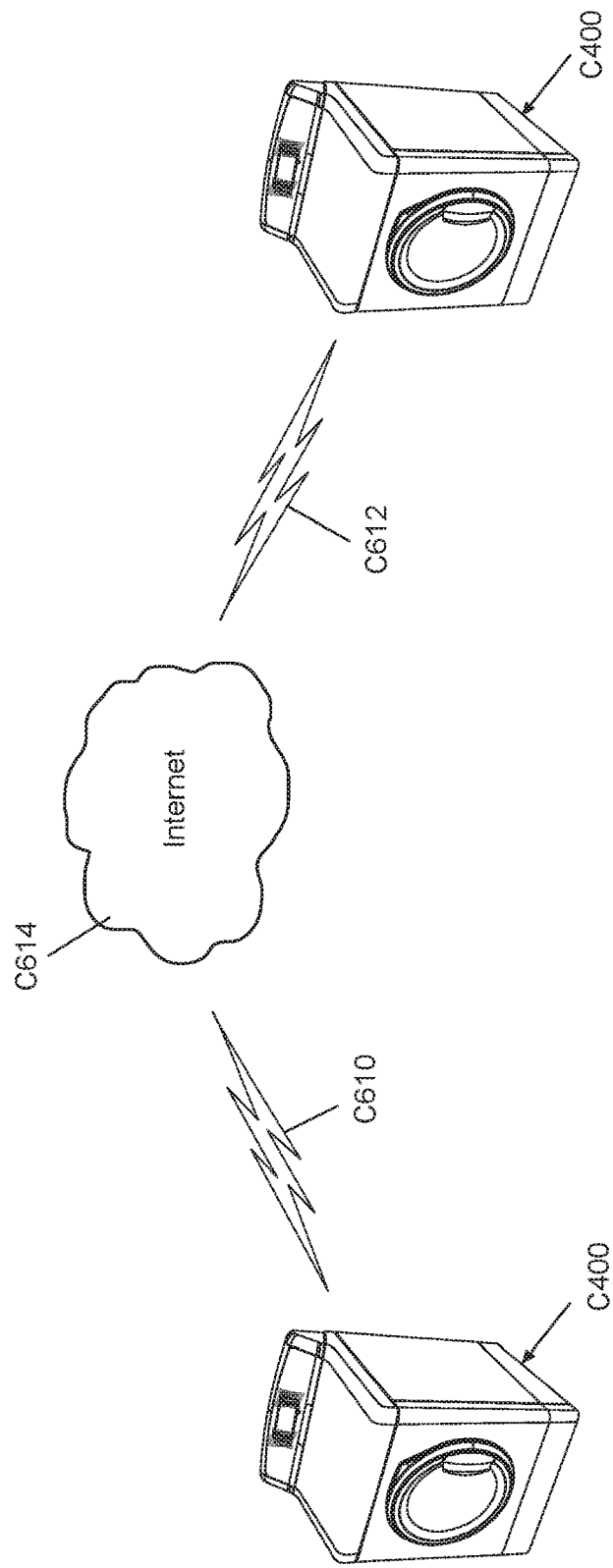
FIG. 78 is a schematic drawing of two dryers of FIG. 75 in communication over a communication network.

FIG. 59 exemplifies the relationships between the structural components within an appliance control system. The appliance has at least one control board which is well known in the art. The control board has at least one processor able to execute software (also known sometimes as firmware) and control some part of the appliance control system apparatus. Control is defined to mean the changing of the state of one of the hardware components to which the processor is attached. For example, a valve may be changed from a closed state to an open state. This represents the control of the valve by the processor. The processor may effect this change of state by changing the state of one of its IO Pins which is in effective communication with the hardware component or by sending a network message where the network is in effective communication with the hardware component. Effective communication refers to the ability to send and receive messages with meaningful information without defining the exact means by which communication is achieved. The software which a processor executes can be broken into a plurality of arbitrary software components. This breakdown has several advantages. They include: manageability, readability, portability, re-usability, etc. It is well known in the art of software design to break-up software into modules or components for these reasons.

This disclosure introduces new components to the appliance control system which will enable the appliance control system to be effectively built from re-usable components and to be dynamically configured by a variety of configuration mechanisms. Further this disclosure will deliver the benefit of re-usability and configurability.

Re-Use

It is known in the art that object oriented techniques promote and enable software re-use. A first component enabling re-use is the class library. Class library contains a plurality of class definitions. A class definition comprises an interface with a plurality of method definitions and a plurality of field definitions.

Field definitions are named variables which have a known data type. The value of a field definition must be a value corresponding to the field's data-type. Example: Field x is an unsigned integer. The value of x can be a number within the range of 0 to 65535. Field definitions can also have a data-type corresponding to another class definition.

A method definition is a function with a name and a description, a return value, and a set of arguments. Each argument of the method can also have a name and a description. Each argument can also have a data-type and a set of valid values. The data-type can also be a class definition.

Each method definition further comprises executable software which can use the arguments in conjunction with the executable software so that the executable software returns a result and/or executes the behavior corresponding to the logic of the executable software and the values of the argument received in the set of arguments. A method definition can further comprise invocations onto other method definitions of its containing class or to method definitions which it has visibility to. The approach to gaining visibility to other classes' methods is known in the art. The return values from the other method definitions can be used by the executable software of the first method either to influence the return value of the method or to influence the behavior of the logic of the executable software.

Preferably, a class definition is confined to a single logical purpose to which the plurality of methods contributes the enablement thereof. A class library can be governed independently of the Appliance Control Systems to which it is applied. Class Library governance includes deployment, documentation, development, testing, bug fixes, revision control and the like.

Class definitions are made executable in two ways. The first way is via a method known as static. When a class is executing statically, all executions of the methods of the class are occurring within the same memory of the processor. This means that if there are two executions occurring simultaneously, the methods of the class must be designed such that any state information used within the execution and stored in memory by a first execution is guarded against inadvertent use by a second execution.

Two factors giving rise to the second way are that 1) it is advantageous for methods to store state information in memory for later use and 2) to enable the 1), it is required to index that state information to a particular execution or execution context so that when there are multiple executions or execution contexts that the method can retrieve the appropriate state information.

Therefore, the second way a class definition is made executable is by instancing a class into an object thereby creating the mechanisms to assign an instance of a class to a particular execution or execution context. Instantiation refers to the allocation and assignment of memory sufficient to hold a unique collection of information associated with a unique object instance and defined by the field and method definitions of the class definition.

Instantiation is the mechanism which allows a class's state information and references to other objects to be encapsulated together and associated with a particular execution or execution context and to expose that instantiated memory to other objects via some type of memory pointer or unique identifier.

An object has the ability to store information associated with its execution context and in its fields. When an object has a field of a data-type that corresponds to a class, the value of the field can be an object. In this way, objects can be composed of their own fields of data and methods and of a plurality of other objects.

Dynamic Configuration

As previously stated, objects can be composed of a plurality of other objects according to the objects field definitions. If an object comprises a method which has executable software to set the value of a field defined to hold an object, then that object can be reconfigured by changing the value of the a field from a first object to a second object. This reconfiguration can then result in a different composite or overall appliance control system behavior. There are many useful purposes for an appliance control system whose behavior can be changed by changing the values in a first objects field to a third object from a second object. For example, a cycle accessory could use this technique to change a cycle structure. Likewise, both a consumables reader and a recipe book wand could use these techniques to customize the behavior of the appliance control system according to the data about the cycle, the data about a consumable, and the like.

There are many mechanisms which can initiate and manage the dynamic configuration of an appliance control system. However, these mechanisms (see FIG. 59) will need a common design framework with which to accomplish the dynamic configuration. And some portions of the dynamic configuration can be accomplished during the compile process while other portions may be accomplished at post-compile time (also known as runtime).

FIG. 36 illustrates at least two embodiments of communications controlling the operation of an appliance according to this disclosure by information related to a cycle structure B71. Here, cycle structure B71(*a*) represents changes to be communicated to the cycle engine 73 (e.g. a new cycle structure or modifications to an existing cycle structure) or information about a cycle structure B71, and cycle structure B71(*b*) represents a cycle structure after change by the cycle engine B73. Messaging (1) communicating a cycle structure B71(*a*) to the cycle architecture 69 enables the cycle engine 73 to discover information related to a cycle structure B71, data about a cycle structure B71, or a cycle structure B71(*b*) to be created or modified. The cycle engine 73 proceeds to build a new or modified cycle structure B71(*b*) at (2). Optionally all messages can be routed through an embedded virtual router at (3) resulting in the cycle engine 73 using its own configuration API for building the new or modified cycle structure B71(*b*). As well the execution by the cycle engine 73 to create or modify the cycle structure B71(*b*) can be accomplished through an EVR.

Alternatively, any client having an arbitrary software component, such as a client B40 in the consumable holder B16, can find or discover the cycle structure or data about a cycle structure 71 at (4). Then, the arbitrary software component can build a new or modified cycle structure in conjunction with the cycle engine 73 configured to receive configuration messages as at (5).

Thus, it is seen that the creator of a new or modified cycle structure 71 is the cycle engine 73 or an arbitrary software component in communication with the cycle architecture B69. The arbitrary software component can reside in a variety of locations with respect to the controller 68 comprising the cycle architecture B69. See the discussion below with respect to FIG. 17. Hence, all messages between the arbitrary software component and the cycle architecture 69 can be optionally routed through an EVR as at (6). As well, the cycle architecture 69 can optionally communicate with the appliance control system through an EVR.

Using the aforementioned cycle engine architecture B69, an operational cycle accessory can be added to the network of an appliance, discover the cycle architecture B69, and send it configuration messages to affect its structure and ultimately its execution. In this case, the operational cycle accessory would typically include a combination of software and data to accomplish the configuration of the cycle architecture B69. Alternately, the aforementioned cycle architecture might send a discovery message seeking identification of all sources of the cycle structure. Sources of the cycle structure may be in ROM, Flash, EE Prom, an operational cycle component, and/or an external source connected via a network different from the control network (See, for example, FIG. 17). Once the cycle structures B71(*a*) are located and retrieved, the cycle engine 73 can commence modifying its own cycle structures B71(*b*) according to the new cycle structure data.

In another embodiment of a cycle architecture B69, a first portion of the cycle structure B71(*a*) is compiled and a second portion is made available at runtime. The second portion can include a plurality of cycle structure data, either in direct or indirect form, which can be combined with the first portion such that the cycle engine 73 operates on the aggregate of the first and second portions for a new operational cycle execution software. The second portion may represent differences in the first portion where differences may be additions, deletions, or modifications to elements, their relative orders, or their relative relationships within the cycle structure. The cycle engine 73 could appropriately apply the differences represented in the second portion by looking at the identifiers of the elements of the first portion of the cycle structure B71(*a*) and the identifiers of the elements of the second portion of the cycle structure B71(*a*). The advantage of this embodiment of a cycle architecture 69 is that changes to the aggregate cycle structure can be made while preserving the first portion such that subsequent corruption or absence of the second portion would not affect the integrity of the first portion, thus enabling the operation cycle execution software to revert to compiled default state, such as might be supplied at the factory. A second advantage of this embodiment is that specialized variants of the first portion can be designed which can accommodate the constraints presented by the appliance process control apparatus B14 and more specifically the controllers 68 such as limited memory and also provide capability for receiving and adapting to a second portion providing flexibility and configurability within the constraints for the cost of the specialized variants. For appliances, this can be an important requirement in some cases.

Alternatively, when an operation cycle accessory is disconnected from the cycle engine B73, the data of the second portion can be optionally removed by the cycle engine 73 causing a reversion to the factory default state. This is a form of anti-piracy protection in that the operation cycle accessory must be present for the additional functionality represented by the accessory to be available to the appliance. Optionally, the connection between the appliance and the operation cycle accessory can include a transfer of the first portion into a memory in the appliance. In this case, additional operation cycles can be retained without the permanent presence of the operational cycle accessory. It should also be noted that an operation cycle accessory can be virtual in that the software and data and ability to communicate with the cycle engine may reside on an external device connected to the cycle engine 73 via at least one network and not physically attached to the containing appliance B12.

It is to be noted that an operational cycle component 60 can have other elements that are not the aforementioned operation cycles or constituent data and complied portions. For example, the operational cycle component 60 can include software code to configure a cycle engine 73 for communication and other functions or code to put software architecture into an alternate mode for the purpose of diagnostics or changing memory.

An appliance cycle of operation performed by the appliance process control apparatus B14 can be optimized by information associated with the consumables 24 on which the appliance process control apparatus is operating. For example, the cycle structure 71 could be built specifically to accommodate some properties or attributes of the consumable 24 or to accommodate some properties or attributes of the consumable holder B16. The body or bodies that comprise information, identifiers of functionalities, properties, attributes, and property and attribute values related to consumables 24 can be referred to as sources of information about a consumable or "consumable information holders." Examples of consumable information holders include the consumable itself, a data pod, the consumable holder B16, a user interface, and a tag. The consumable holder can be a sensing consumable holder that might use a lid sensor, for example, for sensing attributes about the consumable contained therein. These attributes could then be used by the electronics B30 to further refine operation of the consumable holder. For example, if the consumable holder were to dispense B2 ounces, a lid with an amount sensor could be configured with an analog circuit coupled to the electronics B30 to provide a level or volume feedback so that the electronics B30 can dispense exactly B2 ounces rather than a time-based approximation.

Information associated with a consumable can include amount and/or composition or other attributes that would characterize the magnitude of the usefulness of the consumable. In this case, the cycle architecture 69 may adapt itself based on the information. For example, if the consumable 24 were a dishwashing rinse aid and the consumable holder 16 had only 90% of the standard dose, the cycle architecture 69 might adapt itself to this condition by increasing the time of the rinse phase to compensate for the lack of rinse aid. Information associated with a consumable can also include parameters of an operating cycle such as personal preferences of a user (e.g., doneness or crispiness preferences), and data about the consumable holder B16, the appliance B12, or other accessories or components thereof.

In a laundry example, the appliance process control apparatus B14 may provide information to the cycle architecture 69 about process variables like soil level, load size, soil type, etc. Based on this information associated with a consumable, including the process variable information, the cycle architecture 69 or an arbitrary software component in conjunction with a cycle engine 73 can reconfigure the cycle structure 71 to adapt to the process variable information. The consumable holder 16 may comprise the arbitrary software component and be able to reconfigure the cycle structure 71 to adapt to the process variable information. As shown in FIG. 36, reconfiguration can be accomplished in at least two ways. In one way, the arbitrary software component can read the cycle structure 71 and communicate with the cycle engine B73. In a second way, arbitrary software component can be preconfigured and communicate that configuration to or instruct the cycle engine 73 about the configuration.

One example of commands associated with an operating cycle is a collection of key value pairs. Keys comprise parameter names having a meaning, wherein the meaning is known by the cycle engine 73 such that values associated with the keys are thereby associated with the meanings. This enables the values to be used in the contexts of the meanings to modify and/or control the cycle of operation of the appliance.

Another example of commands associated with an operating cycle is a byte array representing a message packet for a network. In one embodiment of this example, the byte array could be arranged according to the packet definition disclosed in WO2006135726 comprising a functional identifier, an op code, and a payload, wherein the identifier and op code relate to an executable function or method implemented by the cycle engine and or cycle engine API. Further, the arguments or parameters of the function or method correspond to the data elements contained in the payload of the message packet.

The consumable holder B16, therefore, can contain all the functionality of and participate in all the embodiments that an operational cycle accessory in communication with an appliance 12 having a cycle architecture 69 can. Therefore in one embodiment, a consumable holder 16 is an operation cycle accessory that further physically contains and may also further be enabled to directly actuate the introduction of a consumable 24 into an appliance B12.

Consumable Reader

Looking again at FIG. 34, a consumable reader, such as that represented at 22, is any device capable of retrieving data or information associated with a consumable 24 directly from a consumable information holder (see discussion below) and exchange data concerning the information by sending and receiving data. A consumable reader 22 can inform memory in the consumable holder 16 of the type of detergent being held therein, for example. The use of this information could affect the operation of client software held in the consumable holder's optional client B40. Example effects could be dispensing quantities, frequency, or timing as controlled by the optional client software in communication with the consumable holder's process control apparatus B28 (having at least an actuator to control dispensing). Other example effects include communications between the optional client B40 and the controller 68 of the appliance 12 which could affect the structure and execution of the cycle architecture B69. See the earlier discussion of operational cycles. The optional client B40 will typically comprise electronics including a processor able to communicate with the communicating control nodes within the appliance process control apparatus B14 and the process control apparatus B28 in the consumable holder B16. The optional client B40 in some cases might be an arbitrary software component (as shown in FIG. B5) in communication with a consumable reader.

Information associated with a consumable, such as an operating cycle, a cycle structure, data about a cycle structure, data that can create or be interpreted to create a cycle structure, usage directions, cooking instructions, preparation instructions, dosage information, nutritional information, promotional and sale information, information about replenishment, offers for replenishment, reminders for replenishment, images and messages for user interface screens, and washing/drying instructions can persist, for example, within the consumable itself, in the packaging for the consumable, or in auxiliary materials, such as user manuals and performance tags, provided with the consumable. The consumable reader 22 is a component that can accept the information associated with the consumable and transmit it elsewhere, such as to the controller 68 of the appliance B12. The consumable reader 22 can be a device integrated with the appliance 12 or with the consumable holder B16, or a separate device that can be coupled, either by a hardwire connection or wireless connection, to the appliance or consumable holder for communication. Examples of consumable readers include, but are not limited to, bar code scanners, RFID tag readers, imaging systems, cameras, intelligent vision systems, devices capable of communications using NFC (near field communications), and magnetic strip readers, enabled to send and receive data.

In another embodiment, an external device such as a phone, PDA, computer, camera, and any external client 1004/1002 able to read and decode the information from the consumable and communicate the information to an appliance is an example of a consumable reader. In this embodiment, the device could communicate the information directly if the device were in communication with the appliance network 1030 or the device could communicate the information using propagated messages on other networks such as 1052, 1070, or 1050.

The consumable reader 22 communicates the information associated with the consumable 24 to the appliance 12 so that the appliance can optimize its performance for the consumable. An example of employing the consumable 24 and consumable reader 22 is provided in the schematic illustration of FIG. 12. In this example, a food provider B70 determines cooking instructions (a cycle structure B71) for a consumable 24 in the form of a frozen meal 71 and encodes the packaging, which is a consumable holder B16, for the consumable 72 with the cooking instructions. A user can place the consumable holder 16 in the vicinity of the appliance B12, which in this instance is an oven, and a consumable reader 22 of the appliance 12 reads the encoded cycle structure 71 (cooking instructions) from the consumable holder 16 and communicates the cycle structure directly to the appliance B12. The cycle architecture 69 in the appliance 12 can then either execute the cycle structure 71 for preparing the frozen meal directly, or create a new or modify an existing cycle structure in the appliance 12 without need for additional information from another source and without need for consumable-related lookup tables. The information associated with the consumable can be self-executing.

The aforementioned example should not be limited to a food provider. Any consumable provider with an authoring tool should be able to develop information about a consumable, preferably in a form appropriate for the creation of an optimum cycle structure 71 and user interaction with the appliance user interface, and encode the information into the consumable or onto the consumable holder so that when the consumable is introduced into the use environment, the optimum cycle structure and the optimal user interaction can be created within the cycle architecture 69 so the user will have an optimum experience. An authoring tool comprises a computer with appropriate software, a driver 1016, an appliance with software architecture 1018, a network connecting the computer to the appliance for communication, and a data store for storing information about a consumable preferably comprising information about a cycle structure and information for use on a user interface and preferably with at least one identifier identifying at least one appliance.

It is contemplated that information associated with consumables will be available from a data source that contains or can acquire the information associated with consumables. The information can include at least one cycle structure corresponding to a preferred operating cycle for the consumable B24. In the case of a food item, the cycle structure 71 might be used to realize a complete cooking cycle definition for the food item. In this embodiment, the cooking appliance 12 can comprise at least one instance of the cycle architecture 69 so that the introduction of the cycle structure 71 into the vicinity of the cooking appliance 12 results in the creation or modification of a cycle structure B71, and initiation of a preferred operating cycle corresponding to the particular combination of the food item B24, the cooking appliance B12, and other attributes, such as the geographic location the cooking appliance 12 and its altitude. Moreover, the food supplier or any consumable or article provider might also encode cycle information comprising a sound, graphics, ring tone or other licensable information enabling the cycle architecture 69 to render the licensable information visually or audibly on behalf of the food or consumable provider.

It will be understood that information associated with consumables can comprise data about a consumable, such as identifiers of functionalities, properties, attributes, and property and attribute values that describe or characterize something about a consumable 24 or its consumable holder B16. The data about a consumable can manifest itself in any type of data structure appropriate for useful storage and retrieval. Examples of appropriate data structures are key-value pairs, XML, relational data tables, comma separated variable files, byte arrays, data packets, command objects, serialized objects, messages, and the like. The data about a consumable may reside entirely within or upon the sources of information about a consumable or consumable holder as will be discussed in more detail hereinafter. Alternatively, the data about a consumable may be created by a second arbitrary software component using a combination of a cycle structure 71 and information associated with consumables. In either case, the data about a consumable is constructed from information associated with a consumable or consumable holder retrieved from a source of information about a consumable or consumable holder.

Information associated with consumables can also comprise user preferences to further refine the creation or modification of the cycle structure 71 to correspond to the preference of the user of the cooking appliance B12. The consumable 24 and/or consumable holder 16 can also be enabled to identify the appliance 12 and provide an appliance-specific operating cycle. One manner of implementing this is for the consumable 24 and/or consumable holder 16 to have operating cycles corresponding to a particular appliance or class of appliance B12. The appliance 12 in which the consumable 24 and/or consumable holder 16 is used identifies and implements the relevant operating cycle. Another manner of implementation is for the consumable 24 and/or consumable holder 16 to have an identifier, and the appliance 12 has stored or access to a database or table of operating cycles for different consumables 24 and/or consumable holders B16. The appliance 12 takes the consumable identifier and looks up the corresponding operating cycle for the consumable.

Information associated with consumables can be in any suitable form. In one embodiment, the information can be a communication packet that can be directly transmitted to the software architecture 1018, thereby eliminating a need for a central storage of consumables data. In another embodiment, the information can be a key that can be used to direct the appliance 12 to stored consumables data.

The consumables 24 can be supplied by a third-party provider, as in the case of store-bought frozen meals and wash aids for laundry appliances and/or dishwashers, or provided by the user. Leftovers and cooked and uncooked prepared foods are examples of consumables 24 that can be provided by the user. The leftovers and the prepared foods can be placed in a storage container (consumable holder B16) encoded with information related to the leftovers and prepared foods. For example, the information can include re-heat or cooking instructions and an expiration date (i.e., throw away date). When the information includes the expiration date, the appliance B12, such as the oven or microwave oven, can refuse to re-heat or cook the food if the current date is past the expiration date. Optionally, the appliance 12 can be configured to receive an override command from the user when the user desires to re-heat or cook the food despite the expiration date.

Any suitable material can be used to encode the information, and examples include, but are not limited to, plastic wrap, aluminum foil, pots, pans, microwave-safe containers, container lids, and an adhesive or magnetic strip that can be placed on the storage container. The information can be configured by the person who originally prepared the leftovers and the prepared foods and encoded using any suitable means, such as a personal computer, a magnetic strip writer, or a handheld encoding device. With this configuration, the user can configure the information on the consumable 24 as desired. In this manner, the consumable holder 16 facilitates the acquisition of the data associated with consumables 24 from a data source.

Taxonomy

A taxonomy architecture is employed to avoid duplication of software logic (sometimes called business logic) between two interacting software components in a controlling device and a controlled appliance. It is beneficial when the controlling device is a consumable holder. In particular taxonomy permits a command generator in a controlling device to readily control an appliance without any information about the appliance being controlled except the control taxonomy itself. This can increase the flexibility of introducing "generic" control devices to control new appliances, adapting control devices to newly available cycles or functionalities which have been added to an appliance, and switching appliances between modes of operation where different operating cycles or functionalities are available. It also makes control of appliances easier for users since they need only be presented with choices which are currently available from the appliance.

A structured taxonomy dataset can efficiently communicate to the controlling device, e.g. a consumable holder, just that information which the controlling device needs in order to generate a well formed command for the appliance or other device such as a user interface. As used herein, a well formed command is a command which has meaning and is performable by the appliance or other device such as a user interface. The information conveyed by the dataset includes a hierarchy of options and data inputs required to form the well-formed command. In one embodiment, it also includes semantic or contextual information to communicate in word or iconic form the available options so that a user can understand the available choices and enter the appropriate data. This is preferably accomplished by labels within the dataset that are associated with arbitrary or non-user friendly identification elements. This allows the logic of the software componentry which must interpret and process the Taxonomy to be decoupled from the presentation of the Taxonomy on a user interface.

Figure 47:
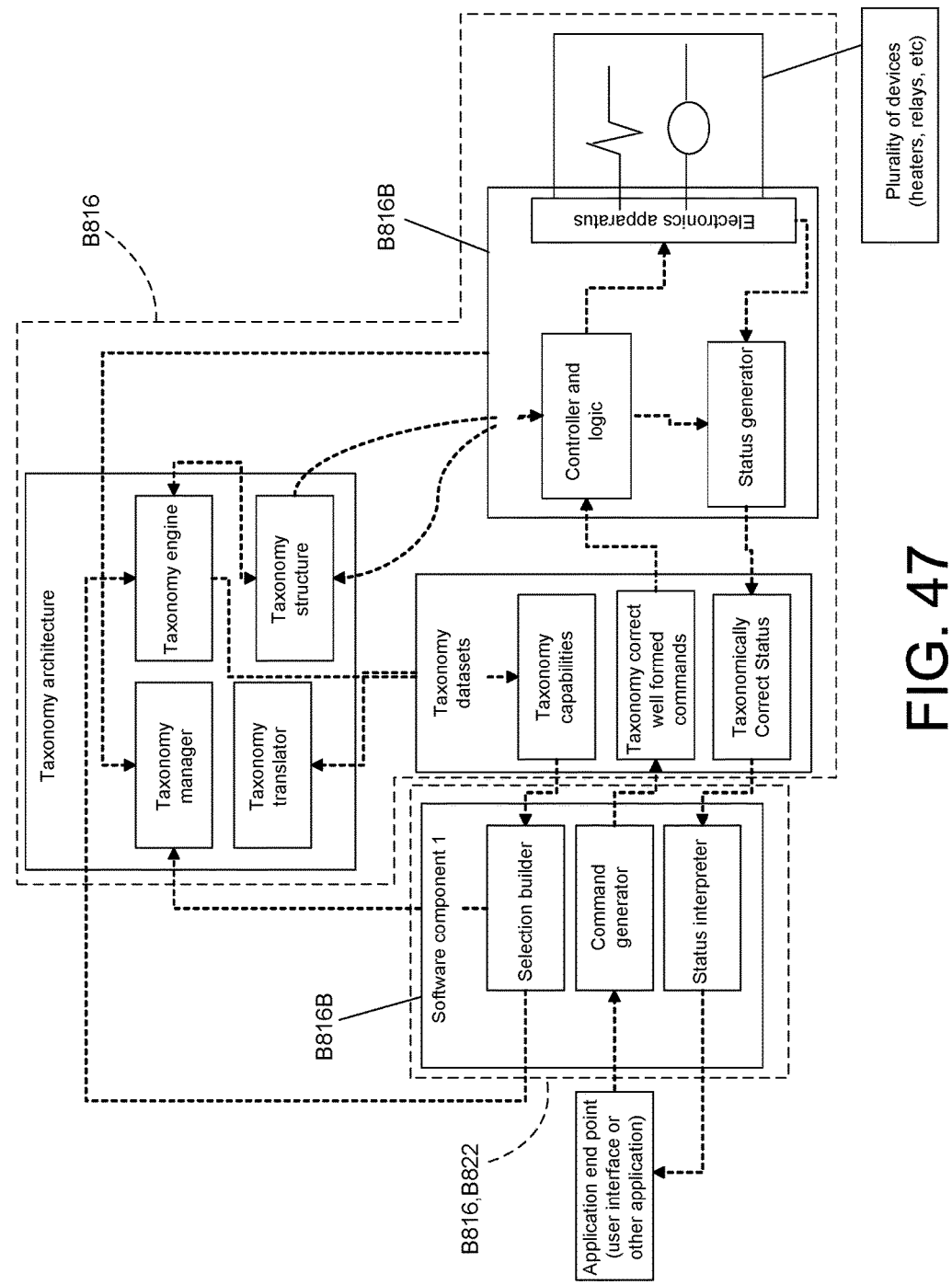
FIG. 47 schematically illustrates a taxonomy control using a taxonomy dataset in combination with the software architecture to control the operation of one or more components within the appliance without direct knowledge of the functions for the component.

Referring to the FIG. 47, generally, the appliance 12 being controlled has a software component B816B having an appliance controller and a status generator. The controlling device B816, B822 (e.g., the consumable holder, consumable reader, or other client) used to control the appliance has a software component B816B with a command generator, a selection builder and a status interpreter. The controlling device B816, B822 may be a programmable user interface such as a PDA, web tablet, a cell phone, an LCD attached to the appliance or a client device.

The taxonomy architecture, shown disposed in the appliance controller B816 and logic, can be disposed in a remote location, such as in a controlling device or on the internet. The taxonomy architecture includes a taxonomy generator, a taxonomy engine, a taxonomy translator and a taxonomy structure. The taxonomy architecture generates a taxonomy dataset defining taxonomy capabilities facilitating the creation, by the software component B1 B816B, of well-formed commands that can be executed by software component B2 B816B. Each of these components and their interrelationships are described in greater detail below.

Creation of the Taxonomy Dataset

The taxonomy dataset is derived from the operational capabilities of the appliance controller B816 structured in a manner to allow the command generator in the software component B1 to interpret the dataset to accomplish several results. More particularly, from time to time the taxonomy engine uses the taxonomy structure and the state aware information to generate a taxonomy dataset reflective of the subset of the universe of options for commands that would be available from an appliance to those that are currently available from the appliance.

For example, the taxonomy dataset describes the available functions supported by a software component B16B, each functions argument, and the valid values of each argument in a data structure. In addition, taxonomy dataset defines the valid values of feedback variables. Since this in a data structure, it can be transmitted and re-transmitted to clients B816 or B822 as required. Changes to taxonomy dataset occur as the cycles of operation progress and the available commands or the valid values of their arguments change. Moreover, additional commands may become available or may become invalid as a cycle of operation progresses.

More particularly, the selection builder registers with the taxonomy manager to receive notifications for new taxonomy engines. In response, the taxonomy manager passes references to all known taxonomy engines back to the selection builder. The selection builder then requests from each taxonomy engine a taxonomy capabilities data set. The taxonomy engine evaluates a taxonomy structure comprised by the controller logic of software component B2 or alternatively to generate a document to generate a taxonomy capabilities dataset. The selection builder then populates a set of pseudo command structures appropriate for an application end point (examples of application end points are user interfaces for control or service or other intermediate application layers like an energy controller or home automation mode like vacation or goodnight.) and passes those structures to the application end point allowing the application end point to be configured. Alternatively, the selection builder may directly configure the application end point.

Communication and Use of the Dataset.

When a controlling device is networked with the appliance, the taxonomy manager establishes a relationship between the software component B1 and the taxonomy architecture allowing the command generator to query for the existence of taxonomy datasets, providing the software component B1 access to a taxonomy dataset, and allowing the command generator and status interpreter to subscribe to taxonomy dataset updates. The taxonomy translator is an optional component that translates the taxonomy datasets between software components B1 and B2.

The taxonomy dataset is communicated to the controller of software component B2 and to the selection builder of software component B1. Optionally, the taxonomy translator translates the taxonomy dataset to a different schematic definition of the command generator.

The command generator uses the taxonomy dataset to construct and populate a set commands structures available for selection by a user interface or other client applications comprising a set of valid commands, their valid arguments, and each arguments valid values. More particularly, the command generator uses the taxonomy dataset to construct one or more well-formed commands which can then be transmitted to the controller. Since the taxonomy dataset can be reset and sent at different times by the taxonomy engine, or the dataset can be updated by revisions from the taxonomy engine, the command generator can have a current set of command structures then available for selection by a user interface or other client application.

Thus, in essence, through use of the taxonomy architecture, the software component B2 or its proxy (the taxonomy translator) communicates to software component B1 a rule set that can be interpreted by software component B1 so that software component B1 does not request something of software component B2 which software component B2 cannot accommodate and does not operate on a state variable which is set to an invalid value.

Before the application end point is able to commence execution, it will request or register for status updates with a Status Interpreter. This will allow the application end point to be populated with valid state variables from the controller before logic is executed and before user interface componentry is rendered. The status interpreter will process taxonomically correct status datasets and validate those datasets against the taxonomy capabilities data set. The status interpreter request or register for status updates from the status generator of software component B2 via the taxonomy engine. Upon receipt of a taxonomically correct status, the status interpreter will provide new status values to the application end point.

The application end point executes resulting in a rendering of the current status of software component 2 and a rendering of selectable pseudo command structures. Each time a selection is made from the pseudo command structure, the selection builder populates a set of valid subcommands appropriate for the selection for further selection by the application end point. When a complete selection is made, a structure containing all pseudo commands are passed to the command generator.

The command generator will construct a taxonomically correct well-formed command and optionally via the taxonomy translator, invoke the command onto the controller of software component 2 via the taxonomy engine.

Execution

The well-formed command is delivered to the controller of the appliance and executed by the appliance.

Typically, the command will result in a state change to the associated memory of software component 2 which will trigger a status update created by the status generator and resulting in new renderings of state to the application end point. This change in state will result in a new capabilities taxonomy or a partial capabilities taxonomy which can replace portions of the original capabilities taxonomy. The new capabilities taxonomy resulting in a different set of valid selections for controlling the cycles of operation of software component 2.

Validation

The status interpreter uses the taxonomy dataset to validate status updates from the controller or taxonomy translator. The dataset contains information structured in such a way to allow the controller to fully validate incoming commands according the structure without additional logic outside of the dataset. For example, the dataset can be conceptually thought of as one or multiple decision trees, with each level of the taxonomy forming a different decision branch, with each of the options and/or data inputs can form a different level. The key presses on the user interface required to select the options and/or data inputs in forming the well-formed command can be compared against the decision tree to confirm that each key press is found within a common branch on the decision tree. If the key presses are not found, then it is an indication that the command contains an error. The taxonomy structure thus serves to populate the user interface with available options and data inputs for a given state of the appliance and also serve as the logic for validating the resulting command.

The taxonomy dataset can be thought of as all available options and settings for an appliance at the current state. For example, the appliance comprises multiple components interconnected by the internal network. Each of the components can have one or more devices. Each of the devices has one or more functionalities, which has one or more settings. All of the functionalities for all of the devices will not necessarily be available during each state of the appliance. As such, the taxonomy dataset will comprise all options and data inputs for all devices that are currently available.

Consider a microwave oven with a top level of the hierarchy showing the options of COOK, JET DEFROST, BAKED POTATO, STEAM COOK, AUTO REHEAT, AND DINNER PLATE, as illustrative examples. The user must select one of the options from the top level.

A detailed example of the creation of the taxonomy dataset and the well-formed command should prove useful. The creation of the taxonomy dataset for the microwave with multiple cooking cycles was constructed by the visual configuration utility (see FIG. 52) from the taxonomy capabilities dataset as is illustrated in XML as follows:

```
<device id="microwave" label="Microwave Oven">
    <device id="ovenCavity" label="Microwave Oven">
        <char name="cycle" label="Cycle" default="timedCook">
            <setting name="timedCook" label="COOK" />
                <char name="turntable" label="Turntable"
                default="on">
                    <setting name="on" label="ON" />
    <setting name="off" label="OFF" />
    </char>
    <range name="duration" label="Duration" default="30"
units="seconds" max="6039" min="60" inc="1" />
    <range name="power" label="Power Level" default="100"
units="%" max="100" min="50" inc="10" />
        </setting>
        <setting name="jetdefrost" label="Jet Defrost"/>
            <char name =foodType label ="Food Type"/>
                <setting name="poultry" label="POULTRY" />
    <setting name="meat" label="MEAT" />
    <setting name="fish" label="FISH" />
            </char>
        </setting>
        |
        |
        |
        etc
    </char>
    </device>
</device>
```

If the user of the microwave chooses to Cook for 30 seconds at 90% power with the Turntable On, a well formed command of the taxonomy dataset would be transmitted optionally to the Taxonomy Translator and to the Taxonomy. The command would be of the form:

```
<command id=" microwave ">
    <device id="ovenCavity">
        <sequence>
            <step id="21">
                <char name="cycle" setting="bake"/>
                <char name="power" setting="90"/>
        <char name="duration" setting="30"/>
        <char name="turntable" setting="on"/>
            </step>
        <step id="22">
                <char name="power" setting="70"/>
        <char name="duration" setting="40"/>
        <char name="turntable" setting="off"/>
            </step>
        </sequence>
    </device>
</command>
```

The taxonomy engine would then traverse the taxonomy structure to transform the well-formed command of the taxonomy dataset to a well formed command of the controller of software component 2 of a packet structure B828. The taxonomy structure is a superset of the taxonomy capabilities dataset. For each specifiable command element above (e.g., cycle, power, duration, and turntable) an additional collection of key words and values necessary to form payload B828A would be associated within the taxonomy structure. These key words would include API ID, Op Code, and Position Index into the payload B828A where position index could be a byte offset or a bit offset.

The taxonomy dataset could be constructed to directly represent the universe of possible commands of the APIs of software architecture B10 providing useful functionality for a service, factory, or laboratory engineer or technician.

Figure 48:
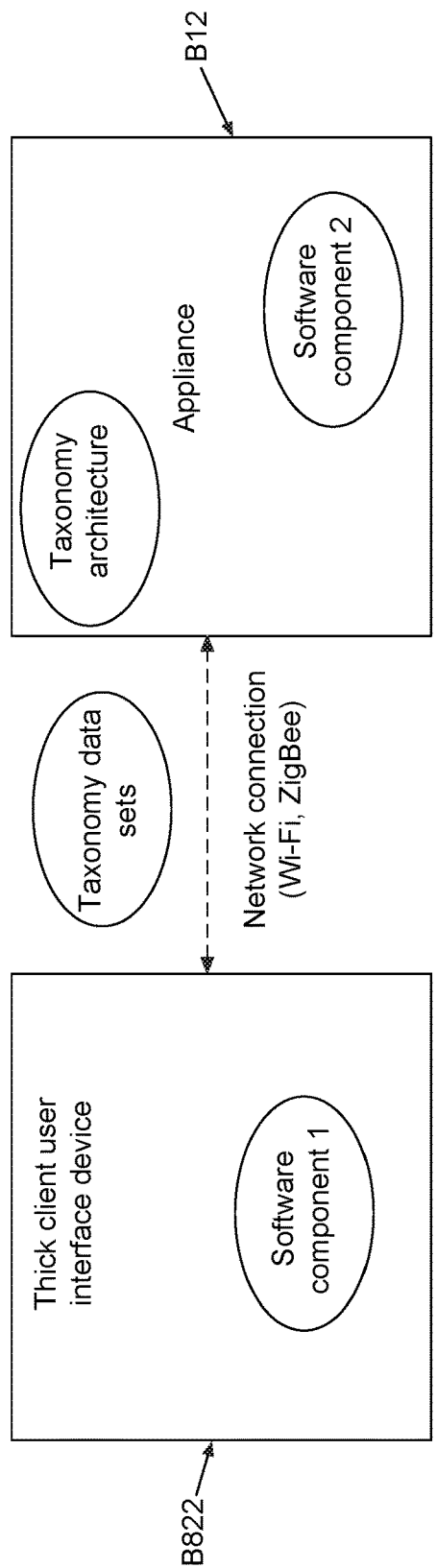
FIG. 48 schematically illustrates one embodiment of taxonomy architecture according to this disclosure.
Figure 49:
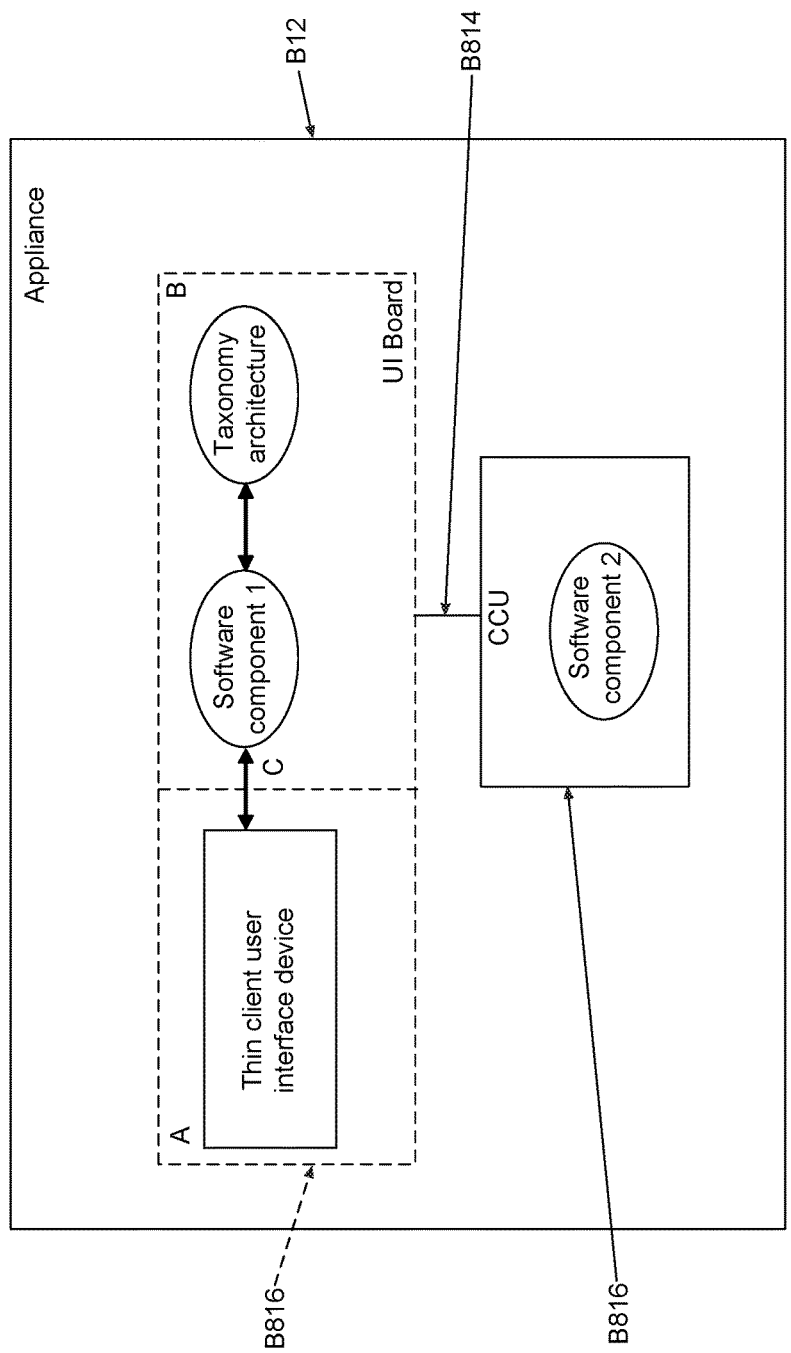
FIG. 49 schematically illustrates a second embodiment of taxonomy architecture according to this disclosure.

It will be understood that the structure illustrated in FIG. 47 is more conceptual than physical. FIG. 48 and FIG. 49 show embodiments of the taxonomy architecture of FIG. 47, partitioned according to the physical architecture of an appliance or an appliance network.

The software component 1 (816B in FIG. 47) is represented as being within a remote client B822, such as a remote controller with a user interface. Consequently, the sub-components of software component 1 B816B (the selection builder, the command generator, and the status interpreter) are specialized for this user interface application. FIG. 48 shows software component B1 in such a user interface device, identified here as a "thick client." A thick client would have the ability to parse a data structure such as an XML document, interpret its meaning, and implement the 'Selection Builder' functionality. Software component B2 and the taxonomy architecture reside in the appliance B12.

FIG. 49 depicts a second embodiment of the taxonomy control architecture where all components are included within an appliance B12. In the structure of FIG. 49 the taxonomy architecture uses a taxonomy translator (not necessary in the embodiment of FIG. 48), thereby rendering the status interpreter of software component 1 to the reduced functionality of an input handler. The UI board in this case comprises an "a" side and a "b" side, each with its own processor. Both sides are connected to each other, preferably by a serial communication "c". The UI board is connected by another connection B814 to a CCU with software component 2, where the connection B814 can be the same type as connection "c", or it can be different. The "a" side is preferably an LCD controller that exposes a low level API, and lacks the full capabilities of a thick client. Hence, the "a" side can be referred to as a "thin client." The "b" side comprises the taxonomy architecture and software component 1.

Figure 50:
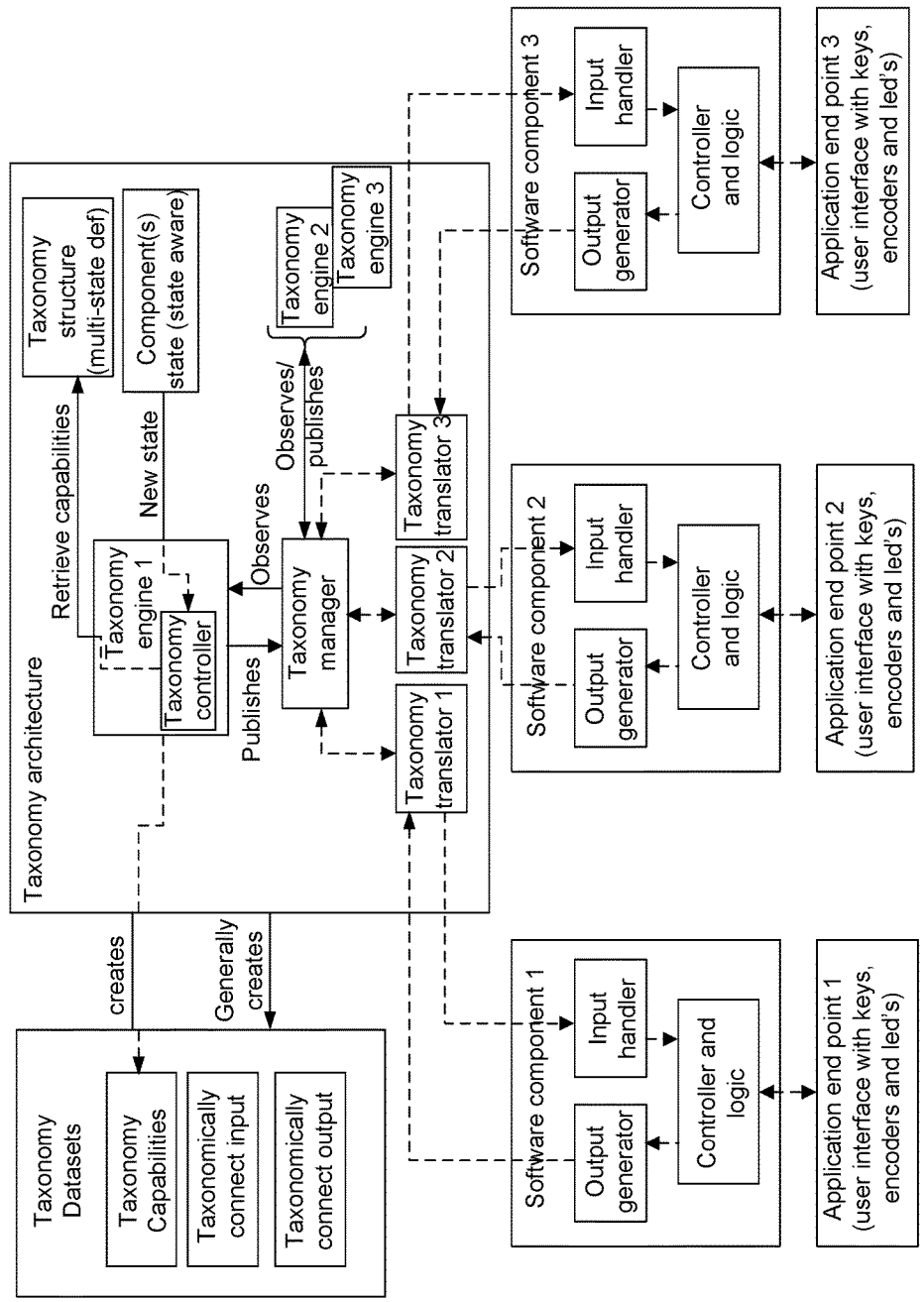
FIG. 50 is a modified version of the software architecture of FIG. 47 for another operating environment.
Figure 51:
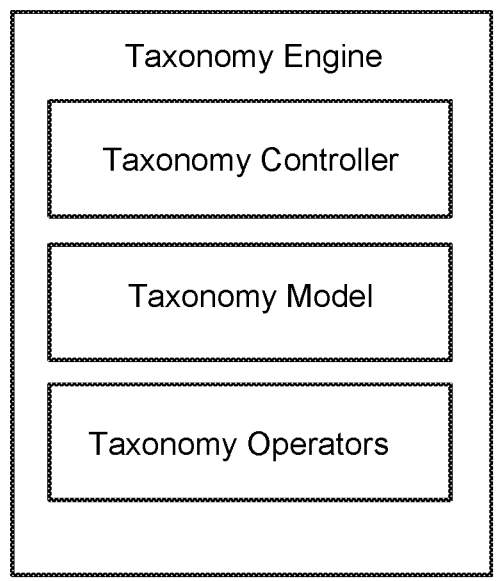
FIG. 51 is a detailed portion of the taxonomy engine of FIG. 50.

FIG. 50 is a more generalized block diagram of the architecture of FIG. 47 with elements rearranged for clarity and to show a less specialized configuration. In FIG. 51, it can be seen that the taxonomy engine comprises a taxonomy controller, a model, and a collection of operators. The taxonomy controller is aware of the state of the componentry for which it is controlling, and is responsible to retrieve from the taxonomy structure the state appropriate taxonomy model and inform the taxonomy engine of the change. This action provides an event to the appropriate taxonomy operator to examine the new taxonomy model and generate a new taxonomy capabilities data set. The taxonomy engine then publishes the new capabilities to the taxonomy manager, who then distributes the new information to the appropriate translators or other software components that have registered for notification.

It will be apparent from FIG. 50 that the selection builder, the status interpreter, and the command generator found in the software component 1 of FIG. 47 are now in the taxonomy translator. Taxonomy translator B2 comprises the selection builder and is responsible for the conversion of taxonomy datasets to software component specific interfaces. Therefore, in this example the software components are not comprised with the functionality of interpretation or generation of taxonomy datasets. Rather, they are comprised with handling inputs from the translator and sending outputs to the translator.

It is contemplated that a taxonomy architecture, through the use of multiple translators, can simultaneously connect to software components similar to software component 1 of FIG. 47 and software component 2 of FIG. 50.

Figure 52:
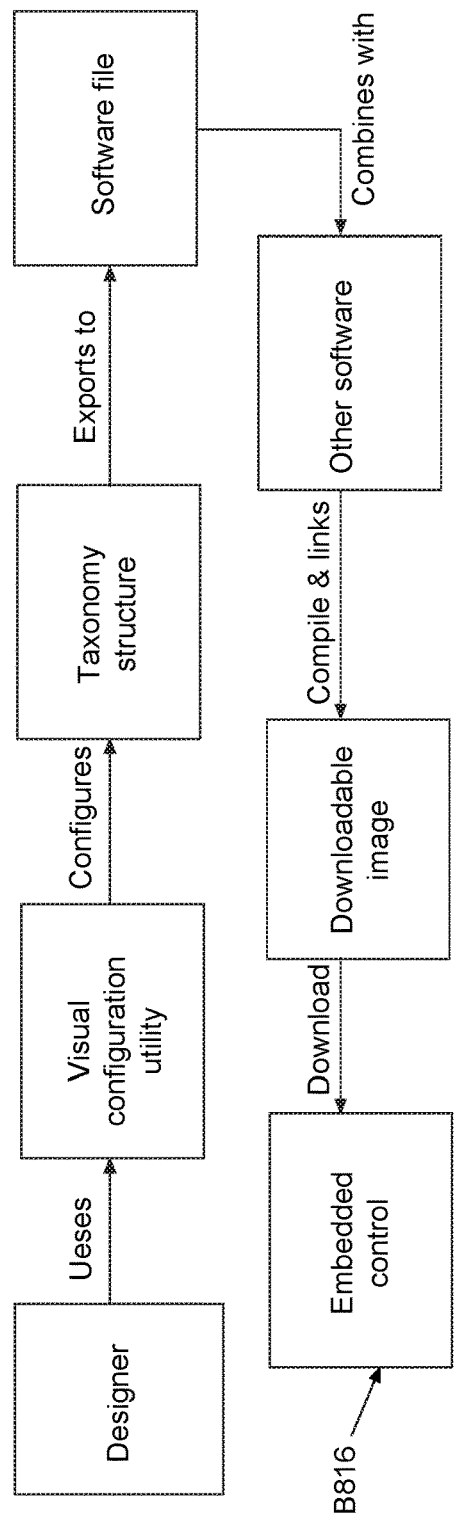
FIG. 52 schematically illustrates a method utilizing the taxonomy architecture according to this disclosure.

Looking at FIG. 52, it is generally known that complex data structures have tremendous advantages because they can be easily varied and re-used with a single complied source code. But this complexity can be troublesome to understand, create, troubleshoot, debug, explain, and generally manage. Object oriented languages provide some level of hiding complexity relative to non-object oriented languages such as C. Similarly, XML data structures are human-readable, in contrast to byte arrays, and therefore can eliminate complexity. But it is currently cost prohibitive to implement technology such as XML or Java in most appliances for domestic use. This disclosure offers a visual configuration utility that simplifies handling complex data structures at much less cost than known systems.

Following the flow of FIG. 52, a designer in step B1 starts the visual configuration utility. A designer can be someone who does the role of product or feature planning, user experience, or user interface design, engineering, or anyone else with a need to retrieve value from or provide value to the information contained by an instance of a configuration held within the memory of the visual configuration utility. In step B2, the designer uses the configuration utility. In this step, the design will load a configuration file from a persistent store such as a hard drive or database or web site. Alternatively, it may be checked out from a document version control system such as visual source save.

In step B3, the designer creates a new configuration comprising a taxonomy structure or begins editing an existing configuration comprising a taxonomy structure. The editing process includes steps like adding new taxonomy elements, deleting taxonomy elements, moving taxonomy elements, or modifying the properties of a taxonomy element. Other sub-steps of step B3 may include binding taxonomy elements to message identifiers or functional identifiers of arbitrary software components of which taxonomy elements either relate to or represent. In step B4, the designer will save the taxonomy configuration appropriately and notify the appropriate office mates such that if one of the office mates is the appropriate controls development engineer, he may immediately acquire the saved taxonomy configuration file and begin step B5. In step B5, an appliance controls development engineer will generate a software and software data file appropriately configured such that a compiler can be invoked preferably from the Visual Configuration Utility to create a downloadable image appropriate for execution by a processor. Further, the controls development engineer will combine the generated software and software data file with a plurality of other arbitrary software components. Preferably, the Visual Configuration Utility can accomplish this task. In step B6, the appliance controls development engineer will invoke the compiler on the combined file and the compiler will generate a downloadable image. And in step B7, the appliance controls development engineer will download the downloadable image to the embedded appliance control processor and test the result. At any step in the process, the process actor may stop activities and move another step taking appropriate action to mitigate the incomplete step and/or the potential re-ordering of steps.

Figures B28 and B29 depict an application built using a proprietary application framework. The taxonomy visual configurator of FIG. 53 would be used as a rule set to develop taxonomy structures. Once the taxonomy structure is configured visually, it can be transformed and exported into a functionally equivalent complex embedded data structure. (See step B3 of FIG. 52) Note how the taxonomy structure comprises multiple taxonomy structures, each associated with a unique appliance state. Examples of unique appliance states are found in FIG. B7.

Figures 53, 54:
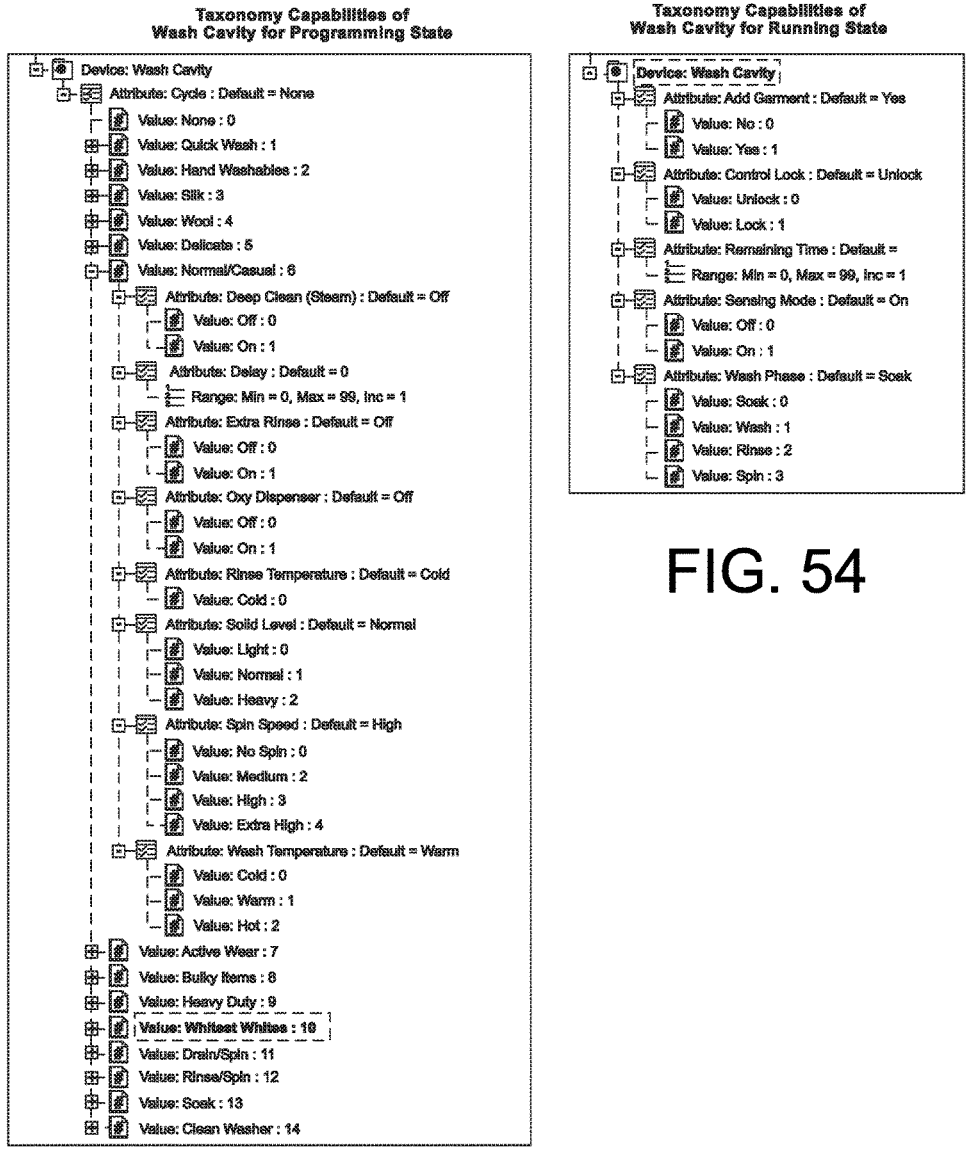
FIG. 53 illustrates an exemplary data structure used in the taxonomy architecture of this disclosure.
FIG. 54 illustrates a second exemplary data structure used in the taxonomy architecture of this disclosure.

Looking more closely at the example of FIG. 53, it can be seen that there is no wash phase definition. This is because wash phase is not a valid feedback until the appliance is in running state. In FIG. 54, there is no cycle definition. This is because during running, the cycle definition cannot be changed.

The data structure of FIG. 53 and FIG. 54 is very powerful and is the heart of the taxonomy architecture. It consists of a nested tree of elements where each element of the tree has a type where that type dictates to the taxonomy operators of FIG. 50 how to properly traverse and extract information from the Tree. Attributes should have corresponding Active Values which are one of the child Values of the plurality of child Values. Attributes contain a plurality of child Values which represent the valid selections of the Attribute. A Value which contains a plurality of Attributes is a Value which must be further specified by having each contained Attribute be defined by its contained active or selected Value. When a child Value is selected or active, the taxonomy operator looks to see if the child Value contains children of the Attribute Type. If so, the taxonomy operator continues the tree traversal repeating the function of the taxonomy operator on the next level of the tree. Ranges are children of Attributes and are equivalent to a plurality of Values which can be mathematically derived from the values of Min, Max, and Inc.

The information contained in the data structures of Figures B28 and B29 is therefore more useful than one would at first realize. For example, taxonomy operators can be written to do a variety of useful functions across a number of the elements of the taxonomy architecture, especially when there is a graphical user interface or an external client. A first taxonomy operator could use the data structure to determine what content should appear on a user interface. As a user makes selections on the user interface, the first taxonomy operator could re-examine the current active selections of the user and repopulate the user interface with the new valid user selections and the valid options of each. A second taxonomy operator could be informed of changes to the appliance state. Upon change to the state of an appliance, the second taxonomy operator could retrieve a new taxonomy capabilities dataset so that the user interface could be repopulated based on the new valid selections and or new valid operators for each. A third taxonomy operator can be configured to receive taxonomically correct inputs and check to see that the input corresponds to a valid well-formed command. The third taxonomy operator would accomplish this by walking the taxonomy structure in the taxonomy architecture of FIG. 50. The third taxonomy operator would evaluate all of the potential roots of the taxonomy structure and find a corresponding root identifier in the taxonomically correct input structure. From the root, the third taxonomy operator would begin to recourse down the tree, determining which branches of the tree to continue down by finding a corresponding identifier in the taxonomically correct input structure. When the third taxonomy operator reaches the end of the tree or alternatively exhausts the elements in the taxonomically correct input structure having used all of them at least once, a valid taxonomically correct input structure is determined if both there are no other un-accounted for elements in the taxonomically correct input structure, and there are no child elements remaining un-walked in the taxonomy data structure. This third operation is the equivalent of portable state-based business logic enabling the thin client 22 of FIG. 48 to be completely devoid of any logic associated with the operation of the appliance. The benefit of this is that user interfaces and all external clients with proper communication and taxonomy dataset interpretation operators can be developed with only knowledge of how to interoperate with taxonomy datasets, and therefore can be devoid of all knowledge of the connected device with which it is in operable communication.

With further consideration of a consumable holder introduced to an appliance having a service interface, the consumable holder could comprise, in addition to data about a cycle structure and data about itself and data about a consumable, a new taxonomy structure representing an incremental change to the appliance taxonomy structure or reflecting a new net per state operational capabilities of the appliance and/or the consumable holder. Additionally, the incremental change and the new net per state operational capabilities could affect the user interface of the appliance in response to a new taxonomy capabilities dataset at the user interface. The new taxonomy capabilities dataset is a subset of the new taxonomy structure. Example changes appearing in the user interface include new default attribute values, new cycles, new options, changes to cycles, changes to options, the selectable and non-selectable valid values thereof, etc.

A plurality of well-formed commands can be derived from a taxonomy dataset derived from the operational capabilities of an appliance. In this case, the taxonomy structure of Figures B27-29 could be created by an authoring tool such as a visual configuration utility shown in Figures B27-29 and provided as a data source to the consumable provider so that the consumable provider could extract a plurality of well-formed commands for associating with the consumable and/or article such that a consumable information holder could provide the plurality of well-formed commands to the cycle architecture 69 contemporaneous with its introduction into the use environment so that the cycle of operation of the appliance 12 and the user interaction with the appliance 12 through the user interface such as one shown in FIG. 17 item 110 can be effected by the commands.

User Interface

Returning to FIG. 17 shows a user interface 110 that can be used with the consumable holder 16 according to this disclosure. The user interface 110 is a user interface that can communicate with one or more appliances B12. Preferably, the user interface is a graphical user interface or GUI. The user interface 110 can be integral to an appliance B12, or the user interface 110 can be positioned remotely from the appliances B12, such as is illustrated in FIG. 17. For example, the user interface 110 can be positioned in a central location in the home or can be portable within the home. The user interface can provide many, if not all, of the functions associated with a traditional user interface of the appliance 12 and can include additional functionalities. The user interface 110 can have any suitable form, such as a monitor, including a touch panel monitor. Other examples of the user interface 110 can include, but are not limited to, a remote keypad, a phone, a personal computer, a voice recognition device, a voice generation device, a sound generation and recognition device, a remote control, a user interface of a home automation system, a user interface of a component different from the components of the appliance, a television, a device that plays recorded music, a device that plays recorded video, and a personal digital assistant. According to one embodiment, the user interface 110 can be employed in addition to the traditional user interfaces on the appliances associated with the remote user interface. Alternatively, the appliances associated with the user interface 110 do not include a separate user interface that physically resides on the appliances. Furthermore, the user interface 110 can be used in conjunction with the above-described combination appliance/home automation system.

The user interface can be a source of information associated with a consumable B24, including information about or consumable holder 16 or about an article with consumable holder capabilities. As discussed previously, the appliance 12 can include sensing, meta-data, discovery protocols, databases and the like and any combination thereof and other forms of identification of information associated with a consumable B24, a consumable holder B16, or an article with consumable holder capabilities. The appliance 12 can also enable the user to manually input information associated with a consumable B24, including data about a consumable 24 or a consumable holder B16. In this case, the GUI prompts or the user navigates to a screen to input information about a consumable 24 or consumable holder 16 or an article with consumable holder capabilities. This could be in the form of questions that the user answers. For example, the GUI might show the user pictures of consumables, consumable holders, cartridges, bulk dispensers and the like and have them select the appropriate picture. This selection would then be translated into information about a consumable or consumable holder. In a second example, the GUI would provide a form to fill out with standard drop down boxes, radio buttons, text input fields, and the like so that the user could fully construct and input the information about a consumable or consumable holder into the GUI.

Information associated with consumables can be displayed on a user interface that is operably connected to the network. Further, a user interface 110 can send a first network message, resulting in a network message on the network being received by a consumable holder B16. The network message can be the first network message or a second network message in response to the first network message wherein the network message can affect the configuration, enablement, functionality, or operation of the consumable holder 16 or the appliance B12. In one example of information received by a user interface effecting the functionality of a consumable holder B16, shown in FIG. 39, the user enters, in message B8, the chemistry option selection and in message B6 the user enters the cycle options. In message B17 and B18, the consumable holder determines the dispensing amount using the chemistry option selection. In a second example, an arbitrary software component residing in the consumable holder might require user credentials to authenticate the user whereby the authentication may be a pre-requisite to the enablement of the consumable holder B16. In a third example where a consumable holder 16 is also functioning as a smart coupler as shown in FIG. 27, 1042 a user interface could receive network configuration information such as a node id from a user enabling the smart coupler 1042 to participate on network 1070.

A user interface 110 can also play a role in the linking of user preference data to the data associated with the combination of operational cycles and appliances so that the user can create or modify operational cycle data, optionally associate the data with at least one appliance, and link the data to user preference data. An example of user preference data would be a name like "Maria's Cookie Recipe," "Sarah's Brownies," or "Williams Beef Stew". The preference data can be stored and an identifier linking the preference data to at least one operational cycle and to at least one combination of operational cycle and an associated appliance. Subsequent to the storage, the user interface 110 can display the user preference data for selection by a user or remember the preference data for subsequent use and infer the selection of preference data via user recognition.

Additionally, a user interface acting as an external client 1004, 1002 (see FIG. 27) can connect to a consumable reader and send information about a consumable to any appliance on an appliance network as shown in FIG. 27 for the purposes previously explained. In this way, the cost of the consumable reader is spread over the appliances on the network. Alternatively, any appliance with a consumable reader and an optional LCD screen could send information about consumables or information about cycle structures to other appliances on an appliance network. Discovery and Propagated messages can be used to associate appliances on a network with the appliance having a consumable reader. Likewise, an appliance having an LCD screen could receive information allowing the association. In this way, a first appliance could send to a second appliance information associated with a consumable to effect a cycle of operation of the second appliance.

Further, a user interface in communication with a source of information about a consumable, e.g. a consumable holder, performance tag, or data pod, could display messages from the consumable. Messages could comprise warnings such as static warnings included with the source of information about a consumable and dynamic warnings based on other information, such as information about an appliance, information reported by an appliance cycle of operation, a user, a user selection, and the use environment, or information associated with a consumable. For example, a warning could be that too much detergent was introduced into the wash for the cycle selections of small loads and delicate fabric. This kind of warning could be generated by the consumable holder or the other controllers 68 and displayed on the user interface and sent as a network message to any node in communication with the consumable holder or appliance.

The user interface can be configured to render multi-media information in its communication of information to the user. Such multi-media information includes representations other than text. Examples of multimedia information include sound clips, ring tones, songs, images, pictures, graphics, video clips, animations, office documents, PowerPoint slides, stylized text, boldness, size, and color, lines, shapes, symbols, and clip art.

User Instructions about a Cycle Structure in a Consumable Information Holder

Consumers want superior performance from their appliances. Superior performance is often judged according to the condition of article on which the appliance cycle of operation operates during or after the cycle of operation. Appliance performance, as perceived by the user, can be drastically affected by steps the user may take to adequately prepare the article for the cycle of operation, steps the user may take to handle the article during the cycle of operation, and steps the user may take once the cycle of operation is complete. These steps can include activities associated with any combination of the article, one or more consumables, one or more appliances, one or more appliance accessories, one or more consumable holders, and the configuration of one or more arbitrary software components. Examples of preparation steps include pre-wash for dishes, pre-treatment for clothes stains, defrosting frozen foods, applying ingredients like spices, oils, or condiments to food, shaking a liquid additive like a turkey basting solution, boiling a pot of water, removing a food item from a package and placing it in a micro-wave sleeve, mixing an egg with the contents of a box, checking inventory of needed ingredients, ordering ingredients, shopping for ingredients pushing certain buttons, making a selection on a user interface, rearranging articles in the appliance, checking the appliance, and the like. Examples of handling steps during a cycle of operation include removing the article from the appliance for stirring, turning, flipping, applying ingredients like spices, oils, or condiments, and the like, adding a consumable or ingredient to the appliance, pushing certain buttons, making a selection on a user interface, rearranging articles in the appliance, closing and opening doors or lids, and the like. Examples of steps to be taken after the cycle of operation is complete include cooling, applying ingredients like spices, oils, frostings or condiments, mixing with other foodstuffs, hanging up, hanging out, ironing, folding, initiating new preparation steps for another cycle of operation of an appliance for the article, consuming the article, arranging the article, drying the article, appropriately storing the article or preserving the article (as in refrigerating or freezing within an appropriate container for an appropriate amount of time), examining the article, replacing the article, replenishing the article or purchasing a new article, replenishing, ordering, or purchasing the consumables used in association with the article, subscribing to subscriptions associated with the article or the consumables used in association with the article, pushing certain buttons, making a selection on a user interface, rearranging articles in the appliance, cleaning surfaces, and the like.

If accurate information could be readily available which would properly instruct the user as to the proper steps of preparation, handling, and post handling (steps after the cycle of operation is complete) to take in accordance with the article or the use of at least one consumable with an article and could be practically conveyed to the user, perceived performance could be drastically improved.

Presently, accurate information, if it exists, must be read by the user from printed instructions on such things as boxes, tags, books, and the internet.

A consumable information holder associated with any of a consumable, a consumable holder, an article, or an article holder could comprise data associated with proper steps of preparation, regulation, and post regulation (steps after the cycle of operation is complete) to take in accordance with the article or the use of at least one consumable with an article. The data could be practically rendered on a user interface in communication with the consumable information holder. An article could have more than one consumable information holder, and multiple articles, each having one or more consumable information holders, can be operated on by an appliance at the same time. A device such as consumable reader can perceive the information from the consumable information holders and render the information to a user interface. The user interface can be interactive so that the user can be guided by the user interface to perform an ordered collection of steps comprising one or more preparation steps, handling steps and post handling steps. On an interactive user interface, the user can enter data affecting the ordered collection, including acknowledgement of the completion of steps, changing steps, actions and transition conditions in a cycle of operation, seeking help, asking inquiries, and the like.

Credentials

The software architecture 1018 can be configured such that the consumable 24 or consumable holder 16 must present electronic credentials (i.e., authentication) before communicating with the appliance B12. Requiring electronic credentials prevents unauthorized communication between the consumable 24 or consumable holder 16 and the appliance B12, thereby avoiding undesirable control of the appliance 12 by the consumable 24 or consumable holder B16. The security techniques disclosed by incorporated WO2006135726, including a firewall, work well for the software architecture 1018. Other possible authentication mechanisms can be used to gain access through the firewall. These can include but are not limited to a hardware signal, a sequence of messages, a handshaking algorithm, or a standard encryption algorithm. Any standard authentication method can be used to gain access to communication capabilities, as long as it is possible to verify that a particular consumable 24 or consumable holder 16 is authorized to gain access.

In addition, the disclosed three basic levels of access to the firewall (access, deny, and temporary access) can be expanded as necessary to enable different levels of access to different consumables 24 and consumable holders B16. These access levels can each have a unique authentication, such as a unique password, and can be associated with different user roles. Different user roles can include but are not limited to a service technician, factory tester, developer, or consumer. Different levels of access allow different sets of commands to be executed or prompted by the consumable 24 or consumable holder B16. These levels can be temporary and time bound, or permanent once authentication is successfully completed.

The implementation of the firewall can vary as needed. The disclosed implementation uses a table of protected commands to validate against different clients, including consumables 24 and consumable holder B16. Any number of data structures can be used to validate a user with the allowed commands for an access level of the firewall. In the end, a firewall must only allow access to commands to the appropriate clients that have successfully been authenticated.

Smart Couplers

Returning to FIG. 27 illustrates an appliance 1000 similar to appliance 12 connected to external clients 1002, 1004 and a second appliance 1006, which is also similar to appliance B12, by a plurality of networks. A first network 1030 comprises a first internal client 1010, a second internal client 1012 and the external client 1002. A second network 1050 comprises the external client 1004. And a third network 1052 comprises the second appliance 1006. Each client is characterized as a node on the respective network. Local clients are clients that communicate with nodes on the same network. Remote clients are clients not directly coupled to the same network as the node to which they are communicating. In this embodiment, external client 1004 would be a remote client of the nodes on the first network 1030, such as client B40 in a consumable holder B16.

Each client node 1002, 1004, 1010, 1012 comprises a software architecture driver (SA driver) 1016 for exchanging messages with any node having a SA 1018, which is similar to software architecture 1018, thereon. The nodes on any given network are in operable communication with the other nodes in that network and are optionally in communication with the nodes present on other networks.

The appliance 1000 further comprises at least one node 1020 having the SA thereon. The second appliance 1006 will also likely have a node with the SA on it, and may have one or more clients as well. The first network 1030 also comprises the node 1020.

Couplers 1040, 1042 are special devices that connect to the appliance and/or to a network and/or to two or more networks and communicate therebetween. Each coupler can comprise all the functionality of a node, and each node can comprise all of the functionality of a coupler. In this embodiment, the coupler 1040 couples the second network 1050 to the third network 1052, and can function as a node on each network. The coupler 1042 couples the second network 1050 to the first network 1030. It could also be considered as coupled to the appliance 1000.

Either of the couplers 1040, 1042 can propagate discovery messages issued by the SA or an SA driver across the networks in order to enable the SA and SA drivers or their coupled arbitrary software components to develop references to identifiers of functionality for the different nodes. Each coupler 1040, 1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers 1040, 1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol 1062 discussed previously herein, a proprietary appliance network protocol utilized by Whirlpool Corporation. For a client not having WIDE network protocol that needs to communicate WIDE messages (e.g., external client 1004), a WIDE driver 1064 can be used. A port driver 1072 couples the external client 1004 to the network 1050.

Each node can also comprise an arbitrary software component 1060. The couplers 1040, 1042, for example, may not. The SA driver 1016 is a software element configured to allow an arbitrary software component to communicate with the SA 1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver 1016 can receive and at least partially interpret messages from the SA and/or from another SA driver, which are specified as feedback events. In some instances, the SA driver 1016 can also send command messages to the SA 1018. In this respect, the external clients 1002, 1004 can have full capability act as an accessory to communicate with and to enhance or alter the operation of the appliance.

It will be understood that any or all of the external clients 1002, 1004, the couplers 1040, 1042, and the internal clients 1010, 1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

The consumable holder 16 can contain all the functionality and components of a smart coupler 1040, 1042 and participate in all the embodiments of a smart coupler in communication with an appliance 1000, B12. Therefore in one embodiment, a consumable holder 16 is a smart coupler which further physically contains a consumable 24 and that can also be enabled to directly actuate the introduction of a consumable 24 into an appliance. Similarly, the consumable holder 16 can be a client (internal as at 1010, external as at 1002, or remote on a different network as at 1004) and communicate with an appliance 1000, B12, 1006, either directly or via a smart coupler 1042, 1040.

Likewise, the consumable reader 22 can contain all the functionality and components of a smart coupler 1040, 1042 and participate in all the embodiments of a smart coupler in communication with an appliance 1000, B12, 1006. Therefore in one embodiment, a consumable reader 22 is a smart coupler which further retrieves information about a consumable 24 and communicates that information to an appliance. Similarly, the consumable reader 22 can be a client (internal as at 1010, external as at 1002, or remote on a different network as at 1004) and communicate with an appliance 1000, B12, 1006, either directly or via a smart coupler 1042, 1040.

Discovery

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered.

Where more than one network is connected by a coupler, such as couplers 1040, 1042, a message received by the coupler from one network can be propagated and sent to the second network. The coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e., a sent message that is also unknowingly received by the sender on a second network to which the sender is coupled. At least the coupler 1040 may have a routing table including proxy identifiers of the functionalities of the second node. As well, the coupler 1042 may have a routing table including proxy identifiers. A discovery message sent by the node 1020 is received by the coupler 1042, which evaluates the message in accord with the routing table and propagates the message to the next node, coupler 1040. Similarly, the coupler 1040, evaluates the propagated message in light of the routing table, and propagates the message to the next node in line, which may be the second node.

See, for example, FIG. 28 illustrating a system where resources in an appliance can be monitored, managed, or changed. A likely scenario has a coupler 2000 connected to an appliance 2002 similar to appliance 12 by a network 2004. The coupler 2000 also connects to a coupler 2006 via network 2008 that may be a different type of network from network 2004. Coupler 2006 connects to a source 2010 of information about resources used or generated by the appliance 2002 by a third network 2012 that may be a different type of network from either network 2004 or network 2008. Assume that the source 2010 wants to send information about the resource to the appliance 2002. This disclosure enables a node in the source 2010 on network 2012 to communicate with a second node, having SA for example, which may be among several on the appliance 2002. We assume that the source 2010 has at least an appropriate communication driver, or one of the couplers has software to translate any message from the source to the communication protocols of the incorporated WO2006135726, for example.

In this scenario, the source 2010 sends a discovery message over the network 2012 seeking any consumer of resources to which the source wants to send information. The coupler 2006 receives the discovery message, translates the message, if necessary, and propagates the discovery message to the next nodes over the network 2008, including coupler 2000. Coupler 2000 receives the discovery message, translates the message, if necessary, and propagates the discovery message to the next nodes over the network, including the appliance 2002. The relevant nodes in the appliance 2002 evaluate the message and determine a discovery reply message, and send respective replies. Here, we assume at least one reply is positive.

The discovery reply message is received by the coupler 2000, which populates its routing table and sends it to the coupler 2006, which populates its routing table and sends it to the source 2010 in accord with the foregoing process. Each node retains the relevant identifiers so that subsequent message can be communicated without repeating the discovery sequence. As well, those nodes with memory, such as the couplers, can be configured to save messages.

With this structure, a source of information about a resource such as electricity, hot water, gray water, gas, water, replaceable parts, or other consumables, can request a change in the operation of the appliance based on the information. For example, if an electric utility is facing a brownout, a source of information about the electricity can request that an electric dryer not commence an operation for a period of time. Similarly, a source of consumables, such as filters or spare parts, can ascertain from an appliance the status of the consumable and send information about the timing and availability of replacement.

Likewise, the consumable holder 16 can affect the cycle of operation of the appliance connected thereto in response to information from a source of consumables or to information from a source of information about a resource. The consumable holder 16 can also initiate, respond to, and/or propagate discovery messages. Further, the consumable holder 16 can create and or comprise network routing information.

FIG. 29 illustrates the transfer of an operation cycle accessory between two appliances, Appliance B1 and Appliance B2. A removably coupled operational cycle accessory B3 has, as part of its data portion, data which is associated with an identifier of a particular appliance. In this way, when the cycle engine 73 in either Appliance B1 or B2 seeks data, it can include in its request an identifier that will determine the correspondence of the data retrieved from the data portion table for the identifier. With this capability, the operational cycle accessory B3 can be removably coupled with more than one appliance and is operable with as many appliances at the data portion table has identification support for.

Likewise, when an arbitrary software component configures the cycle engine 73 through communications, the arbitrary software component can first interrogate, through useful communications, the appliance to ascertain its identification whereby that identification is used with the data portion table to retrieve the appropriate data about the cycle structure to be built. The arbitrary software component can then send messages to the API of the cycle engine 73 to build the appropriate cycle structure 71 for the appliance.

Consumable Reader as a Smart Coupler

Figure 37:
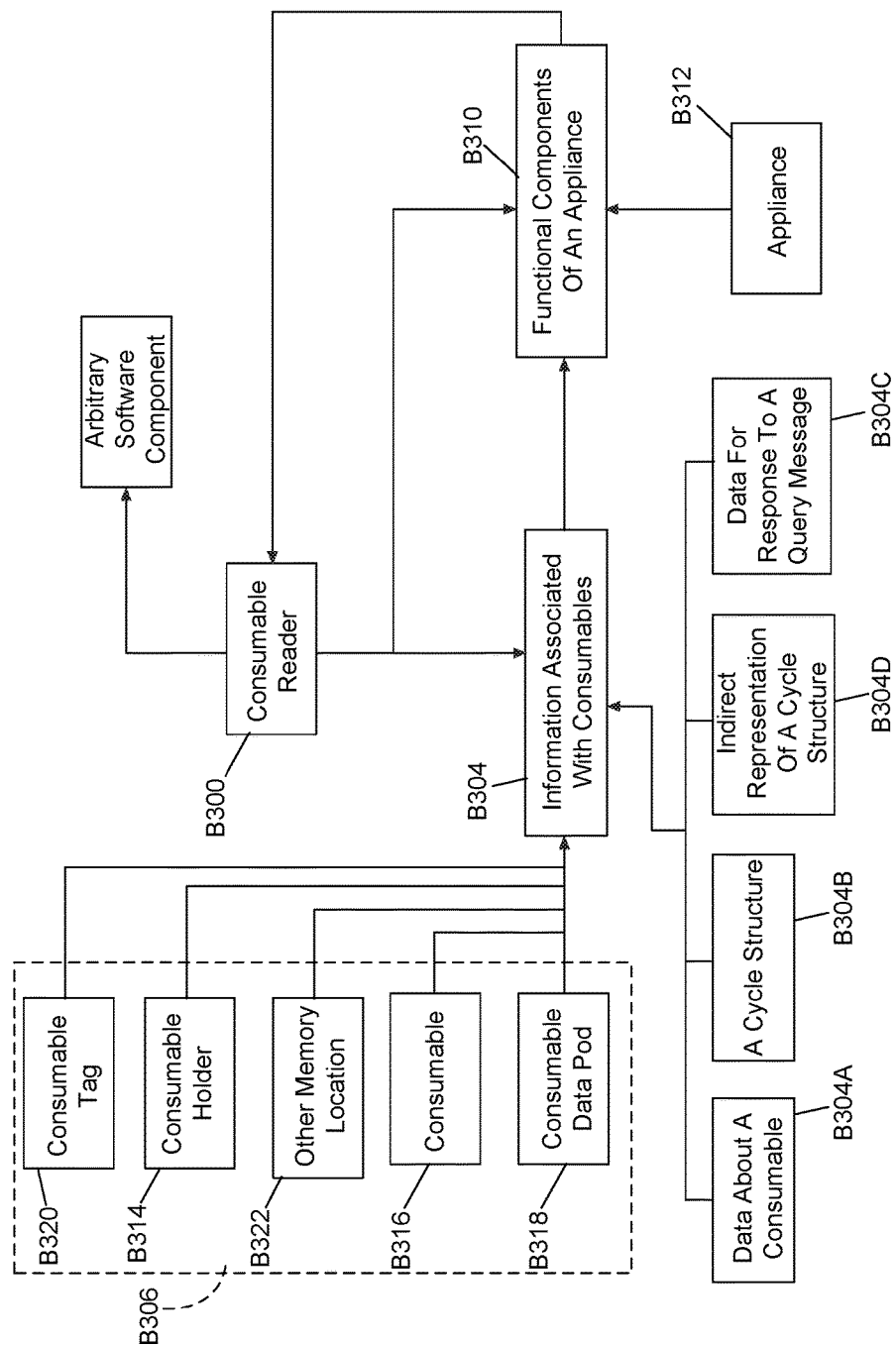
FIG. 37 is a schematic diagram showing the operation of consumable reader with an appliance that is affected by information associated with a consumable.

Looking at FIG. 37, a consumable reader B300 is configured to obtain information associated with consumables B304. One or more consumables B304 may be contained in one or more consumable holders B314 similar to the aforementioned consumable holder B16. The consumable reader B300 can be a form of a smart coupler as in FIGS. 11 and 27. In such case, one purpose of the consumable reader B300 comprises obtaining information associated with consumables B304 and communicating all or a portion of that information to at least one functional component B310 of an appliance B312 resulting in an effect to a cycle of operation in the appliance B312 or in the consumable holder B314. As discussed previously, the consumable 24 can be an article. In one embodiment, the appliance B312 comprises at least one instance of a cycle architecture 69 and an optional cycle operations accessory or functional component B310. Typically, an appliance B312 similar to appliance 12 comprises the functional component B310. The information associated with consumables B304 obtained by the consumable reader B300 can thus include not only data about a consumable B304A, but also a cycle structure B304B, data for a response to a query message from a functional component B304C, and indirect representations of a cycle structure B304D. Any or all of the data can optionally be in the form of at least one well-formed message according to a packet structure or a portion thereof. One example of a packet structure is the SA packet structure disclosed in the incorporated WO2006135726. As mentioned earlier, data about a cycle structure B304D can include direct commands to the functional component B310 or parameters about operating cycles, including user preferences or environmental parameters.

More examples of information associated with consumables B304 include the quantity of consumable pieces, quantity by volume or by weight, date of manufacture, manufacturer, data about its transit from manufacture, distributor, market, and consumer, data about the temperature during transit, nutritional information like calories, fat grams, percent daily allowance of essential vitamins and minerals, a list of medical conditions under which a consumable should not be consumed, data about the relationship between the consumable and known diets, known medical conditions, and known reactions to known medications, and the like. The information associated with consumables B304 can further include appliance or component identifier data in accord with the messaging protocol of the software architecture. Yet further, information associated with consumables B304 can include condition of the consumable, initial conditions for the consumable, data relating to a fill process for the consumable holder, an attribute of the consumable, an attribute of a sensor, an attribute of the consumable holder, a notification trigger rule associated with the consumable, historical information about the consumable, usage instruction relating to the consumable, dietary and allergenic information relating to the consumable, purchasing information, advertising information, recipe information, supply chain information, ingredient information, usage information relating to the consumable, country of origin for at least one of a plurality of ingredients in a consumable, energy consumption attributed to the making and delivering, information relating to carbon emissions in the making and delivering, information relating to the un-natural agents used in the making and delivering, information relating to the environmentally friendly agents used in the making and delivering, information about the treatment of animals in the making and delivering, information relating to the working conditions used in the making and delivering, and information relating to the toxic agents used in the making and delivering. Information about un-natural agents associated with a consumable can include such things as data about pesticides, steroids, and fertilizers associated with the manufacture, delivery or composition of the consumable.

As mentioned earlier, information associated with consumables B304 will be in a consumable information holder B306 that will typically be a memory location somewhere. That memory location can be in the consumable holder B314, or on a surface on a consumable holder B314, which can be one of a bag, a box, a carton, a bottle, a can, a bowl, a dish, a plate, or any other rigid or semi-rigid body suitable to contain a substance. Information can be stored on a removably coupled article comprising memory attached to the surface of the consumable holder B314, such as a performance tag B320. Information can also reside on a consumable B316 itself if the consumable were enabled to store retrievable information as by etching, embossing, or imprinting. An example of a consumable B316 enabled to store retrievable information would be food with information directly printed on or etched into the food using edible ink. Another option is a consumable data pod B318, which is an article comprising memory enabled to store retrievable information about a consumable. An example of a consumable data pod is an article containing data about a consumable potentially further comprising consumable metadata. Consumable meta data can be such data as quantity of consumable pieces, quantity by volume or by weight, date of manufacture, manufacturer, data about its transit from manufacture, distributor, market, and consumer, data about the temperature during transit, nutritional information like calories, fat grams, % daily allowance of essential vitamins and minerals, a list of medical conditions under which a consumable should not be consumed, data about the relationship between the consumable meta data and known diets, known medical conditions, and known reactions to known medications, and the like. The consumable data pod B318 is preferably consumed by the appliance cycle of operation that also operates on the consumable without degradation to the consumable or to the overall objective of the process operating on the consumable. Information can also reside on a performance tag B320 attached or affixed to an article, as in the case of an RFID tag applied to a laundry article.

As well, information can be stored in any other memory location B322, such as memory within a node in the appliance B312 or within the consumable reader B300 itself. The information associated with consumables B304 can be stored in removably coupled memory within the consumable reader B300. It should be understood that, in all cases, information associated with consumables B304 can further include appliance identifier data enabling the functional component to receive the most appropriate data about a consumable according to the connected appliance B312.

In one embodiment, the functional component B310 detects the coupling of the consumable reader B300, queries the consumable reader for information associated with consumables B304, and a cycle structure B71' (see FIG. 36) is created according to the data about the consumable.

In another embodiment, the consumable reader B300 is given or infers a 'start command' in which it selectively retrieves data about an operating cycle, changes the mode of a software operating layer of the appliance, and commands an alternate software layer of the appliance according to the data about an operating cycle. The consumable reader B300 can then retrieve data about an operating cycle, establish communication with the functional component B310, and create a cycle structure. In one variation, the cycle structure is created in the memory of the consumable reader B300 and the consumable reader uses the technique of the first embodiment to perform the cycle of operation.

The consumable reader B300 can further comprise an arbitrary software component B324 of the functional component which creates the cycle structure by communication with the API of the cycle engine, preferably using an embedded virtual router and discovery messages to establish a reference to the cycle engine's API. See FIG. 36.

In certain embodiments, at least one cycle structure is present in the memory of the consumable reader B300, and at least one cycle structure is present in the memory of at least one appliance functional component B310. The cycle structures can be functionally aggregated such that the cycle architecture is disposed to selectively operate in response to either cycle data structure. In this case, a user interface can be used to aggregate information about an appliance operating cycle from more than one component for display, modification, or selection by a user.

The functional component B310 can selectively detect the coupling of the consumable reader B300 to an appliance B312, and the consumable reader is given or infers a 'start command'. Upon the selected event, the cycle of operation of the appliance B312 can obtain and communicate with the information associated with consumables B304. This direct communication with the information associated with consumables B304 is facilitated by the consumable reader B300 acting as a smart coupler. Alternatively, direct communication is facilitated by memory within a node in communication with an executing operation cycle previously populated by the consumable reader that is acting as a smart coupler.

The consumable holder B16, B314 can include or can be coupled to a consumable reader 22, B36, B300. When a consumable holder further comprises a controller such as controller B32 (see FIG. 35) in operable communication with a network, the consumable holder 16 is a smart coupler in that it is the mechanism to transfer data from the consumable information holder B306 to a node on the network. The consumable holder 16 can also be a consumable reader B300 in that from the perspective of a first node of the network, the consumable holder 16 is the node on the network that supplies the functionality of the consumable reader B300. Therefore in one embodiment, a consumable holder is at least one of a smart coupler and a consumable reader that further physically contains a consumable and can also be enabled to directly actuate the introduction of a consumable into an appliance.

Message Binding

Further explanation of message binding may be helpful with respect to the incorporated disclosure of WO2006135726 and the messaging of a fully enabled consumable holder according to this disclosure. The software architecture can preferably support and promote both asynchronous and synchronous data collection. Asynchronous memory polling, for example, is available in the Core API (API ID=1). There are at least two available embodiments of synchronous data collection.

Understanding this disclosure related to synchronous data collection is helped by an understanding of the concept of bounded updates. Bounded updates are events that are grouped together as a snapshot of the appliance state taken during the same scan of the host microprocessor's main loop execution. The appliance control main loop will allow for an iterative update of feedback variables that are registered with an appliance eventing engine. Each registered variable is monitored and only those that change value according to their memory monitor change operator are broadcast as updates to the client. When updates are in the process of being broadcast, no new updates are allowed in order to preserve the snapshot in time.

In the first embodiment, a snapshot is communicated to the client using the MMP flag in Byte B2 of the software architecture header as shown in the application protocol as shown in FIG. 4 of WO2006135726. While the MMP is true, more messages are pending for the snapshot. When MMP is false, the current message is the last message in the snapshot. Therefore, if the first message of a snapshot is the only message in that snapshot, MMP will be false.

The example in FIG. 9 of WO2006135726 illustrates a bounded command (Cycle+Temperature+MMP) with acknowledgments, followed by two consecutive bounded updates. Where bounded refers to elements of protocol which indicate to the receiver that more messages are coming from the source and that data processing by the application logic of the receiving component should be delayed until the bounding indicators of the protocol within the packet structure (MMP bit 7) indicate a complete transaction at which time data processing by the application logic is permitted. Notice that updates do not begin until bounded command execution is complete, providing the client the ability to filter away transient feedback data. Bounded commands are provided by the same mechanism, MMP, as bounded updates in order to provide applications a greater level of control.

The example of FIG. 9 in WO2006135726 is conceptual. The actual mechanism is MMP. However for illustrative purpose, the bounded command begins with an initial "begin" command initiator (MMP set) and includes commands to set a washer cycle to wash, a recipe status to ready, a water temperature to medium, again a recipe status to ready, and finally a cycle start indicator, followed by a command terminator (MMP unset). It can be noted that, in FIG. 9 in WO2006135726, updates, such as by eventing, are disabled to prevent updates from happening before the bounded command is complete. In addition, a "process command" indicator is shown periodically throughout the bounded command processing in the appliance to illustrate the portions of the command issued from the client 16 through the internal communications network are processed.

In the bounded updates, the updates are once again enabled since they were disabled at the beginning of the bounded command to allow the appliance to report its status to the client. In the example shown in bounded updates, the acknowledgment state is shown to ready, the cycle is reported as wash, the state is reported as running, the basket is reported as fill, the pump is reported as on, and the temperature is reported as medium. Again, beginning and terminating indicators enclose the bounded update B44. These beginning and terminating indicators can be reported by use of the flag, MMP, in the application packet structure as discussed in FIG. 4 of WO2006135726 or another method which would be apparent to one skilled in the art of network protocol.

In the bounded update, the basket is reported as agitate, the pump is reported as off and the motor is reported as on. Again, beginning and terminating indicators (MMP) enclose the bounded update B46. Without the beginning and terminating indicators (MMP), the client cannot deduce a relationship between the updates from the appliance. However, with beginning and terminating indicators (MMP), the client can deduce a relationship between the events.

The second embodiment of synchronous data collection is shown in FIG. 32 of WO2006135726. Generally, a node comprises at least a micro-processor, a memory, software, and circuitry coupled to a transmission media where the node is configured to take information from the memory of the micro-processor and, with the circuitry, produce a signal representing that information onto a transmission media. Two nodes in communication with each other could be two micro-processors on a single printed circuit board connected by a serial communications or two computers connected via the internet.

As shown in FIG. 32, it is conventional for a command source 220 to send a complete command within one complete message to a command executor 222. This disclosure, however, contemplates using multiple messages to convey the elements of a command so that a command can be modular and can be composed by command elements. For this to work, the command executor 222 needs to know when to execute the command comprised of multiple command elements, each of which were sent as an independent single command message. This disclosure provides a solution by providing a begin command group message 224 and an end command group message 226, which inform the command executor 222 as to the which command elements belong together for the purpose of executing a plurality of command elements as a single aggregated command.

FIG. 32 shows how the command source 220, using a begin command group message 224 and an end command group message 226 bounding a series if independent command messages 228 can create a command group 230. Without a begin command group message 224 and an end command group message 226, the command executor 222 cannot deduce a relationship between command message 1, 2, through N. However, with the begin command group message 224 and the end command group message 226, the command executor 222 can deduce a relationship between the command messages 228. In message aggregation, whether data collection or batched commands, the MMP flag can be used to identify the beginning and ending of the message group.

A consumable holder communicating with an appliance on a network using a network protocol which supports message binding can be an important feature relating to the consumable holder's controller B32 in the process of executing logic which might result in one of the actuation of the introduction of a consumable to an appliance and an effect to an appliance cycle of operation or display of a user interface. This is because the execution logic may use a plurality of data received in a plurality of messages wherein the plurality of data functionally belongs to a plurality of valid data sets. With message binding, the execution logic will use a single valid data set per execution scan wherein the valid data set are constructed from data received in the plurality of messages according to groupings implied by the binding.

This technique can also be used to batch event, as shown in FIG. 33, which shows an eventing software architecture for communications between one node, event source 200, and a second node, event observer 202. The software architecture contemplates the event source sending a message to the event observer about the event. Rather than sending a single message, however, the event source 200 can use a begin event group message 204 and an end event group message 206 to create an event group 208 from a series of individual event messages 210. An advantage of sending separate messages in this technique is that it more efficiently uses the messaging architecture in rapidly changing states of an appliance and minimizes the number of uniquely identified messages needed to express the state of an appliance. Without the begin and end event group messages, the event observer 202 cannot deduce a relationship between any event messages 1, 2, . . . , and n. However, with the begin and end event group messages, the event observer 202 can deduce a relationship between the events.

EXAMPLES

Messaging

Figure 38:
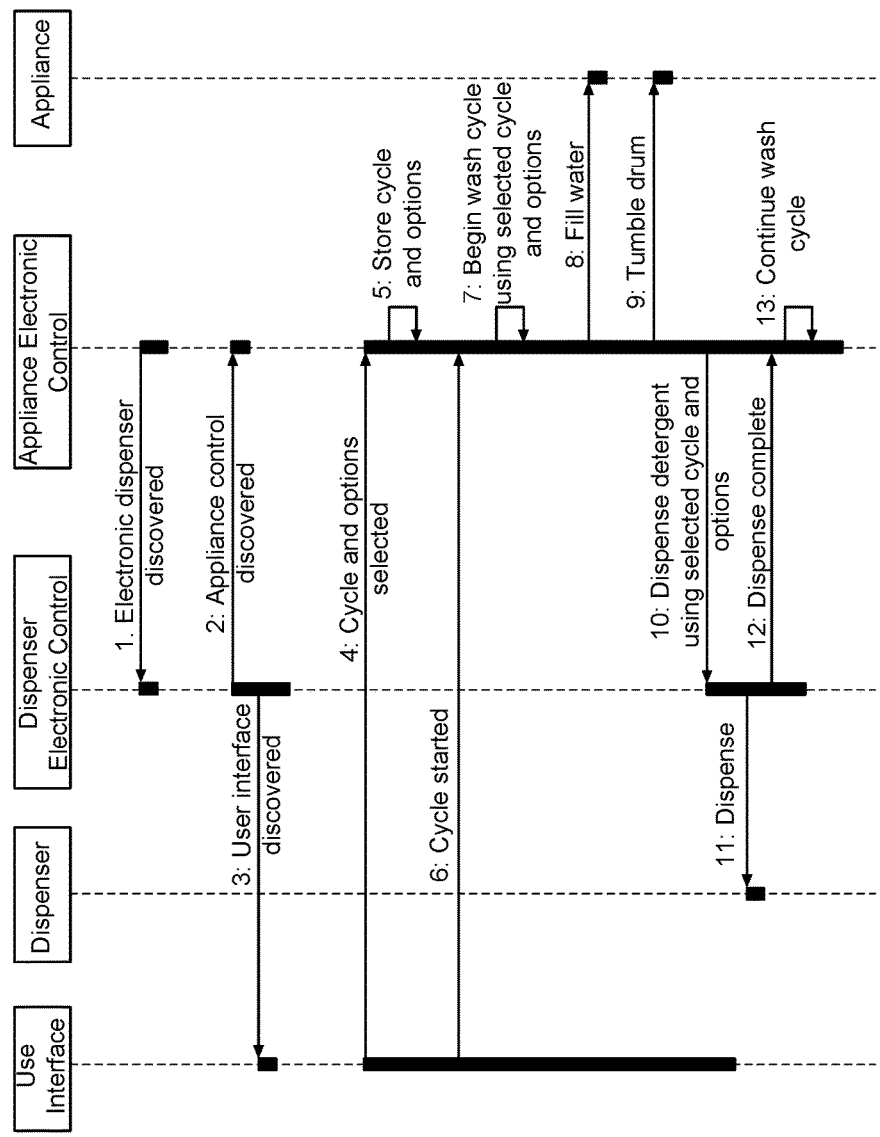
FIG. 38 illustrates messaging between a consumable holder and an appliance according to one embodiment of this disclosure.
Figure 39:
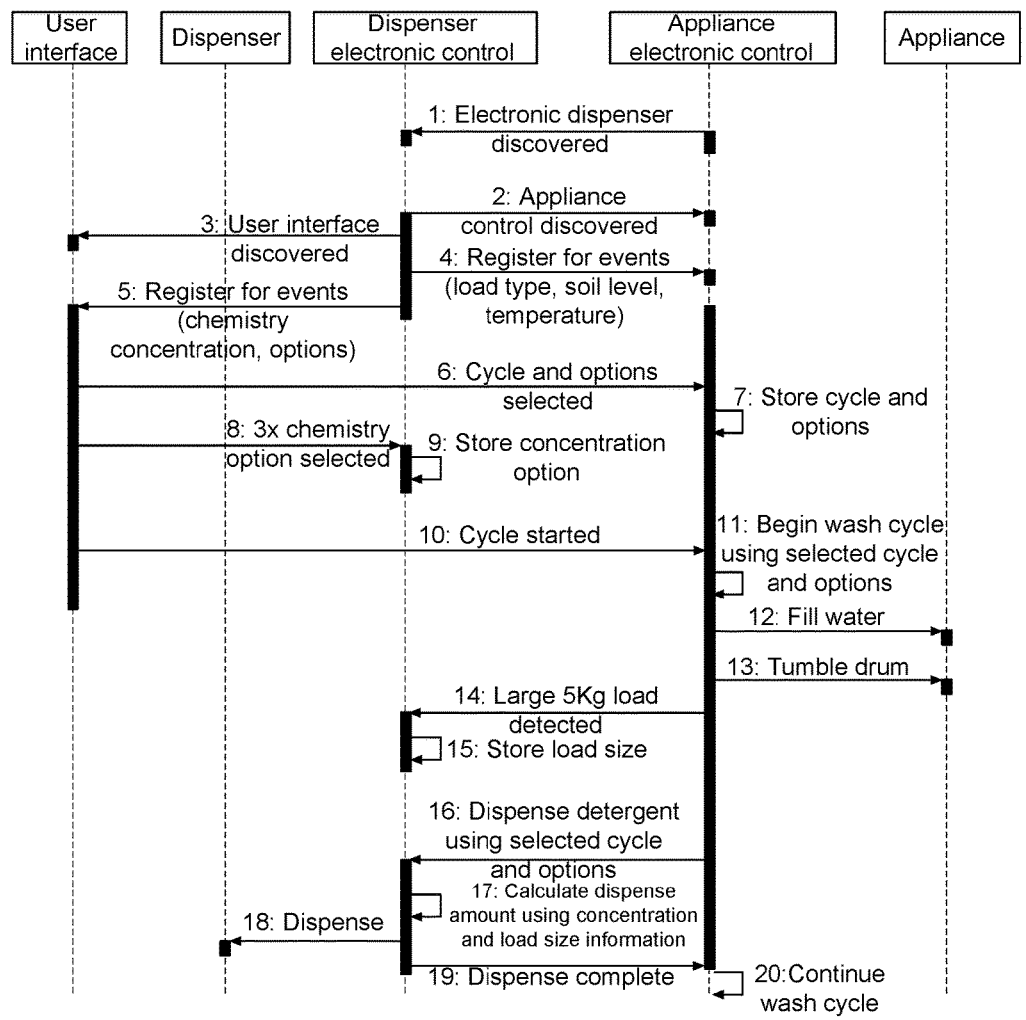
FIG. 39 illustrates messaging between a consumable holder and an appliance according to another embodiment of this disclosure.
Figure 40:
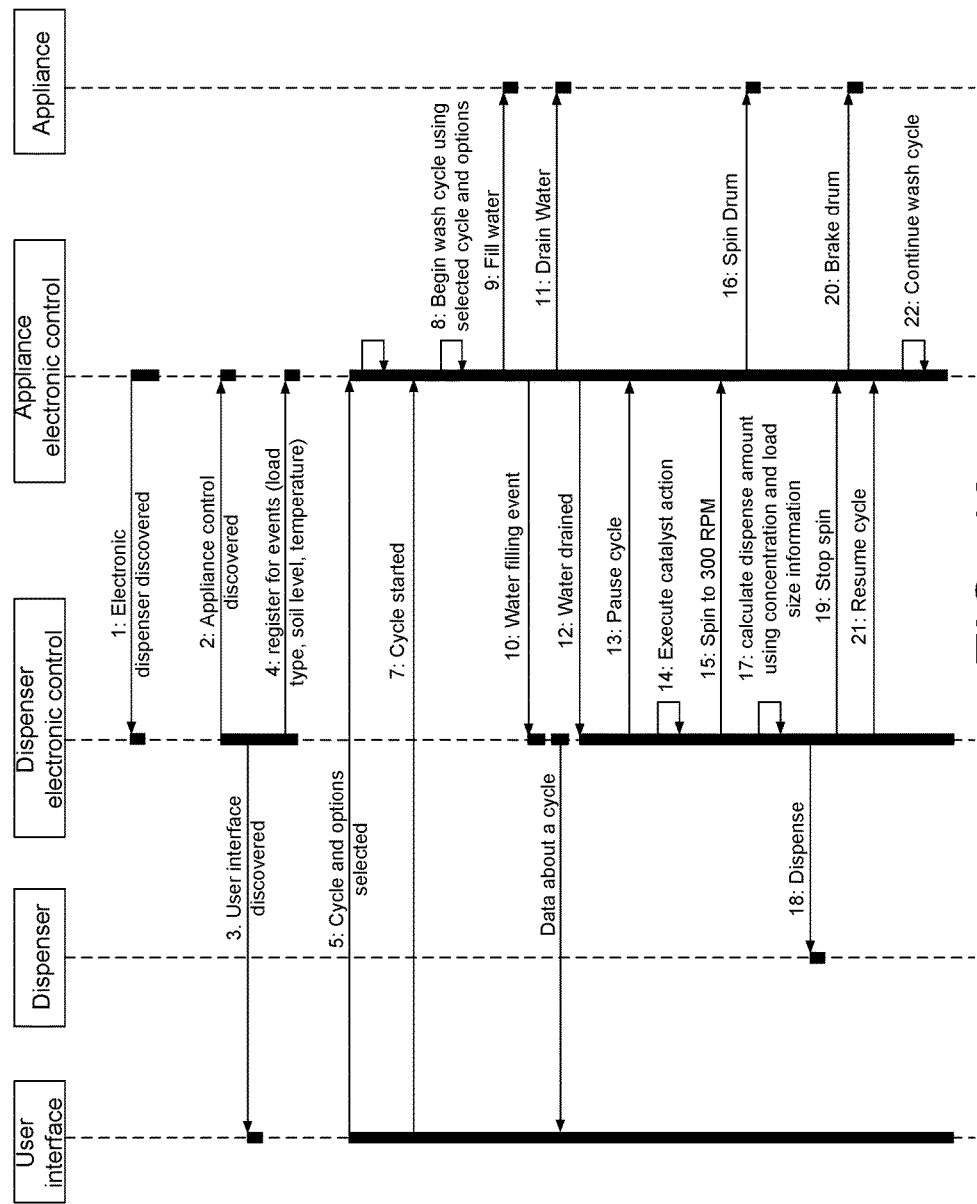
FIG. 40 illustrates messaging between a consumable holder and an appliance according to another embodiment of this disclosure.

Implementation of the inventive concepts in a washing machine can be seen in FIGS. 38-40. It is assumed that the washing machine is able to discover or detect the presence of the consumable holder and its functionalities. Likewise, the consumable holder is able to detect the presence of the washing machine control. Each is able to discover the capabilities of the other (through the use of standard interfaces) and use this information to collaborate together to provide new features for the user.

A first mode in FIG. 38 shows the messaging that might be employed when dispensing is needed during a cycle. The appliance control commands the consumable holder to dispense in a specific manner using a set of standard commands for dispensing. An example would be "dispense detergent, medium size."

FIG. 39 illustrates a second scenario where the appliance control can command the consumable holder to dispense at the appropriate time in the cycle through a set of standard commands. In addition to these commands, the consumable holder can gather other information from the appliance control and its related sensors such as but not limited to load size, load type, soil level, and temperature. The consumable holder can use this status information along with its own dispensing algorithm to dispense a more effective or more accurate chemistry amount and/or type. In addition to gathering cycle or sensor-based data from the appliance control, data can also be gathered from the user interface. This could include details such as detergent concentration, or the type of cycle and options selected by the user. This information can also be used to improve the performance of the dispensing algorithm. Finally, if the consumable holder is able to sense properties about the consumable that it is holding, such as the brand or type of chemistry, this information can also be integrated with the dispensing algorithm to improve performance.

FIG. 40 illustrates a scenario where the consumable holder can use status information from the appliance control to make decisions on when to dispense or even to change the cycle behavior by commanding the appliance control to execute certain processes. An example of this could be inserting a catalyst-type action into a cycle when dispensing certain chemistries by commanding the appliance control to spin and dispense simultaneously. Another example could be commanding the washer to heat the water to a specific temperature in combination with dispensing in order to best activate a chemical reaction upon dispensing a particular chemistry. The consumable holder can also provide status information to the user interface during this operation to notify the user about the improvement it is making to the appliance cycle process.

Smart Filtration

Figure 41:
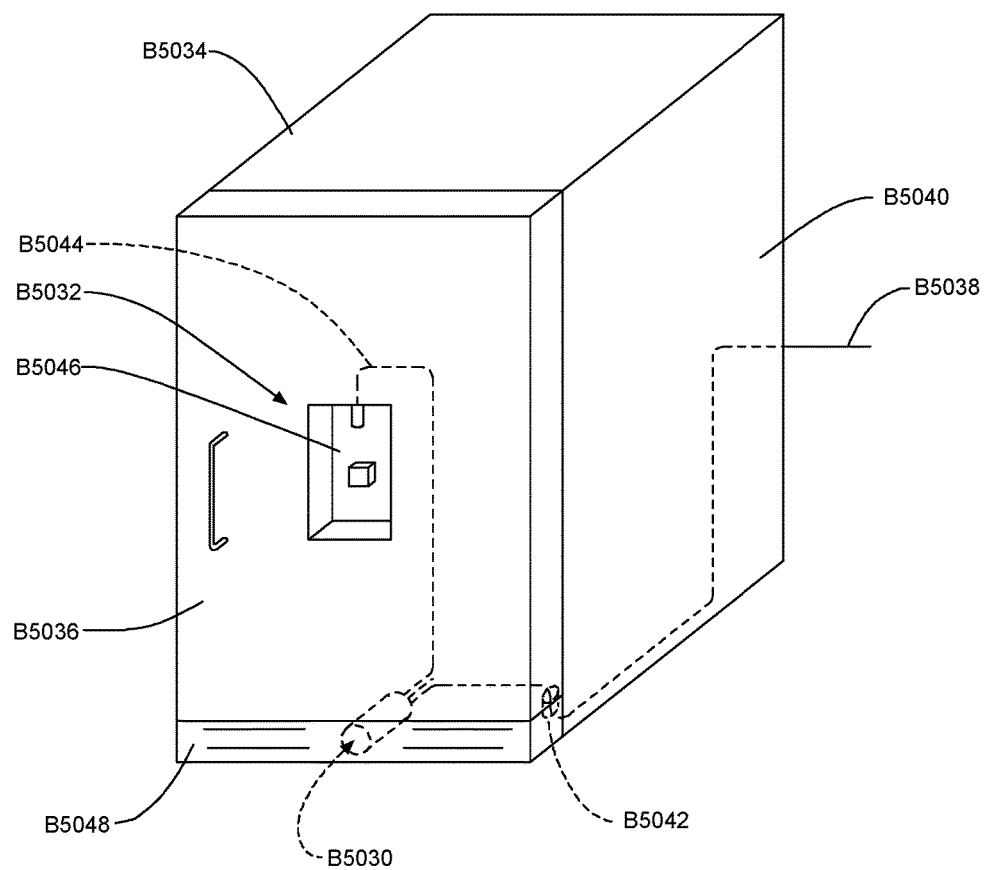
FIG. 41 is a schematic perspective view of a refrigeration appliance with a water filter cartridge system embodying the principles of this disclosure.

Another example of a consumable holder according to this disclosure is found in filtration in a refrigerator as shown in FIGS. 41-44. FIG. 41 illustrates a water filter cartridge system B5030 that may find particular utility in a water dispensing system B5032, such as found in a refrigeration appliance B5034. The disclosure also has utility in other appliances and environments and for filtering liquids other than water. For purposes of disclosing an embodiment of this disclosure, it will be disclosed in the environment of a water dispensing system B5032 in a domestic refrigerator appliance B5034 where the water is dispensed at a door B5036 of the refrigerator. The refrigerator can include a user interface (not shown) as for purposes discussed above. The water is supplied via a water line B5038 plumbed into a building supply, and passes through a cabinet B5040 of the appliance B5034, and into the refrigerator door B5036 at a hinge B5042 for the door. The water line B5038 in the door B5036 is connected to the water filter cartridge system B5030, from which a connecting water line B5044 leads to a water dispenser B5046 accessible from outside of the door B5036. The water filter cartridge system B5030 may be accessible for removal and replacement, such as at stationary ventilation grill B5048 positioned below the door B5036.

Figure 42:
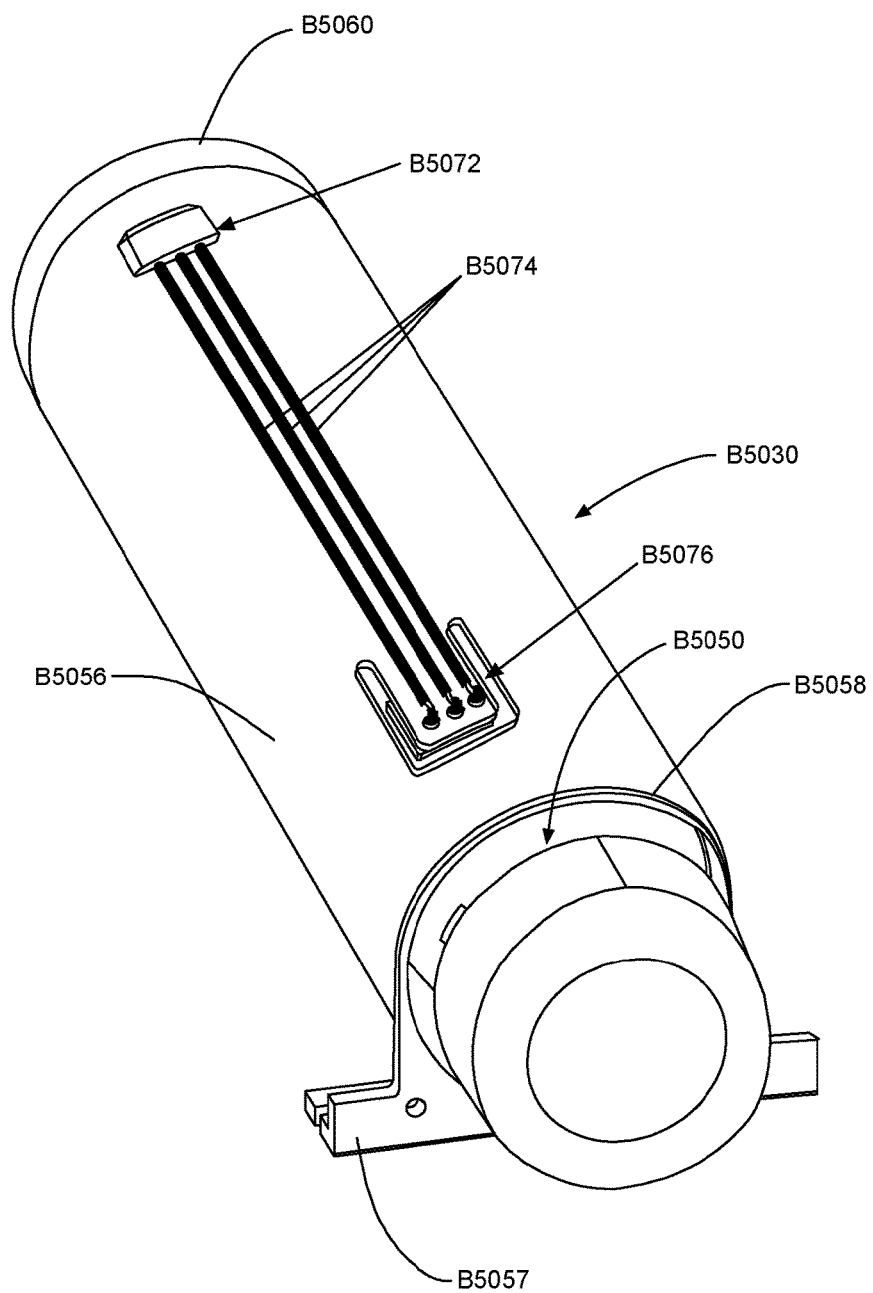
FIG. 42 is a perspective view of the water filter cartridge system of FIG. 40 shown in isolation.
Figure 43:
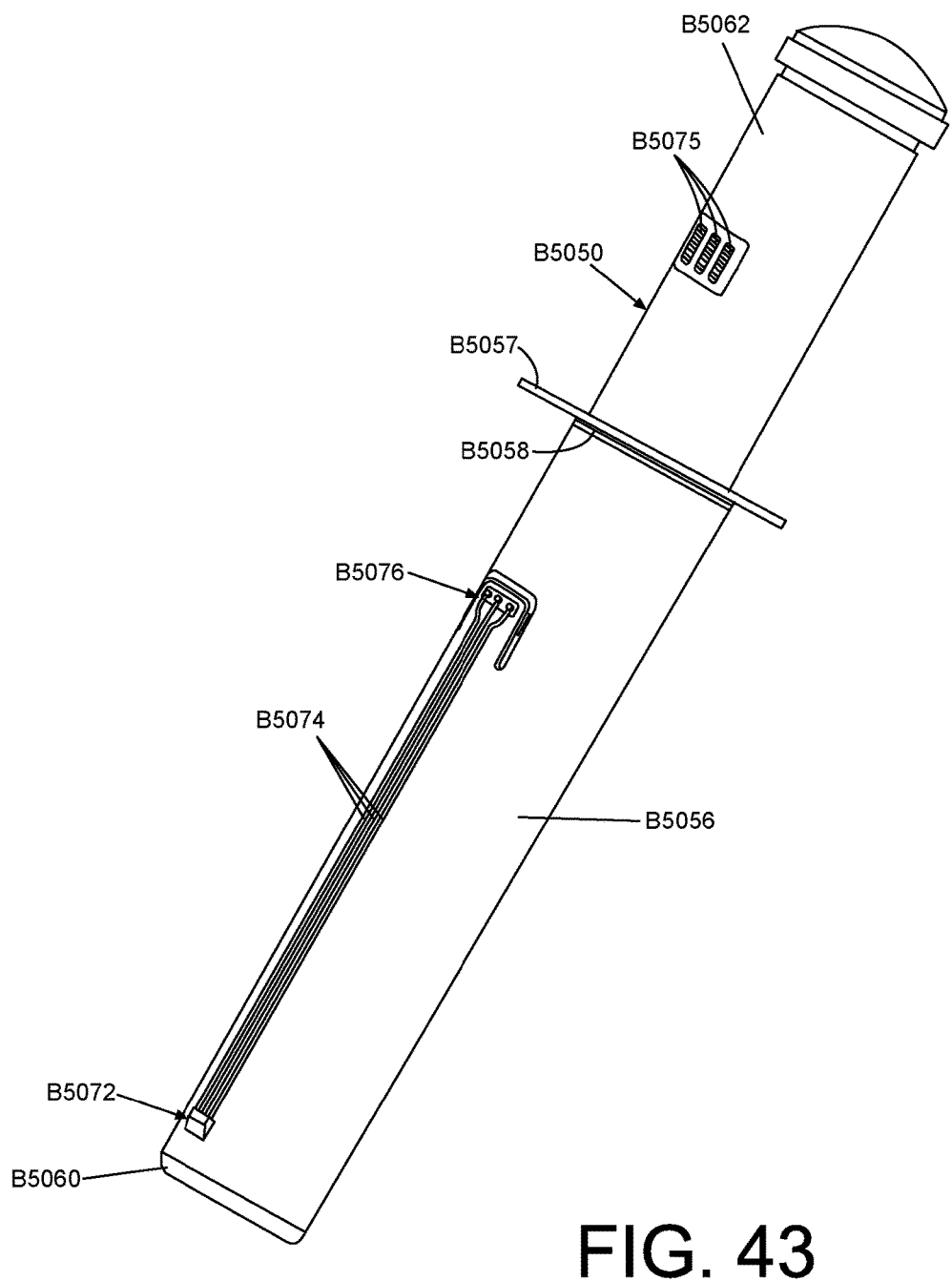
FIG. 43 is a perspective view of components of the water filter cartridge system of FIG. 41 with a cartridge being slightly withdrawn from a housing.

As illustrated in more detail in FIGS. 42-43, the water filter cartridge system B5030 comprises a filter cartridge B5050 and a cartridge housing B5056 which may be permanently attached to the refrigerator B5034, such as via a mounting bracket B5057. The housing B5056 may be in the form of a cylinder with a first open end B5058, and a second end B5060.

The filter cartridge B5050 can have a structure similar to that of a conventional filter cartridge including a porous filter body (not shown) that may have a cylindrical shape, with a similarly shaped impermeable housing B5062 having integrally formed end caps. Alternatively, the end caps can be formed separately and removably attached to the housing B5062 by any suitable means, such as by a snap fit. The cartridge B5050 has an outer diameter sized to fit within the housing B5062. One end of the housing comprises inlet and outlet passages (not shown) to allow unfiltered and filtered liquid, respectively, to flow therethrough.

The filter cartridge B5050 further comprises an identifying element B5075. The identifying element B5075 can be any device capable of storing or providing data and/or information associated with the water filter cartridge system B5030 such as, but not limited to, a barcode, a magnetic strip, a microprocessor, a memory chip, a license key, a specialized structure, a smart card, matermetrics (magnetic nanotechnology fingerprints), a magnetic switch, or an RFID. As shown, the identifying element B5075 comprises a memory chip. The identifying element B5075 can store a unique identifier for a particular filter cartridge, as well as characteristics and other information associated with the filter cartridge and/or its use.

Alternatively, the identifying element B5075 can be separate from the filter cartridge B5050, such as in the form of a license key (not shown). The license key would be configured to plug into a connector on the appliance B5034 and to communicate with the appliance B5034 and across the network of the appliance B5034. The license key can contain a unique identifier, as well as information about the filter cartridge B5050.

The appliance B5034 can comprise a reading element B5076, which can be a type of consumable reader, for communicatively coupling the appliance B5034 with the identifying element B5075. In the embodiment illustrated in FIG. 42 and FIG. 43, the reading element B5076 is positioned on the cartridge housing B5056 and is communicatively coupled to the appliance B5034 via wires B5074 attached to an appliance contact B5072. The reading element B5076 extends through the cartridge housing B5056 such that the reading element B5076 is configured for placement against or adjacent to the identifying element B5075 when the filter cartridge B5050 is inserted into the cartridge housing B5056. If necessary, the appliance B5034 and/or the cartridge housing B5056 can include positioning elements (not shown) for ensuring proper alignment between the identifying element B5075 and reading element B5076 when the water filter cartridge B5050 is inserted into the cartridge housing B5056, as is shown in FIG. 43.

The appliance contact B5072 is configured to communicatively couple to the appliance B5034 when the cartridge housing B5056 is mounted in the appliance B5034. This can be accomplished by configuring the housing B5056 and/or mounting bracket B5057 to maintain the appliance contact B5072 in a position adjacent or abutting a housing contact (not shown) in the appliance B5034. The housing contact can be communicatively coupled to a network of the appliance B5034.

In other embodiments, the reading element B5076 can be positioned on the appliance B5034 or elsewhere on the cartridge housing B5056. For example, the reading element B5076 can be installed near the cartridge housing B5056 in a machine compartment of the appliance B5034. Installing the reading element B5076 in the appliance B5034 is particularly useful in the event that the identifying element B5075 does not require a wired connection with the reading element B5076 in order to communicate, such as when the identifying element B5075 is an RFID chip and the reading element B5076 is an RFID reader.

The reading element B5076 is configured to obtain, exchange, store, deliver, detect, and/or verify data and/or information by communicating with the identifying element B5075. The reading element B5076 can read data from the identifying element B5075, read and write data from/to the identifying element B5075, or engage in a two-way exchange of data with the identifying element B5075.

The reading element B5076 is communicatively coupled with a controller (not shown) of the water filter cartridge system B5030 such that the reading element B5076 can send data obtained from the identifying element B5075 to the controller. The controller can comprise a control board having software architecture configured for communication on the network such that the controller can communicate with other control boards or clients on the network. The controller can further comprise a unique identifier identifying at least one functionality associated with the filter cartridge system B5030 that can be communicated to the appliance B5034. The reading element B5076 can be configured for one or two-way communication with the controller. The controller can be a microprocessor having an internal memory or a memory associated therewith. The controller can be part of the reading element B5076. Alternatively, the controller can be located at any another point on the network of the appliance B5034 or on a network connected to the appliance B5034 and enabled for communication therewith. The controller can be configured for one or two way communication with the appliance B5034 and can be communicatively coupled to the appliance B5034 in a wired or wireless manner.

The Filter Cartridge System as a Node on a Network

The filter cartridge system B5030 can be a node on the network of the appliance B5034. As part of a node, the controller can communicate information related to filter cartridge B5050 (a consumable) to the appliance B5034. The controller can inform the appliance of the properties of the filter cartridge B5050 and the correct usage information using information received from the reading element B5076. The controller can be coupled to the network of the appliance B5034 via a direct wired connection or by a wireless connection. The controller includes the software architecture that enables communication and connection to the network of the appliance B5034. The controller can monitor and record events, communicate with other nodes on the network of the appliance B5034, or affect a cycle of operation of the appliance B5034. The controller can propagate and transfer information to additional networks, such as a third network connected to the network of the appliance B5034, or any other networks connected thereto.

The filter cartridge system B5030 can be discovered by other nodes on the network of the appliance B5034 using discovery messages. By taking advantage of this feature and sending messages to and from the controller, the appliance B5034 can automatically detect the water filter cartridge system B5030 and discover its capabilities. This also enables the water filter cartridge system B5030 control methods and algorithms to reside on the controller, rather than on the main appliance control. Because of this modular functionality, the appliance B5034 will be able to accept a larger variety of filters and can easily adapt to new features and configurations associated with the filter cartridge system B5030. The appliance B5034 can also automatically discover filter cartridges B5050 and the status of any installed filter cartridge B5050 can be communicated to the appliance B5034. Similarly, the filter cartridge system B5030 controller can query the network for the unique identifiers of the functionalities available in the appliance B5034.

Using the software architecture, the water filter cartridge system B5030 can be used to provide instructions or directions for changing appliance B5034 behavior. The controller of the filter cartridge system B5030 can send messages to the appliance B5034 to configure the appliance B5034. The filter cartridge B5050 can include data and information on the identifying element B5075 that can provide characteristics or information to the appliance B5034 through the reading element B5076. This information will be used by the appliance B5034 to modify appliance operation. The identifying element B5075 contain at least one of additional cycles of operation, updated cycles of operation, historical information relating to cycles of operation experienced by the appliance, and software to reconfigure the software architecture of the filter cartridge system B5030 or the appliance B5034.

For example, the filter cartridge B5050 can send the appliance B5034 information regarding volume capacity, flow rating, filtration capabilities, and time/temperature dependence of the filter cartridge B5050. The appliance B5034 can use this information to modify filter cartridge parameters stored in the system, such as by changing a filter cartridge life algorithm. This also enables the use of a number of different filter cartridges because as long as a desired filter cartridge is configured for insertion into the cartridge housing B5056, the appliance B5034 can discover the characteristics of the filter cartridge in order to learn how to implement it correctly.

Filter Cartridge Usage Sensing

Communication between the identification element B5075 and the reading element B5076 can be used for notifying a user that the filter cartridge B5050 has expired and needs to be replaced. This can be accomplished by activating at least one filter status indicator (not shown) when the filter requires replacement. The filter status indicator can be an LED, a sound, and/or a display on a user interface, such as a message or image. The filter status indicator is activated when information obtained by the reading element B5076 indicates that the filter cartridge B5050 needs to be changed. Upon replacement of the filter, the indicator will automatically be turned off and reset.

Another example of an indicator that can be used to draw a user's attention to the filter cartridge B5050 and that can also provide feedback regarding the status of the filter cartridge B5050 is an indicator cap. The indicator cap is best used when the filter cartridge system B5030 is easily visible to a user. In the preferred embodiment, the indicator cap comprises two types of plastic. One type of plastic is transparent, and the type of plastic is opaque. The transparent plastic functions as a light pipe and can be molded to include indicia associated with the filter cartridge B5050. The indicator cap can further comprise an LED light positioned between the layers of plastic to illuminate the indicia. The LED light can be changed to different colors or blinked on and off to provide information about the status of the filter cartridge B5050. For example, when a new filter cartridge B5050 is installed, the LED light can be a steady blue color. When the filter cartridge B5050 has only 10% remaining capacity, the LED light can be a steady red color. When the filter cartridge B5050 expires, the light can blink red on and off until the filter cartridge B5050 is replaced.

The controller can store the unique identifier associated with each filter cartridge B5050 installed in the cartridge housing B5056. When a filter cartridge B5050 is installed in the cartridge housing B5056, the reading element B5076 can obtain data from the identifying element B5075 regarding the filter cartridge B5050. The controller can use this data to check the unique identifier of the filter cartridge B5050 against previously stored unique identifiers associated with previously installed filter cartridges. If the controller determines that the unique identifier already exists in the memory, the controller can instruct the reading element B5076 to retrieve information from the identifying element B5075 regarding whether the filter cartridge B5050 has was any remaining capacity. If the control determines that the filter cartridge B5050 has capacity, the controller can enable operation of the water dispensing system B5032 and can update filter-related parameters in the memory. If the controller determines that the filter cartridge has no remaining life, the user can be alerted that a filter replacement is required. If a filter cartridge B5050 is installed and has a unique identifier not stored in the memory, the controller can record the unique identifier and reset any filter status indicators and store filter-related parameters in the memory.

The identifying element B5075 can include information such as the type, brand, serial number, and flow rate of the particular filter cartridge B5050. Because the reading element B5076 and controller can read and store the unique identifier associated with each filter cartridge B5050, the controller is able to distinguish a new filter cartridge from a used one. The controller can also store dates and times of filter cartridge usage in the memory for service and warranty information purposes.

The identifying element B5075 and/or controller can track the total volume of water that passes through each filter cartridge B5050 and/or the total time that each filter cartridge B5050 is used and associate that information with each filter cartridge's unique identifier. This function can be used to monitor water quality and to help maintain proper filtering characteristics and energy requirements.

The filter cartridge B5050 can also include various sensors for determining parameters associated with filter cartridge usage, such as a water contaminant sensor, a water conductivity sensor, a turbidity sensor, electrochemical sensors, and leak sensors. These sensors can comprise but are not limited to simple electrical leads or contacts, IR sensors, ultrasonic sensors, temperature sensors, and/or capacitive sensors. Information gathered by the sensors can be sent to the controller and can be used to control filter cartridge B5050 and filter cartridge system B5030 operation. Based on the sensed parameters and information about the filter cartridge B5050 obtained from the identifying element B5075, the performance of the filter cartridge B5050 can be adjusted. For example, using the user interface, the user select operational properties of the filter cartridge B5050 and filter cartridge system B5030 that will lengthen the life of the filter cartridge B5050 while diminishing the level of filtration of water, or vice versa.

The leak sensor can be positioned such that any water leaking from the filter cartridge B5050 or cartridge housing B5056 will contact the sensor. The sensor can then notify the controller of the leak, and the controller can shut off a water supply or halt operation of the appliance B5034, dispensing system B5032, or filter cartridge system B5030.

In the event that a particular filter cartridge B5050 can be used to add certain additives to the water, such as vitamins and minerals or flavorings, the controller can be used to adjust additive dosing based on information received from the sensors, from the identifying element B5075, and from a user interface. If the filter cartridge B5050 is dispensing vitamins and/or minerals, the controller can use the sensors and information from the identifying element B5075 to ensure that the level of vitamins and minerals being dispensed is within a range deemed safe for consumption. The user interface can also be updated to reflect the particular additives available for dispensing, and the user can control the type and dosing of any additives being dispensed.

Compatible Filter Detection

The identifying element B5075 can enable automatic detection of a compatible filter cartridge B5050. Upon insertion of a cartridge B5050 into the housing B5056, the reading element B5076 can detect the presence of the identifying element B5075 and interact with the identifying element B5075 to ascertain whether the filter cartridge B5050 is compatible with the filter cartridge system B5030 and appliance B5034. A determination of filter cartridge compatibility can be made based on one or more desired filter cartridge traits, such as filter cartridge manufacturer, filter cartridge size, filter type, remaining filter capacity, filter age, and/or whether the filter cartridge is new or used. This can be accomplished by the reading element B5076, which obtains filter cartridge information from the identifying element B5075. The reading element B5076 can send the filter cartridge information to the controller. The controller can compare the filter cartridge information obtained by the reading element B5076 to compatible filter cartridge information contained in the memory of the controller in order to determine whether the filter cartridge B5050 is compatible.

Alternatively or in addition, the cartridge housing B5056 can include a lockout mechanism configured to accept only compatible filter cartridges B5050. The cartridge housing B5056 and/or cartridge B5050 can also include elements (not shown) designed to break or otherwise deform to ensure that only compatible filter cartridges B5050 can be inserted into the cartridge housing B5056. In addition, such elements can be used to prevent cartridges B5050 from being removed and then reinserted into the same or into a different cartridge housing B5056.

If a user inserts an incompatible filter cartridge B5050, the user can be notified using a user interface of the appliance B5034, lights, sounds, or any combination thereof. Operation of the water dispensing system B5032 can be halted until a compatible filter cartridge B5050 is inserted into the cartridge housing B5056. Alternatively, the water dispensing system B5032 can be configured to bypass the water filter cartridge system B5030 in the event that an incompatible filter cartridge is installed by a user.

Alternatively, the filter cartridge B5050 and cartridge housing B5056 can include an auto-eject mechanism (not shown) capability that would mechanically eject incompatible filter cartridges B5050. The auto-eject mechanism can comprise a motorized latch release or an electromagnetic solenoid that will push the filter cartridge B5050 out of the cartridge housing B5056 if the filter cartridge is determined to be incompatible.

The filter cartridge B5050 can further comprise a proximity target located thereon, a proximity sensor located on the cartridge housing B5056, and a sensor-actuated connector (not shown) located on or near the cartridge housing B5056. The proximity target and proximity sensor can be the identifying element B5075 and the reading element B5076, respectively. When the filter cartridge B5050 is installed in the cartridge housing B5056, the proximity sensor can detect the proximity target on the filter cartridge B5050 and then actuate the connector to close an electrical circuit. This circuit provides power to one of: an electronic control that manages the water dispensing system B5032, an electronic solenoid valve that turns a water supply on and off, or another electronic device related to the appliance B5034 and the water filter cartridge system B5030. In another embodiment, the connector can close the electrical circuit once the controller or appliance B5034 receives information from the identifying element B5075 communicating operational information about the filter cartridge B5050.

Data and information contained on the identifying element B5075 can be encrypted or otherwise protected in order to prevent competitors from creating replacement filters without consent.

Filter Cartridge Replacement Process

Figure 44:
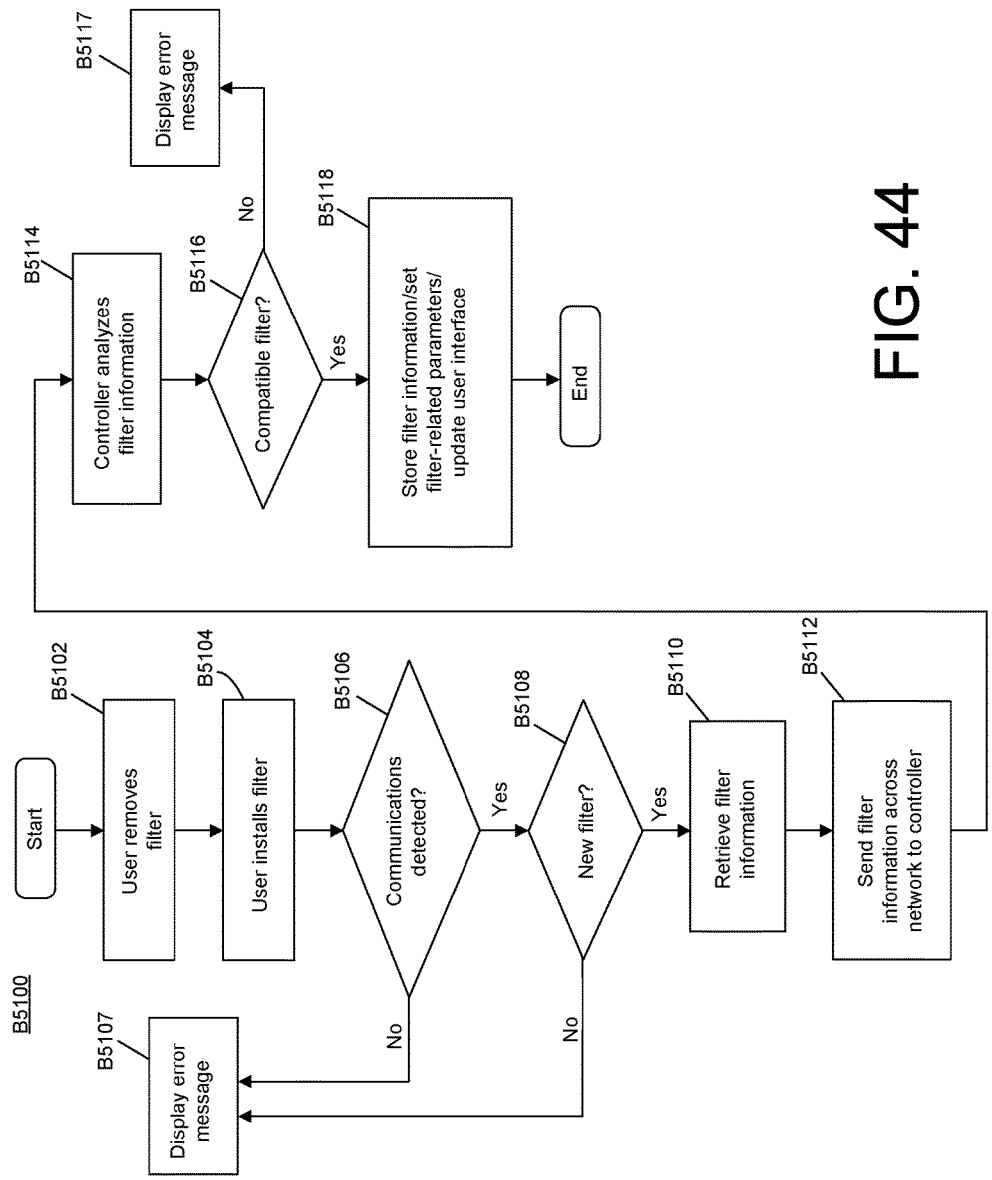
FIG. 44 is a flow chart illustrating an exemplary water filter cartridge replacement process according to one embodiment of this disclosure.

An exemplary filter cartridge replacement process B5100 is illustrated in FIG. 44. At step B5102, a user removes a used filter cartridge from the cartridge housing B5056. In the event that no filter cartridge B5050 is currently in place, the user simply skips step B5102. At step B5104, the user inserts a new filter cartridge B5104.

If the reading element B5076 is unable to interact or communicate with the identifying element B5075 at step B5106, an error message is displayed B5107 to the user, and operation of the water dispensing system B5032 is halted, and/or the water filter cartridge system B5030 is bypassed.

If communications between the reading element B5076 and the identifying element B5075 are detected, the controller receives communications from the reading element B5076 regarding whether the filter cartridge B5050 has been used before. If the filter cartridge B5050 has been used before and has no further filtration capacity, the error message is displayed B5107, and operation of the water dispensing system B5032 is halted, and/or the water filter cartridge system B5030 is bypassed.

If the filter cartridge B5050 is new, then filter information is retrieved B5110 from the identifying element B5075 by the reading element B5076. The reading element B5076 then sends the filter cartridge information across the network to the controller at step B5112. Once the controller receives the filter cartridge information, the controller analyses the filter cartridge information at step B5114. Based on instructions and other information contained in the memory associated with the controller, the controller determines whether the filter cartridge B5050 is compatible at step B5116. If the filter cartridge B5050 is not compatible, an error message is displayed B5117, and operation of the water dispensing system B5032 is halted, or the water filter cartridge system B5030 is bypassed.

If the filter cartridge B5050 is compatible, then at step B5118, the reading element B5076 sends all information obtained from the identifying element B5075 to the controller to be stored in the memory, all filter cartridge-related parameters are set, and the user interface, if present, is updated to reflect current filter cartridge B5050 information. Normal operation of the water dispensing system B5032 and the water filter cartridge system B5030 can begin.

This disclosure has been described utilizing particular embodiments. As will be evident to those skilled in the art, changes and modifications may be made to the disclosed embodiments and yet fall within the scope of this disclosure. For example, various components could be utilized separately or independently in some embodiments without using all of the other components in the particular described embodiment. The disclosed embodiment is provided only to illustrate aspects of this disclosure and not in any way to limit the scope and coverage of this disclosure. The scope of this disclosure is therefore to be limited only by the appended claims.

Creating Cycle Structures

Figure 12:
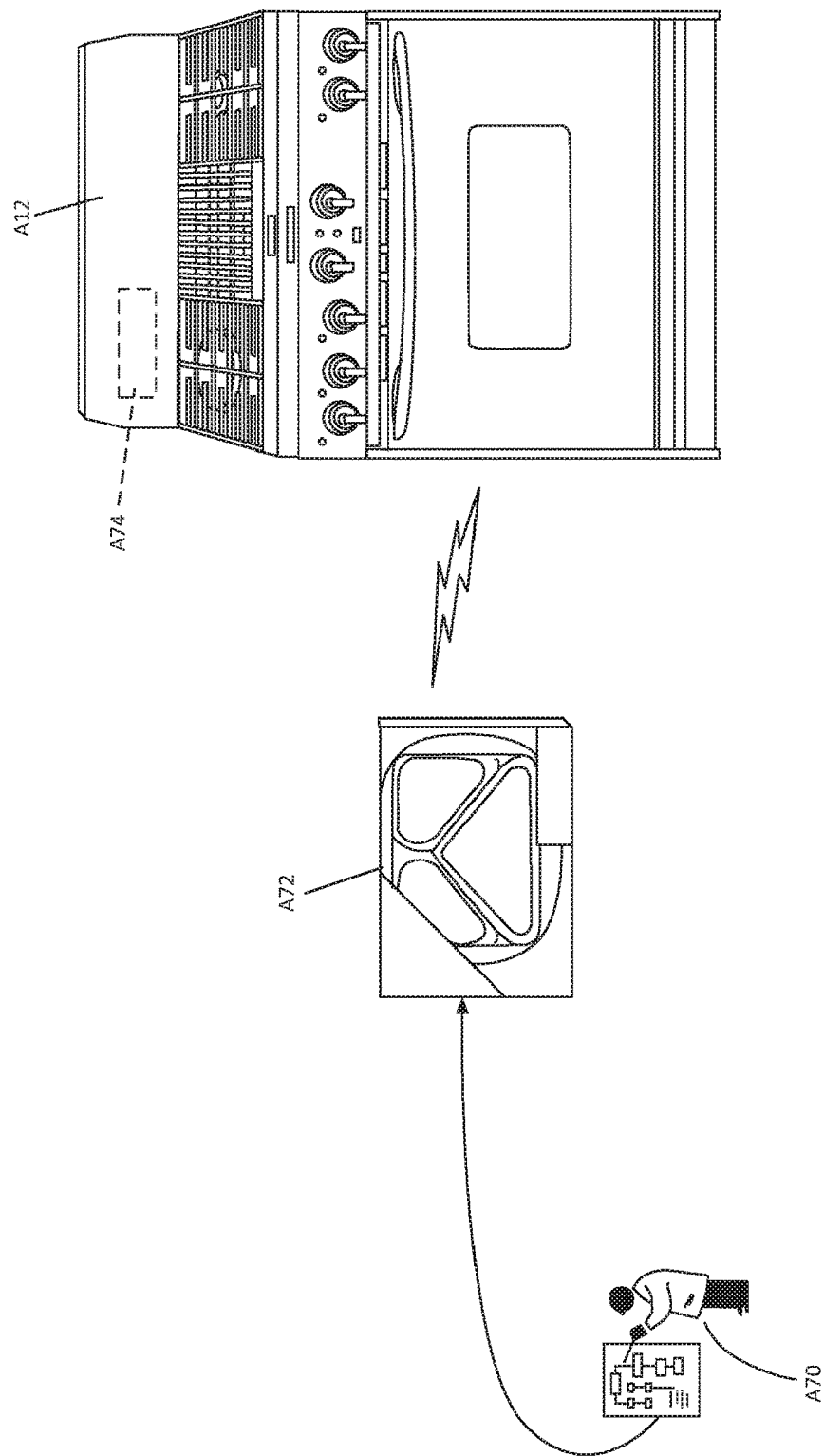
FIG. 12 is a schematic view of a consumable and a consumable reader according to one embodiment of this disclosure for use with a communicating appliance.

FIG. 45 illustrates how a consumable holder according to this disclosure can facilitate the creation or modification of cycle structures for an appliance, such as the appliance to which the consumable holder might be coupled. A cycle structure can, of course, be created independently of a consumable holder as by an authoring tool. This may be created, for example, by a food supplier as illustrated in FIG. 12, or any other consumable or article provider of such items as chemicals, detergents, additives, bleaches, softeners, rinse aids, clothing tags and the like. The consumable holder, however, can also facilitate creation or modification of a cycle structure by accessing information associated with the consumable and acting with the cycle engine to create or modify the cycle structure. The information associated with a consumable will more than likely be in a consumable information holder (see FIG. 37). The consumable holder can send the cycle structure information gleaned from the consumable information holder directly to the cycle engine or reply to a query from the cycle engine. If the information is not directly translatable from the consumable information holder, the consumable holder can execute a conversion to convert the information associated with the consumable holder. The converter converts the data to create the cycle structure 71 that the consumable holder can communicate to the cycle engine so that it can create the new or modified cycle structure B71(*b*).

This disclosure relates, in a least part, to a SA that is implemented on and communicates over an internal communications network on an appliance, which connects the various physical components of the appliance.

Some of the physical components have a corresponding controller (main controller, motor controller, user interface, etc.), which may be a simple microprocessor mounted on a printed circuit board. Other components have no controller. Typically the components that have controllers (and if there is more than one are typically also network enabled) cooperate through network messaging or other forms of data transmission to directly or indirectly, through other components, control the operation of all of the components and their contained or attached devices to implement an operation or cycle for the appliance.

The SA can, but does not have to, reside on each of the components with a controller. Those components with the SA or a variant of the SA compliant with the SA (compliance determined by the ability to send, receive, and process packets) form a node on the network that can communicate with the other nodes.

The SA performs multiple functions: identifying each of the components corresponding to a node to the network; identifying the capabilities or functions of the identified components to the network; identifying the status of the components to the network; providing well defined command interfaces for each component; providing communication between internal and external software components that are not part of the SA; and providing communication between components non-SA software components on different physical components. In this way, the SA functions to inform all of the nodes on the network of the presence, capabilities, and status of the other nodes.

The SA comprises multiple modules, each of which has different functionality. Various combinations of the modules or all of the modules can reside on each of the components. One module having the basic or core functionality for this disclosure resides on all of the components. In one anticipated configuration, all of the modules reside at least on the main controller, which establishes the main controller to function as a primary or controller SA, with the other nodes functioning in a client relationship to the controller SA. In such a configuration, all of the nodes would communicate through the controller SA.

The SA is sufficiently robust that it can permit configurations without a controller SA or with multiple controller SAs. Regardless of the configuration, any component with a residing SA can function as a client with respect to the other components.

The internal communications can be connected to one or more external components directly or through an external network. The external components would also have one, some, or all of the SA modules in resident.

Figure 79:
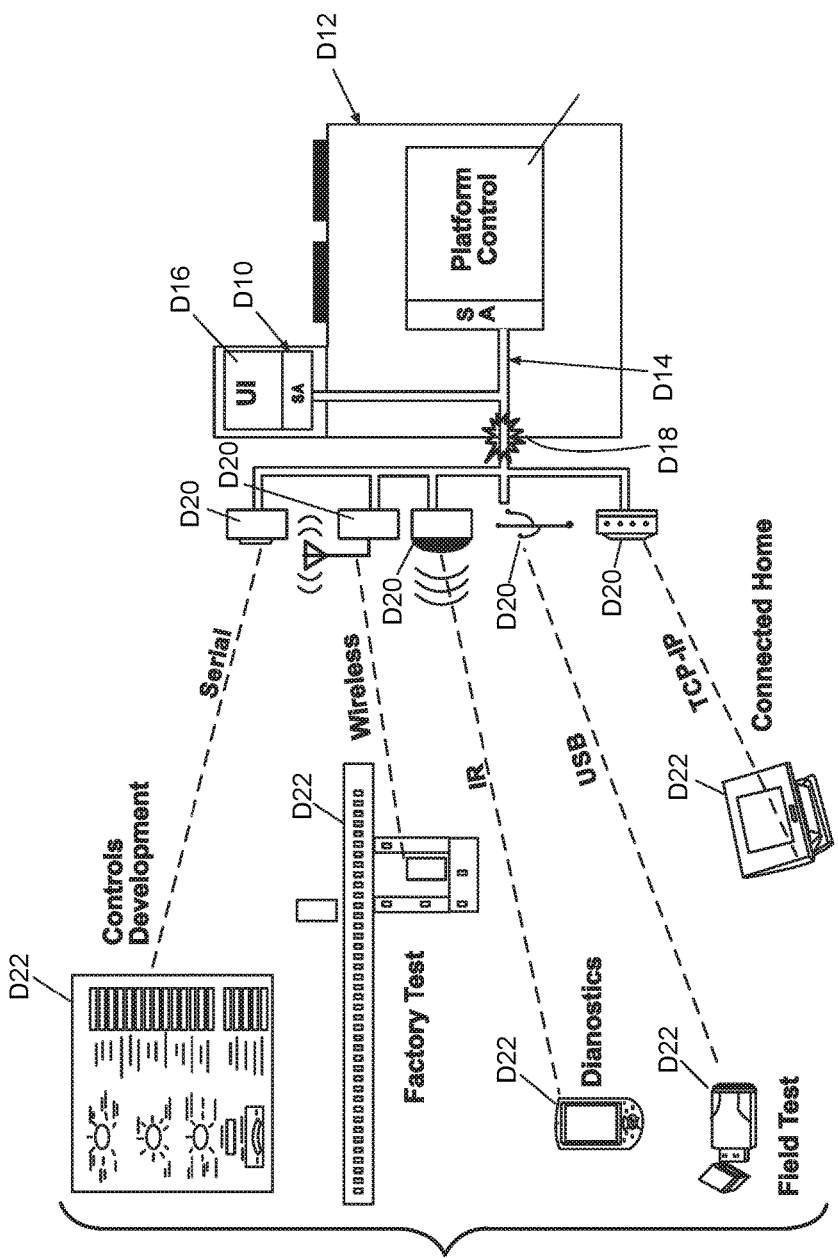
FIG. 79 is a schematic illustration showing a household appliance having an internal communication network interconnecting a plurality of components, wherein each component has a software architecture embedded therein according to this disclosure, the household appliance also having an external communications connection showing various network interface cards (NICs) establishing communication with various embodiments of external clients.

Beginning with FIG. 79, specifics of this disclosure will be described. FIG. 79 is a schematic illustrating one environment of a software architecture D10, (embodying the systems and methods described herein and those which would be apparent to one skilled in the art) in the form of a household appliance D12 having an internal communication network D14 interconnecting a plurality of components D16, which can be internal clients when they include at least a portion of the SA or can otherwise exchange messages across the network D14, wherein the software architecture D10 resides on at least one component D16 to enable the component D16, and preferably each additional component D16 has the software architecture D10 in resident, or an alternate able to be interoperable with. The household appliance D12 also has an internal/external communications connection D18 shown interconnected to various network interface devices D20 for communication with various embodiments of an external client D22.

The external clients will typically comprise computing hardware and software and networking hardware and software able to interact with the software architecture D10. This may be achieved by including all or a portion of the software architecture D10 within the embodiment of the external client or an alternative to the software architecture D10 which is able to communicate and fully or partially interact with the software architecture D10. A number of alternate components (C dll, Visual Basic Driver, Java Driver, and Active X driver) able to fully interact with the software architecture D10 have been implemented.

In connection with the text of this patent application and in review of the drawings accompanying the text of this application, it will be understood that the abbreviation "SA" refers to "software architecture" as described by reference numeral D10 in this application.

Further, the term "client" is used to refer a component on which all or a portion of the SA resides and which fully or partially enables the functionality of the component. The component can be either an internal or external component. While client will primarily be used to describe a component enabled by the SA, client is also used to describe a component that is enabled by an alternate software that is able to successfully exchange messages on internal communication network D14 and communicate with the SA. Generally, the term client is used when referring to the software aspects and not the hardware aspects of the node.

The components D16 can comprise one or more devices. Thus, the term "device" as used in the application can refer to a component or to a device. The devices can be any electronic, electro-thermal, and electromechanical elements which collectively form the component or which are attached to a component with a controller via electrical circuitry (e.g., wiring harness), a physical part which can execute logic, and a physical part which has memory.

As described herein, the appliance D12 can be any of the well-known variety of appliances which would be well known to one skilled in the art. For example, the appliance D12 can be a washer, a dryer, a microwave, a dishwasher, a refrigerator, a refrigerator/freezer combination, a stand-alone freezer, a warming drawer, a refrigerated drawer, an oven, a combination cooktop and oven, a cooktop, and the like. While the described environment of this disclosure is that of an appliance, this disclosure has applicability to any type of machine having networked components.

As described herein, the internal communication network D14 can be any well-known interconnecting conduit, wiring and/or harness, or wireless system suitable for interconnecting the various internal components D16 of a household appliance D12. As described in the background section of this application, the WIDE network is a suitable internal communication network D14 to provide the internal communications necessary to support the software architecture D10 according to this disclosure. It will be apparent to one skilled in the art that the software architecture D10 can run on any suitable internal network, and that the illustrative example provided herein (i.e. the WIDE network) is simply one example of a suitable internal communication network D14.

As previously stated, component D16 is any processor-based component or sub-component of a household appliance D12. Examples of components D16 suitable for receiving and installation of the software architecture D10 according to this disclosure include, but are not limited to, motor control microprocessors, microprocessor enabled key pad controllers, LCD user interface controllers, and other device controls typically included within a household appliance D12.

The internal/external interface connector or slot D18 is suitable for connecting a plurality of types of devices D20, which are able to communicate on the internal communication network D14 and at least one other network such as RS-232 serial, various forms of wireless (ZigBee™, Wi-Fi®, etc.), USB, or wired Ethernet, etc. The functionality of the device D20 may be strictly limited to protocol and physical layer conversion, or may be expanded to support value added services in addition to its base protocol bridging function.

Examples of external clients D22 to which the software architecture D10 permits a household appliance D12 to be connected include, but are not limited to, a personal computer-based control development, a factory testing application, a diagnostic application, a field test application, and an interface to a connected home environment. This connection to the external environment, whether adjacent to or remote from the appliance D12, enables value-added applications to communicate with the appliance D12. Some examples are:

Automated factory test
Energy Management applications
Engineering development tools
Appliance Service and Diagnostic Tool
Electronic Controls Manufacturing Functional Verification Testing
Consumer Applications . . . etc.

The system level architecture (mechanical, electrical, and software elements participating to achieve a useful purpose of the household appliance) includes the software architecture D10 and software elements apart from the software architecture D10. The collection of software elements, including but not limited to the software architecture D10, within the microprocessor of a component of the system architecture is herein referred to as a software operating environment D16A. The software architecture D10 is comprised of three components: a core implementation, an application protocol definition, one or more application program interfaces (referred to herein as "API" or "APIs" in the plural).

Core Implementation

Figure 81:
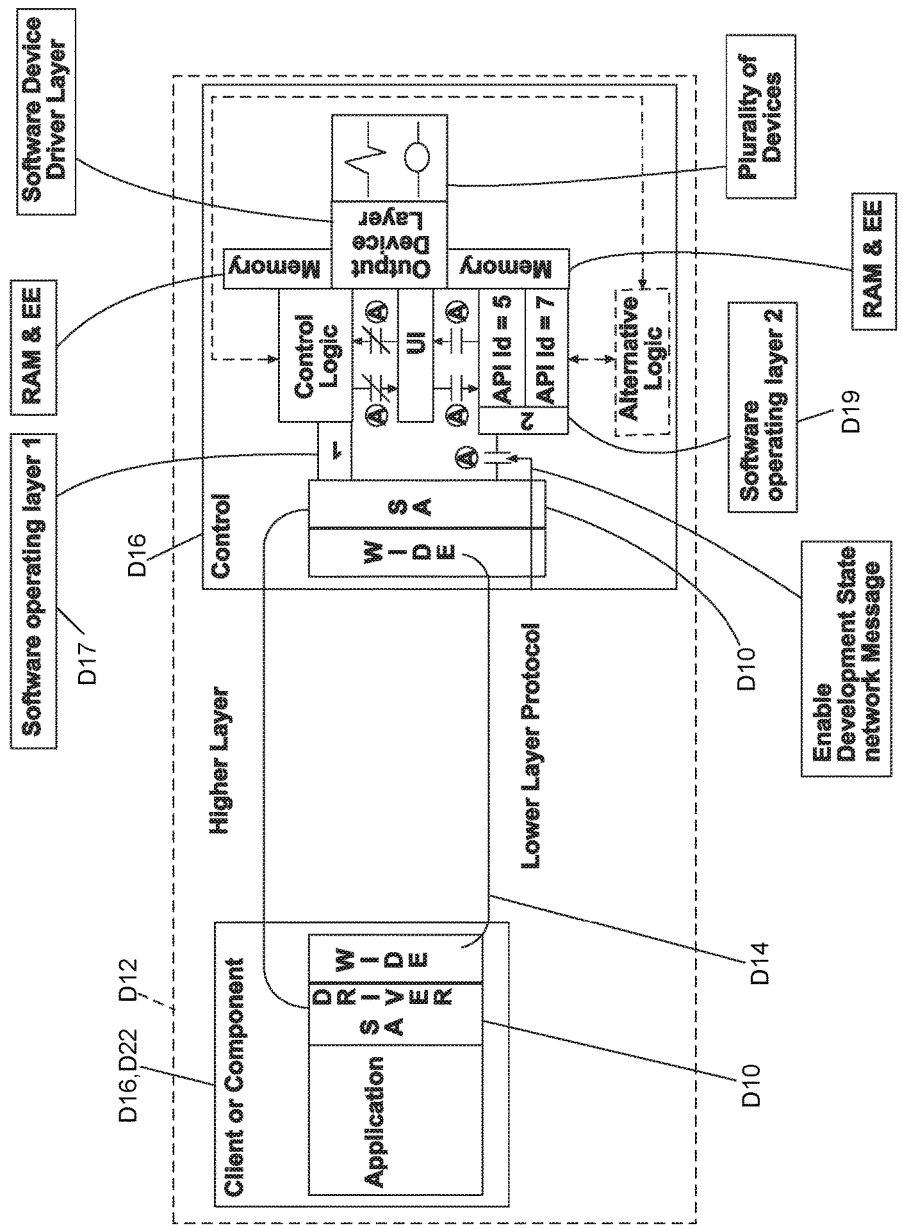
FIG. 81 is a schematic illustration of the internal communications network of FIG. 79 showing the internal communications network functioning as a physical support for the SA residing on two components (a Lower Layer, which represents the network physical layer and is not directly associated with the SA, and a Higher Layer, which represents support for packet structure and is directly an element of the SA) with the SA used by the components to communicate through information exchange and to interact with other software operating layers residing on the components to achieve the results in accordance with the information exchanged between components according to this disclosure.
Figure 89:
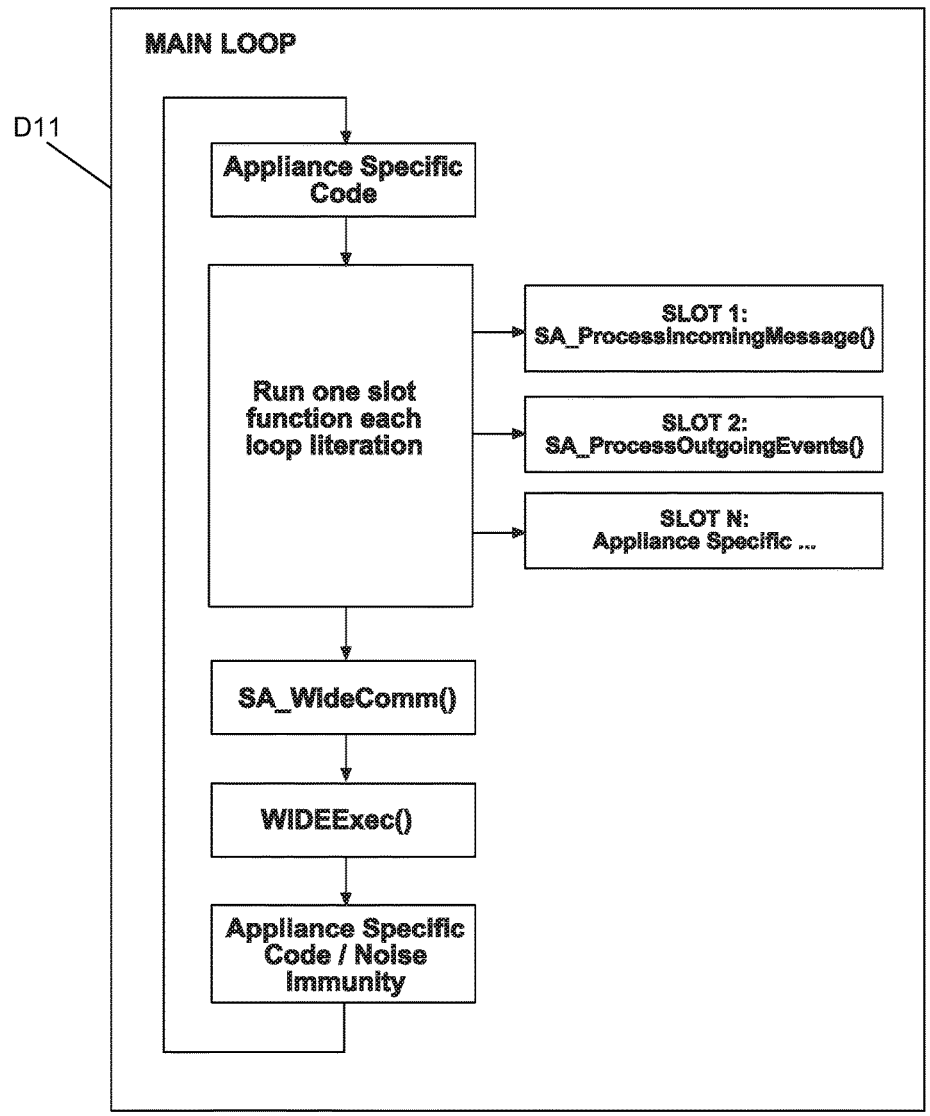
FIG. 89 is a schematic illustration showing the invocation of the controller SA by the supervisory scheduler (MAIN) residing on the main controller, which also invokes a subroutine call to expose functions of client SA's on the network.
Figure 90:
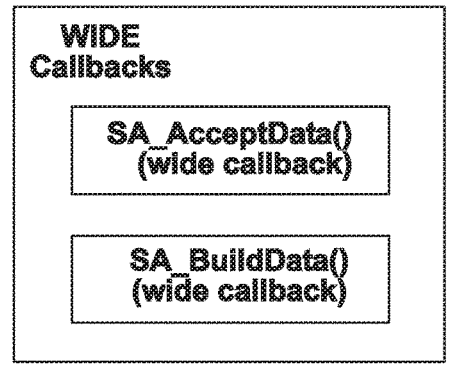
FIG. 90 is a schematic illustration showing the interface between the internal appliance application logic and the software architecture shown in FIG. 89 including a callback section.

The core implementation of the software architecture D10 is a collection of software modules (examples found in FIG. 81 are SACore, SADiscovery, SADAQ, SAPortMemory, SAPollVariable) executing in an appliance control microprocessor. As shown in FIG. 89, the core implementation is preferably executed in the MAIN loop of the appliance control microprocessor which will be apparent to one skilled in the art. The core provides a common application messaging layer over the internal communication network D14 and is based on a flexible design enabling the development of cross-platform connectivity applications. As part of the core implementation, a core API will exist which will be uniformly implemented on each appliance. Moreover, where uniform implementation is not practical, a discovery mechanism may be used, allowing adaptation by the client to the non-uniformity.

Application Protocol Definition

A protocol is a standard procedure for regulating data transmission between nodes in a network. Messages are sent across the internal communication network in one or more packets of data, which are then assembled to form a communicated message. There are two applicable areas of definition relative to the software architecture D10.

Figure 82:
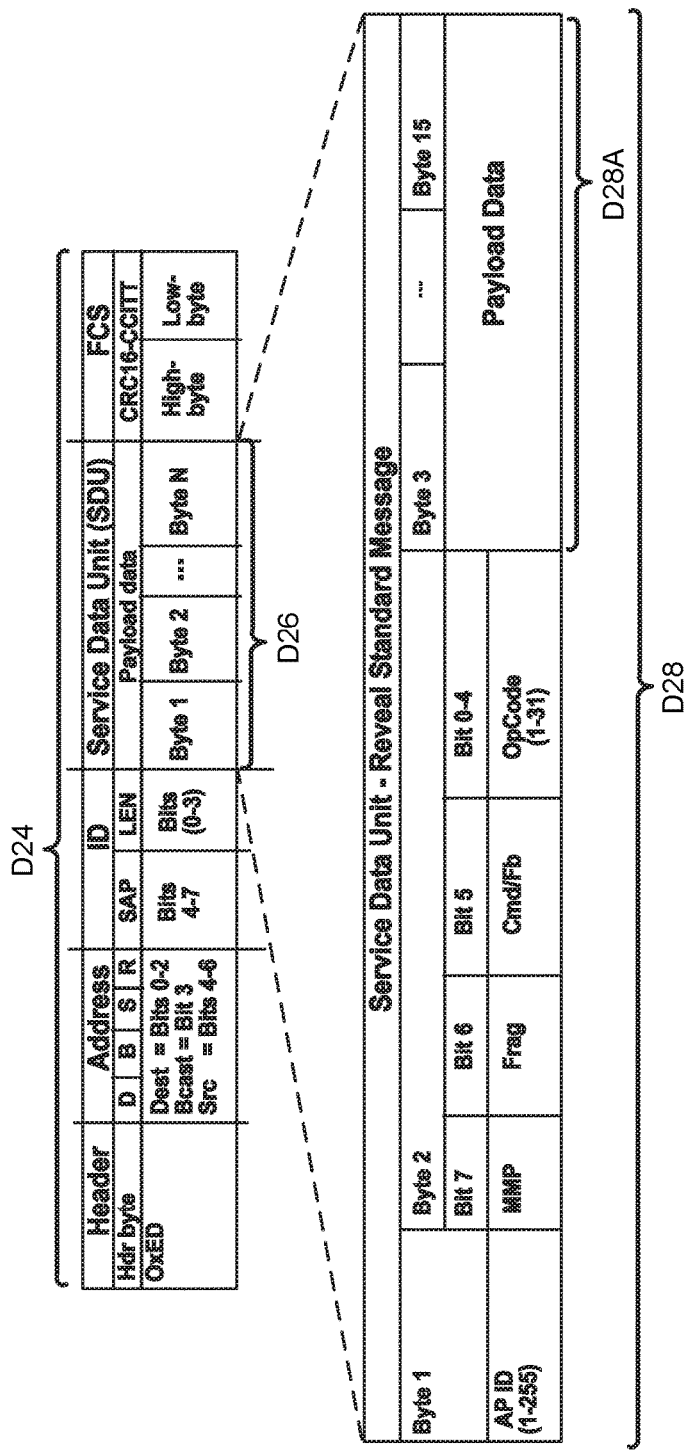
FIG. 82 is a schematic illustration of a packet structure for the internal communications network of the household appliance shown in FIG. 79 having a payload portion comprising an application packet structure for the software architecture according to this disclosure.
Figure 103:
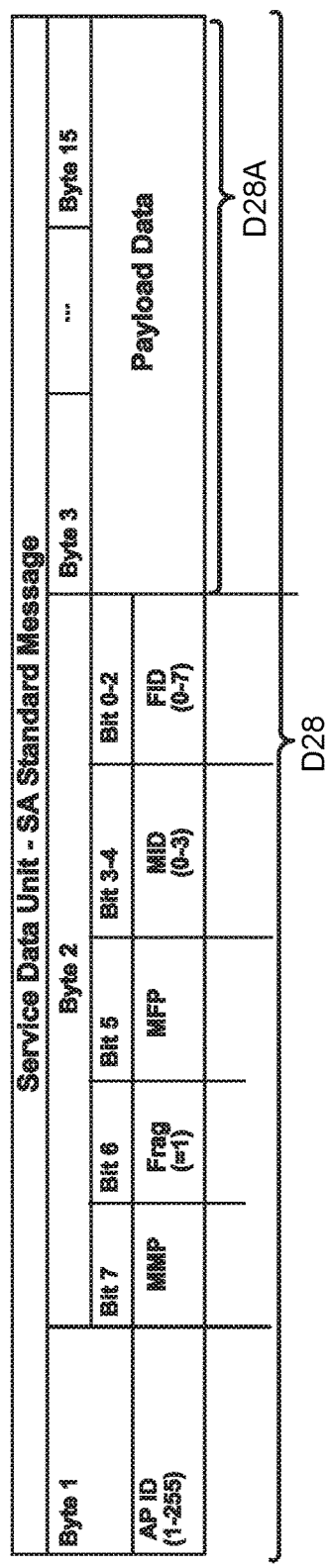
FIG. 103 is a schematic illustration of a fragmentation packet structure for the internal communications network of the household appliance shown in FIG. 79 having protocol for handling fragmented packet integrity, which replaces the protocol illustrated in FIG. 82 when a message must be broken into multiple messages.

1. Packet Definition: is the pre-defined meaning for each byte within a collection of bytes which make the packet, or bits or bit ranges within one of those bytes therein. FIG. 82 and FIG. 103 and their accompanied description represent the Packet Definition of the software architecture D10.

2. Message Order and Messaging Rules: The definition of a Protocol is generally expanded beyond the packet definition (1) above to include rules governing the expected ordered collections of messages necessary to accomplish certain useful transactions. Examples of Ordered Messages with Message Rules (transactions) are shown in FIG. 84, FIG. 87, FIG. 107, FIG. 109, and FIG. 111.

Application Programming Interfaces

An API is a communication and messaging contract, which specifies how one network node communicates with another. This is accomplished by defining the available function calls, the arguments to each function call, the data type of each argument, and in some cases, the valid values of each argument.

In many cases, APIs are specific to an application or appliance D12, and therefore are not considered as part of the software architecture D10 collection of Core (standard set of) APIs; rather, the software architecture D10 core enables and exposes multiple API's to the client D16, D22, and possibly the device D20.

System-Level Architecture

The software architecture D10 was designed to achieve several objectives over time.

1. Business productivity within the constraints of existing control architecture.
2. Business productivity though enablement and realization of new control architecture.
3. Support and better enable core business functions of Innovation, Manufacturability, Quality, and Serviceability.

4. Enable new growth opportunities by enabling production appliances with the software architecture D10 which with the addition of the connector D18 creates the 'connectable' appliance. This approach minimizes the risk and cost of connectivity by externalizing the cost of networking electronics.

To realize the full potential of this architecture, a simple connector can be available on the appliance D12 so that a network card can be plugged into the appliance. See FIG. 79 and FIGS. 96-100 for examples of suitable external devices D20 connected to the appliance D12. As the appliance D12 already has an internal, low cost network D14 for its internal purpose, additional wiring to connect the internal communication network D14 with the external device D20 via the internal/external interface D18 is minimal and can be accomplished in a known manner, such as by a three-wire serial cable, an external connector, and a mounting fixture.

The software architecture D10 can preferably reside on all components D16 of the household appliance control system. However, where cost or other constraints are prohibitive, the software architecture D10 can reside on a sub-set of the components D16 within the control system of the household appliance D12.

Example benefits of this "connectable" architecture include, but are not limited to: external device D20 can be added after market, reducing base cost of the appliance D12. Devices D20 can be developed supporting multiple network technologies, applications and devices D20 can be cross-platform and generic due to the standard interface presented by the software architecture D10, an internal low-cost network (such as the WIDE network example) D14 is used as a standard, API framework and discovery allows many value added commands, the software architecture D10 uses bounded events to preserve state and make efficient use of bandwidth, and the software architecture D10 is designed to be configured at runtime allowing program developers a more flexible architecture that can reduce time to market.

Figure 80:
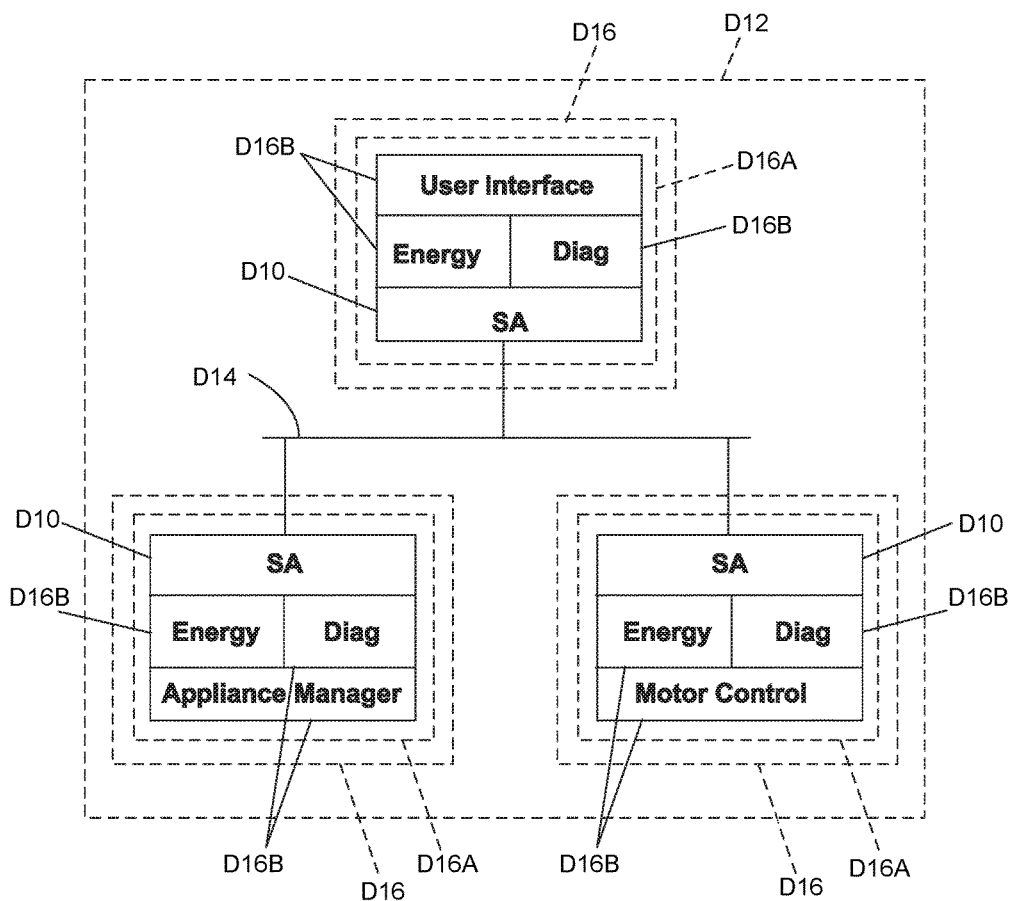
FIG. 80 is a schematic illustration of the internal communications network of FIG. 79 showing the software architecture (SA) according to this disclosure interposed between the internal communications network and various software components of physical components internal to the household appliance.

FIG. 80 is a schematic illustration of the internal communications network D14 of FIG. 79 showing the software architecture D10 according to this disclosure interposed between the internal communications network D14 and various software components D16B within the software operating environment D16A internal to the components D16 making up the control system for the household appliance D12. The components D16 in FIG. 80 represent typical components found in appliances D12, such as an appliance manager (main board or motherboard) and another component such as motor control and a control panel or keypad interface, generally referred to as a user interface. The "Energy" and "Diag" indicia in FIG. 80 are examples of typical non-core functions performed by the software architecture, such as energy and power management ("Energy") and troubleshooting or diagnosis ("Diag"). Not explicitly shown in FIG. 80, are core functions (API 1-7 and 10) performed by the software architecture and represented by the indicia D10.

In addition, the software architecture D10 can be extended to many other types of system architectures where data exchange over peer-to-peer communication is desired. These include multi-node systems where multiple printed circuit boards, such as a motor control board, appliance control board, and smart sensor boards communicate within the appliance D12 using the software architecture D10. The software architecture D10 discovery protocol illustrated in FIG. 84 (and described later herein) can be used to enable a component D16 whose presence causes other components D16 to adapt their control functions to create new behavior or performance or expose new capability to the consumer. The component architecture of FIG. 80 (structural model) along with the discovery behavior of FIG. 84, along with the component identification scheme of API ID, Type, Version (see API ID=D3) are a basis for this disclosure embodied in D10 to enable the appliance with a new dynamic and intelligent system architecture.

FIG. 81 is a schematic illustration of the internal communications network D14 of FIG. 79 showing typical components D16 for appliance control exchanging messages via the internal communications network D14 of the household appliance D12 comprised of a lower layer protocol, such as WIDE, which accounts for OSI layers of PHY, LINK, and partial network layer functionality, as well as a higher layer protocol supported by the software architecture D10 (which accounts for OSI layers of application, transport, and partial network layer functionality) according to this disclosure. The lower layer protocol functions as both a physical and link layer between the higher layer(s) associated with the software architecture D10 and the components D16 in the appliance D12. In this way, the software architecture D10 uses the lower layer protocol to communicate with a first software operating layer D17 that implements the control logic of the component D16 for appliance control relative to client D16, D22, as well as using a second software layer D19 to bypass the control logic and directly control the devices associated with the component D16 for appliance control. The devices in FIG. 81 are the physical elements that represent the functionality of the component D16 for appliance control. FIG. 81 illustrates the software architecture D10 from a software/protocol stack perspective.

In addition, FIG. 81 provides a schematic illustration of two modes of operation enabled by the software architecture D10 which control access to and the level of intervention between the network messages exposed by the software architecture D10 and the internal RAM, EE, and other forms of non-volatile memory of the software operating environment D16A, as well as an output device layer, which comprises the low level software operating layer D19 representing the software components D16B residing within the software operating environment D16A and providing direct control of the devices for the component D16. The software components D16B having direct control of the devices do so by having direct access to the microprocessor port address memory, which, in turn, maps to the physical pins of the microprocessor which, in turn, are connected through various electronic apparatus to the electro-mechanical devices.

Software operating layer D17 of FIG. 81 represents appliance specific software components D16B which interface the network messages received by software architecture D10 to the application control logic resulting in the application control logic to take some action. When the appliance is in a development state, an additional software operating layer D19 (comprised of API D5 or low level API and API D7, which is the memory/port API) enables the network messages of API D5 and API D7 to change the state of the physical memory of the software operating environment 16A and the devices. In this way, the devices can be controlled independently of the application software, which typically controls the devices in accordance with an operational cycle. The direct control permits the each function of the devices to be independently controlled, which is very beneficial in development or diagnostic conditions.

Figure 85:
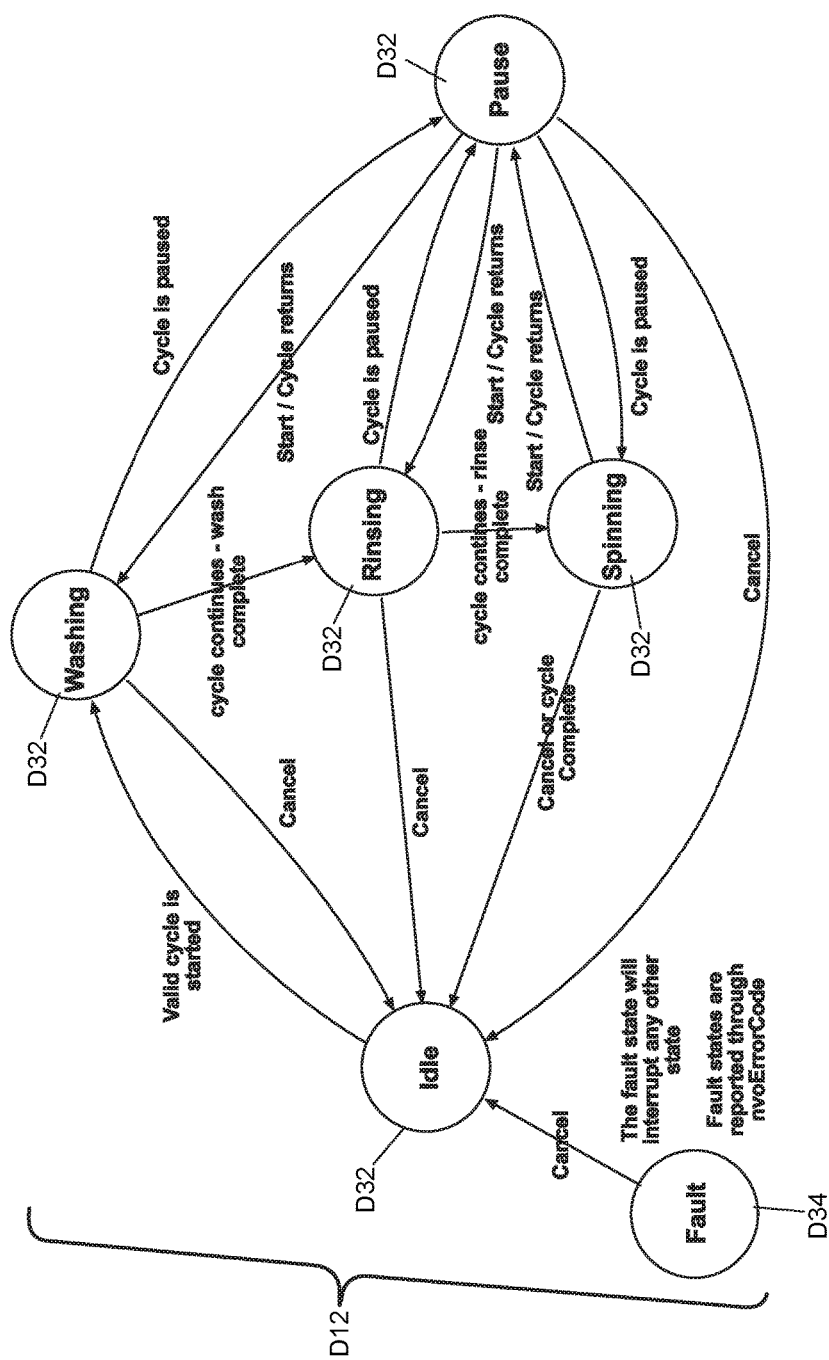
FIG. 85 is a schematic illustration of various exemplary states of a software operating environment typically operating within the Control Logic element as shown in FIG. 81 within a component of a household appliance, which is illustrated as a washer.

Software operating layer D19 is enabled to effect state change by a special network message exposed by software architecture D10 as well as by additional logic customized for the various states of the appliance, an example of which is shown in FIG. 85. During the development state, it is preferred that when the user interacts with the appliance D12 via the user interface of FIG. 81, software operating layer D17 will not receive the associated user interface inputs. Instead, software operating layer D19 will receive the inputs from the user interface. Subsequently, software operating layer D2 D19 may interact with the alternate logic of FIG. 81. The alternate logic may in turn make function calls onto the control logic of software operating layer D17, change values in memory, or change the state of the attached plurality devices. However, during the development state, software operating layer D17 is not able to affect the state of the user interface (e.g. LEDs, lamps, buzzers, text and graphic displays). The development state renders the control logic of software operating layer D17 ineffective unless invoked from software operating layer D19. During the development state, the implementation logic of APIs D5 and D7 and the alternate logic are in complete control of the appliance D12 and its associated components D16.

The development state reverts back to the idle state (FIG. 85) when a special network message is received. In addition, it is contemplated that at least one predetermined key press or a predetermined sequence of key presses may also result in a transition from the development state to the idle state.

Software operating layer D17 operates independently of the enablement of software operating layer D19. The purpose of the development state is to allow and enable operational cycles that have not been previously contemplated. The advantage to this approach is that implementations and configurations of the appliance D12, some of which are illustrated in FIG. 79, do not require new software modifications to any component D16 of the appliance D12 because the appliance D12 has the capability through the software architecture D10 to support any implementation or configuration contemplated.

There are many uses for this capability. They include but are not limited to:

ability to add new functional componentry to an appliance enabled with software architecture D10 achieving new behavioral characteristics and cycles of operation without modification to the pre-existing functional componentry. Examples of this are:

adding steam control to a washer, dryer, oven, and microwave adding energy and other resource management componentry to an appliance adding networking componentry enabling connections to external networks in addition to the internal network D14.

adding a card reader to a commercial appliance in order to create a pay for use usage model.

adding a memory device which comprises additional cycles of operation available for selection and invocation by a client node or application or a user interacting with a user interface.

performing diagnostic tests, which can be accomplished by actuating each output sequentially to verify the expected results (examples: heater on—observed temperature increase, fill valve on—observe water level rise, ice crush motor—observe rotation of crushing apparatus)

performing automated factory tests performing automated performance testing and DOE executions performing automated lifecycle testing performing component D16 unit testing and automated regression testing performing automated ECM testing performing other forms of ad hoc debugging and testing enabling an alternate client device (example: PC) to control the Appliance D12 allowing the universe of selectable cycles of operation to be developed and tested using alternate software operating environments D16A to that which is typically required on the final production embedded computing componentry D16 which offer more productive programming environments resulting in a reduced time to market for new appliance models.

FIG. 82 is a schematic illustration of a packet or packet structure D24 for the internal communications network D14 of the household appliance D12 shown in FIG. 79 having a payload portion D26 comprising an application packet structure D28 for the software architecture D10 according to this disclosure. Packet structure D28 represents a well-formed message that the software architecture D10 can create and send to other components or clients D16 and D22 comprising an occurrence of the software architecture D10 or a variant thereof designed to be operable with packet structure D28 for the purpose of a meaningful exchange of data. Packet structure D28 occupies the position of payload portion D26 within packet structure D24, but packet structure D28 could occupy an alternate position in a variant of packet structure D24. D28A represents a packet structure within D28 which is defined according to the values of API Id and Op Code of packet structure D28.

In a network protocol, a packet (sometimes called a message) is a collection of bytes which are transmitted sequentially, representing all or part of a complete message. Generally, a packet is composed of a header, which includes routing information; a body (also referred to as the payload portion) of data; and a footer that sometimes contains a checksum (e.g., a CRC sum) or a terminator, such as an "end" flag. The payload is a collection of bytes contained in a packet. The payload is the data being transmitted between the application layers of two nodes, which are components D16 comprising the SA or an SA driver. The function of the network and the protocol is to get the payloads from one node to the other. Sometimes one protocol is sent as the payload of another, and in this way, protocols can be nested or stacked. Variables are named memory locations that have associated values. One or more variables can comprise the payload. A transaction is a series of messages or packets that represent a complete data exchange between a plurality of nodes.

The relationship between a packet and a payload can have an impact on the efficient use of available bandwidth. The tradeoff to be considered is the amount of overhead needed to get the payloads from one node to another in the context of application layer requirements.

The protocol packet structure D24 has a first header byte that is identified, for example, as 0xED, followed by an address byte having four portions. The first portion of the address byte comprises a destination portion (D) of bits 0, 1, 2. The second portion of the address byte comprises a broadcast portion (B) of bit 3. The third portion of the address byte comprises a source portion (S) of bits 4, 5, 6. The fourth portion of the address byte comprises a reserved portion (R) of bit seven. The address byte is followed by an identification byte comprised of a service data unit length (SDU-L) comprised of bits 0-3 and a SAP identifier comprised of bits 4-7. A SAP identifier defines the structure of the enclosed payload D26. A SAP of D4 indicates that the enclosed payload D26, also called a service data unit (SDU), is defined by the packet structure D28 associated with the software architecture D10. The identification byte is followed by the payload D26. The payload D26 is followed by a standard validation byte, such as a high-byte, low-byte combination or generally referred to by those skilled in the art as CRC 16-CCITT.

The application packet structure D28 is formed from the payload portion D26 of the protocol packet structure D24. It is within this application packet structure D28 that the communications protocol and data exchange permitted by the software architecture D10 is carried out. The first byte of the application packet structure D28 contains an identifier (API ID), an integer from D1-255, of the particular API carried by the particular instance of the application packet structure D28. The second byte up the application packet structure D28 contains in operation code (abbreviated herein as "op code") as an integer from 1-31 in bit 0-4, followed by a command or feedback (Cmd/Fb) flag of bit 5, a fragmentation (frag) flag of bit 6, and a more messages pending (MMP) flag in bit 7. Bytes 3-15 of the application packet structure D28 comprise the payload (i.e., message data) of the particular instance of the application packet structure D28.

Essentially, the software architecture D10 uses two bytes of the payload D26 of the network packet structure D24 of the internal communication network D14 for additional protocol. The API ID is a unique identifier for a collection of Op Codes which are organized into functional units. 0xFF (255) and 0x01 (1) are preferably reserved. An Op Code is a unique ID within an API which defines and identifies a single command or feedback message. Each API has an associated Type (2 bytes) and Version (2 bytes) allowing for a large library of identifiable, functionally related groups of messages (op codes) to be created over time.

Preferably, 79F (31) is a reserved value for Op Code. The Cmd/Fb flag indicates whether the message is a classified as a command or a feedback. A command is some message that requests an action to be taken, where a feedback is some message that simply contains information (e.g. acknowledgement, event data). Preferably, the Cmd/Fb flag is 0 for commands and D1 for feedbacks.

The frag flag specifies whether the received message is being broken into multiple messages (fragments) by the sender because of the size limitations of the lower layer protocol's payload D26. The first fragment of the message will take on the structure of FIG. 82. All subsequent fragments of the message will take on the structure of FIG. 103. The frag flag is preferably set until the fragmented message is completed.

Figure 87:
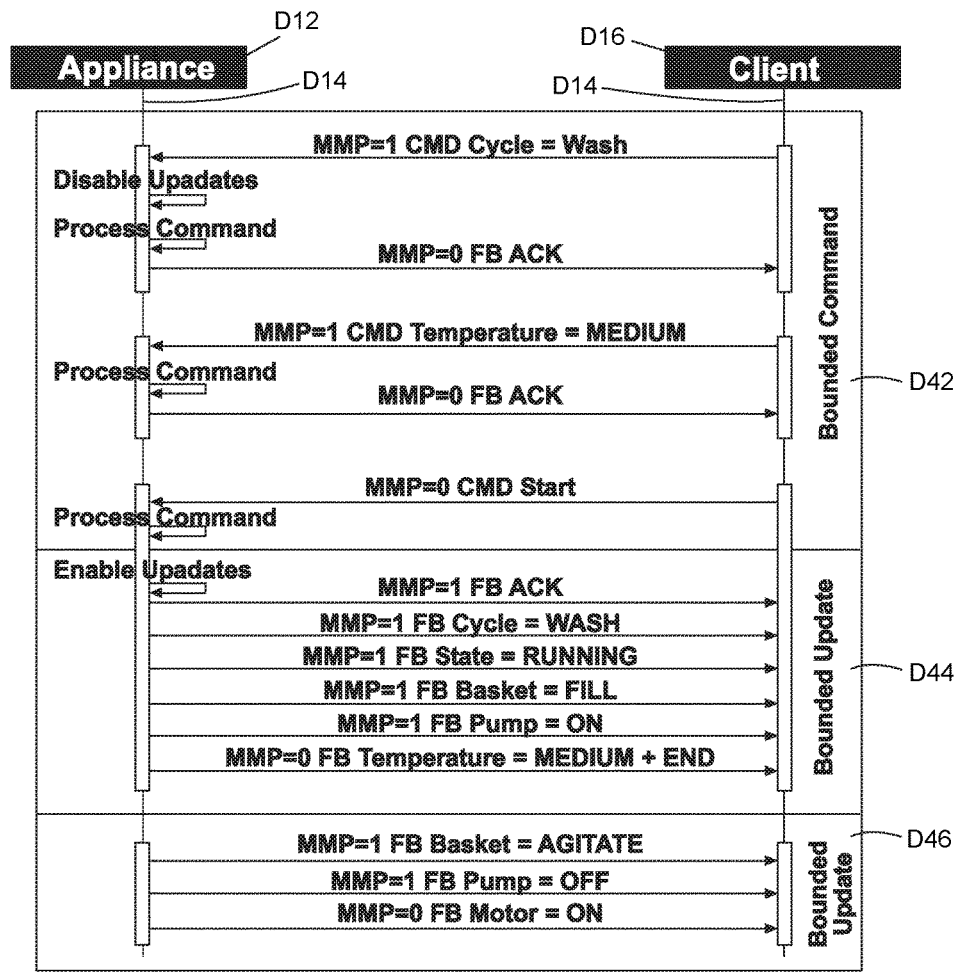
FIG. 87 is a schematic illustrating the usage of binding to link multiple data exchanges to form a single command and/or update between a client SA and the controller SA.

The MMP flag indicates that events are sent as individual messages but are bounded together by protocol so that the client can group events together as a complete snapshot for one scan of the micro-controller. The MMP flag is preferably set until the last message for a snapshot is sent out. FIG. 87 and the accompanying discussion provide more detail on bounded messages.

The MMP flag provides the software architecture D10 the capability to express the state of an appliance D12 as a function of independently meaningful feedback variables bounded together in snapshots.

When the internal state of an appliance D12 changes, multiple events may be sent that, in total, describe the new state of the appliance D12. The number of events required to describe a state change is appliance D12 state specific. Therefore, special protocol delimiters are used to allow an implementation specific number of feedback variables to be associated with a particular appliance state change. Because these events are independently meaningful, this approach is preferable in that all permutations of event (data) aggregations can be created through the use of MMP. This results in efficient use of the identification namespace (API Id and Op Code) because no new identifiers are required when the client requires a new combination of data to be sent. In summary, MMP and the associated rules thereof, allow dynamic and virtual data aggregation eliminating the need for special application case specific solutions. In FIG. 87, the net effect of the MMP flag is shown.

The MMP flag also provides the capability for the embedded implementation to suppress the invalid transient condition. As the appliance state transitions, it is possible for a set of related variables to change several times very rapidly. When appliance state is expressed in terms of independent feedback variables sent as separate events (feedback messages) without a binding mechanism, ambiguous or invalid transient states are likely to occur. Moreover, if the client is executing business logic during the invalid transient state, logic errors may result in incorrect control or user display actions. Refer to the section hence, labeled State Integrity, for an example of how asynchronous data collection is an inferior approach to data collected synchronously within each scan of the microprocessor and transmitted within the snapshot enabled by MMP. In addition, message binding can be used to group independent command invocations so that they may be processed in batch.

The packet structure D28 also governs incoming messages. In general, networks allow asynchronous processes to communicate, creating the potential for one network node to exceed the processing capacity of the other by sending too many requests within a short time window. To prevent message overruns, a protocol is used, according to this disclosure, which allows the sender to wait for an acknowledgement before sending a second message.

This feature permits the software architecture D10 to use an enumeration for this acknowledgement based on the execution state D8 of the software architecture D10. In this way, necessary information describing message success or failure is communicated with fewer messages. The command sender will receive an enumerated acknowledgement for each command sent. The most common is a positive ACK, which means that the node is ready to receive its next command. All other enumerations are a form of failure. Failure is characterized by the remaining 254 possible values of the acknowledgment byte. Of this range of 254 values, some are standardized and some are reserved for application specific failure codes.

Frag flags and MMP flags allow the user of the software architecture D10 flexibility in designing the application messaging strategy. If a developer chooses to use very large messages, the frag flag can be used so that messages larger than the packet structure D28A (i.e., 13 bytes within the exemplary application packet structure D28 shown herein) can be sent by sending the original large data set as multiple smaller data sets within multiple packets of packet structure D28.

By the same token, if a developer chose to use smaller messages (which are often the case) but wanted to group those messages together, MMP flags can be used. For example, if 10 messages of 3 bytes each needed to be sent as a group so that the client application could know that the messages were related to the same scan of the microcontroller, then the first 9 messages would have the MMP flag set and the last message of the group would have the MMP flag=0.

The following presents a summary of defined APIs for the software architecture D10 and then each one of these commands and feedback messages is described in detail. The advantage of this approach is that it allows the developer to choose the modules within the software architecture D10 that are appropriate for the current stage of development (e.g., unit test, engineering testing, production). Furthermore, compiling out certain modules allows developers to use portions of the software architecture D10 in those cases were RAM/ROM resources would otherwise be prohibitive. The APIs are described with their currently-selected application program interface identifier (API ID); however, any identifier can be employed without departing from the scope of this disclosure. The associated functions made capable by the particular API are enumerated beneath each API. Bulleted functions ("•") are feedback messages which are sent from the software architecture D10 to the client (such as an internal client D16 or an external client D22) and non-bulleted functions are commands which are sent from client (16, D22) to the software architecture D10.

One note on a convention used in this application. The word "extends" refers to the ability of one API to build on the functionality of a baser-level API. The extends keyword means: When API x 'EXTENDS' API y, then API x=API x+API y. This notation simplifies the task of record keeping and API documentation. In other words, API x also includes those functions specified in API y. If API x and API y each specify a function with the same Op Code, the implementation of API x implementation can take precedence.

The following table describes the Core API (API ID=1):

| |
|---|
| Message Acknowledgment |
| Publish Heartbeat |
| Set Heartbeat Period |
| New Heartbeat Period |
| Read Memory |
| Publish Memory Data |
| Read EE |
| Publish EE Data |
| Send Event(s) |
| Publish Event |

The following table describes the basic data acquisition API
(Basic DAQ, API ID=2, Type=1):

| |
|---|
| Create Numeric Event |
| Create Byte Event |
| Clear Event(s) |
| Publish Events Cleared |
| Reset SA |
| Publish SA Reset |
| Set External On |
| Publish External On |
| Set External Off |
| Publish External Off |

The following table describes the extended data acquisition API
(Extended DAQ, API ID=2, Type=2): The extended DAQ is inclusive of the Basic DAQ at runtime.

| |
|---|
| Get Event Data |
| Publish Numeric Event Data |
| Publish Byte Event Data |
| Create Remote Numeric Event |
| Create Remote Byte Event |
| Get Remote Variable Data |
| Publish Remote Variable Data |

The following table describes the Discovery API (API ID=3):

| |
|---|
| Find Nodes |
| Publish Node |
| Get APIs |
| Publish APIs |
| Get API Info |
| Publish API Info |
| Get Instance Info |
| Publish Instance Info |

The following table describes the Core Debug API (API ID=4):

| |
|---|
| Publish Saturation |
| Register for Saturation Message |

The following table describes the Low Level API (API ID=5):

| |
|---|
| Set Development State |
| Publish State |
| TBD (Appliance Specific) |

The following table describes the Core Key Press API (API ID=6):

| |
|---|
| Press Key (key index) |
| Publish Key Press (key index) |

The following table describes the Core Memory/Port API (API ID=7):

| |
|---|
| Write Memory |
| Write EE |

The Energy Management API is API ID=8. As does the other APIs, the Energy API is made of a collection of Op Codes, each representing a useful function relating to energy management, and having an associated collection of bytes which are the appropriate parameters to achieve the function.

The following table describes the Poll Variable API (API ID=10):

| |
|---|
| Read Poll Variable |
| Publish Poll Variable |

The Core API (API ID=1 herein) is the smallest subset of the software architecture D10 functionality that can be deployed. However, it is contemplated that other embodiments compliant with packet structure D28 may be developed. It makes provisions to design the two hard coded data acquisition schemes referenced in FIG. 83.

Figure 83:
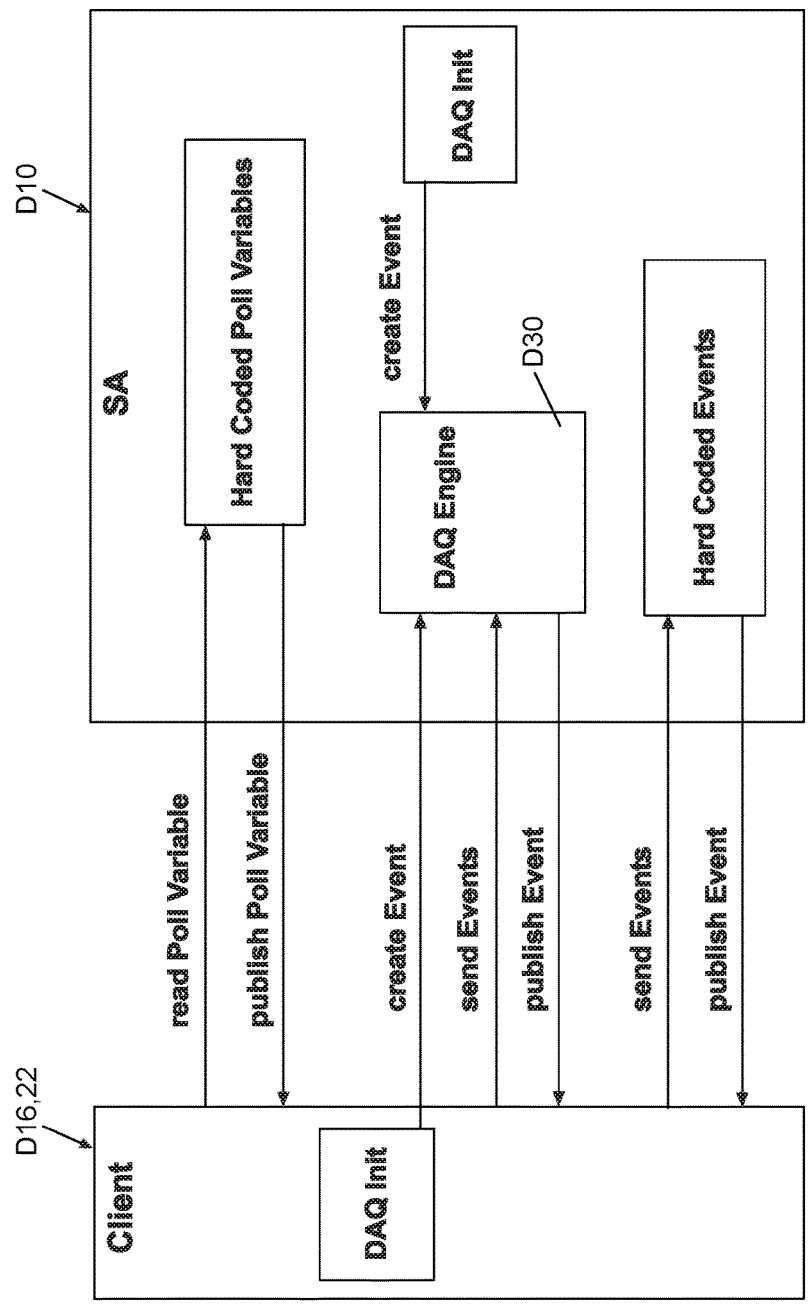
FIG. 83 is a schematic illustration of communication between a SA residing on a controller, controller SA, of the appliance and an SA residing on a component to create a client relationship, client SA, relative to the SA on the controller where various variables and events are transmitted between the controller SA and the client SA.

In the Core API, a protocol mechanism, send Events of FIG. 83, allows the client (16, D22) to request the event source to send all or send a specified set of events. In this way, a type of polling is possible within the framework of the eventing architecture without separate message definitions or implementation structures and logic. Moreover, this mechanism enables robust system startup conditions. For example: if all network nodes send all events simultaneously at system power up, misoperation within the software of a client D16 or D22 where the software components therein would not be able to accurately process the plurality of messages generated as a result of a power-up condition are more likely.

The DAQ API (API ID=2) presents a dynamic mechanism query for a component D16 enabled by the software architecture D10. This feature allows the client D16/22 to configure an embedded software engine (an array of structures whose elements are instanced and stored in a dynamic memory heap [see DynamicMemoryHeap of FIG. 113 containing a collection of NVOEvent structures]) which associates a section of microprocessor memory with an event operator (described in a table below) and arguments. Pointers into memory, values of the memory, event operators and operator arguments are stored in the memory heap's array of structures [FIG. 113 Heap[ ] containing NVOEvent structures]. As shown in FIG. 83, the DAQ engine can be configured in 2 ways:

1. Application software apart from the software architecture D10 which resides in the same microprocessor can configure the DAQ D30 as is shown by the arrow in FIG. 83 from the DAQ Init( ) software component.

2. Secondly, external clients may use the DAQ API (described herein) to configure the DAQ from the network D14.

The rational for each method of DAQ configuration is discussed D3 paragraphs hence.

Figure 116:
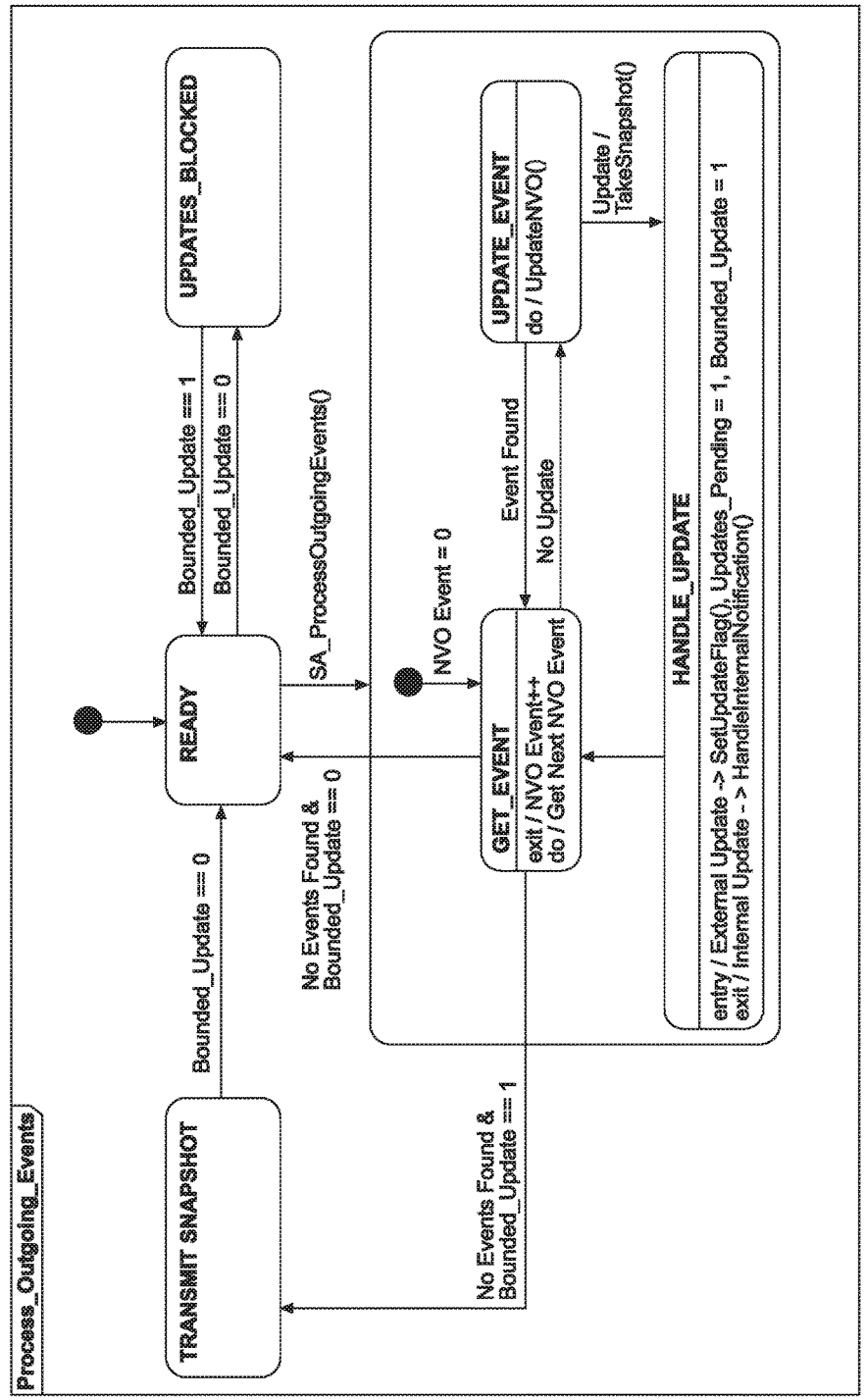
FIG. 116 shows a collection of inter-related UML state diagrams illustrating 4 primary states (READY, TRANSMIT SNAPSHOT, UPDATES_BLOCKED, and PROCESS_DAQ_EVENTS).

As shown in the Process DAQ Events State Diagram of FIG. 116, when the DAQ engine is executed, it iterates over each event structure, checking the associated memory locations against the event operator and arguments. When the event conditions evaluate to a TRUE, message buffers are constructed within the internal memory reflecting the data associated with the event condition. When the iteration is complete, notification messages are generated and preferably broadcast to the network. Alternatively, notification messages can be directed to a specific component D16 if additional memory is allocated to store the network identifier of the component which initially requested or configured the event.

A developer can use several event operators. Examples include: on change, greater than, less than, equal to, deadband, and bitmask. Several Op Codes of the DAQ API are provided to control the memory heap at runtime such as: clear Events, add Events, External notification on/off, get Events, get Event Data, etc.

In total, the software architecture D10 supports four schemes for data collection (all of which are shown in FIG. 83). Two of the four schemes, describe briefly above, are reliant on the DAQ. The other two schemes, also briefly described above, are hardcoded. Each scheme can co-exist within the software architecture D10. Each scheme provides certain optimizations at the expense of other resources.

In a client-configured data acquisition scheme, dynamic events are created. This method can be used if the microprocessor has enough RAM/ROM capacity and is most commonly used when the client is a PC application. Using the DAQ API, a developer can re-use code, require less engineering time, leverages a proven re-useable eventing module, is flexible (e.g., can be configured at runtime), and there can be an optimization of network bandwidth. However, this method can require more RAM/ROM than hard coded methods and an embedded client might not have access to needed data files at runtime.

In the client-configured data acquisition scheme, the DAQ engine D30 must be provided a memory location in order to watch for an event. With a variable map, this is practical when the client is a PC application as in FIG. 105. However, when the client is, for example, another control board that implements the software architecture D10, access to a variable map is impractical. Thus, this disclosure provides functionality for an embedded variable map located in the memory of a node implementing the software architecture D10. This variable map links an API and Op Code to a variable address as in FIG. 106. Thus, in order to register for an event on said node, the client needs only know the API and Op Code for that variable, not the specific memory address.

Using the embedded variable map in the client-configured data acquisition scheme, the situation may arise where a particular client is restricted from creation of an event because the associated API and Op Code pair has already been registered by another node. In such a situation, this disclosure provides that node the ability to request information about the embedded variable map. Included in this information is the variable's memory address. With this information, the client node can the register for an event of the same variable using the variable's address and a different API and Op Code pair than previously attempted (see FIG. 107).

An alternative to the client-configured DAQ, is a self-configured DAQ. In this case, the internal logic uses the DAQ engine D30 to create NVOEvent structures in the DynamicMemoryHeap of FIG. 113. This can be a useful scheme when the events to be realized are fixed and are known at the time of design and there are enough RAM and ROM resources to reuse the difference engine (the logic contained within the DAQ D30) of the DAQ D30. Therefore this method has similar benefits as the client-configured dynamic event scheme, and moreover, will require more RAM/ROM than hard coded methods (described below).

In a hard-coded eventing module, a developer can optimize network bandwidth, optimize use of RAM/ROM and can conform to the DAQ API. However, this scheme requires a custom-coded solution to generate the events and does not rely on the software and logic of the DAQ D30 as shown in FIG. 116).

Using the hard-coded polling method provided by the Core API, a developer can optimize use of RAM/ROM by creating custom-coded solution. Polling will generally waste network bandwidth, but is sometimes used due to its simplicity.

FIG. 83 illustrates one example of each type of potential data acquisition method. An installation of the software architecture D10 can support one, some, or all of the D4 methods. Each of the installation D10 and the client D16 may have a DAQ API initialized thereon. The software architecture D10 may have one or more hard-coded polling variables, one or more hard-coded events, and/or a DAQ engine D30 as described. Various variables and events are transmitted between the main software architecture installation and the client. For example, various hard-coded polling variables are exchanged between the software architecture D10 and the client D16 by the read Poll Variable and publish Poll Variable methods. Various hard-coded events are exchanged between the software architecture D10 and the client D16 by the send Event and publish Event methods. A create Event method is called by the DAQ Init engine which is sent to the DAQ Engine D30 which, in turn exchanges a generated event with the client D16 by the send Event and publish Event methods. The DAQ engine D30 in the software architecture D10 can also create an event received via a create Event method received from the client D16.

Turning again to FIG. 14. FIG. 14 is a schematic illustration showing communication between a household appliance D12 having the software architecture D10 installed therein according to this disclosure and shown in FIG. 79 and a client D22 at a remote location, such as a customer call support center as shown in FIG. 14. The appliance D12 has an interface D18 to its internal network D14 and a network interface D20 which allows it to communicate with the external client D22. The schematic of FIG. 14 shows the customer service center setting up a variable watch using the DAQ Engine D5 create Event function and diagnosing a trouble with the household appliance D12 without needing to send out a service truck to the residence.

The software architecture D10 can be customized to allow for the needs of different implementation platforms. RAM and ROM space and time complexity can be managed, as well as access to memory locations, and timeouts. All of these are located in a predetermined parameters file. It will be understood that the parameters can be renamed, changed, retyped, added or deleted without departing from the scope of this disclosure.

A Discovery API (API ID=3) enables the concept of "Plug 'n Play" architecture. The Discovery API implies that a physical network node or client D16 can contain n functions, each encapsulated by a known API with a unique ID, Type, and Version. These APIs are portable (meaning they represent functionality and are independent of the microprocessor, software language, and network topology) and re-useable on other components where the functionality therein is applicable. The Discovery protocol (described in API 3 of FIG. 84) allows the client to learn the associations between the components D16 and the groups of functionality (APIs) which they contain.

Figure 84:
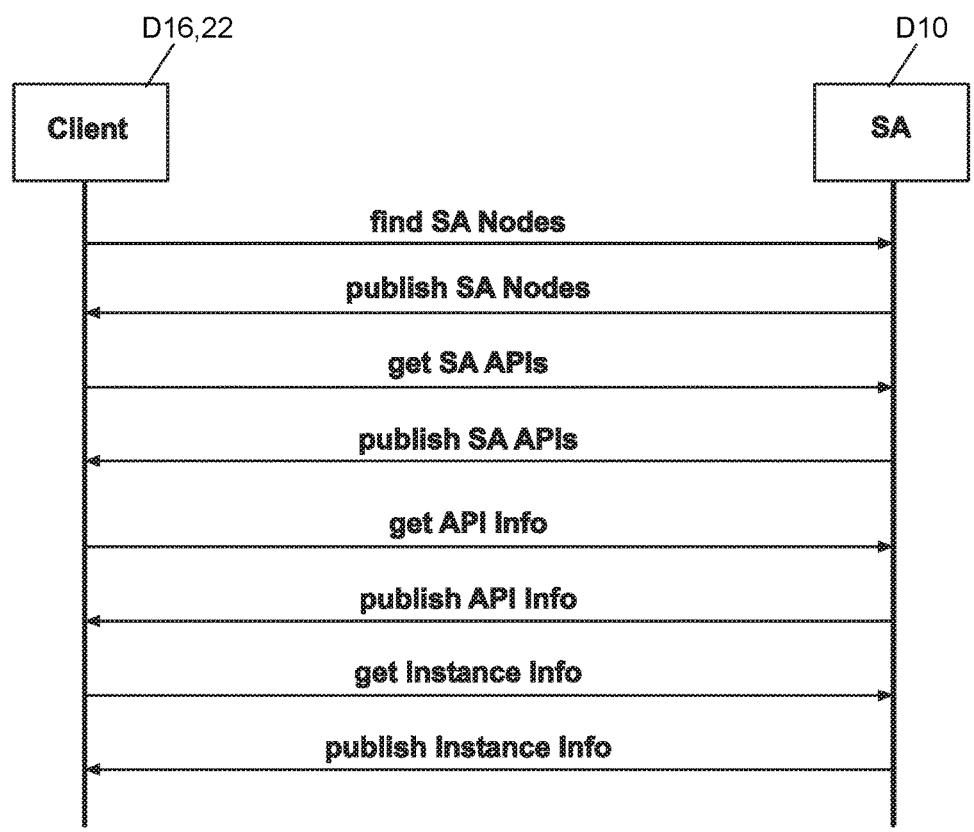
FIG. 84 is a schematic illustration similar to that shown in FIG. 83 illustrating a discovery technique contained in the software architecture of FIG. 79 according to this disclosure.

FIG. 84 illustrates a typical Discovery API sequence. Having no structures in memory representing the other software architecture D10 enabled components a client D16 transmits a command to locate clients/nodes D16 within the appliance D12, which are components D16 enabled with the software architecture. The command can be a "find Nodes" command. Enabled components or nodes D16 respond that they are, indeed, enabled, such as by issuing a broadcasted "publish Nodes" command. Then, the client D16 transmits a command to identify which APIs are located on each enabled node, such as by issuing a "find APIs" command. Each enabled node responds with a bounded message containing its API IDs, such as by replying with a "publish APIs" message. Then, the client D16 issues a command to identify information about each of the APIs found on each enabled node. Such as by issuing a "get API Info" command. Each enabled node responds with a bounded message (whose purpose and structure are described in FIG. 87) containing information about the API contained therein, such as by replying with a "publish API Info" message. This message can include type, version, and the number of occurrences or instances of a particular API Id. In cases where the number of instances of a particular API within a single component D16 exceeds one, meaning that there are multiple of the same APIs installed on a component D16 such as in the case of a multiple-cavity oven which might use multiple oven control APIs, the client D16 issues a command to get information on each instance of an API. This can be accomplished by issuing a "get Instance Info" command. The software architecture D10 responds with the requested information, such as by the "publish Instance Info" message. Multiples of the same instance are auto-numbered with a pseudo-API ID by the software architecture.

In addition when a component D16 enabled by the software architecture D10 and having resident the sub-component of the software architecture D10 discovery, which is API Id=D3, initializes it will automatically send out a message announcing itself (API Id=3, Op Code=2 publishSANode( )).

Also, if the user of the software architecture D10 so chooses, the discovery sequence of FIG. 84 may be altered by omitting messages D1 and D2 (op codes 1 & 2, respectively). The approach is valid in that the client may initiate discovery by issuing an Op code=3 message, getSAAPI (collection) that will result in responses from all components enabled by the software architecture D10 thus obviating the need for messages D1 and D2 in most cases.

It is also contemplated that an abbreviated messaging sequence could achieve the same results as the aforementioned discovery sequence. In an abbreviated discovery sequence, each node issues a message after power-up containing within one message the totality of information which was described in the aforementioned discovery sequence. Each node receiving this message would reply back with the same information about itself giving the node which just powered up the discoverable information from all the nodes that were already powered up.

This Discovery API protocol mechanism allows a client D16 to locate a logical entity at runtime without prior compile time programming. Moreover, this mechanism allows the client D16 to determine if expected components are resident or missing. From this knowledge, the client can configure itself and/or present the user with the appropriate inferred functionality.

The Low Level API (API ID=5) exposes via the network D14, capabilities allowing the client to control or actuate the output devices which are electrically connected to the containing component D16 and to provide read and/or write access to the numeric value which represents the current state and potentially the state history of the electrically connected input device. Typical examples of outputs are valves, relays, triacs, solenoids, LEDs, lamps, buzzers, and on the like. Typical examples of inputs are push buttons, switches, sensors (e.g., pressure, temperature, and over-temperature), and on the like. In the preferred embodiment, the Low Level API as well as the Memory Port API are available only in the development state of FIG. 81 of the software architecture D10 of the appliance D12. The development state can only be entered from the appliance D12 idle state of the exemplary appliance state diagram of FIG. 85. Also in the preferred embodiment, if any user interface actions are initiated via a keypad, LCD, or other user interface device of the appliance D12 during the development state, the appliance D12 can revert back to the idle state of FIG. 85 and set each output back to its un-actuated state. The messages for initiating the development state can be found in the message definition specification for the low level API (see API 5, Op Code 2). This network message is defined to allow the appliance D12 to enter the development state. In the development state, a special API is enabled and exposed to the network D14 which allows the client D16 to control the electronic outputs of the appliance D12 directly. In development state, production oriented business rules such as validation are by-passed, giving the client D16 complete control of the electronic sub-system.

The low level API can be used to implement non-standard operation of the appliance D12 in that the appliance can be operated in a manner other than in accordance with one of the predetermined operating cycles implemented by the appliance software operations layer, which typically resides on the component D16 for appliance control. In this way, the low level API can be thought of as enabling additional cycles of operation. Some examples of additional cycles of operation include: a demonstration cycle; a development cycle; an error detection cycle; a diagnostic cycle; a cycle that reduces the time of at least one timed step of one of the predetermined cycles of operation; a cycle that bypasses at least one operational step of one of the predetermined cycles of operation; a cycle that substitutes a timed step for a step that responds to an event of one of the predetermined cycles of operation; and a cycle that exposes the low level API to the network The Key Press API (API 6) allows the client D16 to press virtual keys. This provides an equal method by which to exercise and test the software without mechanical or human actuation of the physical key pad.

One note on a convention used in this application. The word "extends" refers to the ability of one API to build on the functionality of a baser-level API. The extends keyword means: When API x 'EXTENDS' API y, then API x=API x+API y. This notation simplifies the task of record keeping and API documentation. In other words, API x also includes those functions specified in API y. If API x and API y each specify a function with the same Op Code, the implementation of API x implementation can take precedence.

Exemplary application packets for the payload portion of the packet structure for the internal communications network of the household appliance follow. The application packets are grouped according to API.

Core API: API ID=1 (Type 3, Version 1). The following application packet represents a directed message from the software architecture D10 to a client for publishing acknowledgement (Publish Acknowledgement). This message is sent by the software architecture D10 to the sender of a previous message. It contains an enumerated value representing the results of the previous command processed by the software architecture D10. Generally, the receipt of the acknowledgment indicates that the sender can initiate the next message.

| API ID | Op Code | Byte 3 | Byte 4 | Byte 5 |
|---|---|---|---|---|
| 1 | 1: publish Acknowledgement | Reason code | API | OpCode |

Note that the API and op code of the previously received command (the one that is being acknowledged) is contained within byte 4 and 5 of the payload. This provides the receiver of the acknowledgment (the component D16 which sent the original command) certainty as to which previously transmitted command is being acknowledged. (The previously transmitted command having the unique identifier of API Id and Op Code.) It should be noted that in the drawings and descriptions, the ACK is generally assumed and is not continuously repeated or documented. Enumeration values for the reason code of the above application packet are shown in the table below.

| Enumeration Value for Reason Code | Reason Code Name | Programming Notes |
|---|---|---|
| 0 | READY* | The command was successfully executed and the SA is ready to accept another command. |
| 1 | BUSY* | The SA module is currently busy executing a command. Usually just an internal state. |
| 2 | REJECTED* | The command sent to the SA was rejected, because there was another command still in process. |
| 3 | ACK_EVENT | The command was not executed because the SA is currently waiting for an acknowledgement. |
| 4 | UNSUPPORTED | The command was unsupported for some reason and did not execute. (Ready for next command) |
| 5 | UNSUP_OP_CODE | The command was unsupported and did not execute due to an invalid op code. (Ready for next command) |
| 6 | UNSUP_UNAVAILABLE | The command was unsupported and did not execute because it is currently unavailable in this state. (Ready) |
| 7 | UNSUP_INVALID_PARAM | The command was unsupported and did not execute due to an invalid or out of bounds parameter. (Ready) |
| 8 | UNSUP_OUT_OF_MEMORY | The command was unsupported and did not execute because the dynamic heap is out of memory. (Ready) |
| 9 | UNSUP_DOOR_OPEN | The command was unsupported and did not execute because the appliance door was open. (Ready) |
| 10 | UNSUP_BOUND_CMD_INCOMPLETE | The bounded command was not fully received before a specified timeout, so it was not fully executed. (Ready) |
| 11 | UNSUP_CANNOT_PAUSE_NOW | Unable to pause due to state of appliance process. |
| 200-255 | Application Specific | Application Developers may use these return values in their applications. It is up to the Developer to document the Application Specific reason codes. |

*0-3 are reserved for use by the software architecture 10

The following application packet represents a broadcast message from the software architecture D10 to a client (D16 or D22) for publishing heartbeat (Publish Heartbeat). This message is periodically sent by the software architecture D10. This allows nodes, which have registered for events, to maintain confidence in the event sources. In other words, heartbeat insures connection integrity. Alternatively, the client (16 or D22) may determine that each or some event(s) sent by the software architecture D10 should receive an acknowledgement sent by the client back to the software architecture D10 before the software architecture D10 deems the transaction associated with the generation and transmission of the event to be complete. If a particular event has been created with the 'acknowledgment' classifier according to the message specification of API 2, Op Code=1, 2, 12, or 13, the software architecture D10 will define the end of the transaction associated with the generation and transmission of the event to be complete when an acknowledgment message is received according to the message specified by API Id1 and Op Code 1.

Publish Heartbeat will not be sent until after the software architecture D10 receives a command. This can be used to prevent a misoperation or "Traffic Storm" condition during power-up. Traffic Storm refers to a misoperation within the software of a client D16 or D22 where the software components D16B therein would not be able to accurately process the plurality of messages generated as a result of a power-up condition. Publish Heartbeat will be suspended after a Reset SA message, which is described below with respect to the Core DAQ API and Op Code 8, is received, but will resume after the next subsequent command. This is a feedback message.

| API ID | Op Code | Byte 3-Byte F |
|---|---|---|
| 1 | 2: heartbeat | |

The following application packet represents a directed message from a client to the software architecture D10 for setting heartbeat period (Set Heartbeat Period), which is setting a frequency at which the heartbeat message is sent by the software architecture D10. Exemplary frequencies range from 0 seconds (off) to D3600 seconds (1 hr).

| API ID | Op Code | Byte D3 | Byte D4 | Byte D5-Byte F |
|---|---|---|---|---|
| 1 | 3: setHeartbeatPeriod | Sec MSB | Sec LSB | |

The following application packet represents a broadcast message from the software architecture D10 to a client for publishing the heartbeat period (Publish Heartbeat Period). This message is a response to Set Heartbeat Period. It is necessary so that if a second client changes the heartbeat period, the first client will be notified. Clients who require non-changing heartbeat periods should use the DAQ API to set up an event with a constant broadcast operator, See DAQ API Id=2, Op Code 1, Byte 9=4, 5, or 6 (see change operator table).

| API ID | Op Code | Byte 3 | Byte 4 | Byte 5-Byte F |
|---|---|---|---|---|
| 1 | 16: newHeartbeatPeriod | Sec MSB | Sec LSB | |

The following application packet represents a directed message from a client to the software architecture D10 for reading memory, particularly the RAM (Read Memory). It is sent to the software architecture D10 and results in a "Publish Memory Data" response, which is shown below (Op Code 4) and contains values specified in Bytes 3-7 of the packet below.

| API ID | Op Code | Byte 3 | Byte 4 | Byte 5 | Byte 6 | Byte 7 | Byte 8-Byte F |
|---|---|---|---|---|---|---|---|
| 1 | 5: readMemory | Address Hi-byte | Address Mid-Byte | Address Low-Byte | Size MSB | Size LSB | |

The following application packet represents a directed message from a client to the software architecture D10 for reading EE memory (Read EE). It is sent to the software architecture D10 and results in a "Publish EE Data" response (Op Code=8), which is shown below and contains the values specified in the Read EE packet, Bytes 3-7 below.

| API ID | Op Code | Byte 3 | Byte 4 | Byte 5 | Byte 6 | Byte 7 | Byte 8-Byte F |
|---|---|---|---|---|---|---|---|
| 1 | 6: readEE | Address Hi-byte | Address Mid-Byte | Address Low-Byte | Size MSB | Size LSB | |

The following application packet represents a directed message from the software architecture D10 to a client for publishing memory data (Publish Memory Data) and is a response to Read Memory.

| API ID | Op Code | Byte 3 | Byte 4 | Byte 5 | Byte 6 | Byte n | Byte 8-Byte F |
|---|---|---|---|---|---|---|---|
| 1 | 4: publishMemoryData | data MSB | data | data | | data LSB | |

The following application packet represents a directed message from the software architecture D10 to a client for publishing EE memory data (Publish EE Data) and is a response to Read EE.

| API ID | Op Code | Byte 3 | Byte 4 | Byte 5 | Byte 6 | Byte n | Byte 8-Byte F |
|---|---|---|---|---|---|---|---|
| 1 | 8: publishEEData | data MSB | data | data | | data LSB | |

The following application packet represents a directed message from a client to the software architecture D10 for sending events (Send Events). The message instructs the software architecture D10 to send specified events regardless of event trigger criteria.

Note: Event Id is used synonymously with Op Code. Event Id is a more descriptive term for Op Code when describing an Event which is part of an API.

Note: the notation used below is repeated throughout the document and is described here only. If Byte 3 contains the reserved value 0xFF, then the software architecture D10 interprets Byte 3 to mean all API Ids. Otherwise, Byte 3 specifies a particular API Id. Likewise, If Byte 4 contains 0xFF, the software architecture D10 interprets Byte 4 to mean all Events for the API or APIs specified in Byte 3. Otherwise, Byte 4 contains a single Event Id. Bytes 5 through Byte n contain a single Event Id.

| API ID | Op Code | Byte 3 | Byte 4 | Byte 5 | Byte 6 | Byte 7 | Byte 8-Byte F |
|---|---|---|---|---|---|---|---|
| 1 | 7: send Event(s) | API id (0xFF = all) | EventId# (0xFF = all) | EventId# | EventId# | EventId# | |

The following application packet represents a broadcast message from the software architecture D10 to a client for publishing events (Publish Event) and is a response to the above Send Events message. Alternatively, if the DAQ Engine is being used, this message is sent when the event trigger criteria is satisfied. Below, API Id and Op Code are notated as 'client defined'. This refers to the assignment made of API ID and Op Code by the createEvent commands (sent by the Client) of DAQ API (API Id=2) specifically in Bytes 7 and 8 of Op Code 1 & 2 and Bytes 3 and 4 of Op Code 12 & 13

Core DAQ API: API ID=2 (Type 3, Version 1). The following application packet represents a directed message from a client to the software architecture D10 for creating a numeric event (Create Numeric Event). The message, identified by API Id of 2 and Op Code of 1 or 2 allows the client to create and configure feedback variables [NVOEvent structures of FIG. 112]. Byte 7 and 8 are used to assign the identifier (API Id and Op Code) which will be used to populate fields in the publish event message (API Id 1) when the event conditions are such that an event message is generated. Generated event messages are of the form found in the preceding description of the Core API where the message packet is labeled as 'Publish Event'. The identifiers API Id and Op Code located in bytes 1 and 2 respectively of the Publish Event message. The values found in these bytes can be assigned through the messages defined for the DAQ API, Op Codes 1 and 2 below. Bytes 3-5 contain the address in the memory of the software operating environment which will be evaluated for the event condition represented by Byte 9 which is an enumeration of evaluation rules and Bytes A and B which are arguments to the evaluation rules. Byte 6 specifies the number of contiguous bytes which should be evaluated as a single numeric value with respect to Bytes 9, A, and B

| API ID | Op Code | Byte 3 | Byte 4 | Byte 5 | Byte 6 | Byte 7 | Byte 8-Byte F |
|---|---|---|---|---|---|---|---|
| client defined | client defined | data MSB | data | data | | data LSB | |

| API ID | Op Code | Byte 3 | Byte 4 | Byte 5 | Byte 6 | Byte 7 | Byte 8 | Byte 9 | Byte A | Byte B | Byte C |
|---|---|---|---|---|---|---|---|---|---|---|---|
| 2 | 1: createNumericEvent | address Hi-Byte | address Mid-Byte | address Low-Byte | size 1, 2, 4 | API Id | Event Id | Change Operator | Change Val MSB | Change Val LSB | ACK'd Event 1 = ACK'd 0 = unACK'd |

Event operators associated with Byte 9 of the above application packet are discussed in further detail following this section of exemplary application packets and are shown in the table that denotes event operators available when creating a numeric-based event. Additionally, byte C corresponds further classification resulting in either acknowledged or unacknowledged events (discussed later). See FIG. 109 for an example of the operation of an acknowledged event.

The following application packet represents a directed message from a client to the software architecture D10 for creating a byte event (Create Byte Event). The messages definitions, identified by API Id=2 and Op Code=1 or 2 allows the client to create and configure feedback variables (events). The message specification for Op Code 2 is similar in intent, but has different implementation details that provide usefulness for certain application use cases. API Id 2 with Op Code 2 differs in functionality from API 1 Op Code 1 in that depending on the value of Byte A, either only 1 byte within the range specified by Bytes 3-5 and Byte 6 or all the bytes will be evaluated based on Byte 9's change operator and Byte B's change value. Whereas in the case of Op Code 1, the specified bytes were evaluated as a single numeric. In the case of Op Code 2, each byte or a single byte, according to the value specified in Byte A, will be evaluated independently according to the change operator specified in Byte 9 and the change value specified in Byte B.

| API ID | Op Code | Byte 3 | Byte 4 | Byte 5 | Byte 6 | Byte 7 | Byte 8 | Byte 9 | Byte A | Byte B | Byte C |
|---|---|---|---|---|---|---|---|---|---|---|---|
| 2 | 2: createByteEvent | address Hi-Byte | address Mid-Byte | address Low-Byte | size | API Id | Event Id | Change Operator | byte index 0-255 0xFF = all | Change Val | ACK'd Event 1 = ACK'd 0 = unACK'd |

Event operators associated with Byte 8 of the above application packet are discussed in further detail following this section of exemplary application packets and are shown in the table that denotes event operators available when creating a byte-based event. Additionally, byte C corresponds to further classification resulting in either acknowledged or unacknowledged events (discussed later). See FIG. 109 for an example of the operation of an acknowledged event.

The following application packet represents a directed message from a client to the software architecture D10 for clearing event(s) (Clear Event(s)). The Clearing Events message allows the client to clear the event definitions previously created with either of the create event Op Codes (1 or 2, as shown above). The client can send multiple Clear Event commands to the software architecture D10 using the MMP flag if synchronization is needed across multiple commands.

| API ID | Op Code | Byte 3 | Byte 4 | Byte 5 | Byte 6 | Byte n | Byte 8-Byte F |
|---|---|---|---|---|---|---|---|
| 2 | 3: clearEvent | API Id (0xFF = all) | EventId# (0xFF = all) | EventId # | EventId # | EventId # | |

The following application packet represents a broadcast message from the software architecture D10 to a client for publishing events cleared (Publish Events Cleared) and is a response to Clear Events. The message notifies the clients of the software architecture D10 when Op Codes or APIs are removed from the existing the software architecture node interface.

| API ID | Op Code | Byte 3 | Byte 4 | Byte 5 | Byte 6 | Byte n | Byte 8-Byte F |
|---|---|---|---|---|---|---|---|
| 2 | 4: publishEventsCleared | API Id (0xFF = all) | EventId# (0xFF = all) | EventId# | EventId# | EventId# | |

The following application packet represents a directed message from a client to the software architecture D10 for resetting the software architecture D10 (Reset SA). The Reset SA command instructs the software architecture D10 to re-initialize as if it had just powered up.

| API ID | Op Code |
|---|---|
| 2 | 8: resetSA |

The following application packet represents a broadcast message from the software architecture D10 to notify that the software architecture D10 has been reset (Publish SA Reset) and is a response to Reset SA.

| API ID | Op Code |
|---|---|
| 2 | 9: publishSAReset |

The following application packet represents a directed message from a client to the software architecture D10 for turning on external notification for a specified event (Set External On). The command instructs the software architecture to externally notify clients of the event. See FIG. 108 for an example of the usage of this command.

| API ID | Op Code | Byte 3 | Byte 4 | Byte 5 | Byte 6 | Byte n |
|---|---|---|---|---|---|---|
| 2 | 10: setExternalEventOn | API Id | OpCode | OpCode | OpCode | OpCode |

The following application packet represents a broadcast message from the software architecture D10 to notify that external notification of the specified event has been turned on (Publish External On) and is a response to Set External On. See FIG. 108 for an example of the result of this command.

| API ID | Op Code | Byte 3 | Byte 4 | Byte 5 | Byte 6 | Byte n |
|---|---|---|---|---|---|---|
| 2 | 10: publishExternalOn | API Id | OpCode | OpCode | OpCode | OpCode |

The following application packet represents a directed message from a client to the software architecture D10 for turning off external notification for a specified event (Set External Off). The command instructs the software architecture to not externally notify clients of the event.

| API ID | Op Code | Byte 3 | Byte 4 | Byte 5 | Byte 6 | Byte n |
|---|---|---|---|---|---|---|
| 2 | 11: setExternalEventOff | API Id | OpCode | OpCode | OpCode | OpCode |

The following application packet represents a broadcast message from the software architecture D10 to notify that external notification of the specified event has been turned off (Publish External Off) and is a response to Set External Off.

| API ID | Op Code | Byte 3 | Byte 4 | Byte 5 | Byte 6 | Byte n |
|---|---|---|---|---|---|---|
| 2 | 10: publishExternalOff | API Id | OpCode | OpCode | OpCode | OpCode |

Core DAQ API: API ID=2 (Type 4, Version 1—Extends Type 3, Version 1). The following application packet represents a directed message from a client to the software architecture D10 for getting event data (Get Event Data). Get Event Data instructs the software architecture D10 to send definition(s) of specified events. The definition is a mirror image of the data sent in the Create Event Op Code messages, which are shown above as Op Codes D1 or D2 for the Core DAQ API. The software architecture D10 will respond with a collection of Publish Event Data messages, which are shown below.

| API ID | Op Code | Byte 3 | Byte 4 | Byte 5 | Byte 6 | Byte n | Byte 8-Byte F |
|---|---|---|---|---|---|---|---|
| 2 | 5: getEventData | API Id (0xFF = all) | EventId# 0xFF = all) | EventId# | EventId# | EventId# | |

The following application packet represents a directed message from the software architecture D10 to a client for publishing numeric event data (Publish Numeric Event Data), and is a response to Get Event Data. Each event definition is reported in a separate internal network message and is governed by snapshot rules associated with the MMP flag of D28 of FIG. 82. The event definition contains the information specified about the event in Create Numeric Event.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 2 | 6: publishNumericEventData | address MSB | address LSB | size = 1, 2, 4 | API Id | Event Id | Change Operator | Change Val MSB | Change Val LSB | |

Event operators associated with Byte 8 of the above application packet are discussed in further detail following this section of exemplary application packets and are shown in the table that denotes event operators available when creating a numeric-based event.

The following application packet represents a directed message from the software architecture D10 to a client for publishing byte event data (Publish Byte Event Data) and is response to Get Event Data. Each event definition is reported in a separate internal network message and will be governed by the snapshot rules associate with the MMP flag of D28 of FIG. 82. The event definition contains the information specified about the event in Creation Byte Event.

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 2 | 7: publishByteEventData | address MSB | address LSB | size | API Id | Event Id | Change Operator | byte index 0-255 | Change Val | |

Event operators associated with Byte 8 of the above application packet are discussed in further detail following this section of exemplary application packets and are shown in the table that denotes event operators available when creating a byte-based event.

Figure 106:
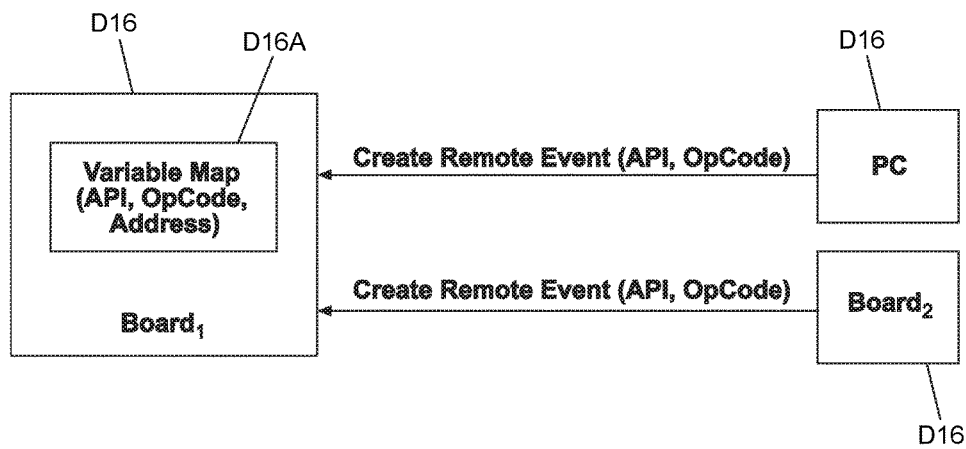
FIG. 106 is a schematic illustration of the location of variable map information on the controller of the component, which is collected from the other components on the network.
Figure 107:
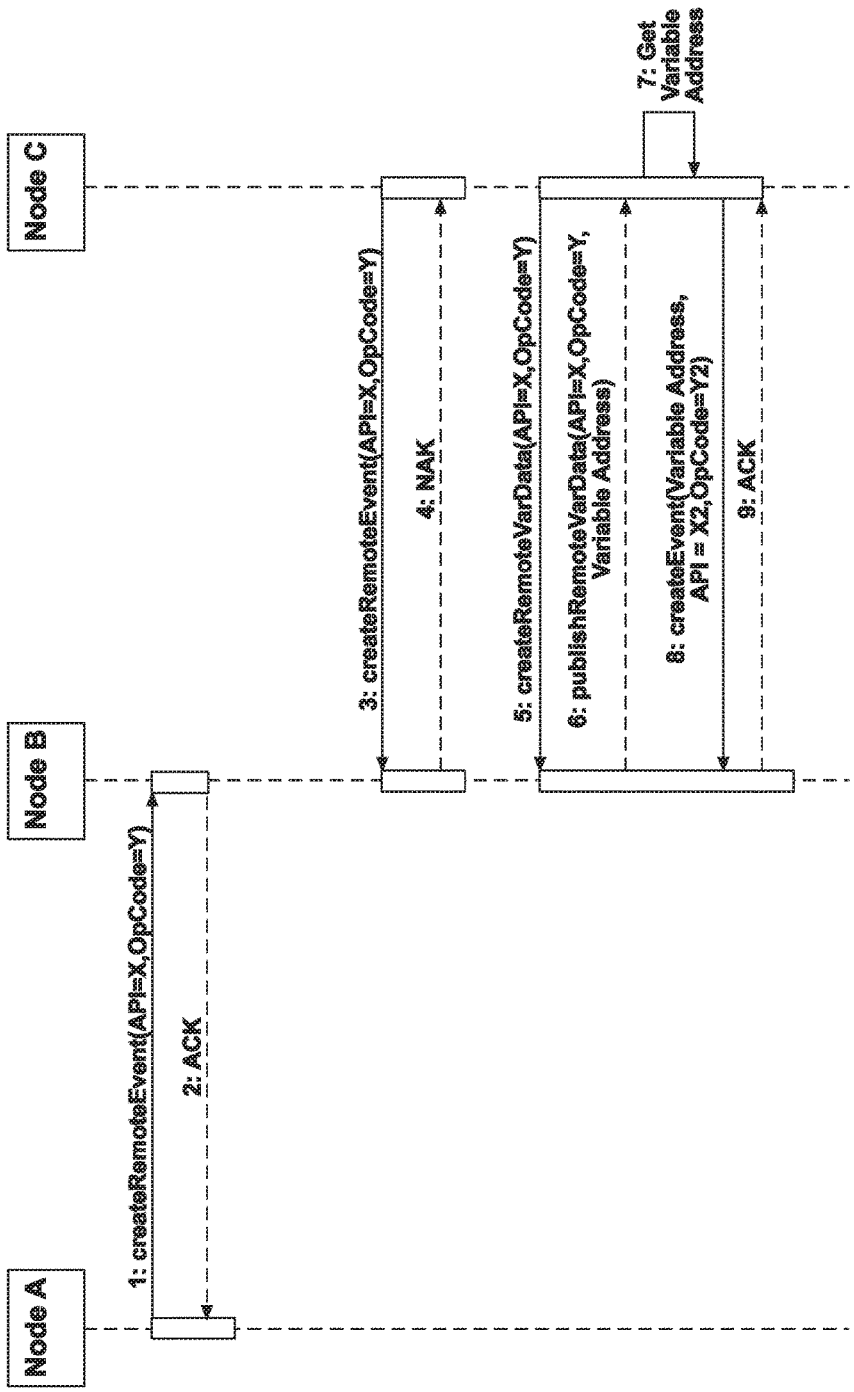
FIG. 107 is a UML Sequence Diagram showing a messaging scenario where a duplicate event request is assigned a variable address to permit both requests to reside in the network.

The following application packet represents a directed message from a client to the software architecture D10 for creating a remote numeric event (Create Remote Numeric Event). The message allows the client or another module in the embedded system to configure feedback variables associated with an existing API and Op Code using an embedded variable map. Although the number can be 4 bytes, the change value is limited to 2 bytes. FIG. 106 illustrates the embedded variable map. FIG. 107 defines the interaction between 3 network nodes where Node A successfully creates a Remote Numeric Event on Node B. And where Node C attempts the same, but through the interaction with Node B, is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Numeric Event by sending (see message 8 in FIG. 107) a new message to Node B with the original memory address and the alternative Identifier.

| API ID | Op Code | Byte 3 | Byte 4 | Byte 5 | Byte 6 | Byte 7 | Byte 8 |
|---|---|---|---|---|---|---|---|
| 2 | 12: createNumRemoteEvent | API Id | OpCode | Change Operator | Change Val MSB | Change Val LSB | ACK'd Event 1 = ACK'd 0 = unACK'd |

FIG. 106 illustrates the embedded variable map. FIG. 107 defines the interaction between 3 network nodes where Node A successfully creates a Remote Numeric Event on Node B. And where Node C attempts the same, but through the interaction with Node B, is able to accomplish the intent of the request without duplication of the Identifier (API Id and The following application packet represents a directed message from the software architecture D10 to a client for publishing remote variable data (Publish Remote Variable Data), and is a response to Get Remote Variable Data. It reports data from the embedded variable map, such as the API, op code, size, and address.

| API ID | Op Code | Byte 3 | Byte 4 | Byte 5 | Byte 6 | Byte 7 | Byte 8 |
|---|---|---|---|---|---|---|---|
| 2 | 14: publishRemoteVarData | Address Hi-Byte | Address Mid-Byte | Address Low-Byte | Size | API Id | OpCode |

OpCode). This is accomplished because Node C is able to query Node B for the address in memory of the initial Identifier so that an alternative (non-duplicated) Identifier may be selected. The alternative identifier is then used to create the Remote Numeric Event by sending (see message 8 in FIG. 107) a new message to Node B with the original memory address and the alternative Identifier.

The following application packet represents a directed message from a client to the software architecture D10 for creating a remote byte event (Create Remote Byte Event). The message allows the client or another module in the embedded system to configure feedback variables associated with an existing API and Op Code using an embedded variable map.

Core Discovery API: API ID=3 (Type 3, Version 1).

Referring to FIG. 84, the following application packet represents a broadcast message from a client to find nodes of the software architecture D10 (Find Node(s)). This broadcast message enables a node to locate other nodes of the software architecture D10.

| API ID | Op Code | Byte 3-Byte F |
|---|---|---|
| 3 | 1: findNodes | |

The following application packet represents a broadcast message (Publish Node) from the software architecture D10 allowing it to publish its presence to other components

| API ID | Op Code | Byte 3 | Byte 4 | Byte 5 | Byte 6 | Byte 7 | Byte 8 |
|---|---|---|---|---|---|---|---|
| 2 | 13: createByteRemoteEvent | API Id | OpCode | Change Operator | Byte Index 0-255 | Change Val | ACK'd Event 1 = ACK'd 0 = unACK'd |

FIG. 106 illustrates the embedded variable map. FIG. 107 defines the interaction between 3 network nodes where Node A successfully creates a Remote Byte Event on Node B. And where Node C attempts the same, but through the interaction with Node B is able to accomplish the intent of the request without duplication of the Identifier (API Id and OpCode). This is accomplished because Node C is able to query Node B for the address in memory of the initial Identifier so that an alternative (non-duplicated) Identifier may be selected. The alternative identifier is then used to create the Remote Byte Event by sending (see message 8 in FIG. 107) a new message to Node B with the original memory address and the alternative Identifier.

The following application packet represents a directed message from a client to the software architecture D10 for getting remote variable data from an embedded variable map (Get Remote Variable Data). The message instructs the software architecture to publish information concerning the data that exists in the embedded variable map. See FIG. 107 for an example of use of this command.

participating on D14. This message is sent when a node of the software architecture D10 powers up or is re-set or is sent as a response to Find Nodes. Additionally, this message can be sent when the node of the software architecture D10 through a secondary Discovery process adds (to itself) an API or adds Op Codes to an existing API. Publish Node is not sent when a client dynamically adds an API or Op Code to the software architecture D10 (via DAQ Op 1, 2, 12, 13). The payload of the feedback message contains a firewall password, which is to be used by the firewall security feature of the software architecture D10 (see FIG. 111 for an example of this feature). This allows the sender of the message to become a 'trusted' node on network D14.

| API ID | Op Code | Byte 3 | Byte 4 |
|---|---|---|---|
| 3 | 2: publishSANode | Firewall Password MSB | Firewall Password LSB |

The following application packet represents a message which can be either directed or broadcasts from a client to the software architecture D10 for getting API(s) (Get APIs) of the software architecture D10. This directed message allows the client to discover the APIs that are supported by a specific node of the software architecture D10. API Id must be unique within an appliance.

| API ID | Op Code | Byte 3 | Byte 4 | Byte 5 | Byte n |
|---|---|---|---|---|---|
| 2 | 14: getRemoteVarData | API Id | OpCode | OpCode | OpCode |

| API ID | Op Code | Byte 3-Byte F |
|---|---|---|
| 3 | 3: getAPIs | |

The following application packet represents a broadcast message from the software architecture D10 to a client for publishing API(s) (Publish API(s)) of the software architecture D10. This message is a response to Get API(s) and is a directed message that allows the client to discover the APIs that are supported by the sending node of the software architecture D10.

| API ID | Op Code | Byte 3 | Byte 4 | Byte 5 | Byte n | Byte 7-Byte F |
|---|---|---|---|---|---|---|
| 3 | 4: publishAPIs | API # | API # | API # | API n | |

The following application packet represents a message which can be directed or broadcast from a client to the software architecture D10 for getting API information (Get API Info). This directed message allows the client to discover Version and Type information about the specified API(s).

| API ID | Op Code | Byte 3 | Byte 4 | Byte 5 | Byte n | Byte 7-Byte F |
|---|---|---|---|---|---|---|
| 3 | 5: getAPIInfo | API # (0xFF = all) | API # | API # | API n | |

The following application packet represents a directed message from the software architecture D10 to a client for publishing API information (Publish API Info) and is a response to Get API Info. This directed message allows the client to discover Version and Type information about the specified API(s). There is one message per API, and the messages are bounded using the MMP flag of FIG. 82.

Using the alternate approach, Byte 3 (API Id) is a runtime object handle and Bytes 3-7 numerically concatenated form the class id.

The Number Instances associated with Byte 8 signifies to the client than an API has multiple instances. The client can follow up with Get Instance Info, which is described below, to find the Instance Ids that belong to the API. The Descr Char 1-Descr Char n is an optional feature that can be helpful to developers. Descriptive text can be used to annotate API Id. For example, 'upper' or 'lower' could be used for the two cavities of a double oven.

The following application packet represents a directed message from a client to the software architecture D10 for getting instance information (Get Instance Info). This directed message allows the client to discover the Instance Ids for the APIs that report more than one Instance of an API. The first instance of any API uses API Id as its Instance Id. If there are multiple Instances of an API Id on the same addressable node, subsequent instances are assigned an Instance Id dynamically. These dynamically assigned Ids can be discovered by sending the Get Instance Info message. The value of the Instance Id should be used in place of API Id when there are multiple instances of an API on a physical network node.

| API ID | Op Code | Byte 3 | Byte 4 | Byte 5 | Byte n | Byte 7-Byte F |
|---|---|---|---|---|---|---|
| 3 | 7: getInstanceInfo | API # (0xFF = all) | API # | API # | API n | |

The following application packet represents a broadcast message from the software architecture D10 to a client for publishing instance information (Publish Instance Info) and is a response to Get Instance Info. This directed message allows the client to discover the Instance Ids. The first instance of any API uses API Id as its Instance Id. If there are multiple Instances of an API Id on the same addressable node, subsequent instances will be assigned an Instance Id

| API ID | Op Code | Byte 3 | Byte 4 | Byte 5 | Byte 6 | Byte 7 | Byte 8 | Byte 9 | Byte A | Byte B-Byte F |
|---|---|---|---|---|---|---|---|---|---|---|
| 3 | 6: publishAPIInfo | API Id | Type MSB | Type LSB | Version MSB | Version LSB | Number Instances | Descr Char 1 | Descr Char 2 | Descr Char n |

Bytes 4 and 5 represent an API's Type which can be used as an indication of a specific sub-classification of an API. The value of Type can be used to determine compatibility concerns between sub-components (APIs). Byte 6 and 7 represent an API (of a particular Type)'s Version. This value can be used to indicate bug fixes or changes to functionality. As with Type, it enables a runtime compatibility check, which can inform the client if the versions are compatible. Alternatively, Bytes 4-7 can be used in conjunction with Byte 3 to form a 5 byte class identifier where class refers to dynamically. These dynamically assigned Ids are communicated via the Publish API Info message described above. For purposes of uniformity, Publish API Info is sent for the first instance (i.e., where API Id=Instance Id). There will be one message for Instance of API, which is bounded using the MMP flag. The value of Instance Id should be used in place of API Id when there are multiple instances of an API on a physical network node.

| API ID | Op Code | Byte 3 | Byte 4 | Byte 5 | Byte 6 | Byte 7 | Byte 8 | Byte 9 | Byte A | Byte n |
|---|---|---|---|---|---|---|---|---|---|---|
| 3 | 8: publishInstanceInfo | API Id | Instance Id | Type[1] MSB | Type LSB | Version[2] MSB | Version LSB | Descr[3] Char 1 | Descr Char 2 | Descr Char n |

[1] Allows for APIs to be sub-classed or specialized. For example, API Id may refer to a washing machine API and Type may specify a particular washer model.
[2] Enables version control (i.e. bug fixes or changes to functionality). Enables a runtime compatibility check, which can inform client if the versions are compatible.
[3] Allows client to associate Instance Id with its physical function. For example, 'upper' or 'lower' could be used for the two cavities of a double oven.

a class definition within a class library (whom one of typical competence with the state of the art would understand).

Preferably, the Descr Char 1-Descr Char n allows the client to associate an Instance Id with its physical function.

For example, 'upper' or 'lower' could be used for the two cavities of a double oven. However, the user of the software architecture 10 may use Descr Char 1-Descr Char n for any useful purpose.

Core Debug API: API ID=4 (Type 1, Version 1). The following application packet represents a broadcast message from the software architecture D10 to a client for publishing saturation (Publish Saturation). Saturation happens when the supporting layers of the internal network D14 are unable to deliver the data that the software architecture D10 has put into the outbound queue of WIDE D14A. The software architecture D10 has no queue; if the WIDE D14A cannot service the outbound data, then the software architecture D10 sends out Publish Saturation.

| API ID | Op Code | Byte 3-Byte F |
|---|---|---|
| 4 | 1: publishSaturation | |

The following application packet represents a directed message from a client to the software architecture D10 for setting a register for saturation (Register for Saturation). The client sends this message to a software architecture node, which enables the Saturation message. Only the node that enables saturation can disable saturation.

| API ID | Op Code | Byte 3 | Byte 4-Byte F |
|---|---|---|---|
| 4 | 2: Saturation On or Off | 1 = on<br>2 = off | |

Low Level API: API ID=5 (Type 1, Version 1). The following application packet represents a broadcast message from the software architecture D10 for publishing state (Publish State). This message sent as a result of a changed internal state of the machine, resulting from normal cycle progressions, user interactions, Op Code 2 below, or other messages received via network D14.

| API ID | Op Code | Byte 3 | Byte 4-Byte F |
|---|---|---|---|
| 5 | 1: publishState | state enum | |

Exemplary machine state enumeration values are presented in the following table. According to one embodiment of this disclosure, the running state is included. However, in some cases, the running state is somewhat ambiguous and additional phase variables must be exposed so that proper client side business logic can be written. In an alternative embodiment, the running state is eliminated in favor of a more granular and definitive state machine where each phase of each state is documented properly. In this embodiment, sufficient address space exists in the byte for the additional enumerations.

| Machine State Enumeration | |
|---|---|
| idle | 1 |
| running | 2 |
| programming | 3 |
| fault | 4 |
| development | 5 |
| end of cycle | 6 |
| pause | 7 |
| reserved | 8 |
| reserved | 9 |
| reserved | 10 |
| appliance specific | 11-255 |

The following application packet represents a directed message from a client to the software architecture D10 for toggling the household appliance D12 software operating environment D16 governing state of FIG. 85 between the development state and the idle state. Note that the development state not shown on FIG. 85, but one with ordinary skill in the art can contemplate a development state which can only be entered from an idle state and when an exited state goes back to an idle state.

| API ID | Op Code | Byte 3 | Byte 4-Byte F |
|---|---|---|---|
| 5 | 2: setDevelopmentState | 1 = on<br>2 = off | |

Core Key Press API: API ID=6 (Type 1, Version 1). The following application packet represents a directed message from a client to the software architecture D10 for pressing a key (Key Press). This directed message allows the client to send virtual key presses. Key indexes are not discoverable due to coding techniques used in the embedded processor; therefore, key indexes may be extracted from the source code files manually or through other automated mechanisms.

| API ID | Op Code | Byte 3 | Byte 4-Byte F |
|---|---|---|---|
| 6 | 1: pressKey | key index | |

The following application packet represents a broadcast message from the software architecture D10 to a client for publishing key press (Publish Key Press).

| API ID | Op Code | Byte 3 | Byte 4-Byte F |
|---|---|---|---|
| 6 | 2: publishKeyPress | key index | |

Exemplary key press index enumeration values are presented in the following table.

| Key Press Index Enumeration | |
|---|---|
| start | 1 |
| cancel | 2 |
| pause | 3 |
| reserved | 4-25 |
| appliance specific | 26-255 |

Memory/Port API: API ID=7 (Type 3, Version 1). The following application packet represents a directed message from a client to the software architecture D10 for writing memory (Write Memory). The Memory/Port port API is enabled via the Development State of FIG. 81 and the associated interaction is similar to the previously described association between Development State of FIG. 81 and the Low Level API (API ID=7).

This directed message allows the client to write to a specified RAM location. The write to the specified RAM location is limited to a single packet. In the current embodiment, this would be 13 bytes shown in 28A of 28. MMP (of 28)=1 is not valid for this message.

| API ID | Op Code | Byte 3 | Byte 4 | Byte 5 | Byte 6 | Byte 7 | Byte n |
|---|---|---|---|---|---|---|---|
| 7 | 1: writeMemory | Address Hi-Byte | Address Mid-Byte | Address Low-Byte | data byte | data byte | data byte |

The following application packet represents a directed message from a client to the software architecture D10 for writing EE memory (Write EE). The write to a specified EE location is limited to a single packet. In the current embodiment, this would be 13 bytes shown in 28A of 28. MMP (of 28)=1 is not valid for this message.

The Memory Port

| API ID | Op Code | Byte 3 | Byte 4 | Byte 5 | Byte 6 | Byte 7 | Byte n |
|---|---|---|---|---|---|---|---|
| 7 | 2: writeEE | Address Hi-Byte | Address Mid-Byte | Address Low-Byte | data byte | data byte | data byte |

Poll Variable API: API ID=10 (Type 1, Version 1). Referring to FIG. 83, the following application packet represents a directed message from a client to the software architecture D10 for reading poll variables (Read Poll Variable(s)). This message instructs the software architecture D10 to send a Publish Poll Variable message, which is shown below, for poll-only variables. Poll variables can be hard-coded by a developer for a specific application and can be used if RAM/ROM resources do not allow the use of the DAQ API.

| API ID | Op Code | Byte 3 | Byte 4 | Byte 5 | Byte 6-Byte F |
|---|---|---|---|---|---|
| 10 | 1: readPollVariable(s) | Event Id 1 (0xFF = all) | Event Id 2 | Event Id n | |

The following application packet represents a directed message from the software architecture D10 to a client for publishing poll variables (Publish Poll Variable) and is a response to Read Poll Variable(s). There is one message per poll variable index as specified in the initiating Read Poll Variable message.

| API ID | Op Code | Byte 3 | Byte 4 | Byte 5 | Byte 6 | Byte 7 | Byte n | Byte 9-Byte F |
|---|---|---|---|---|---|---|---|---|
| 10 | Event ID n: (publishPollVariable) | data MSB | data | data | data | ... | data LSB | |

A note on the event operators discussed in the DAQ API section above. Byte 9 of the Create Event Numeric and Byte message (DAQ API opcodes 1 & 2) and Byte 5 of CreateNumRemoteEvent and CreateByteRemoteEvent (DAQ API op codes 12 & 13) are the event change operator shown in the NVOEventStructure of FIG. 113. Operators are instructions which describe to the software architecture D10 the mathematical condition at which the software architecture D10 should generate an event message. The table below describes examples of event operators. The arguments for event operators are dependent on the type of event being created (numeric-based or byte-based which are op codes 1 and 2, respectively).

Event operators are part of the DAQ API which has two variations: basic (Type 1) and an extended (Type 2). Note the fifth column in the table which denotes the availability of each Event Operator for the plurality of revisions (4) of the DAQ API. Note that Types 1 & 2 are deprecated and the preferred embodiments are the Basic Type 3 or the Extended Type 4 which is inclusive of Type 3 functionality.

The following table denotes the event operators available when creating a numeric-based event (API ID 2, Op Code 1 and 12):

| Name | Operator Id (Byte 8) | Arg 1 (Byte 9) | Arg 2 (Byte A) | DAQ API Type Availability |
|---|---|---|---|---|
| On Change | 0 | — | — | 1, 2, 3, 4 |
| Deadband | 1 | Deadband Val (MSB) | Deadband Val (LSB) | 2, 3, 4 |
| Check Value == | 2 | Compare Val (MSB) | Compare Val (LSB) | 2, 3, 4 |
| Boundary <= \| => | 3 | Compare Val (MSB) | Compare Val (LSB) | 2, 3, 4 |
| 25 msec increments | 4 | — | time = val * 25 ms | 1, 2, 3, 4 |
| Seconds | 5 | — | time = val (sec) | 1, 2, 3, 4 |
| Minutes | 6 | — | time = val (min) | 1, 2, 3, 4 |
| Reserved | 7 | — | — | — |
| BIND | 8 | API Id: DAQ = 2 | Event Id | Unavailable at this time. |

The following table denotes the event operators available when creating a byte-based event (API ID 2, Op Code 2 and 13):

| Name | Operator Id (Byte 8) | Arg 1 (Byte 9) | Arg 2 (Byte A) | DAQ API Type Availability |
|---|---|---|---|---|
| On Change | 0 | Offset (1 – size) | — | 1, 2, 3, 4 |
| Deadband | 1 | Offset (1 – size) | Deadband Val | 2, 3, 4 |
| Check Value == | 2 | Offset (1 – size) | Compare Val | 2, 3, 4 |
| Boundary < or > | 3 | Offset (1 – size) | Compare Val | 2, 3, 4 |
| 25 msec increments | 4 | — | time = val * 25 ms | 1, 2, 3, 4 |
| Seconds | 5 | — | time = val (sec) | 1, 2, 3, 4 |
| Minutes | 6 | — | time = val (min) | 1, 2, 3, 4 |

-continued

-continued

| Name | Operator Id (Byte 8) | Arg 1 (Byte 9) | Arg 2 (Byte A) | DAQ API Type Availability |
|---|---|---|---|---|
| Bit Mask | 7 | offset | mask | 1, 2, 3, 4 |
| BIND | 8 | API Id: DAQ = 2 | Event Id | Unavailable at this time. |

The BIND operator allows the client D16 to create multiple memory events from a single event trigger. In other words, once an Event ID has been assigned, subsequent events can be created which will automatically be sent when the original master event is triggered.

When a byte based event (op code=3) is set up with the On Change operator, a value of 255 in byte 9 will instruct the software architecture D10 to do a change detect for all bytes in the range specified by the address and size arguments.

The Bit Mask operator allows the ability to watch for bit transitions within a byte. The mask value should be set such that bit=1 is a 'care about' and bit=0 is a 'don't care'. When set to 'don't care' a value transition at that bit location will not result in an event generated.

The software architecture D10 does not provide an explicit solution for time synchronization, but does provide an enabling mechanism. The capability of the client D16 to create an event that is periodically broadcast allows the client D16 to maintain a time of day clock which is synchronized with the appliance D12. Since the software architecture D10 may not explicitly expose a time of day clock API, the client D16 can have the address in memory where time of day is stored. It is to be understood that an external client D22 can have all or at least some of the same messaging, discovery, broadcasting, and other capabilities of the client D16.

The software architecture D10 core has several design considerations which can be considered and contemplated to create alternative embodiments of this disclosure described herein.

The following items can be considered when determining alternative embodiments of the core implementation of the software architecture D10:
Message Architecture
Payload Structure or Message Size
Multi-Payload Message Integrity Checking
State Aware Messaging
API Versioning—Discovery
Connection Integrity
Traffic (flow) Control and Acknowledged Messages
Inbound Invalid
Inbound Valid
Outbound
Power-up Condition
State Integrity
Key Presses vs. Logical API
Multi-Node Network
Multiple Nodes
Multiple Clients
Multiple API implementations on same network
Multiple API implementations on the same network node
API(s) using same op codes—Namespace
SAP assignment
SAP discovery
Message Architecture
Message architecture is a primary design element whose solution has many dependent design consequences. The internal communication network D14 packet structure D28 provides new possibilities for event driven message architecture as opposed to previous networks. An element to consider is whether nodes will poll one another if they will register for notification messages.

Polling is a practice of nodes, which can be clients or components D16, periodically sending messages to the owners of data requesting updated values (e.g. continually request data every D100 $ms$). Polling is generally simpler to implement and more commonly used, and can maintain connection integrity verified with each request. However, when polling, the client must continuously ask for information. Network Bandwidth is used up with data that is not changing (bandwidth is the amount of data that can be passed along a communications channel in a given period of time and there are several factors that affect bandwidth such as: number of nodes on a network, the transmission frequency [baud rate], and the protocol overhead [CRCs, acknowledgements, source/destination IDs, etc.], the transport protocol hardware, and cabling govern the limits of bandwidth, however, the Application protocol has the responsibility to make the most efficient use of the available bandwidth). Polling architectures do not scale: as nodes increase the number of messages increases exponentially. Assuming there is information on each node that every other node needs: messages=$n^2-n$. Data is typically not synchronized with the memory of the control and message latency can be as much as twice the polling rate.

Eventing is a practice of nodes registering with the owners of data to be notified under certain conditions with new value of data. The data owner is then responsible to send a message to the observing nodes when the data meets the criteria originally specified during registration. (e.g., send data only when data changes). In an eventing model, bandwidth usage is optimized because data is only sent when it changes. This model scales well with message traffic and minimizes latency. Data is synchronized with the control. However, a connection validation (heartbeat) is needed. Otherwise, a client may not know when an event source is offline. Alternatively, connection validation in an eventing model can be achieved using acknowledgments which are an additional message transmitted from the event observer back to the event source. When the event source transmits an event message, the event source will not consider the transaction to be complete until an acknowledgement message is received. After a timeout has expired, the event source may retransmit the event. This process may repeat for a configurable number of acknowledged event transmission retries.

In eventing architectures, the message binding capabilities of FIG. 87 that are governed by the MMP bit of the packet structure D28 can be used to group events which were generated from the same 'scan' of the microcontroller.

In this case, the preferred embodiment is an eventing model since eventing has advantages listed above as well as the simplicity of the remedies which address the disadvantages of eventing. Connection validation is addressed by use of a heartbeat and/or acknowledged events. When the heartbeat is used, the event source will send out an event periodically so that all of the event listeners of that node can know that the event source is healthy. Likewise, implementing the heartbeat such that its frequency is programmable can also be used to notify all event subscribers that the event source is healthy. The heartbeat period is configurable from the network. Acknowledged Events which are described in detail herein are an alternate method which can be used in addition to the heartbeat or programmable heartbeat to insure connection integrity. Message binding is addressed with the message bounding bit in the payload of each packet structure D28. This allows the software architecture D10 driver to collect messages corresponding to the same microcontroller scan and present those to the application layer as a whole.

Using a the a sub-component of this disclosure known as the DAQ D30, the software architecture allows a client D16 to dynamically register with a component D16 for appliance control, which is enabled with the software architecture D10 and including the optional sub-component of the software architecture DAQ D30, via the internal communication network D14 to receive notification when the value at a specified memory location changes relative to a specified condition. This relieves the component D16 for appliance control from having hard-coded feedback variables and allows real-time feedback to change according to the application, without client polling because event-based updates are accurately broadcast as needed.

Figure 113:
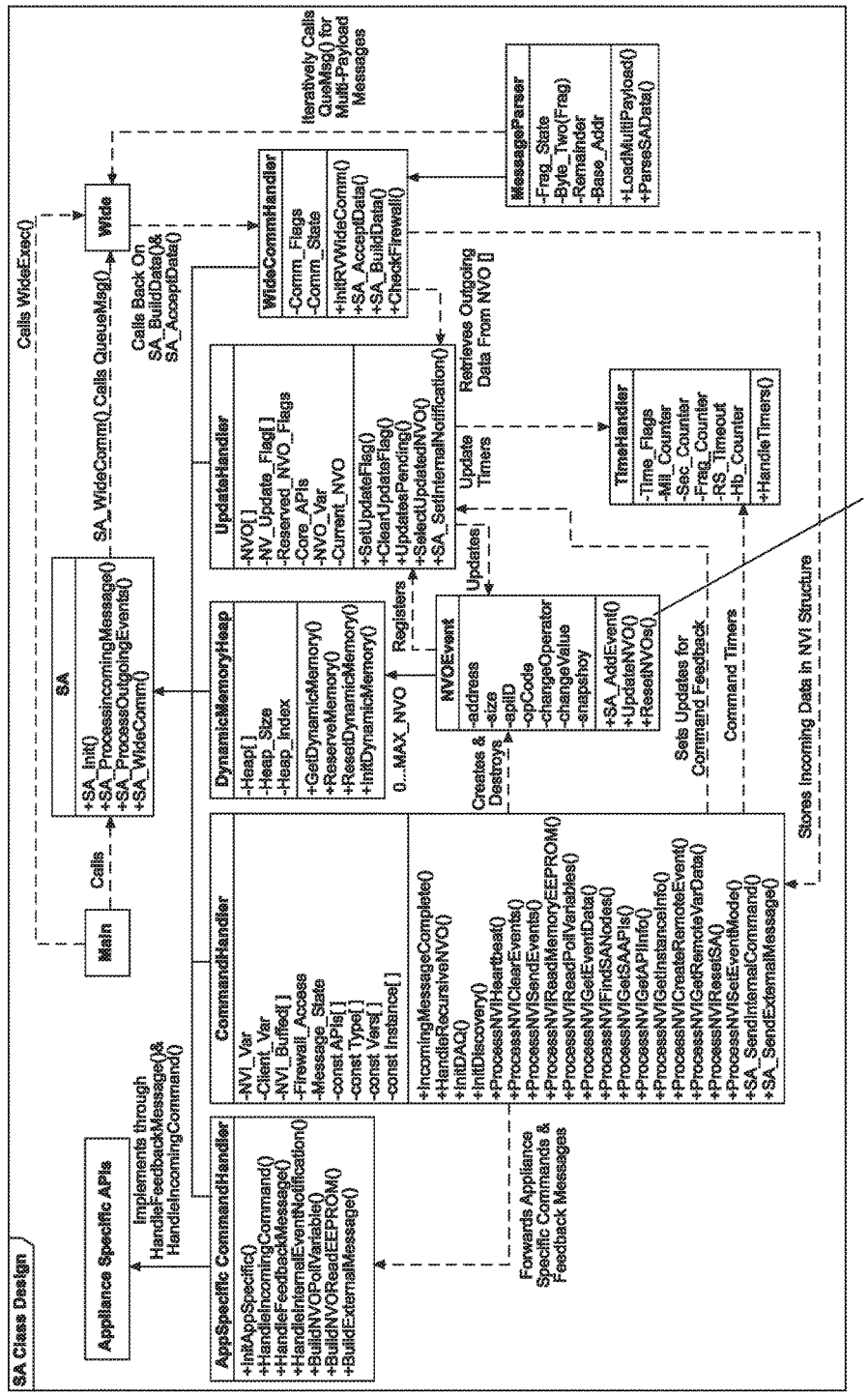
FIG. 113 is a UML class diagram illustrating the preferred implementation of the SA.

A dynamic memory heap of FIG. 113, which is a memory reserved for runtime-configurable feedback messages, is employed wherein the size of the heap is configurable at compile time. It has been found that each feedback event variable requires about D10 bytes of RAM. The events registered in the heap (NVOEvent of FIG. 113) can be added or reset through internal communication network D14 commands issued by the client to a component enabled by the software architecture having also installed the optional sub-component DAQ D30.

Payload Structure

One example of payload structure is a static compound payload which consists of grouping multiple variables together (at design time) so that the client can, with one transaction, send a complete command to, or receive the complete state of a component within the appliance D12. In the case of a command, the client may not intend to change every variable in a payload; therefore, a pre-requisite status update is required to populate the command payload with the current status for those variables which are not intended to change. Moreover, the variables that change may not map directly into a single payload definition resulting in multiple messages containing interspersed changed and non-changed data.

In a simple payload structure, only one variable can exist in a payload. This has a simpler, easier implementation and can approximate a dynamic compound payload (described below). However, bandwidth is not optimized because of a larger ratio of message overhead to data and message binding needed as variables are sent separately.

In a dynamic compound payload structure, payloads are not statically defined at design time, but are dynamically created by the sending node. In this case, the length of the payload is determined by the data, which the sender wishes to send, and moreover, there must include identifiers and possibly delimiters in the payload, which will allow the receiving parser to un-marshal the component parts of the payload. To reiterate, the receiving node must have a parser sophisticated enough to separate the multi-variable payloads into their component parts. This payload structure optimizes bandwidth but can increase ROM requirement due to the sophistication required by the parser. There is also some added overhead to the application protocol since the dynamic compound payload must embed op code lengths as part of messages, requires additional parsing by the receiving component and can be hard to understand and implement.

It is a preferred embodiment of this disclosure to employ a simple payload structure for the application protocol. The complexity of a dynamic compound payload can have difficulties in a cost-benefit analysis for the messages employed in the software architecture D10. To maximize the use of the software architecture D10, the complexity of the interface should be preferably minimized. By way of using compound payloads, by their complex nature, would potentially retard the use of the software architecture D10, especially with embedded clients. Simple payloads are a good approximation of dynamic compound payloads even though there can be additional message overhead (i.e., there are five bytes of overhead for every the internal communication network D14 message). There is an additional two bytes of overhead to support the software architecture D10 packet structure D28. This leaves D13 bytes per the internal communication network D14 protocol packet structure D24 for data in some application-specific conditions. Using a static compound payload can be inflexible and wasteful.

The message binding of FIG. 87 is addressed with the use of the MMP bit in the payload of each message packet. This allows the software architecture D10 driver to collect the messages corresponding to the same microcontroller scan and present those to the application layer as a whole.

State Aware Commands

Relative to a user interface for an appliance D12, the appliance D12 acts like a state machine. As keys are pressed, the state machine transitions from one state to another. For each state, it is known what keys are valid candidates for the next push. Likewise it is also known which keys are not valid for the next push.

Generally, when a key is pressed that is invalid, the appliance D12 will produce an audible alarm to indicate to the user that the appliance was in an inappropriate state for that key. The same concept applies to commands being sent by an external client D22, which may or may not be in the form of key presses, in that some sort of indication can be produced when the commands are invalid.

In general, two types of state machines are developed for appliance control: the key press state machine (as mentioned above) and a process state machine. An example of a typical process state machine is shown in FIG. 85.

FIG. 85 is a schematic illustration illustrating various states of a household appliance D12, such as a washer shown by example in FIG. 85, and to the interaction of the software architecture D10 through various states D32 and a fault error mode D34. The various states D32 of the example washer appliance are shown in FIG. 85 as idle, washing, rinsing, spinning, and pause. Other states for this example appliance D12 as well as states for different appliances D12 are contemplated and the example shown in FIG. 85 should be by example only.

The states of the process state machine can be reported to the internal client D16 or external client D22. However, upon inspection, it can be seen that the process state machine in FIG. 85 does not address events from all possible user inputs (i.e. clock set, spin speed selection, load size option, etc.). In general, the logic in the component D16 for appliance control has a final else clause which handles all other cases which were not pre-defined.

It can be desirable for the client D16, D22 to understand the rules governing the state transitions of the control so that the client D16, D22 can avoid sending invalid commands. Accounting for the fact that the client D16, D22 will not typically be sending key press commands, the designer must understand that there is no available document or data structure allowing client side validation (i.e., validation before the request is sent). Eventually, this can lead to client applications that are likely to send a command that the receiving component D16 will not execute due to its validation logic, which is based on the exemplary state of FIG. 85.

The solution can have an effect not only on bandwidth usage, but also on the overall robustness and end user satisfaction of the application. From a bandwidth perspective, it can be stated that a message not resulting in the desired action, but rather, an error code or retry is a waste of bandwidth when the problem can be prevented. From a user satisfaction perspective, applications that prevent the user from making mistakes are generally considered more "user friendly" than those which allow the user to make mistakes and then use dialog boxes to explain what happened.

Various embodiments of state appropriate commands have been contemplated in accordance with this disclosure.

Using a client-coded rules section, a subset of state information is used to develop case logic or an emulation of the state of the control for the purpose of preventing invalid requests. This model typically does not impose change on the control architecture but can have the client and control can easily be out of sync. The rules and logic development can be based on trial and error (e.g., code, test, re-code). A client design will rapidly evolve, creating poorly designed procedural code.

Using a design-time state-based API data model, a data model is developed such that the client can interpret it and prevent invalid requests. In essence, it is a correlation between state and valid op codes (op codes are message identifiers). The advantage to this is that the developer of the Op Code or API is also responsible to publish information to the client developer (at design time) allowing the designer to emulate the state machine on the client. This emulated state machine enables the client application from sending invalid requests. It is necessary for the control to expose each state defined in the API data model. The design-time data model requires the control developer to be responsible to communicate state rules governing Op Code usage. The client and control can easily get out of sync because data is not available at runtime. A document must be created which reflects the as written code. This document must be maintained and published. The document must be parsed or converted into client side logic and this does not work all of the time. The appliance state can change just as a command is being sent resulting in an invalid command.

Using a run-time state-based API data model, this solution is identical to the previous with the exception that the data model is not shared between developers at design time, but between client and control at runtime. Some additional messaging is required for this data to be communicated from the control. In the runtime data model, the control developer must be responsible to communicate state rules governing Op Code usage. A client can discover at runtime the Op Code/State correlation definition. The client and control are always in sync and the client and developer activities are optimized—no manual translation to/from a document. Additional code (ROM) (written once) required to marshal and un-marshal Op Code/state correlation definition. Some network bandwidth required for transmission of data and some start-up latency as a result of transmission of data. This does not work all of the time. The state can change just as a command is being sent resulting in an invalid command.

Using a post-command acknowledgment enumeration model, the three options above have the goal of preventing the command from being issued by client to control in the invalid state. This solution does not attempt this pre-emption. Instead, this technique allows the client application to send any command at any time. If the command is invalid, an acknowledgment will occur so that the client can take appropriate action. This acknowledgment may or may not include an enumerated reason code. In a post-command reason code model, there is no change imposed on the control architecture but a client is more likely to send commands which will be rejected. The client developer must design a strategy to handle rejection acknowledgment and the end-user experience may not be as pleasant due to frequency of rejected command messages.

Using a design-time naming convention and source code parsing model which is a combination of the design and runtime data models, this has the least impact on the structure of the embedded code, as well, delivers the desired runtime functionality. It is accomplished by creating a client-side parser which can parse the embedded source code and determine the variable to be monitored for each external Op Code. The requirements for this solution are: (1) each non-diagnostic external command (Op Code) will have an associated single Boolean variable which represents the permission state required for execution; and (2) a naming convention is used such that a parser can associate each permission variable to the corresponding external Op Code. In a source code parsing model, the control developer is responsible to communicate state rules governing Op Code usage. A client can discover at runtime the Op Code/State correlation definition pending proper versioning and the client and control are always in sync with proper versioning. The extra reference document is not needed, however, there are non-trivial changes to coding practice, additional logic to be executed each scan, small additional RAM and ROM required, and only sophisticated clients are able to parse source code.

Using a learning client model, this solution requires no change to the embedded system. In this case, the client would "learn" after each rejected command and build a client side permission map that could, over time, achieve the desired runtime behavior. In a learning client model, there is no change imposed on the control architecture, however, this assumes that the correct state variables are being evaluated at the time of rejection. If no state variables are being observed, then the client cannot learn what caused the rejection.

It has been found that several of these options are preferred embodiments. For now, a main preferred embodiment is the runtime API data model. An exemplary beneficiary of this design would be the home control application. The model, however, requires additional embedded design. And because the current business environment does not create a requirement for this embodiment, the post-command acknowledgment is adopted until such time that the cost-benefit of adopting the runtime API data model (also referenced as Taxonomy Engine) becomes favorable.

One of the challenges of the software architecture D10 is to provide functionality without impacting the production schedule of the appliance D12. The software architecture D10 can implement an acknowledged request model. NVO-RecipeStatus (API ID=1, Op Code=1) is a preferred acknowledgment message that the software architecture D10 sends after each message received.

API Versioning—Discovery of FIG. 84

Although the core of the software architecture D10 is independent of any API, its purpose for the software architecture D10 is to expose multiple APIs. It is realistic to expect that APIs will be continually added to the software architecture D10 over time. In anticipation of this, consideration for API discovery and versioning is made.

It is also conceivable that as the software architecture D10 applications grow, the microprocessor resources will not be sufficient to support all the software architecture D10 APIs and functions simultaneously. With the use of compiler directives, the software architecture D10 can be configured so that APIs will appear and reappear for the same model over the development life of the machine.

Discovery is a key to the long-range success of the software architecture D10. A fundamental purpose of the software architecture D10 is to act as middle-ware between client D16 and control component D16. Given the scenario described below, it will be necessary for clients D16 to query the control to discover what the current capabilities are. If certain capabilities are not present (i.e., compile time decision), it is desirable for the application to be able to gracefully fail and communicate to the user that the support for the application is not currently compiled into the appliance control software.

There can be dozens of client implementations and dozens of cross-platform and platform specific APIs. Compiler directives can be developed to include or exclude certain functions of the software architecture D10. There may not be space on the control for all possible functions of the software architecture D10 to exist on the microprocessor simultaneously.

Various embodiments of this disclosure described herein relating to the versioning and discovery methods of APIs are contemplated without departing from the scope of this disclosure.

Using a model number-based discovery model, the client is responsible to understand the capabilities of the control. This can be done using client-based data structures, remote data bases, or runtime code delivery vehicles like OSGi which include all relevant information on a particular model number for an appliance D12. In a model number-based discovery model, there is no additional requirement on the appliance control. However, a model number is not typically assigned at beginning of a product development cycle so it is not available in early software development. Model numbers can be changed due to color schemes, branding, and other irrelevant factors. Different APIs can be residents on the same model due to compiler directives. The client can be required to be responsible to acquire capabilities definition or equivalent code after discovery.

Using an API ID-based discovery model, API-based discovery does not rely at all on model number, but rather defines any product as a collection of well-defined interfaces. This technique allows for the same APIs to be resident on multiple products resulting in some reuse. In an API ID-based discovery model, the reference to API ID compensates for the shortcomings of a model number-based approach. This model allows multiple products to share same compiler directives and same API definitions and can promotes sub-function reuse of the software architecture D10. However, the client can be responsible to acquire capabilities definition or equivalent code after discovery, additional management overhead can be required to maintain and assign unique APIs, and additional resources from a control microprocessor can be required to support discovery Op Codes (i.e., additional messaging).

Using a capabilities discovery model (also referenced as a Taxonomy Engine), this model takes API Discovery an additional step. In addition to the ID of an API, the client will also request and obtain the data definition corresponding to that API. In other words, the client will discover each function call; each function calls arguments, and all the valid values for each argument. In the capabilities discovery model, no secondary lookup is required to acquire capability definition. This model approaches a UPnP or Web Service type concept and sets the foundation for the conversion to LCD screen user interfaces which can be data driven. However, this concept may be cost deficient when applied to low margin mechanical key pads and actuators. And, to take advantage of this technique, the client D16 must develop an interpreter for the capabilities definition which can require more intensive modeling effort by the software architecture D10 sub-function developer and significantly more resources from the control microprocessor.

It has been found that, at the time this application was prepared, an API ID-based discovery model is a preferred embodiment. In addition to API ID, each API can have a type and a version, so that many different permutations of an API can exist over time. This can make the protocol much more flexible (e.g. there can be many types of APIs for a particular appliance D12, such as a dryer, as well as a different version of each type: Dryer API, Horizon Dryer Type, and Version 1).

Discovery can be initiated in a number of ways according to this disclosure. On power up, each node enabled with the software architecture D10 broadcasts a message on the internal communication network D14 called Publish Node.

Secondly, a node, at any time, can broadcast a message on the internal communication network D14 called Find Nodes. This message will result in all nodes responding with a Publish Node message. This API is discussed in more detail with respect to FIG. 83 and the Discovery API.

As discovery is a key to the software architecture D10, versioning is a key to successful discovery. The same rationale used to justify API discovery can be applied to API versioning. Versioning allows the client to find out more information about the API which it has discovered.

During API discovery, the API version and type is reported within the same data structure as the API ID. For example, a simple number bumping approach can be employed. Further, a one- or two-byte or n byte data structure for API ID and a version number are contemplated.

Connection Integrity

In eventing architectures, connection integrity is an issue; whereas in polling architectures, connection integrity is inherent. In eventing architecture, the client D16 can successfully register to listen for feedback (such as for a temperature reading). Once registration is complete, the client relies on the control for notification of changes to temperature. As such, the client would interpret a network problem as a constant temperature. By contrast, in a polling architecture, the client would constantly ask the control for temperature feedback the response or lack thereof would immediately indicate the integrity of the connection.

Using an optional heartbeat model to perform connection integrity, a client must register for a network-based heartbeat. Using an automatic heartbeat model, the software architecture D10 produces a heartbeat automatically when a notification registration buffer is not null. Heartbeats can be broadcast messages or messages directed at a specific node.

In an optional heartbeat model, if there is an instance when it is not needed, the heartbeat can be eliminated. In instances where it is needed, a client must configure the software architecture D10 to produce a heartbeat. In an automatic heartbeat model, there is no effort required for desired functionality—the software architecture D10 is inherently robust. In a broadcast heartbeat, fewer messages need to be sent, a custom heartbeat can be accomplished through time-based event updates and it has simpler implementation. However, this can result in message handling from other network nodes which are not participating in the software architecture D10 collaboration. Also, nodes not properly handling broadcast messages can misinterpret incoming messages. In a directed heartbeat model, only enabled nodes need to handle the software architecture D10 application protocol. However, more messages can be sent using a directed heartbeat model.

For this disclosure, it has been found that a preferred embodiment is a heartbeat for connection integrity, and specifically, a broadcast messages can be used for a heartbeat. Clients that do not prefer the broadcast heartbeat rate can alternately use a periodic time-based NVO event update instead. Making the heartbeat automatic can lessen the burden on the client. With respect to the APIs contained in the software architecture D10, the following functions are supported as part of the Core API (Id=1): Heartbeat Message, Set Heartbeat Period. The heartbeat is preferably automatically initiated with a default period upon receipt of the first message from a client D16.

Figure 109:
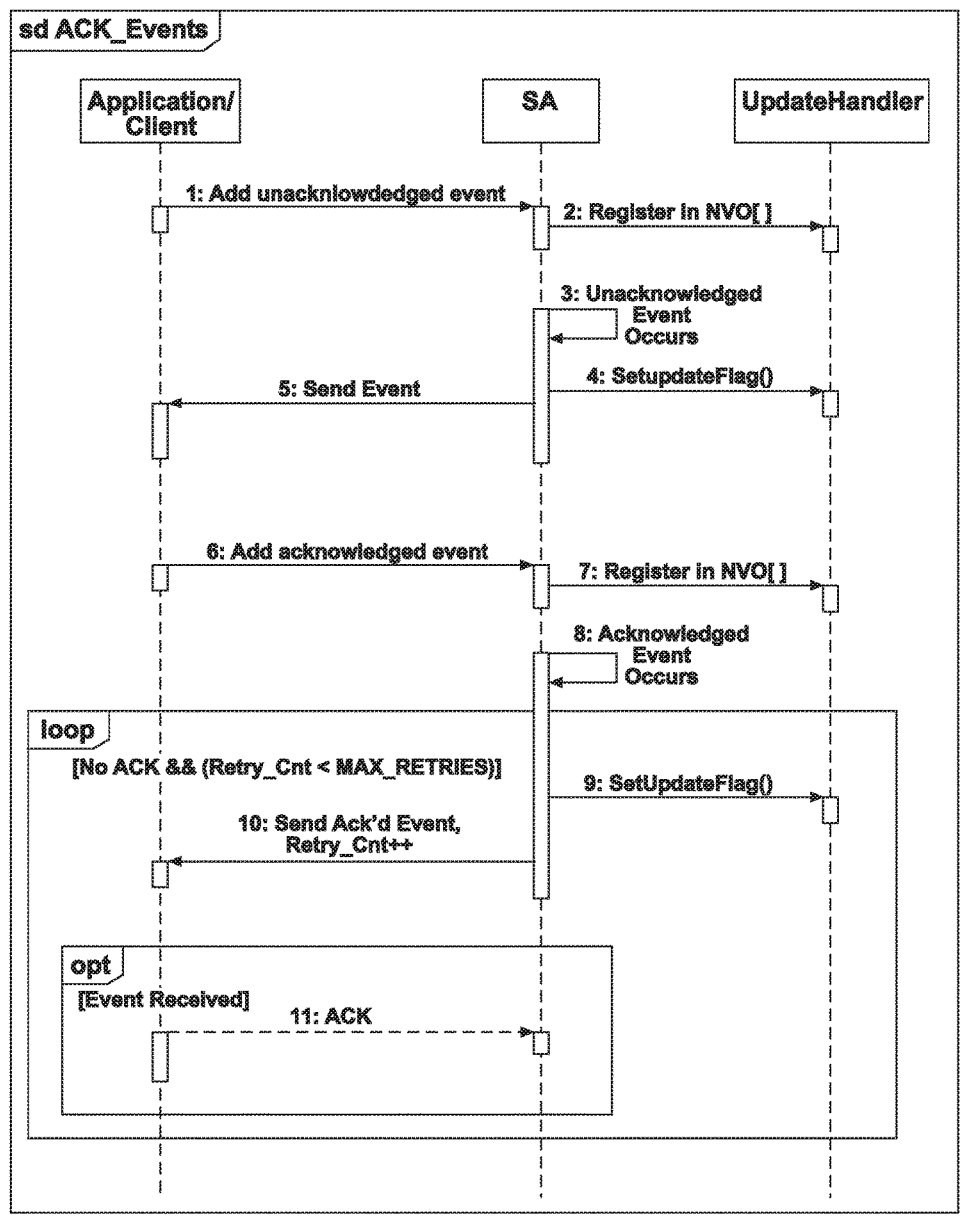
FIG. 109 is a UML sequence diagram of an acknowledged event within the SA, where the controller SA waits a pre-determined time for an acknowledgement message from the client SA until processing the next event.

An additional optional preferable method for connection integrity can be introduced into the software architecture D10. It has been found that as the application of the software architecture proliferated, it was determined that an additional method of connection integrity was needed. Using the heartbeat method for connection integrity is appropriate for many application scenarios. This method is chosen because it represents a good tradeoff between utilization of bandwidth and confidence level of the event source. However, it is possible that an event message sent by the software architecture D10 will fail to be processed by the intended event subscriber even when the event subscriber did not detect a missing heartbeat. In this case, the event subscriber cannot detect failure and therefore cannot take corrective action. The corrective action, in the case of a detected missing heartbeat, is that the event subscriber may request that the event source re-send (all or a sub-set of all) events so that the event subscriber has the most current data. To address this potential undetected failure mode, a second method of connection integrity has been made available through the software architecture D10. The method, known as acknowledged events, allows the integrity of each event message to be individually managed. FIG. 109 illustrates the functionality of the acknowledged event. Further details concerning acknowledged events are described in the descriptions of FIG. 109.

Traffic (Flow) Control

Configurable asynchronous processes are powerful, but can fail when configured beyond their physical processing and bandwidth limits. Mechanisms are introduced to prevent saturation in four known failure scenarios: inbound invalid requests, inbound valid requests, outbound message events, and a power-up condition.

Inbound Invalid Requests.

It is likely that the client will format and send a request that cannot be properly parsed or understood by the control or may be invalid per the state of the control.

Inbound Valid Requests.

Without consideration, the client may ask the control to do a second task before the control has been able to process the first.

In a buffering model, a receive buffer could be used allowing the client to send many requests without concern for the control's ability to service them. In this model, the client has no responsibility even though the implementation of this model is simpler. However, buffering does not solve the flow control problem; it only delays or makes the problem less likely or less frequent and buffering requires more RAM.

In a flow control model, messaging can be used so that the client is required to wait until a control is 'ready' before sending a second request. In a flow control model, the flow control problem is solved robustly, and failure modes are eliminated. However, a client must implement a flow control protocol.

In an acknowledged request model, a control provides a response either positive or negative to each client request. In an acknowledged request model, this model allows a client D16 to develop simple re-try or recovery scenarios. However, this model requires more bandwidth for the acknowledgments and additional ROM and design is required.

In an unacknowledged request model, client requests are un-acknowledged—a client must use state information to determine if the command succeeded. In the unacknowledged request model, less bandwidth and ROM is employed. However, application user experience can suffer, a client application has no indication if an issued command was successful and therefore cannot automate retries, and a user will notice an unsuccessful command and need to manually replicate the command actions.

It has been determined that a preferred embodiment of this disclosure is a flow control protocol with an acknowledged command model. Moreover, acknowledgments can be enumerated such that a client process can develop the most robust recovery scenarios as possible. Because the acknowledgement message previously mentioned in this disclosure provides the API and op code for the acknowledged command, a client can discern the command being responded to. This prevents confusion in a multiple control board network, in which multiple control boards inside of an appliance all utilize the software architecture D10. Flow control and command acknowledgment are techniques which allow the client to send data as rapidly as possible without saturating the control. The benefits can be very responsive applications without introducing unnecessary latency or unexpected application failures.

The flow control benefits are achieved using publish Acknowledgement, API Id=1, Op Code 1. Each command is acknowledged with a publish Acknowledgment response. A new command is only allowed after receipt of a publish Acknowledgment value of READY or UNSUPPORTED. Publish Acknowledgment has the state machine for command flow control as shown in FIG. 86.

Figure 86:
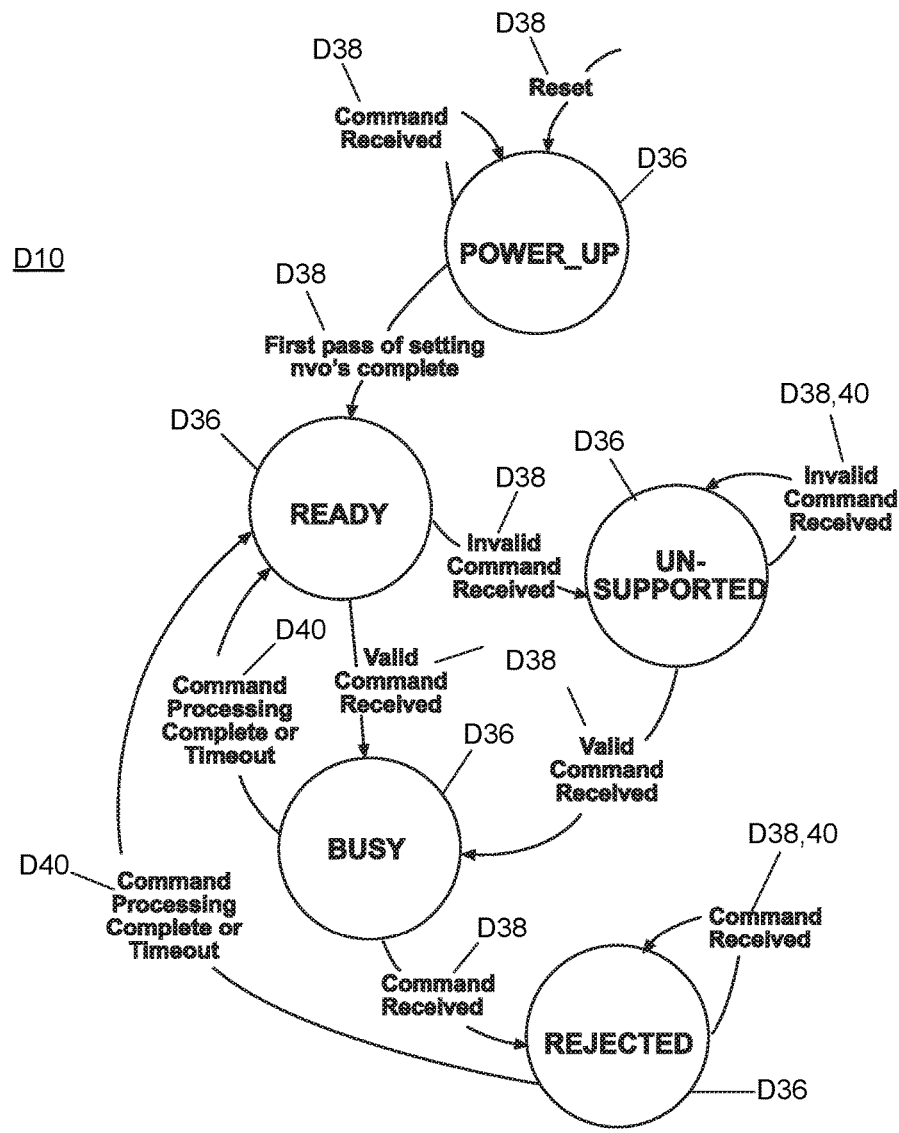
FIG. 86 is a schematic illustration showing the response of the controller SA to various information exchanges in the form of commands issued and received by other SA installations to validate or reject those commands based upon the state of the household appliance as well as the internal state of the controller SA.

FIG. 86 is a schematic illustration showing how the architecture D10 of FIG. 79 interacts with incoming commands according to this disclosure and validates or rejects those commands based upon the state of the household appliance. Various flow control status indicators are shown in FIG. 86 with reference numeral D36 as, e.g., POWER_UP, READY, BUSY, REJECTED, and UN_SUPPORTED based upon various commands D38 and issued responses D40.

Outbound Messages Events (Feedbacks).

During each scan of the microcontroller, the DAQ D30 of software architecture D10 collects byte arrays representing the events that must be sent out on the bus (see PROCESS DAQ EVENTS state of FIG. 116. The DAQ D30 of software architecture D10 is configurable as shown in FIG. 83 and therefore it is possible that the client or clients could configure the software architecture D10 to transmit more data than is possible for the bandwidth of the communication bus (i.e., over configuration).

In order to prevent this, a configuration limit model can be employed which would limit the ability of clients D16 to configure the software architecture D10 to avoid this problem. In a buffering model, the software architecture D10 can be equipped with a transmit buffer. In a saturation message model, the software architecture D10 detects when there is too much data presented to the transport layer such that the data may not be sent to the client. In a require re-initiation model, event distribution is suspended and an event saturation message is send out and/or broadcasted. Eventing is resumed once a SendEvents (e.g., 255=ALL) message is received. In a no re-initiation model, a saturation message is sent out and/or broadcasted and then the software architecture D10 continues eventing.

In the transmit buffer model, the client has no responsibility and client implementation is simpler. However, buffering does not solve problem; it only delays or make problem less likely or less frequent and requires more RAM.

In the configuration limit model, this model would prevent problem so that a recovery process is not necessary, it is impossible to derive a configuration limit, and the limit is based on machine state transitions which are of a random nature relative to the software architecture D10.

In the saturation message model, the client can detect that the software architecture D10 was unable to submit new data to the internal communication network D14 on at least one scan. The client is unable to determine if data was missed and the saturation message does not necessarily mean there was failure—only the possibility of missed data.

In the no re-initiation model, the client has no responsibility, however, the client developer is not forced to implement saturation recovery process, the client developer cannot be aware that events can be dropped due to over configuration of the software architecture D10. This type of failure is not catastrophic and therefore client applications may be oblivious to the loss of data.

In the require re-initiation model, the client developer must consider the saturation failure and its implication to the application, this prevents transient hard to find bugs, and the failure modes are catastrophic and/or obvious. However, the client must implement a saturation recovery process and there may be momentary latency during a required re-initiation process.

In a do nothing model, unnecessary work is avoided but an unforeseen situation may arise causing client developer to spend time troubleshooting something which can be diagnosed programmatically.

It has been determined that a saturation message that does not require re-initiation to be available via compiler directive is a preferred embodiment of this disclosure. The saturation message must be successfully transmitted before further events are put into the transport layer transmit buffer. The following messaging functions are supported as part of the software architecture D10 Debug API (API Id=4): get Saturated and Register for Saturation Message.

As shown in FIG. 82 packet structure D28, all packets of the software architecture D10 use a Cmd/Fb flag enabling the possibility of namespace conflict. Thus, it is possible to overlap op codes under the same API using the Cmd/Fb flag for discernment.

Power-Up Condition.

If the software architecture D10 node experiences a transient loss of power or micro reset, it might be possible for the client to have an incorrect snapshot for the software architecture D10 modules variables. For robust operation, the software architecture D10 can notify its client that the previously exported variables can no longer be considered valid. When considering the transient condition, the configuration of the software architecture D10 could potentially be stored in non-volatile memory, which would allow for the automatic resumption of communication.

In a broadcast message model, the software architecture D10 can send a special broadcast message notifying all clients to 'dump their cache' upon power-up. It is understood that some applications of client D16 may not need to consider this failure mode and therefore would not make use of the special message. It is also known that the software architecture's software operating environment could experience a failure (resulting in a reset of its internal memory) and a recovery within the heartbeat period. With only the heartbeat as a means of detection, this fast recovery would obfuscate the probability that the client's D16 memory holding copies of certain values from the memory of the software operating environment of the software architecture would no longer correspond to the current values within the memory of the software operating environment. To address this failure scenario, a power-up message can be included in the software architecture D10. This message is independent of the heartbeat and would indicate to any client D16 that any previously held values of the memory of the software operating environment of the software architecture D10 would be most probably be invalid and that the client should, through the use of the sendEvent message of API 1 Op Code 7, re-acquire the current values. It is also understood that the client should suspend or modify any logic or calculations which operate on these memory values in an appropriate way until the current values are re-acquired.

In a loss of heartbeat model, the software architecture D10 can discontinue its heartbeat, allowing the client to determine the proper failure mode action. However, as described above, loss of heartbeat model does not cover all failure scenarios. This is especially true when using the automatic resumption model.

In an automatic resumption model, the software architecture D10 can automatically resume normal operation from the last known state after a power-up or reset. In the automatic resumption model, the client may misinterpret the information received as state transitions that did not occur. In other words, for some State A existing before a Reset or Power-up and some State B which is the initial power up State; without additional indication of a State I representing power-up or reset, the client may interpret a State A to State B transition as occurring without having passed through State I.

In a require re-initiation model, a client developer must consider the scenario of the preceding paragraph and its implication to the application. This can prevent transient, hard to find bugs, because the failure is catastrophic and as such easily identified and fixed. However, the client must implement transient recovery process and there can be a momentary latency during re-subscription/data re-acquisition process.

It has been determined that a loss of heartbeat model requiring re-subscription after a power-up/reset is a preferred embodiment of this disclosure. The advantage of a special broadcast message indicative of the state of initial conditions is also understood to be a useful indication when the resources within the software operating environment allow for such additional feature. Even though the heartbeat mechanism can be made to approximate the utility of a power-up message mechanism by making the heartbeat time out small, a preferred solution will include a power up message when resource constraints of the software operating system are not prohibitive. For this reason, the software architecture D10, supports as an optional feature, a power up message which is API Id=3, Op Code=2, publishSANode. Re-subscription can be required because the dynamic event triggers are stored in RAM and will be lost on a power up.

Preferably, the software architecture D10 module does not send any messages out until it has detected a client except the optional power up message publishSANode. A client is detected by the receipt of a valid command. Once the client is detected, a configurable heartbeat message begins broadcasting and the software architecture D10 is then ready for normal operation. Therefore, if the host microprocessor for the software architecture D10 experiences a power-up/RESET, the client will be notified by sensing the absence of the Heartbeat message (see API Id=1 Op Code=2) and optionally sensing the message, publishSANode (see API Id=3 and Op Code=2).

State Integrity

The DAQ D30 of FIG. 83 of the software architecture D10 provides several distinct advantages over a commercially available DAQ systems. The software architecture D10 can expose any variable in the microprocessor memory. In general this will also include the I/O signals of interest. Prior art DAQs cannot do that. The software architecture D10 is available to production machines via a single 3-wire plug, whereas prior art DAQs or emulators require more wiring or harnessing. Prior art DAQs are not practical in the context of a consumer field test. The software architecture D10 can be deployed on the production system. The software architecture D10 coupled with a modem can provide remote monitoring.

The most fundamental aspect, making the software architecture D10 different from prior art devices is that it runs as a blocking subroutine (SA ProcessOutgoingEvents of FIG. 116 and FIG. 89) called synchronously from the main( ) function of the microprocessor. This insures that the client can have (within the limits of network bandwidth) a complete scan-by-scan snapshot of microprocessor memory exactly as the execution engine of the microprocessor scanned it. This opens up many interesting possibilities ranging from low-cost emulation and debugging to hybrid algorithm development using the software architecture D10 to enable PC-aided co-processing with the production electronics.

A comparison of asynchronous data collection and synchronous data collection methods will now be described. In asynchronous collection:

1. Let A and B be variables inside the appliance control memory.
2. Let C be a variable calculated in the client as the product of A and B.
3. Let A=23 and B=67.
4. Client polls for A: A=23.
5. A and B change. A=56, B=77.
6. Client polls for B: B=77.
7. Client calculates C: C=A*B=23*77 (this combination of A and B never occurred on the microprocessor).
8. Client presents invalid value for C to the consumer or end user of the application.

Most applications will work with asynchronous data collection. It is simple and straight forward. However, problems associated with asynchronous collection are extremely time-consuming to debug and identify.

In synchronous collection, the client defines or registers A and B with the software architecture D10. This allows the software architecture D10 to maintain coordinated values of A and B on every scan.

1. Client registers for A and B
2. Client requests a send all.
3. Current values for A and B are sent by the control to client.
4. A and B change. A=56, B=77
5. Control sends bounded event(s) containing A=56 and B=77
6. Client does not calculate C until the bounding or end delimiter bit is reached.
7. Client calculates C=56*77
8. Client presents correct value of C.

With synchronous data collection, the data collection is robust and virtually bulletproof. It enables applications which have not yet been conceptualized and allows for 'real time' debugging of production software w/o special coding on the production electronics. However, additional RAM is required on the control to maintain snapshots of client "care about" variable or property list.

It has been determined that the software architecture D10 preferably can support and promote the synchronous data collection technique. However, asynchronous memory polling is available in the Core API (API ID=1).

With the synchronous data collection technique being employed, the concept of bounded updates should be discussed. Bounded updates are events that are grouped together as a snapshot of the appliance state taken during the same scan of the host microprocessor's Main( ) loop execution. The appliance control main loop will allow for an iterative update of feedback variables that are registered with the DAQ API (e.g., every 25 ms). Each registered variable is monitored and only those that change value according to their memory monitor change operator are broadcast as updates to the client. When updates are in the process of being broadcast, no new updates are allowed in order to preserve the snapshot in time. A snapshot is communicated to the client using the MMP flag in Byte 2 of the software architecture D10 header as shown in the packet structure D28 in FIG. 82.

While the MMP of the packet structure D28 of FIG. 82 is true, more messages are pending for the snapshot. When MMP is false, the current message is the last message in the snapshot. Therefore, if the first message of a snapshot is the only message in that snapshot, MMP will be false.

The example in FIG. 87 illustrates a bounded command (Cycle+Temperature+MMP) with acknowledgements, followed by two consecutive bounded updates. Where bounded refers to elements of protocol which indicate to the receiver that more messages are coming from the source and that data processing by the application logic of the receiving component should be delayed until the bounding indicators of the protocol within the packet structure D28 (MMP bit 7) indicate a complete transaction at which time data processing by the application logic is permitted. The bounded command is shown by reference numeral D42 and the two consecutive bounded updates are shown by reference numbers D44 and D46, respectively. Notice that updates do not begin until bounded command execution is complete, providing the client the ability to filter away transient feedback data. Bounded commands are provided by the same mechanism, MMP found in the packet structure D28, as bounded updates in order to provide applications a greater level of control.

The example of FIG. 87 is conceptual. The actual mechanism is MMP found in the packet structure D28. However for illustrative purpose, the bounded command begins with an initial "begin" command initiator (MMP set) and includes commands to set a washer cycle to wash, a recipe status to ready, a water temperature to medium, again a recipe status to ready, and finally a cycle start indicator, followed by a command terminator (MMP unset). It can be noted that, in FIG. 87, updates (such as by eventing) are disabled to prevent updates from happening before the bounded command is complete. In addition, a "process command" indicator is shown periodically throughout the bounded command processing in the appliance D12 to illustrate the portions of the command issued from the client D16 through the internal communications network D14 are processed.

In the bounded updates D44, the updates are once again enabled (since they were disabled at the beginning of the bounded command D42) to allow the appliance D12 to report its status to the client D16. In the example shown in bounded updates D44, the acknowledgment state is shown to ready, the cycle is reported as wash, the state is reported as running, the basket is reported as fill, the pump is reported as on, and the temperature is reported as medium. Again, beginning and terminating indicators enclose the bounded update D44. These beginning and terminating indicators can be reported by use of the flag, MMP, in the application packet structure D28 as discussed in FIG. 82 or another method which would be apparent to one skilled in the art of network protocol.

In the bounded update D46, the basket is reported as agitate, the pump is reported as off and the motor is reported as on. Again, beginning and terminating indicators (MMP) enclose the bounded update D46.

API Strategy (Key Presses Vs. Logical API)

In almost all cases, the appliance D12 is controlled by an integrated keypad. The embedded software handles the key presses or user events generated by the keypad and action is taken. In effect, the key press handling function(s) are the API for the appliances. In other embodiments, a second API can be developed for an external client D22.

In a key press model, to use the Key Press API, the external client D22 can create virtual key presses and transmit those over the network. The external client D22 can be designed with the knowledge of the integrated keypad so that these key presses can be generated correctly/. This requires an external network interface card to generate key presses. In this model, no modification is needed for the underlying keypad programming. However, the client D22 must monitor the current keypad state in order to determine the key presses needed to achieve a desired state. The Client API must change if the design of the key pad changes rather than machine capabilities. This architecture breaks best practices of software development by interposing a presentation tier between a middle tier and the persistence tier. Extended commands can be included for energy management, service, diagnostic testing, and the like that are not available in the basic keypad interface. A logical API can be used while leveraging as much as possible the validation code associated with the key press handling routines without needing to duplicate code.

In a logical API model, by contrast, the logical API is developed from an abstraction of the machines capabilities rather than the design of the keypad. For example, Bake on a European oven using key presses might require that the client read the encoder position of the cycle dial and programmatically change the encoder to correspond to a Bake setting. If using a logical API, the client need only send the Op Code for set Cycle with the enumeration value for Bake: {0x01, 0x01} (setCycle(Bake)). In the logical API model, the client D16 need not be concerned with the keypad state, keypad design, or key press handling routines. The API remains independent of changes to the keypad design, allows for extended commands, and is an industry best practice.

It has been determined that the software architecture D10 will use a logical API which is integrated with the key press handling routines. The logical API exposes many of the extended commands, which enable various value-added applications. In the appliance control, when a key on the user interface is pressed or an external command is issued, it is directly mapped to a Logical API function call as a common entry point (e.g., when the WASH key is pressed or an external WASH network command is issued will both call the SetCycle(WASH) function in a washer with the software architecture D10 installed thereon). A Logical API function aims to describe a set of functionality in a parameterized manner so that it can be re-used. For example, non-logical specialized functions for temperature might be IncrementTemp( ) or DecrementTemp( ), which cannot easily be used to set the temp to any value. But a logical API function can be: SetTemperature (newTemp, or temp++, or temp−−). This last function can be used by both key presses and external commands.

A command handler for the software architecture D10 can comprise a method for the embedded software to response to either logic commands (e.g., setCycle(bake)) or key presses (e.g., pressing the "Bake" button on an oven appliance D12). The method translates incoming key presses and results in an invocation of the appropriate function within the logical API.

As much validation and state-based logic as possible exists inside this Logical API function so that external commands are treated the same and execute the same code as key presses. This API can be implemented without a major redesign of appliance control software. Only the Customer Interface Manager software must be reorganized and grouped to call API functions as the entry point for each key press command. This is not a requirement of the software architecture D10, however. It only serves to minimize the amount of code that must be written. If a collection of Logical API functions is not available to the external command engine, then validation and state logic found scattered in the appliance control must be duplicated for each external command, resulting in larger code size and increased possibility for error.

Identification: Multi-Node Issues

The discussion above on API Versioning and Discovery established a benefit for a mechanism to discover the APIs resident on any one node having the software architecture D10 installed thereon. Taken to the next step, there are additional considerations:

1. Multiple nodes
2. Multiple clients
3. Multiple installed nodes which implement the same API
4. A single node with multiple duplicate APIs
5. Multiple APIs using the same Op Codes
6. SAP Assignment
7. Client discovery of the nodes supporting the software architecture D10 protocol Multiple Nodes. It is probable that multiple components D16 on the network will implement the software architecture D10. Therefore, considerations should be made for networks with multiple components which implement the software architecture D10.

In a façade pattern model, the façade pattern is used to create simple access to a collection of objects. This is done by creating an interposing software layer between the client and the various target objects so that the client has a simple interface to a single object. This single source is then responsible to forward requests to the appropriate target object. In the façade pattern model, this model is easier to manage because the API is centrally defined. In most applications, the façade presents a simpler interface to the client. However, this model requires compile time design to include other nodes' APIs into the façade node. Additional RAM/ROM can be required for the façade to handle and forward requests to the target node. And, if two nodes are clients to one another, then the façade pattern would create unneeded processing, as the façade node would first make request through its own façade only to forward those to the target node.

In a distributed services model, this method uses discovery protocol as the means for the client to find the target objects. The client is responsible for the independent interaction with each target object. In other words, the client will discover the software architecture D10 node(s) and then will interrogate each as to what API(s) are supported by each node. In the distributed service model, this model scales well such that components can be plugged together at runtime. However, this model can require multiple documents to manage the network variable definitions (APIs).

It has been determined that the software architecture D10 will use the distributed service model for managing multiple enabled nodes on the network D14. The façade approach can be undesirable because changes to the target object API require changes to the façade (change, compile, download, test). Whereas in a single compile time environment supported by good re-factoring tools, façade could be a good choice. In a distributed environment, the more flexible distributed service model will allow for faster development and flexible configurations. However, in some cases there may not be enough resources on each microprocessor in the system to support the software architecture D10. In other cases, there may be legacy protocol and there is no desire to make modifications to a legacy board. In these cases, façade can be a good alternative to the distributed service model.

Multiple Clients.

As shown in FIG. 79, multiple nodes or clients D16 on the network D14 will implement the software architecture D10. Therefore, considerations should be made for networks with multiple occurrences of D10. One major consideration is that of event registration and notification. If multiple clients register with the software architecture D10 for events, the software architecture D10 should be able to manage the event distribution.

Using a node ID directed message eventing model, the software architecture D10 will store the node ID(s) of each event requestor such that when that event is triggered, a directed message will be sent to the requesting node(s). In this model, messages are only sent to nodes that care about the event. However, this model requires one byte per message to store the node ID and requires more RAM to create additional memory structures for each requesting node.

In a node ID directed message eventing with API ID Identifier, using this approach, the software architecture D10 stores the node ID(s) of each event requestor such that when that event is triggered, a directed message is sent to the requesting node(s). In addition, the API ID of the host node is included in the event. This model allows the client transport layer to better route messages internally. However, this model also requires one byte per message to store the API ID and requires more RAM to create additional memory structures for each requesting node.

In a broadcast message eventing model, using this approach, the software architecture D10 does not track the node ID of the event requestor. When the event is triggered, the software architecture D10 sends a broadcast message. In this model, the software architecture D10 implementation is simpler and smaller; there is no need to spend one byte per message to store the Node ID. However, broadcasting can create unnecessary event processing by other nodes.

A forth, hybrid approach, which is the preferred approach, comprises a model where broadcast messages are used which eliminates the need to store node Id. However, the client will include API Id and Op Code in the Event Creation Messages of the DAQ (API Id 2, Op Codes 1, 2, 12, & 13) such that they are dynamically assigned (as discussed in the paragraph below). Using this approach, the resultant event message will contain the assigned API Id and Op Code (as shown in the publishEvent message of API Id=1) In this message (publishEvent), the API Id and Op Codes of Bytes 1 and 2 of 28 in FIG. 82, are those assigned by the client D16 using the event creation messages (cited above).

It has been determined that the software architecture D10 described herein will use the broadcast messaging model which includes the API ID and Op Code. This will provide the benefit of routing by trading API ID storage for node ID storage. Given the discussion on SAP below, the risk of broadcast messaging is much lessened. Although some amount of processing will be used by the nodes to discard irrelevant messages, it is superior to directed messages which could eventually cause saturation of the network and of the software architecture D10 code. Including the API ID allows the client to configure the control with dynamic APIs which will encourage better, modular designs in the future.

Using the Same API on Multiple Nodes.

It is probable that some optional network component will implement the same API as does the UI or Appliance Manager board (i.e. service/diagnostic or energy). This will allow the optional network component D16 to manifest itself to an external client D22. Thus, the software architecture D10 can permit the client D16, D22 to interact with two physical nodes—each implementing the same API. This design consideration is at the intersection of several others, and likewise, its resolution is a combination of pre-existing design solutions.

Optional nodes are possible through dynamic membership. The client will be able to find out which nodes support the packet structure D28 through the discovery API (see FIG. 84). Each node may be interrogated to find out what APIs are supported through discovery as well. Op codes are not globally unique, but the internal communication network D14 node id coupled with the API ID and the Op Code are unique. The API ID is embedded into each event.

To summarize, the client may first discover the software architecture D10 nodes and then discover the support APIs of each. The client may then initiate an interaction with each API of each node. As each packet includes both the node ID and the API ID, both client and target will be able to avoid namespace conflicts and route messages to the appropriate application space.

Multiple Instances of APIs on the Same Network Node.

There are appliance D12 designs, which lend themselves to API re-use on the same microprocessor. Examples would include a double oven (i.e., two separately-controlled baking chambers) or a two-compartment refrigerated drawer. In other words, in some cases there are multiple cavities that perform the same function and can therefore be controlled via the same API. The design approach for this case is discussed.

In a unique function name model, the designer will create an API ID that has unique Op Codes for each command or variable without concern for re-using the definition. In other words, Op Code 10=lower oven set temp and Op Code 11=upper oven set temp. In this unique function names model, there is less messaging during discovery. However, this model does not promote modular design and code reuse.

In a multiple API ID model, the designer uses the same Op Code definition, but will designate a unique API ID for each instance of the API. In other words, upper oven API Id=1, lower oven API Id=2. In this model, there is less messaging during discovery and this model promotes modular design and reuse. However, this model will result in consuming the available API IDs at a faster rate.

In an instance ID model, the software architecture D10 dynamically assigns the API ID to each instance of the API except for the first instance. The first instance of the API will be identified by a global API ID repository. To enable this, the software architecture D10 specifies API IDs (e.g. 246-255) as reserved APIs for dynamic assignment to API instances. This model promotes modular design and code reuse, and does not consume API IDs. However, there is more messaging during discovery.

The software architecture D10 is an object oriented protocol designed to allow objects to discover and collaborate with each other in a robust manner. Basic to these requirements are: (1) collaboration entities must be uniquely addressable so that messages can be appropriately routed on the network and (2) collaboration entities must be uniquely identifiable so their messaging contracts, rules for interaction, and compatibility concerns may be understood. In a single runtime environment, the compiler is capable to enforce item (2). In a networked or distributed environment, embedded compilers do not generally address item (2).

Collaboration entity (object or API) addressing uniqueness is governed by the combination of a 3-bit node ID (found in the address field of the protocol packet structure 24 in FIG. 82) and an 8-bit API or Instance ID (found in byte 1 of packet structure 28 in FIG. 82). Any network message containing these two pieces of information can be correctly routed. This provides for 255 unique collaboration entities (or objects) for each network node.

Entity identification is defined by an 8-bit API ID (a class identifier), a 2-byte type ID (sub-class or specialization), and a 2-byte version ID, where the type ID is representative of intent and the version ID is representative of compatibility This two-tiered approach recognizes uniqueness of addressing separately from uniqueness of identification. This separation provides for a more efficient use of bandwidth by removing four bytes of identification information from each packet. In turn the client must cache the identification information and index it by the eleven total bits of address.

It has been determined that the Instance ID model is a preferred embodiment of this disclosure. The Discovery API (API ID=3) has support for the Instance ID in messages, Publish API Info, Get Instance Info, and Publish Instance Info. Instancing is a very powerful concept, which can be exemplified by its use in the protocol.

API-Op Code Namespace.

Messages on a serial network generally have an ASCII or numeric identifier that allow the receiver of the message to route the data contained in the message to the appropriate internal function. This function will then operate on the remaining data in the payload.

The remaining data in the payload is defined at design time in a document. This document describes the meaning of each bit and/or byte in the payload. From this, internal software message handlers are developed specifically for each payload definition. Therefore there is, in general, one message handler for each unique Op Code and Cmd/Fb pair.

Normally, if there were multiple independent payload definitions that shared the same Op Code without any additional identification mechanism, it would be impossible for the receiver to route that message to the appropriate message handler. However, this disclosure provides the Cmd/Fb flag to support the overlap of Op Codes using, the flag for differentiation. Thus, this disclosure provides the functionality to overlap a command and its corresponding feedback message using the same Op Code.

This section discusses techniques that can be employed to provide unique identification to message payload definitions.

In a globally-unique Op Code model, using this approach, Op Codes must be globally unique. In other words, each platform or API developer must be allocated an Op Code range (e.g., 350-385) which must not overlap with the Op Code range of any other project. This model is inefficient due to range allocations which require spare IDs. Further, API developers will not have control over their Op Code numbering scheme and this model requires an order of magnitude more coordinated decisions (information handoff).

In a globally-unique API ID model, using this approach, Op Codes are grouped into logical collections forming an API. The API will be assigned a globally unique ID composed of API Id, Type, and Version. Therefore, thy Op Codes therein need only be unique within the API. In this model, there is no need for allocated spare IDs, API developers can start at Op Code=1, and this model requires less information coordination to avoid namespace conflicts.

It has been found that this disclosure employs the globally-unique API ID strategy as a preferred embodiment. Certain fixed Op Codes, which are part of the software architecture 10 Core API, revert to the common starting number (1) and the Core API can preferably be assigned an API Id of (1).

SAP Assignment.

SAP found in the protocol packet structure D24 identifies the structure of the payload portion or SDU D26. It is the same concept as an API ID, which was introduced earlier herein. The advantages of SAP are also the same, in that incoming messages need to be identified and routed to the correct internal handlers or quickly discarded. In the example WIDE network D14 discussed herein, there are sixteen available SAPs. The software architecture D10 fits the criteria for SAP membership. In this scenario, the internal communication network D14 administrator can approve the software architecture D10 application protocol and assign the software architecture D10 an official SAP. Other network identifiers for the protocol packet structure D24 are contemplated without departing from the scope of this disclosure. For example, the software architecture D10 can be assigned a default SAP of D1 on the internal network D14.

A SAP (or other sub-protocol identifier) allows the internal communication network D14 node to participate in the software architecture D10 and non-architecture messaging. The software architecture D10 SAP fits into global architecture, and adds more scope to the software architecture D10. The internal communication network D14 SAP is a sound concept from both a technical and practical perspective. Securing a network D14 specific ID provides the software architecture D10 with global visibility and official acceptance which can help to proliferate its use and propel it to a global standard.

The Software Architecture D10 Discovery FIG. 83.

In the previous section, it was established that the software architecture D10's API ID is analogous to the internal communication network D14's SAP. Likewise, in previous sections, it is established that it is advantageous for the client D16 to discover by interrogation the API(s), which reside on each physical node of the software architecture D10.

A similar question and/or solution can be presented for the software architecture D10 discovery. If a service tool wanted to dynamically discover all of the software architecture D10 API(s), it would first need to discover the node IDs of the internal communication network D14 node(s), which supported the software architecture D10 protocol. This can be accomplished by a broadcast message model that sends a broadcast command that the nodes will respond to. In this model, the software architecture D10 can broadcast a new API which is added to the software architecture D10 or can broadcast the addition of new network D14 node(s) that implements the software architecture D10. The Discovery API of FIG. 84 can serve as the mechanism for the software architecture D10 discovery. There can be both a polling discovery message and an unsolicited broadcast message available as is discussed with respect to the Discovery API (API ID=D3).

Multi-Payload Message Integrity

The frag flag, which can comprises bit D6 of byte D2 in the software architecture D10 header, enables the software architecture D10 to send payloads greater than that of the underlying protocol (i.e. that of the internal communication network D14). When the frag flag is set, the receiver should realize that the current message will be fragmented into multiple packets or fragments.

In the message-fragment id model, the first fragment of a fragmented message uses the standard packet structure as described in FIG. 82. This initial fragment provides the message's API, Op Code, and Cmd/Fb flag. All subsequent fragments of the message will preferably assume the fragmented message structure described in FIG. 103. In this structure, the frag flag still exists (along with the MMP flag) to reinforce the data. However, byte 2 now contains the more fragments pending flag (MFP) in bit 5, message ID (MID) in bits 3-4, and fragment ID (FID) in bits 0-2.

The MFP flag informs the receiver that at least one more fragment of the current message should be expected. The transition of MFP from 1 to 0 informs the receiver that the current packet is the final packet of the current message. MID provides a 2-bit identifier for each message. Thus, each fragmented message (group of fragments) will be assigned a MID, and this MID will then increment for each subsequent fragmented message (group of fragments). The MID will increment to 3 and then rollover back to 0. FID provides a 3-bit identifier for each fragment within a message. Thus, for a particular message, the first fragment will always be assigned and FID of 0. For each subsequent fragment of that message, the FID will be incremented. The FID will increment to 7 and then rollover back to 0.

The fragmentation protocol provided by this disclosure allows the receiver to check the integrity of a fragmented message. By monitoring the frag and MFP flag, the receiver can ensure no erroneous halts to a fragmented message. By checking that the MID does not change within reception of a single fragmented message, the receiver can ensure that two separate fragmented messages do not become merged (perhaps due to a lost fragment). By checking that the FID correcting increments per fragment, the receiver can ensure that not fragment is lost within a message (or received out of order). See FIG. 104 for an example of the message-fragment id model.

In a summary CRC model, this solution makes use of a well-known existing cyclic redundancy checksum (CRC) concept. An additional two-byte CRC can be appended to the last payload of a multi-payload message. The CRC is the CRC representation of all payload bytes concatenated into a single combined payload. The sender generates this CRC. The receiver validates this CRC according to well-known methods. In this summary CRC model, this solution re-uses existing CRC algorithms which are established and well known, however, the CRC algorithm is more complex than frame counter and the CRC may not be easily portable to a third party vendor.

Therefore, it has been determined that the message-fragment id model is a preferred embodiment for confirming multi-payload message integrity in the software architecture D10 according to this disclosure. The message-fragment id model is easier to implement for third parties and is easier to add to the existing architecture D10.

Software Organization

Figure 88:
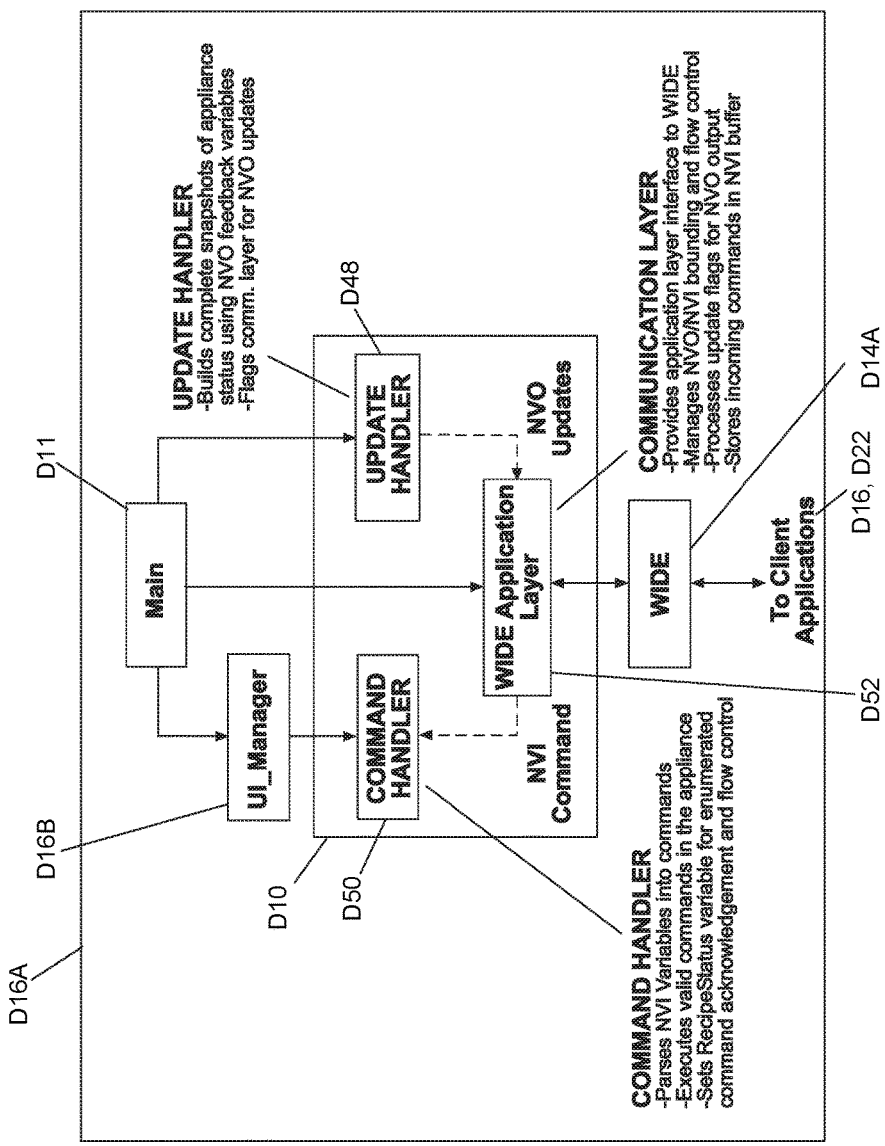
FIG. 88 is a schematic illustration showing the SA in relation to the overall software environment of a component, where the software environment comprises various software operating layers, with the software architecture comprising a command handler, an update handler and an internal communications network layer interface for interconnecting the SA to the internal communications network of the household appliance.

With respect to the software architecture D10, the code organization and implementation files will now be discussed with respect to FIG. 88. FIG. 88 is a schematic illustration showing the software architecture D10 of FIG. 79 according to this disclosure in relation to the software operating environment D16A of a component D16 containing various software components D16B wherein the software architecture D10 comprises a command handler D50, an update handler D48 and an internal communications network layer interface D52 for interconnecting the software architecture D10 to the internal communications network software operating layer D14A, which creates and sends data over the communications network D14 of the household appliance D12. Also shown is an example of how other software components D16B within the software operating environment D16A would invoke on and interact with the components of the software architecture D10 (50, D52, and D48).

In order to create a more generic implementation of the software operating environment D16A, dependency upon the UI Manager, which is one of several software components D16B within the software operating environment D16A, can be eliminated. In this implementation, a main controller software component D16B executes the invocation onto the command handler D50. It was previously believed that the previous implementation afforded more accurate and robust performance of the software architecture D10 due to the particular timing details associated with the execution timing associated with the UI Manager software component D16B.

To define the first level of detail for the software architecture D10, three main software components D16B (sub-components) are shown: the update handler D48, the command handler D50, and the internal communications network layer interface D52. The update handler D48 interacts with the DAQ engine D30 in order to identify information flagged for updates within the operation of the DAQ such that the internal communications network layer interface D52 can process said information resulting in interaction with internal communications network software operating layer D14A resulting in a packet structure D24 transmitted onto network D14. The command handler D50 validates and processes incoming commands from the internal communications network layer interface D52 invoking onto the appropriate software operating function according to the Identifiers API Id and Op Code values of packet structure D28. The internal communications network layer interface D52 is meant to decouple (as much as practicable) the particulars of the software architecture D10 from the internal communications network software operating layer D14A, the network D14 of FIG. 79, and the packet structure D24 of FIG. 82. The internal communications network layer interface D52 interfaces with the internal communications network software operating layer D14A, which creates and sends data according to the definition of FIG. 82 over the communications network D14 of the household appliance D12.

Software operating layer sub-components D48, D50 and D52 of the software architecture D10 shown in FIG. 79 work together to manage communications with other components D16 or clients D22 which also have the software architecture D10 or an alternative capable to interact with packet structure D24.

Figure 114:
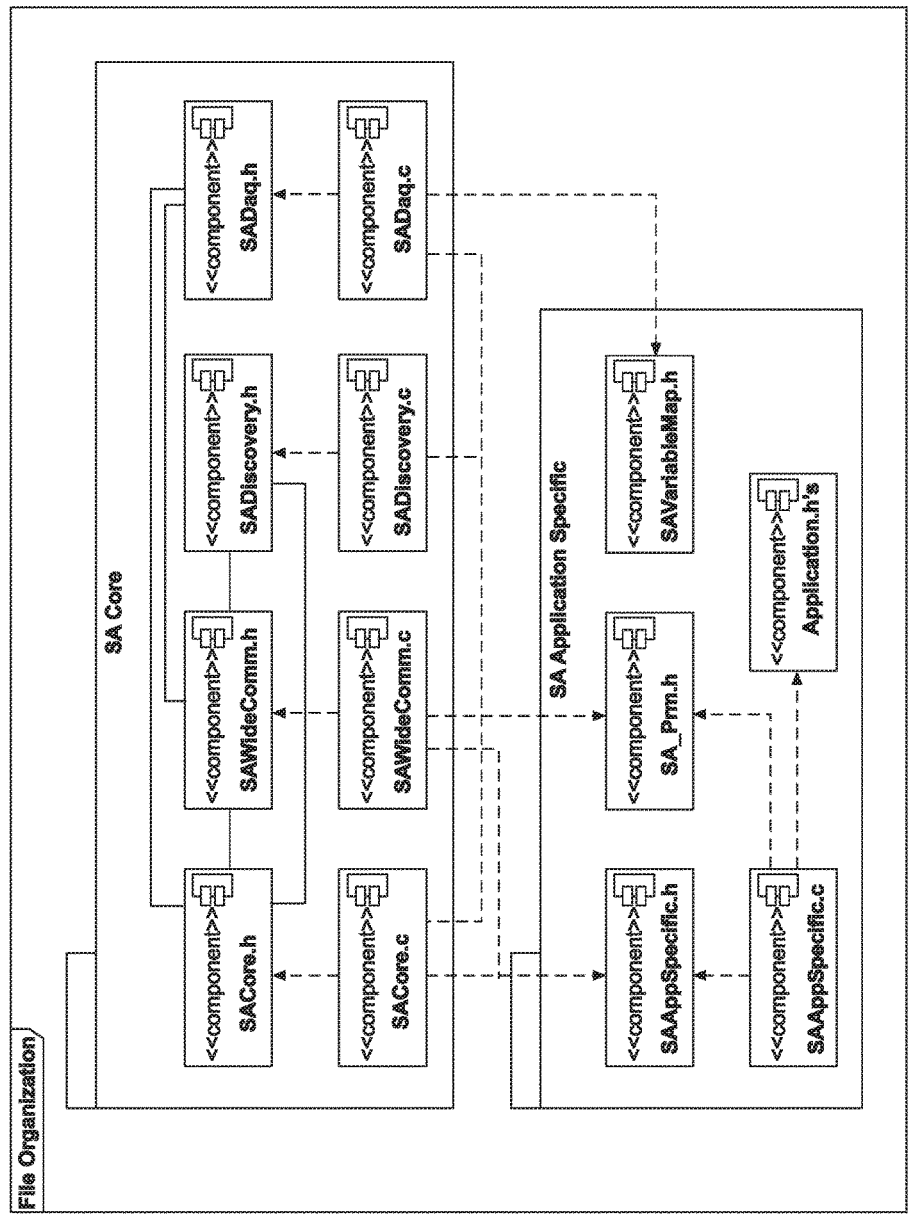
FIG. 114 shows the preferred organization of source code files of the SA.

FIG. 114 shows several implementation files which are contemplated for use with this disclosure.

SA_prm.h.

The software architecture D10 includes configurable parameters and command enumerations.

SACore.c/.h.

This file for the software architecture D10 core software contains the update handler D48 and command handler D50 which processes commands, manages flow control feedback, and takes snapshots of appliance data for dynamic updates.

SAAppSpecific.c/.h.

This file for the software architecture D10 core software contains appliance-specific command handlers and command implementations for driving a particular type of appliance D12 (such as a file specifically directed for management and communication with a washing machine, for example). Any command that is not generic to all appliances D12 is implemented in this function. These commands are enumerated in SAprm.h and are called by the command handler.

SAWideComm.c/.h.

This file contains the internal communication network D14 application layer D52 which provides the interface to the internal communication network D14 protocol and controls bounding of messages into snapshots, parsing incoming commands, and processing update flags to send out update messages.

SADaq.c/.h.

These files contain all functionality for the DAQ engine D30. Thus, all functionality concerning the update handler D48 and eventing is contained here.

SADiscovery.c/.h.

These files contain all functionality for a node implementing the software architecture D10 to discover other nodes (and the corresponding functionality of) other nodes which implement the software architecture D10.

SAVariableMap.h.

This file contains the embedded variable map which allows for event creation by an external client without knowledge of a variables address in memory.

FIG. 89 illustrates an example interface of the software architecture D10 with an appliance control where the software architecture D10 of FIG. 79 is thrice invoked from the supervisory scheduler (MAIN) according to this disclosure. Also shown is MAIN's invocation onto WIDE.WideExec( ) WIDE.WideExec( ) subsequently calls back onto the software architecture D10 according to FIG. 113 where the component of the software architecture D10, WideCommHandler, exposes functions. SA_AcceptData( ) and SA_BuildData( ). Also shown is MAIN's invocation onto SA_WideComm( ) (also a function exposed by a component of the software architecture D10) which ultimately results in the invocation shown in FIG. 113 onto the function WIDE.QueueMsg( ) of the component WIDE of the software operating environment D16A.

Figure 91:
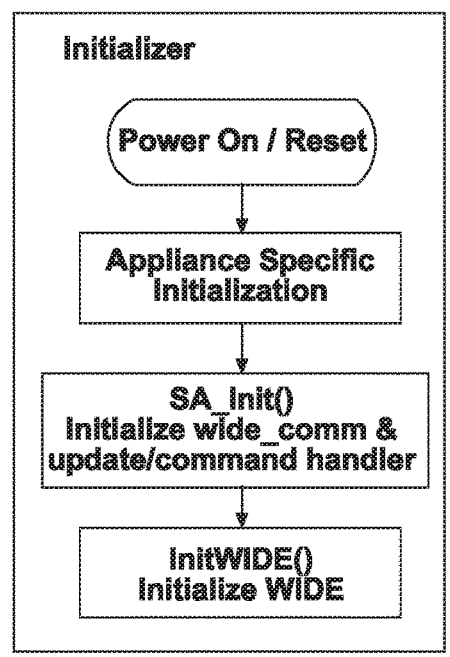
FIG. 91 is a schematic illustration of the example implementation of the software architecture shown in FIG. 89 including an appliance initialization section.

FIG. 91 is a schematic illustration of the example implementation of the software architecture shown in FIG. 89 including an appliance initialization section. The initialization function calls SA_Init( ) from an initialization routine before entering the main execution loop shown in FIG. 89.

The table following this paragraph illustrates a documentation example of how APIs will be managed, including the mechanism of Compiler Directives to control the deployment of the functionality exposed through the APIs of the software architecture D10.

| API Name | API ID | Type | Version | Compiler Directive | ROM Use | RAM Use | Notes |
| --- | --- | --- | --- | --- | --- | --- | --- |
| CORE | 1 | 1 | 2 | SA_COR | 1810 | 43 | Based on 30 dynamic events registered |
| Data Acquisition (DAQ) | 2 | 1 | 2 | SA_DAQ | 1658 | 373 | Based on 30 dynamic events registered (10 bytes RAM/event) |
| Data Acquisition Extended (includes SA_DAQ) | 2 | 2 | 1 | SA_DAQ_EXT | SA_DAQ + 1064 | DAQ | Based on 30 dynamic events registered (includes SA_DAQ) |
| Discovery | 3 | 1 | 1 | SA_DISC | 516 | 3 | |
| Debug | 4 | 1 | 1 | SA_DEBG | | | |
| Low Level | 5 | 1 | 1 | SA_LOLV | | | |
| Key Press | 6 | 1 | 1 | SA_KEPR | | | |
| Memory - Port API | 7 | 1 | 1 | SA_PORT | 342 | 0 | |
| Energy Management | 8 | 1 | 1 | SA_ENGY | | | |

-continued

| API Name | API ID | Type | Version | Compiler Directive | ROM Use | RAM Use | Notes |
|---|---|---|---|---|---|---|---|
| GMCL | 9 | 1 | 1 | SA_GMCL | | | |
| Poll Variables | 10 | 1 | 1 | SA_POLL | | | |
| Service and Diagnostics | 11 | 1 | 1 | SA_DIAG | | | |
| Unused (140-240) | | | | | | | |
| Non-Standard (241-245) | | | | | | | |
| Reserved for API Instance Id (246-255) | | | | | | | |

In the above table, API Ids in the 241-254 range can be used without consideration for standards. They are intended to allow a designer the flexibility to use the software architecture D10 in an application where the expectation of re-use is minimal. In such cases, this will eliminate the need to develop a specific API Id and Type for a collection of messages which are expected to be a 'one off'. These Ids can also be used for candidate standard APIs which have not yet received their official ID. Additionally, in the above table, the RAM and ROM estimates are taken using Motorola HCO8 Cosmic Compiler version 4.3f with the software architecture D10 configured to have D30 dynamic events allowed (i.e., heap size=D300 bytes), D7 APIs defined, and a maximum command size of D15 bytes.

Returning to FIG. 55 is a schematic illustration of a virtual router incorporating the software architecture of FIG. 79 according to this disclosure showing a mapping between a pair of software architecture implementations. The virtual router of FIG. 55 is a software design which encapsulates the API implementations (objects, see APIs D1-8 in each side of the router of FIG. 55) of the software architecture D10 such that the collaboration between an embedded client (application logic, algorithms, closed loops, sequencers, and state machines) and embedded components (the software architecture D10 API implementation: objects like defrosters, heaters, temp sensors, valves, etc.) is uniform and identical regardless if the entities collaborate over the network or share a runtime environment.

Returning to FIG. 92, FIG. 92 shows six unique collaboration examples labeled as such illustrative of how a pair of software operating environments D16A existing on separate hardware components D16 and connected by a network D14 will use the various software components D16B of the software operating environment D16A to create transparent access between the operating logic of application logic D59, which is part of each software operating environment D16A of each component D16, and the software components D16B of both the right hand and the left hand software operating environments.

Prior to describing the collaboration examples, a description of the structure of FIG. 55 should aid in the understanding of the collaboration examples. Each software operating environment D16A contains representations of a subset of useful software operating components D16B, including the software architecture D10, internal communications network layer interface D52, a sub-component of the software architecture D10, the DAQ D30, and a hardware abstraction layer D80.

The hardware abstraction layer D80 comprises a mechanism to encapsulate the particular fixed address of the connected electrical circuits on which the software operating layers of the hardware abstraction layer D80 will operate. The hardware abstraction layer D80 uses software interfaces (28, D28A, or D82) to encapsulate occurrences of D16B in the form of one of the following: the packetized representation (an ordered collection of bytes) of a message in the form of application packet structure D28 exchanged by the software architecture D10, the packetized representation (an ordered collection of bytes) of a message exchanged by the software architecture D10 representing only the packet structure D28A (the valid data arguments) expected by the software operating component D84 or D86, or an alternate representation D82 of either application packet structure D28 or packet structure D28A where the intent and data values and resultant actions are functionally identical but not of the form of an ordered collection of bytes. The alternate representation D82 is in the form of a unique software function having arguments represented by individual named variables whose value are derived from D28A or represented by an ordered collection of bytes derived from D28A.

Application GDMs D84 are variants of software components D16B known as global design modules which are standard software operating components having been subjected to a standard development process including functional and non-functional requirements, testing, documentation, and implementation guidelines. Application GDMs D84 address appliance specific concerns such as defrosters, heaters, door closure. Application GDMs D84 can be classified in at least two variants. The first variant contains specific application logic apart from the application logic D59 used to govern the behavior and gather information from a collection of other software operating components including a plurality of other GDMs D84, D86. The second variant contains specific application logic apart from the application logic D59 used to govern the behavior and gather information from a specific electro-mechanical device or sensor such as a heater, evaporator, motor, valve, solenoid, relay, pressure or temperature sensor. The second variant can be configured to address specific concerns made relevant by the specific manufacture's variant of the device, by the particular configuration of the device based on the usage mode determined by the application requirements (i.e. scaling values), or by a confluence of factors which create specific concerns not mentioned heretofore.

Infrastructure GDMs D86 address specific recurring concerns which are independent of the application of the system architecture of FIG. 79. They can be re-used across a plurality of appliances such as refrigerators, cooktops, dishwasher, dryers, clothes washers, etc. Infrastructure GDMs D86 can be classified in at least two variants. The first variant is associated with a particular concern resulting from a recurring combination of electrical components or electrical constraints. Some examples are: manufacture interface constraints, device duty cycles, electrical load characteristics examples of which are inrush and steady state current limits, or other constraint such as the mode of analog conversion to digital examples of which are 4-20 mA current loops vs. 0-5 Vdc analog voltage feedbacks. The second variant is associated with appliance and application independent software components known as utility functions. They provide logic used by other D16B components including application logic D59 and hardware abstraction layer D80. The second variant may contain or use references to the first variant of the infrastructure GDM D86. Examples include timers, zero cross detection, and other useful software components whose purpose is more utilitarian than driven by application or electro-mechanical requirements.

An embedded virtual router D70 provides an encapsulating layer by which architectural dependencies (the method by which one software component D16B is accessed by or exposed to another D16B [examples of D16B are D30, D84, D86] within or between at least two software operating environments connected by the network D14 alone or a combination of network D14 and other networks) between the application logic D59 (of the software operating environment D16A of the component D16) and the components comprised by the hardware abstraction layer D80, DAQ D30, another instance of application logic D59 or component therein, or any other useful component D16B are minimized or eliminated.

A software component D72 used by other software components D16B to obtain references to any other software components D16B where the referenced software component D16B may be part of a software operating environment D16A existing in or on: the same hardware component D16, a different hardware component D16 connected by the network D14, an external client D22 connected by a combination of network segments including the network D14, or a different hardware component D16 of a different appliance D12 connected by the network D14 or a combination of different network segments between the two appliances D12 and the network D14 of the first appliance D12.

The software component D72 also provides the mechanisms for other software components D16B residing within the same software operating environment D16A to publish the necessary identification and/or routing information into the memory of D72 such to enable the aforementioned enumerated uses of D72. The identification and routing information may be associated with components residing within the same software operating environment D16A or the identification and routing information may be associated with components apart from the components residing within the same software operating environment, but are known by components residing within the same software operating environment.

Structures D74 in the memory of D70 are able to receive messages or provide functions for invocation of messages and are able to send messages or provide callback functions for the distribution of information. These structures having an access definition of D28, D28A, or D82 corresponding to an occurrence of a software component D16B, such as components within D80, D59, or any other useful software component located in the aforementioned enumerations of D72, and the capability to route the information to that software component D16B or to an appropriate intermediate software component D16B having the same or similar purpose of D74.

Looking now at the possible collaboration examples, it is expected that the structures D74 of D70 will be created and populated based on discovery queries containing requests for access to specific software components D16B which are both identifiable and routable, invocations implying said access, or by software components D16B which are able to invoke on D70 on behalf of themselves or other components 16B resulting in creation and population of structures D74.

Collaboration D1: a command is issued by software component D59 of the right-hand software operating environment D16A and received by a software component contained in the collection of D74 with an identifier of API 1 within component D70 of the same software operating environment. Using the identification and routing information contained within D70, the component identified by API 1 transmits the received information through the other local software operating layers D10 and D52, and finally transmitted over D14 and received by D52 of left hand software operating environment. The message is then handled by D10 and routed to the appropriate component within D74 of the left hand software operating environment. The appropriate D74 of the left hand software operating component using identification and routing information contained within D70 of the same software operating component then invokes on or sends the message to the local implementation of API 1 contained in the left hand software operating environments hardware abstraction layer D80. Thus the application logic D59 within software component D16B of the right hand software operating environment invoked a function implemented in the software operating environment of the left hand side without information contained therein for the realization of said invocation. Therefore, the value of the design implied by FIG. 55 is that application logic D59 is re-useable with respect to the location of the of the other software operating components D16B within a plurality of software operating environments D16A connected by a network D14 or a plurality of network segments which may include D14.

Collaboration D2: In this case, the initiation of the message is from D59 of the left hand software operating environment D16A. Illustrated is the case where the final invocation is on a software component (in this case API D2) within the same software operating environment using the same methodology described in greater detail in Collaboration D1. Therefore, in Collaboration D2, an alternative architectural disposition between an occurrence of Application logic D59 to some other useful software component (API 2 of Hardware abstraction Layer D80) is shown to have no effect on the implementation of either. And furthermore, it is the purpose of software component D70, also being able to comply with the Identification and interface requirements imposed by the software architecture D10, to provide this capability.

Collaborations D3-6 show additional uses for the Embedded Virtual Router D70. The mechanisms used to accomplish these variants are the same as described in Collaborations D1 and D2. They are included to illustrate the usefulness of the design and the expected additional message patterns to be available with respect to the DAQ D30. Local event listeners (3) and remote event listeners (4) of Application Logic D59 are provided with an interconnection to a representation of the DAQ engine D30 providing not only a connection to the DAQ in the local software operating environment, but also to the DAQ(s) which reside in remote operating environments. DAQ generated messages based on the occurrence of DAQ events can be transmitted locally (6) and remotely (5) through mechanisms available in D70.

Figure 92:
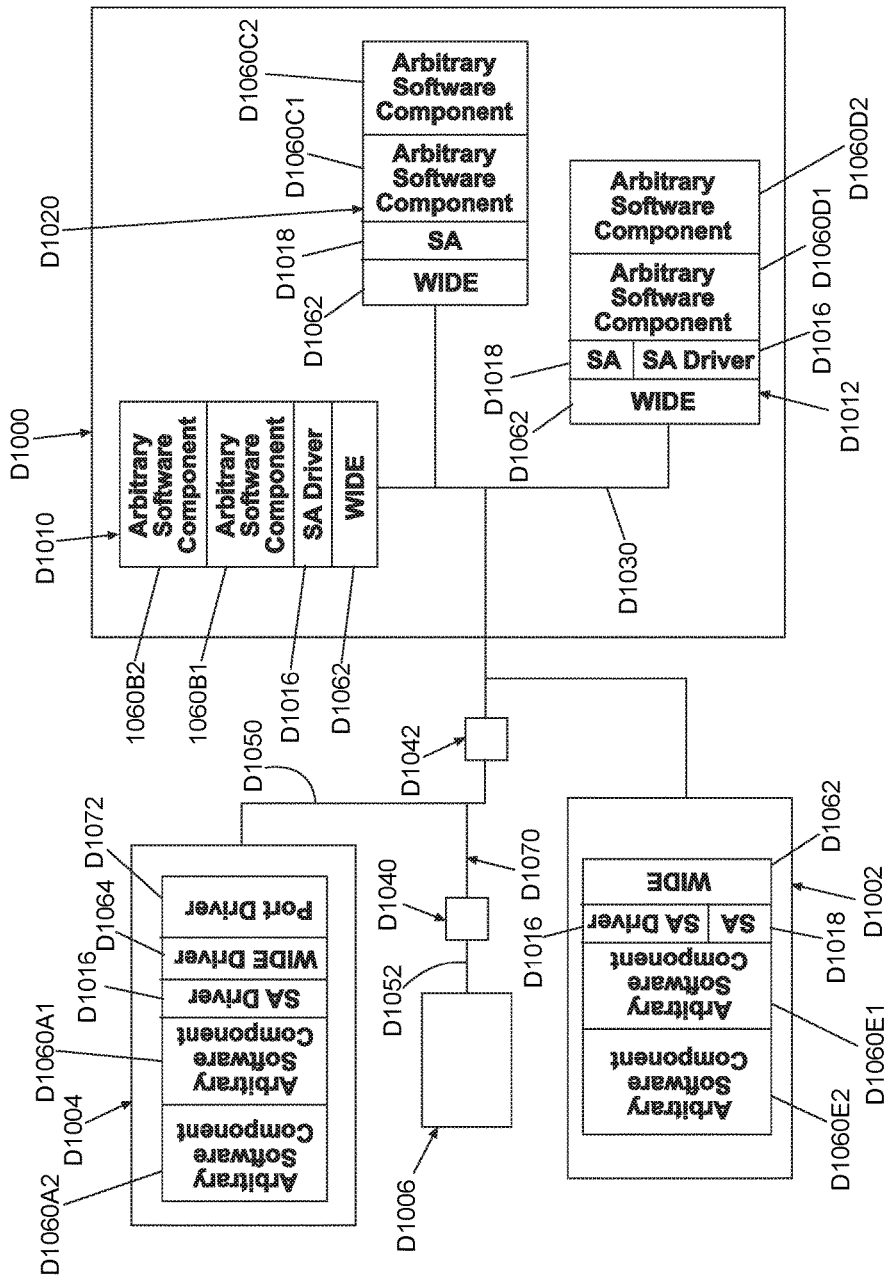
FIG. 92 is a schematic view of a network of appliances and clients connected on multiple networks by couplers.

In an extended application of the embedded virtual router D70 illustrated in FIG. 92, an appliance D1000 is connected to external clients D1002, D1004 and a second appliance D1006 by a plurality of networks. A first network D1030 comprises a first internal client D1010, a second internal client D1012 and the external client D1002. A second network D1050 comprises the external client D1004. And a third network D1052 comprises the second appliance D1006. Each client is characterized as a node on the respective network. Local clients are clients that communicate with nodes on the same network. Remote clients are clients not directly coupled to the same network as the node to which they are communicating. In this embodiment, external client D1004 would be a remote client of the nodes on the first network D1030.

Each client node D1002, D1004, D1010, D1012 comprises a software architecture driver (SA driver) D1016 for exchanging messages with any node having a software architecture (SA) D1018 thereon. The nodes on any given network are in operable communication with the other nodes in that network and are optionally in communication with the nodes present on other networks.

The appliance D1000 further comprises at least one node D1020 having the SA thereon. The second appliance D1006 will also likely have a node with the SA on it, and may have one or more clients as well. The first network D1030 also comprises the node D1020.

Smart couplers D1040, D1042 are special devices that connect to the appliance and/or to a network and/or to two or more networks and communicate therebetween. Each smart coupler can comprise all the functionality of a node, and each node can comprise all of the functionality of a coupler. In the embodiment shown in FIG. 28, the coupler D1040 couples the second network D1050 to the third network D1052, and can function as a node on each network. The smart coupler D1042 couples the second network D1050 to the first network D1030. It could also be considered as coupled to the appliance D1000. A smart coupler can comprise a processor, memory (fixed and/or removable), software, components and circuitry coupled to at least one transmission media. The smart coupler is configured to take information from the memory of its processor and, with the circuitry and components, produce a signal representing that information onto a transmission media. A smart coupler can also comprise a source of power, a GFA sensor, an optoisolation circuit, a converter circuit, an interface expander D324, network health analyzing circuitry and software.

The smart coupler can be used to communicatively couple at least one external client D1002, D1004 to a network of the appliance D12 such that the external client and the appliance D12 can exchange messages therebetween. The external client and the smart coupler can each comprise a network. If desired, multiple external clients can be communicatively coupled to the appliance D12 using one or more smart couplers.

Either of the couplers D1040, D1042 can propagate discovery messages issued by the SA or an SA driver across the networks in order to enable the SA and SA drivers or their coupled arbitrary software components to develop references to identifiers of functionality for the different nodes. Each coupler D1040, D1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers D1040, D1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol D1062, a proprietary appliance network protocol utilized by Whirlpool Corporation. For a client not having WIDE network protocol that needs to communicate WIDE messages (e.g., external client D1004), a WIDE driver D1064 can be used. A port driver D1072 couples the external client D1004 to the network D1050.

Each node can also comprise one or more arbitrary software components. Here, each node is shown as having two arbitrary software components. Thus, node D1004 has arbitrary software components D1060A1 and D1060A2, node D1010 has arbitrary software components D1060B1 and D1060B2, node D1020 has arbitrary software components D1060C1 and D1060C2, node D1012 has arbitrary software components D1060D1 and D1060D2, and node D1002 has arbitrary software components D1060E1 and D1060E2. The SA driver D1016 is a software element configured to allow an arbitrary software component to communicate with the SA D1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver D1016 can receive and at least partially interpret messages from the SA and/or from another SA driver, which are specified as feedback events. In some instances, the SA driver D1016 can also send command messages to the SA D1018. In this respect, the external clients D1002, D1004 can have full capability act as an accessory to communicate with and to enhance or alter the operation of the appliance.

It will be understood that any or all of the external clients D1002, D1004, the couplers D1040, D1042, and the internal clients D1010, D1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of identifiable software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered. The identification information could be raw routing information or could be an identifier which could be used to pull raw routing information out of a routing table. Further the identification information could be an identifier used to get raw routing information from a routing table and other functional identification information out of a routing table. With the ability to create routing tables either by the method of propagated discovery or by a combination of propagated discovery and manual or semi-manual configuration, clients can establish useful communications with other communicating nodes and can rely on the propagated message and the routing table to enable the useful communications without the arbitrary software components of the clients to have knowledge of the routing information required to enable the useful communication.

Where more than one network is connected by a smart coupler, such as couplers D1040, D1042, a message received by the smart coupler from one network can be propagated and sent to the second network. The smart coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e., a sent message that is also received by the sender on a second network to which the sender is coupled.

See, for example, FIG. 55B illustrating a system where resources in an appliance can be monitored, managed, or changed as in the energy controller accessory of FIG. 91. A likely scenario has a coupler D2000 connected to an appliance D2002 by a network D2004. The coupler D2000 also connects to a coupler D2006 via network D2008 that may be a different type of network from network D2004. Coupler D2006 connects to a source D2010 of information about resources used or generated by the appliance D2002 by a third network D2012 that may be a different type of network from either network D2004 or network D2008. Assume that the source D2010 wants to send information about the resource to the appliance D2002. This disclosure enables a node in the source D2010 on network D2012 to communicate with a second node, having SA for example, which may be among several on the appliance D2002. We assume that the source D2010 has at least an appropriate communication driver, or one of the couplers has software to translate any message from the source to the communication protocols of the incorporated PCT/US2006/022420, for example.

In this scenario, the source D2010 sends a discovery message over the network D2012 seeking any consumer of resources to which the source wants to send information. The coupler D2006 receives the discovery message, translates the message, if necessary, and propagates the discovery message to the next nodes over the network D2008, including coupler D2000. Coupler D2000 receives the discovery message, translates the message, if necessary, and propagates the discovery message to the next nodes over the network, including the appliance D2002. The relevant nodes in the appliance D2002 evaluate the message and determine a discovery reply message, and send respective replies. Here, we assume at least one reply is positive.

The discovery reply message is received by the coupler D2000, which populates its routing table and sends it to the coupler D2006, which populates its routing table and sends it to the source D2010 in accord with the foregoing process. Each node retains the relevant identifiers so that subsequent message can be communicated without repeating the discovery sequence. As well, those nodes with memory, such as the couplers, can be configured to save messages.

With this structure, a source of information about a resource such as electricity, hot water, gray water, gas, water, replaceable parts, or other consumables, can request a change in the operation of the appliance based on the information. For example, if an electric utility is facing a brownout, a source of information about the electricity can request that an electric dryer not commence an operation for a period of time. Similarly, a source of consumables, such as filters or spare parts, can ascertain from an appliance the status of the consumable and send information about the timing and availability of replacement.

At least the smart coupler D1042 can hold a routing table constructed from a plurality of discovery confirmation messages. In one embodiment, the routing table holds identifiers from other nodes with each identifiers routing information. In a second embodiment, the routing table holds identifiers from other nodes with each identifier's routing information and with a new identifier that will be used to represent the identifiers from other nodes. The new identifier can be considered a proxy identifier.

In a third embodiment, the routing table can have software function pointers linking the arbitrary software component to the functional identifiers and associated routing information instead of proxy identifiers. As stated previously, nodes can have the same functionality as couplers. This embodiment is an exemplary embodiment where the routing table is coupling an arbitrary software component to another arbitrary software component or to a routing table held by a coupler, or to second arbitrary software component on another node.

In addition to the six collaboration examples, a seventh collaboration example includes first and second arbitrary software components comprised within the application logic D59 where both the first and second arbitrary software components have identifiers and can be identified within the structures D74, which can comprise the routing table. In this collaboration, the first arbitrary software component sends a message to the second arbitrary software component by invoking a software function linked to a plurality of function pointers within the routing table. One of the function pointers of the plurality of function pointers links the message to at least the second arbitrary software component. Likewise, if there is a second instance of the second arbitrary software component residing in the application logic of D16, the first arbitrary software component function invocation may not change. In this case, the plurality of function pointers would include a pointer linking the invocation to routing information contained in the routing table. The routing information is necessary for enabling the message to be routed from the invocation to the receiving second instance of the second arbitrary software component.

It is preferred that the routing tables are populated by one of at least discovery confirmation messages, propagated discovery confirmation messages, manual configuration, semi-manual configuration, hard coded configuration software, and the software compilation process. It should be noted that using discovery messages to populate routing tables is the preferred embodiment. However, routing tables can also be populated using conventional configuration methods involving a manual or semi-manual configuration process, such as with the use of a visual configurator (see, for example, FIGS. 53 and 54 used for another purpose). In addition, a manual or semi-manual configuration process can be used in addition to discovery generated routing tables. In this approach, the discovery process or the configuration process can incrementally add or delete routing information within a routing table.

The various techniques described above with respect to the use of the embedded virtual router D70 can also be applied in a variety of other network configurations in order to enable communication between objects in the system. Examples include but are not limited to enabling communication between two different arbitrary software components within an application logic D59, an arbitrary software component of an application logic D59 and an arbitrary software component of a hardware abstraction layer D80, any arbitrary software component of a first processor and any arbitrary software component of a second processor on the same component D16, any arbitrary software component of a first processor and any arbitrary software component of a second processor on different components D16 within an appliance D12, any arbitrary software component of a first processor and any arbitrary software component of a second processor on different components D16 in different appliances, any arbitrary software component of a first processor and any arbitrary software component of a second processor on different computers where the computers can be dislocated from one another but coupled via a network.

It should be understood that the arbitrary software components above are preferably associated with an identifier associated with the functionality of the software component (a class) and with an arbitrary identifier used as an object handle. A comprehensive namespace can contain unique identifiers for each arbitrary software component on the system. An exemplary namespace can create identifiers comprising a class ID including of an API ID, an instance ID, and a type ID; and an object ID comprising a node ID and an instance ID. Other namespaces can use any desired combination of identifiers to give each arbitrary software component a unique identifier.

Figure 93:
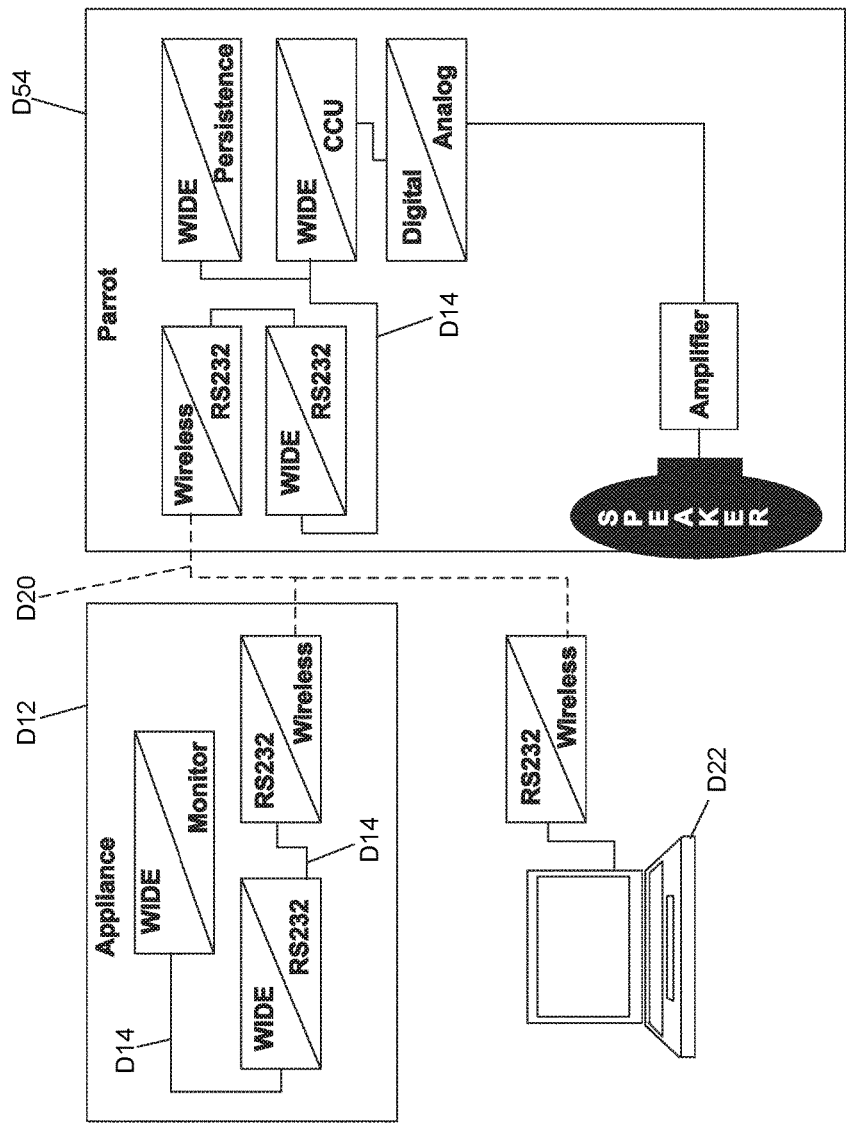
FIG. 93 is a schematic illustration of a persistence node exposed to other components within the Parrot Appliance via network D14 and supporting packet structure D28 of the software architecture D10 of FIG. 79 according to this disclosure.

FIG. 93 is a schematic illustration of a persistence node D54 incorporated within the software architecture of FIG. 79 according to this disclosure. Whereas the state of the art in embedded systems is to provide data persistence local to the PCB, the persistence node according to this disclosure provides a persistence service exposed to components D16 and D22 through the mechanisms of the software architecture D10 and/or the embedded virtual router D70.

Various examples of the connectors and protocols (RS-232, wireless, WIDE, etc.) are shown within the components of each client which communicate with one another along an internal network on each component D16, appliance D12 and persistence node D54. In summary, the persistence node D54 is a logical entity which is discoverable and useable by all components D16 sharing a network D14, D20 or a runtime connection. This entity will provide services and protocol mechanisms necessary to read, write, and store information.

As discussed above, appliances D12 are "state" driven machines and typically have a user interface (e.g., a keypad) using which a user can effect a change in state of the appliance D12 (e.g., change a washer from an idle state to a "wash" state). As applications are developed that require external communication with an appliance D12 (e.g., testing, diagnostics, remote control, etc.), there are three possible techniques to perform this interface: (1) translate external commands into key presses (see FIG. 94 and discussion); (2) use custom software to execute state-change commands (see FIG. 94 and discussion); or (3) simply translate key presses into a logical API (see FIG. 95 and discussion).

Figure 94:
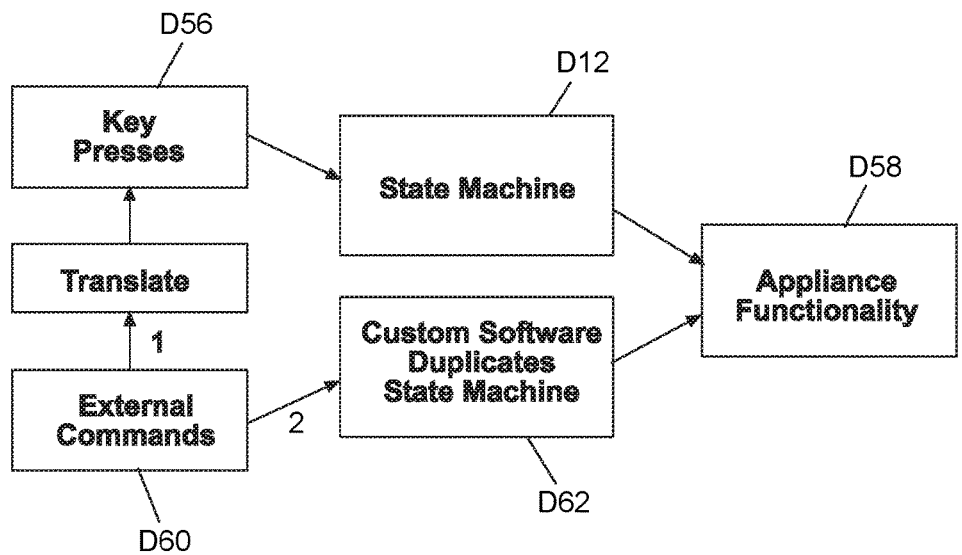
FIG. 94 is a schematic illustration of a prior art method by which external commands are translated into key presses for testing household appliance functionality.

FIG. 94 is a schematic illustration of a prior art method by which external commands are translated into key presses for testing household appliance functionality. In the prior art method, a user would actuate an appliance D12 via one or more key presses D56 to change the state of the appliance (referred to in FIG. 94 as a "state machine" D12) to affect the appliance functionality D58. In order to test the functionality D58 of the appliance, the user would prepare external commands D60 and either (1) translate the external commands D60 to key presses D56; or (2) prepare custom software D62 which would emulate the state machine appliance D12 to attempt to duplicate the appliance functionality D58. This can be difficult and error prone.

Figure 95:
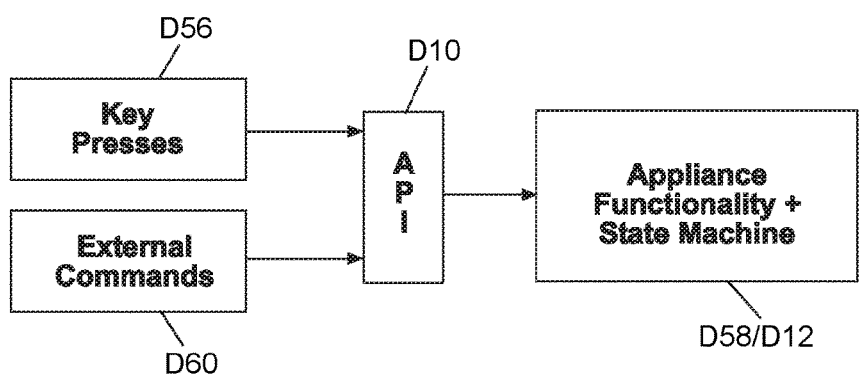
FIG. 95 is a schematic illustration of the interaction of user-initiated key presses and externally-fed software commands are passed as arguments to the SA for issuing commands to a household appliance to, e.g., test household appliance functionality and/or change the state of the household appliance machine.

In an new method of operating and testing an appliance, FIG. 95 is a schematic illustration of the interaction of user-initiated key presses D56 and externally-fed software commands D60, typically from a client, are both passed as arguments to the software architecture D10 of FIG. 79 according to this disclosure for issuing commands to a household appliance D12 to, for example, test household appliance functionality D58 and/or change the state (i.e., actual operation) of the household appliance D12.

The method discussed with respect to FIG. 95 is novel because, instead of translating external messages, treating the appliance D12 as a closed system, it exposes the functionality of the appliance D12 independently of whether the message is received as an external key press or a software command local or remote to the appliance D12. The messages (commands) are processed through an API of the software architecture D10 (now an open system as opposed to the prior art "closed" system), while preserving key-press validation and feedback to the user.

Currently, appliance control software is not set up to validate and execute external commands. To remedy this, an appliance API is defined that includes both user functionality as well as low-level machine control commands. During normal operations, when a key is pressed or an external command is issued, it is directly mapped to an user functionality API function call as a common entry point (e.g., a WASH key is pressed on a user interface [keypad] or an external WASH command is issued will both call a setCycle (WASH) function immediately, regardless of the state of the appliance D12). All validation and state-based behavior will exist inside this function so that external commands are treated the same end execute the same code as key presses D56.

This API can be implemented without a major redesign of appliance control software. Only a user interface software would need to be reorganized to call API functions as the entry point for any command instead of just reacting to key presses inside of the state machine D12. Use of this method of FIG. 95 enables the manufacture of an appliance D12 to test and diagnose the keypad/user interface separately. This saves time and effort in development, diagnosis and testing of appliances. This will also eliminate the need for complex mechanical keypad actuation devices as well as mechanical actuation harnesses which were conventionally used to test user interfaces and appliance functionality.

In addition, the appliance D12 API contains a command to send the appliance into a diagnostic or factory test mode. In this mode, all state-based behavior and command validation code is disabled to allow for a low-level API. API commands in this mode can access and control low-level parts of the appliance D12 such as reading and writing to EEPROM, pressing keys (56), reading sensor values, writing to cycle parameters, actuating relays and other actuators, etc.

The API interface discussed with respect to the software architecture D10 is an object-oriented software package that is effective when one object (appliance functionality) has multiple clients that need to interact with it (e.g., both key presses D56 and external commands D60). This is a new approach because appliances do not currently contain object-oriented software and are generally thought of as being a closed system and having only one client: user interface keys. This disclosure contemplates that appliances D12 will have many clients through the introduction of an internal communication bus (i.e., network D14) and external connectivity D20. These clients may include web applications, diagnostic tools, testing tools, and home automation systems, among others.

Appliances D12 with the API software architecture described herein will be "future proofed" and ready for many advanced remote applications that customers may request. These can include energy management, improved service and diagnostics tools, and remote control and monitoring. In addition, since the API is the entry point into all appliance functionality, customers can benefit from improved automated development testing and factory testing of appliances D12.

The software architecture D10 also contemplates that the virtual device model can be aware of the current capabilities of the physical device (the appliance D12). For example, if an oven is baking, the appliance clock cannot be modified. Capabilities synchronization is a general solution meant to allow a virtual model to recognize changes to the capabilities of a device based on its state.

Currently, this purpose is achieved through code which is written per appliance D12. The solution contained in the software architecture D10 replaces device specific code with a general solution. This solution is comprised of additional messages which the software architecture D10 broadcast containing the current set of invalid commands (API and Op Code). This information is evaluated at runtime so that the user interface will be expressed in such a way that the user may only modify those device characteristics which are modifiable, so that the customer is not given the opportunity to modify a device characteristic which is currently immutable as dictated by the actual device.

The software architecture D10 is a cross-product system of applications and tools. These applications help to increase both quality and speed to market in the product development process. This is done by interacting with the data that is stored in memory inside the appliance D12.

In order to stay flexible, configurable and generic, the applications interact with the appliance by specifying numeric memory locations (addresses) which are required. Each time the software in the appliance changes, however, these locations in memory can move around and take on a very different meaning. In order to solve this problem, a variable map file standard and generator were created.

The variable map file generator takes the software names (textual descriptions) written in code and associates them with the numeric address and size of that piece of data. It then outputs this information in a standard file format. This is executed each time the code is changed and compiled. The information in this standard file provides independence from both the compiler and from where data is located in memory.

The variable map file is then read by any application that wants to interact with a software architecture D10-based appliance D12. Applications are coded against the meaningful textual names of data, rather than the numeric addresses of data which greatly simplifies application development.

The variable map file format and usage process are described in the table below.

| Module | Variable Name | Address | Size |
| --- | --- | --- | --- |
| appman.h | Hour_Timer | 0213 | 1 |
| appman.h | Zone1 | 020e | 3 |
| appman.h | Zone1.Act_Temp | 0210 | 1 |
| appman.h | Zone1.Zone_State_Tmr | 020f | 1 |
| appman.h | Zone1.Zone_State | 020e | 1 |

An example of the method used in working with the variable map concept includes the following steps.

1. An engineer builds an application coded against the textual descriptive names of meaningful data located in the appliance control.

2. The appliance control code changes, resulting in new locations of the meaningful application data.

3. An engineer compiles the new appliance code, which also automatically generates an associated variable map file. The new code and variable map file are deployed together.

4. When the application is run against the new code, it does not have to change, as long as it has the proper variable map file.

5. If new data is required by the application, it can be easily identified or retrieved from the variable map file.

Thus, as shown above, the development engineer need only remember the "Variable Name" column in the table above, and not need to constantly look up the constantly-changing address values in the "Address" columns above.

Figure 96:
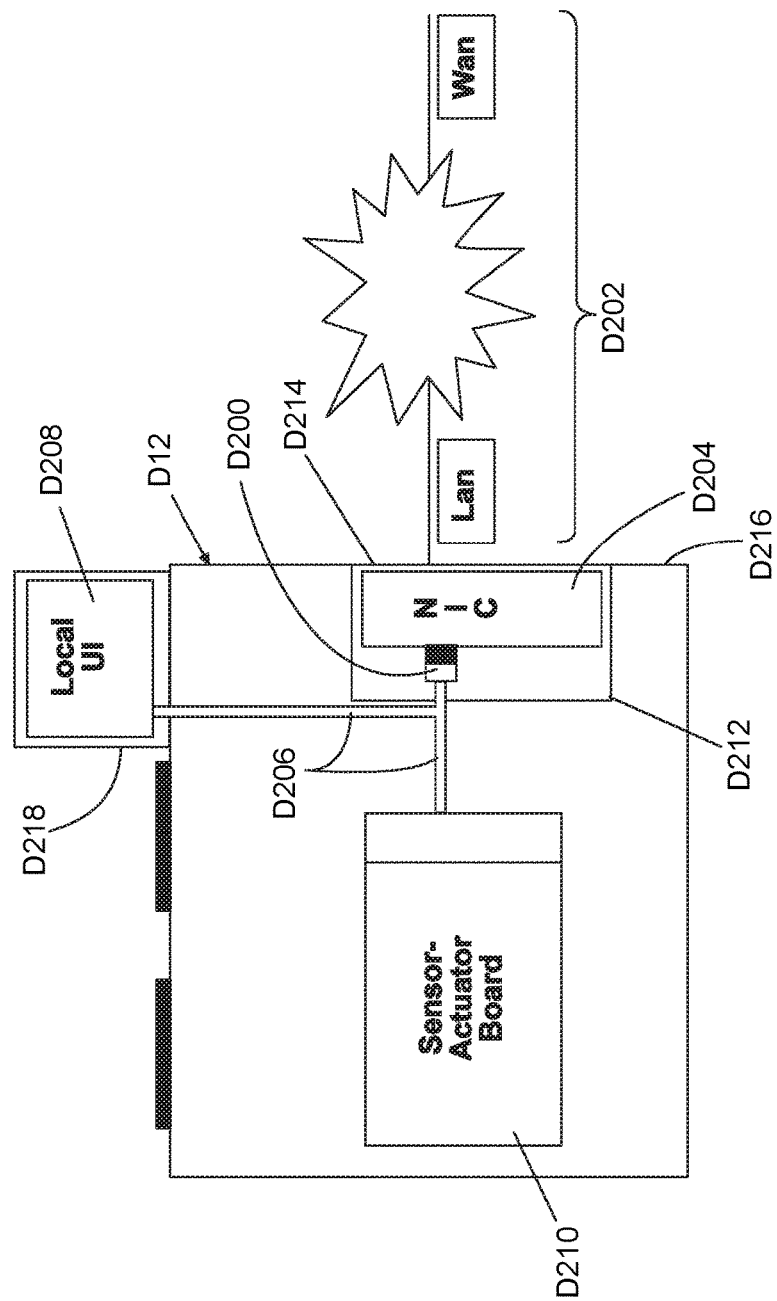
FIG. 96 is a schematic illustration showing mounting of a NIC in a recess formed in a rear side of the appliance.

Referring to FIG. 96, the household appliance D12, which is shown as an oven for exemplary purposes, having an internal communication bus D200 can be electrically coupled to an external network D202 through a network interface card (NIC) D204 similar to the aforementioned network interface connector D20. A NIC is a well-known device that connects a computer or other client to a network, and any suitable NIC can be utilized with the appliance D12. According to one embodiment of this disclosure, the NIC D204 is electrically connected to the internal communication bus D200 and adapts an internal communication bus protocol to a standard communication protocol, such as TCP/IP and GSM, so that the appliance D12 can communicate with an external client (not shown) through the external network D202, such as a local area network (LAN) and/or a wide area network (WAN). Thus, the external client can communicate with the software architecture D10 associated with various internal components of the appliance D12 that reside on the internal network D14. For example, the appliance D12 in FIG. 96 is shown as comprising a user interface (UI) D208 and a sensor-actuator board D210, each comprising a printed circuit board (PCB) with the corresponding software architecture D10, and the external client can communicate with the software architectures D10 through the NIC D204.

The NIC D204 can be mounted to the communication bus D200, which is preferably externally exposed, of the appliance D12 through any suitable mounting means, as is well-known in the computer network art. According to one embodiment of this disclosure, the communication bus D200 is located in a recess D212 defining an opening D214 that is flush with a wall, such as a rear wall D216, of the appliance D12, as shown in FIG. 96. When the communication bus D200 is located within the recess D212, the communication bus D200 and the NIC D204, when mounted to the communication bus D200, are protected from damage that can occur during transport of the appliance D12.

The NIC D204 can be supplied with the appliance D12 at the time of manufacture or can be purchased separately from the appliance D12 as an accessory. Thus, a customer can choose to purchase the appliance D12 without the capability to connect to the external network D202 and upgrade the appliance D12 at a later time to add connectivity, if desired.

Figure 97:
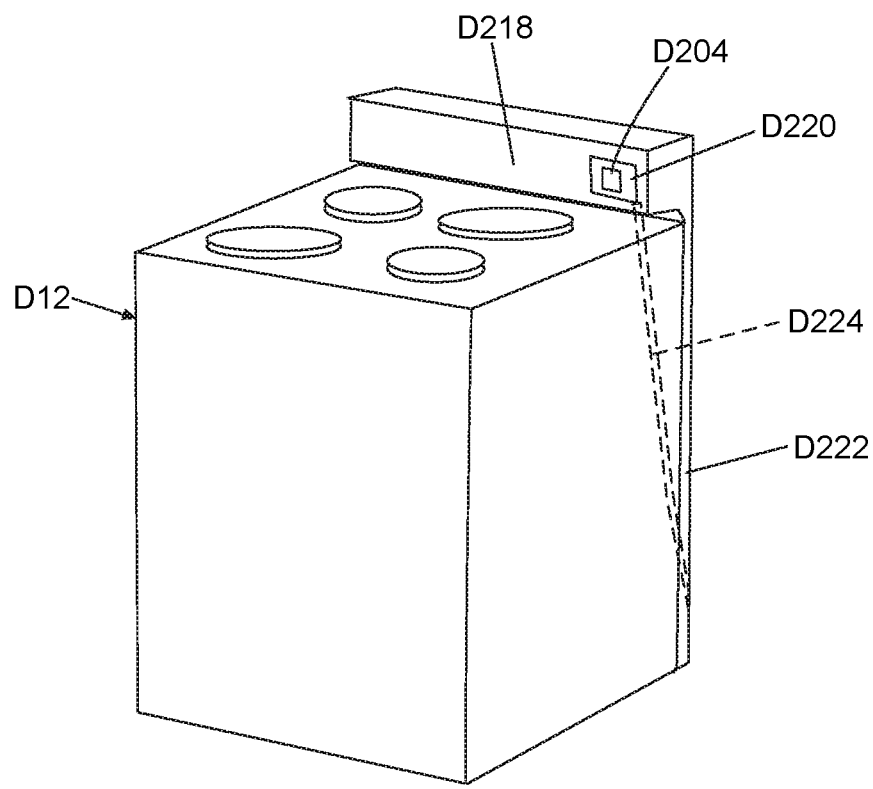
FIG. 97 is a schematic illustration showing mounting of the NIC to a front side of the appliance and a wiring conduit extending from the mounting location of the network interface card to the rear side of the appliance.

The NIC D204 can communicate with the external network D202 through a wired connection or wirelessly. For example, the NIC D204 can communicate with the external network D202 via wireless infrared (IR) communications or other short range wireless means. In such situations, the NIC D204 is preferably mounted to a front side D218 of the appliance D12 to facilitate robust communication. According to one embodiment of this disclosure, the NIC D204 can be mounted in a recess D420 at the front side D218 of the appliance, as illustrated in FIG. 97 with respect to an oven, for example. When mounted to the front side D218 of the appliance, the NIC D204 can be connected to a rear side D222 of the appliance via wires disposed in a wiring conduit D224 that extends from the mounting recess D420 at the front side D218 to the rear side D222 of the appliance D12, where the wires enter the appliance D12.

Figure 98:
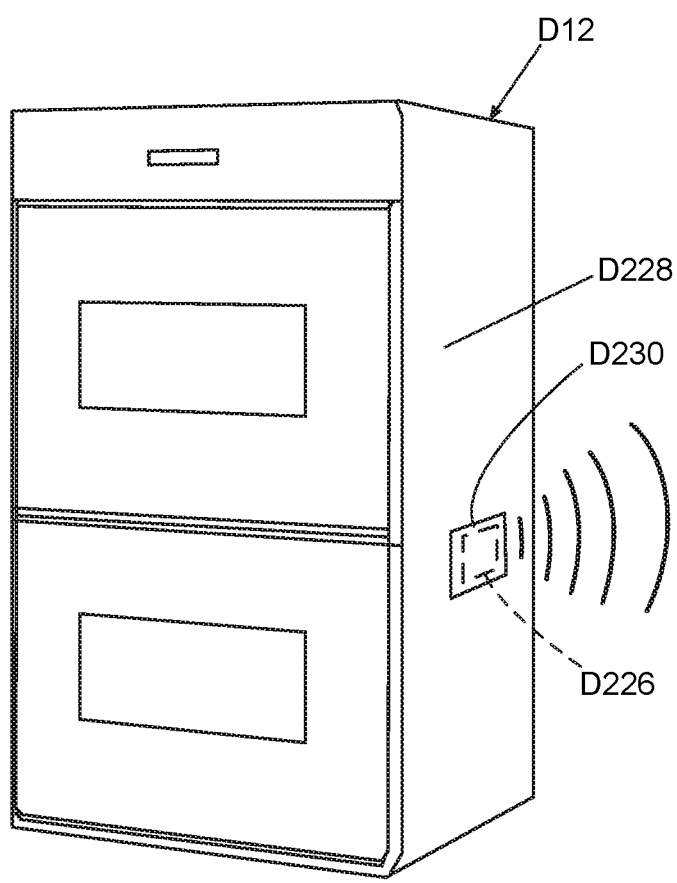
FIG. 98 is a schematic illustration of the appliance comprising a safety barrier that allows communication from an RF PCB located in the appliance and prevents human contact with excessive heat and/or electricity.

Another example of wireless communication is radio frequency (RF) communication. For example, a RF printed circuit board (PCB) D226 can be located inside the appliance D12, which requires connection between the RF PCB D226 and an externally mounted antenna. Alternatively, the RF PCB D226 can be mounted externally of the appliance D12, but this configuration requires an electrical connection between the RF PCB D226 and appliance control electronics, and an installer must open a cabinet or case D228 of the appliance D12 during installation of the RF PCB D226. According to one embodiment of this disclosure, the RF PCB D226 is mounted within the appliance D12, and a non-metallic safety barrier D230 that is a poor conductor of heat and electricity is provided as part of the appliance case D228. An exemplary safety barrier D230 is a plastic window, such as a Plexiglas window, integrated with the appliance case D228, as shown in FIG. 98 for an appliance D12 in the form of an oven for illustrative purposes. The safety barrier D230 allows for RF communication with the internally mounted RF PCB D226 without an external antenna and prevents human contact with excessive heat or electricity.

Referring again to FIG. 15, the appliance D12 can be configured with hardware to facilitate service and diagnostics of the appliance D12. In one embodiment, a service module D232 adapted to removably connect with a standard communication bus on the appliance D12 is configured to record diagnostic data, such as by communicating with the software architecture D10 on the internal network D14. The service module can readily connect to the internal network D14. The connection of the service module D232 to the appliance D12 is represented by step 1 in FIG. 15. The service module D232 is then removed from the appliance D12 and connected to a personal computer D234, such as through a USB port or other suitable standard communication bus. The connection of the service module D232 to the computer D234 is represented by step 2 in FIG. 15. After the service module D232 is connected to the computer D234, the service module D232 connects to the Internet, preferably automatically, and uploads the diagnostic data to a remote client (not shown), as indicated by step 3 in FIG. 15. The remote client processes the diagnostic data to identify an appliance problem or failure and potentially prevent a service call or, if the problem or failure requires a service call, to optimize the effectiveness and efficiency of the service call. Optionally, the service module D232 can download customized testing scripts based on the diagnostic data to run tests on the appliance D12 to further diagnose or eliminate the problem or failure. Reconnection of the service module D232 to the appliance D12 to execute the testing scripts is represented by step 4 in FIG. 15.

Figure 99:
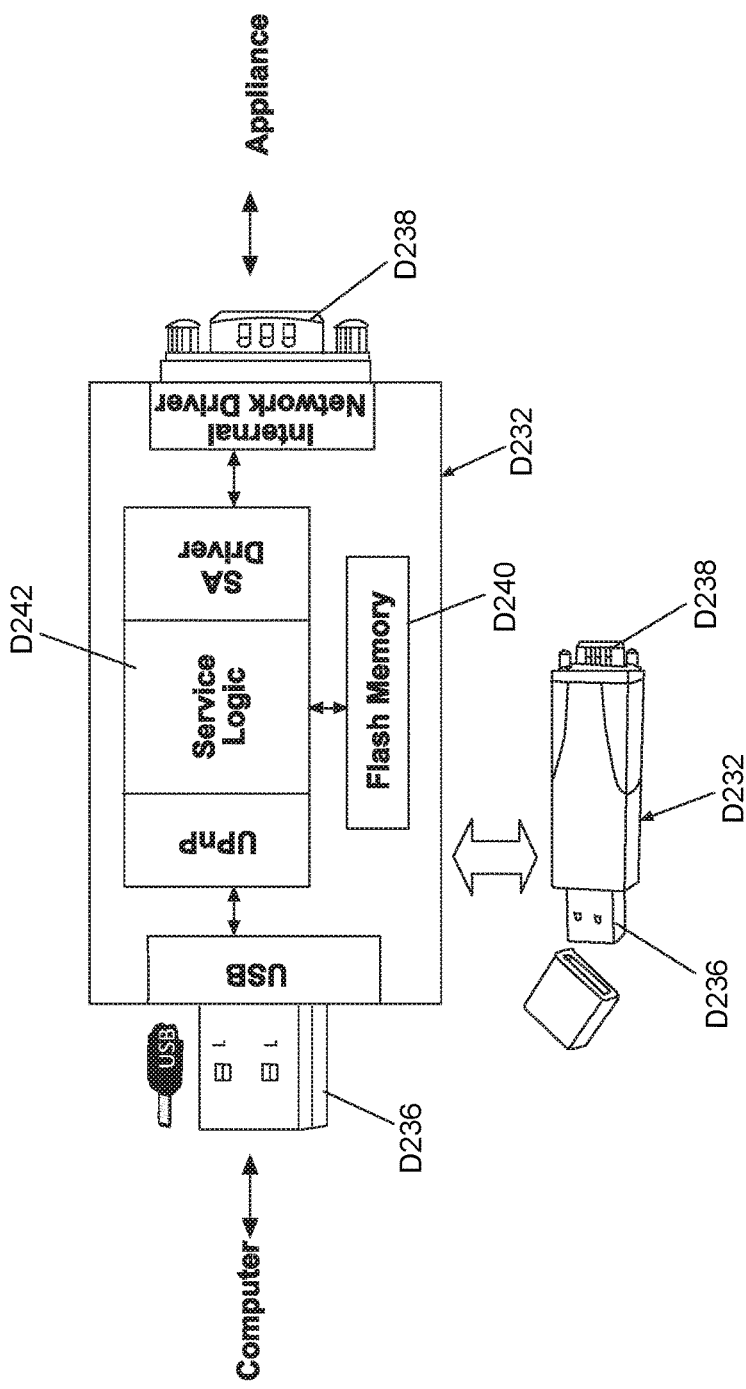
FIG. 99 is a schematic illustration of architecture for the service module of FIG. 15.

An exemplary architecture for the service module D232 is illustrated schematically in FIG. 99. The service module D232 comprises a pair of communication buses, such as external serial buses. According to the illustrated embodiment, the service module comprises a USB D236 at one end for connection to the personal computer and an RS-232 (EIA-232) bus D238 at an opposite end for connection to the appliance D12 and particularly to the software architecture D10 residing on various nodes of the appliance internal network D14. The service module D232 further comprises memory D240, such as flash memory, for storing the diagnostic data, the testing scripts, and other data. The flash memory D240 communicates with a service logic D242 that controls the operation of the service module D232.

Figure 100:
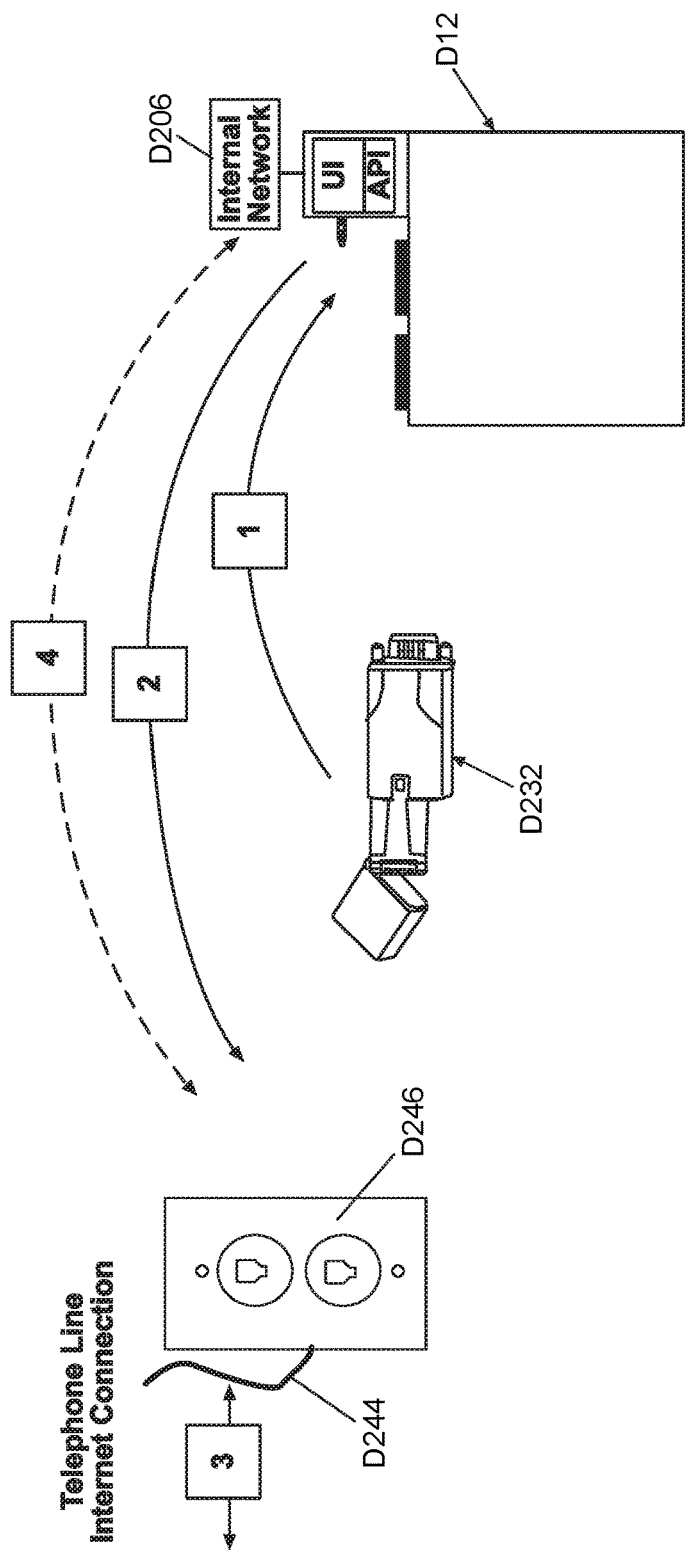
FIG. 100 is a schematic illustration similar to FIG. 15 with the service module uploading the diagnostic data via a telephone line.

FIG. 100 illustrates an alternative hardware architecture for service and diagnostics of the appliance D12. This architecture is similar to that shown in FIG. 15, except that the personal computer D234 is replaced with a telephone line D244, and the service module D232 is adapted for connection to the telephone line D244. Thus, the alternative architecture of FIG. 100 is more suitable for appliance users who do not own a personal computer or do not have a personal computer connected to the Internet. The process for obtaining diagnostic data is the same as described above with respect to FIG. 15; however, rather than connecting the service module D232 to the personal computer D234, the user connects the service module D232 to a standard telephone jack D246, and the service module D232 automatically connects to the Internet through the telephone line D244.

Figure 101:
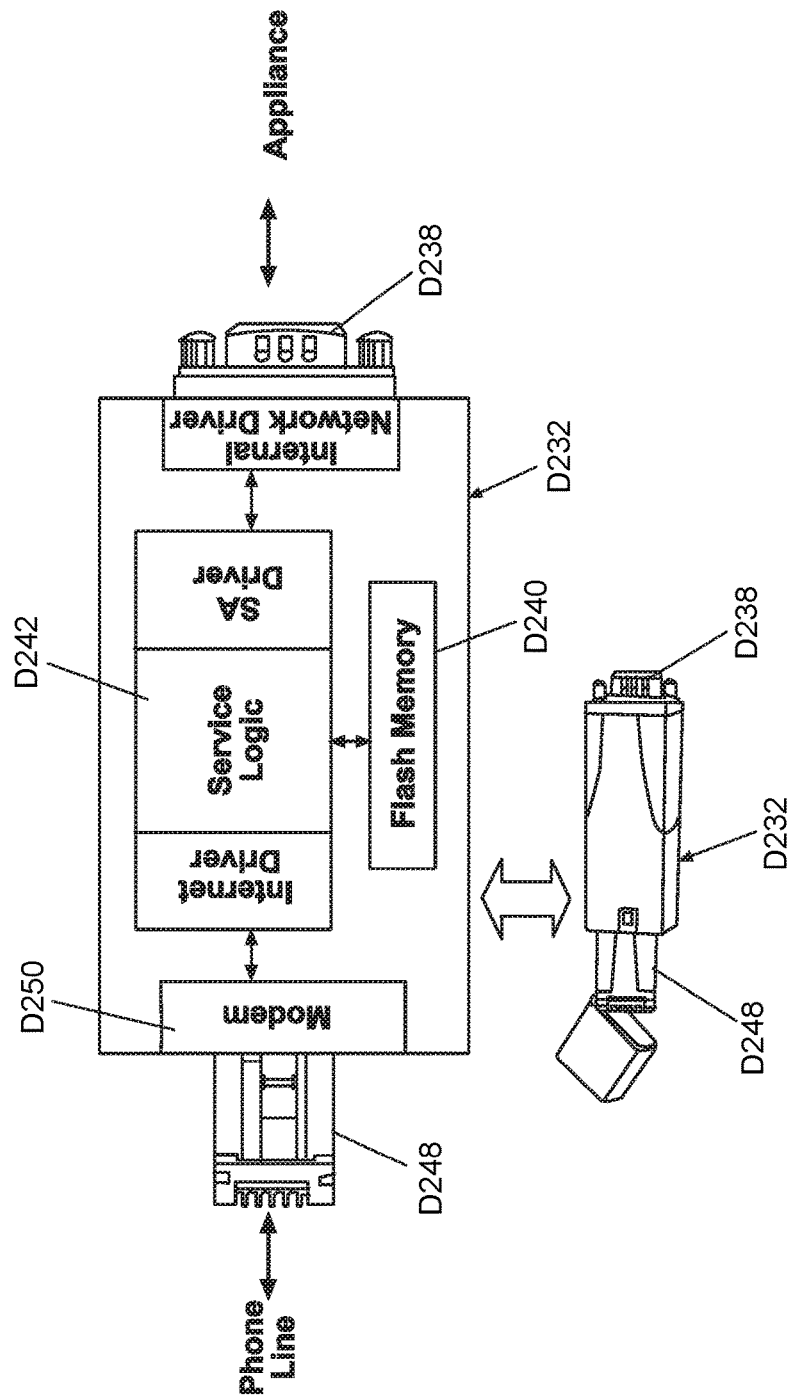
FIG. 101 is a schematic illustration of architecture for the service module of FIG. 100.

Referring to FIG. 101, the service module D232 for use with the system shown in FIG. 100 is similar to the service module D232 illustrated in FIG. 99, except that the USB D236 is replaced with a telephone line plug D248, such as an RJ11 plug, for connecting a modem D250 of the service module D232 with the telephone line D244 to establish a connection to the Internet.

Figure 102:
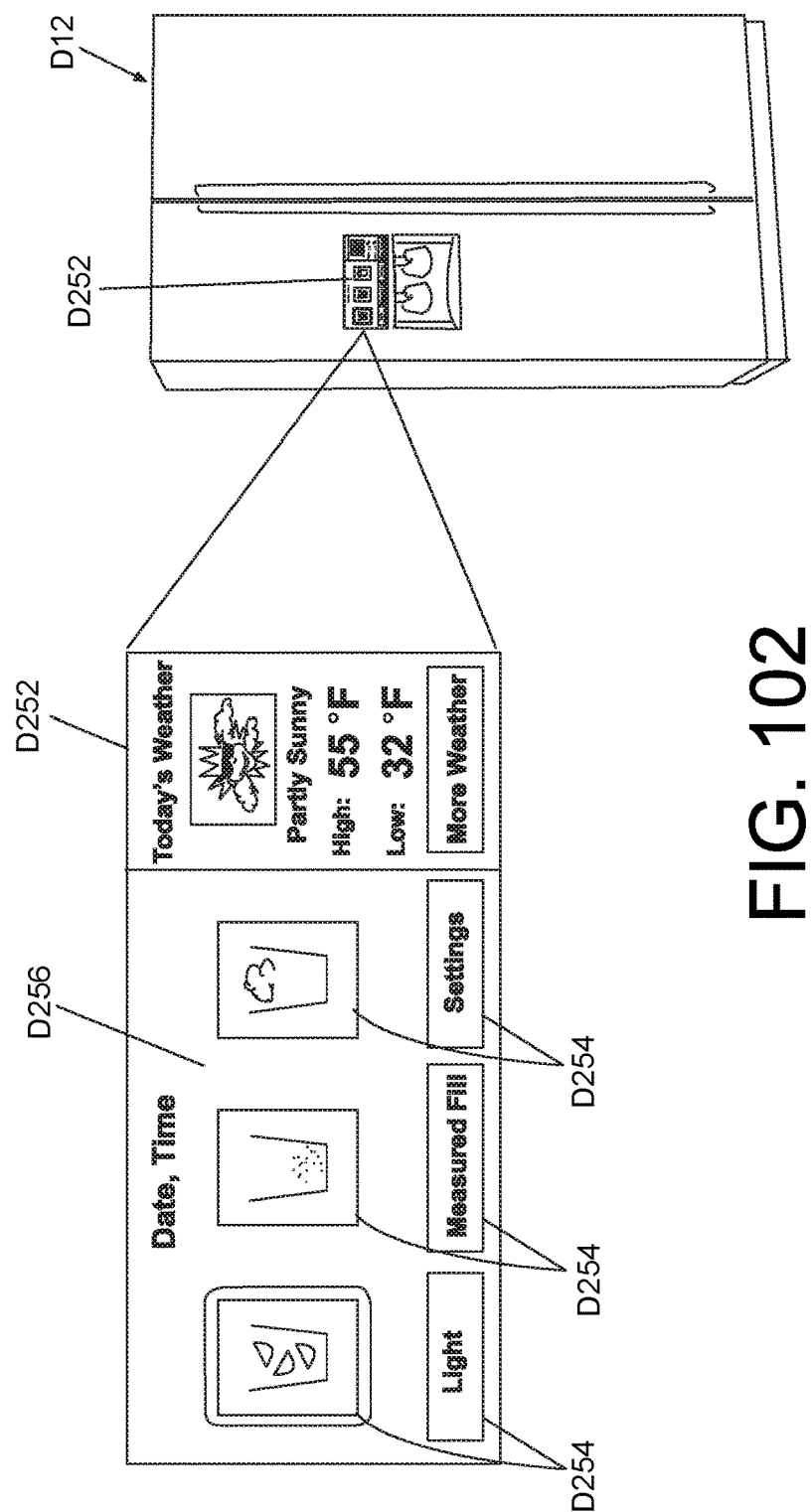
FIG. 102 is a schematic illustration of the appliance in the form of a refrigerator equipped with an exemplary accessory module in the form of a weather station module forming a component with a client SA enabling the weather station module to become operational without manual configuration.

The service modules D232 described above can be supplied with the appliance D12 at the time of manufacture or sold as an accessory during or after the sale of the appliance D12. Other various types of accessory modules can be provided with the appliance D12 or purchased later by a customer for upgrading the appliance D12. An exemplary accessory module can comprise a display operably connectable to the internal network D14 and the external network D202 and visible to the user when mounted to the appliance D12. The display can communicate various data the user, including, but not limited to, data, such as operational status, related to the appliance and obtained via the software architecture D10 on the internal network D14, or information downloaded from the Internet through the external network D202. An exemplary accessory module is a weather station module D252, which is shown in FIG. 102 as mounted to an appliance D12 in the form of a refrigerator for illustrative purposes. In addition to displaying weather-related information or other information that can be downloaded from the external network D202, the display of the weather station module D252 can also include one or more touch pads or a touch screen D256 with selector areas D254 for controlling various operations of the refrigerator, such as for controlling an ice dispenser and a light, and for accessing settings, such as temperature, of the refrigerator.

FIG. 103 illustrates the preferred packet structure for a fragmented message. Such a packet structure is preferably used for communication when the message payload is larger than that of the underlying protocol. This fragmentation packet structure was previously described in the discussed concerning multi-payload message integrity; however, as brief summary can be listed here. In a fragmented message, the standard packet structure described in FIG. 82 is preferably used in the first fragment. All subsequent fragments preferably use the packet structure described in FIG. 103. The difference between these protocols is in Byte 2.

For the entirety of a fragmented message, the flag should bet set. The MFP flag (more fragments pending) should be set until the final fragment of the fragmented message. MID (message id) gives each fragmented message (the group of fragments) a handle or id, preventing merging of separate fragmented message. FID (fragment id) gives each fragment of a fragmented message a handle or id, allowing the detection of a lost fragment. A more in-depth explanation can be found in the discussion on multi-payload message integrity.

FIG. 104 provides example operations of the fragmentation protocol discussed given in FIG. 103. Explanation of this protocol can be found in the multi-payload message integrity section.

Figure 105:
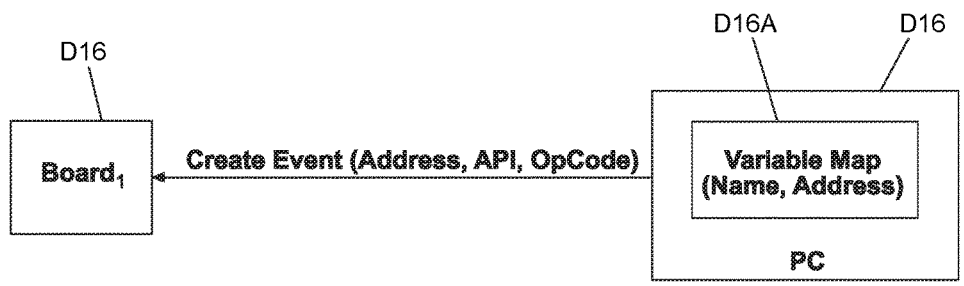
FIG. 105 is a schematic illustration of the location of variable map information at a central location, such as the main controller PC board, which is then communicated to the boards of the other components.

FIG. 105 and FIG. 106 represent alternate architectures for locating the address and Identifier information such that well-formed messages can be constructed and sent to the software architecture of FIG. 88 resulting in event creation within the DAQ D30 of FIG. 83. As previously mentioned, the DAQ engine D30 requires a variable's memory address for event registration. FIG. 105 illustrates an example of using the client-configured data acquisition scheme in which the client (computer or other client) holds a current memory map that relates a variable's name to its memory location. This memory address, in addition to the identifier (API Id and Op Code), is used to construct a well-formed message which is sent to the DAQ resulting in DAQ event creation. FIG. 106 illustrates an example of using the client-configured data acquisition scheme in which the client (e. another control board) does not know the memory address's of desired event variables. In this case, the client can utilize the embedded variable map functionality of this disclosure. Thus, the client must only provide an API and Op Code and is not required to include the memory address of the variable in the well-formed message to be sent to the DAQ. Because, in this case, the software of the DAQ performs the additional task of acquiring the memory location of the variable specified by the Identifier. Once acquired, the DAQ uses the same function calls referenced in the previous case of FIG. 105 to create the event structures in the DAQ's array of event structures contained in the DAQs memory heap.

Variable map information in FIG. 105 relates variable symbolic names to their address in the memory of D16A. FIG. 106 relates variable identifiers (API Id and Op Code) to their address in the memory of D16. The rational for the alternate architectures is that these support both interactions with a human actor who might find it advantageous to work in symbolic names (which tend to be meaningful and communicate will the usefulness of the variable) and interactions with other instances of the software architecture D10 or some component D16 or D22 or some other software component which is able to interact with the software architecture D10. In software based interactions (non-human interactions) it is advantageous not to use symbolic names as they require more memory to store, more bandwidth to transmit, and more computational cycles to process. Instead, numeric identifiers can be substituted for symbolic names. The software architecture D10 uses the numeric identifier API ID and Op Codes as numeric substitutes for symbolic names. Additional numeric identification is available for any valid occurrence of API Id. Where the former numeric identification is sufficient to provide a unique index per component D16 residing on the network D14 and where the latter, the additional identification information can be obtained using a secondary query requiring a component of the former numeric identification, API Id. Then together, API Id and the additional numeric identification (the latter) provides identification unique within the totality of possible software components able to be represented within the software architecture D10.

FIG. 107 provides an example of use of the client-configured data acquisition scheme using the embedded variable map. Here, Node A registers for an event on Node B using the publicly know API X and Op Code Y that links to the desired event variable. Next, Node C attempts to register for the same event using API X and Op Code Y. Because the API and Op Code pair have previously been registered by Node A, Node C's request is rejected. However, Node C then requests data from the remote (embedded) variable map with the get Remote Variable Data command. Node B responds with information, including the desired variable's memory address. Node C then uses this memory address to register for an event, but this time with a different API and Op Code pair.

FIG. 107 can also be thought of as disclosing two message scenarios relating to the event creation suggested in FIG. 106. The first scenario describes the Messaging between Nodes A and B both of which communicate via internal communication network D14 and which is compatible with software architecture D10. In the first scenario, Node B is able to comply with the request from Node A. The second scenario describes the Messaging between Nodes C and B both of which communicate via internal communication network D14 and are compatible with software architecture D10. In this scenario, Node B cannot comply with the request from Node C because the API Id and Op Code in message 3 has already been allocated by a previous request. In this case, Node B responds appropriately resulting in a query (5) from Node C resulting in a network message (6) from Node B containing the necessary information allowing Node C to re-create the same NVOEvent memory structure of FIG. 113 with an API Id and OP Code unique to the DynamicMemoryHeap of FIG. 113 of Node B's software architecture D10.

Figure 108:
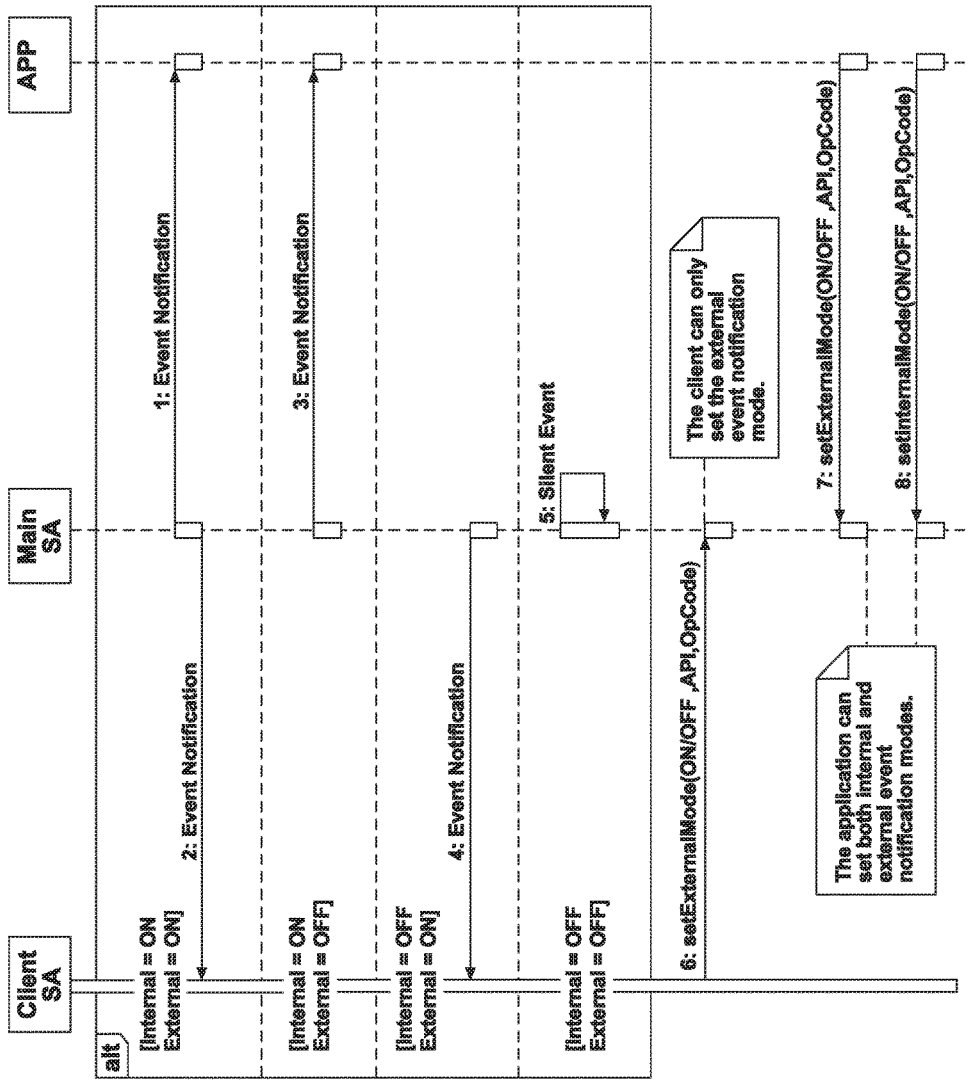
FIG. 108 is a UML sequence diagram of a standard format illustrating the disabling and re-enabling of the realization event requests.

FIG. 108 illustrates the configurable event notification functionality provided by this disclosure. Preferably, events would only notify external clients when triggered by default. However, it may be desired that this external notification be "muted" at some times without actually removing the event from the DAQ engine D30. Additionally, it may be desired that the internal application within the software architecture D10 be notified when an event occurs. Thus, this disclosure provides such functionality. As previously discussed, external notification can be altered using the Set External Event On/Off command within the DAQ API. Additionally, the software architecture D10 preferably provides an internal function to turn internal notification on and off. FIG. 108 shows examples of event notifications under the possible configurations.

In this way, this disclosure has the ability to disable and re-enable the realization of the NVOEvents of FIG. 113 onto the internal communication network D14. In addition, the ability to disable and re-enable the realization of the NVO-Events of FIG. 113 as internal messages sent to software component D16B within the same software operating environment D16A of the software architecture D10.

FIG. 109 illustrates the functionality of an acknowledged event within this disclosure. In an acknowledged event, the software architecture waits a pre-determined time for an acknowledgement message from the client until processing the next event. If the pre-determined time expires, a pre-determined number of retries are executed. Preferably, all events are assumed to be unacknowledged by default. Thus, after sending an event to the client(s), the DAQ engine D30 immediately processes the next event. However, some applications require that events be acknowledged to insure that the message was received by the event requestor. Using this technique, the sender can resend the event if the acknowledgment is not received. The acknowledgment confirms that the requestor has received the event. The advantage to the preferred embodiment of providing the option for acknowledged events is that it is the requestor who determines the necessity of the acknowledgement according to the application requirements. Therefore, when the requestor creates the event using the mechanisms provided by the software architecture D10 within the interface to the DAQ D30, information is included in the message D28A which provides a further classification of the event as acknowledged or unacknowledged. As shown in the example in FIG. 109, upon occurrence of an acknowledged event the software architecture blocks all other event while waiting for an acknowledgment from the client. If no acknowledgement is received, the software architecture D10 will re-send the event after a configurable amount of time. This retry sequence will occur a configurable amount of times, until finally the software architecture stops attempting to send the event and notifies the application through a callback function of failure.

Figure 110:
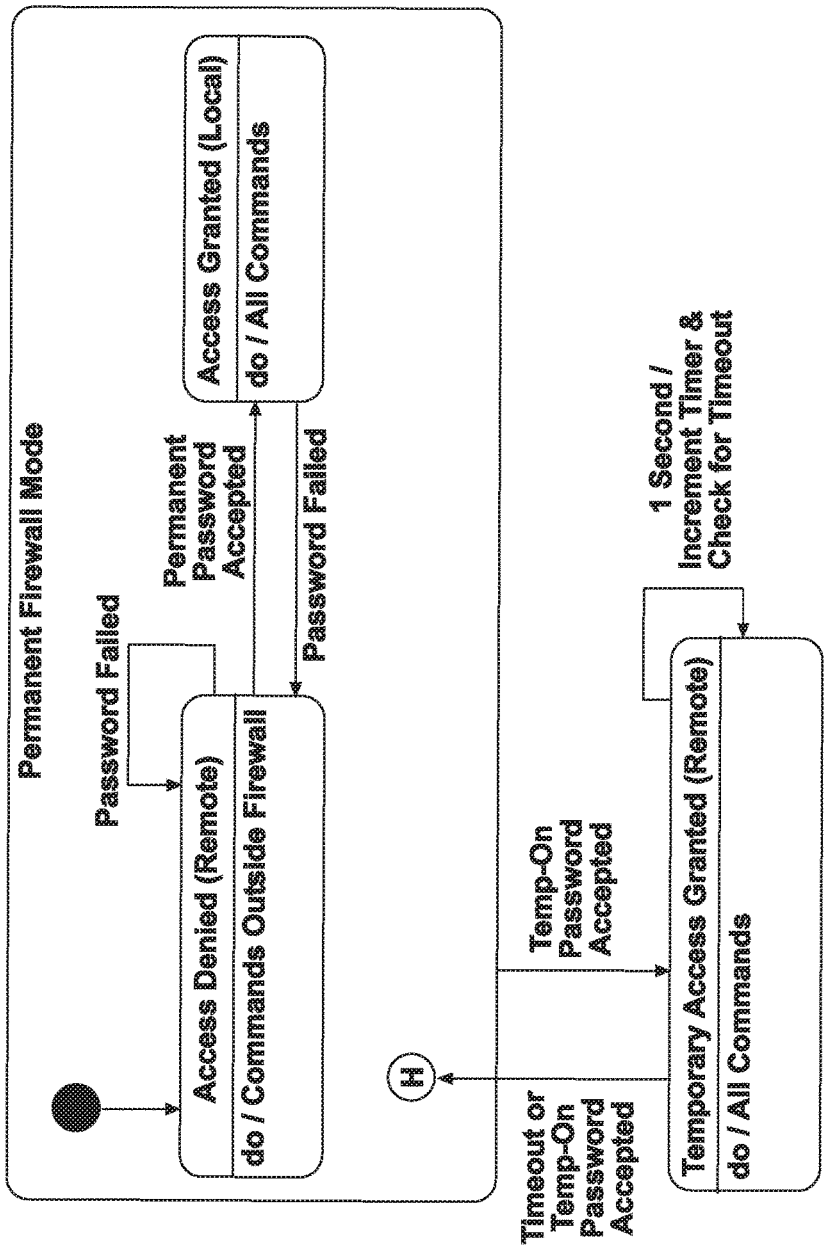
FIG. 110 is a UML state diagram of a standard format illustrating the security modes and firewall provided by this disclosure.

FIG. 110 illustrates the security features provided within this disclosure. Because the execution of critical functions by external nodes is possible through the previously described protocols, this disclosure provides a firewall mechanism to restrict access to command execution. Commands that are deemed safety critical can be listed in a table, preferably in the file SAVariableMap.h, before compilation. Commands can be listed specifically (with an API and Op Code) or as entire APIs (with a specific API and an Op Code=0xFF). The commands listed in this table are claimed to be behind the firewall. As shown in FIG. 110, this disclosure provides three levels of security access: Access Denied, Access Granted, and Temporary Access Granted.

Preferably, all nodes start with an access level of Access Denied by default. In this access level, the node is only allowed to execute the commands in front of the firewall. Thus commands behind the firewall (or listed in the firewall table) are not allowed to be executed. Upon successful submission of a permanent password (within the payload of the Publish Node feedback message), a node is promoted to the Access Granted security level. In this access level, the node is allowed to execute all commands, in front of and behind the firewall. For temporary access behind the firewall, a node can successfully submit a temporary access password (within the payload of the Publish Node feedback message). In this access level, the node is given access to all commands, in front of and behind the firewall, for a configurable amount of time. After this time has expired, the node's access level is reverted to its previous state.

Specifically, FIG. 110 contemplates two passwords each representing a security level recognized by the logic of the command firewall. A password will be transmitted by a component or client when the message of the DAQ API, publish SA Node is broadcast (see bytes 3 and 4 or Op Code 2). One of the passwords represents permanent access to all special commands that are considered to be behind the firewall. The second password will grant temporary access to all special commands that are considered to be behind the firewall. Without a password, clients will have access to all commands which are considered to be in front of the firewall. The engineer responsible for the installation of the software architecture D10 onto a component D16 of the household appliance D12 will determine which commands are in front of and which commands are behind the firewall of FIG. 110.

Figure 111:
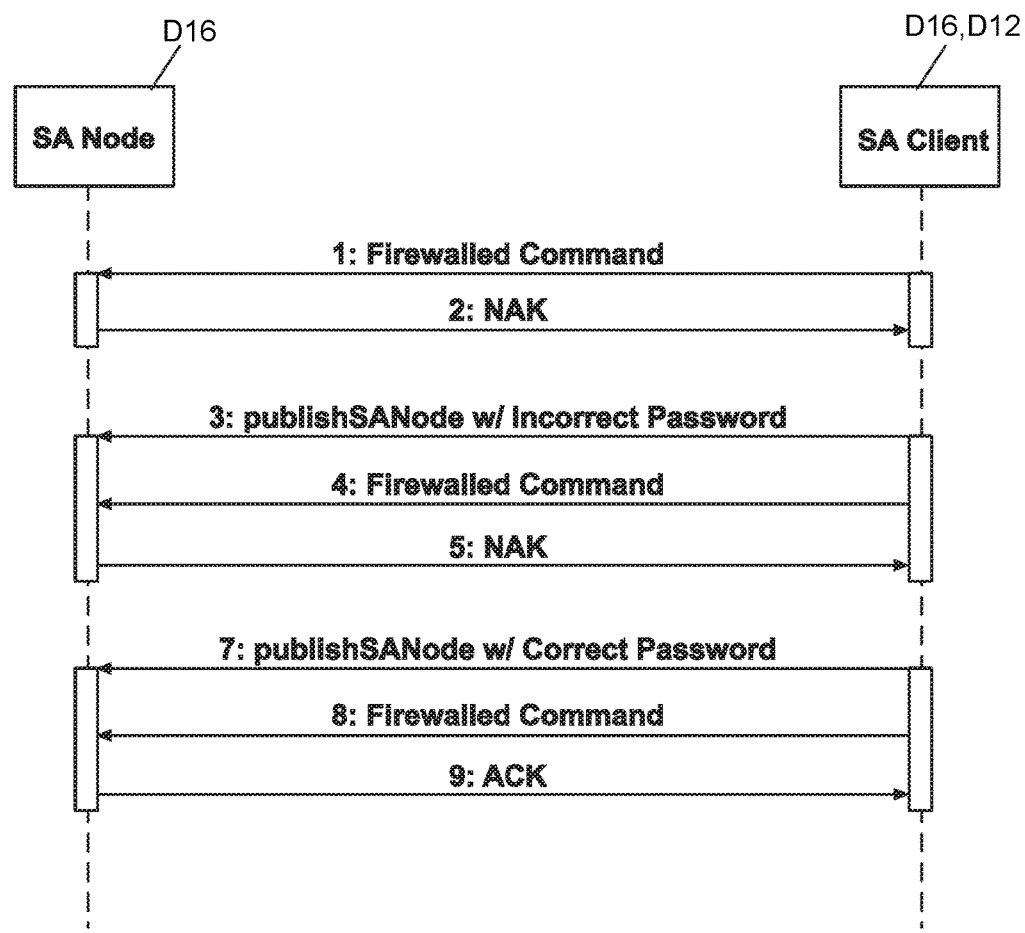
FIG. 111 is a UML sequence diagram illustrating the methods of interaction between a client which must negotiate with the firewall of FIG. 110 before application messaging can be fully processed.

FIG. 111 illustrates an example of operation of the firewall security provided by this disclosure and shown in FIG. 110. By default, a node does not have access to commands behind the firewall. Thus, as shown, if a node without access attempts to execute a firewalled command, it will be rejected. After an incorrect password submission, the firewalled command will still be rejected. Only after a successful password submission is the node allowed to execute the firewalled command.

Figure 112:
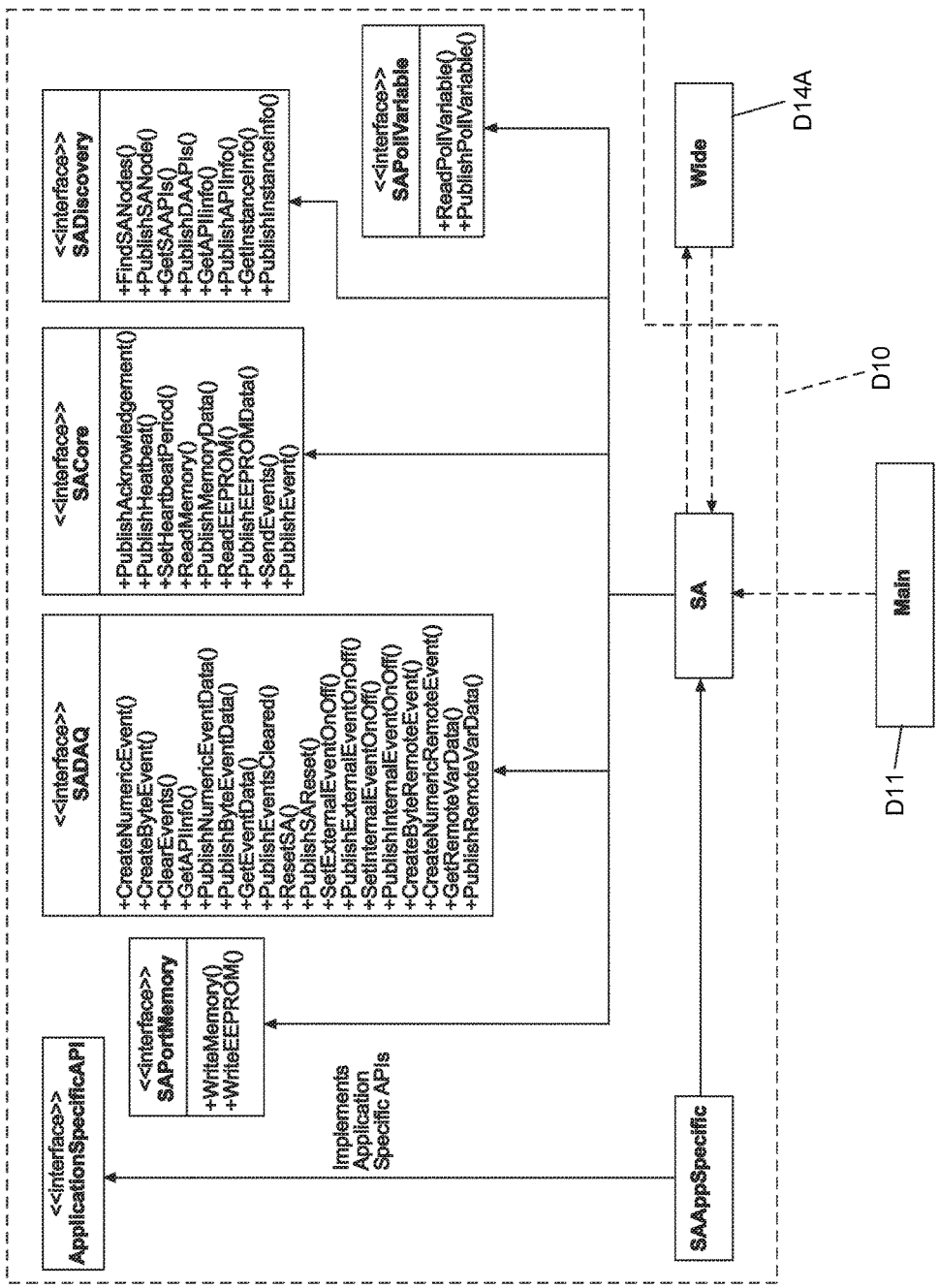
FIG. 112 is a UML class diagram illustrating the standard public interfaces which the SA is able to implement.

FIG. 112 illustrates the standard public interfaces which the software architecture D10 is able to implement. Shown is the ApplicationSpecificAPI which is further populated with useful functionality by the designer according to the needs of the application. Also shown is an example of associations with other software components of the software operating environment with which the software architecture D10 would interact.

FIG. 113 illustrates the preferred implementation of the software architecture D10. Shown are the internal functions and memory allocations needed to perform and support the functionality implied by FIG. 112. Also shown are helper classes (Command Handler, Dynamic Memory Heap, Update Handler, NVOEvent, TimeHandler, WIDEComm-Handler, MessageParser, and AppSpecificCommandHandler) which show the functional grouping of the internal functions and memory allocations needed. Also shown are the associations between the helper classes.

FIG. 114 shows the preferred organization of source code files of the software architecture D10.

Figure 115:
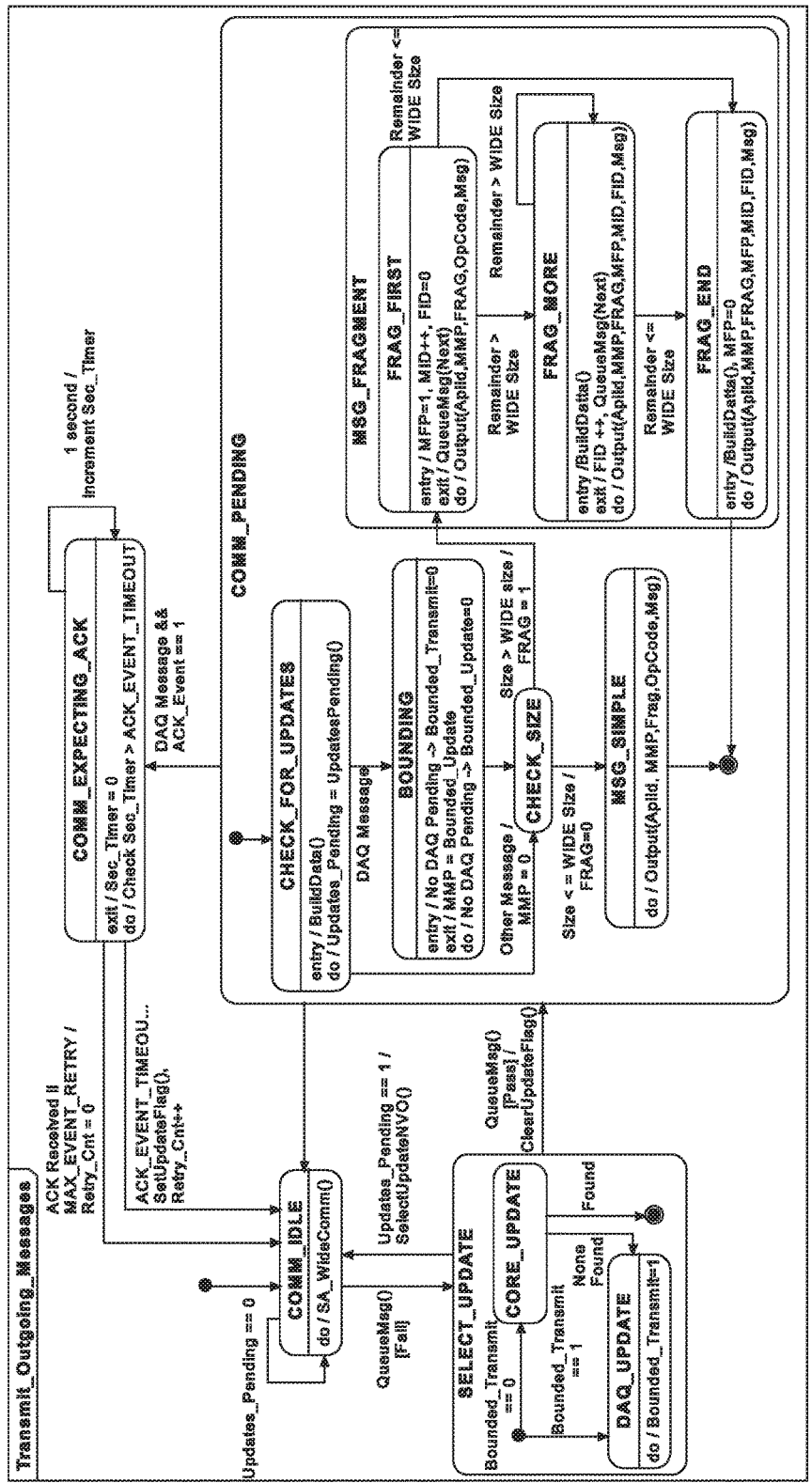
FIG. 115 shows a collection of inter-related UML state diagrams illustrating 3 primary states (COMM_IDLE, COMM_EXPECTING_ACK, and COMM_PENDING), each of which possibly having a plurality of sub-states.

FIG. 115 shows a collection of inter-related state diagrams for three primary states (COMM_IDLE, COMM_EXPECTING_ACK, and COMM_PENDING), with each state possibly having a plurality of sub-states, and so on. The functionality represented here is related to the collaboration associations shown in FIG. 113. Its invocation is also referenced in FIG. 89 as one of the standard interface functions invoked from the MAIN execution loop of the software operating system onto the software architecture D10.

The MAIN function of the software operating environment a6A (shown in FIG. 113 and in FIG. 89) invokes on SA_WideComm( ) shown in the SA class definition (where SA and its aggregate functionality is the Software Architecture D10). The result of the function invocation, is shown in FIG. 115. As shown in FIG. 89, MAIN invokes on SA_WideComm( ) periodically within the software operating systems execution.

FIG. 115 shows a $2^{nd}$ indirect interaction with MAIN which is a result of MAIN invoking on the WIDE function WIDE_EXEC ( ). This collaboration is shown in FIG. 89 and in FIG. 115. In this case, WIDE software operating layer within the WIDE_EXEC( ) function invocation calls WIDE.BuildData( ) which in turn calls SA.WideCommHandler.SA_BuildData( ) D52. In FIG. 115, this invocation is shown within the COMM_PENDING state. This path of execution occurs when, in the previous state of COMM_IDLE, the logic within the sub-states of COMM_IDLE result in a pending outbound message for the WIDE network D14. As shown in FIG. 113, this state transition is realized by the invocation of the function WIDE.QueueMessage( ). This invocation, results in the invocation of the logic contained within the COMM_PENDING state of FIG. 115.

The COMM_EXPECTING_ACK state of FIG. 115 is a result of an outbound event having been initially created with a special indicator denoting acknowledgment required. If the event (also referred to as update) which is being operated on within the COMM_PENDING state requires acknowledgment, the state transition from COMM_PENDING will be to COMM_EXPECTING_ACK. In this case, the event will be re-sent, by re-entering the COMM_PENDING state if a time out has expired without receipt of the expected Acknowledgment message. This process will be repeated until either an Acknowledgement is received or until the configurable retry parameter (MAX_EVENT_RETRY which is incremented each time the event is re-transmitted) is exceeded.

FIG. 116 shows a collection of inter-related UML state diagrams. Shown are four primary states (READY, TRANSMIT SNAPSHOT, UPDATES_BLOCKED, and PROCESS_DAQ_EVENTS). The functionality represented here, is related to the collaboration associations shown in FIG. 113. Its invocation is also referenced in FIG. 89 as one of the standard interface functions invoked from the MAIN execution loop of the software operating environment onto the software architecture D10.

The purpose of the functionality represented by FIG. 116 is to evaluate the structures (NVOEvent) D31 of FIG. 113 determining if the conditions for event transmission have occurred, collecting those, and setting the appropriate flags (Updates_Pending & Bounded Update) so that when the State Machines of D35 are executing, events conditions detected by the DAQ D30 are realized as WIDE Packets D24 onto the WIDE bus D14.

Figure 117:
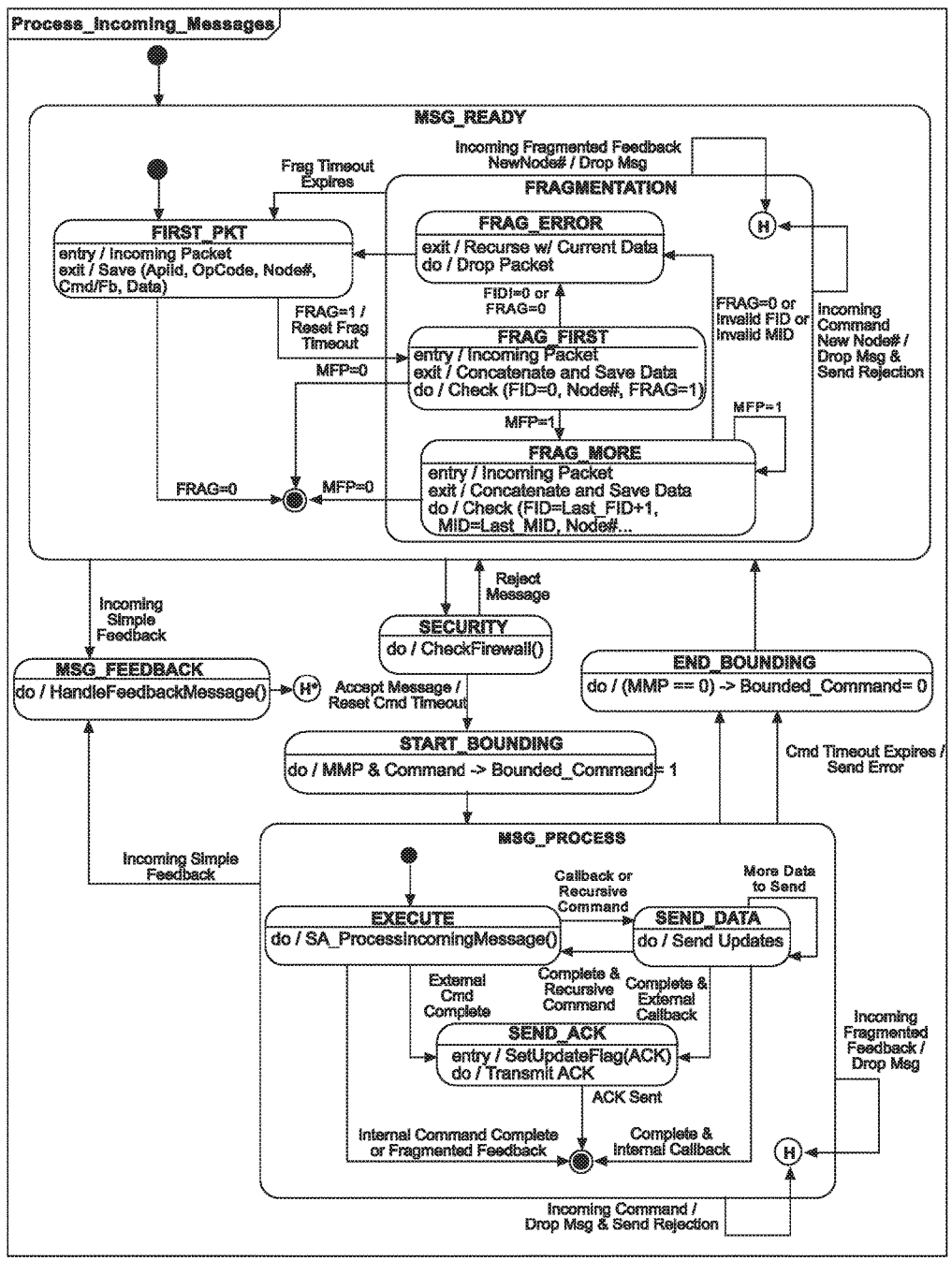
FIG. 117 shows a collection of inter-related UML state diagrams illustrating 2 primary states (MSG_READY and MSG_PROCESS).

FIG. 117 shows two primary states (MSG_READY and MSG_PROCESS). The functionality represented here is related to the collaboration associations shown in FIG. 113 where WIDE calls SA.WideCommHandler.SA.AcceptData ( ). Invocation into these state machines are also referenced in FIG. 89 as functions invoked from the MAIN execution loop of the software operating system onto the software architecture D10 where MAIN calls SA.SA_ProcessIncomingEvents( ). These inter-related state machines govern the execution of incoming commands, responses to requests, and the handling of events.

Figure 118:
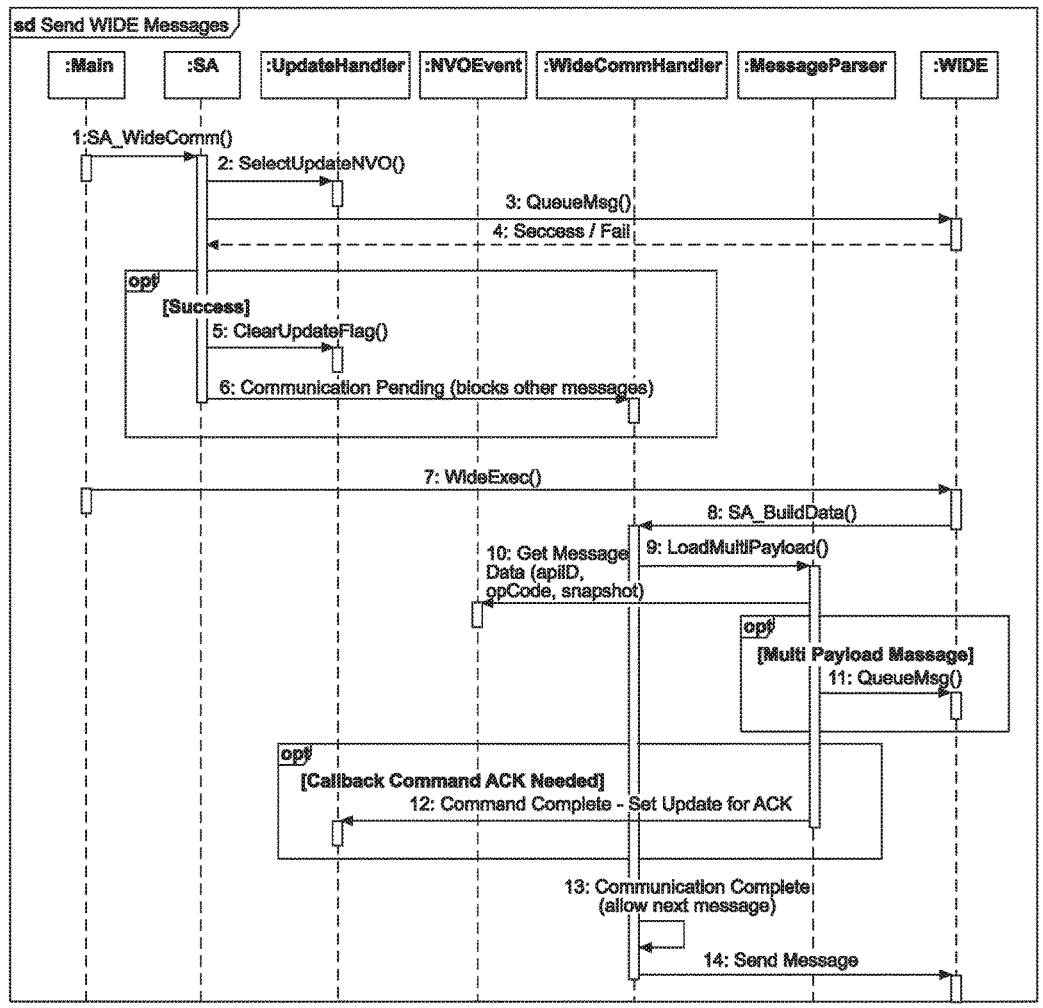
FIG. 118 is a UML sequence diagram illustrating the execution of an ordered collection of internal messages between components for the purpose of producing a network message on the internal network from the SA.

FIG. 118 shows the execution of an ordered collection of messages of the classes in FIG. 113 of the software operating environment. These messages represent the execution path for a common set of logic referenced as 'Send WIDE Message' in FIG. 119, FIG. 120, FIG. 121, and FIG. 122. The invocation from MAIN and WIDE (via WIDE_EXEC ( )) are shown in FIG. 89.

Figure 119:
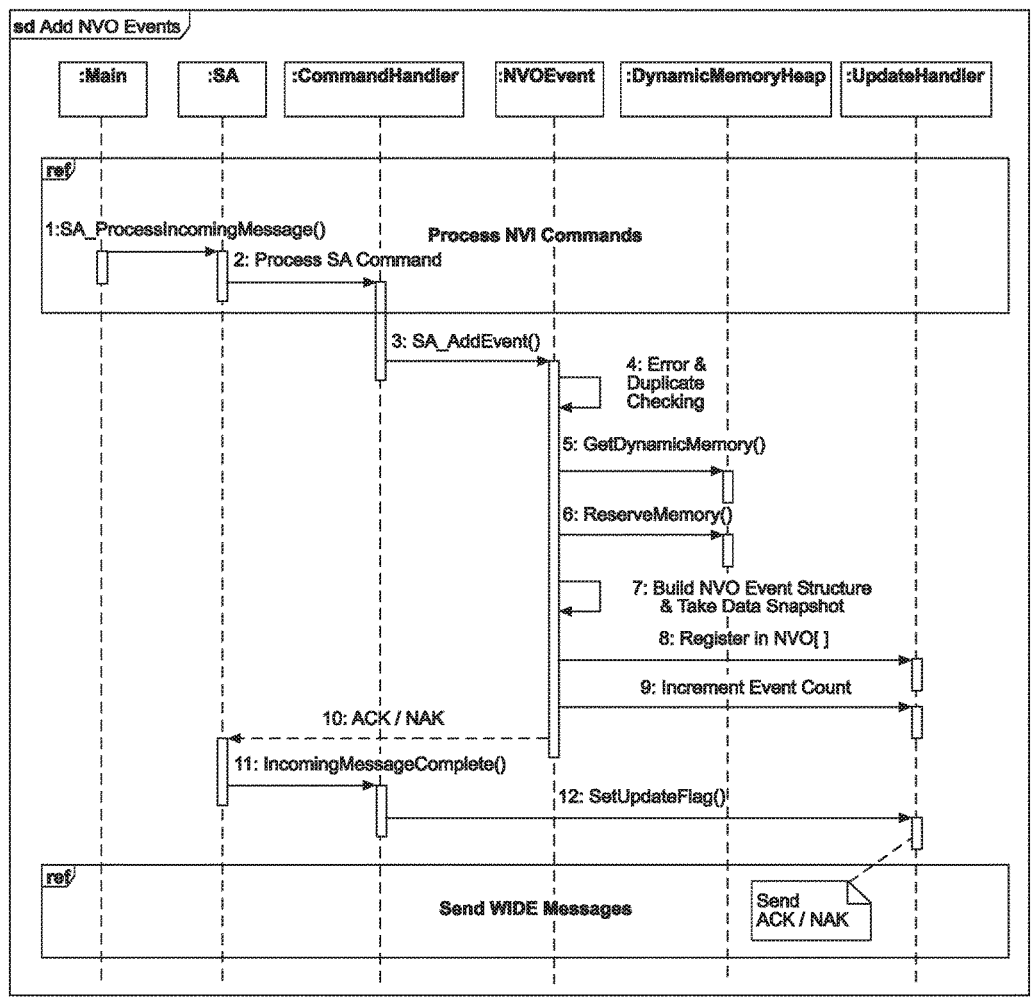

FIG. 119 shows the execution of an ordered collection of messages of the classes in FIG. 113 of the software operating environment. These messages represent an interaction within a software operating environment containing the software architecture D10. The invocation from MAIN is shown in FIG. 89. The diagram illustrates the messaging required to add a well formed NVOEvent memory structure to the DynamicMemoryHeap.

Figure 120:
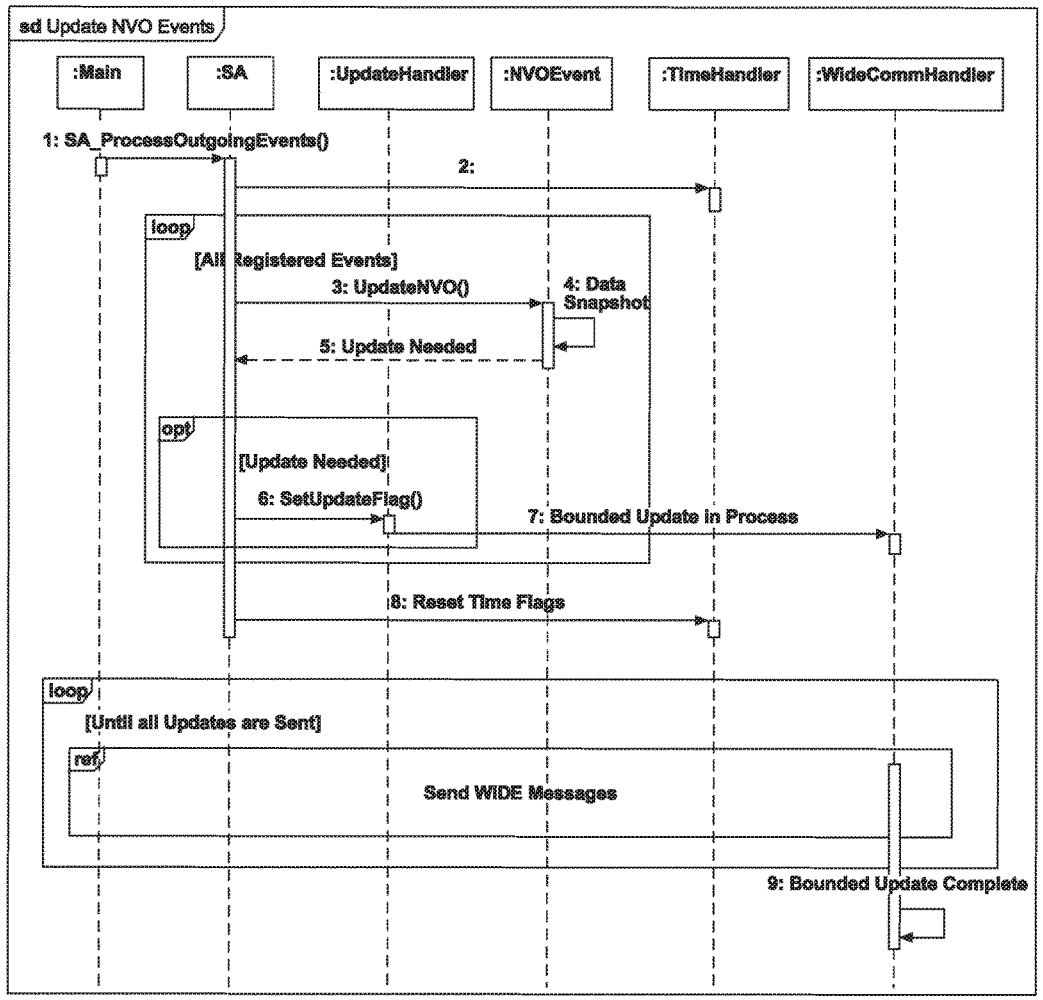

FIG. 120 shows an ordered collection of messages of the classes in FIG. 113 of the software operating environment. These messages represent an interaction within a software operating environment containing the software architecture D10. The diagram illustrates the message execution of FIG. 117. And the invocation from MAIN is shown in FIG. 89. The purpose of the functionality represented by the diagram is to evaluate the NVOEvent memory structures contained within the DynamicMemoryHeap, collect those and their appropriate data values whose event triggering criteria have been met, and to insure a realization of packets D24 onto the internal communication network D14 for the purposes of notifying other clients D16/22 of the NVOEvents which have met there trigger criteria and the associated data values.

Figure 121:
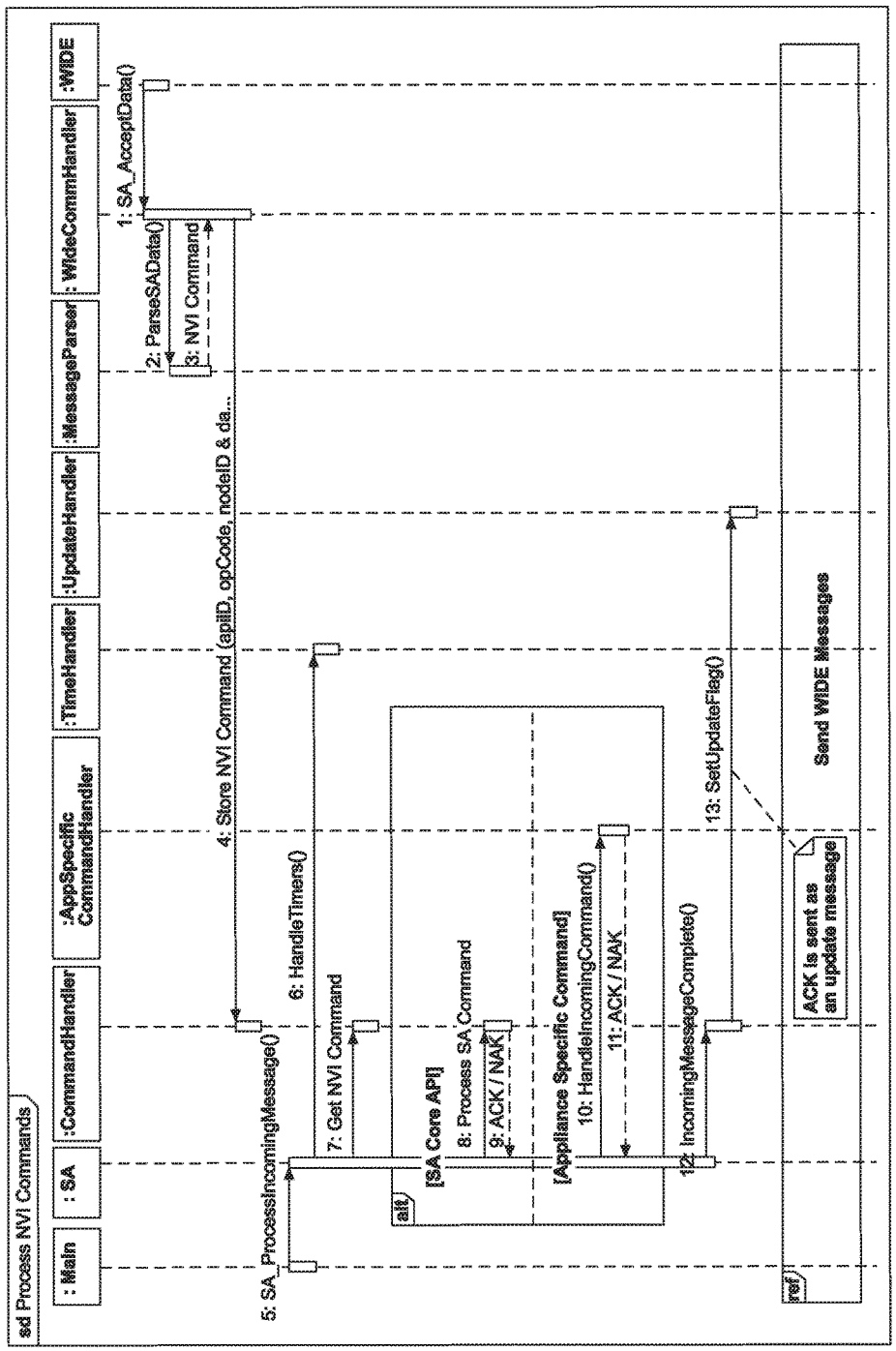
Figure 122:
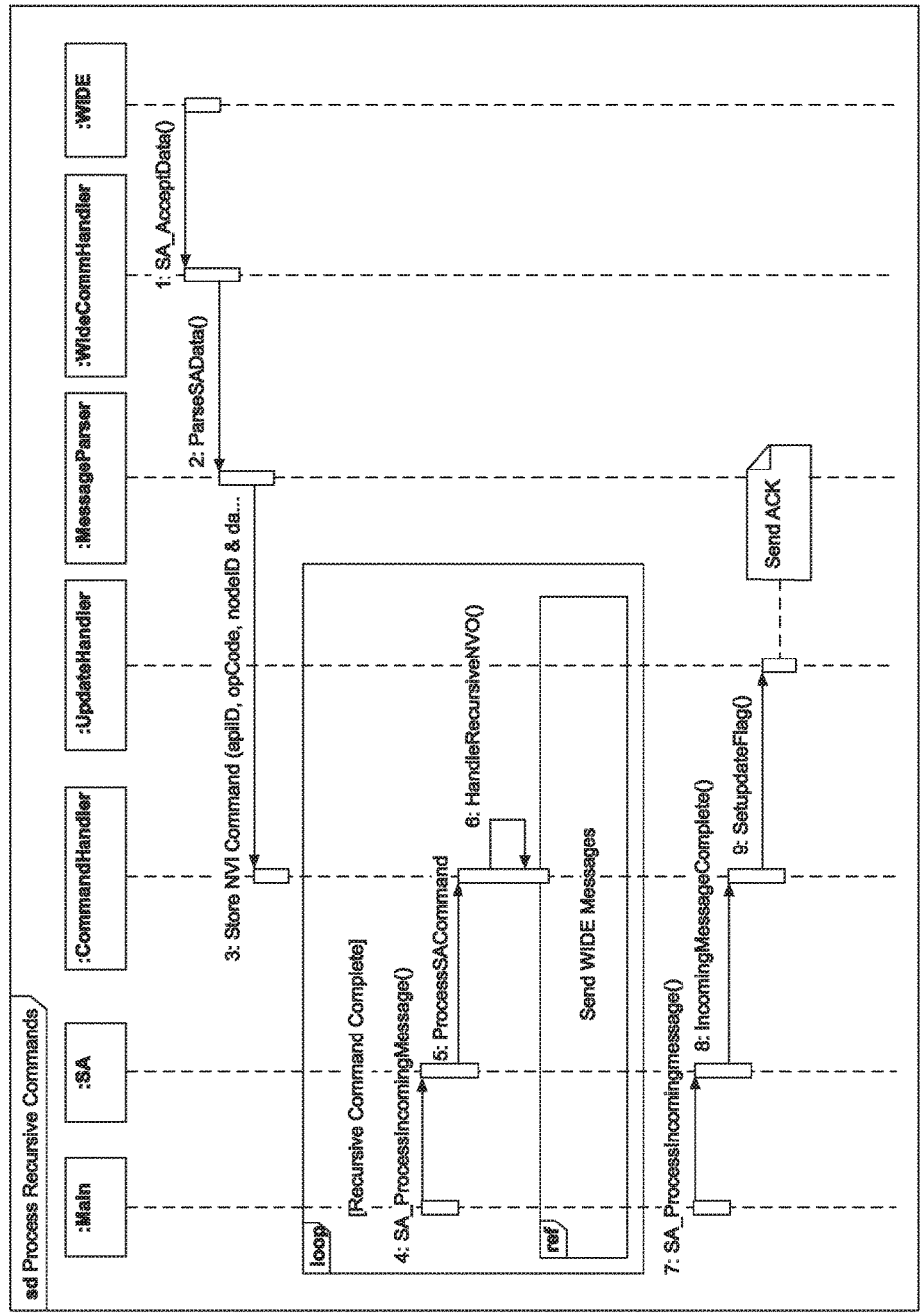
Figure 123:
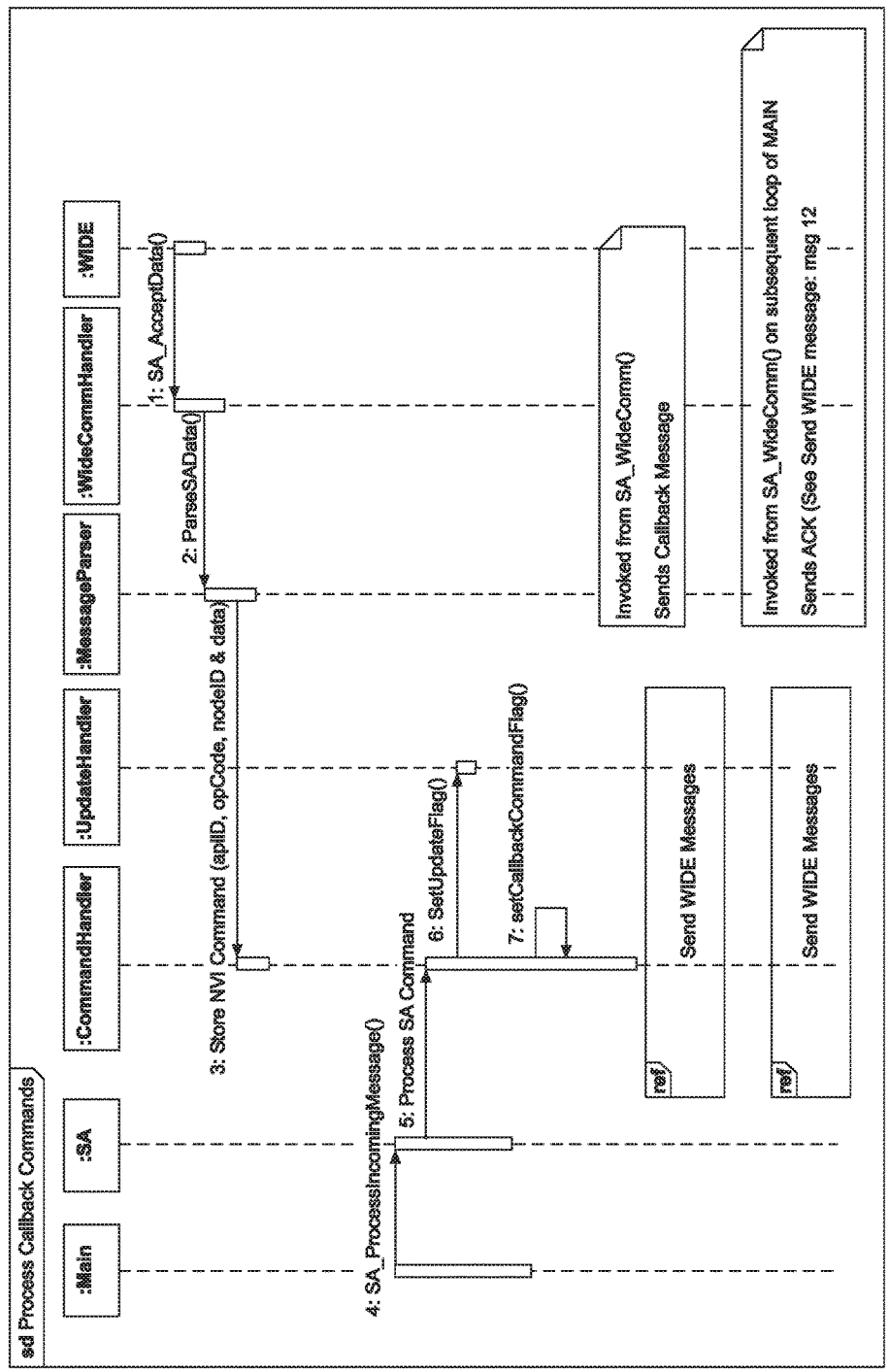

FIG. 121, FIG. 122, and FIG. 123 show an ordered collection of messages of the classes in FIG. 113 of the software operating environment for the purpose of processing incoming commands (NVOs) from the Network D14. These messages represent an interaction within a software operating environment containing the software architecture D10. The invocations from MAIN and WIDE (via WIDE_EXEC( )) are shown in FIG. 89. The figures, described individually in subsequent paragraphs, represent 3 cases of alternate paths for execution.

FIG. 121 illustrates the messaging required to process incoming messages from the internal communications network D14 from clients D22/16 which do not require a response [Command-NoReponse] containing meaningful data other than a response transmitting the success or the reason for failure of the incoming message (the ACK or NAK of API ID=D1, Op Code=D1).

FIG. 122 illustrates the messaging required to process incoming messages from the WIDE bus D14 from clients D22/16 which require a plurality of response messages [Command-MultipleResponseRequired] containing meaningful data in addition to a response which transmits the success or the reason for failure of the incoming message (the ACK or NAK of API ID=1, Op Code=1).

FIG. 123 illustrates the messaging required to process incoming messages from the internal communication network D14 from clients D22/16 which require a single response messages[Command-SingleResponseRequired] containing meaningful data in addition to a response which transmits the success or the reason for failure of the incoming message (the ACK or NAK of API ID=1, Op Code=1).

Taxonomy Control

A typical prior art approach to using a new controlling device to control an appliance is to have the software component of the new controlling device duplicate the logic of the appliance controller so that the new controlling device does not inadvertently request the software component of the appliance controller to perform an operation of which it is incapable. This prior art approach further requires communications between the appliance and the new controlling device regarding the current state of the appliance. This prior art approach is inefficient since it requires a lot of overhead on the new controlling device and takes time to be loaded on to the new controlling device and translated into a form understandable by the new controlling device. Furthermore, this prior art approach requires that a variant of the software component for the appliance controller must be constructed for each new appliance and each time the appliance gets a new or altered functionality.

The purpose of a control taxonomy is to avoid requiring this duplication of software logic (often called business logic) between two interacting software components in a controlling device and a controlled appliance. In particular this permits a command generator in a controlling device to readily control an appliance without any information about the appliance being controlled except the control taxonomy itself. This can increase the flexibility of introducing "generic" control devices to control new appliances, adapting control devices to newly available cycles or functionalities which have been added to an appliance, and switching appliances between modes of operation where different operating cycles or functionalities are available. It also makes control of appliances easier for users since they need only be presented with choices which are currently available from the appliance.

This disclosure uses a structured taxonomy dataset to efficiently communicate to the controlling device just that information which the controlling device needs in order to generate a well-formed command for the appliance. As used herein, a well-formed command is a command which has meaning and is performable by the appliance. The information conveyed by the dataset includes a hierarchy of options and data inputs required to form the well-formed command. In the preferred embodiment, it also includes semantic or contextual information to communicate in word or iconic form the available options so that a user can understand the available choices and enter the appropriate data. This is preferably accomplished by labels within the dataset that are associated with arbitrary or non-user friendly identification elements. This allows the logic of the software componentry which must interpret and process the taxonomy to be decoupled from the presentation of the taxonomy on a user interface (e.g., foreign language, labels, units).

Referring once again to the FIG. 47, FIG. 47 generally illustrates the improved control structure and method of this disclosure, the appliance D12 being controlled has a software component D2 16B having an appliance controller and status generator. The controlling device D16, D22 used to control the appliance has a software component D1 D16B with a command generator, a selection builder and a status interpreter. The controlling device D16, D22 may be a programmable user interface such as a PDA, web tablet, a cell phone, an LCD attached to the appliance or a client device.

The taxonomy architecture, shown disposed in the appliance controller D16 and logic, may alternatively be disposed in a remote location, such as in a controlling device or on the internet. The taxonomy architecture includes a taxonomy generator, a taxonomy engine, a taxonomy translator and a taxonomy structure. The taxonomy architecture generates a taxonomy dataset defining taxonomy capabilities facilitating the creation, by the software component D1, of well-formed commands that can be executed by software component D2. Each of these components and their interrelationships are described in greater detail below.

Creation of the Taxonomy Dataset

The taxonomy dataset is derived from the operational capabilities of the appliance controller D16 structured in a manner to allow the command generator in the software component D1 to interpret the dataset to accomplish several results. More particularly, from time to time the taxonomy engine uses the taxonomy structure and the state aware information to generate a taxonomy dataset reflective of the subset of the universe of options for commands that would be available from an appliance to those that are currently available from the appliance.

For example, the taxonomy dataset describes the available functions supported by a software component D16B, each functions argument, and the valid values of each argument in a data structure. In addition, taxonomy dataset defines the valid values of feedback variables. Since this in a data structure, it can be transmitted and re-transmitted to clients D16 or D22 as required. Changes to taxonomy dataset occur as the cycles of operation progress and the available commands or the valid values of their arguments change. Moreover, additional commands may become available or may become invalid as the cycle of operation progresses from Idle (see FIG. 85).

More particularly, the selection builder registers with the taxonomy manager to receive notifications for new taxonomy engines. In response, the taxonomy manager passes references to all known taxonomy engines back to the selection builder. The selection builder then requests from each taxonomy engine a taxonomy capabilities data set. The taxonomy engine evaluates a taxonomy structure comprised by the controller logic of software component D2 or, alternatively, a document to generate a taxonomy capabilities dataset. The selection builder then populates a set of pseudo command structures appropriate for an application end point and passes those structures to the application end point allowing the application end point to be configured. Examples of application end points are user interfaces for control or service, or other intermediate application layers, like an energy controller or home automation mode such as vacation or goodnight. Alternatively, the selection builder may directly configure the application end point.

Communication and Use of the Dataset.

When a controlling device is networked with the appliance, the taxonomy manager establishes a relationship between the software component D1 and the taxonomy architecture allowing the command generator to query for the existence of taxonomy datasets, providing the software architecture D10 access to a taxonomy dataset, and allowing the command generator and status interpreter to subscribe to taxonomy dataset updates. The taxonomy translator is an optional component that translates the taxonomy datasets between software components D1 and D2.

The taxonomy dataset is communicated to the controller of software component D2 and to the selection builder of software component D1. Optionally, the taxonomy translator translates the taxonomy dataset to a different schematic definition of the command generator.

The command generator uses the taxonomy dataset to construct and populate a set commands structures available for selection by a user interface or other client applications comprising a set of valid commands, their valid arguments, and each arguments valid values. More particularly, the command generator uses the taxonomy dataset to construct one or more well-formed commands which can then be transmitted to the controller. Since the taxonomy dataset can be reset and sent at different times by the taxonomy engine, or the dataset can be updated by revisions from the taxonomy engine, the command generator can have a current set of command structures then available for selection by a user interface or other client application.

Thus, in essence, through use of the taxonomy architecture, the software component D2 or its proxy (the taxonomy translator) communicates to software component D1 a rule set that can be interpreted by software component D1 so that software component D1 does not request something of software component D2 which software component D2 cannot accommodate and does not operate on a state variable which is set to an invalid value.

Before the application end point is able to commence execution, it will request or register for status updates with a status interpreter. This will allow the application end point to be populated with valid state variables from the controller before logic is executed and before user interface componentry is rendered. The status interpreter will process taxonomically correct status datasets and validate those datasets against the taxonomy capabilities data set. The status interpreter request or register for status updates from the status generator of software component D2 via the taxonomy engine. Upon receipt of a taxonomically correct status, the status interpreter will provide new status values to the application end point.

The application end point executes resulting in a rendering of the current status of software component D2 and a rendering of selectable pseudo command structures. Each time a selection is made from the pseudo command structure, the selection builder populates a set of valid subcommands appropriate for the selection for further selection by the application end point. When a complete selection is made, a structure containing all pseudo commands are passed to the command generator.

The command generator will construct a taxonomically correct well-formed command and optionally via the taxonomy translator, invoke the command onto the controller of software component D2 via the taxonomy engine.

Execution

The well-formed command is delivered to the controller of the appliance and executed by the appliance.

Typically, the command will result in a state change to the associated memory of software component D2, which will trigger a status update created by the status generator and resulting in new renderings of state to the application end point. This change in state will result in a new capabilities taxonomy or a partial capabilities taxonomy which can replace portions of the original capabilities taxonomy. The new capabilities taxonomy resulting in a different set of valid selections for controlling the cycles of operation of software component D2.

Validation

The status interpreter uses the taxonomy dataset to validate status updates from the controller or taxonomy translator. The dataset contains information structured in such a way to allow the controller to fully validate incoming commands according the structure without additional logic outside of the dataset. For example, the dataset can be conceptually thought of as one or multiple decision trees, with each level of the taxonomy forming a different decision branch, with each of the options and/or data inputs can form a different level. The key presses on the user interface required to select the options and/or data inputs in forming the well-formed command can be compared against the decision tree to confirm that each key press is found within a common branch on the decision tree. If the key presses are not found, then it is an indication that the command contains an error. The taxonomy structure thus serves to populate the user interface with available options and data inputs for a given state of the appliance and also serve as the logic for validating the resulting command.

The taxonomy dataset can be thought of as all available options and settings for an appliance at the current state. For example, the appliance comprises multiple components interconnected by the internal network. Each of the components can have one or more devices. Each of the devices has one or more functionalities, which has one or more settings. All of the functionalities for all of the devices will not necessarily be available during each state of the appliance. As such, the taxonomy dataset will comprise all options and data inputs for all devices that are currently available.

FIGS. 124-126 illustrate one example of the Taxonomy control in the context of a user interface D16, D22 for a microwave that is populated with a taxonomy dataset indicating the available functions of the appliance D12 for the current state. The user can select from the parameters of the dataset to form the well-formed command that will be issued to control the operation of the appliance D12.

FIG. 124 illustrates the available hierarchy of options and data inputs. The top level of the hierarchy begins with the cycle D100, which is shown to have the options of COOK, JET DEFROST, BAKED POTATO, STEAM COOK, AUTO REHEAT, AND DINNER PLATE, as illustrative examples. The user must select one of the options from the top level.

Once the user selects an option from the top level, the next level of the hierarchy is exposed to the user based on the top level selection. In FIG. 125, the user has selected the COOK option and the user interface then displays data inputs, in the form of TIME D102 and POWER LEVEL D104, available for that option and necessary to form the well-formed command.

FIG. 126 illustrates the situation were the selection of a top level option exposes options at a sub-level. In FIG. 126, the JET DEFROST is selected, which exposes the sub-level of types of meat D106. The user must select the appropriate meat option in completing the well-formed command. Data inputs in the form of weight D108 and defrost level D110 are exposed and must be selected to complete the well-formed command.

Once the user has selected the options and data inputs from the taxonomy dataset accessed by the user interface, the command generator will form the well-formed command and send it to software component D2 on component of the appliance for implementation. This is done only after the well-formed command has passed through the validation process. The controller and logic of software component D2 then uses the well-formed command to control the operation of the devices to effect the well-formed command.

A detailed example of the creation of the taxonomy dataset and the well-formed command should prove useful. The creation of the taxonomy dataset for the microwave of FIG. 124 that discloses multiple cooking cycles was constructed by the selection builder from the taxonomy capabilities dataset as is illustrated in XML as follows:

```xml
<device id="microwave" label="Microwave Oven">
    <device id="ovenCavity" label="Microwave Oven">
        <char name="cycle" label="Cycle" default="timedCook">
            <setting name="timedCook" label="COOK" />
                <char name="turntable" label="Turntable" default="on">
                    <setting name="on" label="ON" />
```

-continued

```
        <setting name="off" label="OFF" />
      </char>
      <range name="duration" label="Duration" default="30" units="seconds" max="6039" min="60" inc="1" />
      <range name="power" label="Power Level" default="100" units="%" max="100" min="50" inc="10" />
        </setting>
        <setting name="jetdefrost" label="Jet Defrost"/>
          <char name =foodType label ="Food Type"/>
            <setting name="poultry" label="POULTRY" />
  <setting name="meat" label="MEAT" />
  <setting name="fish" label="FISH" />
          </char>
        </setting>
        |
        |
        |
        etc
    </char>
  </device>
</device>
```

If the user of the microwave of FIG. 124 chooses to Cook for 30 seconds at 90% power with the turntable on, a well formed command of the taxonomic schema would be transmitted optionally to the taxonomy translator and to the taxonomy. The command of the form:

```
<command id=" microwave ">
  <device id="ovenCavity">
    <sequence>
      <step id="21">
        <char name="cycle" setting="bake"/>
        <char name="power" setting="90"/>
     <char name="duration" setting="30"/>
     <char name="turntable" setting="on"/>
      </step>
    </sequence>
  </device>
</command>
```

The taxonomy engine would then traverse the taxonomy structure to transform the well-formed command of the taxonomic schema to a well-formed command of the controller of software component D2 of the packet structure D28. The taxonomy structure is a superset of the taxonomy capabilities dataset. For each specifiable command element above (i.e. cycle, power, duration, and turntable) an additional collection of key words and values necessary to form packet structure D28A would be associated within the taxonomy structure. These key words would include API Id, Op Code, and position index into the packet structure D28A where position index could be a byte offset or a bit offset.

The taxonomy dataset could be constructed to directly represent the universe of possible commands of the APIs of software architecture D10 providing useful functionality for a service, factory, or laboratory engineer or technician.

Referring again to FIG. 47, it will be understood that the structure illustrated in FIG. 47 is more conceptual than physical. FIG. 48 and FIG. 49 show embodiments of the taxonomy architecture of FIG. 47, partitioned according to the physical architecture of an appliance or an appliance network as shown, for example, in FIG. 79.

The software component D1 (16B in FIG. 47) is represented as being within a remote client D22, such as a remote controller with a user interface. Consequently, the subcomponents of software component D1 (the selection builder, the command generator, and the status interpreter) are specialized for this user interface application. FIG. 48 shows software component D1 in such a user interface device, identified here as a "thick client." A thick client would have the ability to parse a data structure such as an XML document, interpret its meaning, and implement the 'Selection Builder' functionality. Software component D2 and the taxonomy architecture reside in the appliance D12.

FIG. 49 depicts a second embodiment of the taxonomy control architecture where all components are included within an appliance D12. In the structure of FIG. 49 the taxonomy architecture uses a taxonomy translator (not necessary in the embodiment of FIG. 48), thereby rendering the status interpreter of software component D1 to the reduced functionality of an input handler. The UI board in this case comprises an "a" side and a "b" side, each with its own processor. Both sides are connected to each other, preferably by a serial communication "c". The UI board is connected by another connection D14 to a CCU with software component D2, where the connection D14 can be the same type as connection "c", or it can be different. The "a" side is preferably an LCD controller that exposes a low level API, and lacks the full capabilities of a thick client. Hence, the "a" side can be referred to as a "thin client." The "b" side comprises the taxonomy Architecture and Software Component D1.

FIG. 50 is a more generalized block diagram of the architecture of FIG. 47 with elements rearranged for clarity and to show a less specialized configuration. In FIG. 51, it can be seen that the taxonomy engine comprises a taxonomy controller, a model, and a collection of operators. The taxonomy controller is aware of the state of the componentry for which it is controlling, and is responsible to retrieve from the taxonomy structure the state appropriate taxonomy model and inform the taxonomy engine of the change. This action provides an event to the appropriate taxonomy operator to examine the new taxonomy model and generate a new taxonomy capabilities data set. The taxonomy engine then publishes the new capabilities to the taxonomy manager, who then distributes the new information to the appropriate translators or other software components that have registered for notification.

It will be apparent from FIG. 50 that the selection builder, the status interpreter, and the command generator found in the software component D1 of FIG. 47 is now in the taxonomy translator. Taxonomy translator D2 comprises the selection builder and is responsible for the conversion of taxonomy datasets to software component specific interfaces. Therefore, in this example the software components are not comprised with the functionality of interpretation or generation of taxonomy datasets. Rather, they are comprised with handling inputs from the translator and sending outputs to the translator.

It is contemplated that a taxonomy architecture, through the use of multiple translators, can simultaneously connect to software components similar to software component D1 of FIG. 47 and software component D2 of FIG. 50.

Looking again at FIG. 52, it is generally known that complex data structures have tremendous advantages because they can be easily varied and re-used with a single complied source code. But this complexity can be troublesome to understand, create, troubleshoot, debug, explain, and generally manage. Object-oriented languages provide some level of hiding complexity relative to non-object oriented languages such as C. Similarly, XML data structures are human-readable, in contrast to byte arrays, and therefore can eliminate complexity. But it is currently cost prohibitive to implement technology such as XML or Java in most appliances for domestic use. This disclosure offers a visual configuration utility that simplifies handling complex data structures at much less cost than known systems.

Following the flow of FIG. 52, a designer in step 1 starts the visual configuration utility. A designer can be someone who does the role of product or feature planning, user experience, or user interface design, engineering, or anyone else with a need to retrieve value from or provide value to the information contained by an instance of a configuration held within the memory of the visual configuration utility. In step 2, the designer uses the configuration utility. In this step, the design will load a configuration file from a persistent store such as a hard drive or database or web site. Alternatively, it may be checked out from a document version control system such as visual source save.

In step 3, the designer creates a new configuration comprising a taxonomy structure or begins editing an existing configuration comprising a taxonomy structure. The editing process includes steps like adding new taxonomy elements, deleting taxonomy elements, moving taxonomy elements, or modifying the properties of a taxonomy element. Other sub-steps of step 3 may include binding taxonomy elements to message identifiers or functional identifiers of arbitrary software components of which taxonomy elements either relate to or represent. In step 4, the designer will save the taxonomy configuration appropriately and notify the appropriate office mates such that if one of the office mates is the appropriate controls development engineer, he may immediately acquire the saved taxonomy configuration file and begin step 5. In step 5, an appliance controls development engineer will generate a software and software data file appropriately configured such that a compiler can be invoked preferably from the Visual Configuration Utility to create a downloadable image appropriate for execution by a processor. Further, the controls development engineer will combine the generated software and software data file with a plurality of other arbitrary software components. Preferably, the Visual Configuration Utility can accomplish this task. In step 6, the appliance controls development engineer will invoke the compiler on the combined file and the compiler will generate a downloadable image. And in step 7, the appliance controls development engineer will download the downloadable image to the embedded appliance control processor and test the result. At any step in the process, the process actor may stop activities and move another step taking appropriate action to mitigate the incomplete step and/or the potential re-ordering of steps.

FIG. 53 and FIG. 54 depict an application built using a proprietary application framework. The taxonomy visual configurator of FIG. 53 would be used as a rule set to develop taxonomy structures. Once the taxonomy structure is configured visually, it can be transformed and exported into a functionally equivalent complex embedded data structure. (See step 3 of FIG. 52). Note how the taxonomy structure comprises multiple taxonomy structures, each associated with a unique appliance state. Examples of unique appliance states are found in FIG. 85.

Looking more closely at the example of FIG. 53, it can be seen that there is no wash phase definition. This is because a wash phase is not a valid feedback until the appliance is in a running state. In FIG. 54, there is no cycle definition. This is because during running, the cycle definition cannot be changed.

The data structure of FIG. 53 and FIG. 54 is very powerful and is the heart of the taxonomy architecture. It consists of a nested tree of elements where each element of the tree has a type where that type dictates to the taxonomy operators of FIG. 50 how to properly traverse and extract information from the Tree. Attributes should have corresponding Active Values which are one of the child Values of the plurality of child Values. Attributes contain a plurality of child Values which represent the valid selections of the Attribute. A Value which contains a plurality of Attributes is a Value which must be further specified by having each contained Attribute be defined by its contained active or selected Value. When a child Value is selected or active, the taxonomy operator looks to see if the child Value contains children of the Attribute type. If so, the taxonomy operator continues the tree traversal repeating the function of the taxonomy operator on the next level of the tree. Ranges are children of Attributes and are equivalent to a plurality of Values which can be mathematically derived from the values of min, max, etc.

The information contained in the data structures of FIG. 53 and FIG. 54 is therefore more useful than one would at first realize. For example, taxonomy operators can be written to do a variety of useful functions across a number of the elements of the taxonomy architecture, especially when there is a graphical user interface or an external client. A first taxonomy operator could use the data structure to determine what content should appear on a user interface. As a user makes selections on the user interface, the first taxonomy operator could re-examine the current active selections of the user and repopulate the user interface with the new valid user selections and the valid options of each. A second taxonomy operator could be informed of changes to the appliance state. Upon change to the state of an appliance, the second taxonomy operator could retrieve a new taxonomy capabilities dataset so that the user interface could be repopulated based on the new valid selections and or new valid operators for each. A third taxonomy operator can be configured to receive taxonomically correct inputs and check to see that the input corresponds to a valid well-formed command. The third taxonomy operator would accomplish this by walking the taxonomy structure in the taxonomy architecture of FIG. 50. The third taxonomy operator would evaluate all of the potential roots of the taxonomy structure and find a corresponding root identifier in the taxonomically correct input structure. From the root, the third taxonomy operator would begin to recourse down the tree, determining which branches of the tree to continue down by finding a corresponding identifier in the taxonomically correct input structure. When the third taxonomy operator reaches the end of the tree or alternatively exhausts the elements in the taxonomically correct input structure having used all of them at least once, a valid taxonomically correct input structure is determined if both there are no other un-accounted for elements in the taxonomically correct input structure, and there are no child elements remaining un-walked in the taxonomy data structure. This third operation is the equivalent of portable state-based business logic enabling the thin client D22 of FIG. 48 to be completely devoid of any logic associated with the operation of the appliance. The benefit of this is that user interfaces and all external clients with proper communication and taxonomy dataset interpretation operators can be developed with only knowledge of how to interoperate with taxonomy datasets, and therefore can be devoid of all knowledge of the connected device with which it is in operable communication.

Referring again to FIG. 56, a network architecture comprising two appliances D12, D12' and a third party device D22 of the type shown in FIG. 79 is shown. Each appliance has a plurality of nodes D16 comprising, in this embodiment, a CCU, a user interface UI, and several peripherals P1, P2, and P3 in communication with each other by a local network D14. Each peripheral can be a circuit board which may or may not have at least one microprocessor. On the UI board, there are shown two micro-processors uP1 and uP2, connected by a serial communication bus which is different from D14. The UI board typically has multiple network connections on USB, WIDE, and SPI networks. The third party device D22 may be able to send messages which are organized according to FIG. 82. Alternately, the third party device D22 may send messages in the form of a taxonomy dataset. In the latter case, the peripheral P3 could contain a taxonomy architecture which could create well-formed commands as shown in FIG. 82. The appliances D12, D12' communicate with each other over network D2102 and the third party device D22 communicates with the appliances over network D2100.

It will be seen in FIG. 56 that messaging can occur among microprocessors on the same board connected on a network different from D14. As well, messaging can occur between boards D16 on at least two networks where the networks are not of the same type. Further, messaging can occur between appliances D12, D12' between boards D16 carried on at least three networks where at least one of the three networks is a network external to the appliance. Yet further, the third party device D22 can communicate with nodes implementing SA or nodes that can route messages to a node implementing SA in accord with this disclosure.

It will be understood that the architectural characteristics of a network configuration normally impact the implementation of the arbitrary software components which communicate within the architecture. By "architectural characteristics", we refer to the distinctive features of individual networks, the way the various boards D16 are interconnected, and the combinations of network routes interposed between connected boards D16. An embedded virtual router in a processor on a board D16 in accord with this disclosure will enable the arbitrary software components in that board D16 to communicate independently of the architectural characteristics of the associated networks.

An advantage of an embedded virtual router according to this disclosure can be seen in an appliance having a plurality of useful arbitrary software components, each providing at least one useful consumer benefit. Since different consumers typically prefer different combinations of features, it has been a long standing problem in the appliance industry to be able to supply only the sub-set of specific features that an individual consumer would prefer. Typical approaches include (1) providing multiple appliance models or sku's, each with a unique feature set, and (2) providing an appliance with the superset of features insuring that the customer can have all the available features. Both are costly because arbitrary software components in appliances are hardware dependent; at a minimum, software for a board controlling a device in an appliance must be reworked for use in a different appliance, even if it is the same or similar device. This disclosure provides a third, more cost-effective alternative. With the use of an embedded virtual router according to this disclosure, all arbitrary software components are independent of one another with respect to their architectural location. An appliance manufacturer can thus provide a user-specific capability for an appliance at much lowest cost by providing an external client having any combination of arbitrary software components that can be purchased separately as part of an external accessory, but with full capacity to participate in all forms of useful communication with other arbitrary software components within the appliance because of the embedded virtual router.

Assume, for example, an appliance with three possible features: (a) a door switch, (b) an LED, and (c) an LCD, either or both of the LED and the LCD to indicate the state of the door switch. All versions of the appliance will have a door switch. But some will have only an LED, some will have LCD, and some may have both an LED and an LCD. With the prior art, the manufacturer has to provide three software architectures: one for communication between the door switch and the LED, one for communication between the door switch and the LCD, and one for communication among the door switch, the LED and the LCD. With an embedded virtual router according to this disclosure, designer need only have software architecture for the door switch and an embedded virtual router. An accessory can enable the door switch in any version of the appliance having an embedded virtual router to handle communication with any combination of LED and LCD, without further software architecture.

For another example, assume an appliance with three controller circuit boards, each having a feature. If a manufacturer sought to save costs by combining two features on a single board, any costs savings would have be adjusted by the added cost of reconfiguring the software architecture on the third board. A software architecture with an embedded virtual router according to this disclosure would enable such a change without the necessity of reconfiguring the software architecture.

In an embodiment of this disclosure embodiment shown in FIG. 127, a smart cable D120 comprises a smart coupler D1042 enclosed within a length of conduit with connectors D184 and D182 on either end. The smart cable D120 includes wiring between at least one external device D170 and the appliance D12 by way of the smart coupler D1042, such that the external client D170 and the appliance D12 are able to exchange information via the smart coupler D1042. Alternatively, the smart cable D120 can be hardwired to a network having the external client D170 thereon. The smart cable D120 can comprise any type of transmission line within the length of cable suitable for the purposes described herein. The smart cable D120 can comprise multiple types of cable and is preferably over-molded. The advantage of an over-molded cable is that it is a single article not subject to inadvertent separation from its component functional parts. This will make the total cost of ownership less and will make the distribution and testing of the smart cable D120 simpler. Examples include but are not limited to multicore cable, twinax cable, ribbon cable, optical fiber, twisted pair cable, dielectric slabs, or electric power lines, or any combination thereof.

In another embodiment illustrated in FIG. 128, a smart cable D420 comprises an appliance pigtail D422 and an external client pigtail D424 with a smart coupler D1042 connected therebetween. Both the appliance pigtail D422 and the external client pigtail D424 comprise a length of cable. The pigtails D422, D424 also include an appliance connector D482 and an external client connector D484 on their respective ends. The connectors D482, D484 are configured to communicatively couple the smart cable D420 to the appliance D12 and to the external client D170, respectively. The pigtails D422, D424 can be permanently coupled to the smart coupler D1042 at ends opposite the connectors D482, D484.

Alternatively, as illustrated in FIG. 129, the pigtails D422, D424 can be removably coupled to the smart coupler D1042 by smart device connectors D488 at ends opposite the appliance connector D482 and the external client connector D484, respectively. The smart device connectors D488 enable the pigtails D422, D424 to be interchanged with other pigtails having smart device connectors D488 on one end and different types of appliance connectors D482 and external client connectors D484 on the other. This facilitates connection of the smart cable D420 to a plurality of different appliances D12 and external devices D170.

Alternatively, appliance connector D182 or D482 can be coupled to a smart connector [defined below] for the purpose of coupling the smart cables D182 or D482 or a smart wireless coupler to an internal communicating node of the appliance not directly compatible with the interface provided for by D182 or D482.

The smart cables D120, D420 can be different types of cables in order to accommodate different transmission standards employed by different appliances D12 and external devices D170. For example, if the external device D170 connected to the smart cable D120, D420 uses two-wire cable, and the appliance D12 connected to the smart cable D120, D420 uses one-wire cable, the smart cable D120, D420 can comprise a one-wire portion of cable and a two-wire portion of cable with a suitable converter therebetween. Alternatively, the appliance D12, the external client D170, or the smart coupler D1042 can comprise a suitable converter for transmitting messages between different types of transmission lines.

Preferably, a conventional opto-isolation circuit for providing separation between the electrical networks of the coupled devices D12 and D170 is included in some portion of the apparatus comprising the smart cable D120, D420 and any smart connectors interposed between the client D170 and the appliance D12. Opto-isolation requires a D2 wire communication configuration, so preferably, the opto-isolator is provided in the portion of the apparatus where there is D2 wire communications. The opto-isolation circuit electrically isolates the appliance D12 from the smart cable D120, D420. A grid friendly appliance sensor (a type of frequency sensor—see discussion below) can also be included in the smart coupler D1040, the appliance D12, or any another node in communication on the network. The grid friendly appliance sensor instructs the appliance D12 when the AC Voltage frequency falls below a given threshold. An exemplary threshold is a lower threshold of D59.95 Hertz; when the monitored frequency falls below D59.95 Hertz, various loads of the appliance can be instructed or requested to turn off. A software component configured to respond to resource-related commands will determine the appropriate response to the information provided by the grid friendly sensor. Generally, the software component configured to respond to a resource-related command will not compromise the appliance cycle of operation with respect to any consumer benefit.

The smart coupler D1042 can be used as the primary smart component within several embodiments. For example, it is the smart component within the smart cable D120, D420. It can also be operated in a "stand alone" mode. In the stand alone mode, the smart coupler, D1042 can be connected to only one of the appliance D12 and the external client D170. The smart coupler, D1042 can receive power from the external client D170 or the appliance D12 in the stand alone mode or it can be powered by an auxiliary power source, which will be discussed in more detail hereinafter. The smart coupler D1042 is also the primary smart component within the embodiments of FIGS. 127, 128, 129, 130, 131, and 134.

Looking at FIG. 133, the smart coupler D607 can also provide information to any software component configured to respond to resource related commands with respect to certain standard energy information signals when it is in communication with a source of information about a resource D600. Such software component can reside on the smart coupler itself, in the appliance D12, in smart coupler D604, in client D600 and/or in device D616. An example of a source of information about a resource would be a power utility that would be in communication with a smart coupler. The signals can include but are not limited to a demand response (DR) signal instructing a component of the appliance D12 to reduce consumption of the resource, a signal indicating time-of-use pricing of the resource (TOU pricing), a critical peak pricing of the resource (CPP) signal indicating a significant short-term price increase due to demand exceeding supply or inability of the power grid to handle high-energy demands, a signal specifying real-time pricing (RTP), and critical peak rebate (CPR) signals indicating a rebate for reduced consumption at a given time. The software component configured to respond to a resource related command can reside in the smart coupler D1042, in the appliance D12, in the source of information about a resource D600, in a second appliance, or in any other node in communication with the smart coupler.

Referring again to FIGS. 127-131 and 134, the smart coupler D1042 or smart wireless coupler can also include authentication and encryption capabilities. Authentication serves to validate the connected appliance D12 and/or external client D170, and/or applications included on the appliance and/or on the external client D170. Encryption acts as a key to unlock and expose the appropriate services to the connected appliance D12, external client D170, or application and prevents the unauthorized use of services which are not exposed and not intended for use by a non-authenticated appliance, external client, or application. The smart coupler D1040 whether wired or wireless can include special, proprietary electronics that enable communication between the appliance D12 and the external client D170. As a result, unauthorized persons who lack the smart cable D120, D420 or smart wireless coupler cannot couple an unauthorized external client D170 with the appliance.

Any of the connectors D182, D184, D482, D484, D488 or an appliance connection element D400 can be a smart connector. A smart connector is a wired or wireless connector that has specialized circuitry, structural adaptations, hardware, and/or software that provide additional functionality beyond that of a conventional connector. Conventional connectors are passive devices that do not modify or examine the packets sent therethrough. The function of a conventional connection is to electrically mate the pins of one connector to the corresponding sockets of another connector. In addition to the conventional function of a connector, smart connectors can incorporate one-wire to two-wire conversion, other types of conversion, level shifting of the electrical signals, power management functionalities, protocol translation, opto-isolation, authentication, encryption, mechanical adaptations or any combination thereof. A smart connector can be more or less permanently connected to an appliance. Smart connectors can be ganged or daisy chained together to provide a composite function from a collection of functions comprised by each individual smart connector. Power management functionalities can include AC/DC conversion and the ability to control the amount of power drawn through the smart connector. Smart connectors can also be designed so as to expose additional networks or other points of connectivity; for example, a smart connector can have a first connection point designed to accept a smart cable D120, D420 as well as a second connection point designed to accept a second cable of a specialized diagnostic device. Preferably, the appliance connection element D400 is a smart connector (see FIG. 132 and D400).

For example, the embodiment illustrated in FIG. 130 comprises a smart wireless coupler D290 coupled to a smart cable D296. The smart wireless coupler D290 comprises a first wireless communicating component D292 communicatively coupled to an external client/smart device D170 and a second communicating component D294 in communication with the first communicating component D292 and communicatively coupled to a smart coupler D1042 of the smart cable D296. The smart cable D296 comprises the smart coupler D1042 and an appliance pigtail D298 similar to the appliance pigtail D222. The appliance pigtail D298 communicatively couples the smart device D170 to the appliance D12.

Looking to FIG. 131, the smart coupler D1042 comprises a microprocessor D320 having at least one arbitrary software component stored in the memory thereon. The arbitrary software component can be an application or driver stored in memory thereon and accessible by any external clients D170 or other appliances connected to the smart coupler D1040. Preferably, the arbitrary software component comprises at least a driver for enabling communication between the smart coupler D1042 and a second device coupled to a network on which coupler D1040 is also coupled. An exemplary arbitrary software component is an SA driver. Referring again to FIG. 92, client D1004 can establish minimal functional communications with smart coupler D1042 as long as D1004 is configured with the proper port driver D1072. Further, SA driver D1016 or a useful application such as a service and diagnostic software application in the form of an arbitrary software component D1060 can be automatically sent to or loaded by client D1004 from the memory of smart coupler D1042. In this way, a smart coupler can enable connected clients to install software components necessary of full functional communications from the smart couplers with which they are connected, or conversely, the smart coupler can install the software on the client. Likewise, a smart coupler can use the internet connection of its connected clients to retrieve new arbitrary software components for its own internal operation or for further distribution to other any other coupled clients D170 or any appliances D12. The smart coupler D1042 can further comprise any number of additional arbitrary software components.

Looking again at FIG. 131, the microprocessor D320 can include any number of elements common to microprocessors, such as ROM, RAM, on-chip flash memory, transistors, and various communication buses. The smart coupler D1042 further includes analyzing circuitry and software that monitors physical signals associated with the circuitry coupled to at least one transmission media. This feature can be useful during the diagnosis process because the client D1004, 170 can check the health of D1030 before commencing any useful diagnosis processes requiring communications with appliance D1000, D12.

The smart coupler D1040 can further comprise an alternate power source D332, an interface expander D324, a variable display D326 enabled to display licensable content simultaneous with indications about the information relating to the smart coupler D1040 and information about devices with which it is in communication with, and a removable memory D330. The smart coupler D1040 can be powered via connection to the external client D170 and/or the appliance D12. When in "stand alone" mode, or at a user's selection, the smart coupler D1040 can also be powered by the alternate power source D32, which can be electrically isolated from the appliance D12 and/or the external client D170. The alternate power source D32 can be a battery. The alternate power source D32 can also be a connection to another power source, such as a wall transformer that can be plugged into a conventional electrical outlet.

The interface expander D324 comprises a plurality of ports D336 for enabling the microprocessor D320 to communicatively couple with a plurality of additional external auxiliary sources of information. Each port D336 can be configured by a port configuration tool D338 in order to communicate with the plurality of external auxiliary sources of information having their own physical connection and protocol requirements. The port configuration tool D338 can reside on a PC and couple to the smart coupler D1042 via D484 (for example). The importance of the port configuration tool is that it allows the interface expander D324 pin definitions to be redefined by the client D170, D1004. Alternatively, the port configuration tool D338 can be stored in the memory of the smart coupler D1042 and for uploading by or installing on the client D170, D1004.

The removable memory D330 can also be used to configure the interface expander D324 by using an external client D170 having the port configuration tool D338 thereon to write instructions to the removable memory D330. Once the removable memory D330 is connected to the smart device D180, the microprocessor D320 can read the instructions on the removable memory D330 and configure the ports D336 accordingly. Examples of the different pin configurations on the interface expander D324 include but are not limited to a general purpose input/output, a power port, a wireless port, a USB port, a serial ports like SCI, SPI or RX, TX, a ground, an analog-to-digital converter port, a plurality of Boolean IO Points, analog inputs and outputs configured in the form of 0-5 Vdc, +/−10 Vdc, D4-20$ma$, PWM outputs. The removable memory D330 can also be used with the smart coupler D1042 to deliver upgrades, deliver applications, store data and event logs, deliver and store data about a cycle structure, deliver and store information about a resource, deliver drivers or other applications to an external client D170, hold data about messages, hold data to populate a routing table, and hold data about consumables. The display D326 can visually convey information about the status of the smart coupler to a user. An exemplary display can consist of tri-color LED lights that produce different patterns depending on the status of the smart coupler. The display D326 can also include an illuminated image depicting a brand name, logo, or other indicia associated with the appliance.

The interface expander D324 can be configured to couple to any electronic peripheral including sensors, data sources, and auxiliary communicating nodes. An auxiliary wireless device D350 can be coupled to the interface expander D324 when it is properly configured. It is anticipated that when smart coupler D1042, receives a propagated message, smart coupler will propagate the message to the networks to which its coupled including any network configured to receive the propagated message that is in communication to the smart coupler D1042 coupled to the smart coupler D1042 via the interface expander D324.

Referring to FIG. 132, the smart coupler D607 is directly coupled to appliance connection element D400 on the appliance D12 in a direct mount configuration. In this embodiment, smart coupler D1042 further has a smart auxiliary wireless communicating component D350 coupled to the smart coupler D607 via the interface expander D324. In this embodiment the interface expander D324 has at least some of its pins configured as general purpose input Booleans with an associated component of software configured to receive messages from a source D600 of information about a resource. In this embodiment, the path of the messages is between the source D600 of information about a resource and a first coupler D604, then between the first coupler D604 and the smart auxiliary wireless device D350 which acts as a second coupler. Then the messaging passes between the smart auxiliary wireless communicating component D350 and the smart coupler D607 directly mounted to the appliance D12, where the transmission media coupling smart auxiliary wireless communicating component D350 to the smart coupler D607 is the Boolean or Binary network provided by the interface expander D324. The advantage of this network, optimally configured for resource messages, is that it allows a decoupling point between two complex halves of the network where the first half comprises componentry from the source D600 up to the interface of the interface expander D324, and the second half comprising the interface expander D324 through the appliance D12. As the configuration of the interface expander D324 in this embodiment is exceedingly simple, the information contract comprising the aforementioned exemplary energy management signals (DR, TOU, and the like) is most easily and rapidly described, promoted, and adopted. Further, the information contract is advantageous when the messaging architecture and protocols implemented by the smart couplers in communication on either side of that contract are different from one another, and where the dissimilarities of the differences are significant from one region of the country to the next or one type of appliance coupler to the next, and so on.

The appliance connection element D400 provides access to an internal network D402 of the appliance D12 as is illustrated in FIG. 134. The internal network D402 connects the various internal components D404 of the appliance D12. The appliance connection element D400 can connect to any internal component D404 of the appliance, such as a control board, or it can connect directly to the internal network D402. The appliance connection element D400 can be a standardized connection element integrated into all appliances manufactured by a particular company, or it can be a specialized connection element unique to certain models of appliances. A single instance of an appliance D12 typically comprises multiple various and different embodiments of the connection element D400 where there is at least one connection element on each node D404 in communication with the network D402 and at least one additional connection element D400 for connecting external clients such as a smart coupler D1042.

Referring to FIG. 134, an appliance connection element D400 can be a conventional connector or it can be a smart connector. It can be configured to facilitate communication between the appliance D12 and the smart coupler D1042. If the appliance connection element D400 is not structured to receive the desired connector on the smart coupler D1042, a suitable connector adapter can be used, e.g., a conventional connector or a smart connector. In this way, the smart cable D120, D420 or a smart coupler D1042, or the 'Appliance Half' of the smart wireless coupler can be connected to any appliance connection element D400 by using a suitable connector adapter. An example would be a converter dongle that plugs into the appliance connection element D400 and provides a suitable port for receiving the connector D482 or D182 (see FIGS. 127-131 and 134). Another example is an adapter comprising a length of cable with connectors at each end configured to couple to the smart coupler and to the appliance D12, respectively. Adapters and smart connectors can also be used to communicatively couple the external device D170 with the smart coupler. Preferably, an appliance comprises an appliance connection element D400 configured as a smart connector and further configured to receive external clients either by a direct mount or by a length of cable and further configured to receive external s installed by the consumer without uninstalling the appliance D12 and without, or without significant tool usage.

FIG. 133 illustrates a system where resources in the appliance or any other resource consuming device configured for communication can be monitored, managed, or changed as in the form of an energy controller accessory. The energy controller accessory can stand alone or be incorporated into any element of the system. A likely scenario has a smart coupler D607 directly mounted and connected to the appliance D12 by a network D608. The network D608 can be a WIDE network as described previously herein. The smart coupler D607 also connects to a connecting element D604 via a second network D606 that can be a different type of network from network D608. The connecting element D604 can be a second smart coupler, a smart connector, or a conventional connector. If network D602 is a different type of network from network D606, the connecting element D604 is a smart coupler or a smart connector having protocol conversion capabilities. An example of the network D606 is a wireless ZigBee network and an example of the network D602 is the Internet.

Smart coupler D604 connects to a source of information about at least one resource D600 generated or used by the appliance D12 and/or by a different kind of resource consuming device D616 such as a light switch, ceiling fan, water heater, or the like. The connection between the smart coupler D604 and the source D600 is by a third network D602 that can be a different type of network from either network D608 or network D606. Assume that the source D600 wants to send information about at least one resource to the appliance D12 or to the device D616. The information can include a request for a change in the operation of the appliance D12 based on the information. The resource can be electricity, hot water, gray water, gas, water, replaceable parts, or other consumables. The source D600 can send information about multiple resources if desired. This disclosure enables a source of information about a resource D600 in effective communication with consumers of the resource to affect the level of consumption of that resource. Preferably, the source D600 of information about a resource is communicatively coupled to the network D602 to communicate with a second node, having SA for example, which may be among several on the appliance D12 or on the device D616. We assume that the source D600 has at least an appropriate communication driver, or one of the smart coupler D607 and the connecting element D604 has software to translate any message from the source D600 to the aforementioned communication protocols, for example.

In this scenario, the source D600 sends a discovery message over the network D602 seeking any consumer of resources to which the source D600 wants to send information. The connecting element D604 receives the discovery message, translates the message, if necessary, and propagates the discovery message to the next nodes over the network D606, including the smart coupler D607 and devices D616. Coupler D607 receives the discovery message, translates the message, if necessary, and propagates the discovery message to the next nodes over the network D608, including the appliance D12. The relevant nodes in the appliance D12 evaluate the message and determine a discovery reply message, and send respective discovery confirmation messages. Here, we assume at least one reply is positive.

The discovery confirmation message is received by the smart coupler D607, which populates its routing table with routing information about the replying nodes and with identifiers about the replying nodes and sends at least one identifier representing the information in its routing table to the connecting element D604, which populates its routing table preferably using the same technique as D607 and sends at least one identifier representing the information in its routing table to source D600 in accord with the foregoing process. Each node retains the relevant identifiers (routing information) so that subsequent message can be communicated without repeating the discovery sequence. As well, those nodes with memory, such as the couplers, can be configured to save messages.

The functionality described above can be extended to communicate information from the source D600 to an additional device D616 connected to the network D606 by a network D612. The device D616 can be an additional appliance D12 or other device that is configured to utilize information from the source D600.

With this structure, if an electric utility is facing a brownout, for example, a source of information about the electricity can send a general message asking for resource consumption reduction to the plurality of communicating nodes which had previously positively responded to the first discovery message sent from D600. The general message is propagated by the plurality of smart couplers coupled to D600 via the network D602 or other networks to which D600 is coupled. Similarly, a source of consumables, such as filters or spare parts, can ascertain from an appliance the status of the consumable and send information about the timing and availability of replacement.

In certain embodiments, there could be a first appliance with a graphical user interface coupled to a smart coupler in communication with a source of information about a resource. The first appliance could also be in communication with a second appliance via at least one smart coupler. The second appliance does not have a graphical user interface. A user of the first appliance could input a parameter into the graphical user interface, such as a price threshold at which the user would prefer to reduce the level of consumption of a resource. This parameter could be stored in the memory of a node in first appliance, in the memory of a smart coupler in communication therewith, or in the memory of the source of information about a resource. When a message is received from the source of information about a resource, the software component configured to respond to information about a resource can use the parameter to determine the response to the information about a resource. The response could be to change the operation of the appliance to reduce a level of resource consumption. The response could also include sending message to the second appliance. The message to the second appliance could either be a command to reduce a level of resource consumption or a message to a second software component configured to respond to the information about a resource. Further, information about the response to the information about a resource can be displayed on the graphical user interface, and the information about the response can come from the first and/or the second appliance.

It should be noted that using discovery messages to populate routing tables is the preferred embodiment. However, routing tables can also be populated using conventional configuration methods involving a manual or semi-manual configuration process. In addition, a manual or semi-manual configuration process can be used in addition to discovery generated routing tables. In this approach, the discovery process or the configuration process can incrementally add or delete routing information within a routing table.

As illustrated in FIG. 134, a smart coupler D1042 can be communicatively coupled to the appliance D12, an external client D170 in the form of a diagnostic PC, and a source D500 of information about operation of the appliance D12 so that failures or other problems in the appliance D12 can be diagnosed, monitored, and/or resolved. The smart coupler D1042, which could be a smart cable D120, D420, is communicatively coupled to a network D402 of the appliance D12 via connection element D400. The smart coupler also connects to the source D500 directly via the interface expander port D324 or via an auxiliary wireless or wired communicating component coupled to the smart coupler via the interface expander port D324 and via a wired or wireless communicating component D350 (see FIG. 132). The wireless communicating component D350 can be any arbitrary wireless or wired communicating component able to establish communications with the wired or wireless communicating component coupled to the interface expander port D324.

The source D500 connects to the appliance D12 in a manner enabling the source D500 to obtain information about at least one operational parameter or measured value associated with the operation of the appliance D12, e.g., direct connection D505. Exemplary operational parameters include power consumption, temperature, data about the cycle of operation, vibration, noise, and the like. The source D500 can communicate with the network D402 to send information about at least one operational parameter of the appliance D12 to the smart coupler and/or diagnostic PC. Alternatively, the source D500 is not in communication with the network D402 and monitors at least one operational parameter of the appliance D12 by other means. For example, if the appliance D12 is a conventional washing machine, the source D500 can be in communication with an accelerometer attached to the exterior of the washing machine for monitoring vibrations, which enables the detection of an imbalance in the washing machine.

The source D500 can communicate with the smart coupler, the appliance D12, the diagnostic PC, or any combination thereof. We assume that the source D500 has at least an appropriate communication driver, or at least one of the smart coupler, the appliance D12, and the diagnostic PC has software to translate any message from the source D500 to the aforementioned communication protocols, for example. It should be understood that the functionality employed by the source D500 can include functional identifiers which can be discovered through propagated messages by any node in communication therewith.

If the appliance D12 experiences a failure that requires a service person to visit the appliance D12 in the home, the service person can couple a PC or other portable computing device to the appliance D12 to diagnose the problem using at least one of the smart cable D120, 420 or using the smart wireless coupler, or by using a service key, or by using a central collector. Problems can be diagnosed by sending low-level commands to the appliance from the PC instructing various components in the appliance to turn on or off and/or change their operating parameters. One exemplary way of accomplishing this is by using multiple modes of operation as disclosed above, whereby the client puts at least one software operating layer into a different mode, and the different mode configures the software architecture to receive and act on a different set of messages that provides a different set of functionalities to the external client. Information from the source D500 regarding the operation of the appliance D12 can then be examined in order to see if the instructions from the PC have resulted in a predictable outcome. For example, in order to test a heating element in an oven, the PC would send a command to the oven instructing the heating element to turn on. A measured temperature of an oven cavity having the heating element therein can be sent to the PC by the source D500 or from componentry (including a smart cable) connected to or in communication with internal components D404 or preferably both. This information can be used to determine whether the heating element is functioning properly and heating the oven cavity to a desired temperature.

Information from the source D500 can also cause the PC or any other element in the system to prompt a user at a user interface to choose at least one component D404 to be turned off in the appliance D12, or to take some other action. A user can also enter default actions at the user interface to be taken in response to the receipt of certain information from the source D500. For example, a user can configure the heating element to turn off if the source D500 notifies the system that the temperature of the oven cavity is dangerously high.

Alternatively, the failure code can be sent directly to the appliance D12 to turn off a low-priority component D404. Failure codes can also be sent to the smart coupler, which can use the processor D320 to analyze the code and generate appropriate instructions to be sent to the appliance D12.

Looking again, FIG. 57 illustrates the process of creating the main structures D74 of the embedded virtual router D70 (see FIG. 55). The three main structures D74 comprise a capability table, a dependency table, and a routing table. Each software module operating over the appliance network or among appliances and accessories contains its own capability and dependency information. The compiler pre-processor executes a set of EVR builder macros at compile time to create a capability table and a dependency table (that may be in composite form) for the downloadable software image. Reveal discovery completes the process by populating the routing table. Although FIG. 57 shows the creation of the dependency and capability table on compiling, all can be created at runtime. The routing tables simply inform the application layer how to 'get to' other software specified in its dependency list. Routing tables are populated based on a first set of software modules stating a set of "needs" in the dependency table and a second set of software modules stating a set of "haves" in the capability table. For "needs," the implementer specifies what software modules (classes) are needed by this software module. For "haves," the implementer specifies what software modules (classes) are available.

Referring again, FIG. 58 illustrates how the embedded virtual router D70 can enable different hardware components D16, D16', D16" to be virtually chained together. This virtual chaining enables messages to be sent from the application logic D59 of a first hardware component D16 to the application logic D59 of a third hardware component D16" without the first hardware component D16 having to know anything about the route that a message will have to take by using structures D74 contained in each component's embedded virtual router D70. Each hardware component D16 D16', D16" includes at least one arbitrary software component, e.g., software components D1060 (see FIG. 92). Each hardware component D16, D16', D16" also includes an SA driver D1016 and a WIDE driver D1064 (see FIG. 92). Network D14 connects the first hardware component D16 to the second hardware component D16', and network D14', which is a different network from network D14, connects the second hardware component D16' to the third hardware component D16". Routing tables comprising the information on the structures contained in the memory of the first hardware component D16 and of the second hardware component D16' of FIG. 58 are used to encapsulate the complete route from the first hardware component D16 to the third hardware component D16". This enables a message to be sent from the first hardware component D16 to the third hardware component D16" without the first hardware component D16 having knowledge of the route between the second hardware component D16' and the third hardware component D16". The message can be propagated such that a first message is sent from the first hardware component D16 to the second hardware component D16' while a second message is sent from the second hardware component D16' to the third hardware component D16". In this manner, the routing information necessary to route the message from the first hardware component D16 to the third hardware component D16" is contained in part within each of the first and second messages.

Object Oriented Control Protocol:

FIG. 59 exemplifies the relationships among the structural components within an appliance object-oriented control protocol D1100 according to this disclosure. An appliance D1102 has an appliance control system D1104 enabling it to perform a physical operation on an article. The appliance control system D1104 has at least one control board D1106 of a type well known in the art, each control board D1106 having at least one processor D1108 able to execute software (also known sometimes as firmware) within a software operating environment D1110 and control some part of an appliance control system apparatus D1112. Controlling an appliance control system apparatus D1112 means changing the state of one or more hardware components D1114 in communication with the processor D1108 by an action of the processor D1108. The appliance control system apparatus D1112 comprises such things as electro-chemical actuators D1116, sensors D1118, driver circuits D1120, signal conditioning circuits D1122, transmission media D1124, and other hardware components D1126 necessary to effectively perform a physical operation on an article, including, but not limited to, electro-mechanical devices and electro-thermal devices. For example, a valve may be changed from a closed state to an open state in response to a signal from the processor D1108. This represents the control of the valve by the processor D1108. The processor D1108 may effect this change of state by changing the state of one of its IO Pins which is in effective communication with the hardware component D1114 or by sending a network message where the network is in effective communication with the hardware component. Effective communication refers to the ability to send and receive messages with meaningful information without defining the exact means by which communication is achieved. The software that the processor D1108 executes can comprise any of a plurality of arbitrary software components D1128, each with a well-defined functional purpose and a well-defined interface for enabling a second component to be compatibly designed and to be communicatively coupled. An arbitrary software component D1128 is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. Other examples of arbitrary software components D1128 as shown in FIG. 59 include algorithms D1130, a software architecture D1132, an embedded virtual router D1134 (such as D70 in FIG. 55), an internal appliance communication protocol such as WIDE D1136, a class library object D1138, a class X object D1140, an object of class X D1142, a cycle engine D1144, a cycle engine API D1146, a cycle structure D1148, and data about a cycle structure D1150. Class library object D1138, class X object D1140, and object of class X D1142 are described more fully below with reference to FIG. 135. The processor D1108 can also be in communication with one or more other networks D1164, each of which can have one or more other processors D1166. This organization has numerous advantages including increased manageability, readability, portability, configurability, and re-usability.

Various configuration mechanisms D1152 are available to create, change or initiate the behavior of the appliance control system D1104. The configuration mechanisms D1152 include anything that can create, delete, change, stop, or initiate behavior in the appliance control system D1104. The configuration mechanism D1152 can, for example, be an arbitrary software component D1154, data about a cycle structure D1156, data about a consumable D1158, an appliance accessory D1160, a client D1162, or other examples not illustrated in FIG. 59, including, but not limited to a control board, data about an algorithm, data about a consumer benefit, data about a consumer preference, data about a consumer, data from a consumer, data from a user interface, a functional component with a driver configured to communicate with an appliance, a remote user interface, a functional component able to generate or communicated a taxonomy dataset, any other functional component in operable communications with the appliance control system, or any functional component of the appliance control system or another appliance control system. This disclosure introduces methods, techniques, messaging protocols, and software componentry as the building blocks for a new, intelligent appliance control system that will enable the appliance control system D1104 to be effectively built from re-usable components and to be dynamically configured by at least one among a variety of different configuration mechanisms D1152. An object-oriented control system D1100 according to this disclosure will deliver the benefits of re-usability, robustness, quality, and configurability.

Configurability is one of the hallmarks of the oriented control system D1100. Object oriented programming has not heretofore been suited for inexpensive real time embedded control systems because it generally requires more memory and was thought to be cost prohibitive as compared to procedurally-oriented or hard-coded control systems. Moreover, real time embedded control systems are very inflexible due to the nature of the procedural programming methodologies used in very small micro-processors exemplified by those ranging from D4-D16 bits of address space and D8$k$ to D64$k$ of ROM with very little RAM. This disclosure anticipates that sufficient and cost-effective memory is now or soon will be available for an embedded real time control system to allow the cost-effective commercialization of an object oriented real time control system. This disclosure also incorporates an expansion of an object-oriented real time control system to include a distributed object oriented real time control system wherein at least one object-oriented real time control system is operatively coupled to another node on a network or to a component with an embedded virtual router provided to direct message traffic. The expansion enhances this disclosure by allowing multiple components of the design to be interoperable and useful in a plurality of various combinations, therefore further enhancing the value of this disclosure in the areas of re-use, configurability, flexibility.

Definitions of Object Oriented Terms: Basic.

Object oriented techniques in software architecture, such as the software architecture D10 discussed with reference to FIGS. 79-81, 83, 84, 86, 88, and 55, and D4018 in FIG. 92, and D1132 in FIG. 59 promote and enable software re-use. A first component enabling re-use is the class library. Class library contains a plurality of class definitions. A class definition comprises an interface with a plurality of method definitions and a plurality of field definitions.

Field definitions are named variables that have a known data type. The value of a field definition must be a value corresponding to the field data-type. For example, say field x is an unsigned integer. The value of x can be a number within the range of 0 to D65535. Field definitions can also have a data-type corresponding to another class definition.

A method definition is a function with a name and a description, a return value, and a set of arguments. Each argument of the method can also have a name and a description. Each argument can also have a data-type and a set of valid values. The data-type can also be a class definition.

Each method definition further comprises executable software which can use the arguments in conjunction with the executable software so that the executable software returns a result and/or executes the behavior corresponding to the logic of the executable software and the values of the argument received in the set of arguments. A method definition can further comprise invocations onto other method definitions of its containing class or to method definitions which it has visibility to. The approach to gaining visibility to other classes' methods is known in the art. The return values from the other method definitions can be used by the executable software of the first method either to influence the return value of the method or to influence the behavior of the logic of the executable software.

Preferably, a class definition is confined to a single logical purpose to which the plurality of methods contributes the enablement thereof. A class library can be governed independently of the appliance control system to which it is applied. Class library governance includes deployment, documentation, development, testing, bug fixes, revision control and the like.

Class definitions are made executable in two ways. The first way is via a method known as static. When a class is executing statically, all executions of the methods of the class are occurring within the same memory of the processor. This means that if there are two executions occurring simultaneously, the methods of the class must be designed such that any state information used within the execution and stored in memory by a first execution is guarded against inadvertent use by a second execution.

Two factors giving rise to the second way are that D1) it is advantageous for methods to store state information in memory for later use and D2) to enable the first way, it is required to index that state information to a particular execution or execution context so that when there are multiple executions or execution contexts that the method can retrieve the appropriate state information.

Therefore, the second way a class definition is made executable is by instancing a class into an object thereby creating the mechanisms to assign an instance of a class to a particular execution or execution context. Instantiation refers to the allocation and assignment of memory sufficient to hold a unique collection of information associated with a unique object instance and defined by the field and method definitions of the class definition.

Instantiation is the mechanism which allows a class's state information and references to other objects to be encapsulated together and associated with a particular execution or execution context and to expose that instantiated memory to other objects via some type of memory pointer or unique identifier.

An object has the ability to store information associated with its execution context and in its fields. When an object has a field of a data-type that corresponds to a class, the value of the field can be an object. In this way, objects can be composed of their own fields of data and methods and of a plurality of other objects.

Definitions of Object Oriented Terms: Advanced.

Patterns, pattern categories, frameworks, and layer architectures are terms of art that reference certain advanced design concepts which are not applied to real time embedded control systems. A design pattern is a standard solution that addresses a recurring design problem. Well known design patterns include Composite, Recursive Composition, Observer, Builder, Factory, Abstract Factory, Strategy, Decorator, Façade, Singleton, Adapter, Proxy, Command, State, Hierarchical State, Iterator, Façade, Flyweight, Template, and Chain of Responsibility. Patterns are organized into Categories of Creational, Structural, and Behavioral wherein each pattern belongs to only one category. Structural patterns are used to organize objects into appropriate structures associated with the domain of the design. Objects organized according to creational patterns facilitate the creation of the structures. Objects organized according to behavioral patterns operate on the structures for the purpose of creating a result such as modification, addition, deletion, data extraction, data calculation, and the like. The advantage of this type of organization is that certain arbitrary software components are more re-usable. For example, a portion of a cycle engine that executes the cycle can be the same software for every appliance because it is configured to operate on the components configured using the composite pattern to representing a cycle structure. A second portion of the cycle engine is configured according to the builder pattern so that it can retrieve data about the cycle structure and create the cycle structure from the data about the cycle structure. Using this technique, a plurality of appliances can be configured to perform a plurality of operations providing a plurality of consumer benefits using exactly the same software except for the values of the data about the cycle structure. Even the location of the data about the cycle structure can be different and distributed by configuring the Creational component with advance discovery techniques (previously described in CyclesOfOperationsAccessory). Without these techniques, a reasonable level of re-use and configurability would not be possible.

Frameworks are more specialized than pattern. Frameworks are a plurality of software components operatively coupled to address a specialized problem domain with an expected set of variability. In other words, a framework is designed to solve a set of related problems wherein some instances of the related problems are not known but anticipated and wherein the framework can operably address the some instances when the some instances occur without additional changes to the framework. A layered architecture is a plurality of frameworks that are in operable cooperation wherein each of the frameworks is independent and can be used in other occurrences of layered frameworks.

This disclosure further includes an appliance control system for controlling an appliance control system apparatus using a layered architecture of a plurality of frameworks wherein each framework comprises at least one implementation of an object oriented pattern. Preferably, there are multiple patterns implemented wherein there are patterns for creating structures, structures, and behavioral patterns that operate on the structures.

Alternatively or additionally, this disclosure comprises an appliance control system for controlling an appliance control system apparatus using objects instantiated from class definitions.

Typically, a software operating environment which supports object oriented techniques is able to allocate RAM memory dynamically at runtime. Dynamic memory allocation might be used when new objects are created because address and memory space must be allocated to hold the data associated with the object and any address identifiers required for operable use. There is a correlative relationship between memory allocation and object creation; as well there is a correlative relationship between object creation and configurability of the behavior of the arbitrary software components within the object oriented software operating environment. This disclosure encompasses an appliance control system configured to allocate memory at runtime for the purpose of assigning memory to instantiated objects.

Dynamic Configuration.

As previously stated, objects can be composed of a plurality of other objects according to the objects field definitions. If an object comprises a method which has executable software to set the value of a field defined to hold an object, then that object can be reconfigured by changing the value of the a field from a first object to a second object. This reconfiguration can then result in a different composite or overall appliance control system behavior. There are many useful purposes for an appliance control system whose behavior can be changed by changing the values in a first objects field to a third object from a second object. For example, a cycle accessory could use this technique to change a cycle structure. Likewise, both a consumables reader and a recipe book wand could use these techniques to customize the behavior of the appliance control system according to the data about the cycle, the data about a consumable, and the like.

There are many mechanisms which can initiate and manage the Dynamic Configuration of an appliance control system. However, these mechanisms (see FIG. 59) will need a common design framework with which to accomplish the dynamic configuration. And some portions of the dynamic configuration can be accomplished during the compile process while other portions may be accomplished at post-compile time (a/k/a runtime).

In any event, FIG. 135 discloses the basic mechanisms needed to create and manage the software portion of an appliance control system, such as the appliance control system D1104 from FIG. 59, comprising at least one class library D1138 with classes that can be instantiated as objects D1140 and referenced to other objects in a form of at least one composite structure, and the configuration mechanism, such as the configuration mechanism D1152 from FIG. 59, which may be a client, client accessory, or another arbitrary software component, either within a shared runtime environment with the other objects in the diagram or in effective communication with the other objects across a network.

In message D1, the configuration mechanism D1152 is able to discover the available functionality of the software operating environment exposed with the discovery software architecture D10 or the embedded virtual router D70 by sending a message to the discovery software architecture D10 or the embedded virtual router D70 to getClassLibrary( ).

This message is a form of discovery of functional identifiers, and is restricted to discovery of classes and not instances of classes. The class library D1138 is itself an object instantiated from the ClassLibrary class. An example of a unique numeric functional identifier in an appliance would include an API ID plus Type and Version.

In message D2, a unique numeric addressing identifier is returned so that the configuration mechanism D1152 can address the class library object D1138 directly. An example of a unique numeric addressing identifier in an appliance would include Node ID plus API ID.

In message D3, the configuration mechanism D1152 sends a message to the discovery software architecture D10 or the embedded virtual router D70 with a unique numeric addressing identifier D1168 enabling it to be forwarded to the object corresponding to the unique numeric addressing identifier (in this case, oid1 for the class library D1138).

In message D4, the discovery software architecture D10 or the embedded virtual router D70 forwards the message getClasses( ) to the class library object D1138.

In message D5, the class library object D1138, returns unique numeric addressing identifiers for objects representing the classes contained by the class library objects.

In messages D6 and D7, the configuration mechanism D1152 sends a message to the class library object D1138 requesting unique addressing identifiers D1170 for objects D1140 instantiated on Class X. Class X is specified as an argument to the message and Class X is represented by a unique numeric functional identifier also known as a class identifier.

In message D8, the unique numeric addressing identifier D1170 is returned allowing the configuration mechanism D1152 to address subsequent messages to the object D1140 representing the Class which is identified by the unique numeric functional identifier of X [where X can be any number].

In messages D9 and D10, the configuration mechanism D1152 sends a message to the object D1140 representing Class X requesting unique numeric addressing identifiers D1172, D1174 for all objects D1142, D1176 instantiated on Class X.

In message D11, a collection unique numeric addressing identifiers D1172, D1174 are returned.

In messages D12 and D13, the configuration mechanism D1152 requests that the object D1140 representing Class X create a new instance of Class X.

In message D14, Class X returns the unique numeric addressing identifier of the new instance.

In messages D15 and D16, a method is invoked on an instance of Class X where the first argument is MID which is an identifier of the method to which the request is purposed for. [MID is the equivalent of OP code discussed above.] A second set of arguments are arbitrary and will correspond to the method definitions of the class of which the object is instantiated. In this case, one of the arguments is a second unique numeric addressing identifier for a second object different from the object receiving messages D15 and D16. This allows the oid4 to address a subsequent message contained within the software of the method corresponding to MID to oid5. In this case, the software of the method corresponding to MID could have set a field value of oid4 to oid5 resulting in oid4 being partially composed by oid5.

Composition is a preferred technique to create re-usable structures. Black-box re-use refers to establishing or changing structures of composition of objects at runtime by enabling objects to obtain references to other objects at runtime. Adopting this technique allows an object-oriented control system to be modified at runtime by a plurality of configuration mechanisms. Several embodiments of appliance functional configurations can benefit from black-box re-use techniques. Examples are appliances with cycle engines, appliances that need to change or allow their cycle structure to be changed in response to an interaction with a consumable or consumable reader, a recipe book, or any other configuration mechanism, especially those which effect the cycle of operation either directly or indirectly by way of data about themselves, a consumable, a person, an appliance, a benefit, an outcome, or a behavior.

Appliances can also hold data about themselves, their componentry, and the organization of their componentry. In one embodiment, the appliance would have a composition with a root container of an appliance object having attributes of model number and serial number, methods for setting and getting those attributes, and at least one attribute containing a plurality of other objects representative of a first set of child containers. An example of a first set of child containers might be an appliance control system which in turn might have a second set of child containers of control boards wherein each object within the composition would also comprise a plurality of known methods and attribute names such as part numbers, model numbers, vendor ids, serial numbers and the like wherein some of the methods could be exposed to other local or remote objects for invocation and wherein the attribute names would be associated with values determined by the instance of that appliance, its current or past state, other factors, or any combination thereof. The classes available to be composed in the composition could be designed such that a client could bi-directionally traverse the composition and collect relevant attribute data or invoke appropriate methods according to the behavioral purpose of the client. In one embodiment, the client would be configured as a behavioral component of the visitor pattern within the same software operating environment of the composite structure. In a second embodiment, the client would be external to the composite structure and would access the structure over a network preferably using an embedded virtual router to encapsulate the difference between the external interface of the network and the internal interface of object to object collaboration within a single software operating environment. In one embodiment, the object composition of an appliance control system would be comprehensive and would be representative of the types of objects suggested in FIG. 135.

For an object-oriented control system to be distributed means that multiple software operating environments, each with a plurality of objects, will have the objects in operable communication. This disclosure blends object oriented messages between messaging in a runtime environment with messaging between objects across a network. A communications network like WIDE having a protocol like SA can be used to enable the operable communications between objects not sharing a runtime environment. Further, an embedded virtual router can be used to selectively encapsulate the communications between objects independent of the interposing architecture. It is preferred, then, that the packet structure be specifically designed and optimized for object oriented messaging. Therefore a plurality of namespaces comprising identifiers, either individually or in sets, must be defined to uniquely identify classes, objects, methods, method arguments, object and class attributes. Namespaces are the range of identifiers for a given set of things where each identifier can have an unambiguous meaning.

The packet structure can then be defined wherein fields of the packet can contain elements of the various namespaces allowing operable communications between objects. An exemplary packet structure might contain object ids, method ids, class ids, and argument values wherein the ordinal position of the argument value would designate the argument. An alternative to argument values by position would be pairs of argument ids and argument values wherein the ordinal position of the argument value within the packet would not have meaning and the meaning would be derived from the argument id.

See, for example, FIG. 136 that shows an exemplary packet structure D1182 for an object-oriented message in an appliance D1102 (FIG. 59) according to this disclosure. In this case, FIG. 136 illustrates the packet structure D1182 for message D3 sent from the configuration mechanism D1152 to the SA D10 or to the embedded virtual router D70 in FIG. 135. The packet D1182 will include at least D4 bytes, one to set the oid (1), one to set the MID (1) and one each for the arguments $arg_1$ through $arg_n$. It will be understood that the packet D1102 can be included in a larger message including values for MMP or Frag, as well as network identifiers as shown, for example, for the packet D24 in FIG. 82.

This disclosure includes at least one object-oriented control system configurable by a configuration mechanism in selective operable communication with a plurality of object oriented control systems using a packet protocol for constructing messages comprising identifiers from a plurality of namespaces associated with the building blocks of object-oriented systems wherein the meaning of each unique identifier within class library namespace is uniquely meaningful throughout the universe of appliances. The operable communications between objects can be selectively encapsulated through the use of an embedded virtual router and the context of more data about an object can be ascertained by traversing the composite structure from the object or knowing the class from which the object is instantiated. This disclosure further comprises a comprehensive approach to create a control system which can be configured to deliver the desired benefits of the user.

While examples of this disclosure have been specifically described in connection with certain specific embodiments thereof, it is to be understood that this is by way of illustration and not of limitation, and the scope of the appended claims should be construed as broadly as the prior art will permit.

What is claimed is:

1. An audio communication accessory, comprising:
    a communication device configured to communicate with an appliance;
    an audio user interface configured to transmit a first audio signal from a user to the appliance via the communication device, and to receive a second audio signal from the appliance via the communication device for audio transmission to the user;
    a selection builder configured to receive a current state awareness of the appliance, and further configured to populate a set of valid command structures appropriate for control or operation of the appliance based on a taxonomy capabilities dataset of the appliance and based on taxonomy capabilities of the current state of the appliance; and
    a command generator configured to construct a well-formed command related to the first audio signal when the first audio signal corresponds to at least one of the set of valid command structures based on the current state of the appliance, and configured to transmit the well-formed command to the appliance.

2. The audio communication accessory of claim 1, wherein the accessory enables a user to control the appliance in response to a voice command received via the audio user interface and constructed into a well-formed command by the command generator.

3. The audio communication accessory of claim 2, wherein the appliance performs a cycle of operation on a physical article in response to the voice command.

4. The audio communication accessory of claim 2, wherein the appliance comprises at least one of a washing machine, a dryer, a dishwasher, a microwave, an oven, a stove, a cooktop, a refrigerator, a freezer, or a counter-top kitchen appliance.

5. The audio communication accessory of claim 1, wherein the accessory comprises a phone.

6. The audio communication accessory of claim 1, wherein the accessory is mounted to the appliance.

7. The audio communication accessory of claim 1, wherein the accessory is communicatively coupled to an audio device separate from the accessory,
    wherein the appliance can be controlled by the audio device via the communication device, and
    wherein the audio user interface is further configured to enable a user to interact with the audio device via the communication device.

8. The audio communication accessory of claim 7, wherein the audio device comprises at least one of a stereo system, a clock, or a clock radio.

9. The audio communication accessory of claim 1, wherein the audio user interface enables a user to interact with the appliance to determine an operation status of the appliance.

10. The audio communication accessory of claim 9, wherein the operation status represents at least one of a fireplace on/off status, a security system activation status, a carbon monoxide detector status, an appliance door open status, a washing cycle status, a water temperature, a temperature limit exceeded, a leak detector status, a filter replacement status, an end of operation, a start of operation, confirmation of an operation in progress, a cooktop burner on/off status, a heating element on/off status, a pre-heat status, an energy usage, or an energy usage exceeds limit.

11. The audio communication accessory of claim 1, further comprising at least one of an event calendar, a medication reminder, a weather forecast or a lost item location accessible via the audio user interface.

12. The audio communication accessory of claim 1, wherein the audio user interface enables a user to interact with the appliance to configure or activate a sleep mode for the appliance.

13. The audio communication accessory of claim 12, wherein the sleep mode comprises at least one of turning off a light, turning down a temperature, or activating a security system.

14. The audio communication accessory of claim 1, wherein a user can interact with the appliance via the audio user interface during a sales demonstration.

15. The audio communication accessory of claim 1, wherein a user can interact with a use and care guide via the audio user interface.

16. The audio communication accessory of claim 1, wherein the audio communication accessory is communicatively coupled to a tactile feedback device to provide tactile versions representing outputs of the audio communication accessory.

17. The audio communication accessory of claim 1, wherein a coupling of the audio communication accessory and the appliance is authenticated.

18. The audio communication accessory of claim 1, wherein the first audio signal is an audio input received from the user by the audio user interface, the audio input corresponding to a command to be transmitted to the appliance via the communication device.

19. The audio communication accessory of claim 18, wherein the second audio signal includes audio information to be audibly transmitted to the user.

20. An appliance comprising:
a communication device configured to receive a voice input signal from an audio user interface and to transmit an audio output signal from the appliance to the audio user interface;
a selection builder configured to receive a current state awareness of the appliance, and further configured to populate a set of valid command structures appropriate for control or operation of the appliance based on a taxonomy capabilities dataset of the appliance and based on taxonomy capabilities of the current state of the appliance; and
a command generator configured to construct a well-formed command related to the voice input signal and based on the set of valid command structures of the current state of the appliance, for execution by the appliance.

* * * * *